(12) United States Patent
Gladwin et al.

(10) Patent No.: US 12,717,793 B2
(45) Date of Patent: Aug. 25, 2026

(54) LIMITING EXECUTION OF DATABASE OPERATIONS BASED ON POWER USAGE POLICY DATA

(71) Applicant: Ocient Holdings LLC, Chicago, IL (US)

(72) Inventors: S. Christopher Gladwin, Chicago, IL (US); Greg R. Dhuse, Chicago, IL (US); George Kondiles, Highland Park, IL (US); Dylan Sebastian Murphy, Newton, MA (US); Neil Kumar, Chicago, IL (US); Joseph Jablonski, Chicago, IL (US); Ian Michael Drury, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/895,760

(22) Filed: Sep. 25, 2024

(65) Prior Publication Data

US 2025/0021566 A1 Jan. 16, 2025

Related U.S. Application Data

(63) Continuation-in-part of application No. 18/887,562, filed on Sep. 17, 2024, and a continuation-in-part of (Continued)

(51) Int. Cl.
*G06F 16/2455* (2019.01)
*G06F 16/242* (2019.01)
*G06F 16/248* (2019.01)

(52) U.S. Cl.
CPC .... *G06F 16/24564* (2019.01); *G06F 16/2428* (2019.01); *G06F 16/248* (2019.01)

(58) Field of Classification Search
CPC ........... G06F 16/24564; G06F 16/2428; G06F 16/248

(Continued)

(56) References Cited

U.S. PATENT DOCUMENTS

| | | |
|---|---|---|
| 5,509,131 A | 4/1996 | Smith |
| 5,548,770 A | 8/1996 | Bridges |

(Continued)

FOREIGN PATENT DOCUMENTS

| | | |
|---|---|---|
| JP | 2012155358 A | 8/2012 |
| KR | 101143998 B1 | 5/2012 |
| KR | 1020190015285 A | 2/2019 |

OTHER PUBLICATIONS

Anonymous; Database; Wikipedia; Sep. 22, 2019; 21 pgs [Retrieved from the Internet: https://en.wikipedia.org/w/index.php?title=Databases&oldid=917129682; retrieved on Jul. 14, 2023].

(Continued)

*Primary Examiner* — Joshua Bullock
(74) *Attorney, Agent, or Firm* — Garlick & Markison; Patricia M. Healy

(57) ABSTRACT

A database system is operable to determine power usage policy data and generate operation requirement data based on the power usage policy data. A database operation is determined for execution, and an energy utilization-based operation limitation enforcement function is performed upon energy utilization-based operation restriction enforcement input data to generate energy utilization-based operation restriction enforcement data for the database operation based on applying the operation requirement data. The database operation is executed when the energy utilization-based operation restriction enforcement data indicates execution of the operation is allowed based on execution of the database operation adhering to the operation requirement data. Execution of database operation is foregone when the (Continued)

energy utilization-based operation restriction enforcement data indicates execution of the operation is disallowed based on execution of the database operation not adhering to the operation requirement data.

20 Claims, 136 Drawing Sheets

Related U.S. Application Data application No. 18/743,289, filed on Jun. 14, 2024, now abandoned, which is a continuation of application No. 18/532,167, filed on Dec. 7, 2023, now Pat. No. 12,271,384, which is a continuation of application No. 17/651,914, filed on Feb. 22, 2022, now Pat. No. 11,874,841, which is a continuation of application No. 17/443,066, filed on Jul. 20, 2021, now Pat. No. 11,734,283, which is a continuation of application No. 16/668,402, filed on Oct. 30, 2019, now Pat. No. 11,106,679.

(58) Field of Classification Search
USPC .......................................................... 707/694
See application file for complete search history.

(56) References Cited

U.S. PATENT DOCUMENTS 5,628,023 A 5/1997 Bryant
5,778,354 A 7/1998 Leslie
5,787,416 A 7/1998 Tabb
5,921,582 A 7/1999 Gusack
6,195,661 B1 2/2001 Filepp
6,230,200 B1 5/2001 Forecast
6,473,847 B1 10/2002 Kamiya
6,633,772 B2 10/2003 Ford
6,816,280 B1 11/2004 Davenport
6,816,957 B1 11/2004 Halladay
7,499,907 B2 3/2009 Brown
7,783,858 B2 8/2010 Chiang
7,908,242 B1 3/2011 Achanta
8,880,695 B2 11/2014 Sakai
8,903,803 B1 12/2014 Aly
9,547,435 B2 1/2017 Kim
9,870,386 B1 1/2018 Madhavarapu
10,133,775 B1 11/2018 Ramalingam
10,152,522 B1* 12/2018 van Rotterdam ..... H04L 63/102
10,275,776 B1* 4/2019 Watson .............. G06F 11/3604
10,354,423 B2 7/2019 Ozawa
10,740,404 B1 8/2020 Hjermstad
10,909,091 B1 2/2021 Shah
10,909,143 B1 2/2021 Brahmadesam
10,990,571 B1 4/2021 Zhang
11,080,253 B1 8/2021 Leshinsky
11,297,123 B1 4/2022 Coombs
12,072,887 B1 8/2024 Schieferstein
12,093,254 B1 9/2024 Kondiles
2001/0051949 A1 12/2001 Carey
2002/0032676 A1 3/2002 Reiner
2002/0116417 A1 8/2002 Weinberg
2003/0171998 A1 9/2003 Pujar
2004/0068661 A1 4/2004 Dettinger et al.
2004/0162853 A1 8/2004 Brodersen
2004/0215919 A1 10/2004 Emmes
2006/0212944 A1 9/2006 Hara
2008/0077570 A1 3/2008 Tang
2008/0133456 A1 6/2008 Richards
2008/0204806 A1 8/2008 Tao
2009/0063893 A1 3/2009 Bagepalli
2009/0183167 A1 7/2009 Kupferschmidt
2010/0082577 A1 4/2010 Mirchandani
2010/0115172 A1 5/2010 Gillingham
2010/0241646 A1 9/2010 Friedman
2010/0274983 A1 10/2010 Murphy
2010/0312756 A1 12/2010 Zhang
2011/0219169 A1 9/2011 Zhang
2011/0295833 A1 12/2011 Narasayya
2012/0005490 A1* 1/2012 Goraczko ............ G06F 1/3206
713/300
2012/0036162 A1* 2/2012 Gimbel .............. G06F 16/2455
707/783
2012/0109888 A1 5/2012 Zhang
2012/0150008 A1 6/2012 Kaib
2012/0151118 A1 6/2012 Flynn
2012/0185866 A1 7/2012 Couvee
2012/0210095 A1 8/2012 Nellans
2012/0254252 A1 10/2012 Jin
2012/0311246 A1 12/2012 Mcwilliams
2013/0041852 A1* 2/2013 Ellis ..................... H04L 67/125
705/400
2013/0117270 A1 5/2013 Sullivan
2013/0166690 A1 6/2013 Shatzkamer
2013/0246336 A1 9/2013 Ahuja et al.
2013/0332484 A1 12/2013 Gajic
2014/0047095 A1 2/2014 Breternitz
2014/0136510 A1 5/2014 Parkkinen
2014/0188841 A1 7/2014 Sun
2014/0201351 A1 7/2014 Fransen
2015/0205607 A1 7/2015 Lindholm
2015/0244804 A1 8/2015 Warfield
2015/0248366 A1 9/2015 Bergsten
2015/0293966 A1 10/2015 Cai
2015/0310045 A1 10/2015 Konik
2015/0310067 A1* 10/2015 Svoboda ............ G06F 21/6218
707/781
2016/0034547 A1 2/2016 Lerios
2016/0062805 A1 3/2016 Kumar
2016/0370843 A1* 12/2016 Gatson ................. G06F 1/3206
2017/0330596 A1 11/2017 Segal
2017/0353395 A1 12/2017 Richardson et al.
2018/0018727 A1 1/2018 Abuelsaad et al.
2018/0089867 A1 3/2018 Ozawa
2018/0130143 A1* 5/2018 Han ...................... G06Q 50/06
2018/0157711 A1 6/2018 Lee
2018/0198842 A1 7/2018 Chandran
2018/0336639 A1 11/2018 Dziabiak et al.
2019/0297143 A1 9/2019 Anadon
2020/0117649 A1 4/2020 Arnold
2021/0124744 A1 4/2021 Gladwin
2021/0133196 A1 5/2021 Gladwin
2021/0191942 A1 6/2021 Arnold
2021/0240713 A1 8/2021 Kondiles
2021/0365456 A1 11/2021 Kondiles
2021/0383109 A1 12/2021 Mukherji
2022/0004556 A1 1/2022 Arnold
2022/0043690 A1 2/2022 Kondiles
2022/0043755 A1 2/2022 Kondiles
2022/0043787 A1 2/2022 Kondiles
2022/0138168 A1 5/2022 Veselova
2022/0237230 A1 7/2022 Zovic
2022/0382751 A1 12/2022 Dhuse
2023/0107652 A1 4/2023 Veselova
2023/0367773 A1 11/2023 Kondiles
2023/0385277 A1 11/2023 Schmidt
2023/0385278 A1 11/2023 Bove
2023/0401217 A1 12/2023 Arnold
2023/0418827 A1 12/2023 Kondiles
2024/0004882 A1 1/2024 Bove
2024/0078232 A1 3/2024 Arnold
2024/0118905 A1 4/2024 Kondiles
2024/0134858 A1 4/2024 Schieferstein
2024/0143595 A1 5/2024 Bove
2024/0256538 A1 8/2024 Gladwin
2024/0256541 A1 8/2024 Gladwin
2024/0265012 A1 8/2024 Gladwin

OTHER PUBLICATIONS

European Patent Office; Communication pursuant to Article 94(3) EPC; Application No. 20881989.6; Sep. 6, 2024; 8 pgs.

(56) References Cited

OTHER PUBLICATIONS

European Patent Office; extended EP Search Report; Application No. 20881989.6; Jul. 27, 2023; 10 pgs.
International Searching Authority; International Search Report and Written Opinion; International Application No. PCT/US2020/056315; Feb. 9, 2021; 11 pgs.
A new high performance fabric for HPC, Michael Feldman, May 2016, Intersect360 Research.
Alechina, N. (2006-2007). B-Trees. School of Computer Science, University of Nottingham, http://www.cs.nott.ac.uk/~psznza/G5BADS06/lecture13-print.pdf. 41 pages.
Amazon DynamoDB: ten things you really should know, Nov. 13, 2015, Chandan Patra, http://cloudacademy. .com/blog/amazon-dynamodb-ten-thing.
An Inside Look at Google BigQuery, by Kazunori Sato, Solutions Architect, Cloud Solutions team, Google Inc., 2012.
Big Table, a NoSQL massively parallel table, Paul Krzyzanowski, Nov. 2011, https://www.cs.rutgers.edu/pxk/417/notes/contentlbigtable.html.
Distributed Systems, Fall2012, Mohsen Taheriyan, http://www-scf.usc.edu/-csci57212011Spring/presentations/Taheriyan.pptx.
European Patent Office; extended European Search Report; Application No. 20880707.3; Aug. 29, 2023; 12 pgs.
International Searching Authority; International Search Report and Written Opinion; International Application No. PCT/US2017/054773; Feb. 13, 2018; 17 pgs.
International Searching Authority; International Search Report and Written Opinion; International Application No. PCT/US2017/054784; Dec. 28, 2017; 10 pgs.
International Searching Authority; International Search Report and Written Opinion; International Application No. PCT/US2017/066145; Mar. 5, 2018; 13 pgs.
International Searching Authority; International Search Report and Written Opinion; International Application No. PCT/US2017/066169; Mar. 6, 2018; 15 pgs.
International Searching Authority; International Search Report and Written Opinion; International Application No. PCT/US2018/025729; Jun. 27, 2018; 9 pgs.
International Searching Authority; International Search Report and Written Opinion; International Application No. PCT/US2018/034859; Oct. 30, 2018; 8 pgs.
International Searching Authority; International Search Report and Written Opinion; International Application No. PCT/US2020/056452; Jan. 26, 2021; 11 pgs.
MapReduce: Simplified Data Processing on Large Clusters, OSDI 2004, Jeffrey Dean and Sanjay Ghemawat, Google, Inc., 13 pgs.
Rodero-Merino, L.; Storage of Structured Data: Big Table and HBase, New Trends In Distributed Systems, MSc Software and Systems, Distributed Systems Laboratory; Oct. 17, 2012; 24 pages.
Step 2: Examine the data model and implementation details, 2016, Amazon Web Services, Inc., http://docs.aws.amazon.com/amazondynamodb/latestldeveloperguide!Ti . . . .

* cited by examiner database system 10

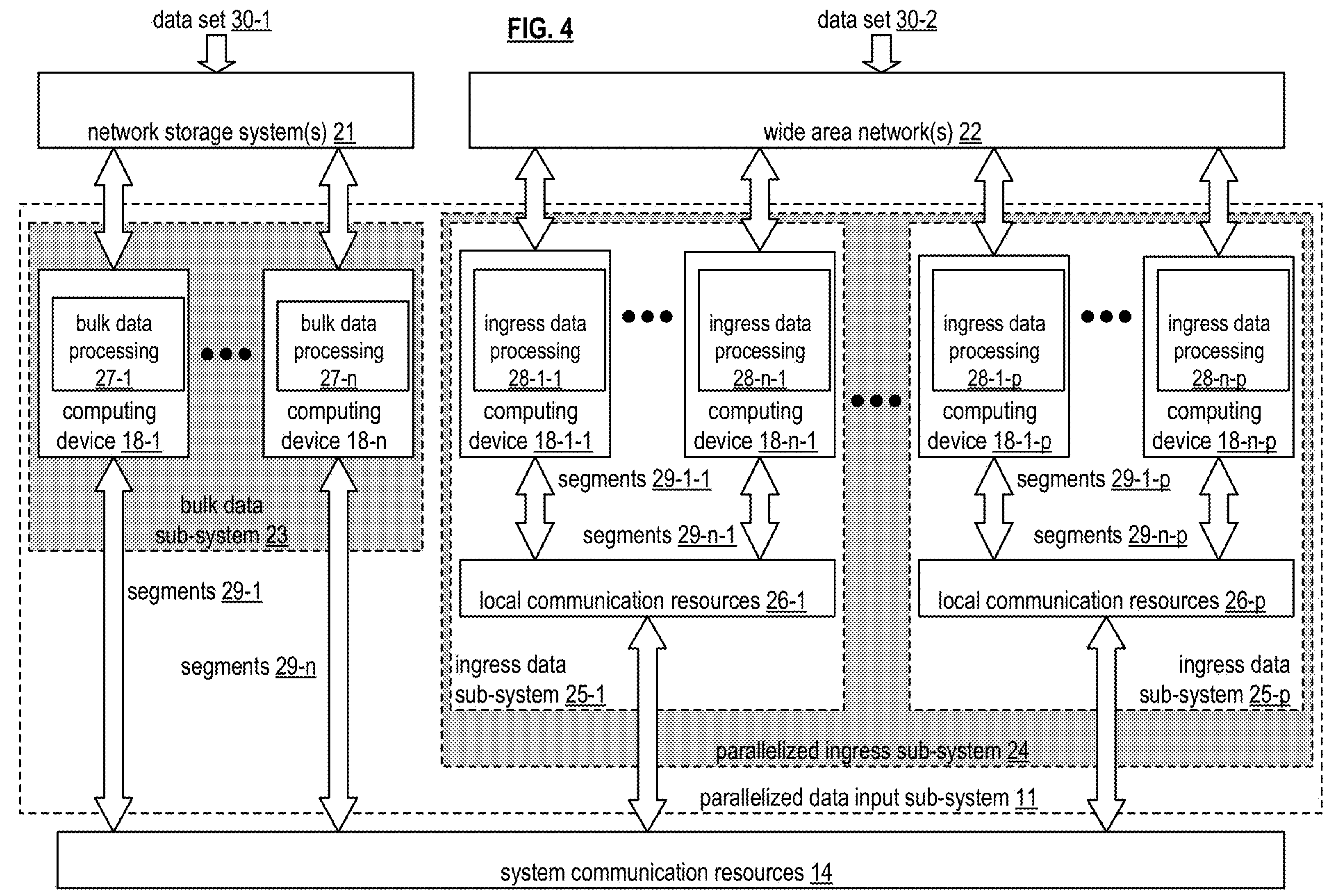
FIG. 4
data set 30-1
data set 30-2
network storage system(s) 21
wide area network(s) 22
bulk data processing 27-1
computing device 18-1
bulk data processing 27-n
computing device 18-n
bulk data sub-system 23
segments 29-1
segments 29-n
ingress data processing 28-1-1
computing device 18-1-1
ingress data processing 28-n-1
computing device 18-n-1
segments 29-1-1
segments 29-n-1
local communication resources 26-1
ingress data sub-system 25-1
ingress data processing 28-1-p
computing device 18-1-p
ingress data processing 28-n-p
computing device 18-n-p
segments 29-1-p
segments 29-n-p
local communication resources 26-p
ingress data sub-system 25-p
parallelized ingress sub-system 24
parallelized data input sub-system 11
system communication resources 14

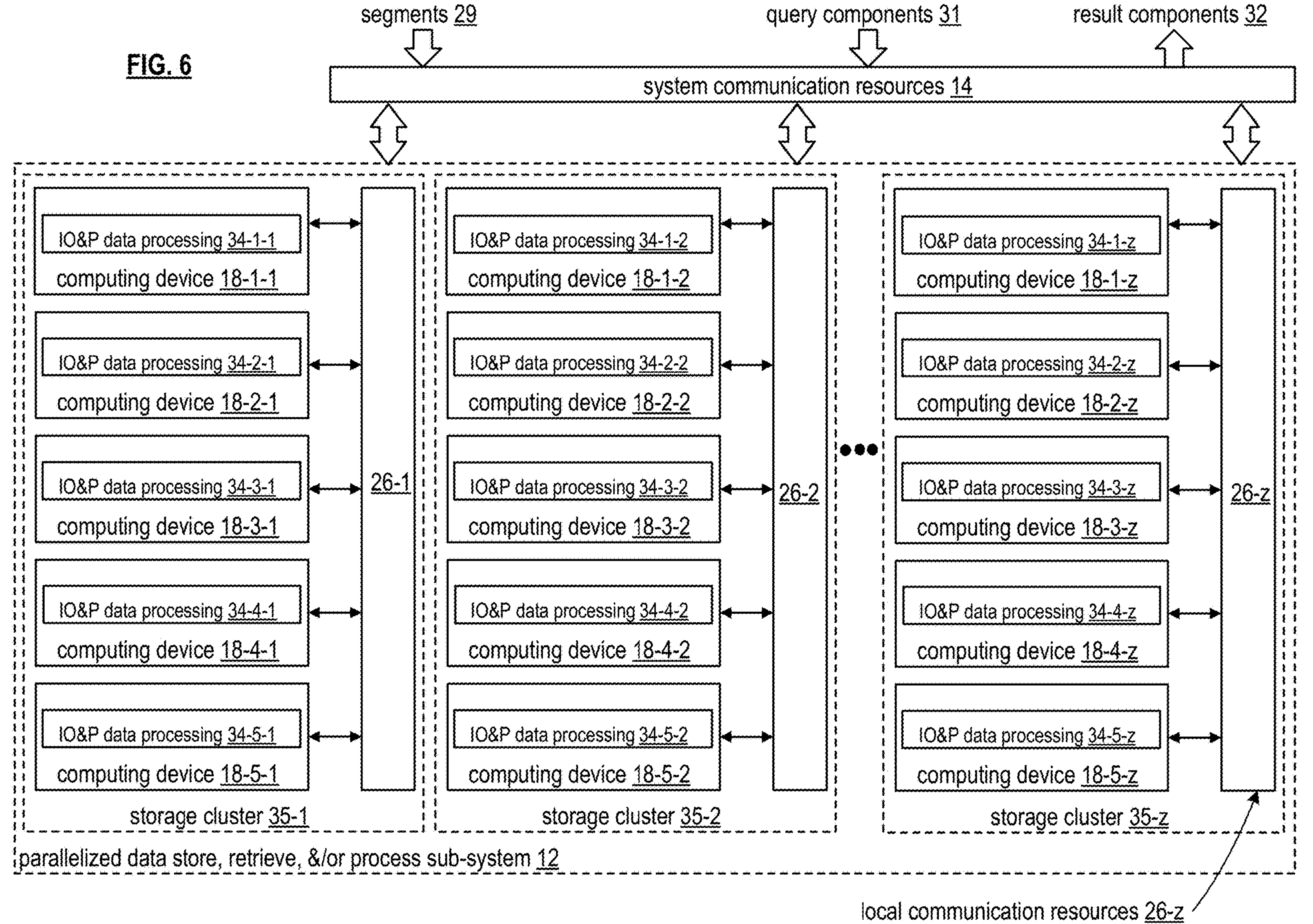
FIG. 6
segments 29
query components 31
result components 32
system communication resources 14
IO&P data processing 34-1-1
computing device 18-1-1
IO&P data processing 34-2-1
computing device 18-2-1
IO&P data processing 34-3-1
computing device 18-3-1
IO&P data processing 34-4-1
computing device 18-4-1
IO&P data processing 34-5-1
computing device 18-5-1
26-1
storage cluster 35-1
IO&P data processing 34-1-2
computing device 18-1-2
IO&P data processing 34-2-2
computing device 18-2-2
IO&P data processing 34-3-2
computing device 18-3-2
IO&P data processing 34-4-2
computing device 18-4-2
IO&P data processing 34-5-2
computing device 18-5-2
26-2
storage cluster 35-2
IO&P data processing 34-1-z
computing device 18-1-z
IO&P data processing 34-2-z
computing device 18-2-z
IO&P data processing 34-3-z
computing device 18-3-z
IO&P data processing 34-4-z
computing device 18-4-z
IO&P data processing 34-5-z
computing device 18-5-z
26-z
storage cluster 35-z
parallelized data store, retrieve, &/or process sub-system 12
local communication resources 26-z computing device 18 computing device 18 computing device 18 node 37 node 37 node 37 data set segment group segment 1
data & parity section
manifest section
index 0 section
index x section
statistics section segment 2
data & parity section
manifest section
index 0 section
index x section
statistics section segment 3
data & parity section
manifest section
index 0 section
index x section
statistics section segment 4
data & parity section
manifest section
index 0 section
index x section
statistics section segment 5
data & parity section
manifest section
index 0 section
index x section
statistics section

FIG. 23 query processing system 2502 query execution module
2504 database system 10 database system 10 query execution module 2504

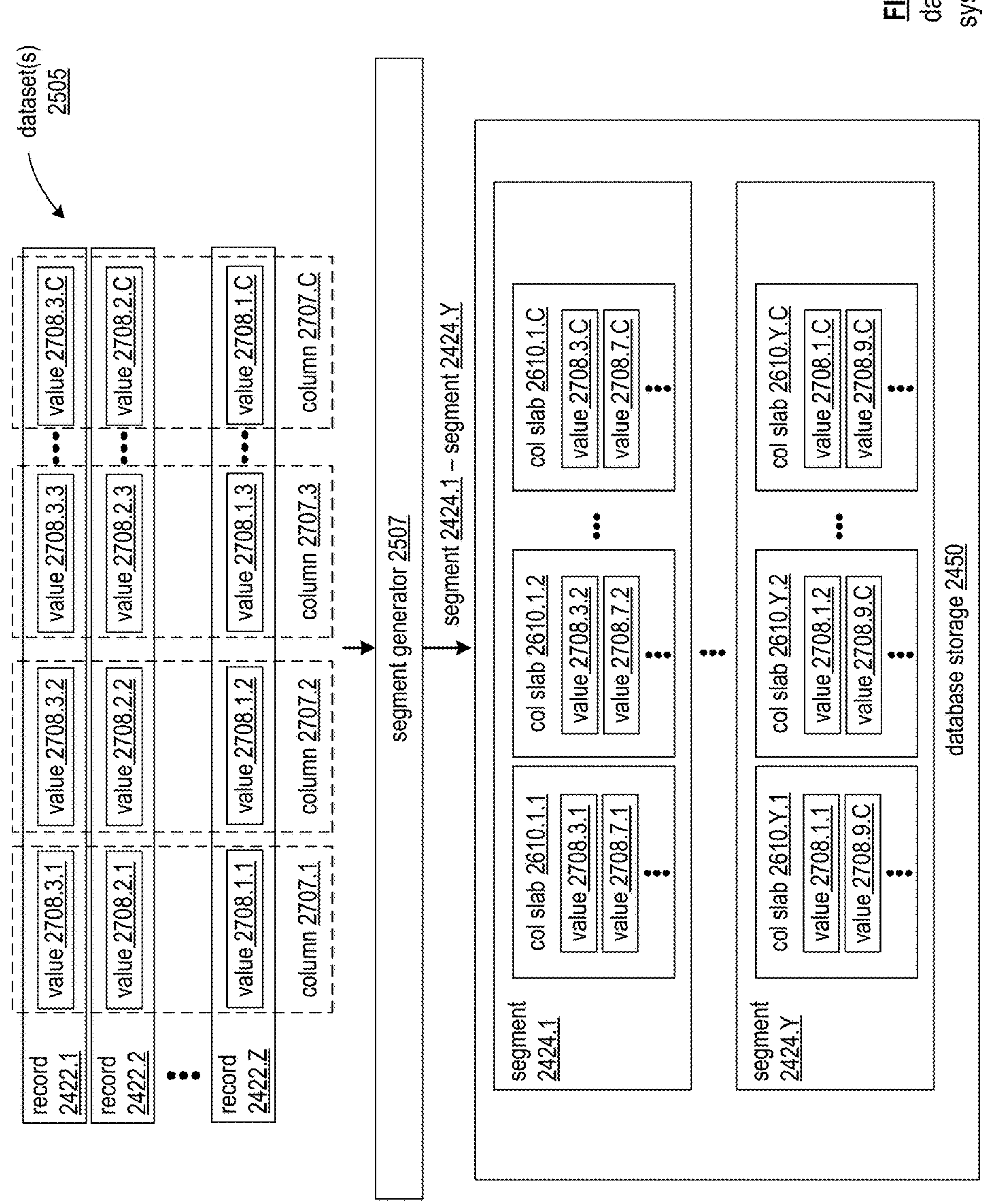
dataset(s) 2505
record 2422.1
record 2422.2
record 2422.Z
value 2708.3.1
value 2708.3.2
value 2708.3.3
value 2708.3.C
value 2708.2.1
value 2708.2.2
value 2708.2.3
value 2708.2.C
value 2708.1.1
value 2708.1.2
value 2708.1.3
value 2708.1.C
column 2707.1
column 2707.2
column 2707.3
column 2707.C
segment generator 2507
segment 2424.1 – segment 2424.Y
segment 2424.1
col slab 2610.1.1
value 2708.3.1
value 2708.7.1
col slab 2610.1.2
value 2708.3.2
value 2708.7.2
col slab 2610.1.C
value 2708.3.C
value 2708.7.C
segment 2424.Y
col slab 2610.Y.1
value 2708.1.1
value 2708.9.C
col slab 2610.Y.2
value 2708.1.2
value 2708.9.C
col slab 2610.Y.C
value 2708.1.C
value 2708.9.C
database storage 2450
FIG. 24P
database system 10 database system 10 query processing system 2510 query processing system 2510 database system 10 database system 10 database system 10 record processing and storage system 2505

2505 record processing and storage system 2505

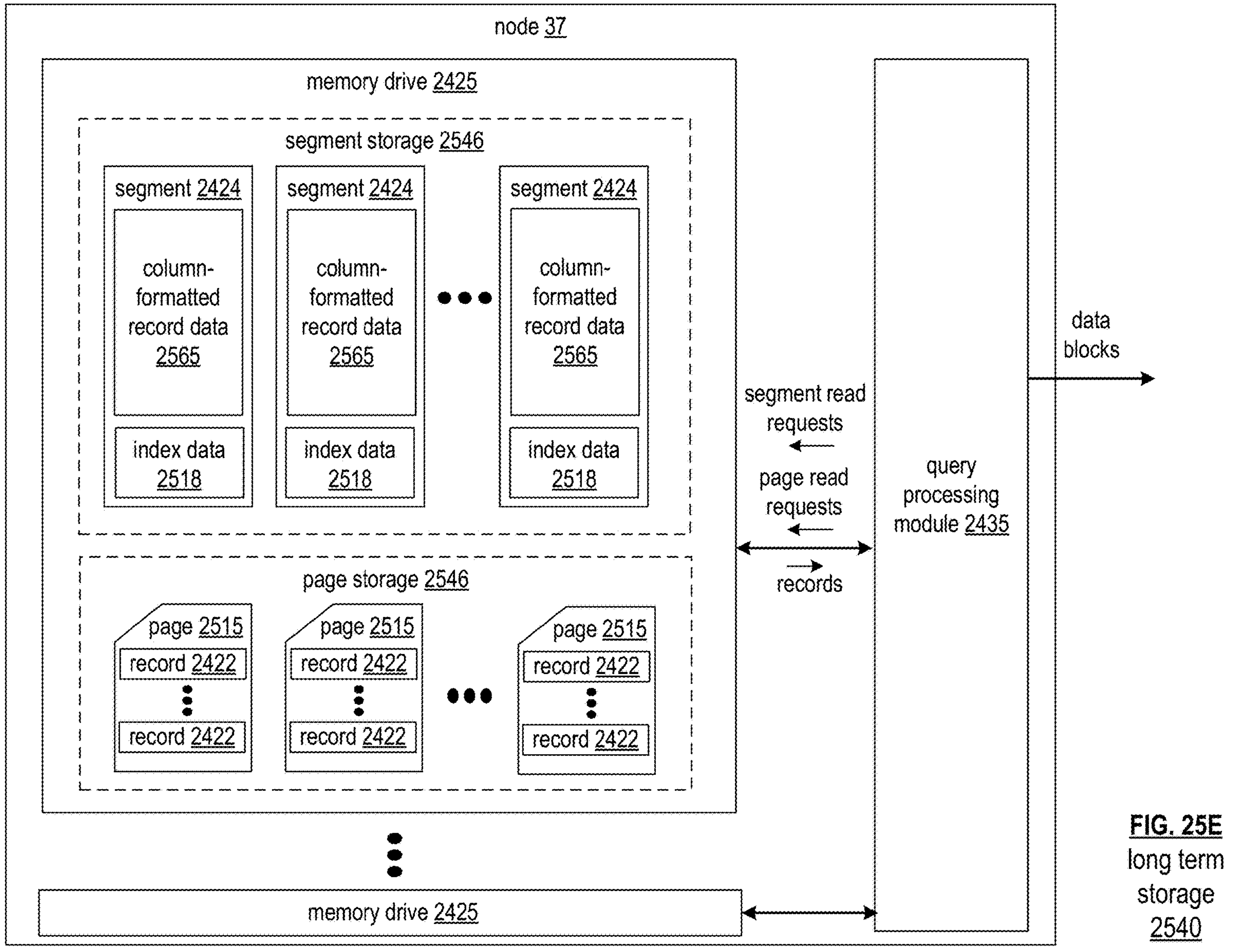
FIG. 25E long term storage 2540 database system 10 database system 10 database system 10 database system 10 database system 10 database system 10 database system 10 database system 10 database system 10 energy utilization measurement system 3550
per-operation energy utilization measurement module 3631
execution of energy utilization measurement function(s) 3619 for operation 3701.i
per-operation energy utilization measurement output data 3616 for operation 3701.i
energy utilization measurement data 3617
user entity(ies) 2012

FIG. 27E energy utilization measurement system 3550
per-operation energy utilization measurement module 3631
execution of energy utilization measurement function(s) 3619 for operation 3701.i
per-operation energy utilization measurement output data 3616 for operation 3701.i
energy utilization measurement data 3617
energy utilization estimation system 3551
energy utilization-based operation pricing system 3556

FIG. 27F database system 10 database system 10 database system 10 database system 10 database system 10 database system 10 database system 10 database system 10 database system 10 database system 10 database system 10 database system 10 database system 10 database system 10 database system 10 database system 10 database system 10

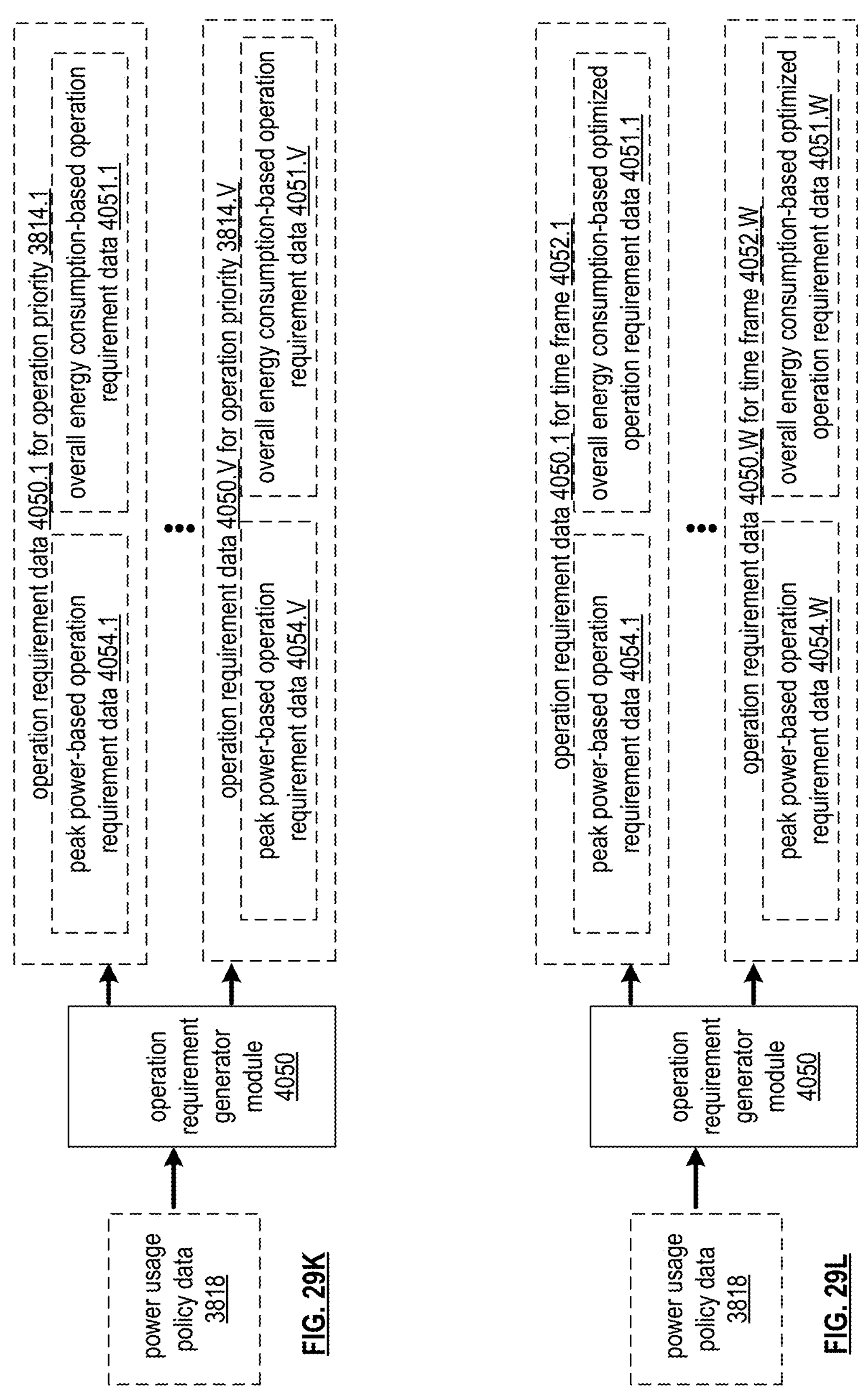
power usage policy data 3818
operation requirement generator module 4050
operation requirement data 4050.1 for operation priority 3814.1
peak power-based operation requirement data 4054.1
overall energy consumption-based operation requirement data 4051.1
operation requirement data 4050.V for operation priority 3814.V
peak power-based operation requirement data 4054.V
overall energy consumption-based operation requirement data 4051.V
FIG. 29K
power usage policy data 3818
operation requirement generator module 4050
operation requirement data 4050.1 for time frame 4052.1
peak power-based operation requirement data 4054.1
overall energy consumption-based optimized operation requirement data 4051.1
operation requirement data 4050.W for time frame 4052.W
peak power-based operation requirement data 4054.W
overall energy consumption-based optimized operation requirement data 4051.W
FIG. 29L database system 10 database system 10 database system 10 database system 10 database system 10 database system 10 database system 10 segment indexing module 2510

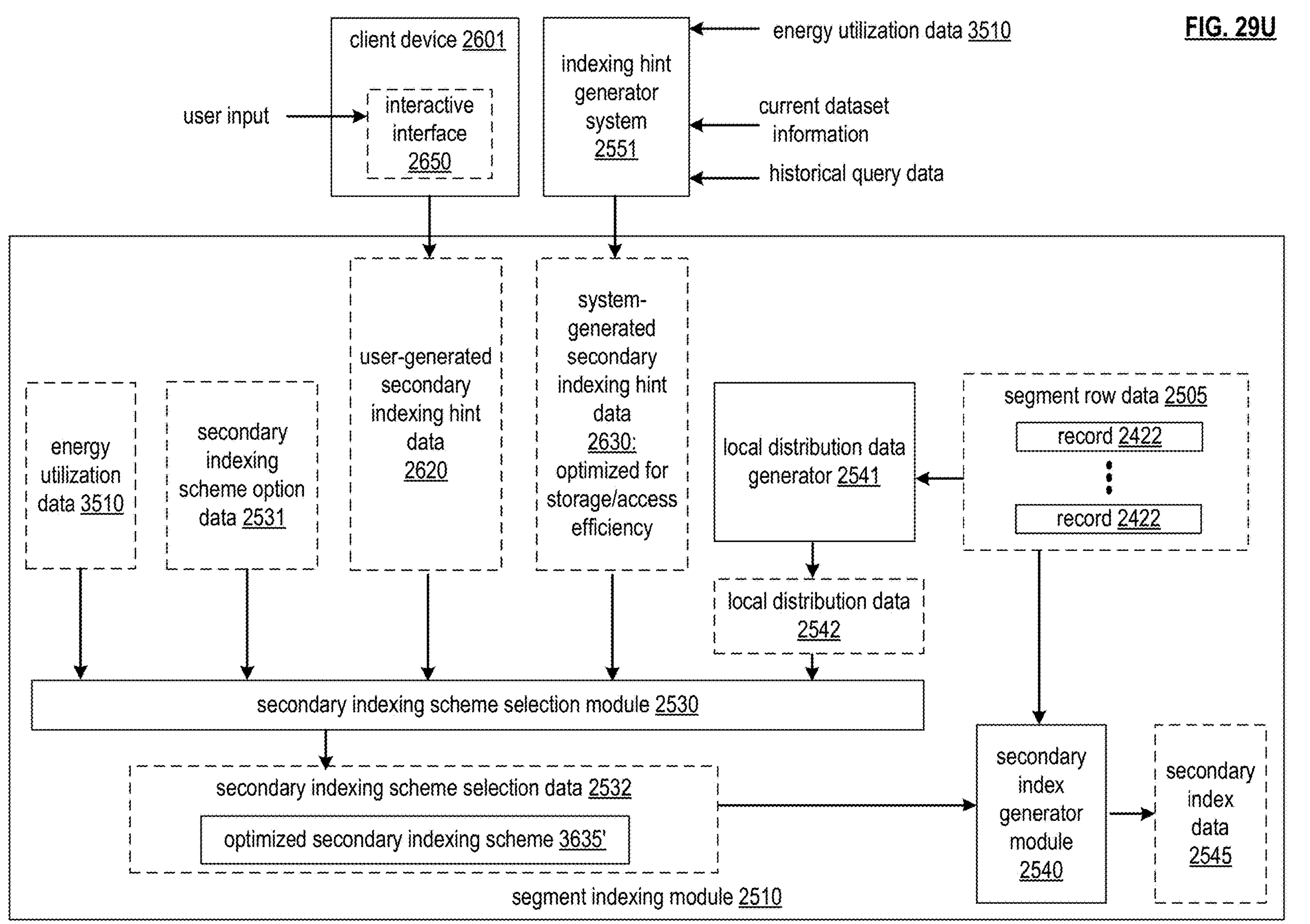
FIG. 29U
client device 2601
interactive interface 2650
user input
indexing hint generator system 2551
energy utilization data 3510
current dataset information
historical query data
energy utilization data 3510
secondary indexing scheme option data 2531
user-generated secondary indexing hint data 2620
system-generated secondary indexing hint data 2630: optimized for storage/access efficiency
local distribution data generator 2541
segment row data 2505
record 2422
record 2422
local distribution data 2542
secondary indexing scheme selection module 2530
secondary indexing scheme selection data 2532
optimized secondary indexing scheme 3635'
secondary index generator module 2540
secondary index data 2545
segment indexing module 2510 database system 10 database system 10 database system 10

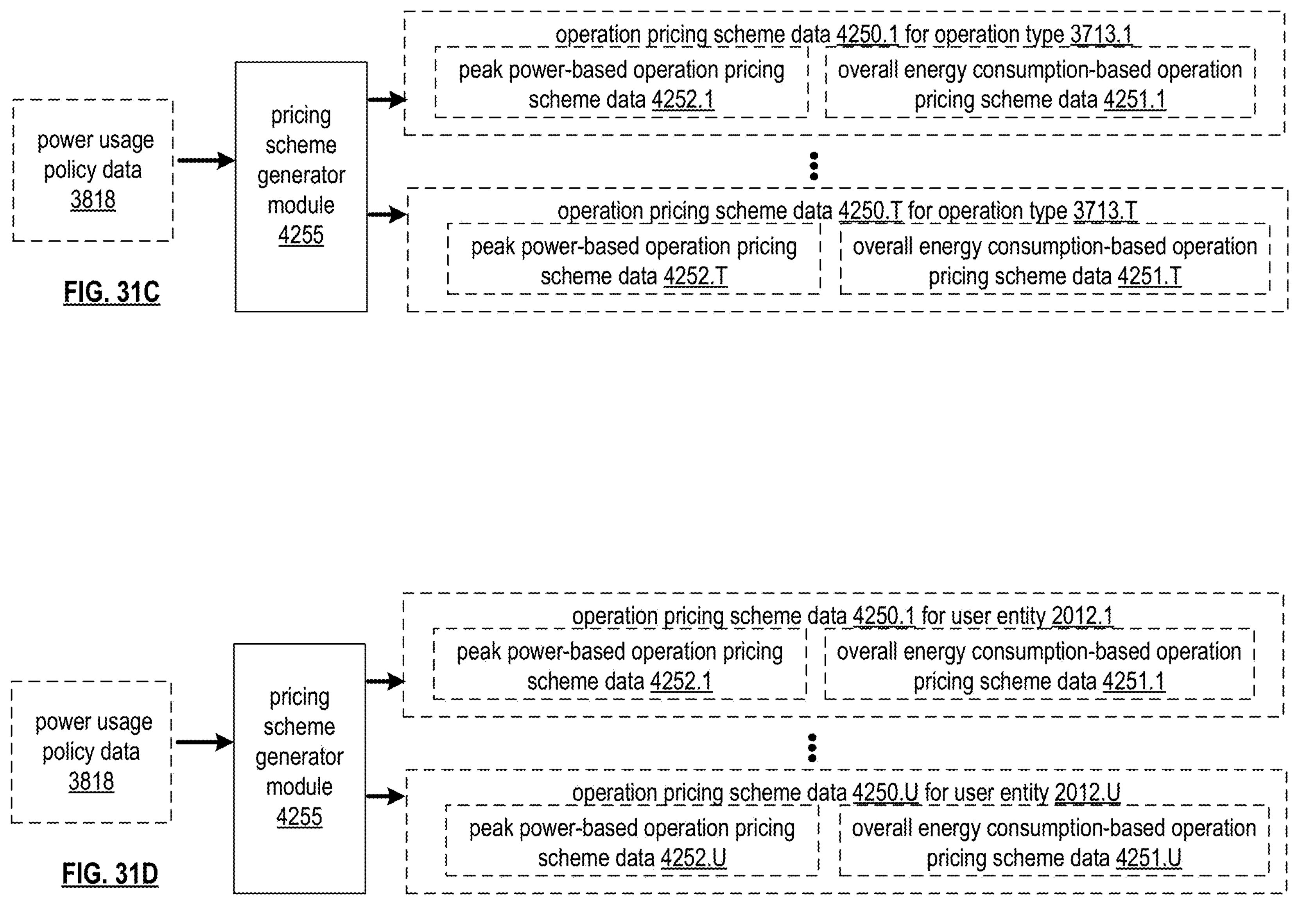
power usage policy data 3818
pricing scheme generator module 4255
operation pricing scheme data 4250.1 for operation type 3713.1
peak power-based operation pricing scheme data 4252.1
overall energy consumption-based operation pricing scheme data 4251.1
operation pricing scheme data 4250.T for operation type 3713.T
peak power-based operation pricing scheme data 4252.T
overall energy consumption-based operation pricing scheme data 4251.T
FIG. 31C
power usage policy data 3818
pricing scheme generator module 4255
operation pricing scheme data 4250.1 for user entity 2012.1
peak power-based operation pricing scheme data 4252.1
overall energy consumption-based operation pricing scheme data 4251.1
operation pricing scheme data 4250.U for user entity 2012.U
peak power-based operation pricing scheme data 4252.U
overall energy consumption-based operation pricing scheme data 4251.U
FIG. 31D

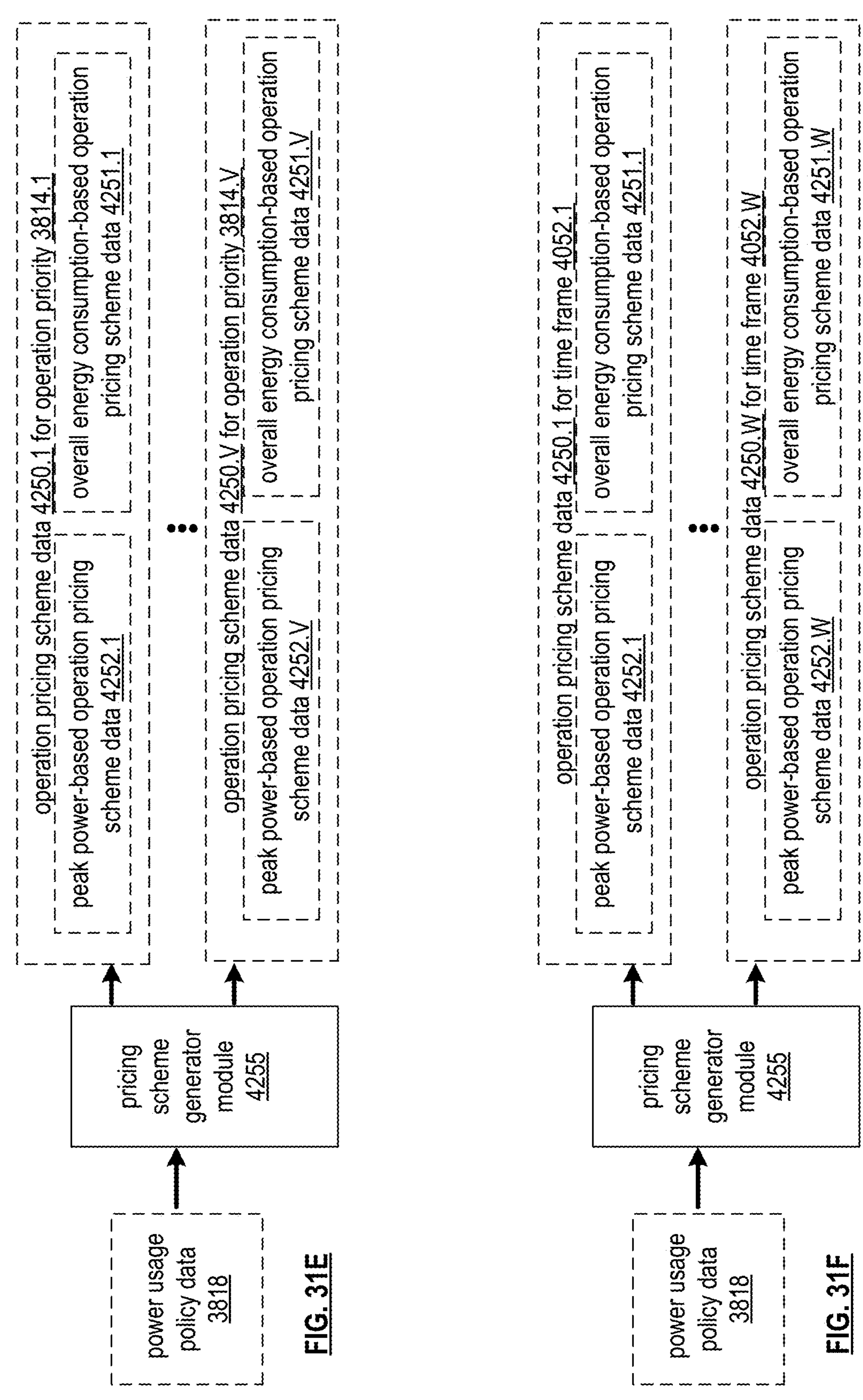
power usage policy data 3818
pricing scheme generator module 4255
operation pricing scheme data 4250.1 for operation priority 3814.1
peak power-based operation pricing scheme data 4252.1
overall energy consumption-based operation pricing scheme data 4251.1
operation pricing scheme data 4250.V for operation priority 3814.V
peak power-based operation pricing scheme data 4252.V
overall energy consumption-based operation pricing scheme data 4251.V
FIG. 31E
power usage policy data 3818
pricing scheme generator module 4255
operation pricing scheme data 4250.1 for time frame 4052.1
peak power-based operation pricing scheme data 4252.1
overall energy consumption-based operation pricing scheme data 4251.1
operation pricing scheme data 4250.W for time frame 4052.W
peak power-based operation pricing scheme data 4252.W
overall energy consumption-based operation pricing scheme data 4251.W
FIG. 31F

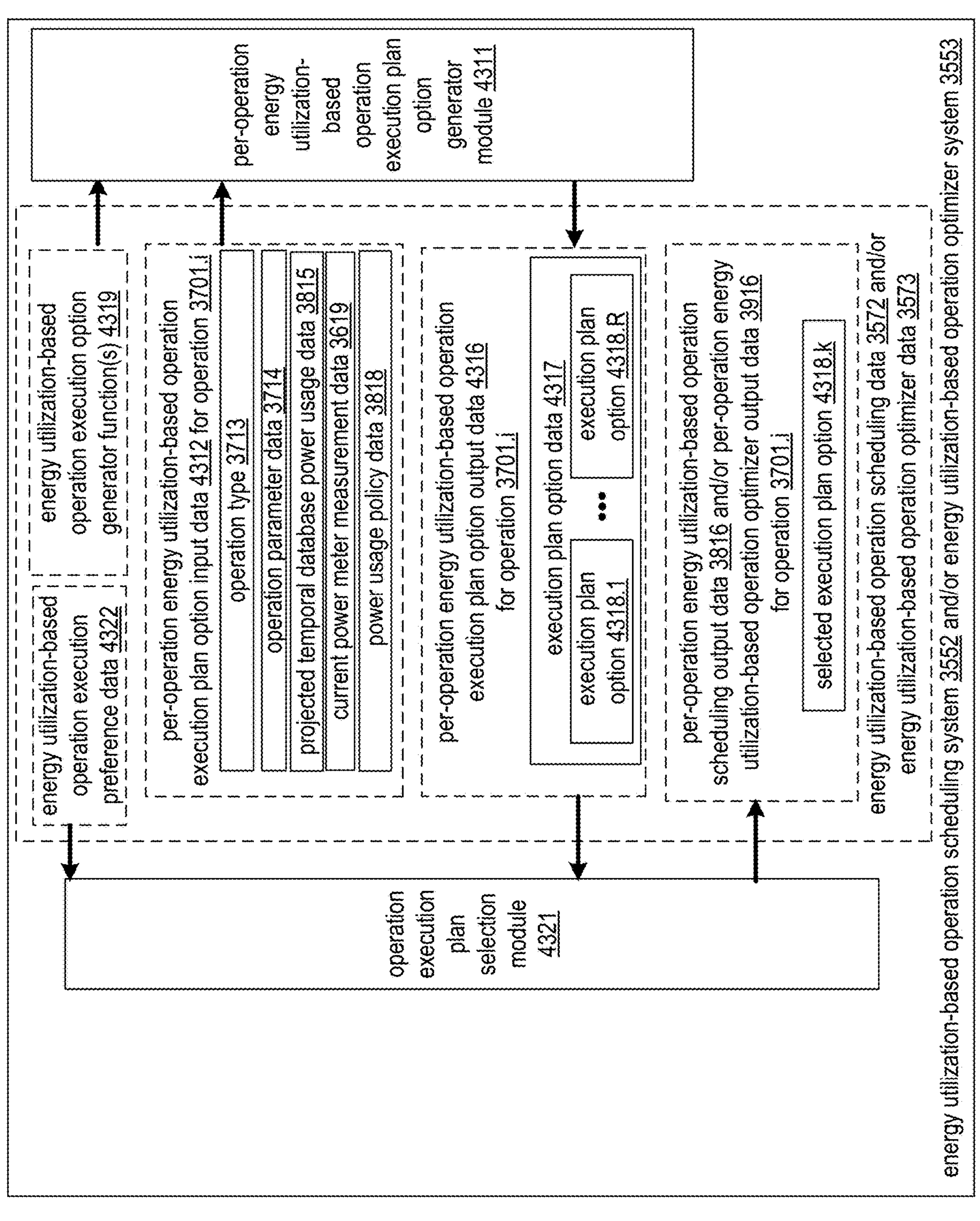
FIG. 32A database system 10 database system 10 database system 10 database system 10 database system 10 database system 10 database system 10

LIMITING EXECUTION OF DATABASE OPERATIONS BASED ON POWER USAGE POLICY DATA

CROSS-REFERENCE TO RELATED APPLICATIONS

The present U.S. Utility patent application claims priority pursuant to 35 U.S.C. § 120 as a continuation-in-part of U.S. Utility application Ser. No. 18/887,562, entitled "OPTIMIZING EXECUTION OF OPERATIONS BY A DATABASE SYSTEM BASED ON ENERGY UTILIZATION AND/OR PERFORMANCE", filed Sep. 17, 2024, which is hereby incorporated herein by reference in its entirety and made part of the present U.S. Utility patent application for all purposes.

The present U.S. Utility patent application claims priority pursuant to 35 U.S.C. § 120 as a continuation-in-part of U.S. Utility application Ser. No. 18/743,289, entitled "ENFORCEMENT OF QUERY RULES BASED ON POWER FOR ACCESS TO DATA IN A DATABASE SYSTEM", filed Jun. 14, 2024, which is a continuation of U.S. Utility application Ser. No. 18/532,167, entitled "ENFORCEMENT OF A MINIMUM RESULT SET SIZE RULE FOR QUERIES REQUESTED FOR EXECUTION AGAINST A DATABASE SYSTEM", filed Dec. 7, 2023, which is a continuation of U.S. Utility application Ser. No. 17/651,914, entitled "ENFORCEMENT OF QUERY RULES FOR ACCESS TO DATA IN A DATABASE SYSTEM", filed Feb. 22, 2022, issued as U.S. Pat. No. 11,874,841 on Jan. 16, 2024, which is a continuation of U.S. Utility application Ser. No. 17/443,066, entitled "ENFORCEMENT OF A SET OF QUERY RULES FOR ACCESS TO DATA SUPPLIED BY AT LEAST ONE DATA PROVIDER", filed Jul. 20, 2021, issued as U.S. Pat. No. 11,734,283 on Aug. 22, 2023, which is a continuation of U.S. Utility application Ser. No. 16/668,402, entitled "ENFORCEMENT OF SETS OF QUERY RULES FOR ACCESS TO DATA SUPPLIED BY A PLURALITY OF DATA PROVIDERS", filed Oct. 30, 2019, issued as U.S. Pat. No. 11,106,679 on Aug. 31, 2021, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 4 is a schematic block diagram of an embodiment of a parallelized data input sub-system in accordance with various embodiments;

FIG. 6 is a schematic block diagram of an embodiment of a parallelized data store, retrieve, and/or process (IO&P) sub-system in accordance with various embodiments;

FIGS. 15-23 are schematic block diagrams of an example of processing a table or data set for storage in the database system in accordance with various embodiments;

FIG. 24P is a schematic block diagram of a database system that implements a segment generator that generates segments from a plurality of records in accordance with various embodiments;

FIG. 25E is a schematic block diagrams of a node that implements a query processing module that reads records from segment storage and page storage in accordance with various embodiments;

FIGS. 27C-27H are schematic block diagrams illustrating an energy utilization measurement system in accordance with various embodiments;

FIGS. 29I-29L are schematic block diagrams of an operation requirement generator module in accordance with various embodiments;

FIGS. 29T-29U are schematic block diagrams of a segment indexing module in accordance with various embodiments;

FIGS. 31C-31F are schematic block diagrams of a pricing scheme generator module in accordance with various embodiments;

FIG. 32A is a schematic block diagram of an energy utilization-based operation scheduling system and/or an energy utilization-based operation optimizer system in accordance with various embodiments;

DETAILED DESCRIPTION OF THE INVENTION

Figure 1:
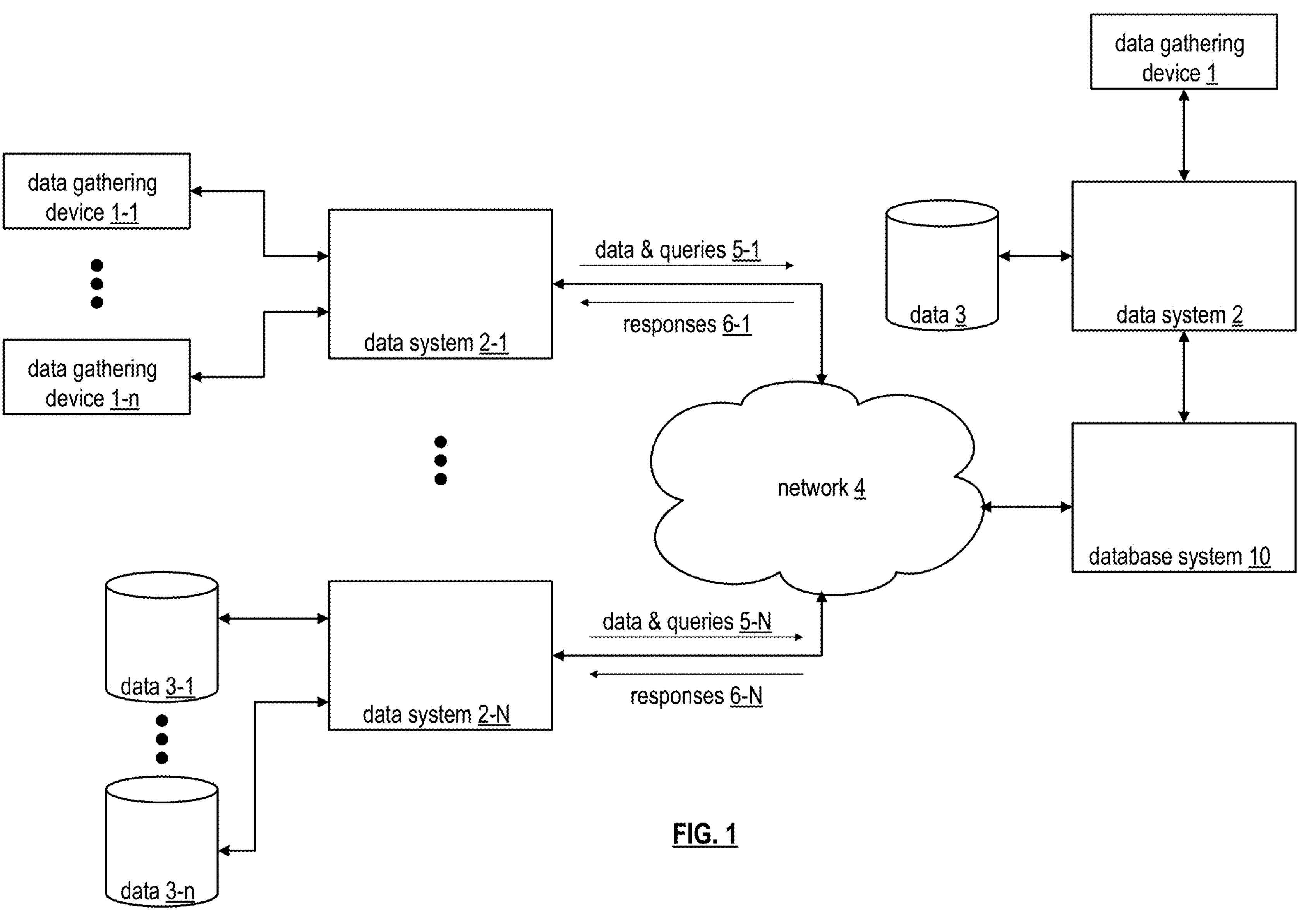
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
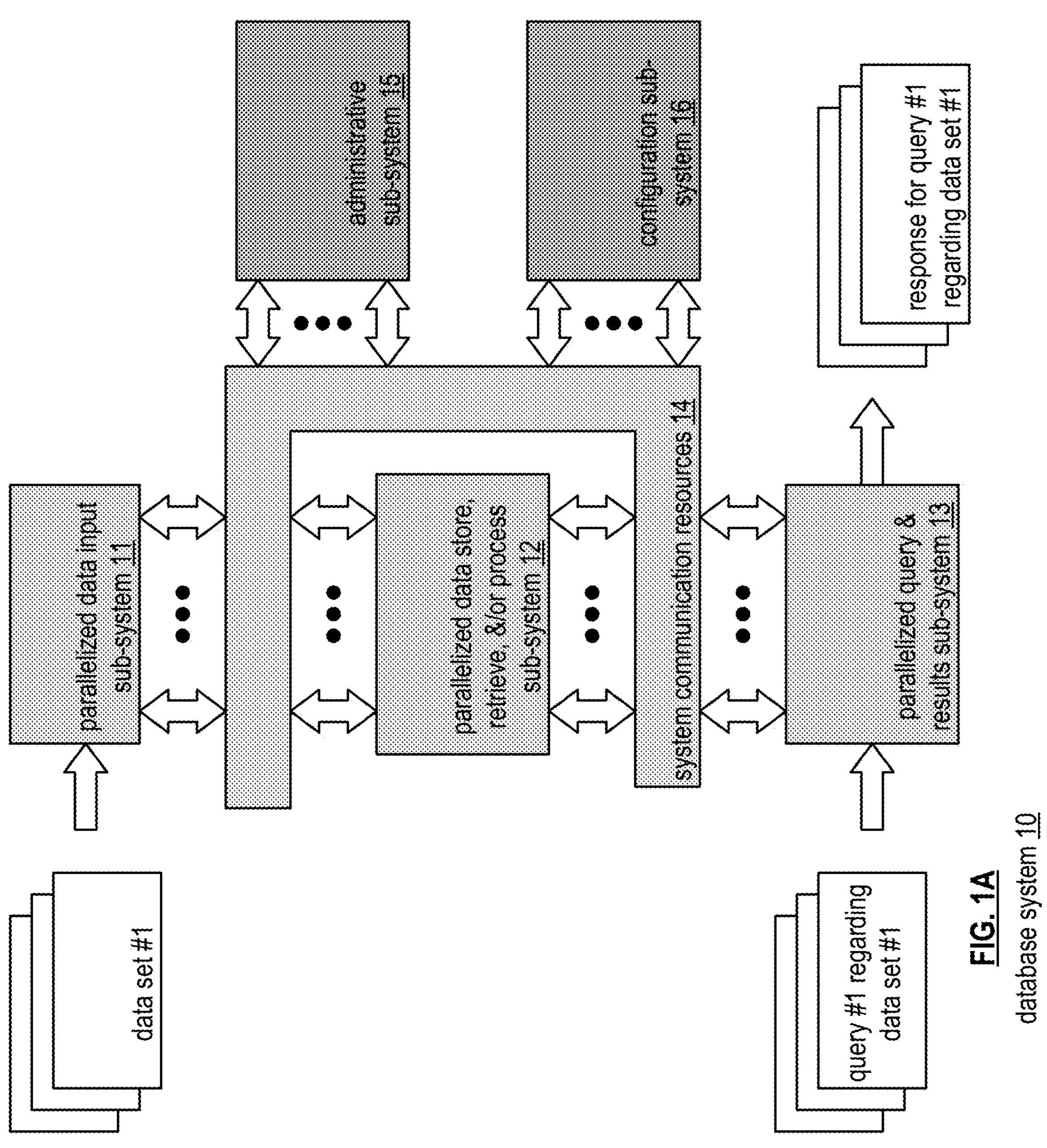
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices, an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figures 2, 3:
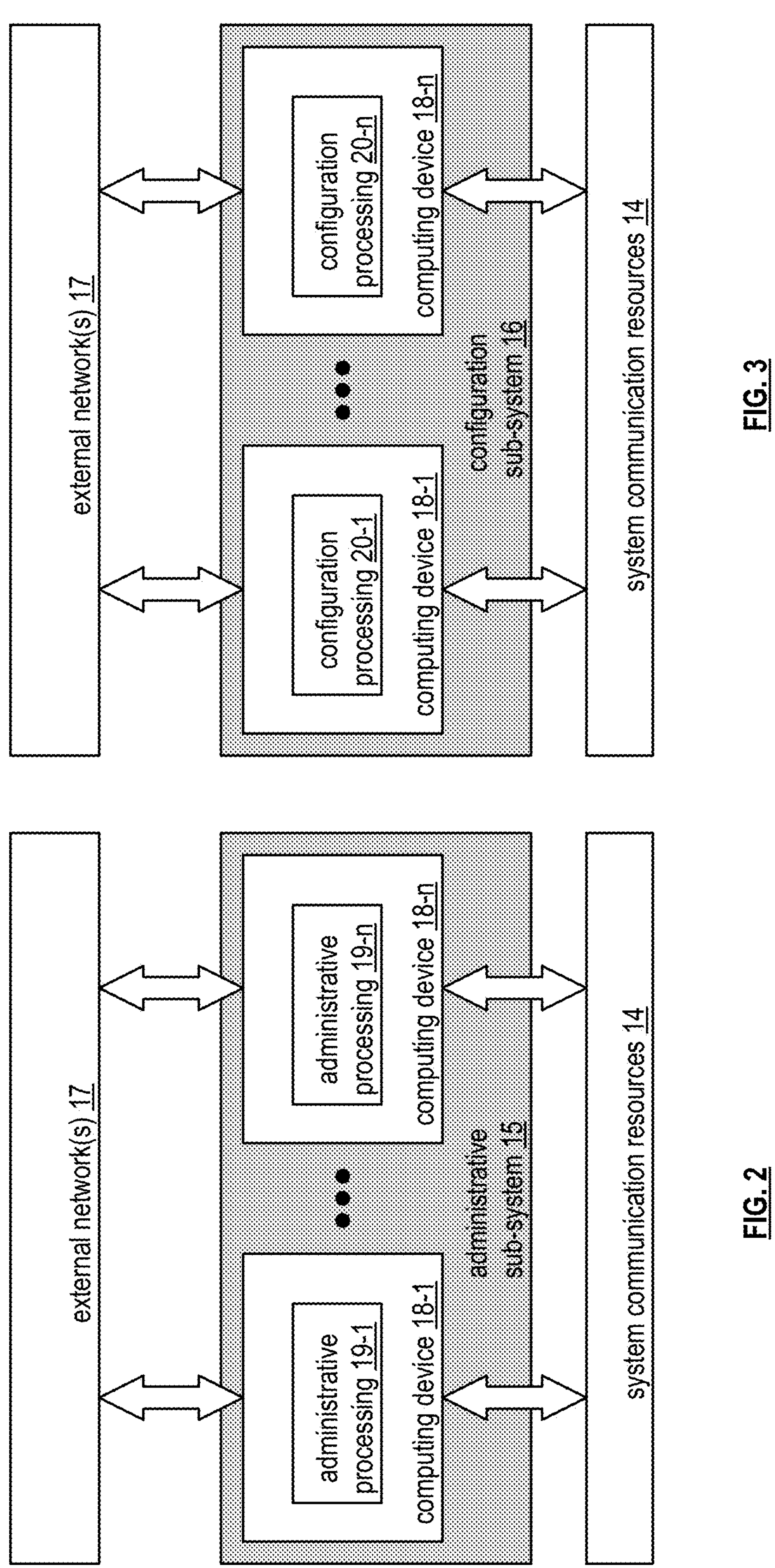
FIG. 2 is a schematic block diagram of an embodiment of an administrative sub-system in accordance with various embodiments.
FIG. 3 is a schematic block diagram of an embodiment of a configuration sub-system in accordance with various embodiments.

FIG. 2 is a schematic block diagram of an embodiment of the administrative sub-system 15 of FIG. 1A that includes one or more computing devices 18-1 through 18-*n*. Each of the computing devices executes an administrative processing function utilizing a corresponding administrative processing of administrative processing 19-1 through 19-*n* (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
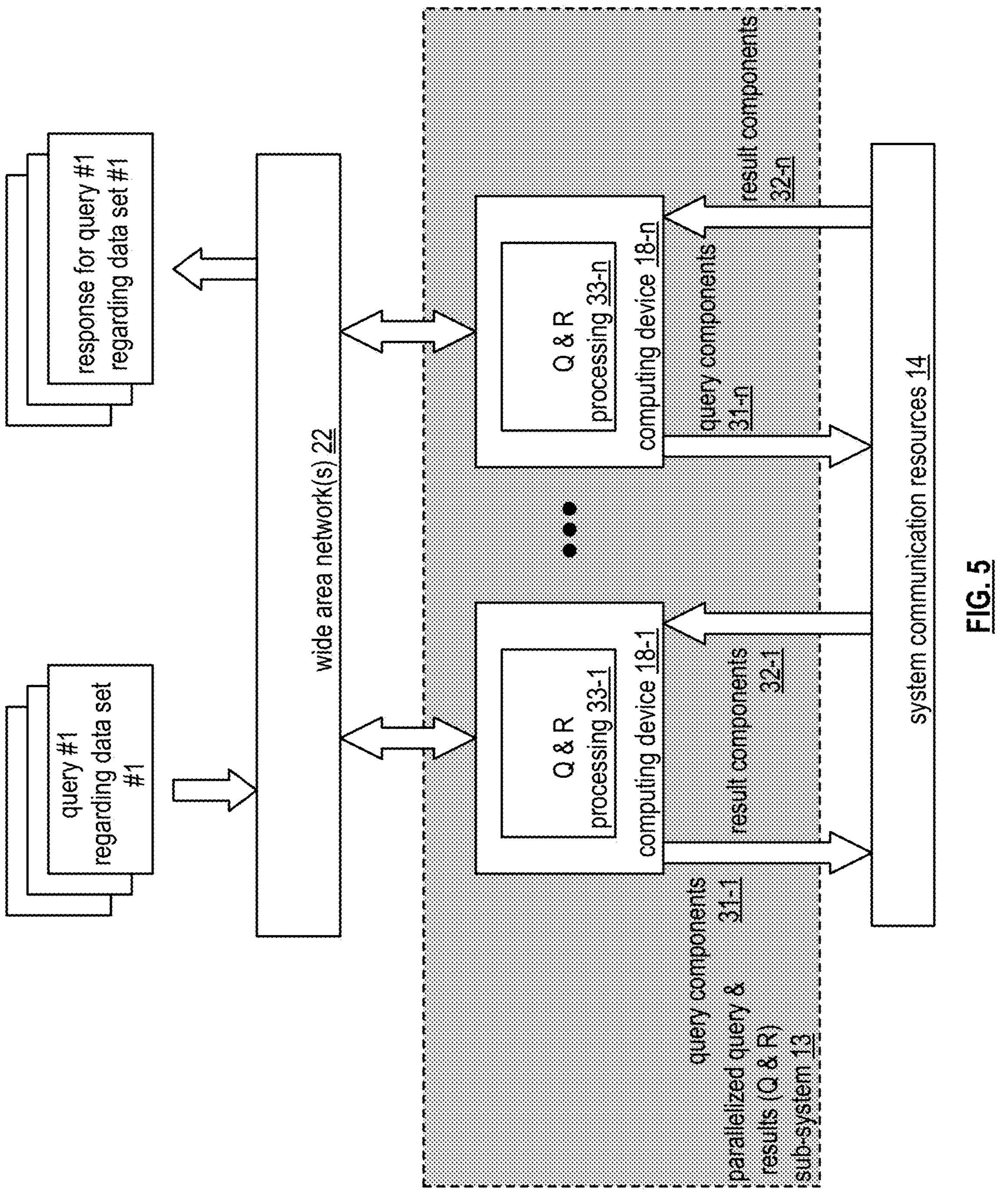
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-*n* are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
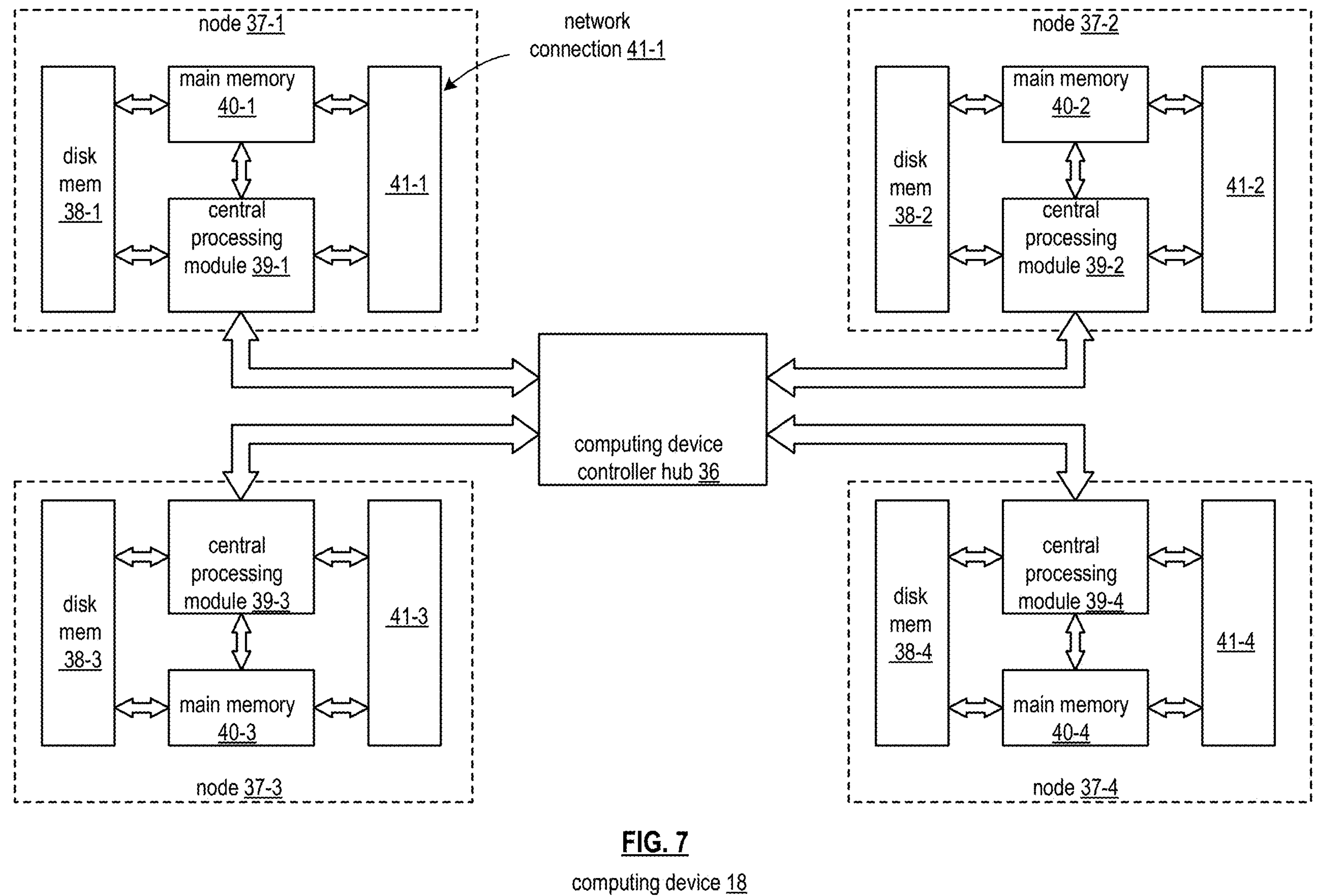
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
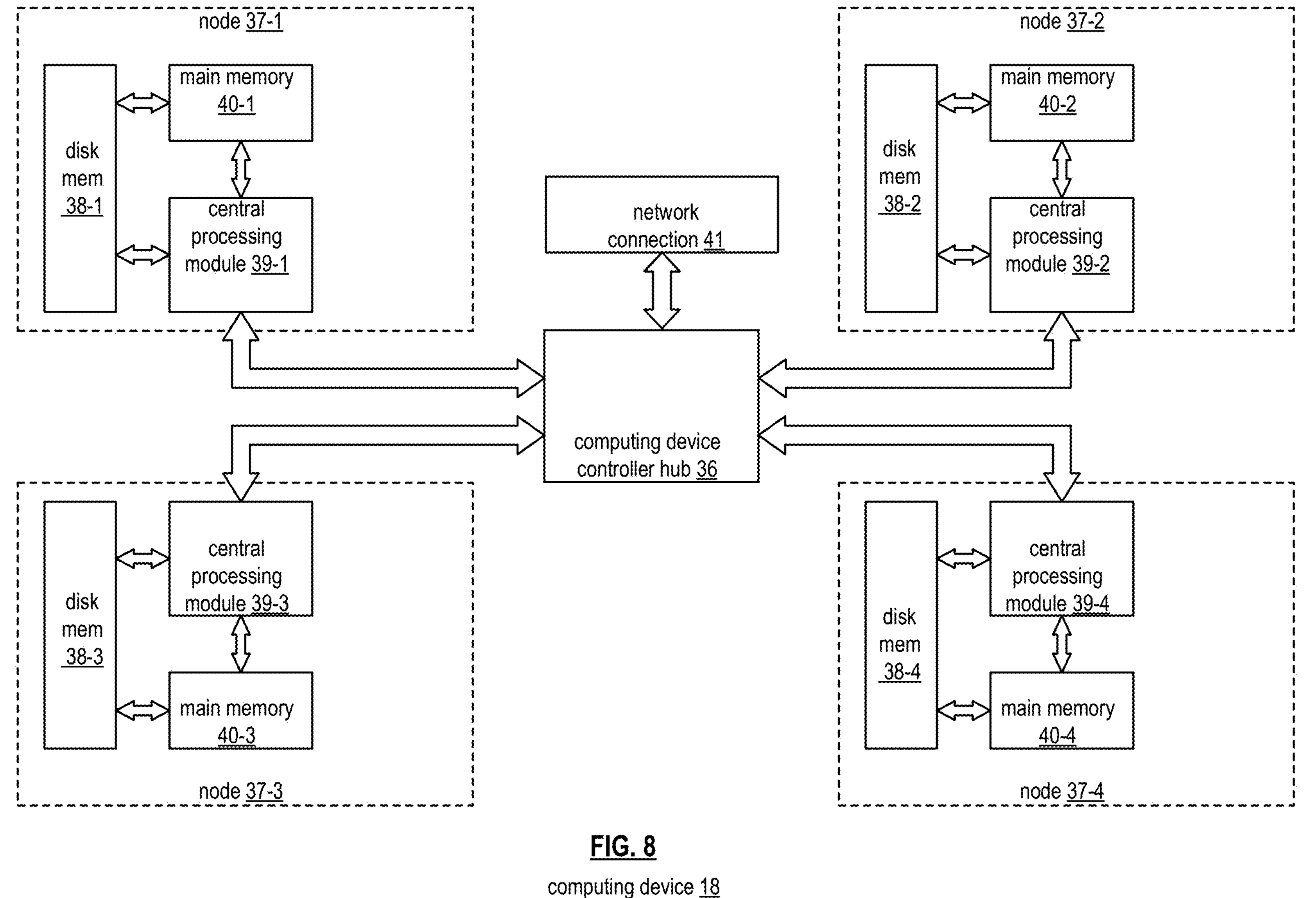
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
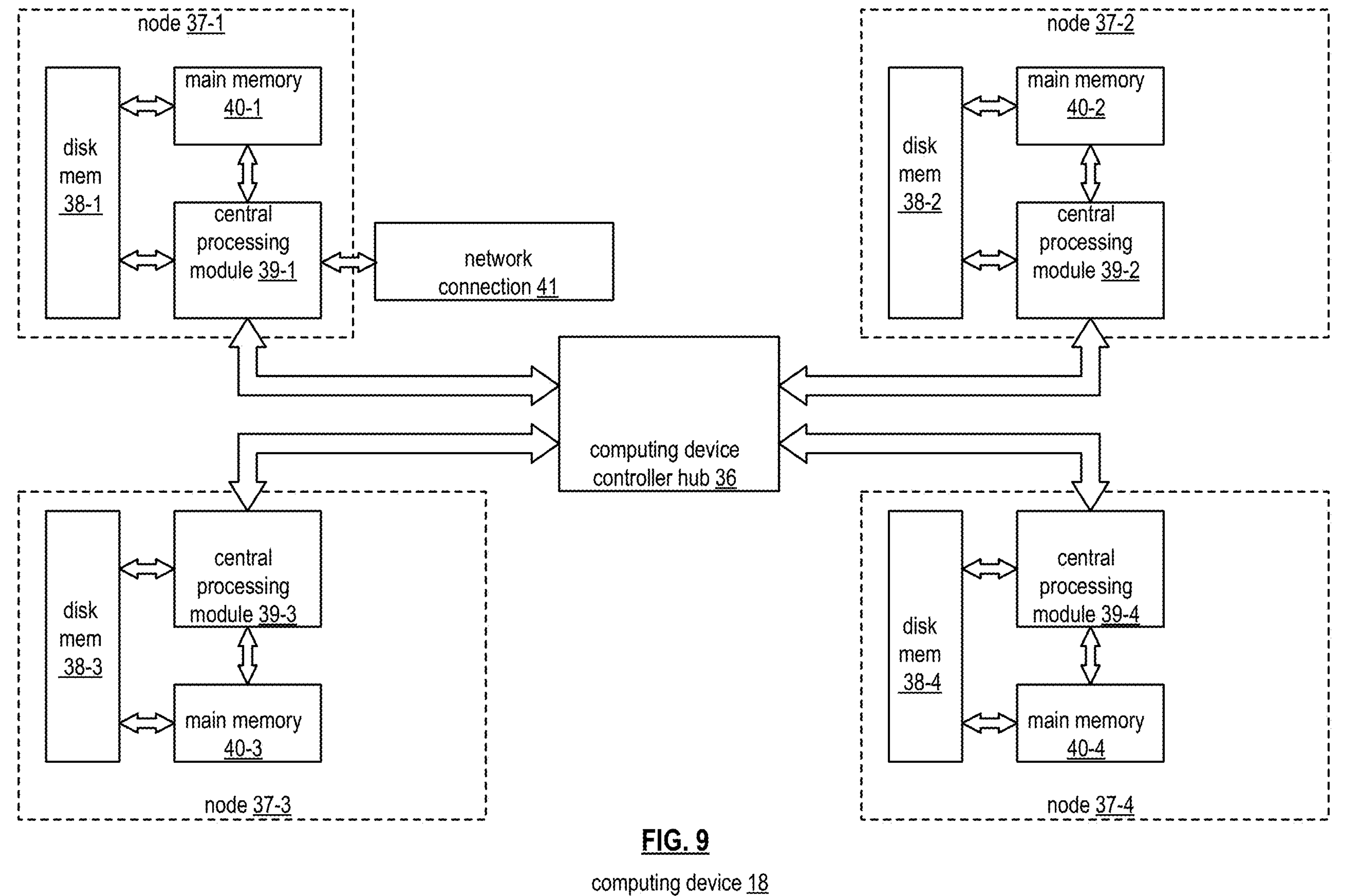
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
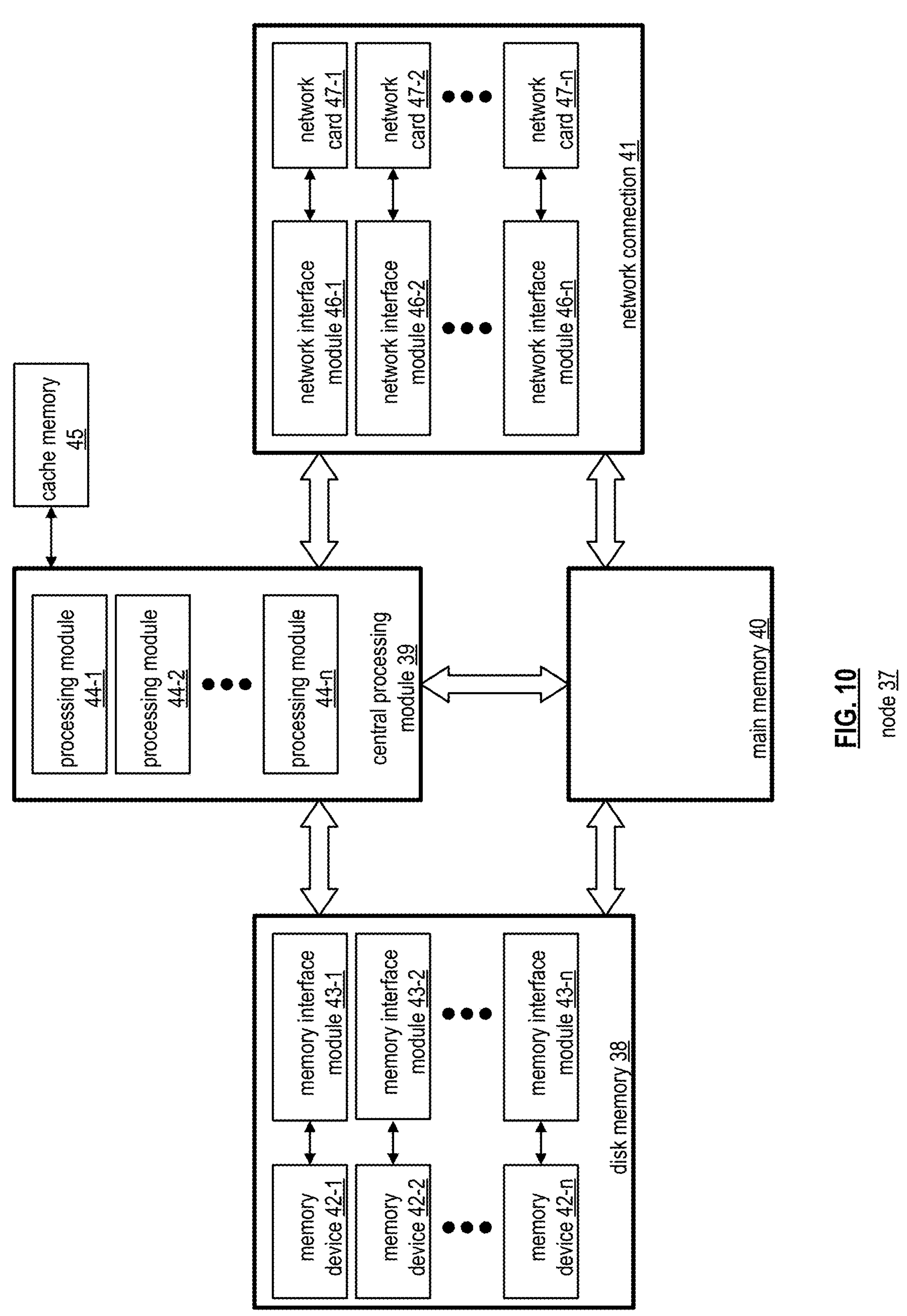
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-*n* and an associated one or more cache memory 45. A processing module is as defined at the end of the detailed description.

The disk memory 38 includes a plurality of memory interface modules 43-1 through 43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n* is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through **46-*n* include a software driver for the corresponding network card and a physical connection that couples the network card to the central processing module 39** or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
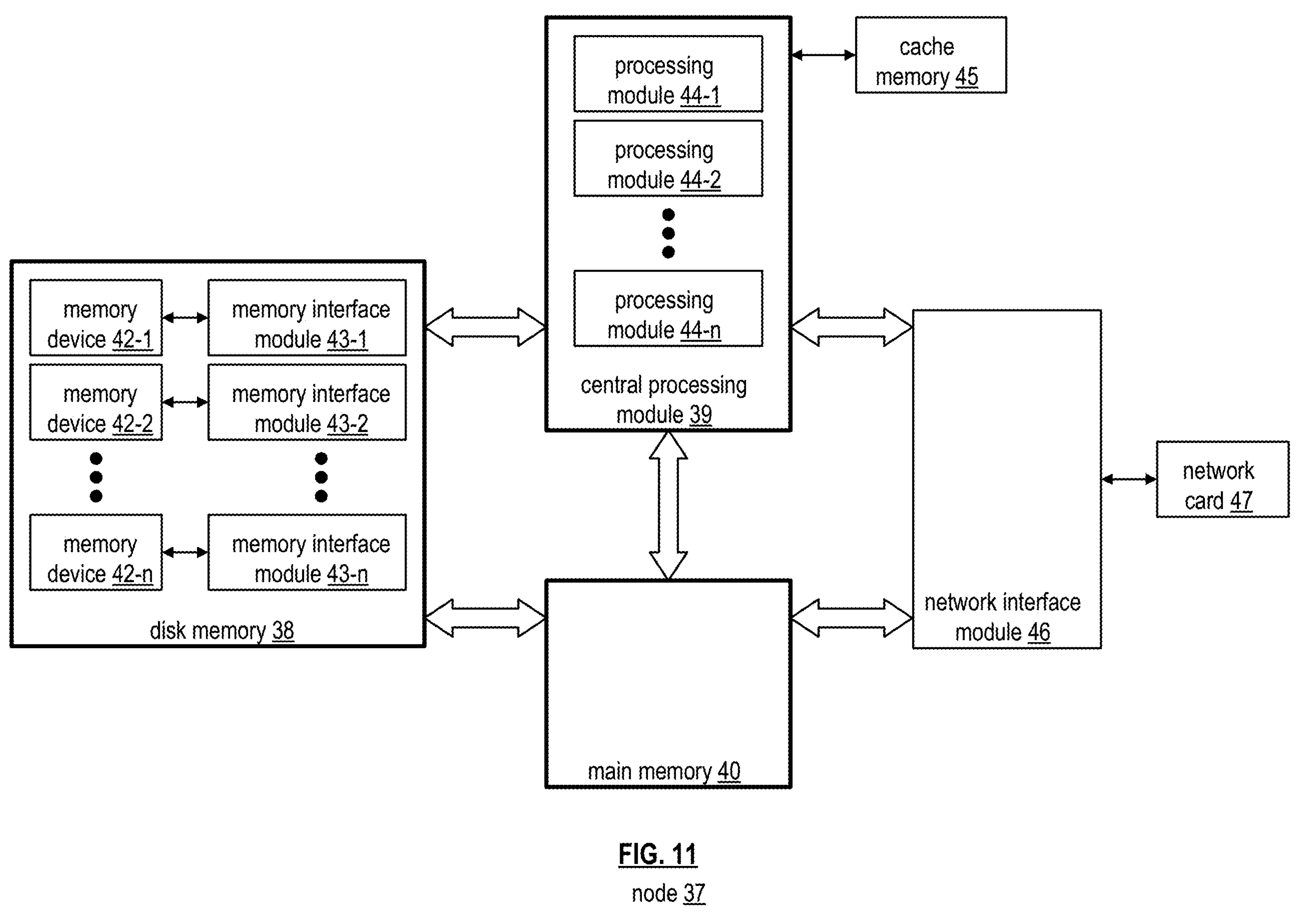
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
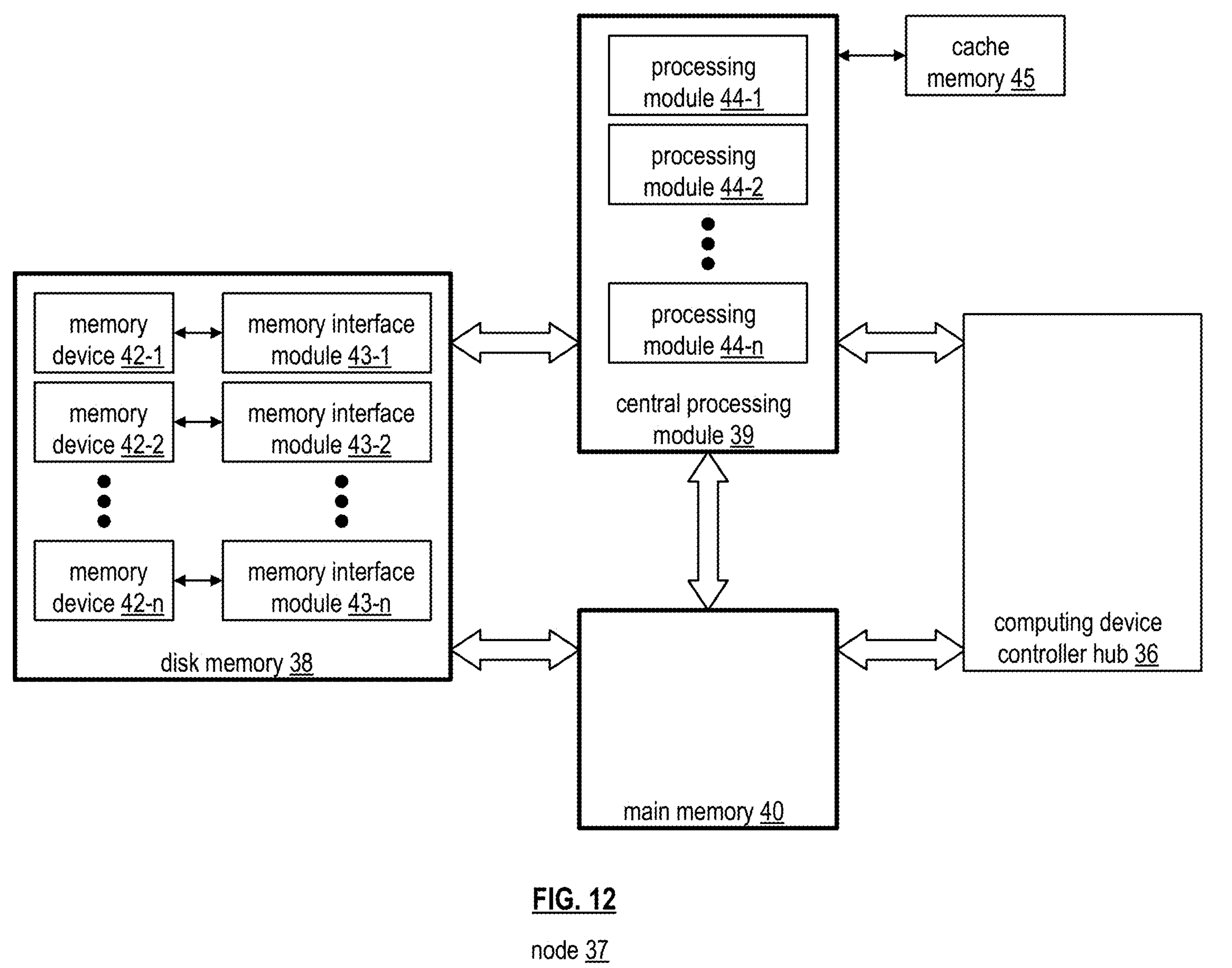
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
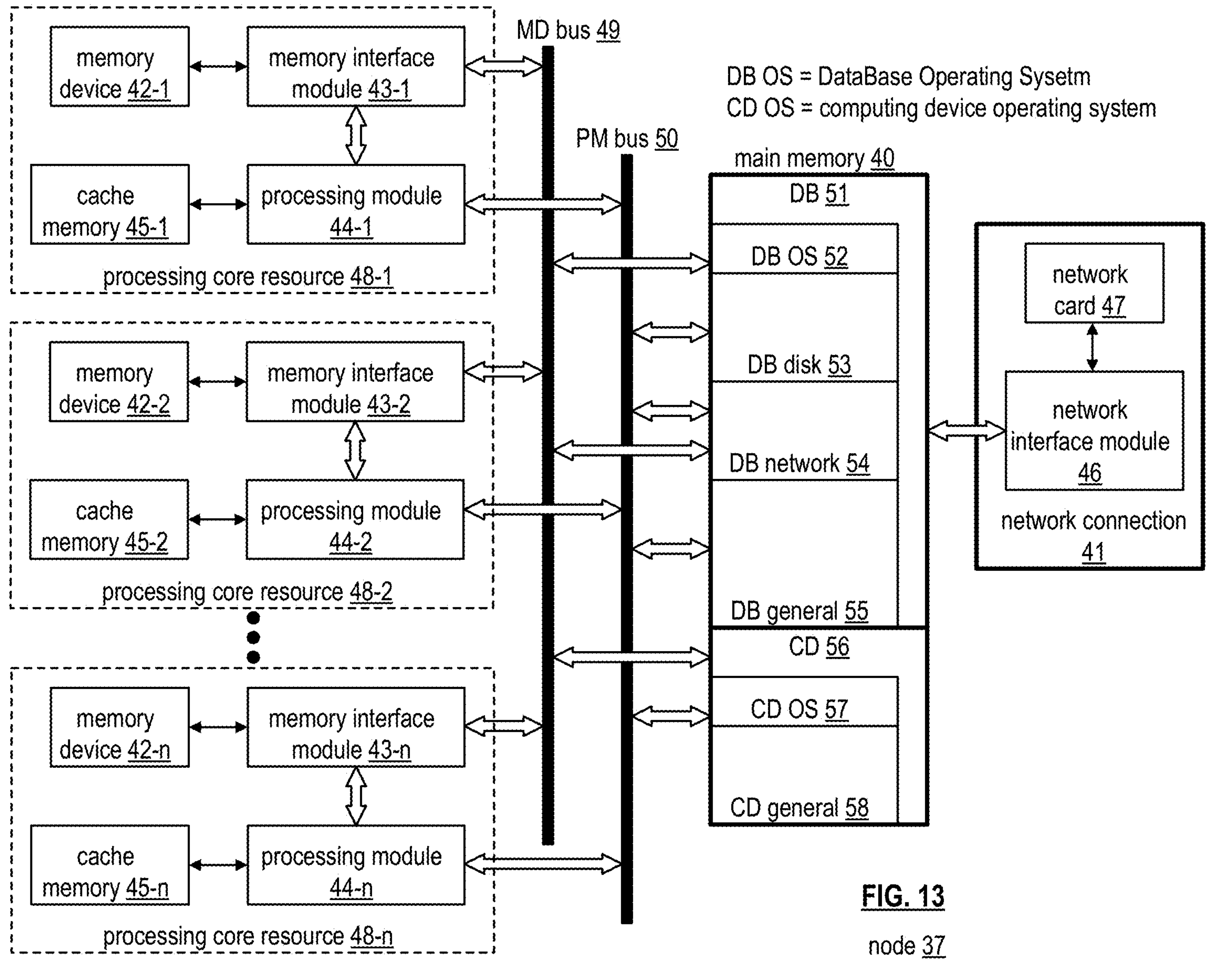
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through **48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n***. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
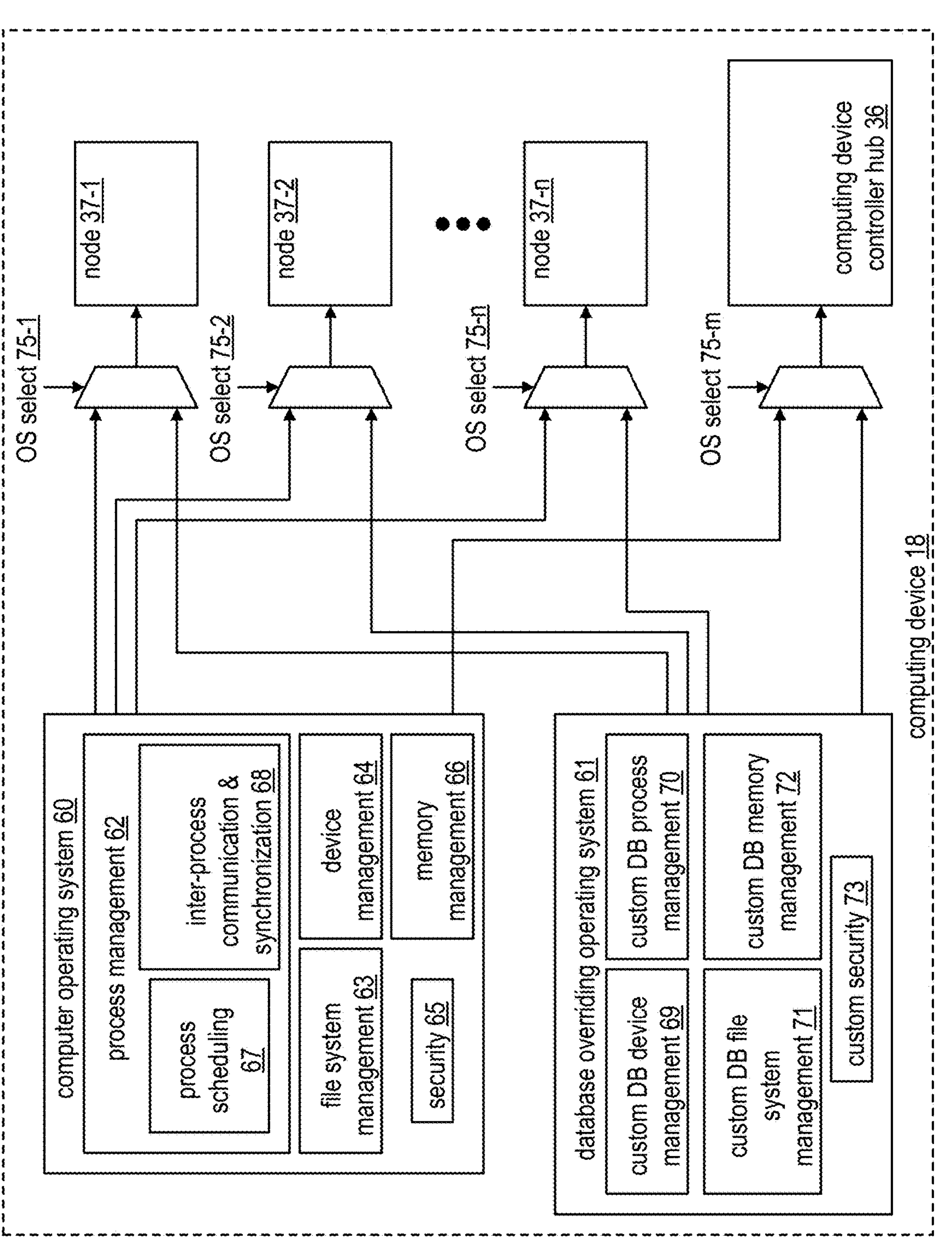
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through **75-*n* when communicating with nodes 37-1 through 37-*n* and via OS select 75-*m* when communicating with the computing device controller hub 36**). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
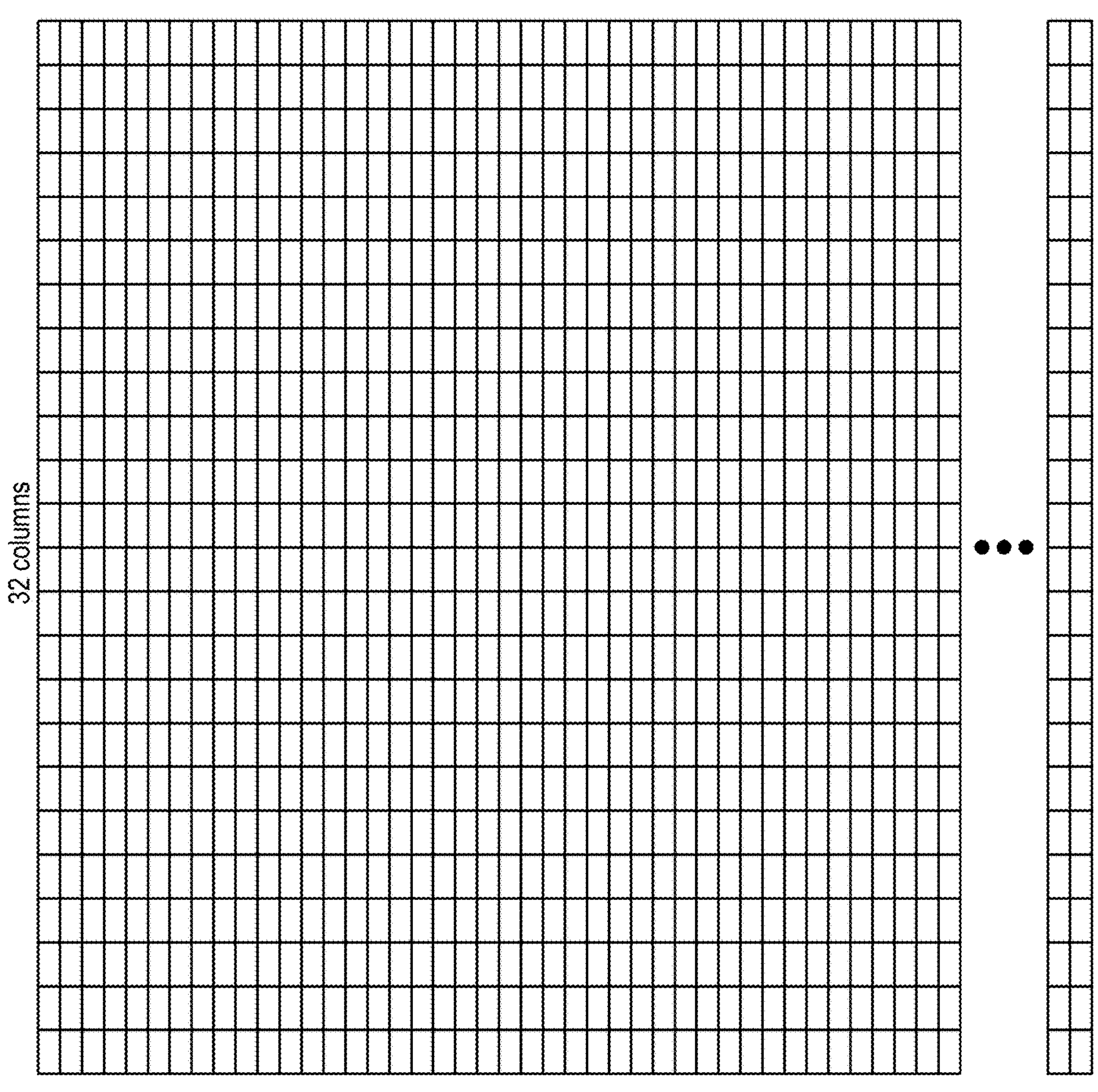

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
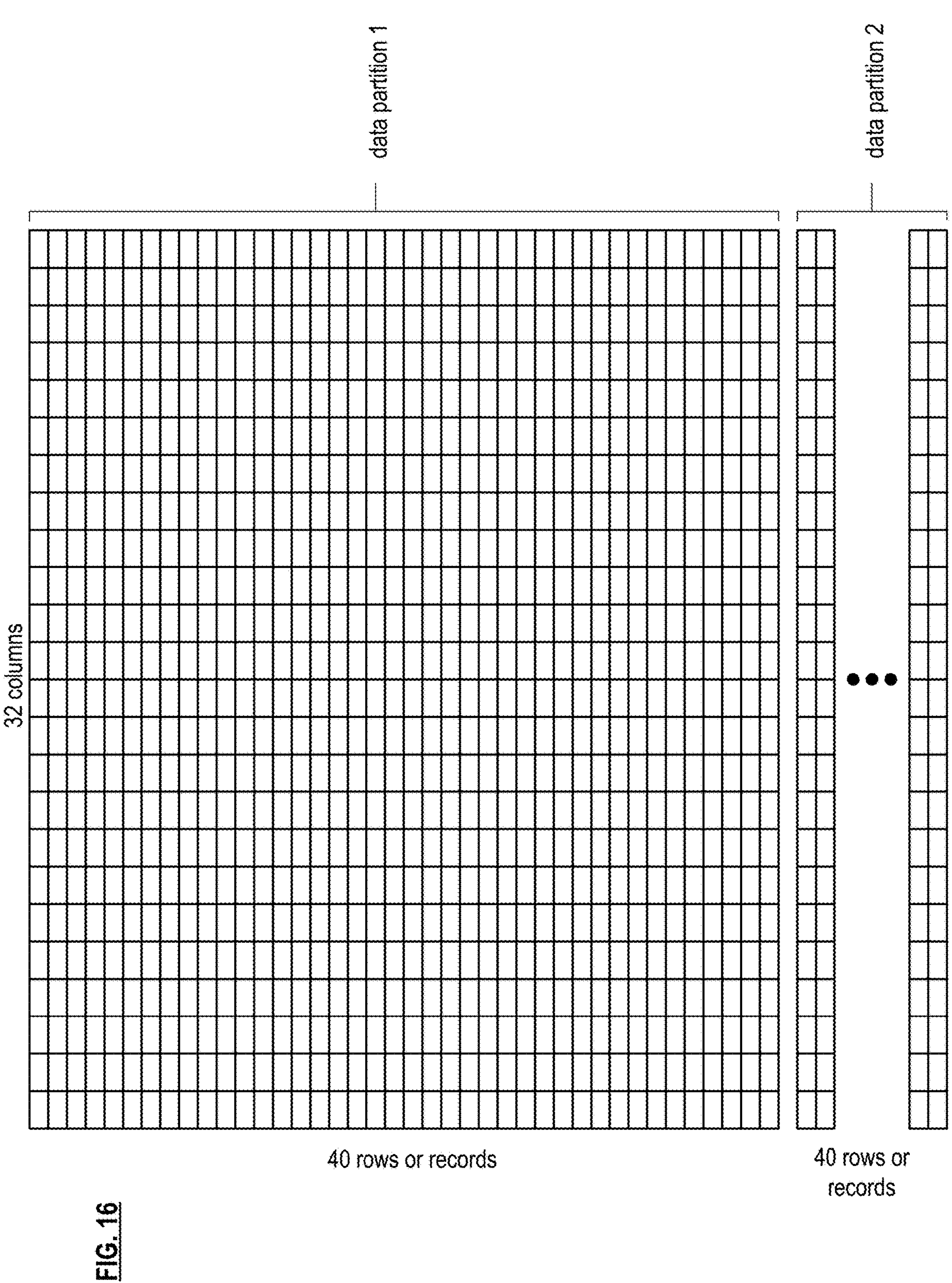

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
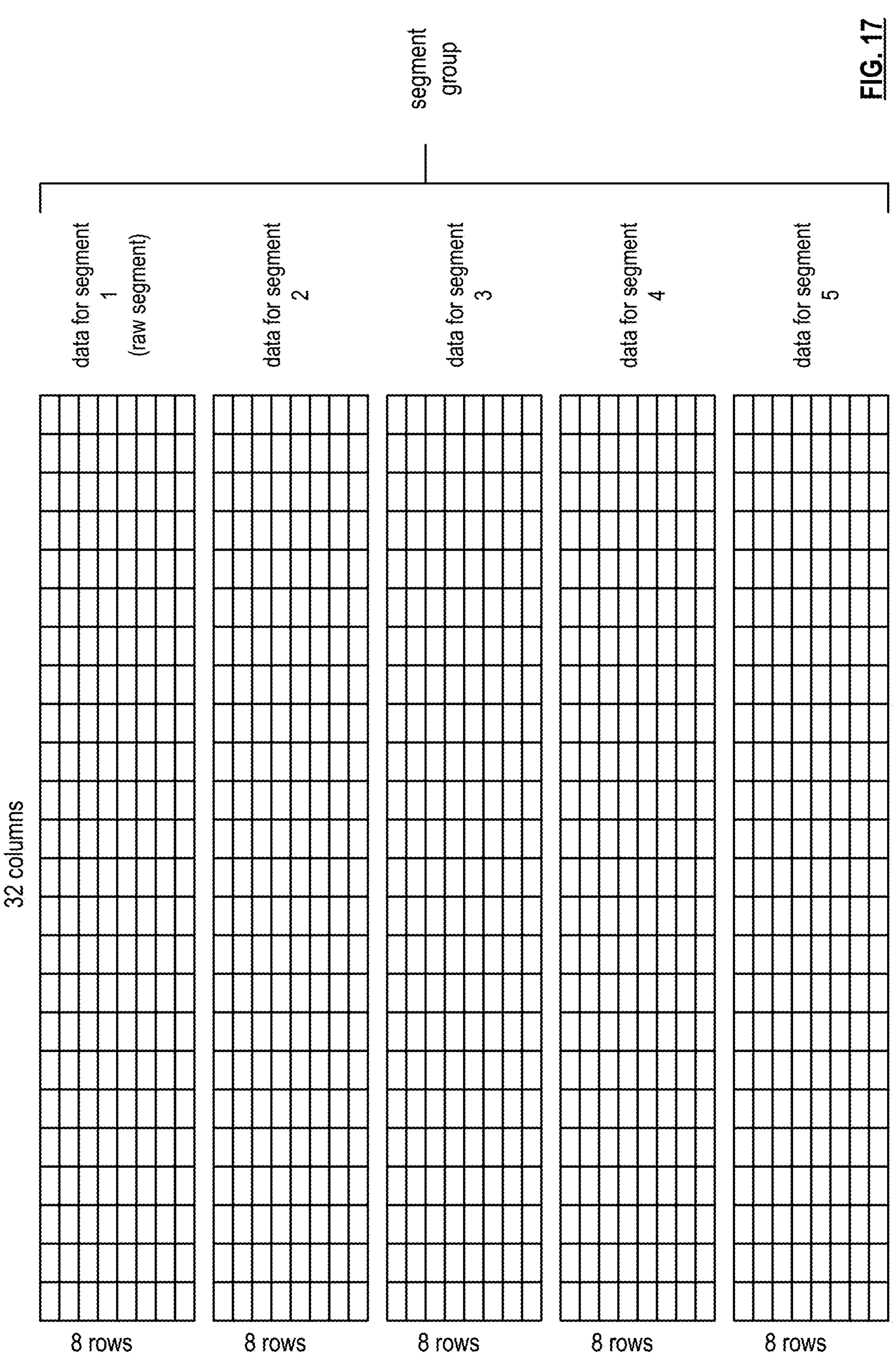

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
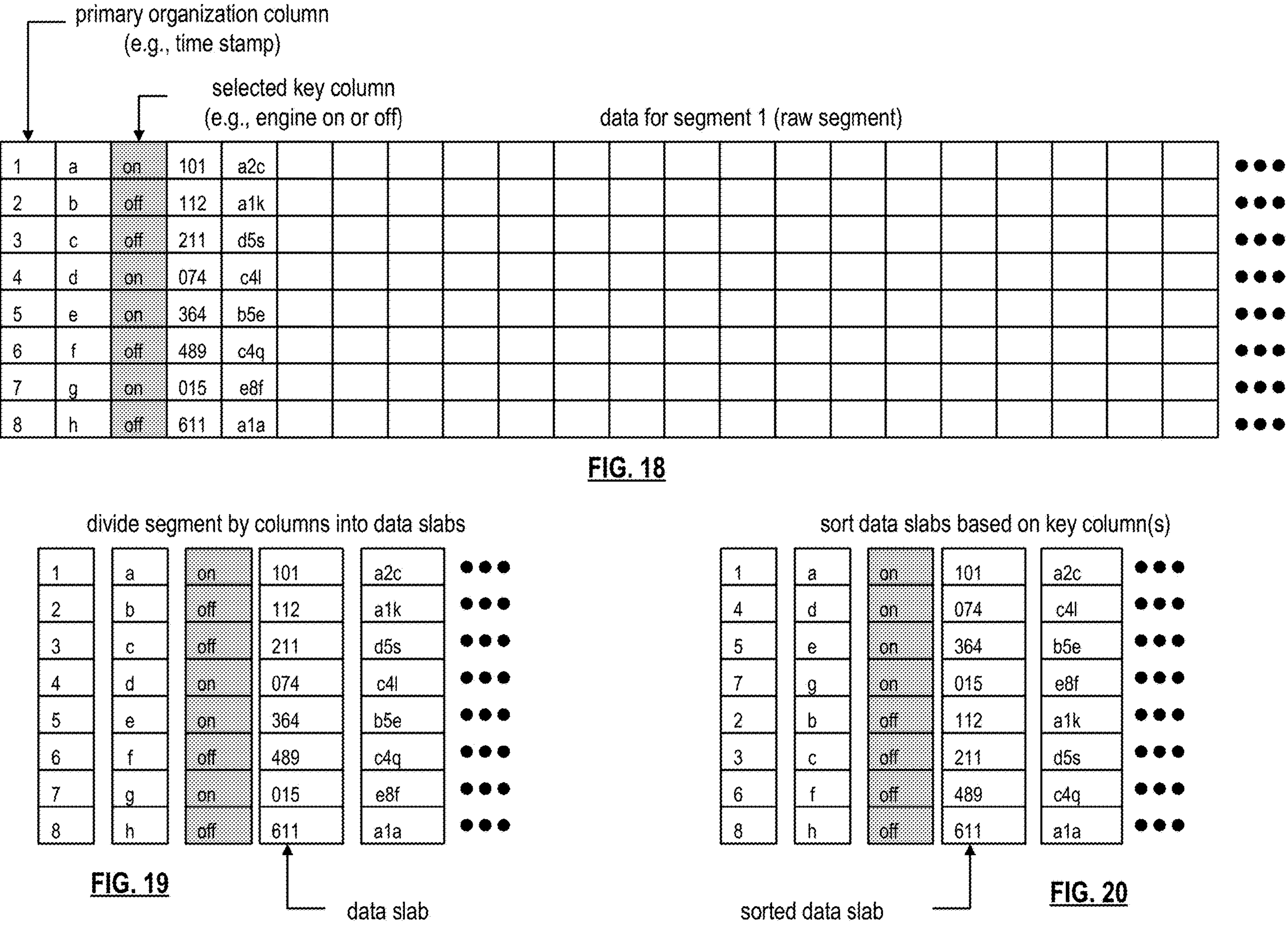

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.).

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
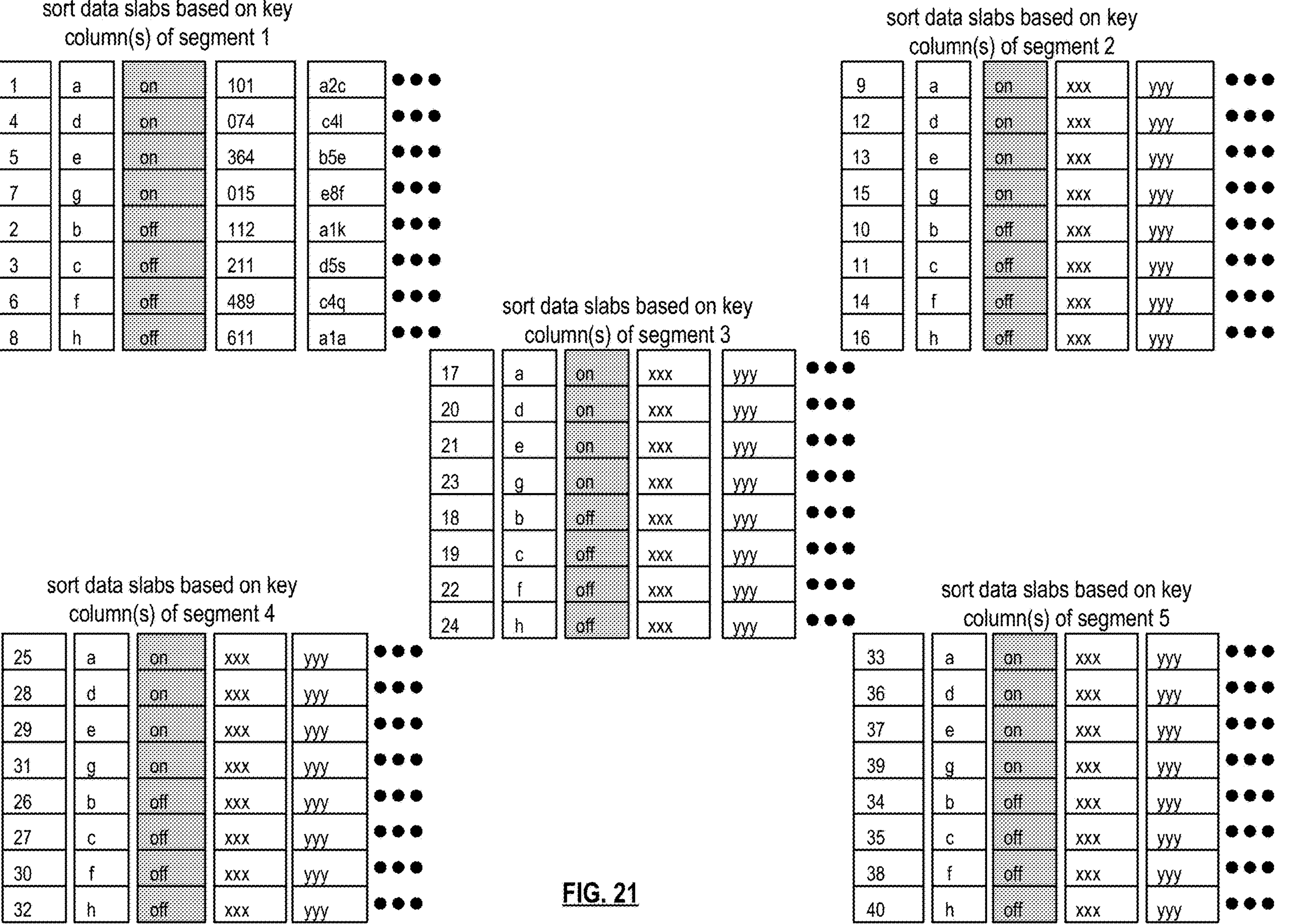

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
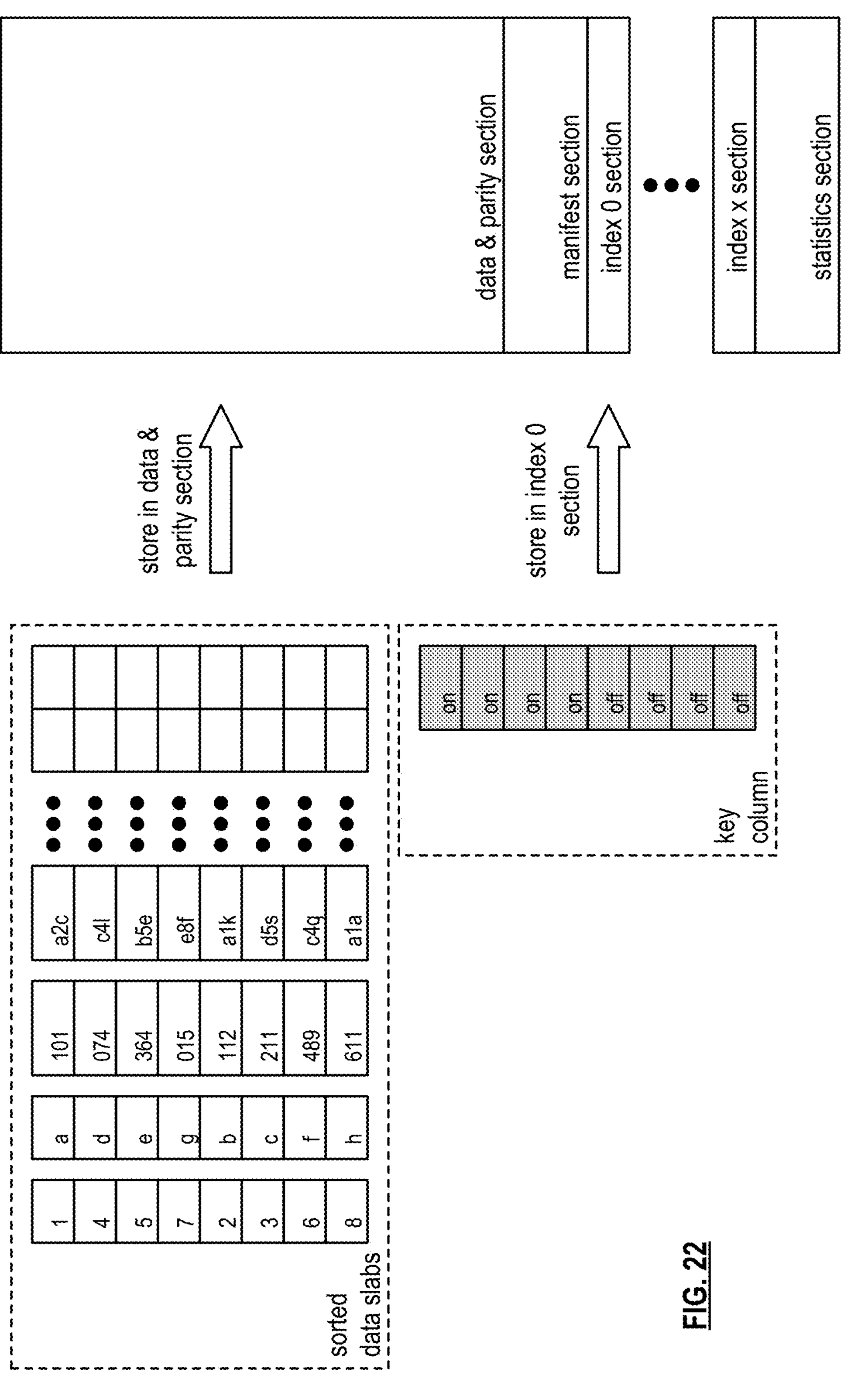

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
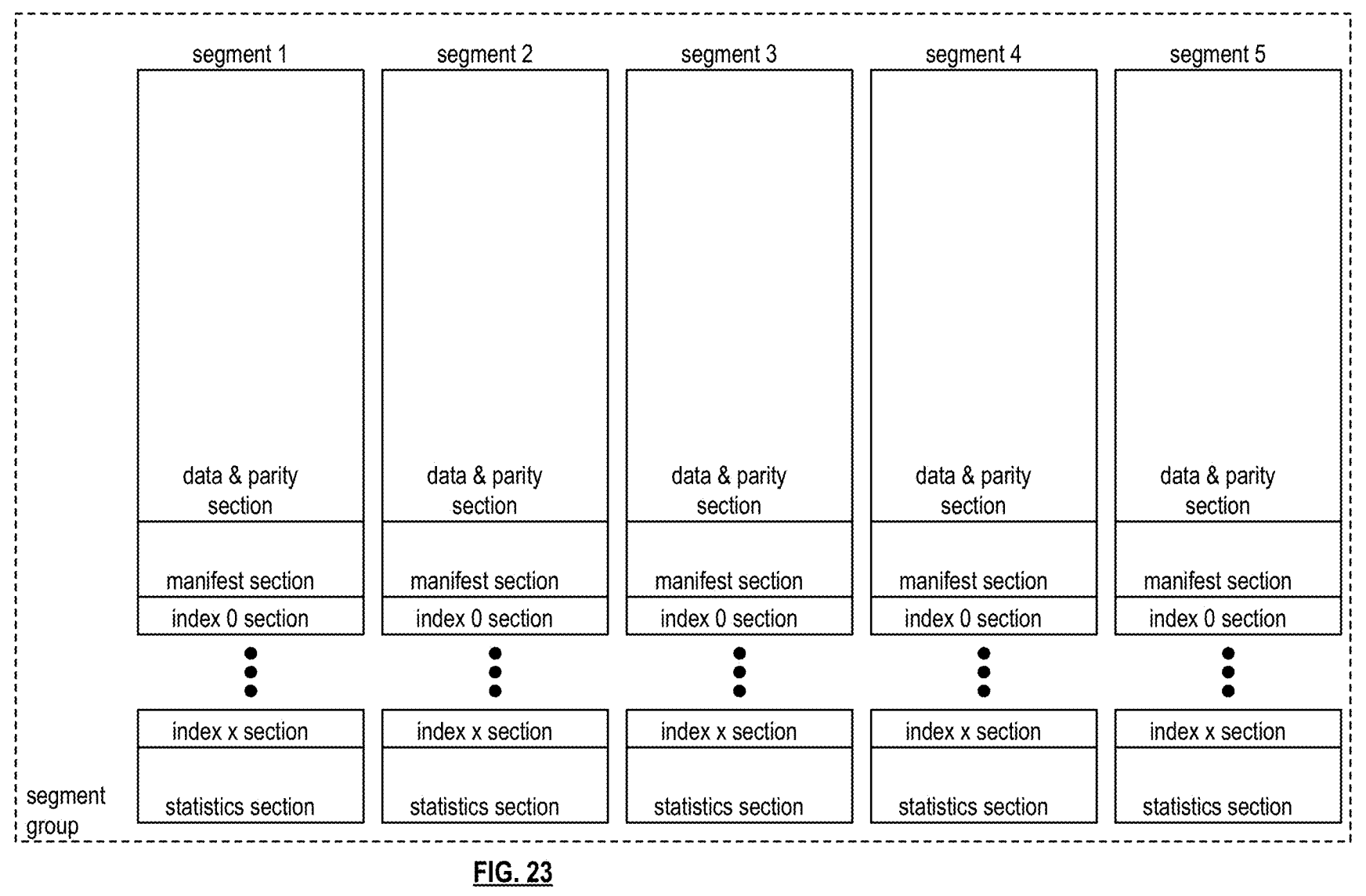

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
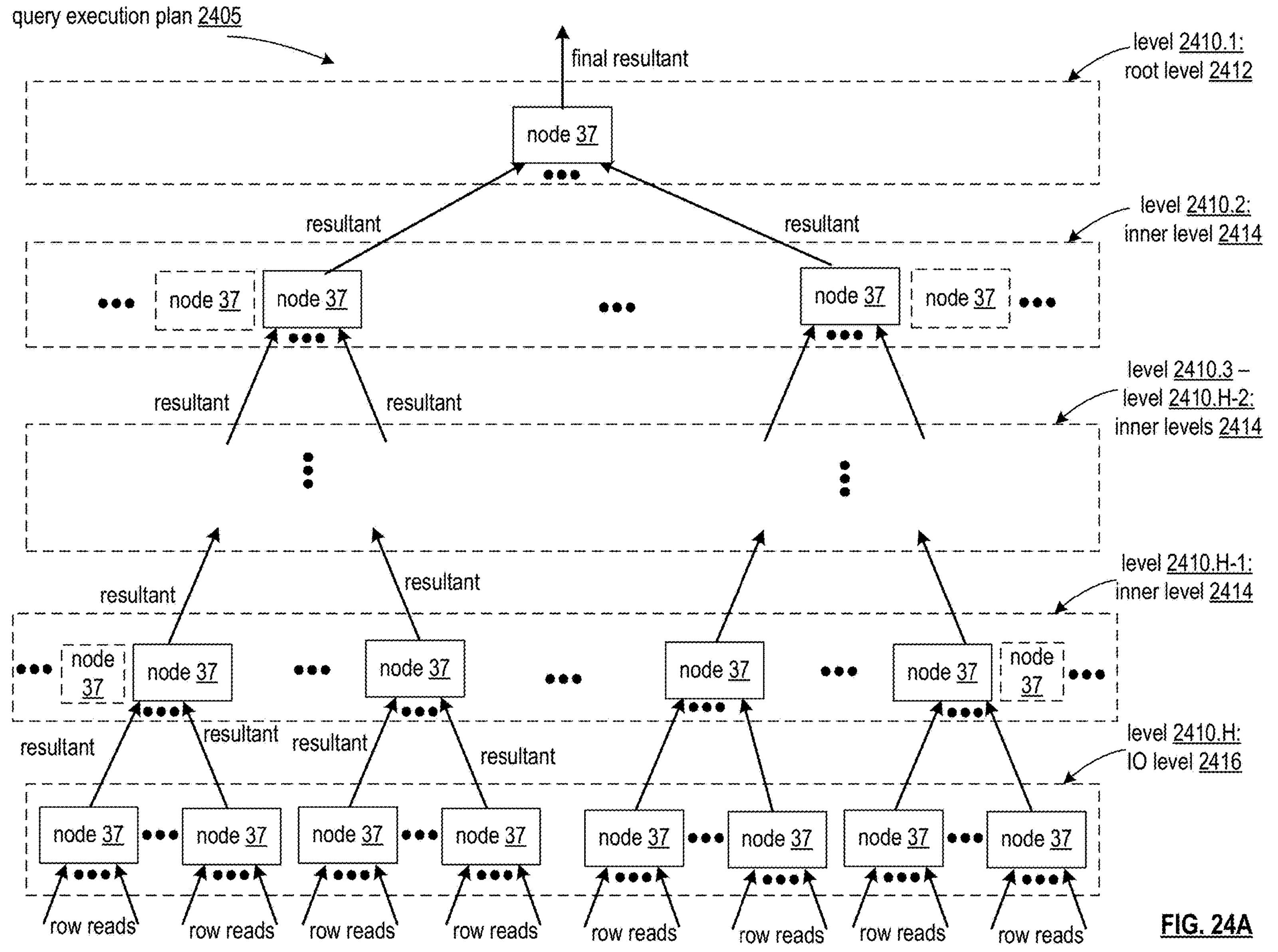
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices **18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414** can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined (e.g. as an acyclic directed graph of operators), and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata applied across a plurality of nodes 37, for example, where at least one node 37 participates in some or all features and/or functionality of FIG. 24A based on receiving and storing the system metadata in local memory of the at least one node 37 as configuration data and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
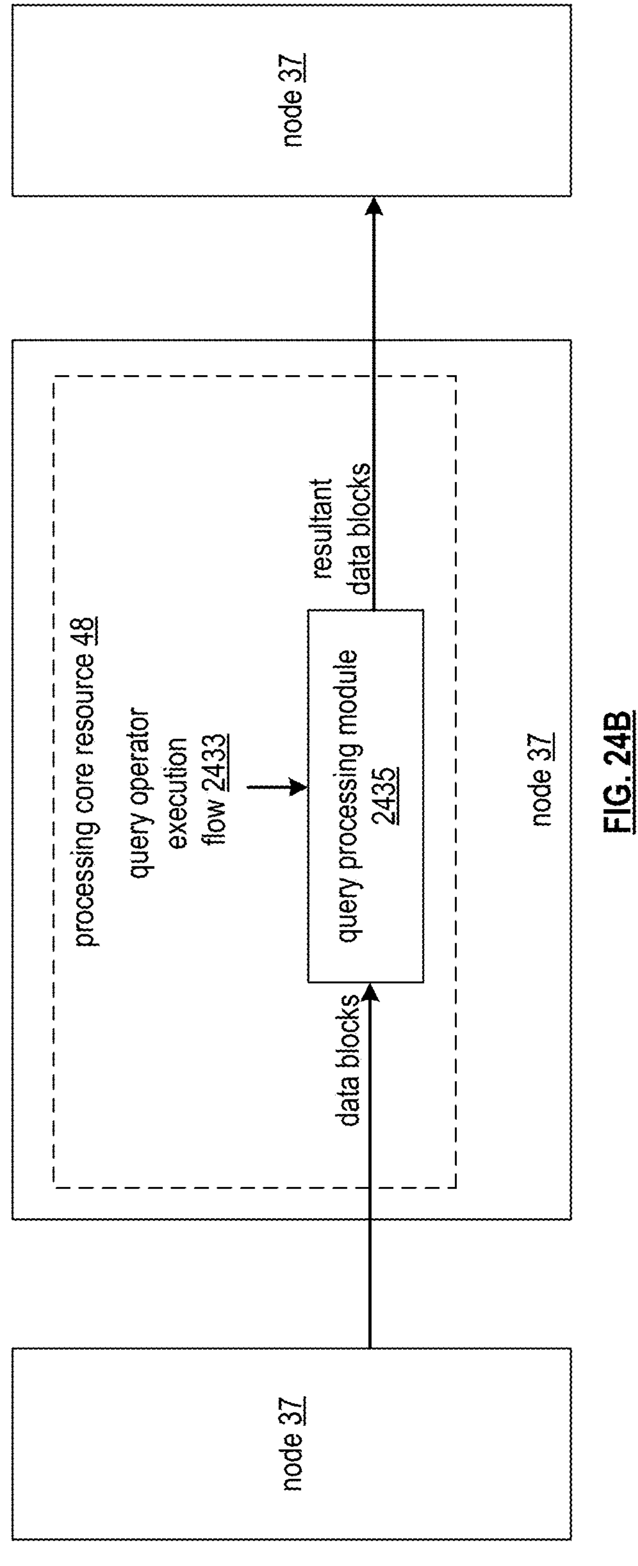
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433 (e.g. as an acyclic directed graph of operators). In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-*n* of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata applied across a plurality of nodes 37 that includes the given node, for example, where the given node 37 participates in some or all features and/or functionality of FIG. 24B based on receiving and storing the system metadata in local memory of given node 37 as configuration data and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
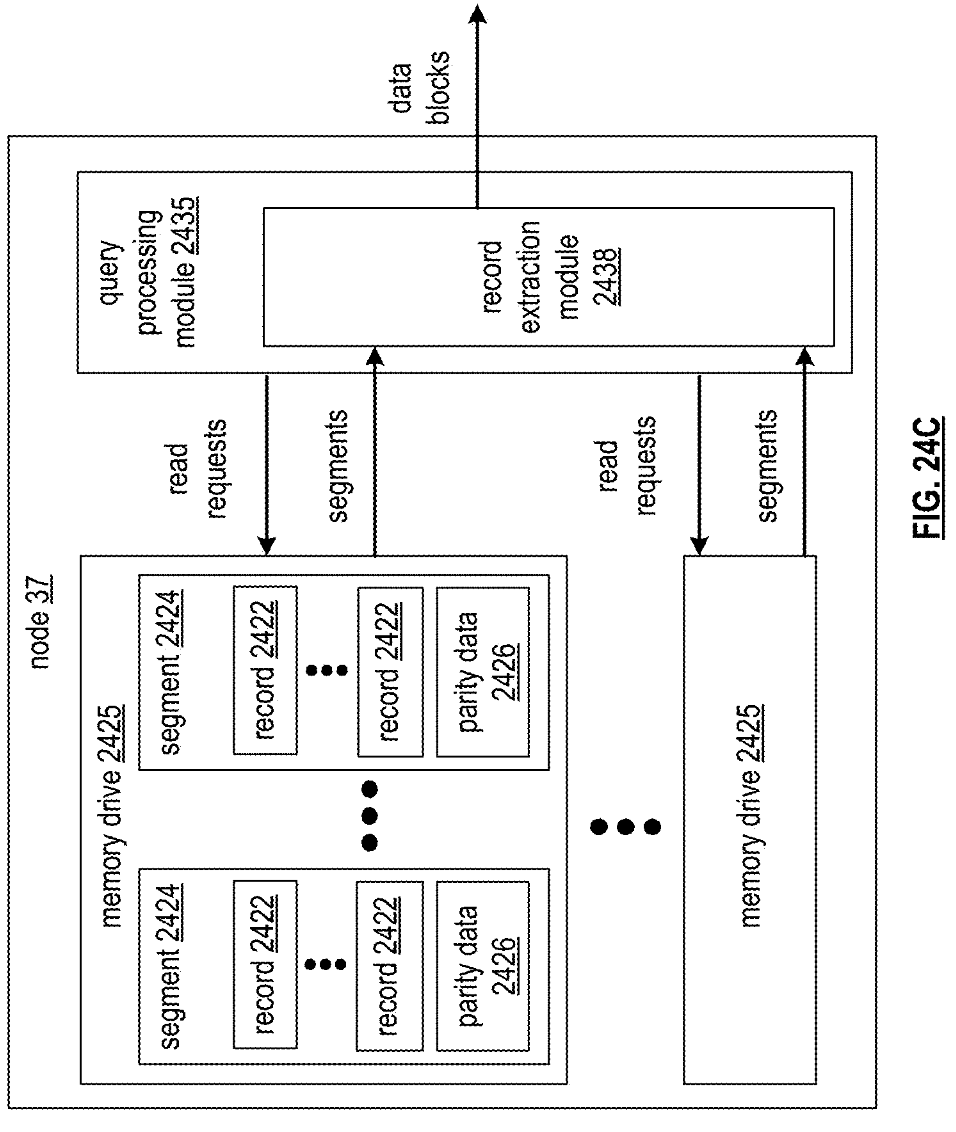

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices **42-1-42-*n* of the node 37's disk memory 38**.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata applied across a plurality of nodes 37 that includes the given node, for example, where the given node 37 participates in some or all features and/or functionality of FIG. 24C based on receiving and storing the system metadata in local memory of given node 37 as configuration data and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
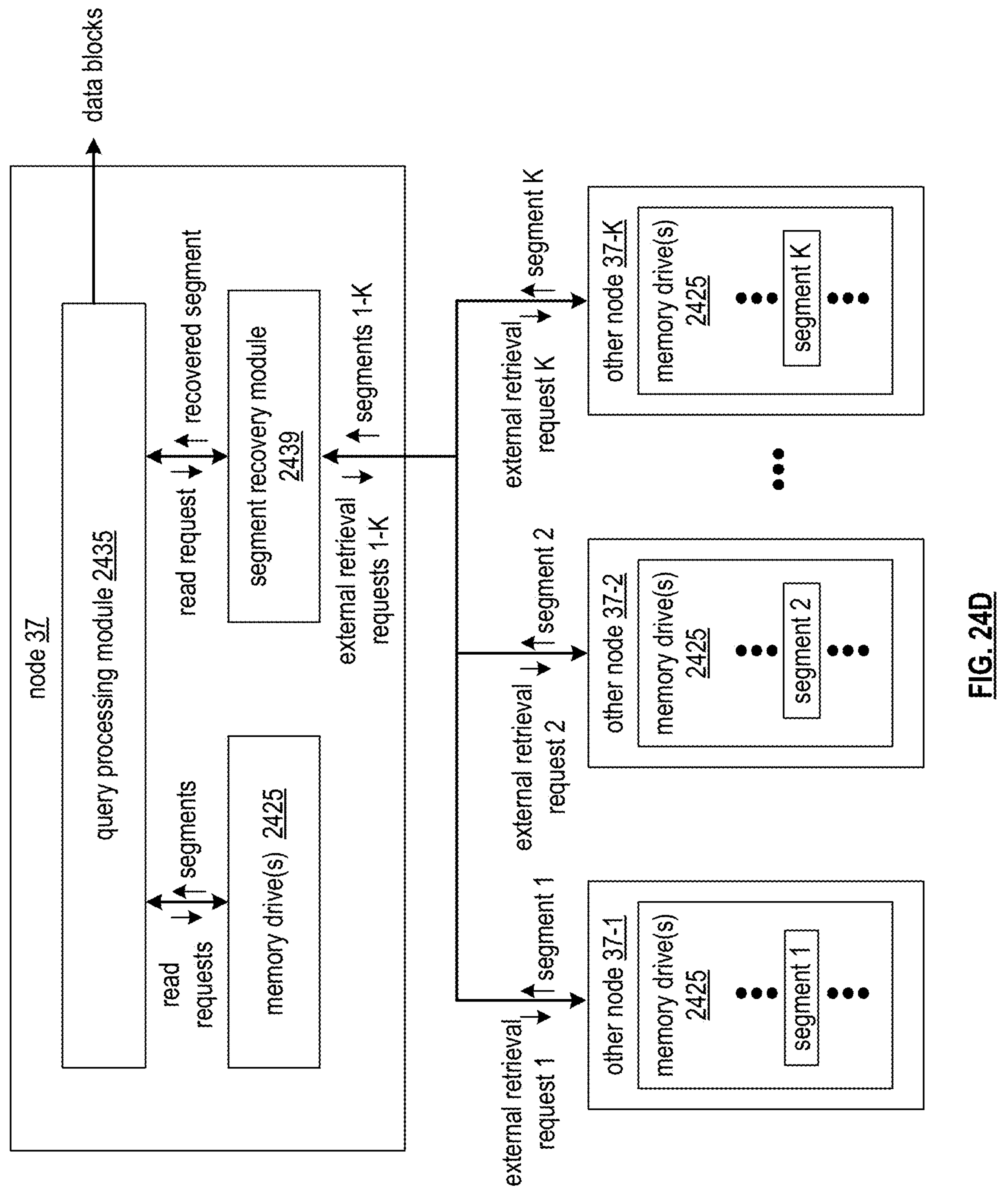

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata applied across a plurality of nodes 37 that includes the given node, for example, where the given node 37 participates in some or all features and/or functionality of FIG. 24D based on receiving and storing the system metadata in local memory of given node 37 as configuration data and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
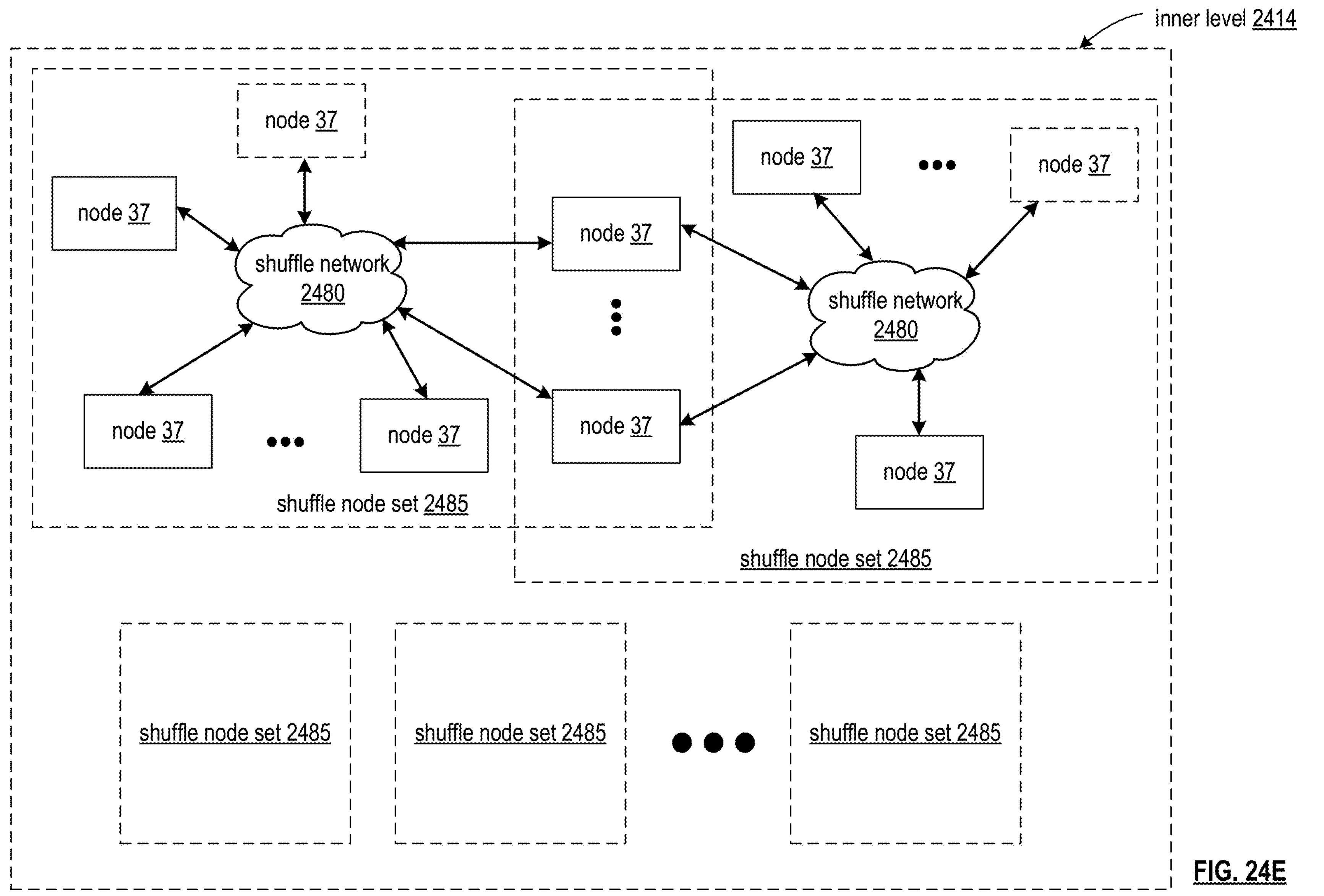
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata applied across a plurality of nodes 37, for example, where at least one node 37 participates in some or all features and/or functionality of FIG. 24E based on receiving and storing the system metadata in local memory of the at least one node 37 as configuration data and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
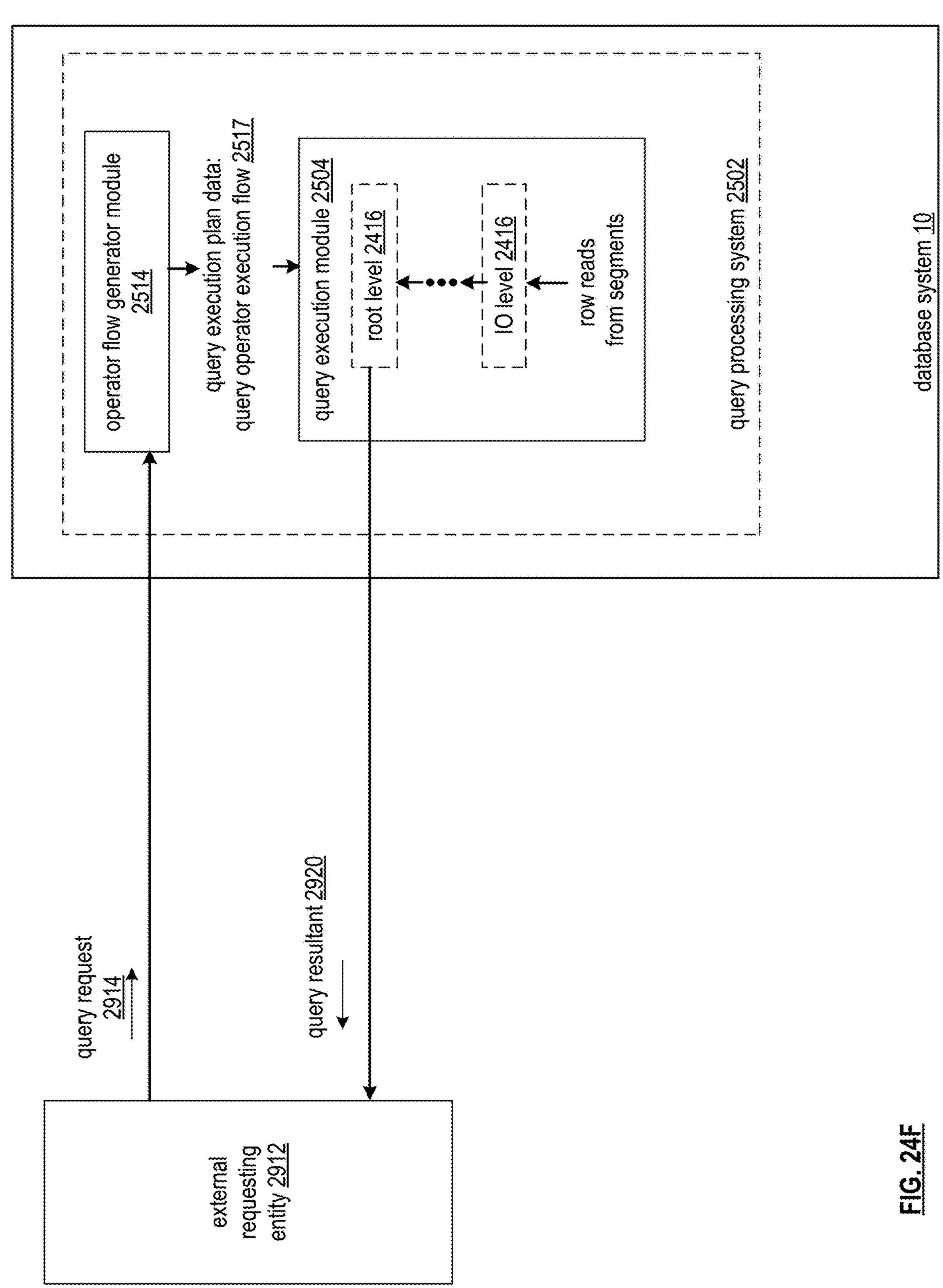
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2914. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2914 for execution via the database system 10, where the corresponding query resultant 2920 is transmitted back to the computing device, for example, for storage by the computing device and/or for display to the corresponding user via a display device.

As another example, a query is automatically generated for execution via processing resources via a computing device and/or via communication with an external requesting entity implemented via at least one computing device. For example, the query is automatically generated and/or modified from a request generated via user input and/or received from a requesting entity in conjunction with implementing a query generator system, a query optimizer, generative artificial intelligence (AI), and/or other artificial intelligence and/or machine learning techniques. The computing device generates and transmits a corresponding query request 2914 for execution via the database system 10, where the corresponding query resultant 2920 is transmitted back to the computing device, for example, for storage by the computing device, transmission to another system, and/or for display to at least one corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
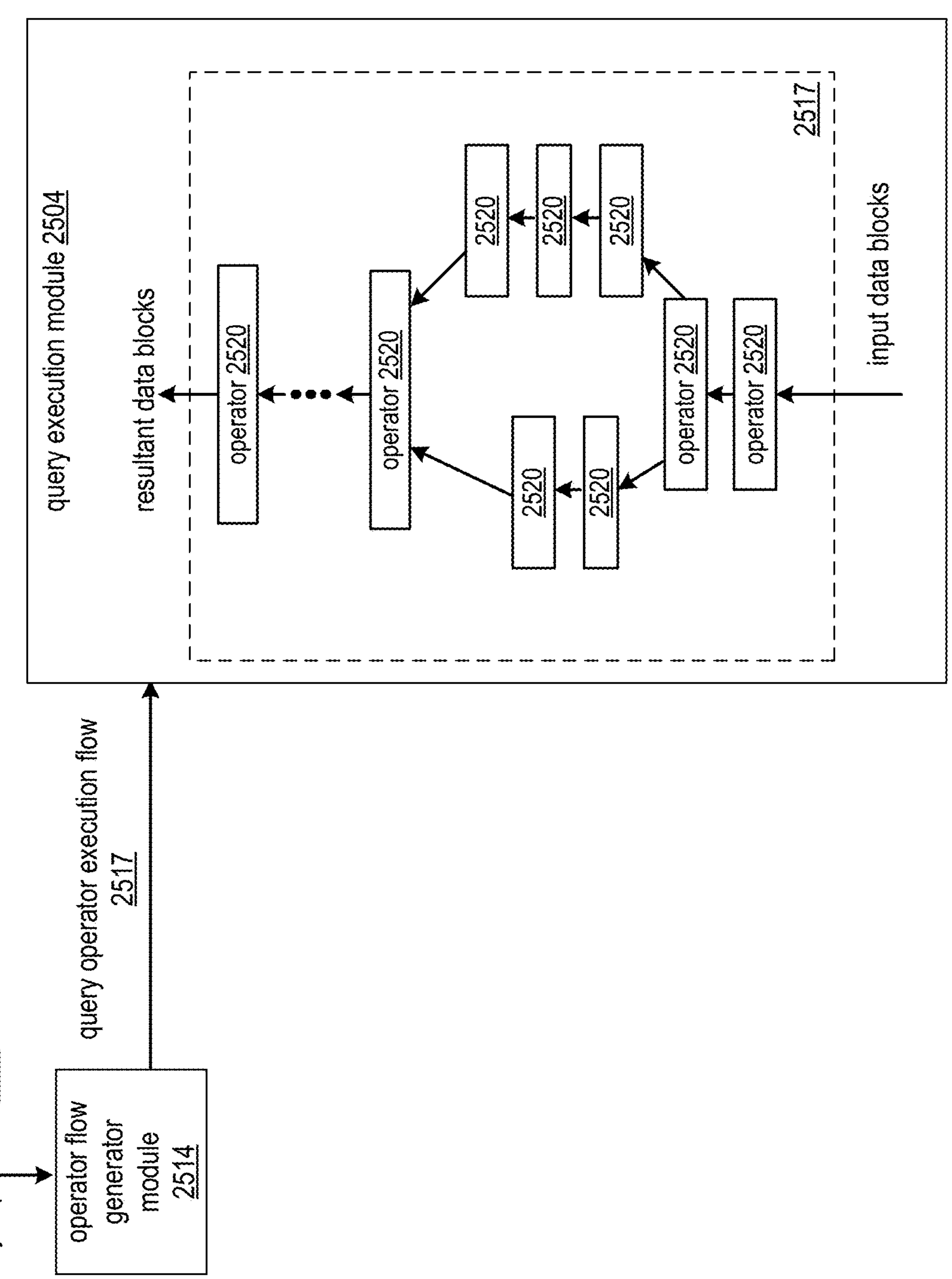
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression (e.g. as an acyclic directed graph of operators), and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24H:
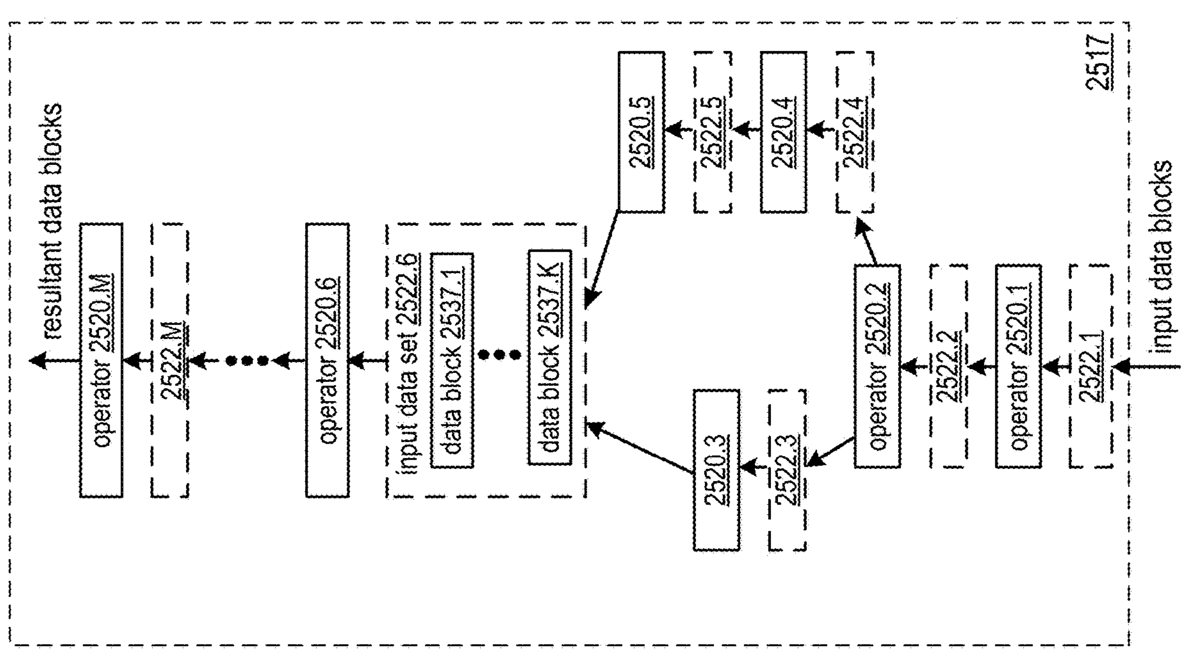
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in a same shuffle node set as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
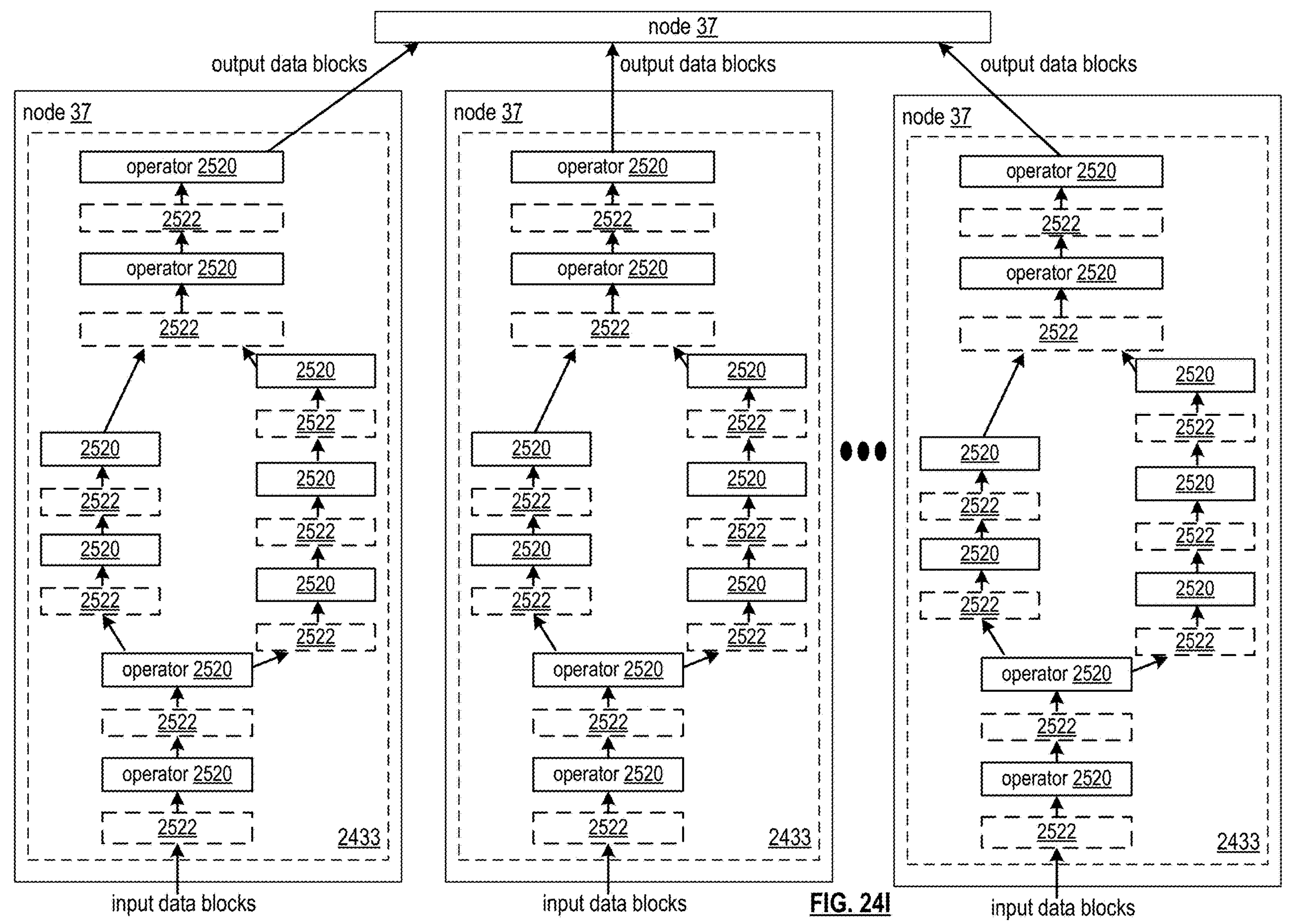
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
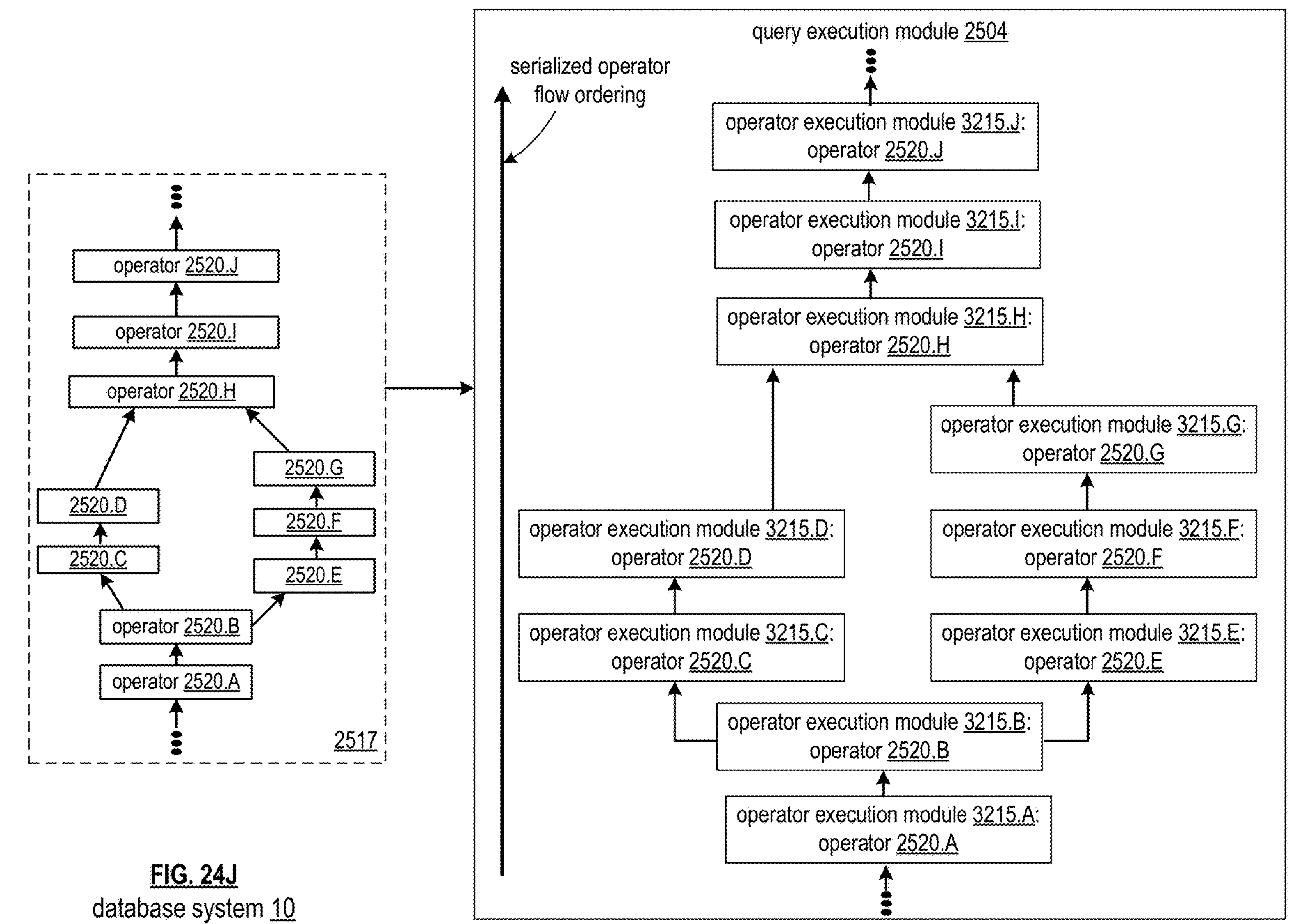
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
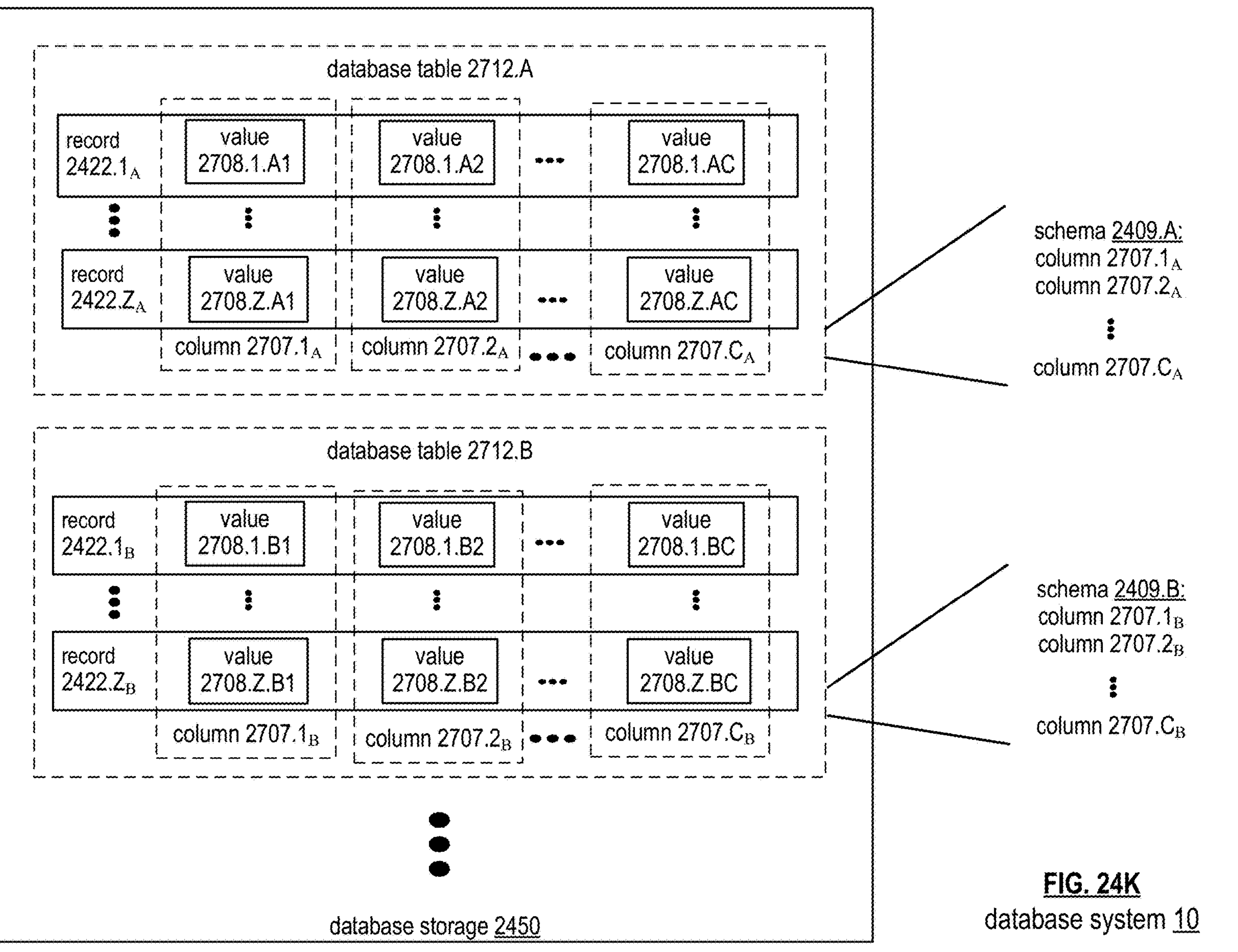
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns 2707.$\mathbf{1}_A$-2707.$C_A$ of schema 2709.A for database table 2712.A can have a different number of columns than and/or can have different datatypes for some or all columns of the set of columns 2707.$\mathbf{1}_B$-2707.$C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
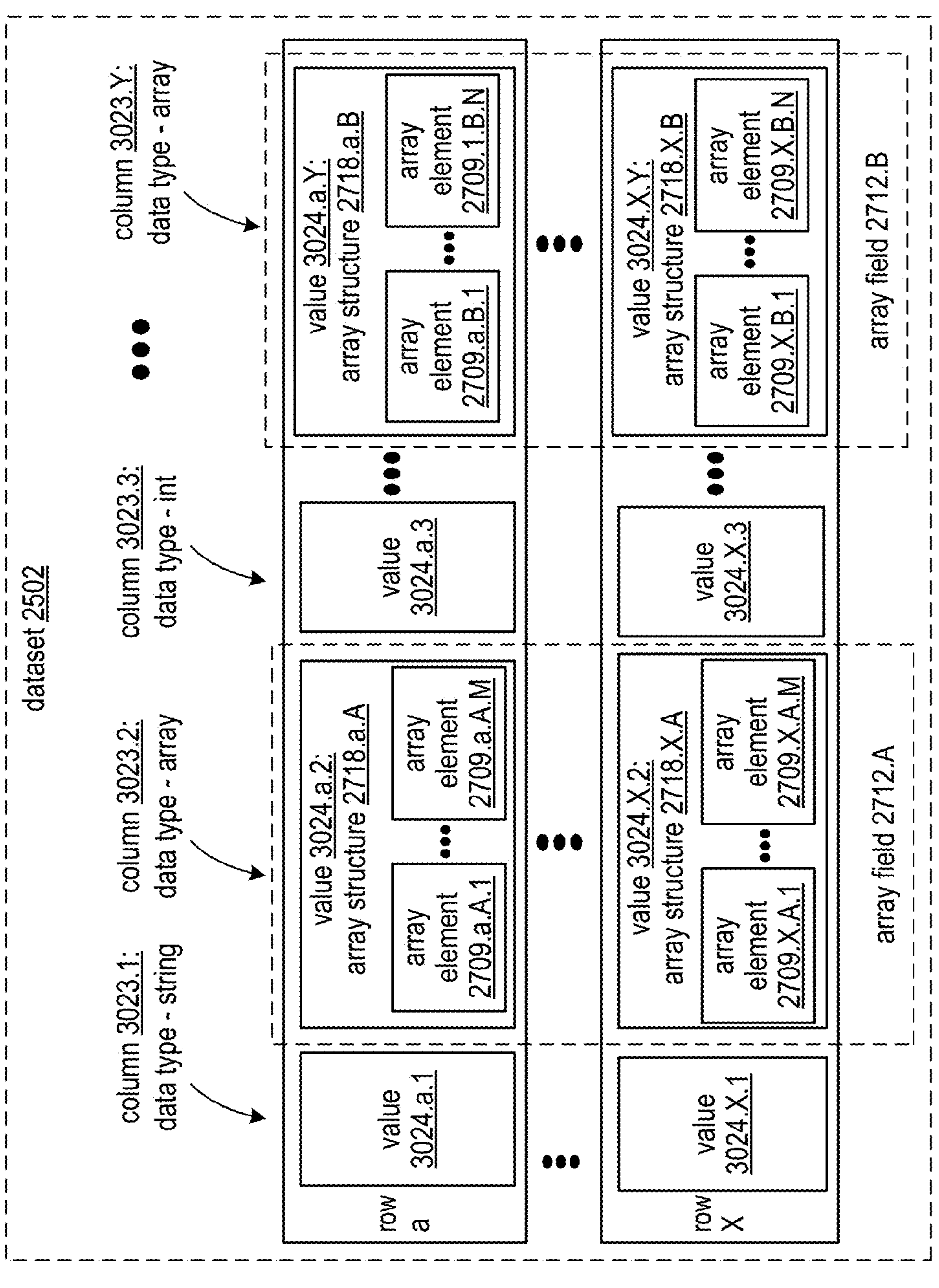
FIG. 24L illustrates an example embodiment of a dataset stored in database storage that includes at least one array field in accordance with various embodiments.

FIG. 24L illustrates an embodiment of a dataset 2502 having one or more columns 3023 implemented as array fields 2712. Some or all features and/or functionality of the dataset 2502 of FIG. 24L can be utilized to implement one or more of the database tables 2712 of FIG. 24K and/or any embodiment of any database table and/or dataset received, stored, and processed via the database system 10 as described herein.

Columns 3023 implemented as array fields 2712 can include array structures 2718 as values 3024 for some or all rows. A given array structure 2718 can have a set of elements 2709.1-2709.M. The value of M can be fixed for a given array field 2712, or can be different for different array structures 2718 of a given array field 2712. In embodiments where the number of elements is fixed, different array fields 2712 can have different fixed numbers of array elements 2709, for example, where a first array field 2712.A has array structures having M elements, and where a second array field 2712.B has array structures having N elements.

Note that a given array structure 2718 of a given array field can optionally have zero elements, where such array structures are considered as empty arrays satisfying the empty array condition. An empty array structure 2718 is distinct from a null value 3852, as it is a defined structure as an array 2718, despite not being populated with any values. For example, consider an example where an array field for rows corresponding to people is implemented to note a list of spouse names for all marriages of each person. An empty array for this array field for a first given row denotes a first corresponding person was never married, while a null value for this array field for a second given row denotes that it is unknown as to whether the second corresponding person was ever married, or who they were married to.

Array elements 2709 of a given array structure can have the same or different data type. In some embodiments, data types of array elements 2709 can be fixed for a given array field (e.g. all array elements 2709 of all array structures 2718 of array field 2712.A are string values, and all array elements 2709 of all array structures 2718 of array field 2712.B are integer values). In other embodiments, data types of array elements 2709 can be different for a given array field and/or a given array structure.

Some array structures 2718 that are non-empty can have one or more array elements having the null value 3852, where the corresponding value 3024 thus meets the null-inclusive array condition. This is distinct from the null value condition 3842, as the value 3024 itself is not null, but is instead an array structure 2718 having some or all of its array elements 2709 with values of null. Continuing example where an array field for rows corresponding to people is implemented to note a list of spouse names for all marriages of each person, a null value for this array field for the second given row denotes that it is unknown as to whether the second corresponding person was ever married or who they were married to, while a null value within an array structure for a third given row denotes that the name of the spouse for a corresponding one of a set of marriages of the person is unknown.

Some array structures 2718 that are non-empty can have all non-null values for its array elements 2709, where all corresponding array elements 2709 were populated and/or defined. Some array structures 2718 that are non-empty can have values for some of its array elements 2709 that are null, and values for others of its array elements 2709 that are non-null values.

Some array structures 2718 that are non-empty can have values for all of its array elements 2709 that are null. This is still distinct from the case where the value 3024 denotes a value of null with no array structure 2718. Continuing example where an array field for rows corresponding to people is implemented to note a list of spouse names for all marriages of each person, a null value for this array field for the second given row denotes that it is unknown as to whether the second corresponding person was ever married, how many times they were married or who they were married to, while the array structure for the third given row denotes a set of three null values and non-null values, denoting that the person was married three times, but the names of the spouses for all three marriages are unknown.

Figure 24M:
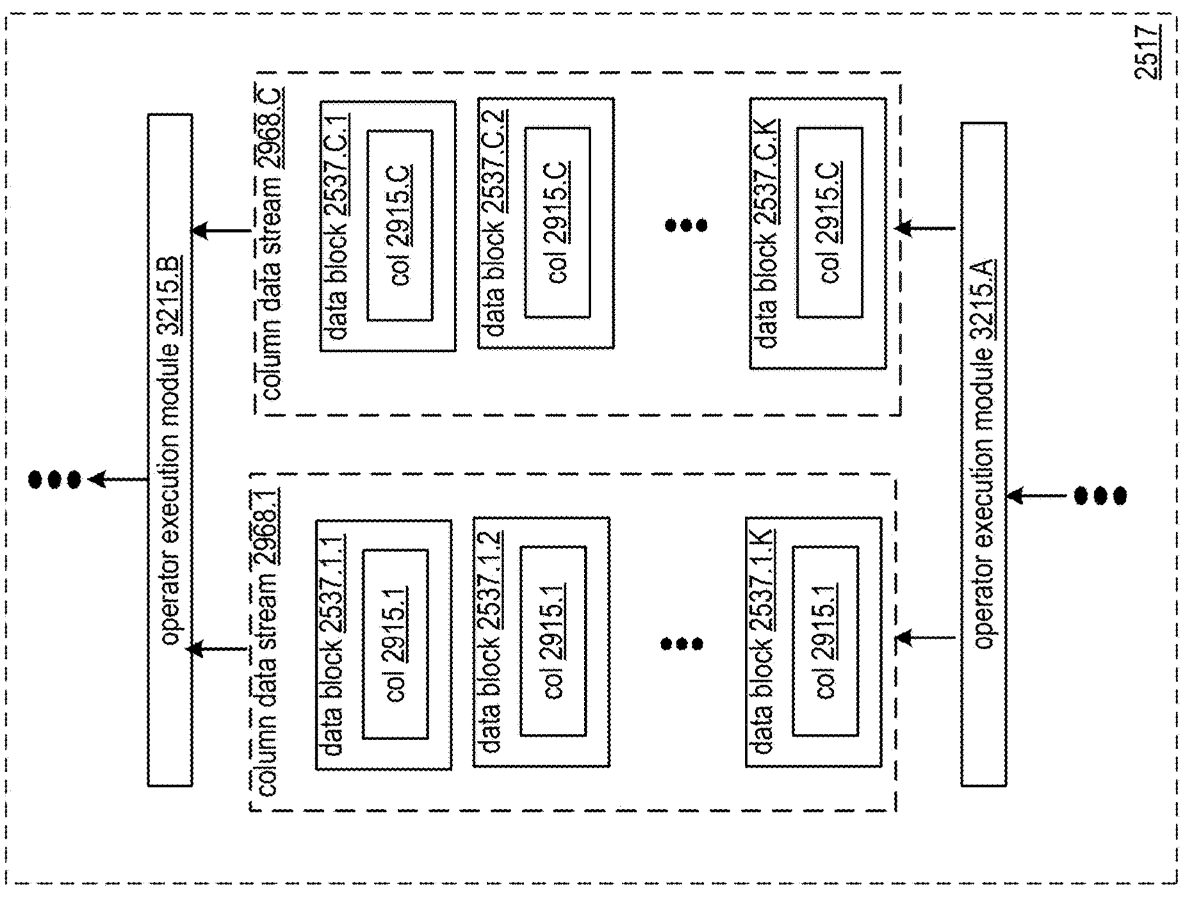
FIG. 24M is a schematic block diagram of a query execution module that implements a plurality of column data streams in accordance with various embodiments.
Figure 24N:
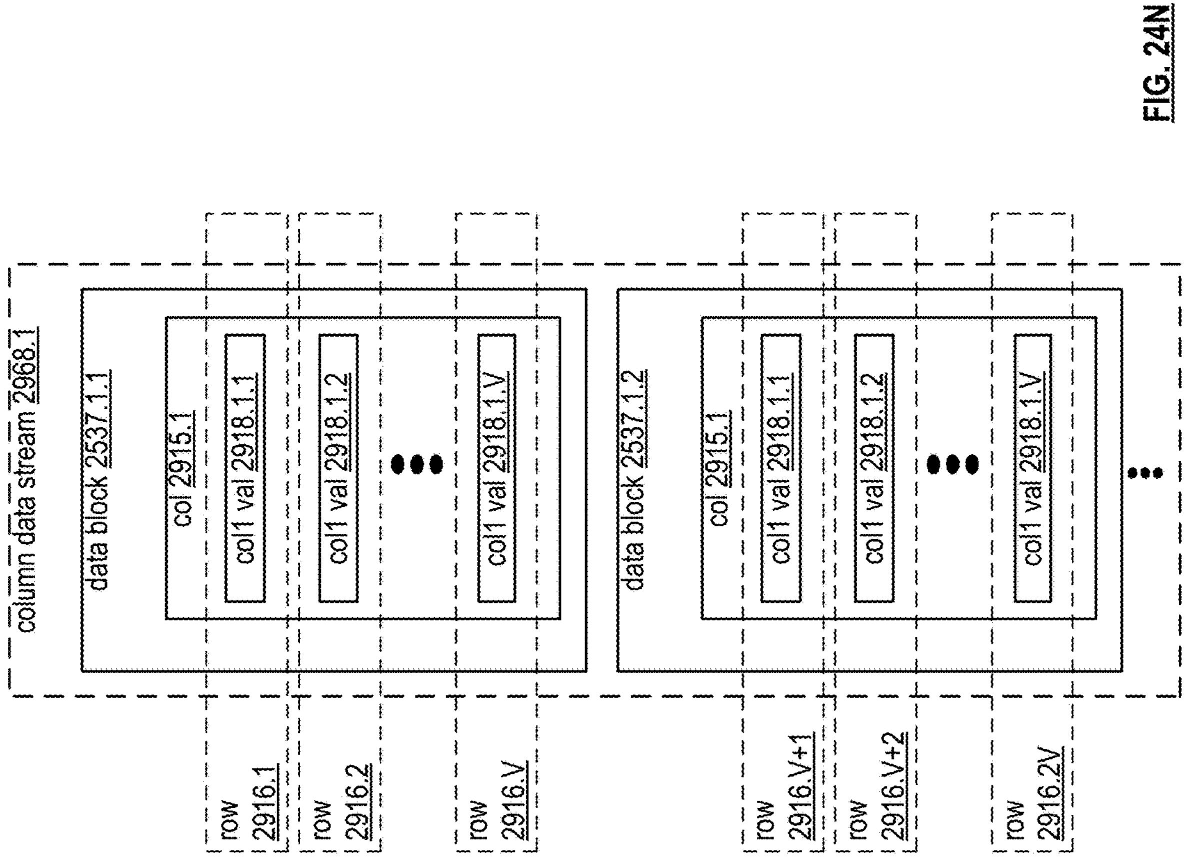
FIG. 24N illustrates example data blocks of a column data stream in accordance with various embodiments.

FIGS. 24M-24N illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24M-24N can implement any embodiment of query execution module 2504 described herein and/or any performance of query execution described herein. Some or all features and/or functionality of column data streams 2968 of FIGS. 24M-24N can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24M, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24N, each data block 2537 of a given column data stream 2968 can include values 2918 for the respective column for one or more corresponding rows 2916. In the example of FIG. 24N, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple columns can be emitted in a same multi-column data stream.

Figure 24O:
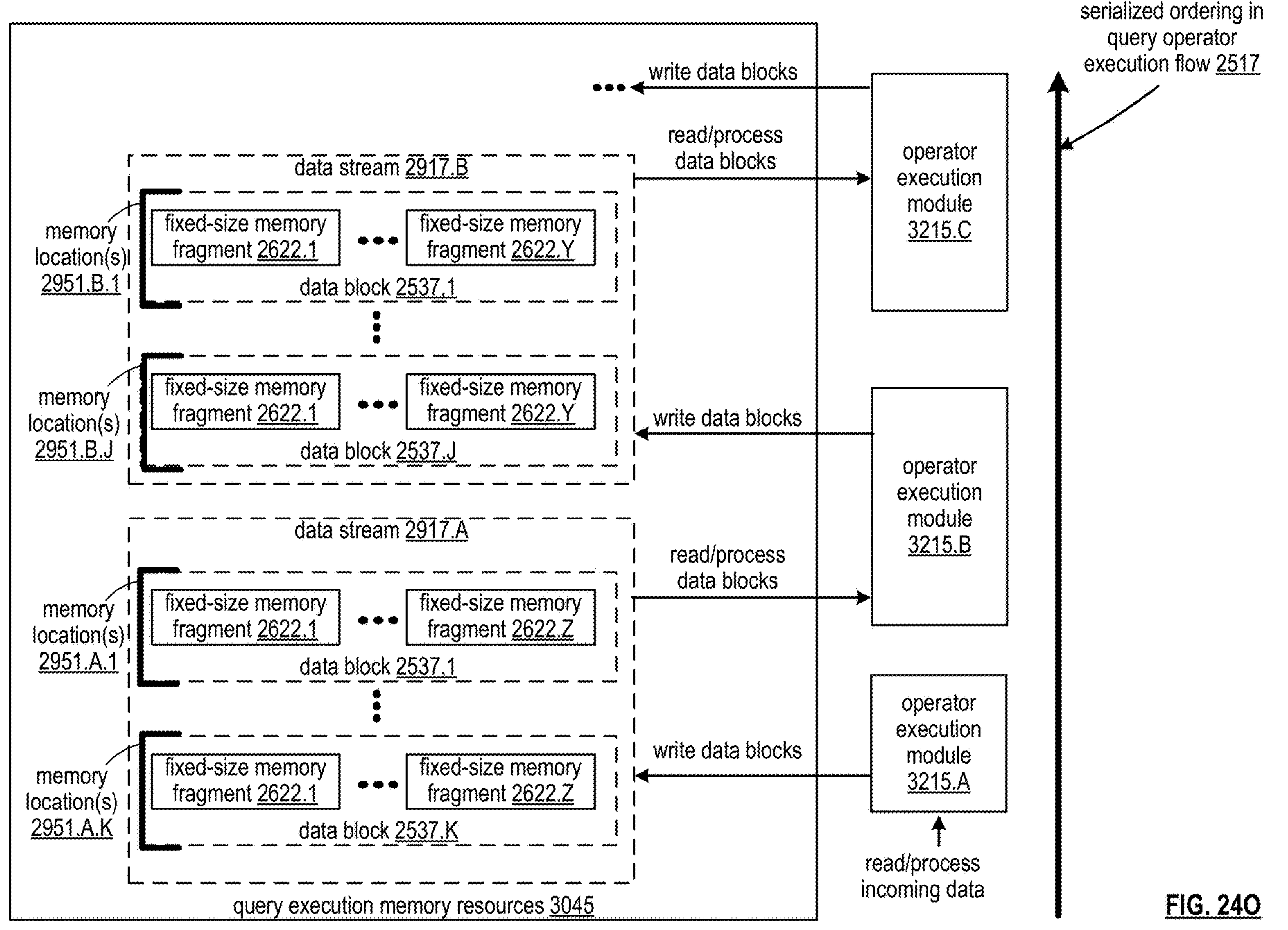
FIG. 24O is a schematic block diagram of a query execution module illustrating writing and processing of data blocks by operator execution modules in accordance with various embodiments.

FIG. 24O illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24O can implement the operator execution modules of FIG. 24J and/or can implement any query execution described herein. The data blocks 2537 can implement the data blocks of column streams of FIGS. 24M and/or 24N, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

FIG. 24P illustrates an embodiment of a database system 10 that implements a segment generator 2507 to generate segments 2424. Some or all features and/or functionality of the database system 10 of FIG. 24P can implement any embodiment of the database system 10 described herein. Some or all features and/or functionality of segments 2424 of FIG. 24P can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24Q:
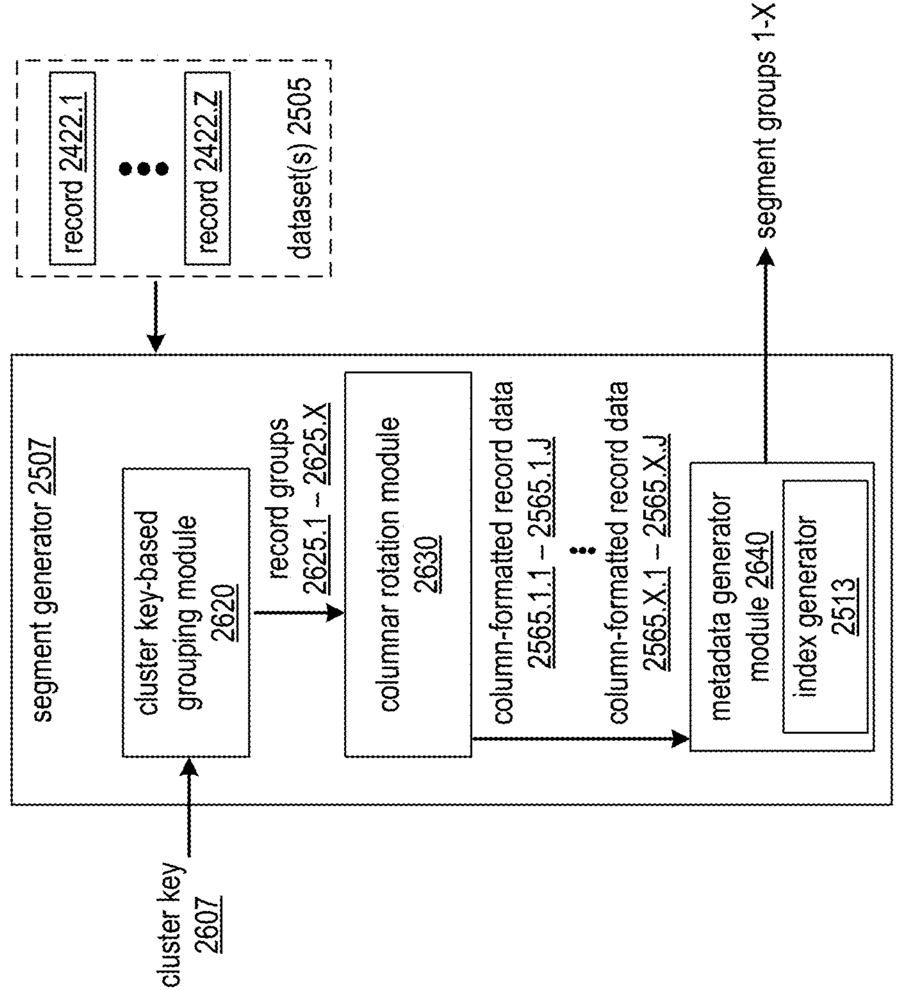
FIG. 24Q is a schematic block diagram of a segment generator that implements a cluster key-based grouping module, a columnar rotation module, and a metadata generator module in accordance with various embodiments.

FIG. 24Q illustrates an example embodiment of a segment generator 2507 of database system 10. Some or all features and/or functionality of the database system 10 of FIG. 24Q can implement any embodiment of the database system 10 described herein. Some or all features and/or functionality of the segment generator 2507 of FIG. 24Q can implement the segment generator 2507 of FIG. 24P and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility patent application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility patent application for all purposes; and/or U.S. Utility application Ser. No. 16/985,930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility patent application for all purposes. For example, the database system 10 implements some or all features and/or functionality of record processing and storage system of U.S. Utility application Ser. No. 16/985,723, U.S. Utility application Ser. No. 16/985,957, and/or U.S. Utility application Ser. No. 16/985,930.

Figure 24R:
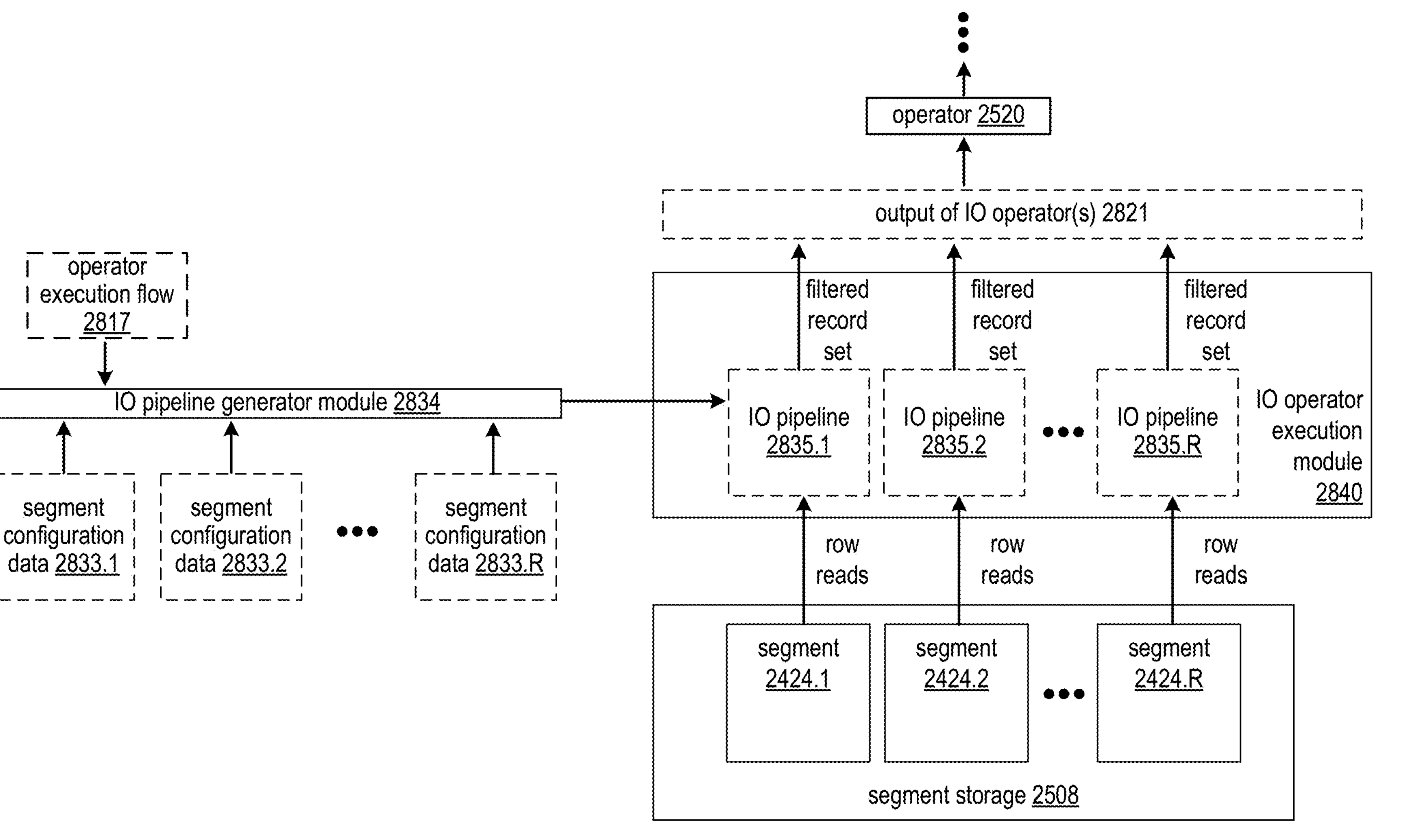
FIG. 24R is a schematic block diagram of a query processing system that generates and executes a plurality of IO pipelines to generate filtered records sets from a plurality of segments in conjunction with executing a query in accordance with various embodiments.

FIG. 24R illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24R can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the column slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24S:
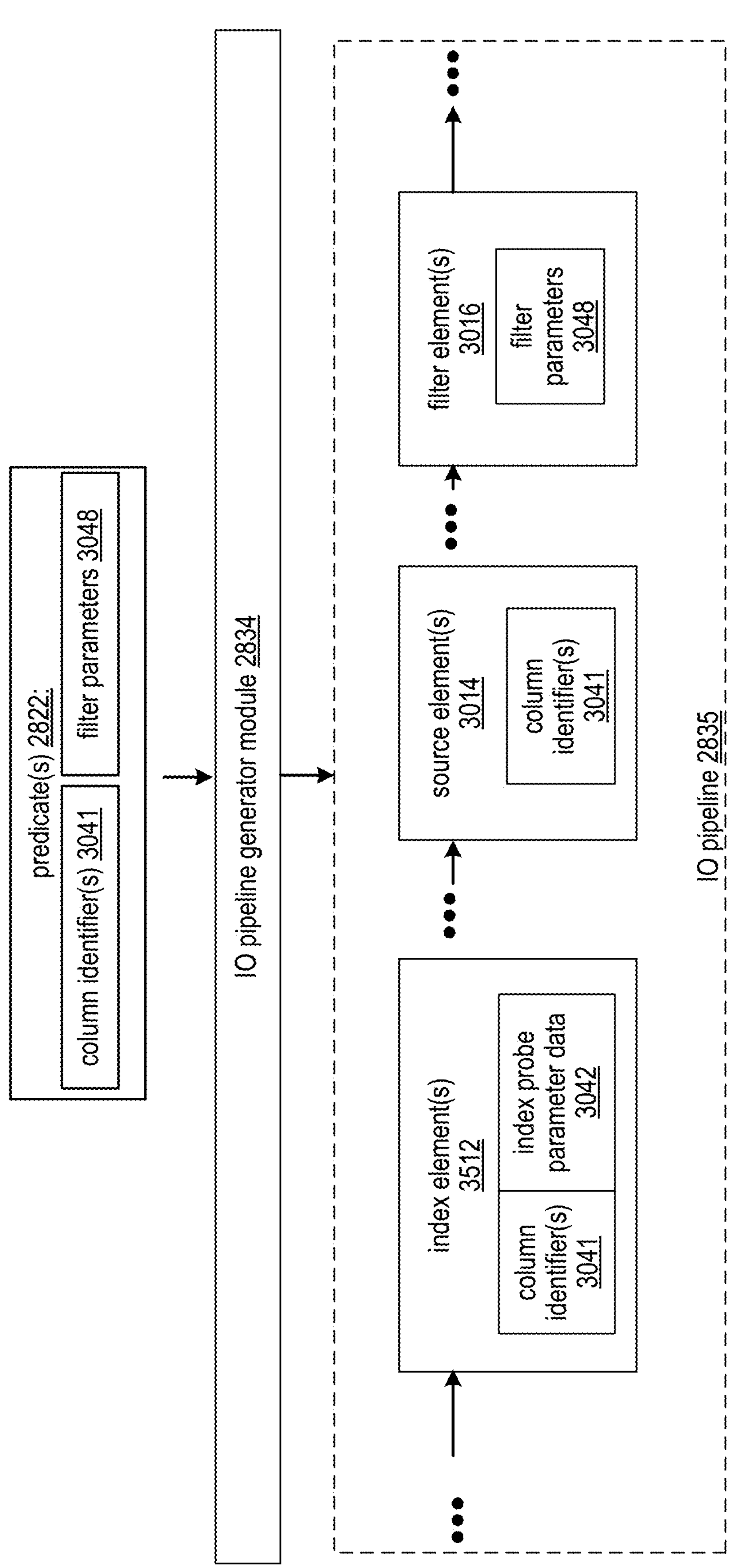
FIG. 24S is a schematic block diagram of a query processing system that generates an IO pipeline for accessing a corresponding segment based on predicates of a query in accordance with various embodiments.

FIG. 24S illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths (e.g. the IO pipeline includes an acyclic directed graph of elements). These elements can implement sourcing and/or filtering of rows based on query predicates 2822 applied to one or more columns, identified by corresponding column identifiers 3041 and corresponding filter parameters 3048. Some or all features and/or functionality of the IO pipeline 2835 and/or IO pipeline generator module 2834 of FIG. 24S can implement the IO pipeline 2835 and/or IO pipeline generator module 2834 of FIG. 24R, and/or any embodiment of IO pipeline 2835, of IO pipeline generator module 2834, or of any query execution via accessing segments described herein.

In some embodiments, the IO pipeline generator module 2834, IO pipeline 2835, IO operator execution module 2840, and/or any embodiment of IO pipeline generation and/or IO pipeline execution described herein, implements some or all features and/or functionality of the IO pipeline generator module 2834, IO pipeline 2835, IO operator execution module 2840, and/or pushing of filtering and/or other operations to the IO level as disclosed by: U.S. Utility application Ser. No. 17/303,437, entitled "QUERY EXECUTION UTILIZING PROBABILISTIC INDEXING" and filed May 28, 2021; U.S. Utility application Ser. No. 17/450,109, entitled "MISSING DATA-BASED INDEXING IN DATABASE SYSTEMS" and filed Oct. 6, 2021; U.S. Utility application Ser. No. 18/310,177, entitled "OPTIMIZING AN OPERATOR FLOW FOR PERFORMING AGGREGATION VIA A DATABASE SYSTEM" and filed May 1, 2023; U.S. Utility application Ser. No. 18/355,505, entitled "STRUCTURING GEOSPATIAL INDEX DATA FOR ACCESS DURING QUERY EXECUTION VIA A DATABASE SYSTEM" and filed Jul. 20, 2023; and/or U.S. Utility application Ser. No. 18/485,861, entitled "QUERY PROCESSING IN A DATABASE SYSTEM BASED ON APPLYING A DISJUNCTION OF CONJUNCTIVE NORMAL FORM PREDICATES" and filed Oct. 12, 2023; all of which hereby incorporated herein by reference in its entirety and made part of the present U.S. Utility patent application for all purposes.

Figure 24T:
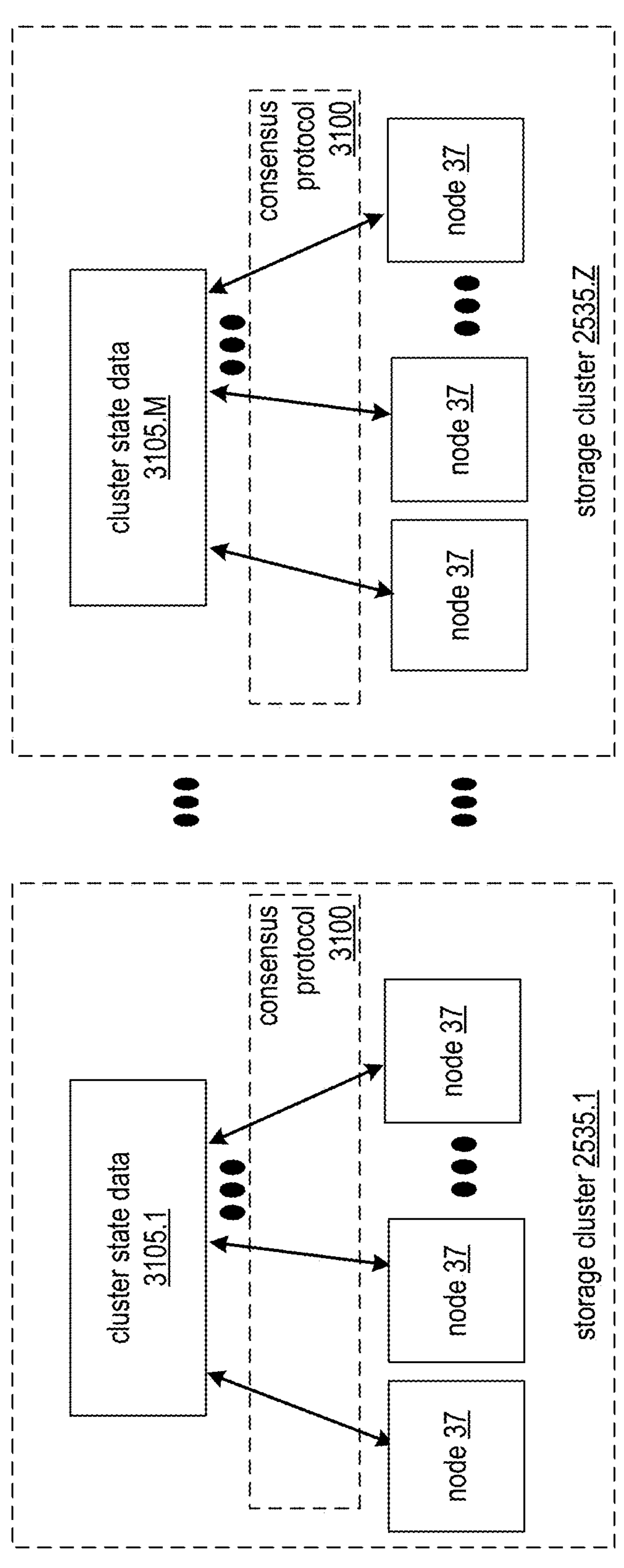
FIG. 24T is a schematic block diagram of a database system that includes a plurality of storage clusters that each mediate cluster state data via a plurality of nodes in accordance with a consensus protocol in accordance with various embodiments.

FIG. 24T presents an embodiment of a database system 10 that includes a plurality of storage clusters 2535. Storage clusters 2535.1-2535.Z of FIG. 24T can implement some or all features and/or functionality of storage clusters 35-1-35-Z described herein, and/or can implement some or all features and/or functionality of any embodiment of a storage cluster described herein. Some or all features and/or functionality of database system 10 of FIG. 24T can implement any embodiment of database system 10 described herein.

Each storage cluster 2535 can be implemented via a corresponding plurality of nodes 37. In some embodiments, a given node 37 of database system 10 is optionally included in exactly one storage cluster. In some embodiments, one or more nodes 37 of database system 10 are optionally included in no storage clusters (e.g. aren't configured to store segments). In some embodiments, one or more nodes 37 of database system 10 can be included in multiple storage clusters.

In some embodiments, some or all nodes 37 in a storage cluster 2535 participate at the IO level 2416 in query execution plans based on storing segments 2424 in corresponding memory drives 2425, and based on accessing these segments 2424 during query execution. This can include executing corresponding IO operators, for example, via executing an IO pipeline 2835 (and/or multiple IO pipelines 2835, where each IO pipeline is configured for each respective segment 2424). All segments in a given same segment group (e.g. a set of segments collectively storing parity data and/or replicated parts enabling any given segment in the segment group to be rebuilt/accessed as a virtual segment during query execution via access to some or all other segments in the same segment group as described previously) are optionally guaranteed to be stored in a same storage cluster 2535, where segment rebuilds and/or virtual segment use in query execution can thus be facilitated via communication between nodes in a given storage cluster 2535 accordingly, for example, in response to a node failing and/or a segment becoming unavailable.

Each storage cluster 2535 can further mediate cluster state data 3105 in accordance with a consensus protocol mediated via the plurality of nodes 37 of the given storage cluster. Cluster state data 3105 can implement any embodiment of state data and/or system metadata described herein. In some embodiments, cluster state data 3105 can indicate data ownership information indicating ownership of each segments stored by the cluster by exactly one node (e.g. as a physical segment or a virtual segment) to ensure queries are executed correctly via processing rows in each segment (e.g. of a given dataset against which the query is executed) exactly once.

Consensus protocol 3100 can be implemented via the raft consensus protocol and/or any other consensus protocol. Consensus protocol 3100 can be implemented be based on distributing a state machine across a plurality of nodes, ensuring that each node in the cluster agrees upon the same series of state transitions and/or ensuring that each node operates in accordance with the currently agreed upon state transition. Consensus protocol 3100 can implement any embodiment of consensus protocol described herein.

Coordination across different storage clusters 2535 can be minimal and/or non-existent, for example, based on each storage cluster coordinating state data and/or corresponding query execution separately. For example, state data 3105 across different storage clusters is optionally unrelated.

Each storage cluster's nodes 37 can perform various database tasks (e.g. participate in query execution) based on accessing/utilizing the state data 3105 of its given storage cluster, for example, without knowledge of state data of other storage clusters. This can include nodes syncing state data 3105 and/or otherwise utilizing the most recent version of state data 3105, for example, based on receiving updates from a leader node in the cluster, triggering a sync process in response to determining to perform a corresponding task requiring most recent state data, accessing/updating a locally stored copy of the state data, and/or otherwise determining updated state data.

In some embodiments, updating of state data (such as configuration data, system metadata, data shared via a consensus protocol, and/or any other state data described herein), for example, utilized by nodes to perform respective functionality over time, can be performed in conjunction with an event driven model. In some embodiments, such updating of state data over time can be performed in a same or similar fashion as updating of configuration data as disclosed by: U.S. Utility application Ser. No. 18/321,212, entitled COMMUNICATING UPDATES TO SYSTEM METADATA VIA A DATABASE SYSTEM, filed May 22, 2023; and/or U.S. Utility application Ser. No. 18/310,262, entitled "GENERATING A SEGMENT REBUILD PLAN VIA A NODE OF A DATABASE", filed May 1, 2023; which are hereby incorporated herein by reference in their entirety and made part of the present U.S. Utility patent application for all purposes.

In some embodiments, system metadata can be generated and/or updated over time with different corresponding metadata sequence numbers (MSNs). For example, such generation/updating of metadata over time can be implemented via any features and/or functionality of the generation of data ownership information over time with corresponding OSNs as disclosed by U.S. Utility application Ser. No. 16/778,194, entitled "SERVICING CONCURRENT QUERIES VIA VIRTUAL SEGMENT RECOVERY", filed Jan. 31, 2020, and issued as U.S. Pat. No. 11,061,910 on Jul. 13, 2021, which is hereby incorporated herein by reference in its entirety and made part of the present U.S. Utility patent application for all purposes. In some embodiments, the system metadata management system 2702 and/or a corresponding metadata system protocol can be implemented via a consensus protocols mediated via a plurality of nodes, for example, to update system metadata 2710, in a via any features and/or functionality of the execution of consensus protocols mediated via a plurality of nodes as disclosed by this U.S. Utility application Ser. No. 16/778,194. In some embodiments, each version of system metadata 2710 can assign nodes to different tasks and/or functionality via any features and/or functionality of assigning nodes to different segments for access in query execution in different versions of data ownership information as disclosed by this U.S. Utility application Ser. No. 16/778,194. In some embodiments, system metadata indicates a current version of data ownership information, where nodes utilize system metadata and corresponding system configuration data to determine their own ownership of segments for use in query execution accordingly, and/or to execute queries utilizing correct sets of segments accordingly, based on processing the denoted data ownership information as U.S. Utility application Ser. No. 16/778,194.

Figure 24U:
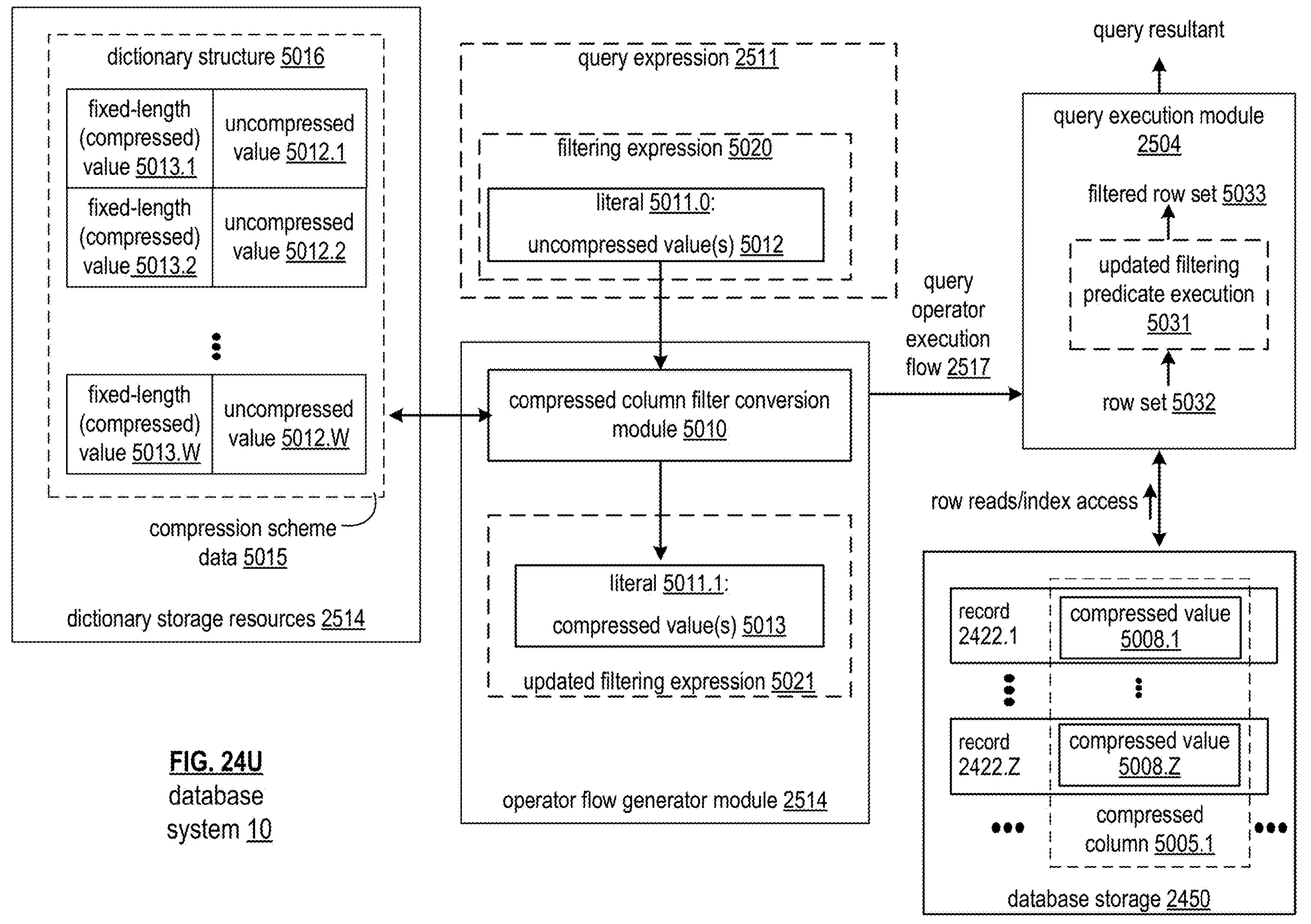
FIG. 24U is a schematic block diagram of a database system that implements a compressed column filter conversion module based on accessing a dictionary structure in accordance with various embodiments.
Figure 24V:
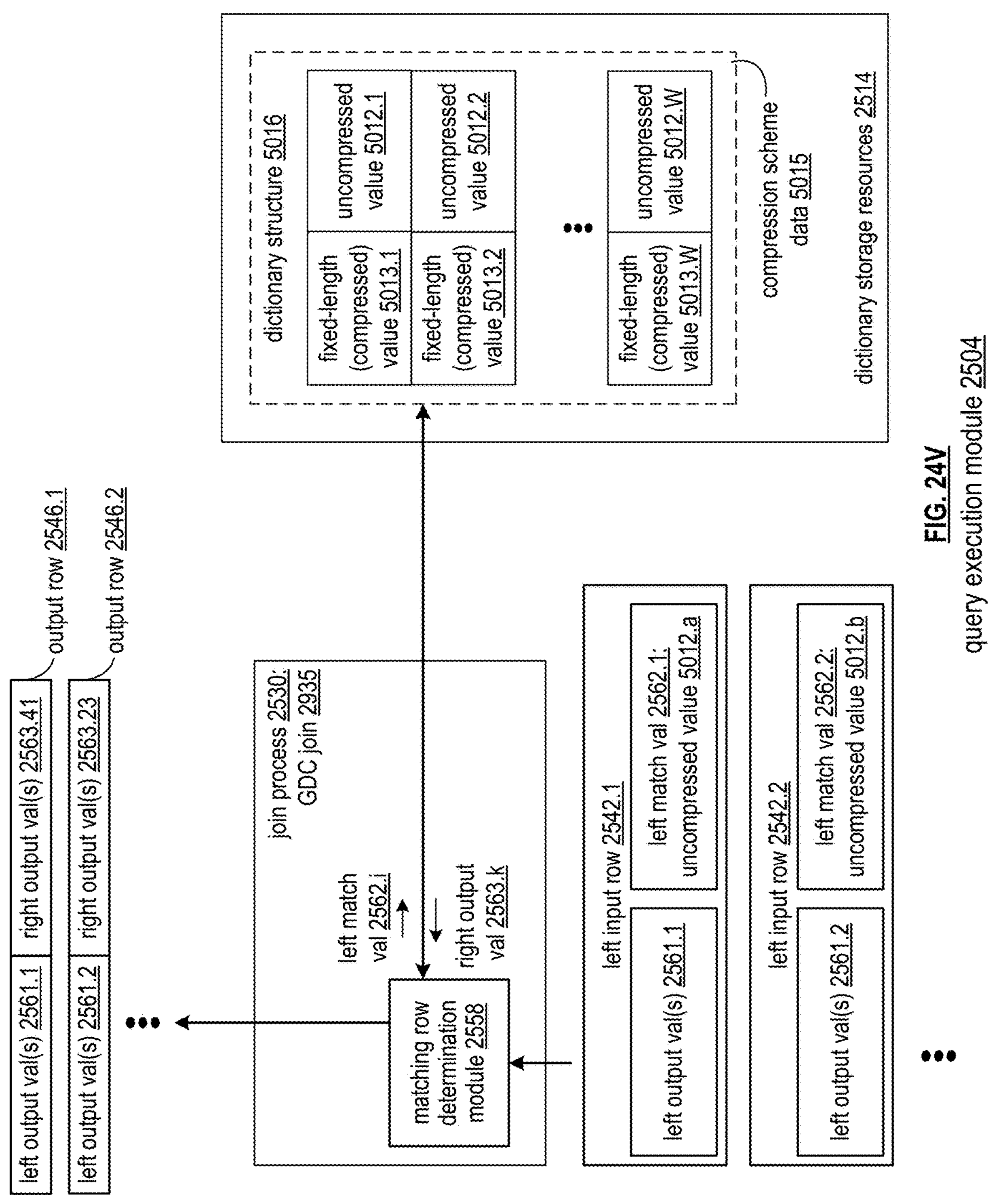
FIG. 24V is a schematic block diagram of a query execution module that implements a Global Dictionary Compression join via access to a dictionary structure in accordance with various embodiments.

FIGS. 24U and 24V illustrate embodiments of a database system 10 that utilizes a dictionary structure to store compressed columns. Some or all features and/or functionality of the dictionary structure 5016 of FIGS. 24U and/or 24V can implement any compression scheme data and/or means of generating and/or accessing compressed columns described herein. Any other features and/or functionality of database system 10 of FIG. 24U and/or 24V can implement any other embodiment of database system 10 described herein.

In some embodiments, columns are compressed as compressed columns 5005 based on a globally maintained dictionary (e.g. dictionary structure 5016), for example, in conjunction with applying Global Dictionary Compression (GDC). Applying Global Dictionary Compression can include replaces variable length column values with fixed length integers on disk (e.g. in database storage 2450), where the globally maintained dictionary is stored elsewhere, for example, via different (e.g. slower/less efficient) memory resources of a different type/in a different location from the database storage 2450 that stores the compressed columns 5005 accessed during query execution.

The dictionary structure can store a plurality of fixed-length, compressed values 5013 (e.g. integers) each mapped to a single uncompressed value 5012 (e.g. variable-length values, such as strings). The mapping of compressed values 5013 to uncompressed values 5012 can be in accordance with a one-to-one mapping. The mapping of compressed values 5013 to uncompressed values 5012 can be based on utilizing the fixed-length values 5013 as keys of a corresponding map and/or dictionary data structure, and/or can be based on utilizing the uncompressed values 5012 as keys of a corresponding map and/or dictionary data structure.

A given uncompressed value 5012 that is included in many rows of one or more tables can be replaced (i.e. "compressed") via a same corresponding compressed value 5013 mapped to this uncompressed value 5012 as the compressed value 5008 for these rows in compressed column 5005 in database storage. As new rows are received for storage over time, their column values for one or more compressed columns 5005 can be replaced via corresponding compressed values 5008 based on accessing the dictionary structure and determining whether the uncompressed value 5012 of this column is stored in the dictionary structure 5016. If yes, the compressed value 5013 mapped to the uncompressed value 5012 in this existing entry is stored as compressed value 5008 in the compressed column 5005 in the database storage 2450. If no, the dictionary structure 5016 can be updated to include a new entry that includes the uncompressed value 5012 and a new compressed value 5013 (e.g. different from all existing compressed values in the structure) generated for this uncompressed value 5012, where this new compressed value 5013 is stored as is applied as compressed value 5008 in the database storage 2450.

The dictionary structure 5016 can be stored in dictionary storage resources 2514, which can be different types of resources from and/or can be stored in a different location from the database storage 2450 storing the compressed columns for query execution. In some embodiments, the dictionary storage resources 2514 storing dictionary structure 5016 can be considered a portion/type of memory as of database storage 2450 that are accessed during query execution as necessary for decompressing column values. In some embodiments, the dictionary storage resources 2514 storing dictionary structure 5016 can be implemented as metadata storage resources, for example, implemented by a metadata consensus state mediated via a metadata storage cluster of nodes maintaining system metadata such as GDC structures of the database system 10.

The dictionary structure 5016 can correspond to a given column 5005, where different columns optionally have their own dictionary structure 5016 build and maintained. Alternatively, a common dictionary structure 5016 can optionally be maintained for multiple columns of a same table/same dataset, and/or for multiple columns across different tables/different datasets. For example, a given uncompressed value 5012 appearing in different columns 5005 of the same or different table is compressed via the same fixed-length value 5013 as dictated by the dictionary structure 5016.

This dictionary structure 5016 can be globally maintained (e.g. across some or all nodes, indicating fixed length values mapped across one or more segments stored in conjunction with storing one or more relational database tables) and can be updated overtime (e.g. as more data is added with new variable length values requiring mapping to fixed length values). For example, the dictionary structure 5016 is maintained/stored in state data that is mediated/accessible by some or all nodes 37 of the database system 10 via the dictionary structure 5016 being included in any embodiment of state data described herein.

In some embodiments, dictionary compression via dictionary structure 5016 can implement the compression scheme utilized to generate (e.g. compress/decompress the values of) compressed columns 5005 of FIG. 24U based on implementing some or all features and/or functionality of the compression of data during ingress via a dictionary as disclosed by U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility patent application for all purposes.

In some embodiments, dictionary compression via dictionary structure 5016 can implement the compression scheme utilized to generate (e.g. compress/decompress the values of) compressed columns 5005 of FIG. 24U based on implementing some or all features and/or functionality of global dictionary compression as disclosed by U.S. Utility application Ser. No. 16/220,454, entitled "DATA SET COMPRESSION WITHIN A DATABASE SYSTEM", filed Dec. 14, 2018, issued as U.S. Pat. No. 11,256,696 on Feb. 22, 2022, which is hereby incorporated herein by reference in its entirety and made part of the present U.S. Utility patent application for all purposes.

In some embodiments, dictionary compression via dictionary structure 5016 can be utilized in performing GDC join processes during query execution to enable recovery of uncompressed values during query execution, for example, based on implementing some or all features and/or functionality of GDC joins as disclosed by U.S. Utility application Ser. No. 18/226,525, entitled "SWITCHING MODES OF OPERATION OF A ROW DISPERSAL OPERATION DURING QUERY EXECUTION", filed Jul. 26, 2023, which is hereby incorporated herein by reference in its entirety and made part of the present U.S. Utility patent application for all purposes.

FIG. 24U illustrates an embodiment of database system 10 where a compressed column filter conversion module 5010 accesses a dictionary structure 5016 to generate an updated filtering expression 5021 in conjunction with query execution.

The compressed column filter conversion module 5010 can generate updated filtering expression 5021 based on updating one or more literals 5011.1 from corresponding literals 5011.0 based on replacing uncompressed values 5012 with compressed values 5013 mapped to these compressed values based on accessing dictionary structure 5016 and determining which fixed-length compressed value 5013 is mapped to each given uncompressed value 5012. Such functionality can be implemented for one or more queries executed by database system 10 to reduce access to the dictionary structure during query execution in conjunction with performing one or more optimizations of the query operator execution flow to improve query performance.

FIG. 24V illustrates an embodiment of executing a join process 2530 that is implemented as a global dictionary compression (GDC) join. This can include applying a matching row determination module 2558 via access to a dictionary structure 5016.

In some embodiments, unlike hash maps generated during query execution for access in conjunction with executing other types of JOIN operations (e.g. as described in U.S. Utility application Ser. No. 18/266,525), the dictionary structure 5016 can optionally be accessed during GDC join processes based on being globally maintained, and thus being generated prior to execution of the corresponding query. In particular, the dictionary structure 5016 can be implemented in conjunction with compressing one or more columns, such as a variable length values stored in one or more variable length columns, by mapping these variable length, uncompressed values (e.g. strings, other large values of a given column) to corresponding fixed-length, compressed values 5013 (e.g. integers or other fixed length values).

For example, segments can store the fixed length values to improve storage efficiency and/or queries can access and process these fixed length values, where the uncompressed variable length values are only required via access to dictionary structure 5016 to emit an uncompressed value 5012 for a given fixed-length value 5013 of a given input row. This functionality can be achieved via performing a corresponding join as described herein, where the matching condition 2519 is implemented for a compressed column and indicates matching by the value of the compressed column, such as simply emitting the uncompressed value mapped to the compressed column as the right output value 2563 for a given input row, implemented as a left input row 2542 of a join operation.

Figure 24W:
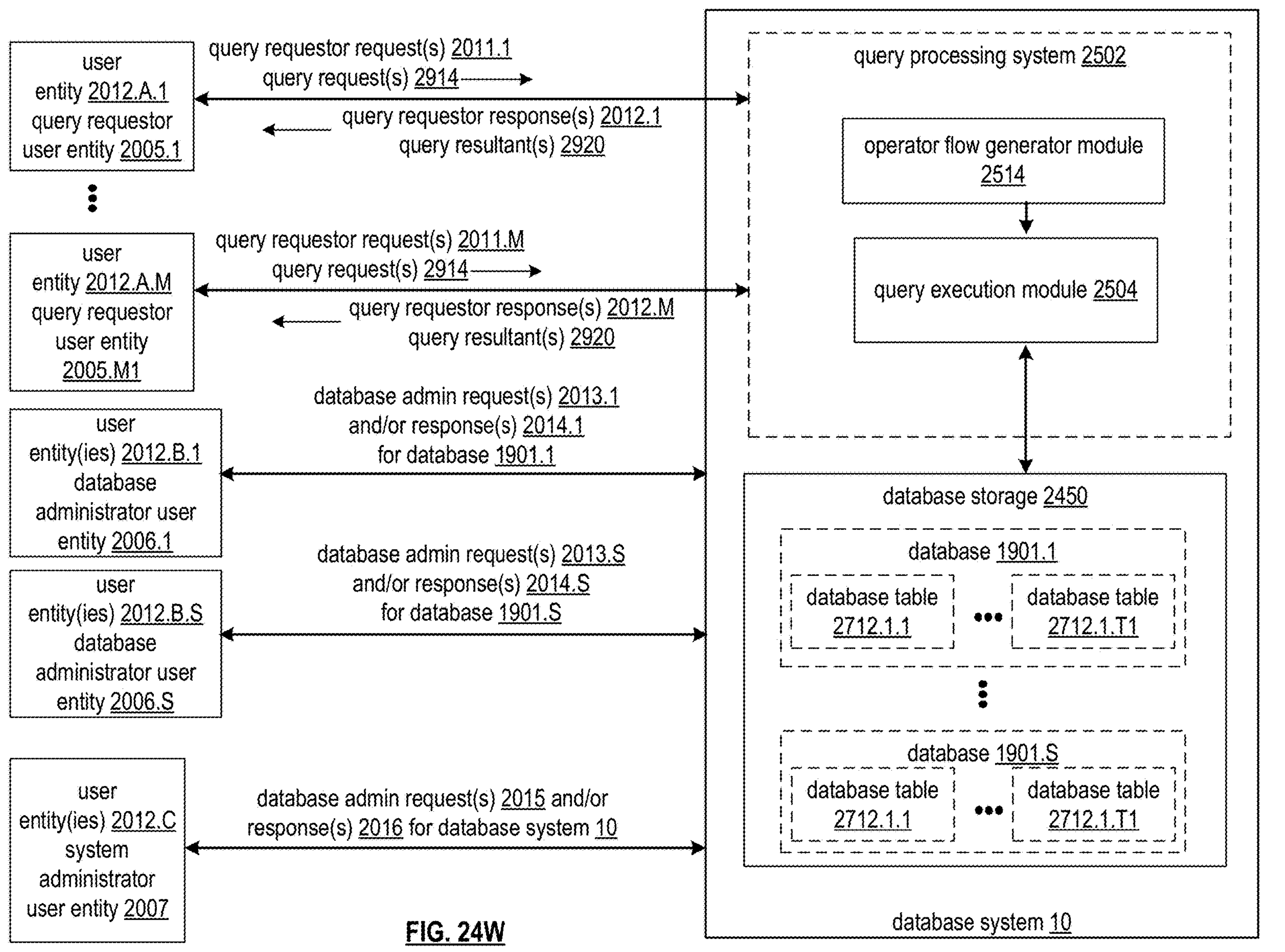
FIG. 24W is a schematic block diagram illustrating communication between database system 10 and a plurality of user entities in accordance with various embodiments.

FIG. 24W illustrates an embodiment of database system 10 operable to communicate with a plurality of user entities.

Some or all features and/or functionality of FIG. 24W can implement any embodiment of database system 10 described herein.

Various users can send data to and/or receive data from database system 10 over time, for example, as corresponding requests and/or responses. Requests can indicate requests for queries to be executed, requests that include data to be loaded/stored, requests that include configuration data configuring any values/functionality utilized by database system 10 to perform its functionality, data supplied in response to a request from database system 10, and/or other requests to database system 10 for processing by database system 10. Responses can indicate query resultants of executed queries, notifications/confirmation that requests were processed successfully or rendered failure, error notifications, data supplied in response to a request from user entity 2012, and/or other information.

Some or all user entities 2012 can be implemented as user entities corresponding to humans that communicate with database system 10 (e.g. requests are configured via user input to a corresponding computing device of database system 10 or communicating with database system 10); user entities corresponding to groups of multiple people, for example, corresponding to companies/establishments that communicate with database system 10; user entities corresponding to automated entities such as one or more computing devices and/or server systems (e.g. implemented via artificial intelligence, machine learning, and/or configured instructions to cause these automated entities to send requests and/or process responses; and/or corresponding to a given person and configured to send/receive data based on user input from a corresponding person); and/or other user entities. Some or all user entities 2012 can be implemented as humans and/or devices included in/associated with database system 10 (e.g. personnel/employees of a service provided by database system 10; computing devices implementing nodes/processing modules of database system 10 that communicate via internal communication resources of database system 10, etc.). Some or all user entities 2012 can be implemented as humans and/or devices external from database system 10 (e.g. humans/companies that are customers of a service provided by database system 10; computing devices external from the computing devices/nodes/processing resources of database system 10 that communicate with database system 10 via a corresponding communication interface, etc.)

User entities 2012 can include various type of user entities 2012, which can include one or more user entities 2012.A, one or more user entities 2012.B, and/or one or more user entities 2012.C. A given user entity can optionally implement multiple types of user entities 2012 (e.g. a given user entity 2012 operates as both a user entity 2012.A and a user entity 2012.B). Multiple different users (e.g. different people, different devices) can implement a given user entity 2012 (e.g. different employees of a given company implement a given user entity 2012 at different times; different devices associated with a given person or company implement a given user entity 2012 at different times, etc.).

In some embodiments, some or all user entities 2012 can configure/perform functionality corresponding to workload management (WLM).

User entities 2012 can include one or more user entities 2012.A.1-2012.A.M corresponding to query requestor user entities 2005.1-2005.M. Query requestor user entities 2005 can send query requests 2914 indicating queries for execution and/or receive query resultants in response 2920. User entities 2012 can optionally be implemented in a same or similar fashion as external requesting entity 2912.

User entities 2012 can include one or more user entities 2012.B.1-2012.B.S corresponding to database administrator user entities 2006 that request/configure/monitor loading/storage of/access to a corresponding database 1901 that stores a corresponding plurality of database tables 2712.1-2712-T (e.g. database administrator user entities 2006 optionally correspond to data sources that load their data to the system for use in query execution, where this data source sources data included in tables 2712 of a corresponding database 1901).

For example, in some embodiments, database system 10 can implement database storage 2450 to store various tables 2712 corresponding to multiple different databases 1902.1-1901.S, for example, each sourced by, accessible by, and/or configured via corresponding user entities 2012.B. Different databases 1901 can store same or different types of data, same or different numbers of tables 2712, etc. Some or all user entities 2012.A can correspond to a given database 1901 (e.g. based on being associated with the corresponding data source and/or user entities 2012.B) for example, where these user entities are only allowed to query against the given database 1901.

User entities 2012 can include one or more user entities 2012.C corresponding to system administrators of the database system 10 that request/configure/monitor loading/storage of/access to databases in query execution and/or otherwise configure/monitor functionality of database system 10 described herein.

Different user entities can have different corresponding permissions/privileges/access types, for example, indicated in corresponding user permissions data stored by and/or accessible by database system 10. In some embodiments, one or more given user entities can configure permissions of other user entities. Such permissions can configure types of requests that can be sent, restrictions on data included in responses, and/or which data can be accessed (e.g. in loading data and/or requesting data). For example, some users entities 2012. A can be restricted to certain types of queries/query functions be performed, access to only some databases 1902 and/or only some tables 2712, limits on how many queries be executed/how much data be returned, certain levels of query priority, certain service classes of query execution defining corresponding attributes of how queries be executed/how query execution be restricted, etc. As another example, some user entities 2012.B can be restricted to certain types/rates of data loading to a corresponding database 1901, certain permissions regarding how much configuration of database system 10 they can have power over, etc. As another example, different user entities 2012.C can have different permissions regarding how much configuration of database system 10 they can have power over, different functionalities/aspects of database system that they have permissions to configure, etc.

Figure 25A:
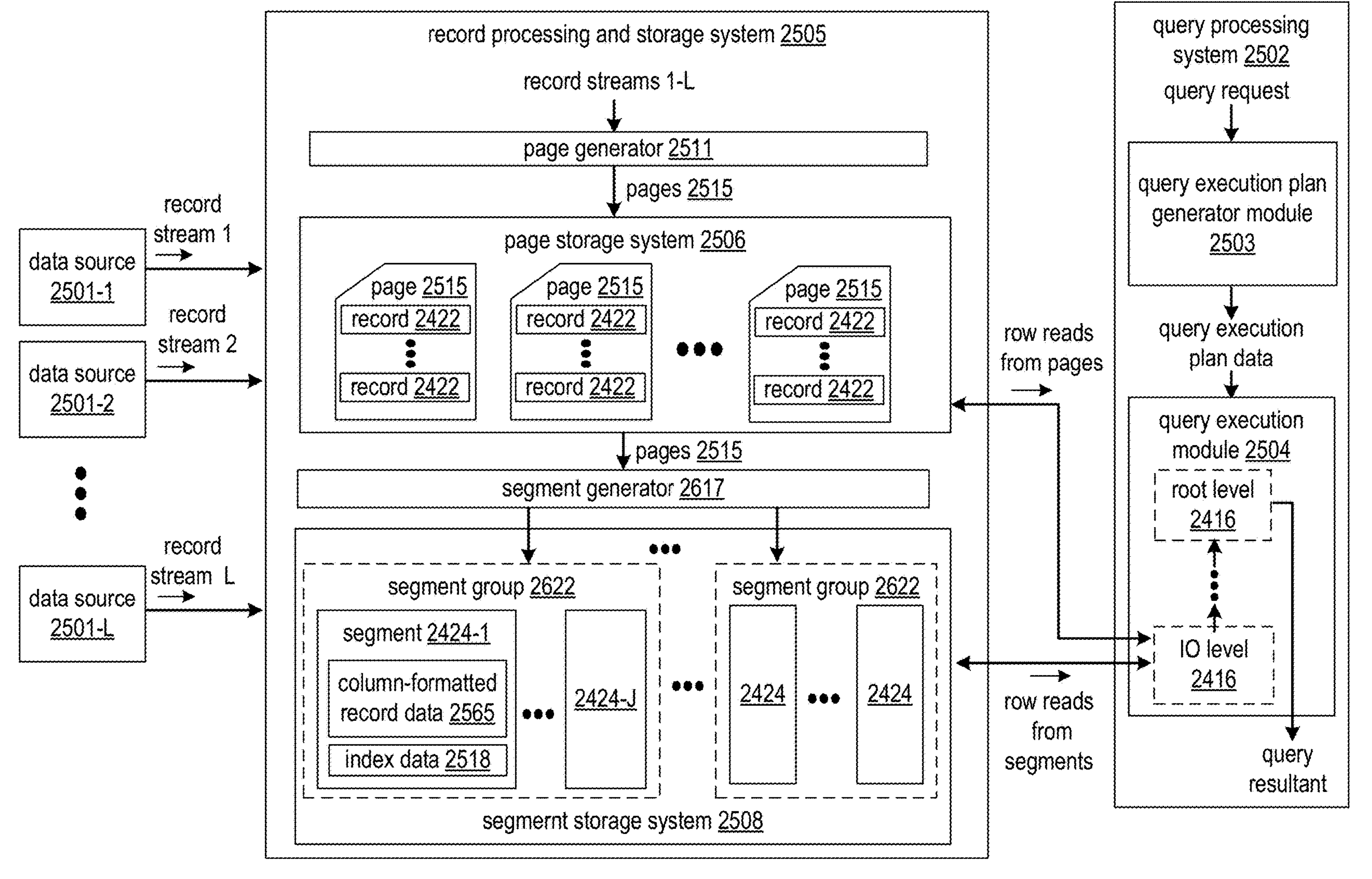
FIGS. 25A-25B are schematic block diagrams of embodiments of a database system that includes a record processing and storage system in accordance with various embodiments.
Figure 25B:
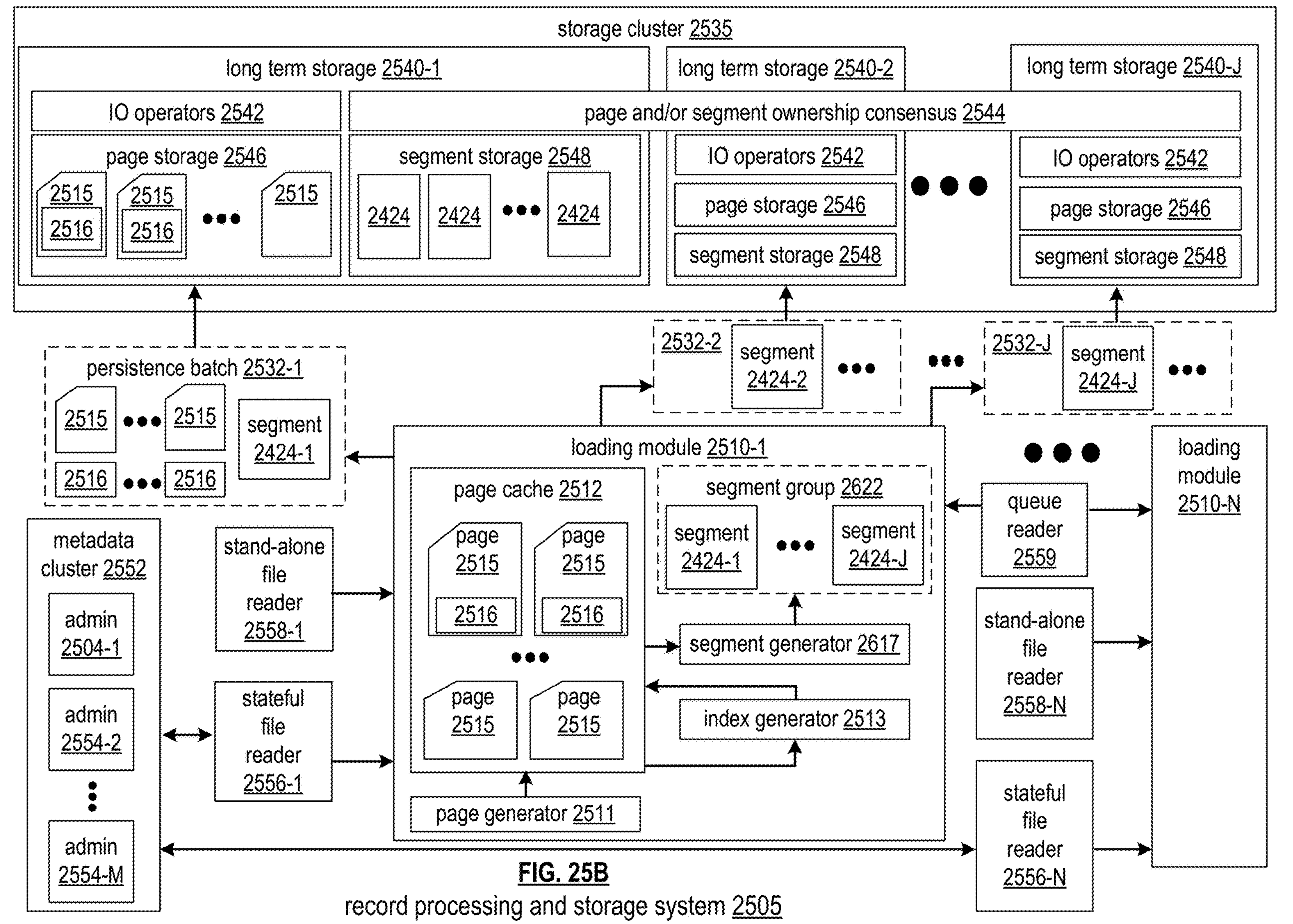
Figure 25C:
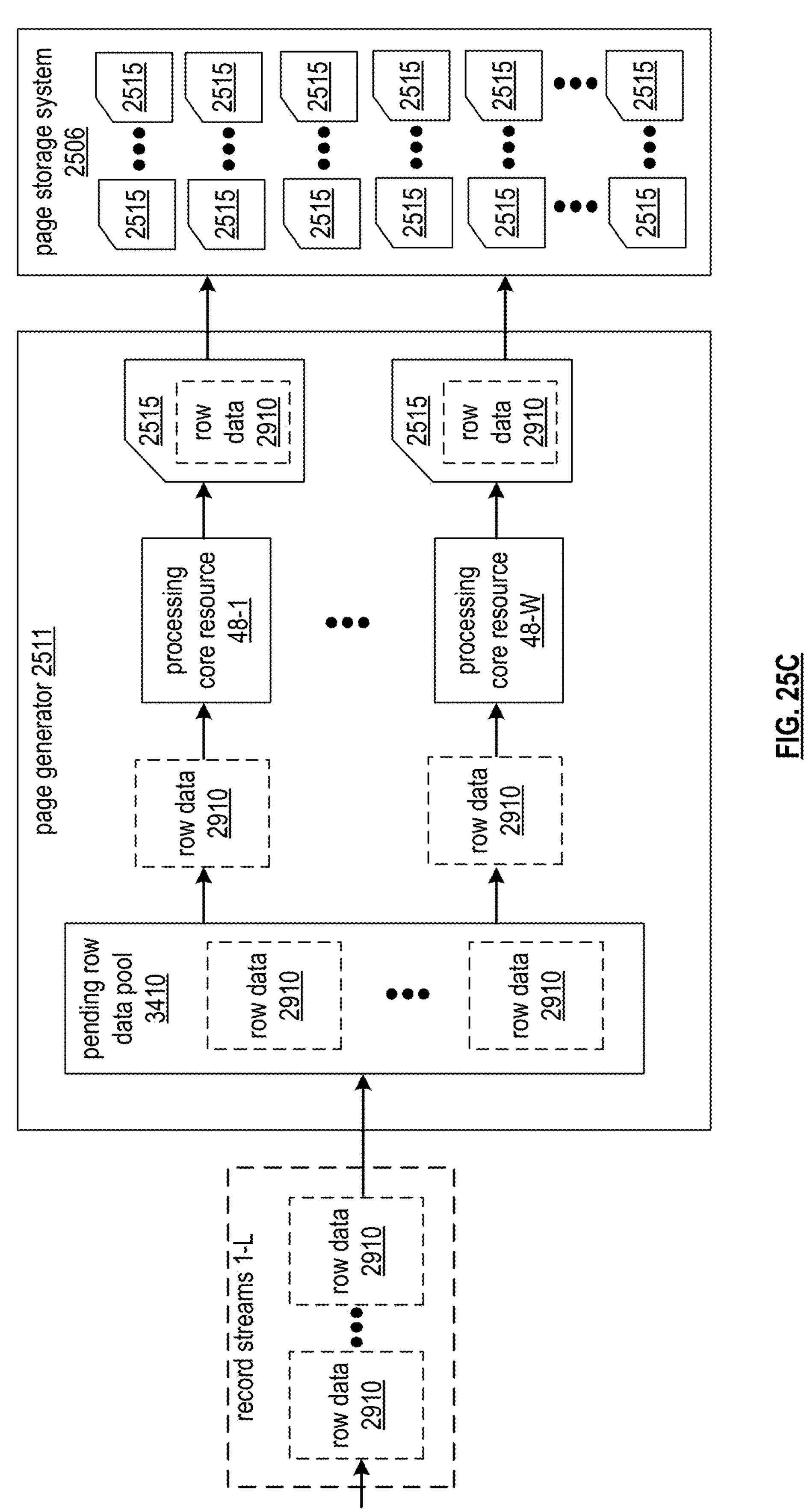
FIG. 25C is a is a schematic block diagrams of an embodiment of a page generator in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C can be utilized to implement the database system 10 of FIGS. 24A-24I when executing queries indicating join expressions. Some or all features and/or functionality of FIGS. 25A-25C can be utilized to implement any embodiment of the database system 10 described herein.

FIG. 25A illustrates an embodiment of a database system 10 that implements a record processing and storage system 2505. The record processing and storage system 2505 can be operable to generate and store the segments 2424 discussed previously by utilizing a segment generator 2617 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15. For example, the segment generator 2617 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 37 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments. As used herein, a cluster key can be implemented as any one or more columns, such as key columns(s) of FIG. 18, that are utilized to cluster records into segment groups for segment generation. As used herein, more favorable levels of clustering correspond to more rows with same or similar cluster keys being stored in the same segments, while less favorable levels of clustering correspond to less rows with same or similar cluster keys being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1-2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1-2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering, For example, greater numbers of records with common cluster keys are expected to be included in the total set of pages 2515 of the page storage system 2506 when the page storage system 2506 accumulates pages over longer periods of time to include a greater number of pages. In other words, delaying the grouping of rows into segments as long as possible increases the chances of having sufficient numbers of records with same and/or similar cluster keys to group together in segments. Determining when to generate segments such that the conversion from pages into segments is delayed as long as possible, and/or such that a sufficient amount of records are converted all at once to induce more favorable levels of cluster, is discussed in further detail in conjunction with FIGS. 26A-26D. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2617 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at IO level 2416 to a root node at root level 2412 to generate a query resultant. The nodes at IO level 2416 can perform row reads to read records 2422 from segments 2424 as discussed previously and as illustrated in FIG. 24C. The nodes at IO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at IO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an IO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4. The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2617 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2617, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2617, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalities at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data sources 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511; access to pages 2515 by the segment generator 2617; transfer of segments 2424 to the segment storage system 2508 once generated by the segment generator 2617; communication of query execution plan data to the query execution module 2504, such as the plurality of nodes 37 of the corresponding query execution plan 2405; reading of records by the query execution module 2504, such as IO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

The record processing and storage system 2505 and/or the query processing system 2502 of FIG. 25A, and/or any other embodiment of record processing and storage system 2505 and/or the query processing system 2502 described herein, can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the record processing and storage system 2505 and/or the query processing system 2502 can each be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the record processing and storage system 2505 and/or the query processing system 2502 at a massive scale.

Some or all functionality performed by the record processing and storage system 2505 and/or the query processing system 2502 as described herein cannot practically be performed by the human mind, particularly when the database system 10 is implemented to store and perform queries against records at a massive scale as discussed previously. In particular, the human mind is not equipped to perform record processing, record storage, and/or query execution for millions, billions, and/or trillions of records stored as many Terabytes, Petabytes, and/or Exabytes of data. Furthermore, the human mind is not equipped to distribute and perform record processing, record storage, and/or query execution as multiple independent processes, such as hundreds, thousands, and/or millions of independent processes, in parallel and/or within overlapping time spans.

Some or all features and/or functionality of FIG. 25A can be performed via at least one node 37 in conjunction with system metadata, applied across a plurality of nodes 37, for example, where at least one node 37 participates in some or all features and/or functionality of FIG. 25A based on receiving and storing the system metadata in local memory of the at least one node 37 as configuration data, and/or based on further accessing and/or executing this configuration data to implement some or all functionality of the record processing storage system and/or to implement some or all functionality of the query processing system as part of its database functionality accordingly. Performance of some or all features and/or functionality of FIG. 25A can optionally change and/or be updated over time, and/or a set of nodes participating in executing some or all features and/or functionality of FIG. 25A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of loading modules 2510-1-2510-N. Each loading module 2510 can be implemented via its own processing and/or memory resources. For example, each loading module 2510 can be implemented via its own computing device 18, via its own node 37, and/or via its own processing core resource 48. The plurality of loading modules 2510-1-2510-N can be implemented to perform some or all of the functionality of the record processing and storage system 2505 in a parallelized fashion.

The record processing and storage system 2505 can include queue reader 2559, a plurality of stateful file readers 2556-1-2556-N, and/or stand-alone file readers 2558-1-2558-N. For example, the queue reader 2559, a plurality of stateful file readers 2556-1-2556-N, and/or stand-alone file readers 2558-1-2558-N are utilized to enable each loading modules 2510 to receive one or more of the record streams 1-L received from the data sources 2501-1-2501-L as illustrated in FIG. 25A. For example, each loading module 2510 receives a distinct subset of the entire set of records received by the record processing and storage system 2505 at a given time.

Each loading module 2510 can receive records 2422 in one or more record streams via its own stateful file reader 2556 and/or stand-alone file reader 2558. Each loading module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given loading module 2510 is implemented via its own computing device 18 and/or node 37, the same computing device 18 and/or node 37 can optionally be utilized to implement the stateful file reader 2556, and/or each stand-alone file reader 2558 communicating with the given loading module 2510.

Each loading module 2510 can implement its own page generator 2511, its own index generator 2513, and/or its own segment generator 2617, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of loading modules 2510 as illustrated in FIG. 25B. Each page generator 2511 of FIG. 25B can process its own incoming records 2422 to generate its own corresponding pages 2515.

As pages 2515 are generated by the page generator 2511 of a loading module 2510, they can be stored in a page cache 2512. The page cache 2512 can be implemented utilizing memory resources of the loading module 2510, such as memory resources of the corresponding computing device 18. For example, the page cache 2512 of each loading module 2010-1-2010-N can individually or collectively implement some or all of the page storage system 2506 of FIG. 25A.

The segment generator 2617 of FIG. 25A can similarly be implemented as a plurality of segment generators 2617 of a corresponding plurality of loading modules 2510 as illustrated in FIG. 25B. Each segment generator 2617 of FIG. 25B can generate its own set of segments 2424-1-2424-J included in one or more segment groups 2622. The segment group 2622 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2617 of a loading module 2510 can access the page cache 2512 of the loading module 2510 to convert the pages 2515 previously generated by the page generator 2511 into segments. In some cases, each segment generator 2617 requires access to all pages 2515 generated by the segment generator 2617 since the last conversion process of pages into segments. The page cache 2512 can optionally store all pages generated by the page generator 2511 since the last conversion process, where the segment generator 2617 accesses all of these pages generated since the last conversion process to cluster records into groups and generate segments. For example, the page cache 2512 is implemented as a write-through cache to enable all previously generated pages since the last conversion process to be accessed by the segment generator 2617 once the conversion process commences.

In some cases, each loading module 2510 implements its segment generator 2617 upon only the set of pages 2515 that were generated by its own page generator 2511, accessible via its own page cache 2512. In such cases, the record grouping via clustering key to create segments with the same or similar cluster keys are separately performed by each segment generator 2617 independently without coordination, where this record grouping via clustering key is performed on N distinct sets of records stored in the N distinct sets of pages generated by the N distinct page generators 2511 of the N distinct loading modules 2510. In such cases, despite records never being shared between loading modules 2510 to further improve clustering, the level of clustering of the resulting segments generated independently by each loading module 2510 on its own data is sufficient, for example, due to the number of records in each loading module's 2510 set of pages 2515 for conversion being sufficiently large to attain favorable levels of clustering.

In such embodiments, each loading modules 2510 can independently initiate its own conversion process of pages 2515 into segments 2424 by waiting as long as possible based on its own resource utilization, such as memory availability of its page cache 2512. Different segment generators 2617 of the different loading modules 2510 can thus perform their own conversion of the corresponding set of pages 2515 into segments 2424 at different times, based on when each loading modules 2510 independently determines to initiate the conversion process, for example, based on each independently making the determination to generate segments as discussed in conjunction with FIG. 26A. Thus, as discussed herein, the conversion process of pages into segments can correspond to a single loading module 2510 converting all of its pages 2515 generated by its own page generator 2511 since its own last the conversion process into segments 2424, where different loading modules 2510 can initiate and execute this conversion process at different times and/or with different frequency.

In other cases, it is ideal for even more favorable levels of clustering to be attained via sharing of all pages for conversion across all loading modules 2510. In such cases, a collective decision to initiate the conversion process can be made across some or all loading modules 2510, for example, based on resource utilization across all loading modules 2510. The conversion process can include sharing of and/or access to all pages 2515 generated via the process, where each segment generator 2617 accesses records in some or all pages 2515 generated by and/or stored by some or all other loading modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple loading modules 2510. As discussed herein, the conversion process of pages into segments can optionally correspond to multiple loading modules 2510 converting all of their collectively generated pages 2515 since their last conversion process into segments 2424 via sharing of their generated pages 2515.

An index generator 2513 can optionally be implemented by some or all loading modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-x of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a loading module 2510 and can utilize its index generator 2513 to generate index data 2516 for a particular page 2515 in response to having query execution plan data indicating that records 2422 be read the particular page from the page cache 2512 of the loading module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each loading modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from loading modules 2510 to storage cluster 2535 and/or to facilitate sending of data from storage cluster 2535 to loading modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster 35-1-35-*z* of FIG. 6 can receive pages 2515, corresponding index data 2516, and/or segments 2424 from its own set of loading modules 2510-1-2510-N, where the record processing and storage system 2505 of FIG. 25B can include z sets of loading modules 2510-1-2510-N that each generate pages 2515, segments 2524, and/or index data 2516 for storage in its own corresponding storage cluster 35.

The processing and/or memory resources utilized to implement each long term storage 2540 can be distinct from the processing and/or memory resources utilized to implement the loading modules 2510. Alternatively, some loading modules can optionally share processing and/or memory resources long term storage 2540, for example, where a same computing device 18 and/or a same node 37 implements a particular long term storage 2540 and also implements a particular loading modules 2510.

Each loading module 2510 can generate and send the segments 2424 to long term storage 2540-1-2540-J in a set of persistence batches 2532-1-2532-J sent to the set of long term storage 2540-1-2540-J as illustrated in FIG. 25B. For example, upon generating a segment group 2522 of J segments 2424, a loading module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a loading module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2617. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a loading module 2510 maintains storage of pages 2515 via page cache 2512, even if they are sent to storage cluster 2535 in persistence batches 2532. This can enable the segment generator 2617 to efficiently read pages 2515 during the conversion process via reads from this local page cache 2512. This can be ideal in minimizing page movement, as pages do not need to be retrieved from long term storage 2540 for conversion into segments by loading modules 2510 and can instead be locally accessed via maintained storage in page cache 2512. Alternatively, a loading module 2510 removes pages 2515 from storage via page cache 2512 once they are determined to be successfully stored in long term storage 2540. This can be ideal in reducing the memory resources required by loading module 2510 to store pages, as only pages that are not yet durably stored in long term storage 2540 need be stored in page cache 2512.

Each long term storage 2540 can include its own page storage 2546 that stores received pages 2515 generated by and received from one or more loading modules 2010-1-2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more loading modules 2010-1-2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the loading module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a loading module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and/or segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and/or segment ownership consensus 2544 can include one or more versions of ownership data, for example, that is generated via execution of a consensus protocol mediated via the set of long term storage 2540-1-2540-J. The page and/or segment ownership consensus 2544 can dictate that every record is owned by exactly one long term storage 2540 via access to either a page 2515 storing the record or a segment 2424 storing the record, but not both. The page and/or segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and/or segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and/or segment ownership consensus 2544. For example, the long term storage 2540 can be solely responsible for durably storing the records utilized in query executions. In such embodiments, the cached and/or temporary storage of pages and/or segments of loading modules 2510, such as pages 2515 in page caches 2512, are not read for query executions via accesses to storage resources of loading modules 2510.

Some or all features and/or functionality of FIG. 25B can be performed via at least one node 37 in conjunction with system metadata applied across a plurality of nodes 37, for example, where at least one node 37 participates in some or all features and/or functionality of FIG. 25B based on receiving and storing the system metadata in local memory of the at least one node 37 as configuration data and/or based on further accessing and/or executing this configuration data to implement some or all functionality of a loading module 2510, to implement some or all functionality of a file reader, and/or to implement some or all functionality of the storage cluster 2535 as part of its database functionality accordingly. Performance of some or all features and/or functionality of FIG. 25B can optionally change and/or be updated over time, and/or a set of nodes participating in executing some or all features and/or functionality of FIG. 25B can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25C illustrates an example embodiment of a page generator 2511. The page generator 2511 of FIG. 25C can be utilized to implement the page generator 2511 of FIG. 25A, can be utilized to implement each page generator 2511 of each loading module 2510 of FIG. 25B, and/or can be utilized to implement any embodiments of page generator 2511 described herein.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can be transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream over time for processing by a loading module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each loading module 2510 can have its own pending row data pool 3410. Alternatively, multiple loading modules 2510 can access the same pending row data pool 3410 that stores all incoming row data 2910, for example, by utilizing queue reader 2559.

The page generator 2511 can facilitate parallelized page generation via a plurality of processing core resources 48-1-48-W. For example, each loading module 2510 has its own plurality of processing core resources 48-1-48-W, where the processing core resources 48-1-48-W of a given loading module 2510 is implemented via the set of processing core resources 48 of one or more nodes 37 utilized to implement the given loading module 2510. As another example, the plurality of processing core resources 48-1-48-W are each implemented by a corresponding one of the set of each loading module 2510-1-2510-N, for example, where each loading module 2510-1-2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received over time. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding loading module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Some or all features and/or functionality of FIG. 25C can be performed via at least one node 37 in conjunction with system metadata applied across a plurality of nodes 37, for example, where at least one node 37 participates in some or all features and/or functionality of FIG. 25C based on receiving and storing the system metadata in local memory of the at least one node 37 as configuration data and/or based on further accessing and/or executing this configuration data to implement some or all functionality of a loading module 2510, to implement some or all functionality of page generator 2511 and/or page storage system 2506 as part of its database functionality accordingly. Performance of some or all features and/or functionality of FIG. 25C can optionally change and/or be updated over time, and/or a set of nodes participating in executing some or all features and/or functionality of FIG. 25C can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 25D:
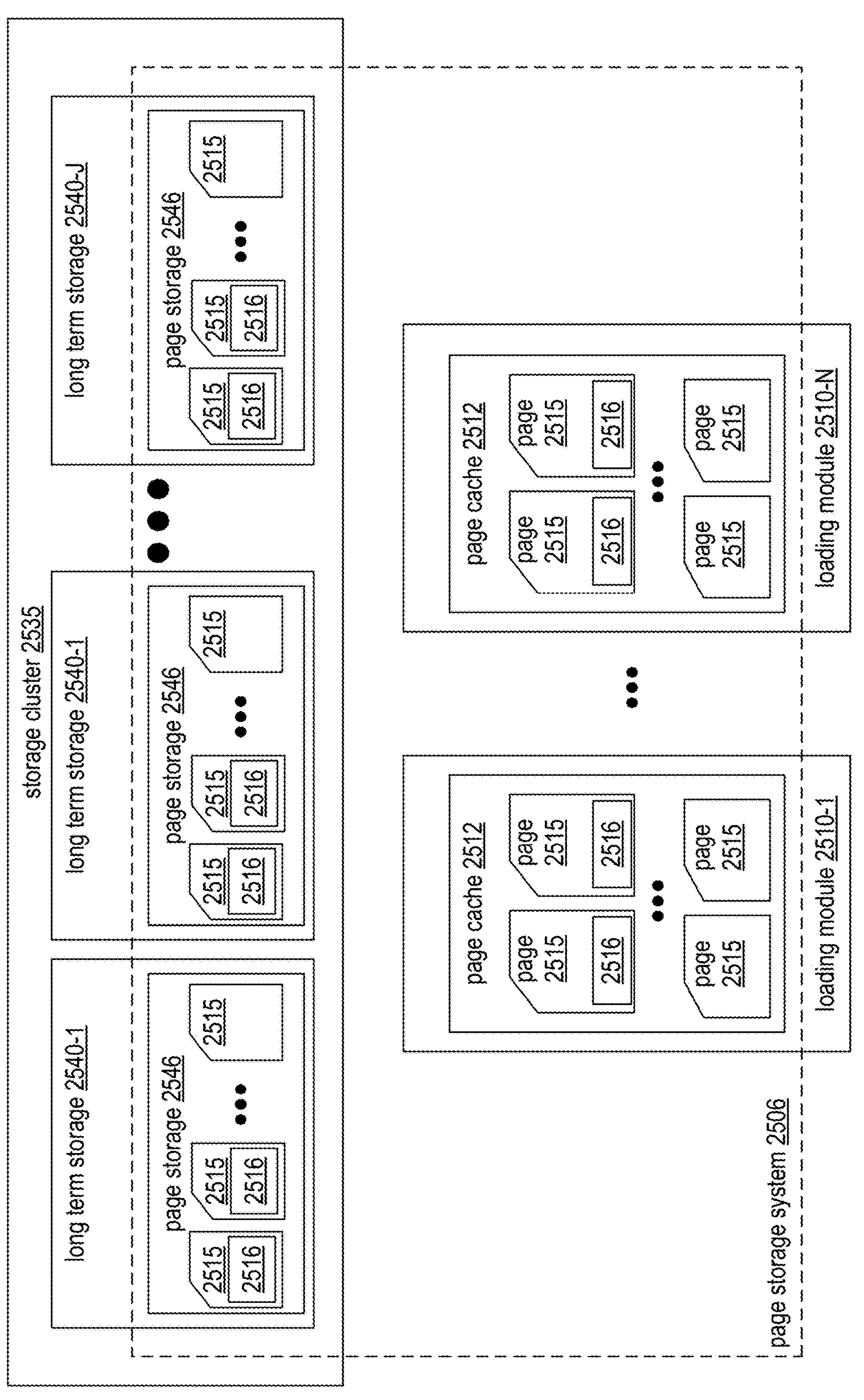
FIG. 25D is a schematic block diagrams of an embodiment of a page storage system of a record processing and storage system in accordance with various embodiments.

FIG. 25D illustrates an example embodiment of the page storage system 2506. As used herein, the page storage system 2506 can include page cache 2512 of a single loading module 2510; can include page caches 2512 of some or all loading module 2510-1-2510-N; can include page storage 2546 of a single long term storage 2540 of a storage cluster 2535; can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-*z*; and/or can include any other memory resources of database system 10 that are utilized to temporarily and/or durably store pages.

Some or all features and/or functionality of FIG. 25D can be performed via at least one node 37 in conjunction with system metadata applied across a plurality of nodes 37, for example, where at least one node 37 participates in some or all features and/or functionality of FIG. 25D based on receiving and storing the system metadata in local memory of the at least one node 37 as configuration data and/or based on further accessing and/or executing this configuration data to implement some or all functionality of a loading module 2510 and/or a given long term storage 2540 as part of its database functionality accordingly. Performance of some or all features and/or functionality of FIG. 25D can optionally change and/or be updated over time, and/or a set of nodes participating in executing some or all features and/or functionality of FIG. 25D can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the IO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425.

Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the IO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and/or segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Some or all features and/or functionality of FIG. 25E can be performed a given node 37 in conjunction with system metadata applied across a plurality of nodes 37, for example, where the given node 37 performs some or all features and/or functionality of FIG. 25E based on receiving and storing the system metadata in local memory of the at least one node 37 as configuration data, and/or based on further accessing and/or executing this configuration data to implement some or all functionality of the given node 37 of FIG. 25E as part of its database functionality accordingly. Performance of some or all features and/or functionality of FIG. 25E can optionally change and/or be updated over time based on the system metadata applied across the plurality of nodes 37 being updated over time and/or based on nodes on updating their configuration data stored in local memory to reflect changes in the system metadata based on receiving data indicating these changes to the system metadata.

In some embodiments, some or all features and/or functionality of loading new data (e.g. as new pages and/or new segments), for example, via one or more loading modules 2510 and/or via record processing and storage system 2505 as described herein implements some or all features and/or functionality of loading modules, record processing and storage system, and/or any loading of data for storage and access in query execution as disclosed by: U.S. Utility application Ser. No. 18/355,497, entitled "TRANSFER OF A SET OF SEGMENTS BETWEEN STORAGE CLUSTERS OF A DATABASE SYSTEM", filed Jul. 20, 2023; and/or U.S. Utility application Ser. No. 18/308,954, entitled "QUERY EXECUTION DURING STORAGE FORMATTING UPDATES", filed Apr. 28, 2023; which are hereby incorporated herein by reference in its entirety and made part of the present U.S. Utility patent application for all purposes.

FIGS. 26A-26H illustrate embodiments of a database system 10 that implements an energy utilization processing system 3500. The embodiments illustrated in 26A-26H can be utilized to implement one or more nodes 37 of one or more computing devices 18 implementing database system 10. Some or all features and/or functionality of FIGS. 26A-26H can be utilized to implement any embodiment of database system 10 described herein.

In some embodiments, database system 10 can be operable to perform various database operations based on generating and/or processing energy utilization data 3510. In particular, various energy utilization data 3510 can be generated and/or processed to characterize and/or improve energy utilization of database system 10.

The various computing devices 18 and/or corresponding computing device nodes 37, and/or processing core resources 48, memory drives 2425, disk memory 38, main memory 40, system communication resources 14, and/or any other hardware implementing some or all functionality of database system 10 are delivered power to enable their functionality. For example, the respective computing devices 18 are housed in one or more data centers to which power is supplied, for example, via an electrical grid and/or via one or more other power supply resources.

Implementing various functionality of database system 10 at a massive scale can induce large amounts of power consumption, which can be costly (e.g. in monetary payments to the data center and/or entity managing the electrical grid) and/or can be harmful to the environment (e.g. due to carbon emissions and/or other greenhouse gas (GHG) emissions required to generate the energy, for example, via the electrical grid, that is consumed by the database system 10 in performing various operations over time at the massive scale. It can therefore be advantageous to characterize energy consumption by the database system and/or to employ various strategies to reduce energy utilization in performing database operations.

FIGS. 26A-26H present embodiments of database system 10 that improve energy efficiency, for example, via an overall reduction in energy utilization and/or via increase in amount/scale of operations/storage/functionality that is performed per unit of energy utilization. Such improvements can be achieved via implementing some or all features and/or functionality of energy utilization processing system 3500 described herein, and/or via processing and/or generating any embodiment of energy utilization data 3510 described herein. Some or all features and/or functionality presented in FIGS. 26A-26H can improve the technology of database systems based on decreasing energy utilization and/or based on increasing energy efficiency, which can thus decrease monetary cost and/or environmental harm required to perform database functionality, which can be particularly substantial when the database system is implemented at a massive scale.

Figure 26A:
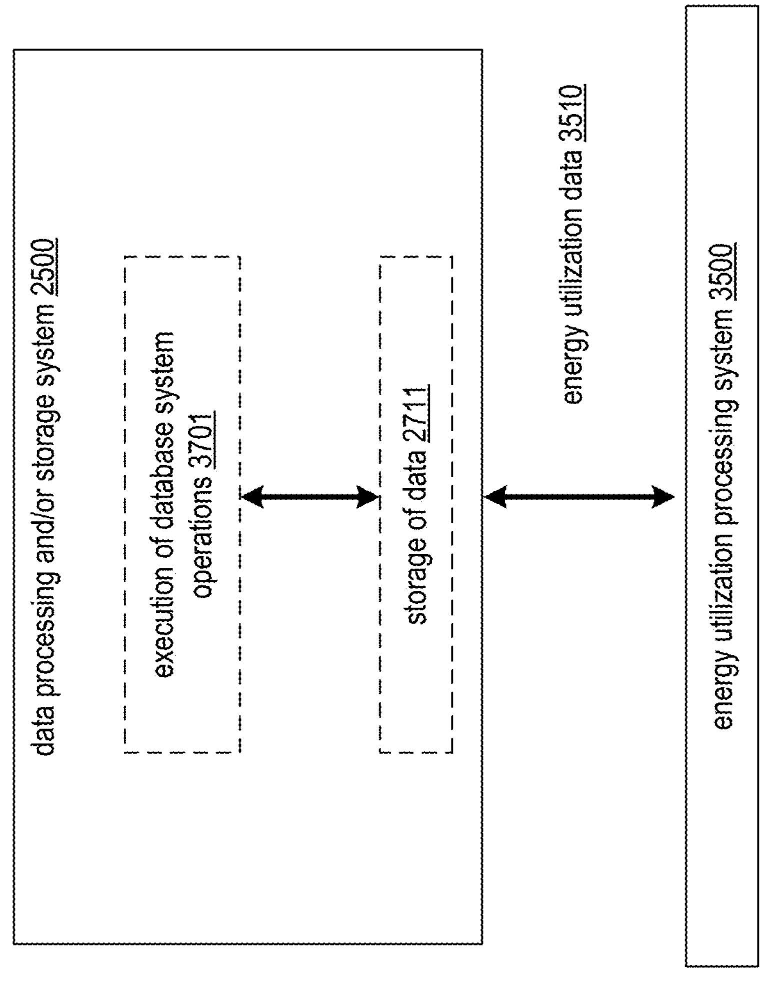
FIG. 26A is a schematic block diagram of a database system that includes a data processing and/or storage system and/or an energy utilization processing system in accordance with various embodiments.

FIG. 26A presents an embodiment of database system 10 that implements a data processing and/or storage system 2500 to facilitate storage of data 2711 and/or to facilitate execution of various database system operations 3701 to receive, generate, facilitate persistent storage of (e.g. long term storage of, and/or storage of data over some length of time while withstanding hardware outages via various migration and/or rebuilding as necessary), and/or access this stored data 2711. For example, the data processing and/or storage system 2500 implements any of the various functionality of database system 10 described herein, where execution of one or more database operations 3701 can implement any database functionality described herein and/or where data 2711 corresponds to any data (e.g. any records/rows/relational database tables/datasets) stored by database system 10. Some or all features and/or functionality of database system 10 of FIG. 26A can implement any embodiment of database system 10 described herein.

The database system 10 can further implement an energy utilization processing system 3500, which can generate, process, and/or communicate energy utilization data 3510. For example, the energy utilization processing system 3500 receives energy utilization data 3510 from data processing and/or storage system 2500 to characterize energy utilization consumed while executing one or more database system operations 3701 and/or while storing data 2711 persistently over time. As another example, the energy utilization processing system 3500 generates energy utilization data 3510 to configure how data processing and/or storage system 2500 executes one or more database system operations 3701 and/or to configure how data processing and/or storage system 2500 stores data 2711, for example, to improve energy efficiency in executing these database system operations 3701 and/or in storing data 2711.

Figure 26B:
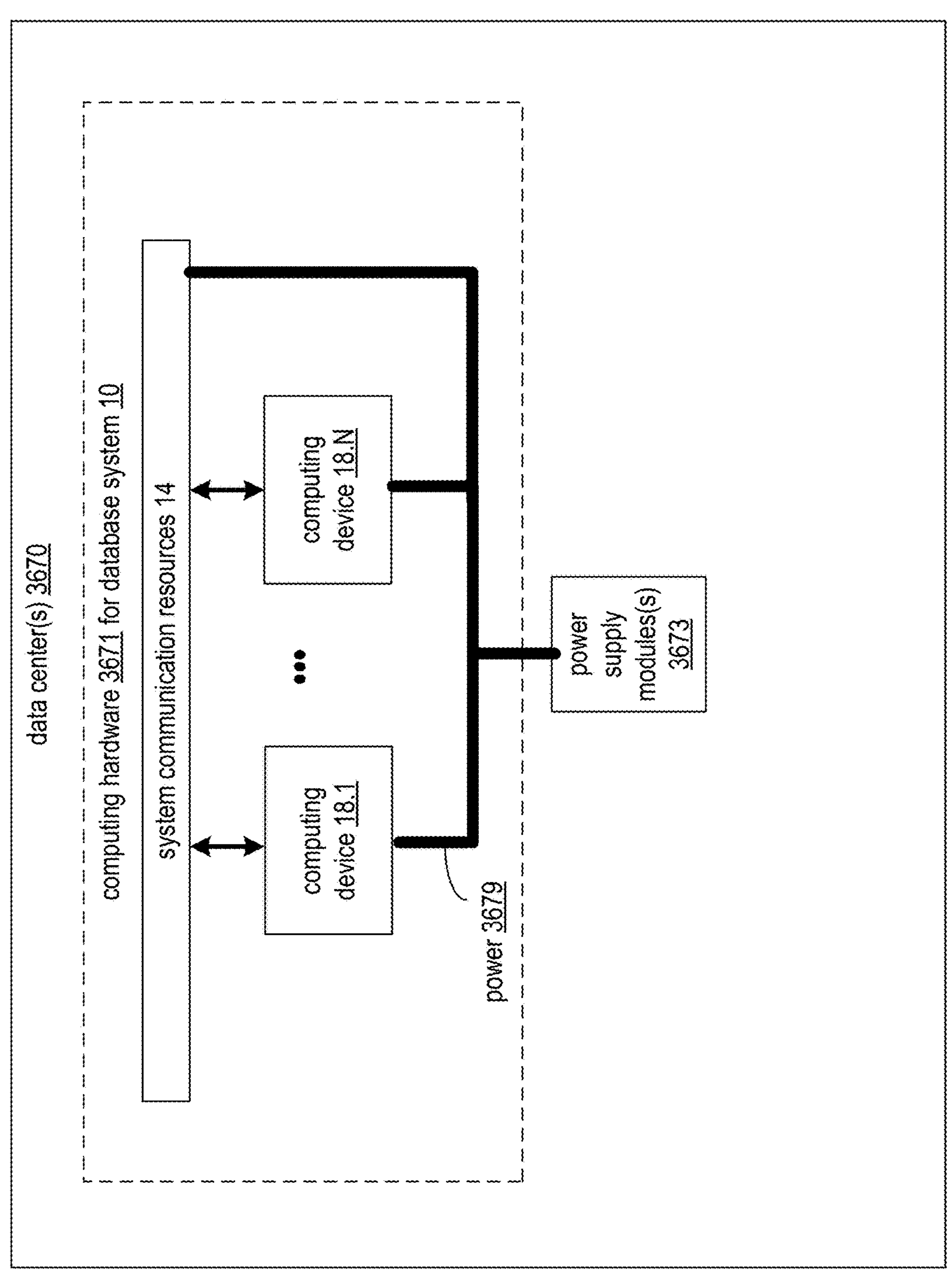
FIG. 26B is a schematic block diagram of a database system that includes a plurality of computing devices and at least one power supply module in accordance with various embodiments.

FIG. 26B presents an embodiment of database system 10 that is implemented via computing hardware 3671 housed in one or more data centers 3670. Some or all features and/or functionality of database system 10 of FIG. 26B can implement any embodiment of database system 10 described herein.

The one or more data centers 3670 can be physical facilities (e.g. buildings) housing the computing hardware 3671. For example, all data 2711 is stored and/or all operations 3701 are performed via hardware housed in these one or more data centers 3670. The one or more data centers are optionally located in a same geolocation (e.g. same physical address/same facility/same compound/same city). The one or more data centers are optionally located across different geolocations (e.g. multiple different physical addresses/multiple different facilities/multiple different compounds/multiple different cities).

The computing hardware 3671 can include a plurality of computing devices 18.1-18.N, which can implement some or all features and/or functionality of computing devices 18 described herein. The computing hardware 3671 can further include system communication resources 14, which can facilitate communication of data between computing devices 18. The system communication resources 14 can implement some or all features and/or functionality of system communication resources 14 described herein.

The energy utilization processing system 3500 and/or data processing and/or storage system 2500 of FIG. 26A can be implemented via one or more computing devices 18 of database system 10 housed in the one or more data centers. For example, execution of one or more database operations can be achieved via one or more computing devices 18. As a particular example, a set of computing device nodes 37 of one or more computing devices 18, and/or a set of processing core resources 48 of one or more computing devices 18 operate in parallel to execute respective portions of a given database operation 3701. As another example, a set of disk memories 38 and/or memory drives 2425 of the computing devices 18 and/or respective nodes 37 can store data (e.g. records of one or more relational database tables), where some database operations 3701 correspond to receiving, generating, rebuilding, and/or migrating the stored data and/or where some database operations correspond to accessing the stored data (e.g. in conjunction with executing queries).

The computing hardware 3671 can alternatively or additionally include any other computing hardware (e.g. information technology (IT) hardware), for example, to implement drive resources, main memory resources, processing resources, and/or network resources of the database system 10, and/or can include any other hardware utilized to enable database system 10 to perform its respective functionality. The computing hardware 3671 can include any storage devices, servers, network equipment, server racks, routers, switches, firewalls, cables, modems, cooling systems, control systems, generators, power sources, etc. The computing hardware can optionally include any computing hardware housed in and/or implemented by a corresponding data center 3670.

Such execution of operations 3701 can rely on delivery of power 3679, supplied by one or more power supply modules 3673, to the computing devices 18, system communication resources 14, and/or other hardware of computing hardware 3671. The power supply modules 3673 can be implemented via any generators, batteries, and/or power distribution systems of database system 10. The power supply modules 3673 can be implemented via one or more power distribution units (PDUs), one or more remote power panels (RPPs), load transducers, uninterruptable power supply units (UPSs), and/or other power control systems. The power supply modules 3673 can otherwise deliver power to the various computing hardware 3671. The power supply modules 3673 can be implemented via additional computing hardware 3671 (e.g. corresponding power control systems, generators, batteries, cabling, etc.).

Some or all power 3679 can correspond to grid-based power delivered via a utility grid (e.g. electrical grid) to which the data center is connected and/or powered by. Some or all power 3679 can correspond to onsite power generated at the data center (e.g. generated via an onsite generator of the datacenter). Some or all power 3679 can correspond to battery power delivered via one or more chemical batteries and/or other batteries powering the computing hardware 3671. Some or all power 3679 can correspond to power delivered via one or more super conductors powering the computing hardware 3671. Some or all power 3679 can correspond to natural gas-based energy and/or steam-based energy. Some or all power 3679 can correspond to renewable energy (e.g. solar, wind, hydroelectric, hydrogen, ocean, geothermal, biomass, etc.). Some or all power 3679 can correspond to nuclear power generated via a nuclear power plant. Some or all power 3679 can correspond to electrical power that was generated via a power plant emitting carbon dioxide and/or other greenhouse gases.

The computing hardware 3671 can thus require being powered via power 3679 to operate and perform respective database operations 3701. Execution of various database operations 3701 by various computing devices 18 and/or other computing hardware 3671 can thus render corresponding energy utilization by database system 10. For example, the energy utilization by database system 10 when executing database operations 3701 is greater than when not executing any database operations 3701 (e.g. a given computing device 18 consumes more energy when executing an operation than when idle/unpowered). The energy utilization by database system 10 can be greater when executing a greater number of operations (e.g. in parallel or otherwise within a time frame) and/or when executing more complex/larger operations (e.g. requiring more data be read/written/communicated and/or requiring data be read/written/communicated at a higher rate) than when executing a lesser number of operations and/or less complex/smaller operations (e.g. the database system consumes more energy when more computing devices 18 are used to execute operations, and/or a given computing device 18 consumes more power when executing greater numbers/complexity of operations).

As another example, the energy utilization by database system 10 when storing data 2711 is greater than when not storing any data 2711 (e.g. a given computing device 18 consumes more energy when storing data than when idle/unpowered). The energy utilization by database system 10 can be greater when storing a greater amount of data (e.g. the database system consumes more energy when more computing devices 18 are used to store data, and/or a given computing device 18 consumes more power when storing a greater amount of data).

As used herein, energy utilization (e.g. indicated in, utilized to generate, and/or derived based on any energy utilization data 3510 described herein) can correspond to, be computed, measured, and/or estimated as, and/or be otherwise based on one or more energy utilization-based metrics such as: amount of energy (e.g. expressed in kilowatt-hours or other measure of energy) consumed via consumption of power 3679 over at least one time period; amount of power consumed from the at least one corresponding power supply (e.g. expressed in kilowatts or other measure of power), such as average power or peak power induced over the at least one time period; monetary cost (e.g. expressed in dollars or other currency, and/or expressed in carbon credits and/or carbon offsets) of power consumed over at least one time period; amount of carbon emissions (e.g. carbon dioxide released into the atmosphere, expressed by weight such as kilograms or tons of $CO_2$) induced over the at least one time period; amount of greenhouse gases (GHGs) (e.g. some or all warming gases released into the atmosphere, such as carbon dioxide, methane, nitrous oxide, chlorofluorocarbon CFC-11, sulpherihexafluoride, and/or other warming gases, for example, measured by weight, such as kilograms or tons of $CO_2e$ and or expressed based on global warming potential); emissions factor, carbon intensity, conversion factor, and/or emissions intensity for activities performed by the database system, such as particular functions performed by the database system; grid utilization factor (e.g. amount/proportion of time electrical grid-based power and/or power generated onsite is used, for example, versus other power supply); performance per kilowatt-hour and/or other efficiency measure (e.g. measuring unit of activity executed by the database system performed per kilowatt hour, such as amount, speed, and/or rate of rows and/or bytes processed, read, written, stored, and/or transmitted per kilowatt-hour or other energy unit); storage capacity per kilowatt-hour (e.g. measuring unit of storage, such as amount of rows and/or bytes stored via drive resources or other memory resources per kilowatt-hour or other unit of energy); database and/or data center infrastructure efficiency (e.g. based on total energy consumption by computing devices and/or other hardware of the database system); database and/or data center performance efficiency (e.g. based on efficiency measured in kWh and/or a corresponding unit of work/power); database and/or data center power density (e.g. based on rack power consumption as a function of rack capacity); energy reuse effectiveness and/or energy reuse factor (e.g. based on reused energy of total energy); fixed to variable energy ratio (e.g. indicating how energy is effectively decreased); green energy coefficient (e.g. based on renewable energy being utilized); equipment energy efficiency (e.g. rated and/or estimated efficiency of all computing devices/memory/hardware/IT equipment of the database system and/or data center); operational energy consumption (e.g. energy consumed by all equipment/hardware, for example, if idle); power usage effectiveness (e.g. ratio of total energy consumption vs. energy consumed by all equipment/hardware); renewable energy factor (e.g. measuring renewable energy vs. total energy consumption); space, wattage, and/or performance (e.g. measuring hardware efficiency within constraints of available energy and power of corresponding data center); stranded power capacity per rack (e.g. indicating physical space available for additional equipment in the data center); technology carbon emissions (e.g. indicating total carbon emissions); peak temperature/average temperature/other metrics relating to how much/how often heat is released by respective hardware; rate/amount/cost/length of time of cooling required to cool the respective hardware (e.g. based on how much/how often heat is released); and/or any other metrics relating to energy utilization.

In some embodiments, energy utilization can be particular to different hardware components of the database system 10 that separately consume power and thus induce corresponding energy utilization. Thus, any energy utilization described herein can be divided into and/or expressed separately for different categories of such hardware. In particular, the one or more energy utilization-based metrics expressing any energy utilization described herein can be indicated for a set of energy utilization categories, which can include: drive-based energy utilization; processor-based energy utilization; memory-based energy utilization; network-based energy utilization; and/or other categories of energy utilization.

For example, in performing various database functionality, drive-based energy utilization can be induced by storage resources of the database system 10 (e.g. resources storing data 2711, such as disk memory 38, storage drives 2424, database storage 2450, external memory, solid state drives, hard disk drives, magnetic tape memory, and/or long term/persistent memory resources utilized for storage of data 2711). As another example, in performing various database functionality, processor-based energy utilization can be induced by processing resources of the database system 10 (e.g. processors on computing devices 18 and/or nodes 37, such as processing core resources 48, central processing units (CPUs), microprocessors, multi-core processors, integrated circuits, processing modules, and/or other processing resources implemented to generate and/or process data). As another example, in performing various database functionality, memory-based energy utilization can be induced by memory resources (e.g. non-drive/non-long term storage memory resources) of the database system 10 (e.g. resources used to store intermediate/temporary data/computing instructions in conjunction with performing database operations, such as main memory 40, random access memory (RAM), dynamic random access memory (DRAM), static ram (SRAM), cache memory, heap memory, huge page memory, memory modules, and/or CPU registers; for example DRAM requires refreshing via power, where use of DRAM memory for various operations can thus impact energy utilization due to power consumed for this refresh); As another example, in performing various database functionality, network-based energy utilization can be induced by network resources and/or chassis resources (e.g. system communication resources 14, inter-node communication resources, for example, implementing shuffle networks 2480 used by shuffle node sets 2485 (e.g. in performing operations such as join operations requiring communication of data between nodes), implementing transfer of data between nodes and/or storage clusters (e.g. in conjunction with migrating data 2711 between nodes/storage clusters and/or in conjunction with retrieving parity data to rebuild data structures of data 2711 from other data structures of data 2711), network hardware such as switches and routers, etc.).

In some embodiments, the energy utilization of the database system (and/or categorized utilization by different hardware types) can be particular to and/or a function of database operations being performed at a particular time, where the energy utilization is thus a function of software-based functionality of the database system, rather than simply being a function of the hardware, for example, of a corresponding one or more data centers housing the database system 10. For example, as used herein, energy utilization at a given time optionally corresponds to only a portion of total energy utilization by the one or more data centers induced by performing various database functionality (e.g. versus other energy utilization required regardless of what jobs are being performed by the database system at a given time), such as executing a particular database operation 3701 and/or storing particular data 2711.

In particular, it can be advantageous to characterize, configure, and/or reduce the energy utilization induced by performing a particular database operation 3701 (e.g. a particular task, job, sub-operation for a particular task or job, and/or other operation executed in conjunction with performing any functionality of database system 10 that thus induces power consumption to be performed). Alternatively or in addition, it can be advantageous to characterize, configure, and/or reduce the energy utilization induced by storing particular data 2711 (e.g. data under a particular schema/formatting; particular data type; particular row(s)/record(s); particular relational database table; particular dataset; particular type of compression, secondary indexing, and/or redundancy storage scheme applied; and/or other data stored in conjunction with performing any functionality of database system 10 that thus induces power consumption to be stored).

As used herein, energy efficiency (e.g. indicated in, utilized to generate, and/or derived based on any energy utilization data 3510 described herein) can denote to how favorable energy utilization is, for example, during a given period of time and/or for performing a given database functionality. For example, performing a given database operation with higher, improved, and/or otherwise more favorable energy efficiency can correspond to reducing/rendering more favorably energy utilization, for example, as defined by one or more energy utilization-based metrics (e.g. reducing overall energy consumed, reducing peak power, reducing carbon emissions, etc.). One or more energy efficiency-based metrics can be included in the one or more energy utilization-based metrics.

For example, a second strategy for performing given database functionality can be considered more energy efficient than a first strategy for performing the given database functionality based on reading, writing, receiving, generating, processing, and/or persistently storing a given amount of data under the second strategy requires less energy utilization (e.g. as defined by one or more energy utilization-based metrics) than reading, writing, receiving, generating, processing, and/or persistently storing the given amount of data under the first strategy.

As another example, a second strategy for performing given database functionality can be considered more energy efficient than a first strategy for performing the given database functionality based on reading, writing, receiving, generating, and/or processing a given amount of data under the second strategy at a given rate requires less energy utilization (e.g. as defined by one or more energy utilization-based metrics) than reading, writing, receiving, generating, and/or processing the given amount of data under the first strategy at the given rate.

As another example, a second strategy for performing given database functionality can be considered more energy efficient than a first strategy for performing the given database functionality based on performing of the given database functionality under the second strategy within a given time frame, at a given rate, at a given cost, and/or at a given reliability, requiring less energy utilization (e.g. as defined by one or more energy utilization-based metrics) than performing of the given database functionality under the second strategy within the given time frame.

As another example, a second strategy for performing given database functionality (e.g. performing one or more database operations 3701, storing given data 2711 persistently, and/or reading, writing, receiving, generating, transmitting, and/or processing given data) can be considered more energy efficient than a first strategy for performing the given database functionality when a given amount of energy utilization (e.g. as defined by one or more energy utilization-based metrics) renders the ability to read, write, receive, generate, process, and/or persistently store a greater amount of data in performing the given database functionality under the second strategy than under the first strategy.

As another example, a second strategy for performing given database functionality can be considered more energy efficient than a first strategy for performing the given database functionality when a given amount of energy utilization (e.g. as defined by one or more energy utilization-based metrics) renders the ability to read, write, receive, generate, transmit, process, and/or persistently store a given amount of data more quickly in performing the given database functionality under the second strategy than under the first strategy.

As another example, a second strategy for performing given database functionality can be considered more energy efficient than a first strategy for performing the given database functionality when a given amount of energy utilization (e.g. as defined by one or more energy utilization-based metrics) renders the ability to read, write, receive, generate, transmit, process, and/or persistently store a given amount of data more reliably in performing the given database functionality under the second strategy than under the first strategy.

As another example, a second strategy for performing given database functionality can be considered more energy efficient than a first strategy for performing the given database functionality when a given amount of energy utilization (e.g. as defined by one or more energy utilization-based metrics) renders the ability to read, write, receive, generate, transmit, process, and/or persistently store a given amount of data more cost-effectively (e.g. via more favorable energy utilization-based pricing) in performing the given database functionality under the second strategy than under the first strategy.

As another example, a second strategy for performing a given database operation 3701 can be more energy efficient than a first strategy for performing the given database operation 3701 based on the second strategy for performing the given database operation rendering lower/more favorable energy utilization (e.g. as defined by one or more energy utilization-based metrics) than the first strategy.

As another example, a second strategy for storing given data 2711 can be more energy efficient than a first strategy for storing the given data 2711 based on the second strategy for storing the given data rendering lower/more favorable energy utilization (e.g. as defined by one or more energy utilization-based metrics) than the first strategy.

As another example, second hardware can be more energy efficient than first hardware based on the second hardware being capable of reading, writing, receiving, generating, transmitting, processing, and/or persistently storing, via a given amount of energy utilization, a greater amount data, a given amount of data at a higher rate, a given amount of data more reliably, and/or a given amount of data more cost-effectively than the first hardware via the given amount of energy utilization.

As another example, second hardware can be more energy efficient than first hardware based on the second hardware being capable of reading, writing, receiving, generating, transmitting, processing, and/or persistently storing a given amount data via less energy utilization than the first hardware.

As another example, second hardware can be more energy efficient than first hardware based on the second hardware being capable of reading, writing, receiving, generating, transmitting, processing, and/or persistently storing the given amount of data within a given time frame, at a given rate, at a given cost, and/or at a given reliability than the first hardware.

As another example, a second mode of operation of the database system as a whole can be more energy efficient than a first mode of operation of the database system as a whole based on operation of the system under the second mode rendering lower/more favorable energy utilization for the database system as a whole (e.g. over a given period of time and/or in performing a given set of functionality) than the first mode.

Figure 26C:
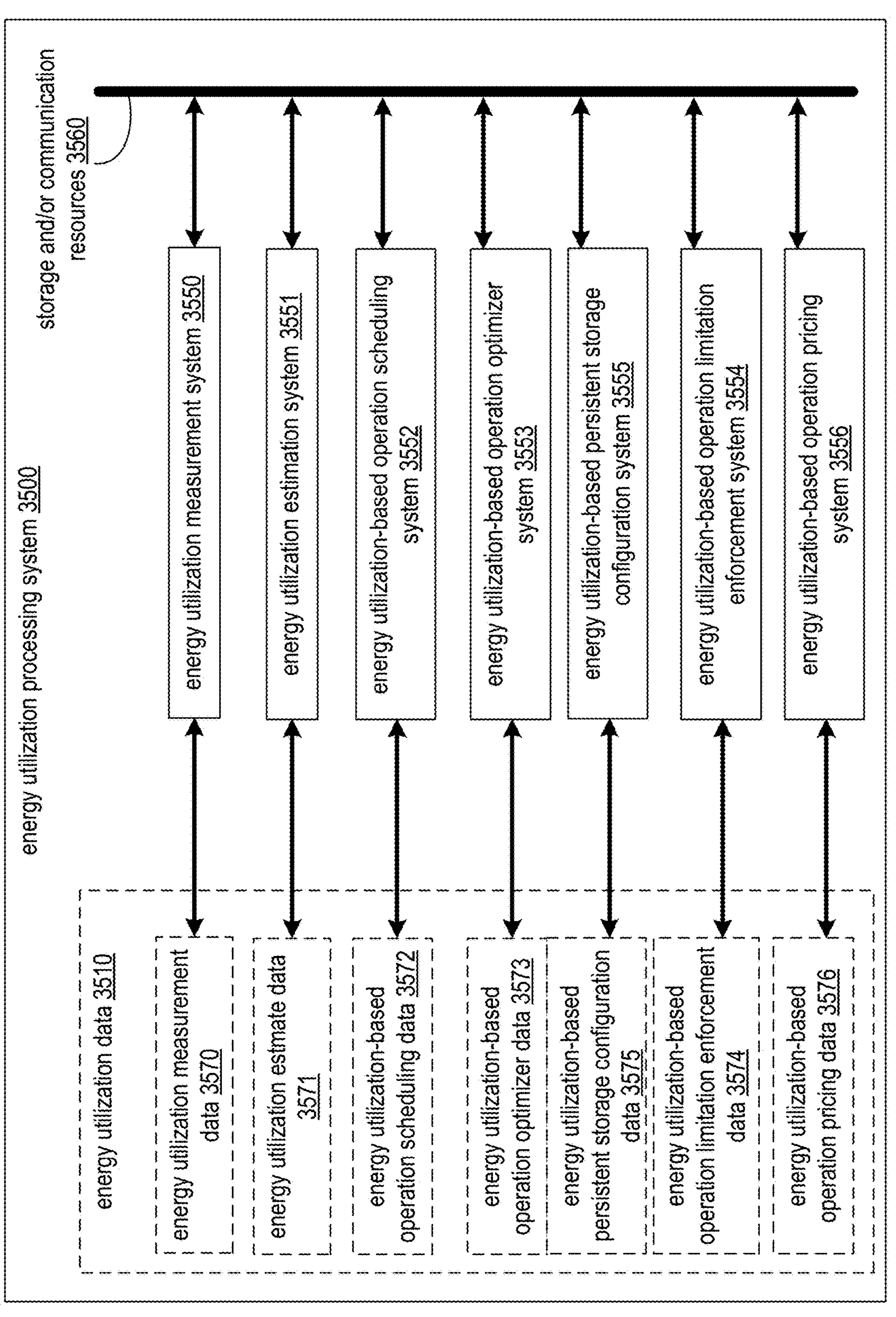
FIG. 26C is a schematic block diagram of an energy utilization processing system that includes a plurality of systems in accordance with various embodiments.

FIG. 26C illustrates an embodiment of energy utilization processing system 3500. Some or all features and/or functionality of energy utilization processing system 3500 of FIG. 26C can implement any embodiment of energy utilization processing system 3500 and/or database system 10 described herein.

The energy utilization processing system 3500 can implement a plurality of systems that includes systems 3550-3556, operable to perform various functionality of the energy utilization processing system 3500. The various systems 3550-3556 can be implemented separately or in tandem, via shared and/or distinct computing resources (e.g. same or different computing devices 18 and/or same or different processing and/or memory resources). The various systems 3550-3556 can optionally communicate shared data with each other via storage and/or communication resources 3560.

The energy utilization processing system 3500 can implement an energy utilization measurement system 3550 operable to generate and/or process energy utilization measurement data 3570, for example, relating to characterizing of how much energy utilization was used at a given time and/or how much energy utilization was used to perform particular database functionality. The energy utilization measurement system 3550 can be operable to implement some or all features and/or functionality discussed in conjunction with FIGS. 27A-27L.

The energy utilization processing system 3500 can alternatively or additionally implement an energy utilization estimation system 3551 operable to generate and/or process energy utilization estimate data 3571, for example, relating to estimating of how much energy utilization will be used at a given future time and/or how much energy utilization will be used to perform particular upcoming database functionality. The energy utilization estimation system 3551 can be operable to implement some or all features and/or functionality discussed in conjunction with FIGS. 28A-28Q and/or 33A-33D.

The energy utilization processing system 3500 can alternatively or additionally implement an energy utilization-based operation scheduling system 3552 operable to generate and/or process energy utilization-based operation scheduling data 3572, for example, relating to scheduling of database operations at particular times, for example, to reduce peak power and/or otherwise improve energy efficiency of the database operations and/or database system as a whole. The energy utilization-based operation scheduling system 3552 can be operable to implement some or all features and/or functionality discussed in conjunction with FIGS. 29A-29S.

In some embodiments, some or all features and/or functionality of energy utilization-based operation scheduling system 3552 and/or some or all features and/or functionality of executing operations via scheduling of their execution described herein implements some or all features and/or functionality of query scheduling (e.g. via query scheduling module 4215, query scheduling module 2815, and/or query selection module 2950) concurrently executing queries in accordance with assigned query priority, setting/updating query priority of queries (e.g. as priority values 2942), and/or workload management as disclosed by: U.S. Utility application Ser. No. 18/482,939, entitled "PERFORMING SHUTDOWN OF A NODE IN A DATABASE SYSTEM", filed Oct. 9, 2023, which is hereby incorporated herein by reference in its entirety and made part of the present U.S. Utility patent application for all purposes; and/or U.S. Utility application Ser. No. 18/226,525, entitled "SWITCHING MODES OF OPERATION OF A ROW DISPERSAL OPERATION DURING QUERY EXECUTION", filed Jul. 26, 2023, which is hereby incorporated herein by reference in its entirety and made part of the present U.S. Utility patent application for all purposes; and/or U.S. Utility application Ser. No. 16/720,481, entitled "SELECTING A NORMALIZED FORM FOR CONVERSION OF A QUERY EXPRESSION", filed Dec. 19, 2019, which is hereby incorporated herein by reference in its entirety and made part of the present U.S. Utility patent application for all purposes.

The energy utilization processing system 3500 can alternatively or additionally implement an energy utilization-based operation optimizing system 3553 operable to generate and/or process energy utilization-based operation optimizer data 3573, for example, relating to optimizing of database operations, for example, to improve energy efficiency of performing the database operations. The energy utilization-based operation optimizing system 3553 can be operable to implement some or all features and/or functionality discussed in conjunction with FIGS. 29A-33J and/or FIGS. 32A-32G.

In some embodiments, some or all features and/or functionality of energy utilization-based operation optimizing system 3553 and/or some or all features and/or functionality of executing operations via optimizing these operations (e.g. via optimizing of respective operator execution flows of operators as described herein and/or optimizing of IO pipelines described herein) implements some or all features and/or functionality of query optimization (e.g. via any embodiment of flow optimizer module 4914 and/or query processing module 2502), for example, as disclosed by: U.S. Utility application Ser. No. 18/634,450, entitled "EXECUTING MULTI-CHILD OPERATORS DURING QUERY EXECUTION VIA APPLYING A PIECEWISE SCHEDULING STRATEGY", filed Apr. 12, 2024, which is hereby incorporated herein by reference in its entirety and made part of the present U.S. Utility patent application for all purposes; U.S. Utility application Ser. No. 18/620,268, entitled "QUERY EXECUTION VIA UPWARDS AND DOWNWARDS FLOW OF OPERATOR OUTPUT ACROSS MULTIPLE LEVELS OF A QUERY EXECUTION PLAN", filed Mar. 28, 2024, which is hereby incorporated herein by reference in its entirety and made part of the present U.S. Utility patent application for all purposes; U.S. Utility application Ser. No. 18/226,525, entitled "SWITCHING MODES OF OPERATION OF A ROW DISPERSAL OPERATION DURING QUERY EXECUTION", filed Jul. 26, 2023, which is hereby incorporated herein by reference in its entirety and made part of the present U.S. Utility patent application for all purposes; U.S. Utility application Ser. No. 18/309,897, entitled "OPTIMIZING AN OPERATOR FLOW FOR PERFORMING FILTERING BASED ON NEW COLUMNS VALUES VIA A DATABASE SYSTEM", filed May 1, 2023, which is hereby incorporated herein by reference in its entirety and made part of the present U.S. Utility patent application for all purposes; U.S. Utility application Ser. No. 18/310,177, entitled "OPTIMIZING AN OPERATOR FLOW FOR PERFORMING AGGREGATION VIA A DATABASE SYSTEM", filed May 1, 2023, which is hereby incorporated herein by reference in its entirety and made part of the present U.S. Utility patent application for all purposes; U.S. Utility application Ser. No. 18/494,230, entitled "GENERATING EXECUTION TRACKING ROWS DURING QUERY EXECUTION VIA A DATABASE SYSTEM", filed Oct. 25, 2023, which is hereby incorporated herein by reference in its entirety and made part of the present U.S. Utility patent application for all purposes; and/or U.S. Utility application Ser. No. 18/326,305, entitled "HANDLING NULL VALUES IN PROCESSING JOIN OPERATIONS DURING QUERY EXECUTION", filed May 31, 2023, which is hereby incorporated herein by reference in its entirety and made part of the present U.S. Utility patent application for all purposes.

The energy utilization processing system 3500 can alternatively or additionally implement an energy utilization-based persistent storage configuration system 3555 operable to generate and/or process energy utilization-based persistent storage configuration data 3575, for example, relating to configuring of how data 2711 is persistently stored, such as formatting and/or schemes for if/how the data 2711 is compressed, indexed, and/or redundantly stored. The energy utilization-based persistent storage configuration system 3555 can be operable to implement some or all features and/or functionality discussed in conjunction with FIGS. 31A-31G.

The energy utilization processing system 3500 can alternatively or additionally implement an energy utilization-based operation limitation enforcement system 3554 operable to generate and/or process energy utilization-based operation limitation enforcement data 3574, for example, relating to allowing or disallowing operations based on whether they meet restrictions imposed by a power usage policy. The energy utilization-based operation limitation enforcement system 3554 can be operable to implement some or all features and/or functionality discussed in conjunction with FIGS. 30A-30I.

In some embodiments, some or all features and/or functionality of energy utilization-based operation limitation enforcement system 3554 and/or some or all features and/or functionality associated with enforcing operation requirement data and/or determining whether or not database operations are allowed as described herein implements some or all features and/or functionality of or functionality of limits imposed via service classes, imposing limitations on queries (e.g. via rulesets enforced via compliance modules), and/or imposing limits based on query attributes such as user entity, a table being accessed, and/or a query function being performed as disclosed by: U.S. Utility application Ser. No. 16/668,402, entitled "ENFORCEMENT OF SETS OF QUERY RULES FOR ACCESS TO DATA SUPPLIED BY A PLURALITY OF DATA PROVIDERS", filed Oct. 30, 2019, which is hereby incorporated herein by reference in its entirety and made part of the present U.S. Utility patent application for all purposes.

The energy utilization processing system 3500 can alternatively or additionally implement an energy utilization-based operation pricing system 3556 operable to generate and/or process energy utilization-based operation pricing data 3576, for example, relating to pricing operations as a function of their energy utilization. The energy utilization-based operation pricing system 3556 can be operable to implement some or all features and/or functionality discussed in conjunction with FIGS. 31A-31G.

In some embodiments, some or all features and/or functionality of energy utilization-based operation pricing system 3556 and/or some or all features and/or functionality associated with pricing queries or other operations that have been executed already or have yet to be executed as described herein implements some or all features and/or functionality of or functionality of pricing queries and/or applying corresponding pricing schemes as disclosed by: U.S. Utility application Ser. No. 16/665,571, entitled "ENFORCEMENT OF MINIMUM QUERY COST RULES REQUIRED FOR ACCESS TO A DATABASE SYSTEM", filed Oct. 28, 2019, which is hereby incorporated herein by reference in its entirety and made part of the present U.S. Utility patent application for all purposes.

Figure 34A:
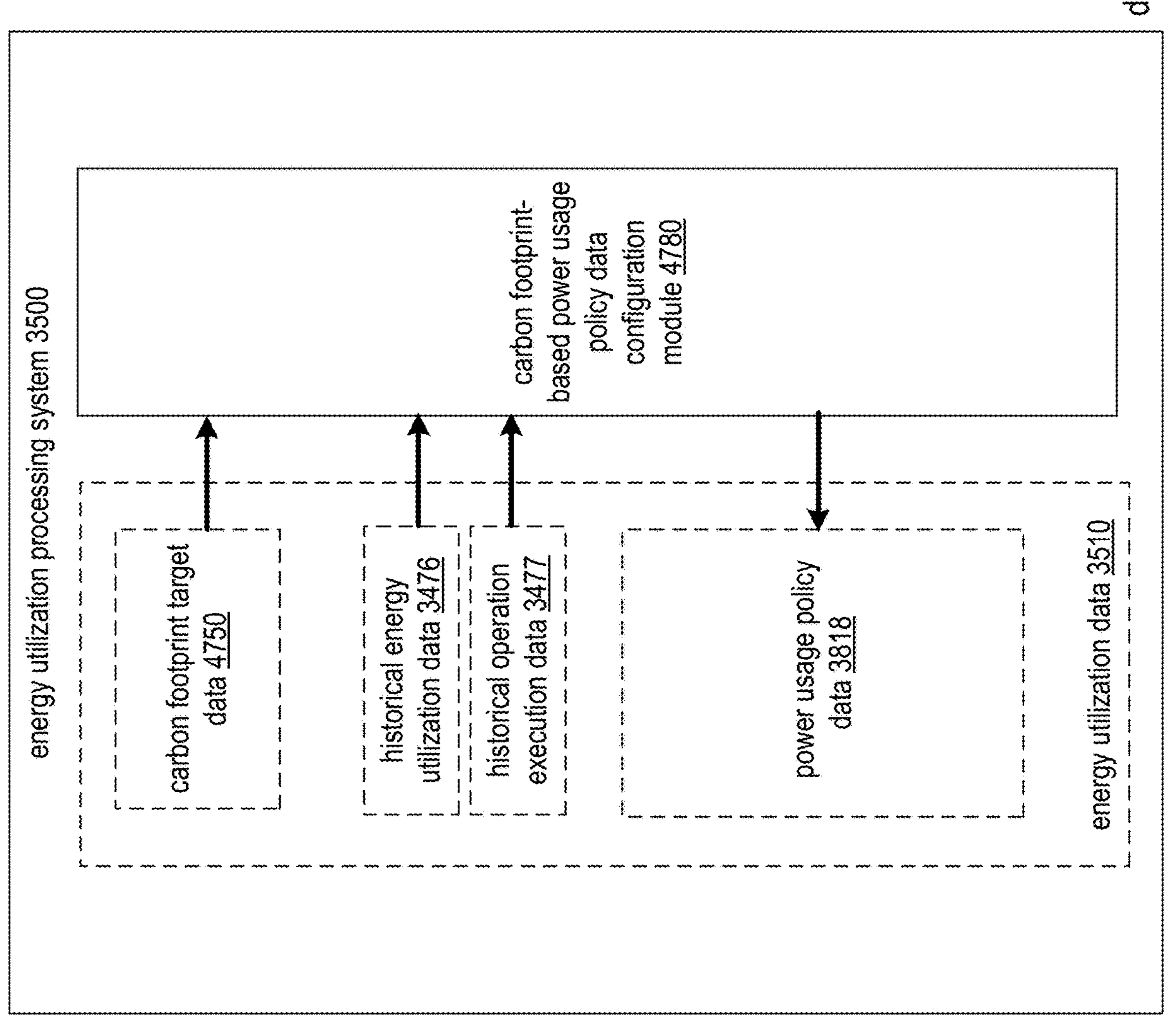
FIG. 34A is a schematic block diagram of an energy utilization processing system in accordance with various embodiments.
Figure 34B:
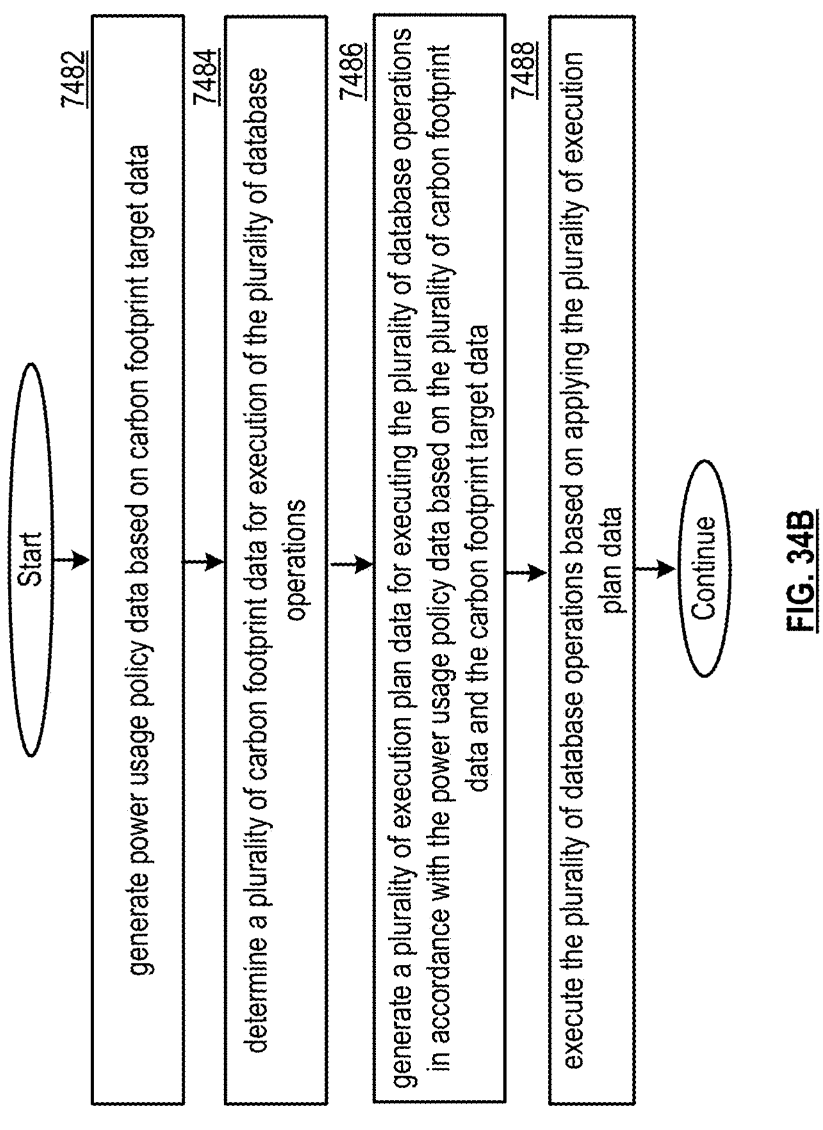
FIG. 34B is a logic diagram illustrating a method for execution in accordance with various embodiments.

Some or all systems implemented by energy utilization processing system 3500 operate based on carbon footprint related to respective energy utilization (e.g. where some or all energy utilization data 3510 is implemented as carbon footprint data relating to carbon emissions and/or other GHG emissions), for example, implementing some or all features and/or functionality discussed in conjunction with FIGS. 34A-34B.

Figure 26D:
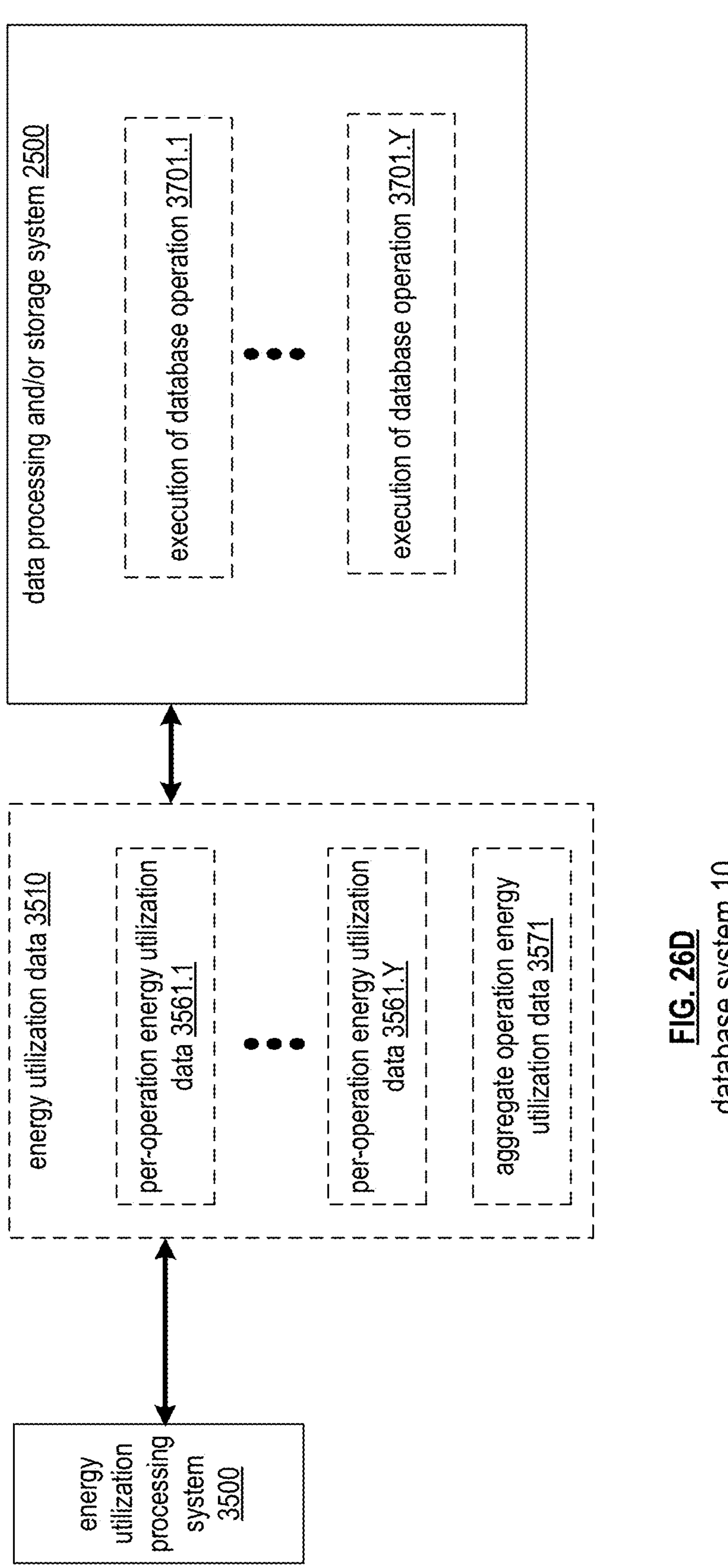
FIG. 26D is a schematic block diagram of a database system that generates per-operation energy utilization data for a plurality of database operations.

FIG. 26D illustrates an embodiment of a database system 10 where data processing and/or storage system 2500 executes a plurality of database operations 3701.1-3701.Y (e.g. serially at different times and/or concurrently in parallel). The plurality of database operations 3701 can include same or different types of operations for same or different types of database functionality. Energy utilization data 3510 can include per-operation energy utilization data 3561.1-3561.Y, where each per-operation energy utilization data 3561 is generated for a corresponding operation, for example, to characterize energy utilization by the individual operation and/or to configure its execution (e.g. to improve energy efficiency of the operation itself and/or the database system as a whole). The energy utilization data 3510 can alternatively or additionally include aggregate operation energy utilization data 3571, for example, corresponding to an aggregation of energy utilization across execution of all of the operations 3701.1-3701.Y. Some or all features and/or functionality of database system 10 of FIG. 26D can implement any embodiment of database system 10 described herein.

Figure 26E:
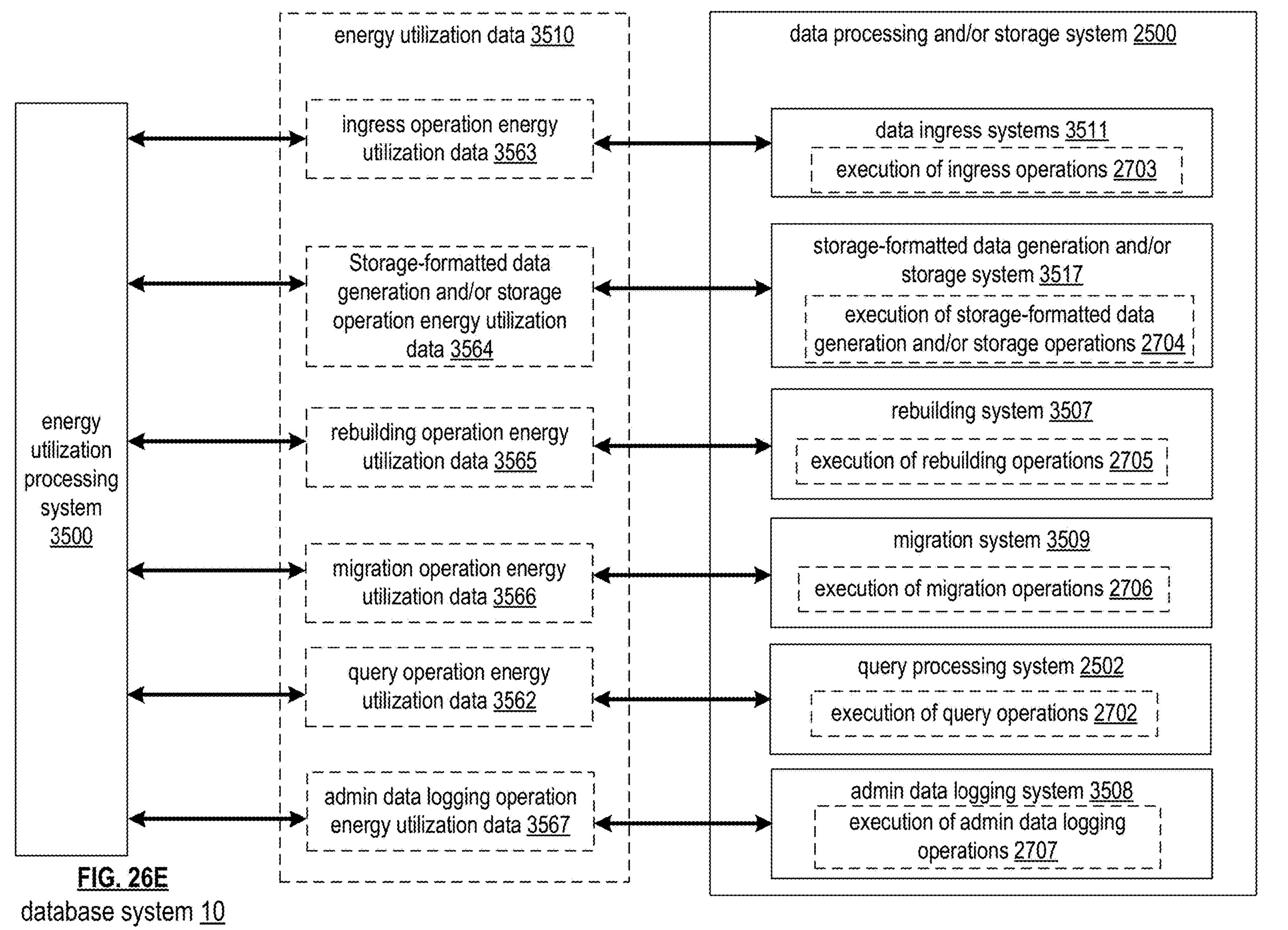
FIGS. 26E-26G are schematic block diagrams of a data processing and/or storage system that includes a plurality of systems in accordance with various embodiments.

FIG. 26E illustrates an embodiment of database system 10 where data processing and storage system includes a plurality of systems responsible for performing various functionality of the database system 10, for example, via a plurality of systems that includes systems 3511, 3517, 3507, 3509, and/or 2502. These various systems can be implemented separately or in tandem, via shared and/or distinct computing resources (e.g. same or different computing devices 18 and/or same or different processing and/or memory resources). The various systems 3550-3556 can optionally communicate shared data with each other via storage and/or communication resources 3560.

The plurality of systems can include a query processing system 2502, which can be operable to execute queries via execution of various query operations 2702. A given query operation 2702 can correspond to processing and execution of a corresponding query, for example, indicated in a corresponding query expression received in a query request 2914 to generate a corresponding query resultant 2920. A given query operation 2702 can optionally correspond to a portion of this processing and execution of a corresponding query, where a plurality of query operations 2702 are performed (e.g. serially at a time or concurrently in parallel) to process and/or execute a given query. A given database operation 3701 (e.g. having a query operation type) can optionally correspond to a query operation 2702, a portion of a query operation 2702, and/or multiple query operations 2702. The energy utilization data 3510 can optionally include query operation energy utilization data 3562 for such query operations 2702 (e.g. as per-operation energy utilization data 3561 for various query operations 2702), for example, to characterize energy utilization by the query operations and/or to configure their execution.

In some embodiments, some or all features and/or functionality of query processing system 2502 and/or executing of queries via execution of a query operator execution flow can include executing queries to perform types of query operations corresponding to grouped aggregation operations, join operations, and/or union distinct operations, which can be executed based on implementing via some or all features and/or functionality of grouped aggregation operations, join operations, and/or union distinct operations disclosed by: U.S. Utility application Ser. No. 18/310,177, entitled "OPTIMIZING AN OPERATOR FLOW FOR PERFORMING AGGREGATION VIA A DATABASE SYSTEM", filed May 1, 2023, which is hereby incorporated herein by reference in its entirety and made part of the present U.S. Utility patent application for all purposes; U.S. Utility application Ser. No. 18/226,525, entitled "SWITCHING MODES OF OPERATION OF A ROW DISPERSAL OPERATION DURING QUERY EXECUTION", filed Jul. 26, 2023, which is hereby incorporated herein by reference in its entirety and made part of the present U.S. Utility patent application for all purposes; U.S. Utility application Ser. No. 18/321,906, entitled "PROCESSING LEFT JOIN OPERATIONS VIA A DATABASE SYSTEM BASED ON FORWARDING INPUT", filed May 23, 2023, which is hereby incorporated herein by reference in its entirety and made part of the present U.S. Utility patent application for all purposes; U.S. Utility application Ser. No. 18/494,230, entitled "GENERATING EXECUTION TRACKING ROWS DURING QUERY EXECUTION VIA A DATABASE SYSTEM", filed Oct. 25, 2023; which is hereby incorporated herein by reference in its entirety and made part of the present U.S. Utility patent application for all purposes; and/or U.S. Utility application Ser. No. 18/326,305, entitled "HANDLING NULL VALUES IN PROCESSING JOIN OPERATIONS DURING QUERY EXECUTION", filed May 31, 2023, which is hereby incorporated herein by reference in its entirety and made part of the present U.S. Utility patent application for all purposes.

The plurality of systems can alternatively or additionally include a data ingress system 3511, which can be operable to receive data 2511 for storage via execution of one or more ingress operations 2703. A given ingress operation 2703 can correspond to receiving, processing, and/or storing a set of data of data 2711 (e.g. prior to long term storage formatting), for example, via processing one or more incoming data streams and/or bulk data received in one or more files. A given ingress operation 2703 can optionally correspond to a portion of this receiving, processing, and/or storing of the set of data, where a plurality of ingress operations 2703 are performed (e.g. serially at a time or concurrently in parallel) to receiving, processing, and/or storing a set of data. A given database operation 3701 (e.g. having an ingress operation type) can optionally correspond to an ingress operation 2703, a portion of an ingress operation 2703, and/or multiple ingress operations 2703. The energy utilization data 3510 can optionally include ingress operation energy utilization data 3563 for such ingress operations 2703 (e.g. as per-operation energy utilization data 3561 for various ingress operations 2703), for example, to characterize energy utilization by the ingress operations and/or to configure their execution.

In some embodiments, some or all of the functionality of data ingress system 3511 and/or some or all features and/or functionality discussed in conjunction with receiving incoming rows from one or more stream sources (e.g. in row data with corresponding row numbers), processing rows for storage in pages, maintaining a durability horizon, and/or implementing one or more stream loaders (e.g. via one or more nodes) as described herein is implemented via some or all features and/or functionality regarding receiving incoming rows from one or more stream sources, processing corresponding row data such as labeled row data having corresponding row numbers, processing rows for storage in pages, maintaining a durability horizon, and/or implementing one or more stream loaders as described in U.S. Utility application Ser. No. 16/985,723, U.S. Utility application Ser. No. 16/985,957, U.S. Utility application Ser. No. 16/985,930, and/or U.S. Utility application Ser. No. 17/215,527, entitled MAINTAINING ROW DURABILITY DATA IN DATABASE SYSTEMS, filed Mar. 29, 2021, issued as U.S. Pat. No. 11,675,757 on Jun. 13, 2023, which is hereby incorporated herein by reference in its entirety and made part of the present U.S. Utility patent application for all purposes.

In some embodiments, some or all of the functionality of data ingress system 3511 and/or some or all features and/or functionality discussed in conjunction with loading data, for example, via one or more loading modules 2510 and/or via record processing and storage system 2505 as described herein, can implement processing of a corresponding message stream via a plurality of feed receiver modules in a fault tolerant manner as disclosed by U.S. Utility application Ser. No. 17/119,311, entitled "FAULT-TOLERANT DATA STREAM PROCESSING", filed Dec. 11, 2020, which hereby incorporated herein by reference in its entirety and made part of the present U.S. Utility patent application for all purposes.

The plurality of systems can alternatively or additionally include a storage-formatted data generation and/or storage system 3517, which can be operable to generate storage-formatted data from a set of data and/or store this storage-formatted data for example, long term and/or persistently (e.g. where data 2711 is formatted as storage-formatted data for persistent storage), via execution of various storage-formatted data generation and/or storage operations 2704. A given storage-formatted data generation and/or storage operation 2704 can optionally correspond to a portion of this generating and/or storing of storage-formatted data, where a plurality of storage-formatted data generation and/or storage operations 2704 are performed (e.g. serially at a time or concurrently in parallel) to generate and/or store storage-formatted data. A given database operation 3701 (e.g. having a storage-formatted data generation operation type) can optionally correspond to a storage-formatted data generation and/or storage operation 2704, a portion of a storage-formatted data generation and/or storage operation 2704, and/or multiple a storage-formatted data generation and/or storage operation 2704. The energy utilization data 3510 can optionally include storage-formatted data generation and/or storage operation energy utilization data 3564 for such storage-formatted data generation and/or storage operations 2704 (e.g. as per-operation energy utilization data 3561 for various storage-formatted data generation and/or storage operations 2704), for example, to characterize energy utilization by the storage-formatted data generation and/or storage operations and/or to configure their execution.

In some embodiments, some or all features and/or functionality of storage-formatted data generation and/or storage system 3517 and/or generating segments for storage described herein implements some or all features and/or functionality of the segment generator disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility patent application for all purposes In some embodiments, some or all features and/or functionality of data ingress system 3511 and/or storage-formatted data generation and/or storage system 3517, and/or some or all features and/or functionality of loading new data (e.g. as new pages and/or new segments), for example, via one or more loading modules 2510 and/or via record processing and storage system 2505 as described herein implements some or all features and/or functionality of loading modules, record processing and storage system, and/or any loading of data for storage and access in query execution as disclosed by: U.S. Utility application Ser. No. 18/355,497, entitled "TRANSFER OF A SET OF SEGMENTS BETWEEN STORAGE CLUSTERS OF A DATABASE SYSTEM", filed Jul. 20, 2023; and/or U.S. Utility application Ser. No. 18/308,954, entitled "QUERY EXECUTION DURING STORAGE FORMATTING UPDATES", filed Apr. 28, 2023; which are hereby incorporated herein by reference in its entirety and made part of the present U.S. Utility patent application for all purposes.

In some embodiments, some or all features and/or functionality of data ingress system 3511 and/or storage-formatted data generation and/or storage system 3517, and/or some or all features and/or functionality of loading new data described herein is based on implementing some or all features and/or functionality of loading tables, for example, generated via execution of CTAS queries, as disclosed by U.S. Utility application Ser. No. 18/313,548, entitled "LOADING QUERY RESULT SETS FOR STORAGE IN DATABASE SYSTEMS", filed May 28, 2023; which are hereby incorporated herein by reference in its entirety and made part of the present U.S. Utility patent application for all purposes.

The plurality of systems can alternatively or additionally include a rebuilding system 3507, which can be operable to rebuild one or more data structures (e.g. where data 2711 includes one or more such data structures), via execution of various rebuilding operations 2705, for example, based on preparing for and/or responding to an outage of storage resources storing these data structures, in conjunction with ensuring persistent storage of these data structures in the case of outages. A given rebuilding operation 2705 can optionally correspond to a portion of this rebuilding of one or more data structures, where a plurality of rebuilding operations 2705 are performed (e.g. serially at a time or concurrently in parallel) to rebuild the one or more data structures. A given database operation 3701 (e.g. having a migration operation type) can optionally correspond to a rebuilding operation 2705, a portion of a rebuilding operation 2705, and/or multiple rebuilding operations 2705. The energy utilization data 3510 can optionally include rebuilding operation energy utilization data 3565 for such rebuilding operations 2705 (e.g. as per-operation energy utilization data 3561 for various rebuilding operations 2705), for example, to characterize energy utilization by the rebuilding operations and/or to configure their execution.

The plurality of systems can alternatively or additionally include a migration system 3509, which can be operable to migrate data from at least one source location to at least one destination location (e.g. where data 2711 this data for migration), via execution of various migration operations 2706, for example, in conjunction with ensuring persistent storage of data 2711, and/or based on preparing for and/or responding outages, based on responding to addition of new storage devices, and/or based on rebalancing the database system. A given migration operation 2706 can optionally correspond to a portion of this migrating of data from at least one source location to at least one destination location, where a plurality of migration operations 2506 are performed (e.g. serially at a time or concurrently in parallel) to migrate the data from the at least one source location to the at least one destination location. A given database operation 3701 (e.g. having a migration operation type) can optionally correspond to a migration operation 2706, a portion of a migration operation 2706, and/or multiple migration operations 2706. The energy utilization data 3510 can optionally include migration operation energy utilization data 3566 for such migration operations 2706 (e.g. as per-operation energy utilization data 3561 for various migration operations 2706), for example, to characterize energy utilization by the migration operations and/or to configure their execution.

In some embodiments, some or all features and/or functionality of migration system 3509 and/or execution of migration operations executes some or all features and/or functionality of segment transfers, segment transfer group process 2810 and/or transfer segment group task processing module 3510 for transferring data from storage cluster 2535.1 to 2535.2 disclosed by: U.S. Utility application Ser. No. 18/632,629, entitled "DATABASE SYSTEM PERFORMANCE OF A STORAGE REBALANCING PROCESS", filed Apr. 11, 2024, which is hereby incorporated herein by reference in its entirety and made part of the present U.S. Utility patent application for all purposes; and/or U.S. Utility application Ser. No. 18/355,497, entitled "TRANSFER OF A SET OF SEGMENTS BETWEEN STORAGE CLUSTERS OF A DATABASE SYSTEM", filed Jul. 20, 2023, which is hereby incorporated herein by reference in its entirety and made part of the present U.S. Utility patent application for all purposes.

In some embodiments, some or all of the functionality of persistently storing data (e.g. via receiving, generating, storing, rebuilding, migrating, and/or accessing this data over time via systems of data processing and/or storage system 2500), and/or some or all of the functionality of implemented in conjunction with generating segments, storing segments (e.g. via multiple segment parts), storing segment metadata regarding segments, reloading segments, rebuilding segments, executing queries and/or performing rebuilds across multiple different storage clusters, and/or implementing a consensus protocol as described herein, is implemented based on implementing some or all features and/or functionality of the database system 10, for example, with regards to generating segments, storing segments, loading segments, rebuilding segments, and/or implementing a consensus protocol, as disclosed by: U.S. Utility application Ser. No. 18/308,954, entitled "QUERY EXECUTION DURING STORAGE FORMATTING UPDATES", filed Apr. 28, 2023, which is hereby incorporated herein by reference in its entirety and made part of the present U.S. Utility patent application for all purposes; U.S. Utility application Ser. No. 18/310,262, entitled "GENERATING A SEGMENT REBUILD PLAN VIA A NODE OF A DATABASE SYSTEM", filed May 1, 2023, which is hereby incorporated herein by reference in its entirety and made part of the present U.S. Utility patent application for all purposes; and/or U.S. Utility application Ser. No. 18/355,497, entitled "TRANSFER OF A SET OF SEGMENTS BETWEEN STORAGE CLUSTERS OF A DATABASE SYSTEM", filed Jul. 20, 2023, which is hereby incorporated herein by reference in its entirety and made part of the present U.S. Utility patent application for all purposes.

The plurality of systems can alternatively or additionally include an admin data logging system 3509, which can be operable to generate and/or store administrative data (e.g. debugging data, metrics tracked for observability of database system performance, other log data, and/or any metadata and/or administrative data described herein, where data 2711 optionally includes this logged admin data), via execution of various admin data logging operations 2707. For example, the administrative data can correspond to data logged in conjunction with monitoring any database operations 3701 performed by database system 10 and/or can include admin-based configuration of database operations 3701 performed by database system 10. A given admin data logging operation 2707 can optionally correspond to a portion of this logging of admin data, where a plurality of admin data logging operations 2707 are performed (e.g. serially at a time or concurrently in parallel) to log the data. A given database operation 3701 (e.g. having a migration operation type) can optionally correspond to an admin data logging operation 2707, a portion of an admin data logging operation 2707, and/or multiple admin data logging operations 2707. The energy utilization data 3510 can optionally include admin data logging operation energy utilization data 3567 for such admin data logging operations 2707 (e.g. as per-operation energy utilization data 3561 for various admin data logging operations 2707), for example, to characterize energy utilization by the migration operations and/or to configure their execution.

In some embodiments, the admin data logging operations 2707 include some or all operations performed by the energy utilization processing system 3500, where some of the log data corresponds to energy utilization data 3510 and/or data generated via processing of other energy utilization data 3510 (e.g. the log data includes various logged energy utilization measurement data 3570 and/or energy utilization estimate data 3571 as other database operations are performed over time). The database system 10 can otherwise be operable to apply energy utilization processing system 3500 to characterize and/or configure the energy utilization consumed by the energy utilization processing system 3500 in characterizing and/or configuring execution of other operations (e.g. configure how frequently energy utilization measurements are logged, how much processing be performed to schedule/optimize various operations for the purposes of energy efficiency to ensure that the energy utilization required to achieve this energy efficiency in other operations does not outweigh the benefits of the resulting scheduling and/or optimizations, etc.).

Figure 26F:
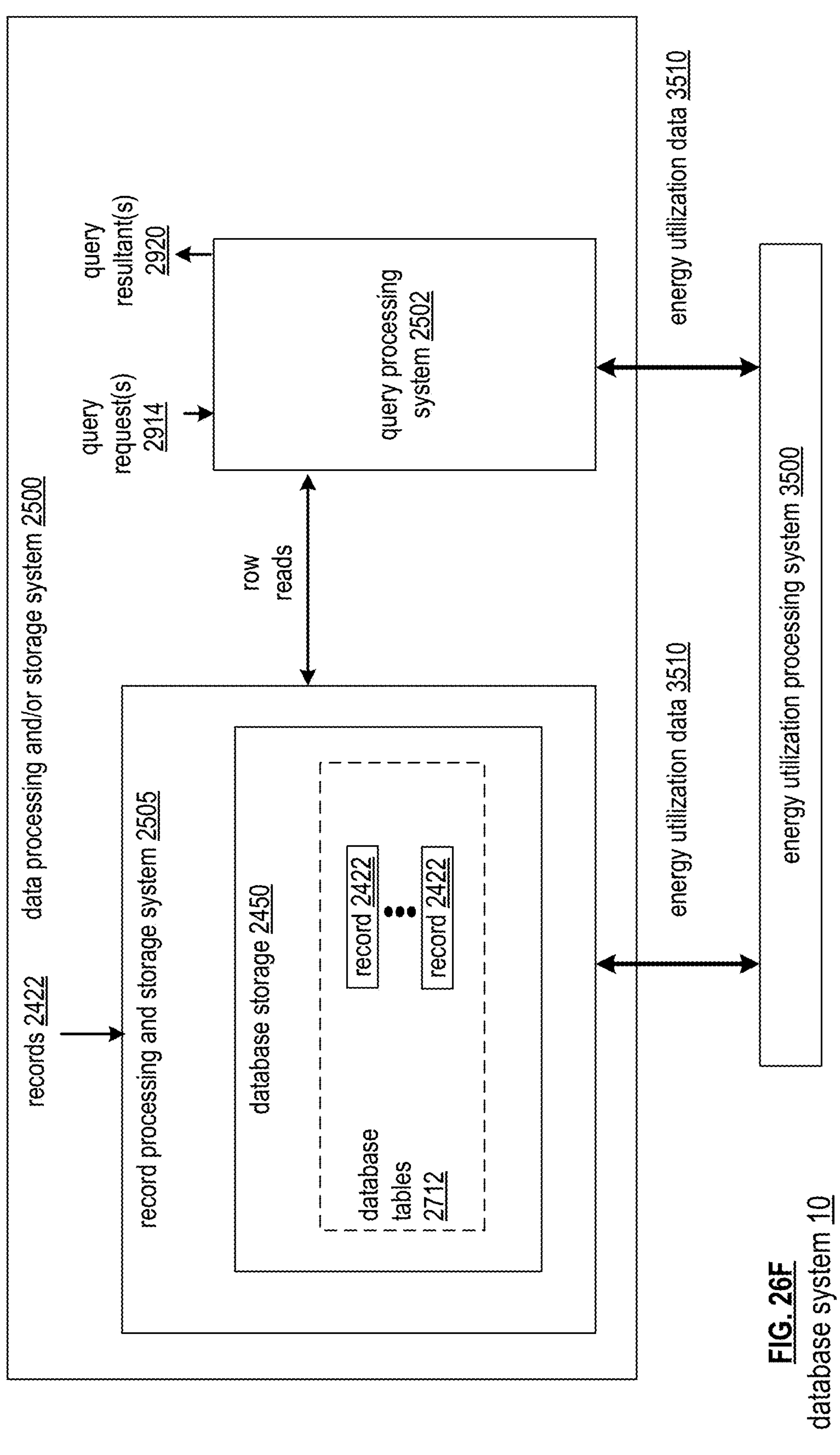

FIG. 26F illustrates an example embodiment of a data processing and/or storage system 2500. Some or all features and/or functionality of the data processing and/or storage system 2500 can implement the data processing and/or storage system 2500 of FIG. 26A and/or any embodiment of data processing and/or storage system 2500 described herein.

The data processing and storage system 2500 can include a record processing and storage system 2505 operable to implement database storage 2450 via storage of a plurality of records 2422 of one or more relational database tables 2712. For example, the record processing and storage system 2505 receives and processes incoming records for storage via database storage 2450. The record processing and storage system 2505 of FIG. 26C can implement some or all features and/or functionality of any embodiment of record processing and storage system 2505 described herein. The records 2422 of the one or more relational database tables 2712 can correspond to data 2711.

The data processing and/or storage system 2500 can include a query processing system 2502 operable to receive query requests 2914 and execute corresponding queries (e.g. via query execution module 2504) to generate corresponding query resultants via row reads performed via access to the database storage 2450 of record processing and storage system 2505. The query processing system 2502 of FIG. 26C can implement some or all features and/or functionality of any embodiment of query processing system 2502 and/or query execution module 2504 described herein.

The energy utilization processing system 3500 can communicate energy utilization data 3510 with record processing and/or storage system 2505. For example, energy utilization data 3510 includes energy utilization metrics received from and/or measured for record processing and/or storage system during execution of a database operation 3701 and/or during storage of records 2422 to indicate energy utilization induced by execution of the database operation 3701 and/or by storage of records 2422. As another example, the energy utilization data 3510 includes instructions configuring execution of one or more database operations 3701 by record processing and/or storage system 2505 (e.g. operations for receiving and/or formatting records for storage and/or maintaining storage of the records over time).

The energy utilization processing system 3500 can communicate energy utilization data 3510 with query processing system 2502. For example, energy utilization data 3510 includes energy utilization metrics received from and/or measured for query processing system during execution of a database operation 3701 (e.g. a corresponding query operation to execute a given query request) to indicate energy utilization induced by execution of the database operation 3701. As another example, the energy utilization data 3510 includes instructions configuring execution of one or more database operations 3701 (e.g. a corresponding query operation to execute a given query request) by query processing system 2502 (e.g. operations for receiving and/or formatting records for storage and/or maintaining storage of the records over time).

In some embodiments, data 2711 is stored via an object storage system and/or non-relational database-based storage system. In some embodiments, some or all features and/or functionality of generating, formatting, storing, indexing, and/or accessing data 2711 via operations 3701 described herein and/or some or all features and/or functionality of data processing and/or storage system 2500 described herein, is implemented via some or all features and/or functionality of primary storage system 2506, secondary storage system 2508, and/or object storage system 3105 disclosed by: U.S. Utility application Ser. No. 18/402,954, entitled "FILTERING RECORDS INCLUDED IN OBJECTS OF AN OBJECT STORAGE SYSTEM BASED ON APPLYING A RECORD IDENTIFICATION PIPELINE", filed Jan. 3, 2024, which is hereby incorporated herein by reference in its entirety and made part of the present U.S. Utility patent application for all purposes; U.S. Utility application Ser. No. 18/402,968, entitled "APPLYING FILTERING PARAMETER DATA BASED ON ACCESSING AN INDEX STRUCTURES STORED VIA OBJECTS OF AN OBJECT STORAGE SYSTEM", filed Jan. 3, 2024, which is hereby incorporated herein by reference in its entirety and made part of the present U.S. Utility patent application for all purposes; and/or U.S. Utility application Ser. No. 18/403,002, entitled "QUERY EXECUTION VIA COMMUNICATION WITH AN OBJECT STORAGE SYSTEM VIA AN OBJECT STORAGE COMMUNICATION PROTOCOL", filed Jan. 3, 2024, which is hereby incorporated herein by reference in its entirety and made part of the present U.S. Utility patent application for all purposes.

Any embodiment of operation 3701 described herein can be implemented as part of, all of, and/or a collection of: one or more query operations 2702; one or more ingress operations 2703; one or more storage-formatted data generation and/or storage operations 2704; one or more rebuilding operations 2705; one or more migration operations 2706; and/or one or more admin data logging operations 2707. Any embodiment of operation 3701 described herein can be implemented as part of, all of, and/or a collection of any operations, operators, functions, models, algorithms, processes, and/or IO pipeline elements described herein.

In some embodiments, any embodiment of operation 3701 described herein can be implemented as training of and/or applying of one or models, such as one or more machine learning models and/or AI models, respective training functions, model execution operators, and/or other functionality of training and/or applying machine learning models via database system 10, for example, implementing some or all features and/or functionality disclosed by: U.S. Utility application Ser. No. 18/457,496, entitled "IMPLEMENTING NONLINEAR OPTIMIZATION DURING QUERY EXECUTION VIA A RELATIONAL DATABASE SYSTEM", filed Aug. 29, 2023, which is hereby incorporated herein by reference in its entirety and made part of the present U.S. Utility patent application for all purposes; and/or U.S. Utility application Ser. No. 18/457,568, entitled "GENERATING A DECISION TREE MODEL DURING QUERY EXECUTION VIA A RELATIONAL DATABASE SYSTEM", filed Aug. 29, 2023, which is hereby incorporated herein by reference in its entirety and made part of the present U.S. Utility patent application for all purposes.

In some embodiments, any embodiment of operation 3701 described herein can be implemented as one or more window functions, one or more user-defined functions, one or more table-valued functions, and/or one or more functions implementing time series applications, for example, via implementing some or all features and/or functionality disclosed by U.S. Utility application Ser. No. 16/921,226, entitled "RECURSIVE FUNCTIONALITY IN RELATIONAL DATABASE SYSTEMS", filed Jul. 6, 2020, which is hereby incorporated herein by reference in its entirety and made part of the present U.S. Utility patent application for all purposes.

Figure 26G:
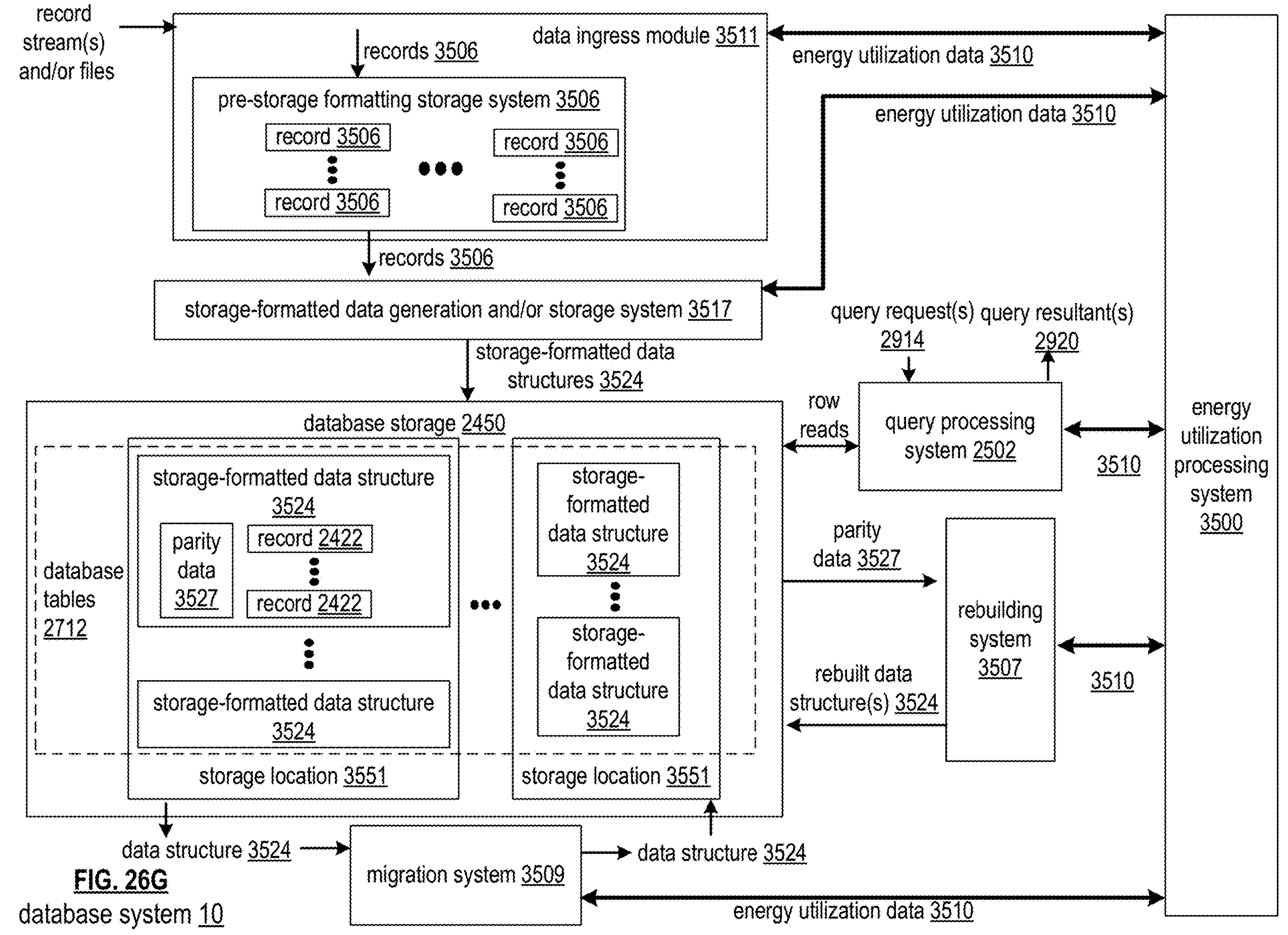

FIG. 26G illustrates an example embodiment of a database system 10. Some or all features and/or functionality of the data processing and/or storage system 2500 can implement the database system of FIG. 26A and/or any embodiment of database system 10 described herein.

Data ingress system 3511 can receive records 3506 from one or more record streams and/or files. These records can be stored via a pre-storage formatting storage system 3605 before being processed for long term storage. The energy utilization by data ingress system 3511 and/or pre-storage formatting storage system 3605 to perform its respective functionality can be characterized and/or configured in corresponding energy utilization data 3510 generated and/or processed by the energy utilization processing system 3500. Some or all features and/or functionality of data ingress system 3511 of FIG. 26G can implement any embodiment of data ingress system 3511 described herein.

The records 3506 can be formatted that same as or differently from records 2422, can include some or all of the same data as records 2422, and can each correspond to a record 2422 once stored (e.g. the record 3506 is ultimately stored as a row of a relational database table). The data ingress system 3511 and/or pre-storage formatting storage system 3605 can optionally be implemented via some or all features and/or functionality of any embodiment of page generator 2511 and/or page storage system 2506, respectively, described herein.

The records 3506 can await conversion into storage-formatted data structures 3524 that include corresponding records 2422 by storage-formatted data generation and/or storage system 3517, where the resulting storage-formatted data structures 3524 are stored in one or more storage locations 3551 of database storage 2450, for example, to collectively store one or more database tables 2712. The energy utilization by storage-formatted data structures 3524 and/or database storage 2450 to perform its respective functionality can be characterized and/or configured in corresponding energy utilization data 3510 generated and/or processed by the energy utilization processing system 3500. Some or all features and/or functionality of formatted data generation and/or storage system 3517 of FIG. 26G can implement any embodiment of formatted data generation and/or storage system 3517 described herein.

The storage-formatted data structures 3524 can be implemented via some or all features and/or functionality of segments 2424 described herein. The energy utilization by storage-formatted data structures 3524 and/or database storage 2450 can be implemented via some or all features and/or functionality of segment generator 2617 and/or segment storage system 2508 described herein. The one or more storage locations 3551 can be implemented via some or all features and/or functionality of long term storage 2540 described herein. The database storage 2450 of FIG. 26G can implement any embodiment of database storage 2450 described herein.

The data ingress system 3511 and storage-formatted data generation and/or storage system 3517 can collectively implement loading of new data 2711 for storage. In some embodiments data ingress system 3511 and/or storage-formatted data generation and/or storage system 3517 can load new data 2711 for storage, for example, via performance of database operations 3701 to implement and/or perform some or all features and/or functionality any embodiments of loading modules 2510 and/or record processing and storage system 2505 described herein.

Rebuilding system 3507 can be operable to rebuild various storage formatted data structures 3524, for example, as a function of and/or based on access to other storage formatted data structures 3524 (e.g. based on their respective parity data 3527, which can implement some or all features and/or functionality of any parity data described herein), for example, in accordance with a redundancy storage scheme implemented by the storage formatted data structures 3524. The energy utilization by rebuilding system 3507 to perform its respective functionality can be characterized and/or configured in corresponding energy utilization data 3510 generated and/or processed by the energy utilization processing system 3500. Some or all features and/or functionality of rebuilding system 3507 of FIG. 26G can implement any embodiment of rebuilding system 3507 described herein.

The rebuilding system 3507 can implement some or all features and/or functionality of segment recovery module 2439 described herein, and/or via any rebuilding of segments 2424 from other segments in a same segment group described herein.

Migration system 3509 can be operable to transfer storage of various storage formatted data structures 3524 between storage locations 3551 (e.g. store in a new storage location 3551 and delete from the old storage location 3551 once storage in the new storage location is confirmed). The energy utilization by migration system 3509 to perform its respective functionality can be characterized and/or configured in corresponding energy utilization data 3510 generated and/or processed by the energy utilization processing system 3500. The migration system 3509 can optionally implement some or all functionality of rebuilding system 3507 to rebuild data structures as part of moving the data structures to the new location. Some or all features and/or functionality of migration system 3509 of FIG. 26G can implement any embodiment of migration system 3509 described herein.

In some embodiments, the migration system 3509 performs database operations 3701 to implement and/or perform some or all features and/or functionality of the segment transfer group process 2810, transfer segment group task processing module 3510, transfer segment group task processing module 3510 and/or storage rebalancing module 2905, storage rebalancing process 2915 disclosed by: U.S. Utility application Ser. No. 18/632,629, entitled "DATABASE SYSTEM PERFORMANCE OF A STORAGE REBALANCING PROCESS", filed Apr. 11, 2024, which is hereby incorporated herein by reference in its entirety and made part of the present U.S. Utility patent application for all purposes; and/or U.S. Utility application Ser. No. 18/355,497, entitled "TRANSFER OF A SET OF SEGMENTS BETWEEN STORAGE CLUSTERS OF A DATABASE SYSTEM", filed Jul. 20, 2023, which is hereby incorporated herein by reference in its entirety and made part of the present U.S. Utility patent application for all purposes.

Query processing system 2502 can perform queries indicated in query requests 2914 to generate corresponding query resultants 2920 via row reads to records 2422 included in storage formatted data structures 3524 via access to these data structures (and/or corresponding index data). This can include generating an operator execution flow 2517 and/or executing the operator execution flow 2517 via a plurality of nodes 37 participating in a plurality of hierarchical levels of a query execution plan 2405. The energy utilization by query processing system 2502 to perform its respective functionality can be characterized and/or configured in corresponding energy utilization data 3510 generated and/or processed by the energy utilization processing system 3500. Query processing system 2502 of FIG. 26G can implement any embodiment of query processing system 2502 and/or query execution module 2405 described herein.

Figure 26H:
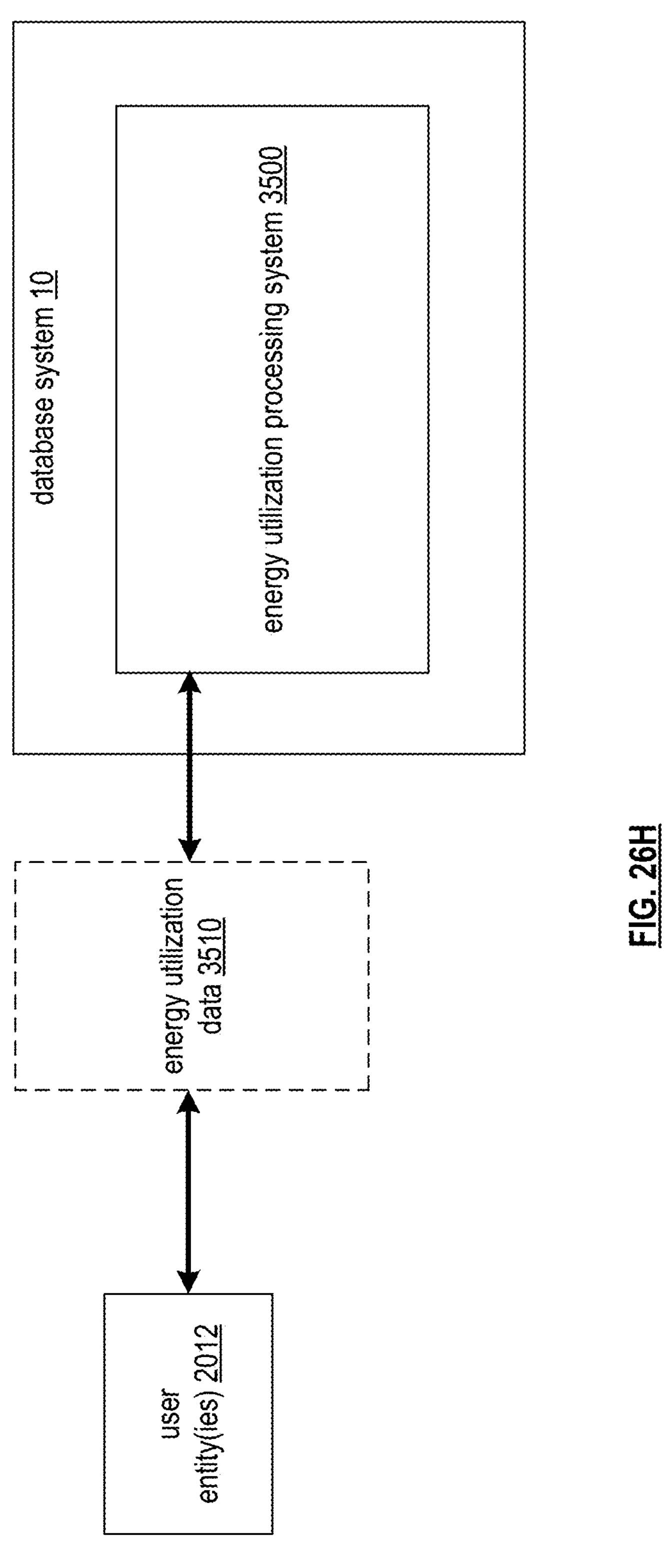
FIG. 26H is a schematic block diagram of a database system that implements an energy utilization processing system that communicates energy utilization data with at least one user entity in accordance with various embodiments.

FIG. 26H illustrates an embodiment of where database system 10 communicates energy utilization data 3510 with a user entity 2012, such as any user entity 2012 described herein. This can include collecting input relating to configuring of generation/collecting of energy utilization data 3510 by the database system (e.g. communication of power usage policies, communication of energy utilization thresholds/restrictions, configuration of how database operations be scheduled/optimized/restricted to reduce energy utilization, etc.) from a user entity and/or reporting energy utilization data (e.g. logged measurements/estimates/etc.) to a user entity. Options for configuration and/or reported data can be displayed to the user entity via a graphical user interface, for example, presented via a display device of a client device associated with the user entity.

FIGS. 27A-27L illustrate embodiments of a database system that implements an energy utilization measurement system 3550. Some or all features and/or functionality of the energy utilization measurement system 3550 of FIGS. 27A-27L can implement the energy utilization measurement system 3550 of FIG. 26C and/or any embodiment of the energy utilization processing system 3500 described herein. Some or all features and/or functionality of the energy utilization measurement data 3570 of FIGS. 27A-27L can implement any embodiment of energy utilization data 3510 described herein. Some or all features and/or functionality of database system 10 of FIGS. 27A-27L can implement any embodiment of database system 10 described herein.

Figure 27A:
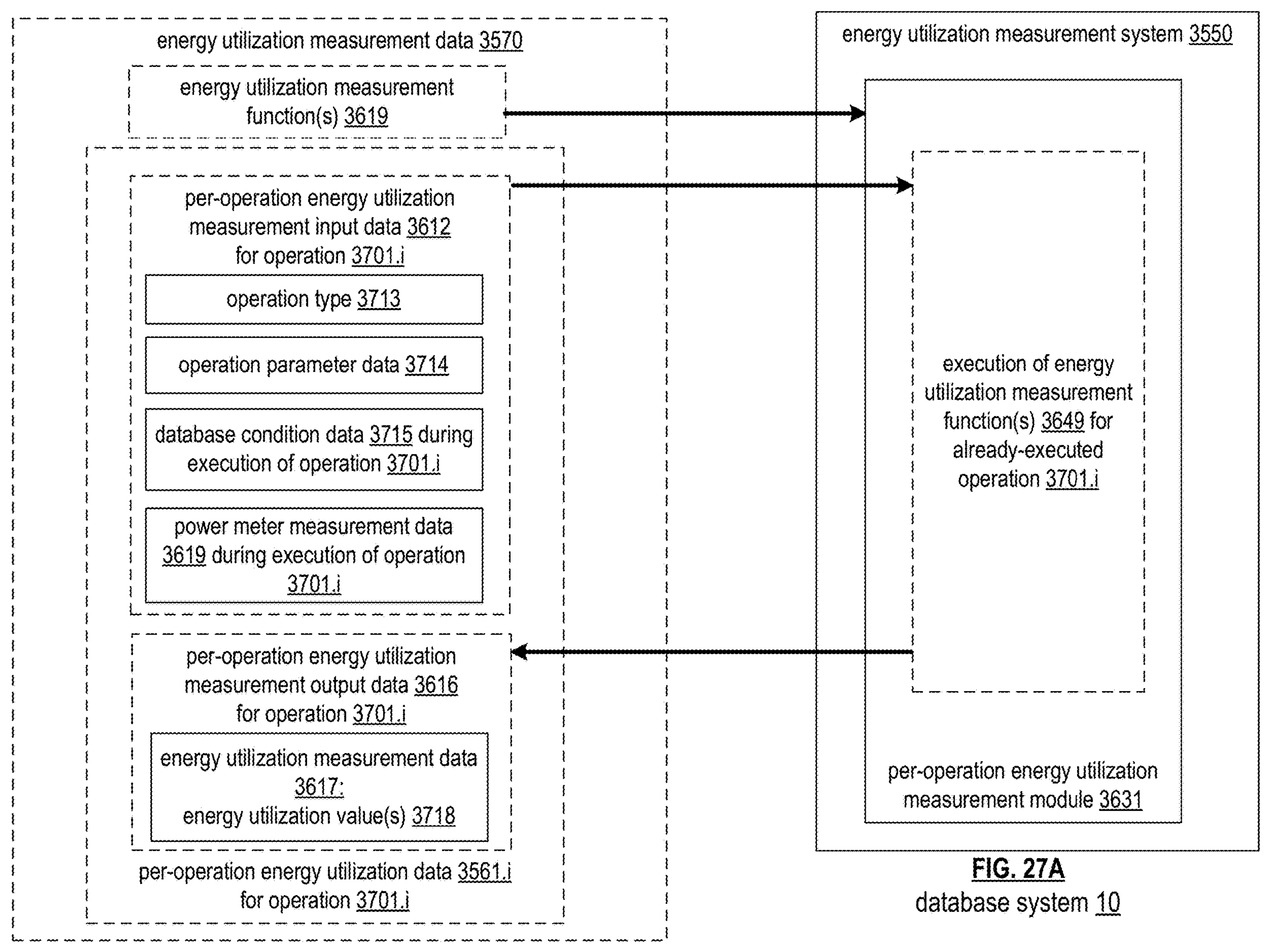
FIG. 27A is a schematic block diagram of an energy utilization measurement system in accordance with various embodiments.

FIG. 27A illustrates an embodiment of an energy utilization measurement system 3550 that implements a per-operation energy utilization measurement module 3631 that executes one or more energy utilization measurement functions 3649 to generate per-operation energy utilization measurement output data 3616 for a given database operation 3701.*i* (e.g. an operation that was already executed, or that is currently being executed) based on per-operation energy utilization measurement input data 3612 for the given database operation 3701.*i*. As used herein, operation 3701.*i* can correspond to any given operation 3701 (e.g. of the set of operations 3701.1-3701.Y executed by the database system and/or additional operations proposed but ultimately not executed by the database system, which can all optionally be individually processed as instances of operation 3701.*i*).

The one or more energy utilization measurement functions 3649 can be executed based on applying corresponding parameters, weights, and/or function definition(s) that are: received by energy utilization processing system 3500; accessed in memory by energy utilization processing system 3500; configured via user input by a user entity communicating with energy utilization processing system 3500; automatically generated and/or automatically updated/re-tuned over time by energy utilization processing system 3500 (e.g. via training on training data to generate a corresponding machine learning model and/or artificial intelligence (AI) model based on utilizing at least one machine learning-based training function and/or technique and/or based on utilizing at least one AI-based training function and/or technique);

implemented by energy utilization processing system 3500 via artificial intelligence (e.g. based on utilizing a generative AI platform and/or other AI platform/model(s) accessible by and/or communicating with by energy utilization processing system 3500); and/or otherwise being determined by energy utilization processing system 3500. The corresponding parameters, weights, and/or function definition(s) of energy utilization measurement function(s) 3649 can be configured to generate per-operation energy utilization measurement output data 3616 as a function (e.g. deterministic function) of corresponding per-operation energy utilization measurement input data 3612.

The energy utilization measurement output data 3616 for operation 3701.*i* can include energy utilization measurement data 3617 for the given operation 3701.*i*, which can indicate one or more energy utilization values 3718 (e.g. corresponding to any of the energy utilization-based metrics described herein). Example values 3718 included in energy utilization measurement data 3617 of energy utilization measurement output data 3616 are presented in FIG. 27C.

The energy utilization measurement input data 3612 for operation 3701.*i* can indicate an operation type 3713 for the operation (e.g. whether the operation is a query operation 2702, ingress operation 2703, storage-formatted data generation operation 2704, rebuilding operation 2705, migration operation 2706, admin data logging operation 2707, another operation, a sub-operation of one of these operation categories, etc.). For example, the operation type 3713 indicates a value denoting an identifier for the respective operation type of operation 3701.*i*. The one or more energy utilization values 3718 of energy utilization estimate data 3717 can be computed by energy utilization measurement system 3550 as a function of the operation type 3713.

The energy utilization measurement input data 3612 for operation 3701.*i* can alternatively or additionally indicate operation parameter data 3714 further specifying factors relating to execution of the given operation, for example, that impact energy utilization in executing the operation 3701. Some or all operation parameter data 3714 can be determined prior to execution of the operation 3701, for example, as specified in configurable arguments and/or executable expression of a corresponding request to execute the operation 3701. Some or all operation parameter data 3714 optionally cannot be determined until after execution of the operation 3701 has initiated and/or completed, for example, based on state of the database system 10 when the operation 3701 is performed. Examples of operation parameter data 3714 are presented in FIG. 27D. The one or more energy utilization values 3718 of energy utilization measurement data 3617 can be computed by energy utilization measurement system 3550 as a function of the operation parameter data 3714.

The energy utilization measurement input data 3612 for operation 3701.*i* can alternatively or additionally indicate database condition data 3715 during execution of operation 3701.*i* further specifying factors relating to the state of database system 10 at the time the operation was executed, for example, that impact energy utilization in executing the operation 3701. This can include current information such as: database system wide energy utilization (e.g. corresponding values for any metrics described herein), type of power (e.g. battery vs. grid-based vs. renewable) being used by the database at the time the operation was executed; a current mode of operation of storage of the database in persistently storing data 2711 at the time the operation was executed; an emissions factor for the database's current mode of operation/functionality at the time the operation was executed; current pricing scheme at the time the operation was executed; configuration of the database system 10 at the time the operation was executed; how much data 2711 is stored across how many tables across how many devices at the time the operation was executed; which nodes/devices are online vs offline/active vs. idle at the time the operation was executed; other operations concurrently executing when the operation 3701.*i* was executed; various system metadata/state data mediated via one or more storage clusters, such as any state data described herein, etc. The one or more energy utilization values 3718 of energy utilization measurement data 3617 can be computed by energy utilization measurement system 3550 as a function of the database condition data 3715.

The energy utilization measurement input data 3612 for operation 3701.*i* can alternatively or additionally include power meter measurement data 3619 measured (e.g. by power monitoring hardware of the database system 10) during execution of operation 3701.*i*, for example, while any number of database operations 3701 and/or other activities contributing to energy consumption may have also been performed by database system 10. The one or more energy utilization values 3718 of energy utilization measurement data 3617 can be computed by energy utilization measurement system 3550 as a function of the power meter measurement data 3619.

The values 3718 of energy utilization measurement data can correspond to singular values for energy utilization (e.g. for of the energy utilization-based metrics), for example, based on the measurement taken via energy utilization measurement function being known/expected to be accurate and/or a singular estimated value being sufficient (e.g. a mean/center of a corresponding distribution, given the input data 3612). These can alternatively or additionally correspond to value ranges (e.g. bounded range by min and max value, confidence intervals, range having a center and span dictated by the input data 3612, for example, based on how confident the estimate for measurement is based on the input data 2712, etc.) for energy utilization (e.g. for of the energy utilization-based metrics), for example, based on guaranteeing/expecting the actual value to fall within the presented range and/or based on the measurement taken via energy utilization measurement function being an estimate rather than a value guaranteed to be accurate. These can alternatively or additionally correspond to probability distribution data (e.g. expected value and/or standard deviation for the measurement value given the input data 3612, a probability mass function (PMF) and/or probability density function (PDF) for the measurement value, given the input data 3612, and/or other distribution data).

In some embodiments, the energy utilization measurement data 3617 can characterize an amount/portion of energy utilization by the database system 10 attributed to execution of the particular database operation 3701.*i*. For example, if energy utilization measured by some or all of the database system as a whole was measured as a value X (e.g. for one or more energy utilization metrics) across a temporal period in which database operation 3701.*i* was executed, and if value Y is value 3718 determined to be energy utilization consumed by the database operation, a value Z=X−Y is thus the energy utilization that would have been expected to have been consumed over the temporal period if the database operation had not been executed. While X can be directly measurable (e.g. based on power meters or other power consumption monitoring of the database system 10 as a whole, or one or more particular discrete portion of database system 10), the value Y may correspond to an estimate for how much of the energy utilization X is attributed to the database operation 3701.*i*, even in the case where database operation 3701.*i* was already executed.

Figure 27B:
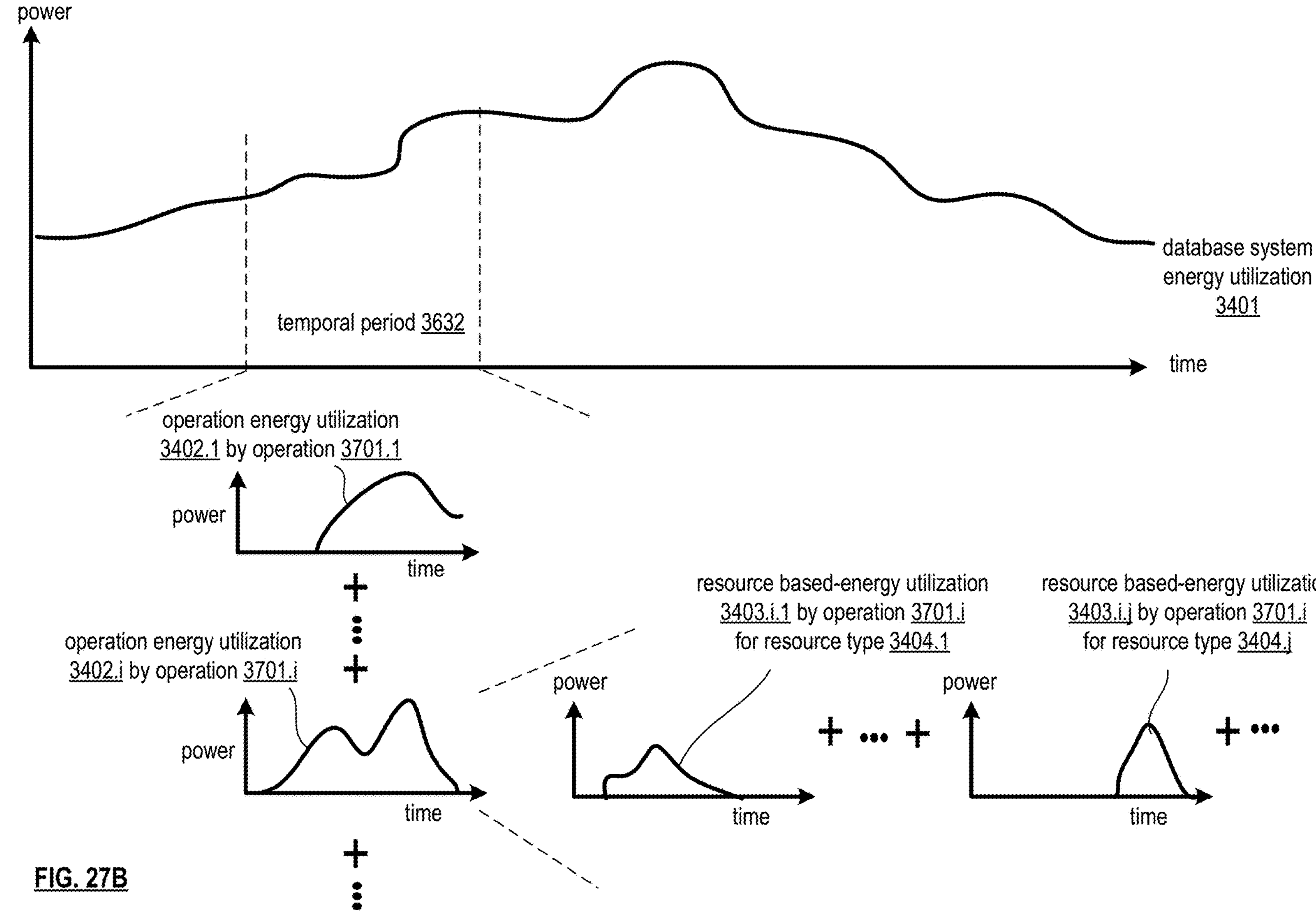
FIG. 27B illustrate example database system energy utilization in accordance with various embodiments.

FIG. 27B illustrates an example of how energy utilization by database system 10 over a period of time is rendered via energy utilization induced via various operations 3701 during this period of time. In particular, during a particular time period 3632, database system energy utilization 3401 (e.g. power consumption over the temporal period 3632 as plotted in FIG. 27B) can be induced by energy utilization 3402 of each of a plurality of operations executing during this temporal period 3632 (e.g. where some of all of these operations execute concurrently for some or all portions of the time period).

For example, a spike in power of database system energy utilization 3401 near the end of temporal period 3632 can be based on higher power consumption of energy utilization 3402.1 and 3402.*i* induced by executing operations 3701.1 and 3701.*i* at this time, respectfully. For example, the power consumed at a particular time is a summation of power consumed to execute all operations at that particular time (e.g. as well as additional power consumed for other functionality of database system 10 requiring power at the particular time).

Furthermore, corresponding energy utilization 3402.*i* of a given operation 3701.*i* can be induced by energy utilization 3403 by each of a plurality of resources having corresponding/different resource types 3404. For example, a spike in power of operation energy utilization 3402.*i* near the end of temporal period 3632 can be based on a large spike in power consumed by operation 3701.*i* via resource type 3404.*j* at this time, and/or a smaller prior spike at a previous time can be induced based on a small spike in power consumed by operation consumed by operation 3701.*i* via resource type 3404.1 at this previous time. The resource based-energy utilization 3403 can each correspond to energy utilization of a given device (e.g. given computing device 18), and/or across a plurality of devices of a particular type (e.g. resource based-energy utilization 3403.*i*.1 corresponds to drive-based energy utilization for resource type 3404.1 corresponding to a drive-based resource type; resource based-energy utilization 3403.*i*.2 corresponds to processor-based energy utilization for resource type 3404.2 corresponding to a processor-based resource type; resource based-energy utilization 3403.*i*.3 corresponds to memory-based energy utilization for resource type 3404.3 corresponding to a memory-based resource type; and/or resource based-energy utilization 3403.*i*.4 corresponds to network-based energy utilization for resource type 3404.4 corresponding to a network-based resource type).

Figure 27C:
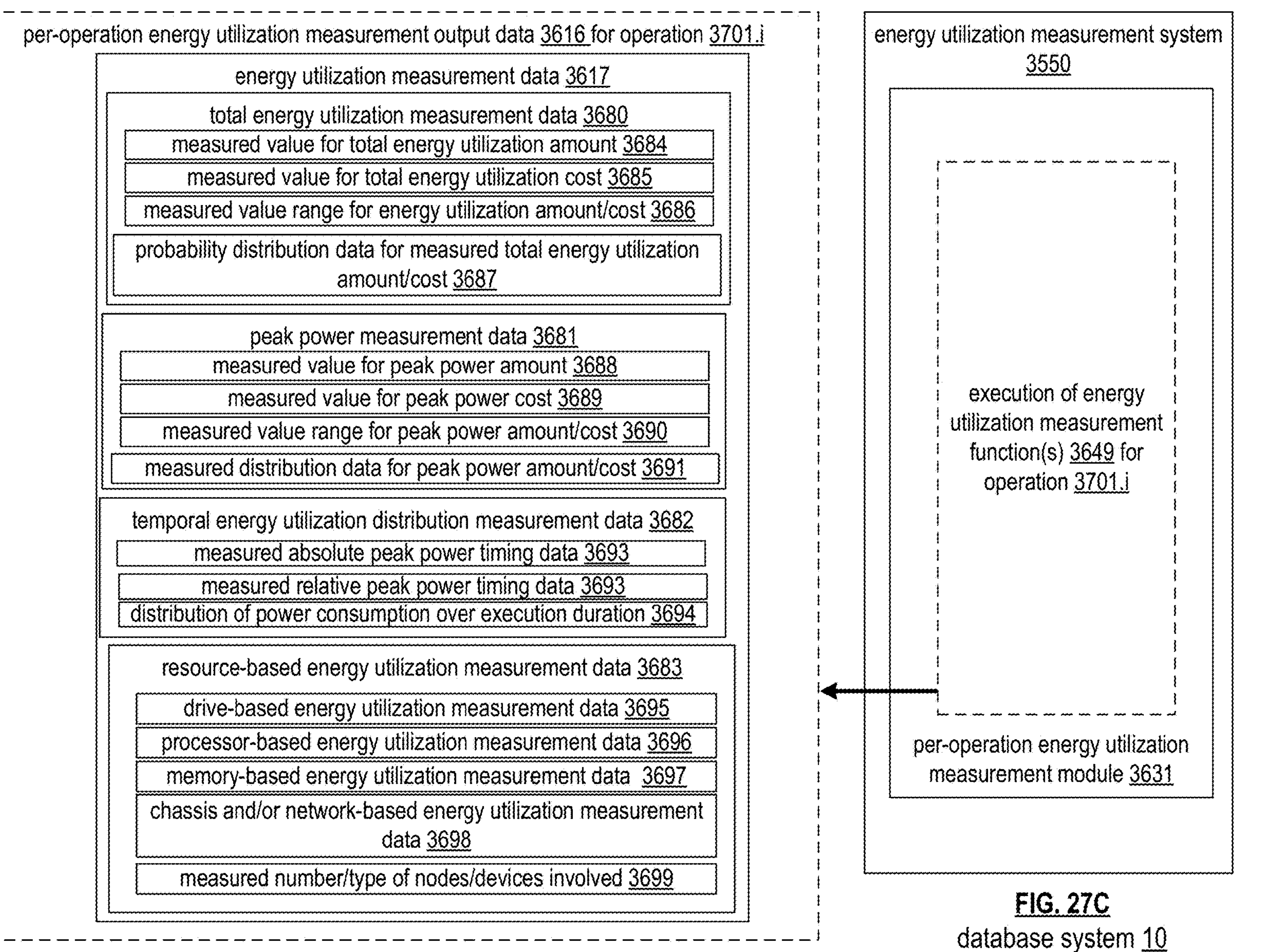

FIG. 27C illustrates an example of energy utilization measurement data 3617 of energy utilization measurement output data 3616 for operation 3701.*i* generated by energy utilization measurement system 3550. The energy utilization measurement data 3617 can include total energy measurement data 3680, peak power measurement data 3681, temporal energy utilization distribution measurement data 3682, and/or resource type-based energy utilization measurement data 3683.

The total energy measurement data 3680 can characterize how much energy, and/or associated monetary cost, was required to execute the database operation 3701.*i* over the duration of the database operation (e.g. as a portion of all energy consumed by the database system during the temporal period in which the database operation is executed). The total energy measurement data 3680 can indicate a measured value for total energy utilization measurement amount 3684 (e.g. a singular value) corresponding to a value indicating total amount of energy utilized (e.g. expressed in kilowatt-hours, measure of energy, integral and/or summation of power utilization by the database operation over a corresponding temporal period in which the database operation was executed, and/or as a value for any of the energy utilization-based metrics described herein). The total energy measurement data 3680 can alternatively or additionally include a measured value for total energy utilization cost 3685, which can indicate a total energy utilization cost (e.g. a singular value, for example, corresponding to price/monetary/carbon credit/carbon offset) corresponding to a value indicating cost/price of the total amount of energy utilized. The total energy measurement data 3680 can alternatively or additionally include a measured value range for energy utilization amount and/or cost 3686 corresponding to a range (e.g. bounded by max and min values, a confidence interval, etc.) of value that the actual value for total energy utilization amount and/or total energy utilization cost is known/expected to fall within. The total energy measurement data 3680 can alternatively or additionally include probability distribution data (e.g. expected value and/or standard deviation, parameters defining a PDF or PMF for the corresponding distribution curve, etc.) for measured total energy utilization amount and/or cost 3687.

The peak power measurement data 3681 can characterize a maximum amount of power, and/or associated monetary cost, that was required to execute the database operation 3701.*i* at any given time during the temporal period in which the database operation was executed. In some cases, peak power of the database system as a whole occurred at this time (e.g. the spike in power required at the given time to execute database operation 3701.*i* was substantial enough to render corresponding peak power across the database system during the temporal period in which the database operation was executed, and/or across a longer period of time, for example, due to being more significant than other concurrent activities by the database system over the temporal period and/or more significant than additional activities over the longer period of time). In other cases, peak power of the database system occurred at a different time (e.g. the peak power for the operation was not substantial enough to render peak power by the database system as a whole at that time, for example, due to other concurrently executed database operations with their own spikes in power also having been executing at different times, having been load balanced such that various peak powers of various database operations did not compound, another database operation having a larger peak power during a different time in the temporal period, etc.).

The peak power measurement data 3681 can include a measured value for peak power amount 3688 (e.g. a singular value, expressed in kilowatts, corresponding to a maximum power induced by the database operation 3701.*i* over a temporal period in which the database operation was executed, optionally expressed in kilowatt-hours or other energy measure for a small time window (e.g. a second or fraction of a second) within the temporal period the database operation was executed having highest energy consumption over all time windows within the temporal period, and/or as a value for any of the energy utilization-based metrics described herein). The peak power measurement data 3681 can include a measured value for peak power cost 3689, which can indicate cost attributed to the peak power amount (e.g. a singular value, for example, corresponding to price/monetary/carbon credit/carbon offset). The total energy measurement data 3671 can alternatively or additionally include a measured value range for peak power amount and/or cost 3690 corresponding to a range (e.g. bounded by max and min values, a confidence interval, etc.) of value that the actual value for peak power amount and/or peak power cost is known/expected to fall within. The total energy measurement data 3681 can alternatively or additionally include probability distribution data (e.g. expected value and/or standard deviation, parameters defining a PDF or PMF for the corresponding distribution curve, etc.) for measured total peak power amount and/or cost 3691.

The temporal energy utilization distribution measurement data 3682 can characterize power consumption by the database operation over time, for example, based on a measured execution duration of time indicating how long the execution of database operation 3701.*i* lasted (e.g. length of the corresponding temporal period in which the database operation 3701.*i* was executed). This can characterize when power spiked/dipped during execution of the database operation, for example, based on some portions of the database operation's execution requiring more power than others.

The temporal energy utilization distribution measurement data 3682 can include measured absolute peak power timing data 3692 indicating when the peak power of the database operation occurred, for example, in a standardized time measure across the database system 10 (e.g. a time in coordinated universal time (UTC) time; occurred in the daytime vs. in the nighttime; occurred over the weekend vs. during a weekday, etc. (e.g. expressed as a singular time value, time range, and/or probability distribution value for the absolute time). The temporal energy utilization distribution measurement data 3682 can alternatively or additionally include measured relative peak power timing data 3693 indicating when the peak power occurred relative to the temporal period in which the database operation was executed (e.g. after 3 seconds of execution; when the operation was 20% complete; after 15% of the total duration of the database operation execution elapsed, etc.; expressed as a singular time value, time range, and/or probability distribution value for the absolute time). The temporal energy utilization distribution measurement data 3682 can alternatively or additionally include indicating distribution of power consumption over the execution duration 3694 (e.g. power utilization attributed to the database operation execution across a plurality of instantaneous points in time during the temporal period, energy utilization across a plurality of clock cycles/short time windows within the temporal period, a function definition defining a corresponding curve for power consumption as a function of time, etc.), and/or can otherwise indicate times that other spikes in power consumption induced by the database operation occurred (e.g. over a predetermined threshold amount), times that dips in power occurred (e.g. under a predetermined threshold amount), etc. (e.g. expressed as a singular time values, time ranges, and/or probability distribution value for the absolute times, mapped to corresponding power levels).

The resource-based energy utilization measurement data 3683 can characterize how energy utilization by the database operation's execution is dispersed across different resources of the database system. This can be useful in identifying which resources experience the greatest power draw. power spikes, and/or highest contribution to energy utilization cost in executing the corresponding database operation.

The resource-based energy utilization measurement data 3683 can include drive-based energy utilization measurement data 3695 indicating drive-based energy utilization induced via execution of the database operation, such as energy utilization by storage devices of database system 10 in executing the given database operation, for example, based on the database operation 3701.*i* including steps that involve storing and/or accessing data (e.g. via IO operators and/or execution of an IO pipeline) in these storage devices and/or correspond to operations involving persistent storage of data. The drive-based energy utilization measurement data 3695 can include energy utilization measurement data 3680, peak power measurement data 3681, and/or temporal energy utilization distribution measurement data 3682 attributed specifically to drive-based resources (e.g. total energy utilization amount/cost value/range/probability distribution data attributed specifically to drive-based resources; peak power amount/cost value/range/probability distribution data attributed specifically to drive-based resources; peak power timing/power distribution values, ranges, and/or probability distribution data attributed specifically to drive-based resources; etc.). The drive-based energy utilization measurement data 3695 can optionally further indicate distribution of such drive-based energy consumption across different types of storage devices.

The resource-based energy utilization measurement data 3683 can include processor-based energy utilization measurement data 3696 indicating processor-based energy utilization induced via execution of the database operation, such as energy utilization by processor devices of database system 10 in executing the given database operation, for example, based on the database operation 3701.*i* including steps that involve processing data via these processing devices. The processor-based energy utilization measurement data 3696 can include energy utilization measurement data 3680, peak power measurement data 3681, and/or temporal energy utilization distribution measurement data 3682 attributed specifically to processor-based resources (e.g. total energy utilization amount/cost value/range/probability distribution data attributed specifically to processor-based resources; peak power amount/cost value/range/probability distribution data attributed specifically to processor-based resources; peak power timing/power distribution values, ranges, and/or probability distribution data attributed specifically to processor-based resources; etc.). The processor-based energy utilization measurement data 3696 can optionally further indicate distribution of such processor-based energy consumption across different types of processors (e.g. different types of processing devices, different types of processing cores within multi-core processing devices etc.).

The resource-based energy utilization measurement data 3683 can include memory-based energy utilization measurement data 3697 indicating memory-based (e.g. for non-storage-based memory) energy utilization induced via execution of the database operation, such as energy utilization by memory devices of database system 10 in executing the given database operation, for example, based on the database operation 3701.*i* including steps that involve storing intermediate data (e.g. hash maps, pages of rows, etc.) generated in executing the database operation via these memory devices. The memory-based energy utilization measurement data 3697 can include energy utilization measurement data 3680, peak power measurement data 3681, and/or temporal energy utilization distribution measurement data 3682 attributed specifically to memory-based resources (e.g. total energy utilization amount/cost value/range/probability distribution data attributed specifically to memory-based resources; peak power amount/cost value/range/probability distribution data attributed specifically to memory-based resources; peak power timing/power distribution values, ranges, and/or probability distribution data attributed specifically to memory-based resources; etc.). The memory-based energy utilization measurement data 3697 can optionally further indicate distribution of such memory-based energy consumption across different types of memory (e.g. RAM vs. cache memory, etc.).

The resource-based energy utilization measurement data 3683 can include chassis and/or network-based energy utilization measurement data 3698 indicating network-based/chassis-based energy utilization induced via execution of the database operation, such as energy utilization by network devices of database system 10 in executing the given database operation, for example, based on the database operation 3701.*i* including steps that involve communicating data between devices (e.g. between nodes 37 at same or different levels of a query execution plan, etc.) and/or involve accessing external networks (e.g. the internet). in executing the database operation via these network devices. The network-based energy utilization measurement data 3698 can include energy utilization measurement data 3680, peak power measurement data 3681, and/or temporal energy utilization distribution measurement data 3682 attributed specifically to network-based resources (e.g. total energy utilization amount/cost value/range/probability distribution data attributed specifically to network-based resources; peak power amount/cost value/range/probability distribution data attributed specifically to network-based resources; peak power timing/power distribution values, ranges, and/or probability distribution data attributed specifically to network-based resources; etc.). The network-based energy utilization measurement data 3698 can optionally further indicate distribution of such network-based energy consumption across different types of network devices.

Figure 27D:
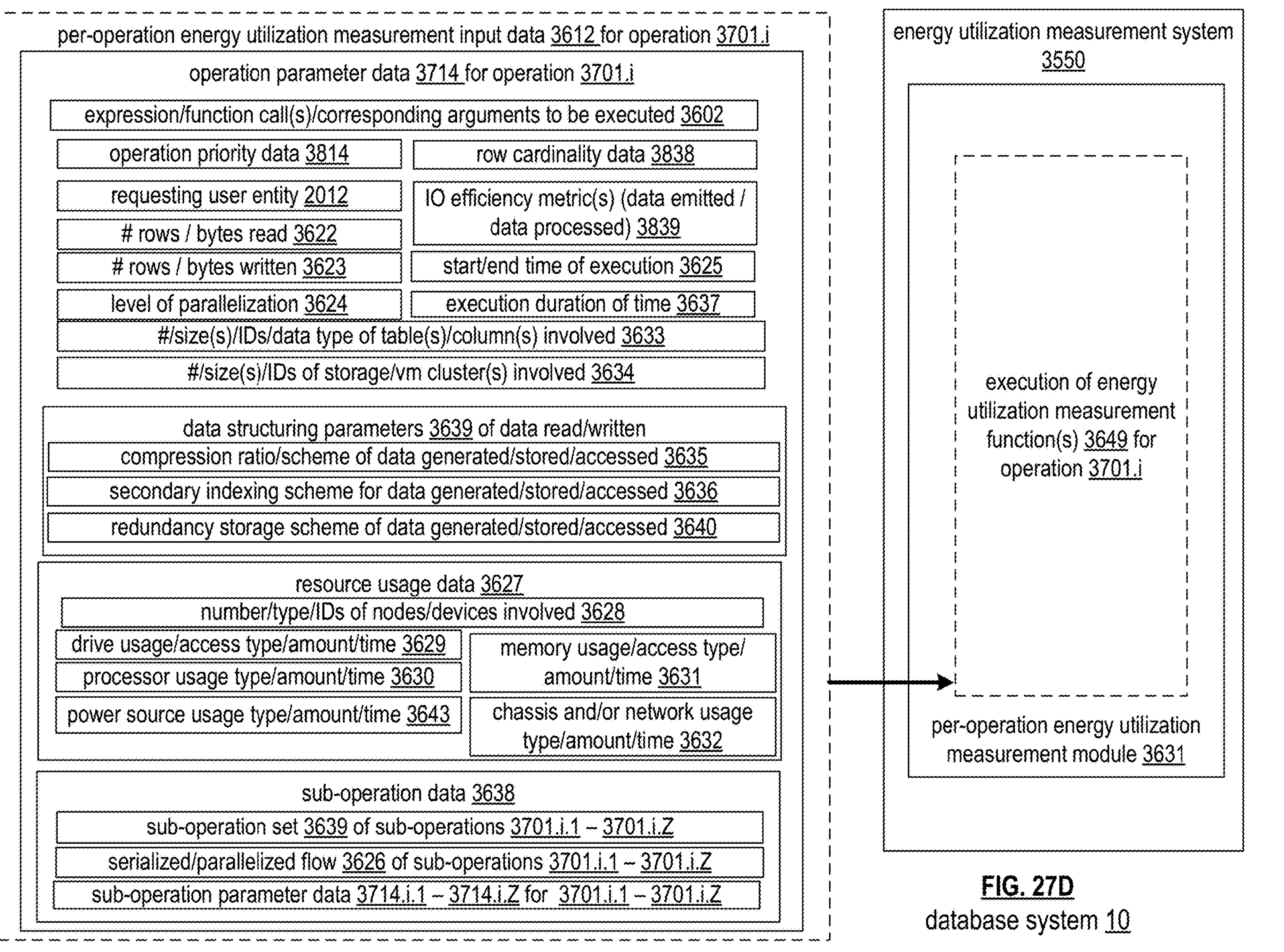

FIG. 27D illustrates example parameters of operation parameter data 3614 of energy utilization measurement input data 3612 for operation 3701.*i*, for example, generated by energy utilization measurement system 3550 or otherwise determined as parameters characterizing the operation 3701.*i* for which energy utilization measurement data (and/or other output by energy utilization processing system 3500) is to be generated.

In particular, parameters specific to the given operation 3701.*i* can impact the energy utilization induced in executing the corresponding operation. Thus, different operations 3701.*i*, and/or even different instances of the same operation having some or all different parameters of their respective operation parameter data 3714, can have different respective per-operation energy utilization (e.g. measured and/or estimated by the energy utilization processing system 3500) induced by differences in their respective operation parameter data 3714.

Some or all operation parameters of operation parameter data 3614 can be determined/determinable prior to execution of the operation 3701.*i*, for example, as defined in an instruction/expression defining the operation 3701.*i* Other operation parameter data 3614 optionally cannot be determined until the execution of operation 3701.*i* has begun/completed, for example, based on being based on the state of the database system 10. Some or all operation parameters of operation parameter data 3614 can be automatically measured/estimated by the energy utilization processing system 3500 for the corresponding operation based on the expression/instructions for the given operation (e.g. prior to execution), based on the state of the database system 10 (e.g. prior to, during, and/or after execution), and/or based on measurements/monitoring during the execution of the of the operation.

In some embodiments, some or all operation parameters of operation parameter data 3614 are fixed, for example, based on constraints/requirements for executing the corresponding operation 3701.*i*. In some embodiments, some or all operation parameters of operation parameter data 3614 are automatically selected/configured by the energy utilization processing system 3500 for the operation 3701.*i* prior to being performed, for example, to improve energy utilization for the operation 3701.*i* and/or for the database system as a whole (e.g. in scheduling and/or optimizing the corresponding operation as discussed in further detail herein).

Some or all features of operation parameter data 3614 of FIG. 27D can implement any embodiment operation parameter data 3714 described herein, including operation parameter data 3714 used as input for other functions of other systems of energy utilization processing system 3500 described herein, where any of the other outputs (e.g. scheduling data, optimization data, restriction data, etc.) generated by any system of energy utilization processing system can be generated as a function of one or more parameters of operation parameter data 3614 of FIG. 27D.

The operation parameter data 3614 can include (and/or can be defined based on) an expression (and/or one or more function calls with corresponding configured arguments) to be executed 3602. For example, the expression/function call/corresponding arguments is defined/indicated in a corresponding request (e.g. generated by/received from a user entity such as a person or automated system) to execute the operation and/or otherwise defines the operation to be executed.

The operation parameter data 3614 can include operation priority data 3814, which can indicate a priority value for the operation 3701.*i* (e.g. relative to other operations). This can be based on an urgency of executing the corresponding operation (e.g. a query related to an amber alert is more time-critical than an administrative function to log activity) and/or a priority of a corresponding user. The operation priority data 3814 can be configured in conjunction with workload management. The operation priority data 3814 can be indicated in a request for execution of the corresponding operation 3701.*i*. The operation priority data 3814 can be generated/updated/configured via implementing some or all features and/or functionality query scheduling and/or WLM described herein, for example, to schedule queries in accordance with query priority. For example, operation priority data 3814 can be relevant in constricting when/how soon/how quickly the operation is executed, which can impact energy utilization (e.g. operations executed more quickly can induce higher/less favorable energy utilization; operations executed sooner can constrain scheduling strategies used to reduce peak power, etc.).

The operation parameter data 3614 can alternatively or additionally include a requesting user entity 2012 (e.g. via a corresponding identifier value identifying the user entity 2012). For example, requesting user entity 2012 can be relevant in constricting how the corresponding operation is prioritized, scheduled, and/or configured for execution, which can impact energy utilization.

The operation parameter data 3614 can alternatively or additionally indicate an amount of data (e.g. number of rows and/or bytes) read 3622 in executing the corresponding operation 3701.*i*. This can correspond to a known and/or estimated amount of data to be read, determined prior to execution of the corresponding operation 3701.*i*. This can correspond to a known and/or estimated amount of data that was determined to be read after execution of the corresponding operation 3701.*i*. The amount of data read 3622 can correspond to data read from particular memory, such as disk memory/storage resources (e.g. rows read from relational database tables in database storage, for example, via execution of IO operators). The amount of data read 3622 can correspond to data read from other memory, such as RAM and/or cache memory (e.g. reading from a hash map or other structure maintained in memory only for the life of the corresponding operation). For example, amount of data read 3622 can be relevant as higher amounts of data read 3622 can contribute to higher/less efficient memory utilization.

The operation parameter data 3614 can alternatively or additionally indicate an amount of data (e.g. number of rows and/or bytes) written 3623 in executing the corresponding operation 3701.*i*. This can correspond to a known and/or estimated amount of data to be written, determined prior to execution of the corresponding operation 3701.*i*. This can correspond to a known and/or estimated amount of data that was determined to be written after execution of the corresponding operation 3701.*i*. The amount of data written 3623 can correspond to data written to particular memory, such as disk memory/storage resources (e.g. new rows written added relational database tables in database storage). The amount of data written 3623 can correspond to data written to other memory, such as RAM and/or cache memory (e.g. writing a hash map or other structure written to memory only for the life of the corresponding operation). For example, amount of data written 3623 can be relevant as higher amounts of data written 3623 can contribute to higher/less efficient memory utilization.

The amount of data written 3623 can optionally correspond to (and/or operation parameter data 3614 can otherwise indicate) size of data blocks written (e.g. even if a total amount of data being written is fixed, amount of data written can relate to how many blocks the data is written to and/or size of each data block). For example, write operations that are consolidated (e.g. via queueing data to be written until a threshold amount of data is reached) to write to larger chunks (e.g. larger than 4 k blocks) can render lower energy utilization and/or data of a given write operation chunked into a smaller number of large chunks (e.g. larger than 4 k blocks) can render lower energy utilization.

In some embodiments, the amount of data written can be processed differently in estimating energy utilization than the amount of data read. For example, writing a given amount of data can be known/estimated induce greater energy utilization than reading this amount of data.

The operation parameter data 3614 can alternatively or additionally indicate a level of parallelization 3624 (e.g. how many parallelized nodes/processing core resources/threads are executing in parallel, concurrently; how many nodes participate in a given shuffle node set; etc.). For example, level of parallelization 3624 can be relevant as higher amounts of level of parallelization 3624 can contribute to higher/less efficient energy utilization (e.g. greater power consumption at the given time that parallelized resources process a plurality of data in parallel vs. if this data was processed serially, which can contribute to peak power).

The operation parameter data 3614 can alternatively or additionally indicate row cardinality data 3838. For example, the row cardinality data 3838 indicates row cardinality of data to be accessed (e.g. in a query, for example, where this data is filtered and/or processed to generate a query resultant) and/or stored (e.g. as segments or other storage formatted data structure). The row cardinality 3614 can impact how efficiently the operation can be executed, for example, by impacting how much data is processed (e.g. size/memory consumed by a hash map being built during the execution; amount of data processed during 10/filtering of a corresponding query; etc.). For example, higher row cardinality indicated by row cardinality data 3838 can be relevant as it can induce higher levels of processing which can contribute to higher/less efficient memory utilization. In some embodiments, the row cardinality data can be related to efficiency of grouping rows by cluster key, relevant to IO efficiency in generating segments and/or accessing/filtering rows of these segments.

The operation parameter data 3614 can alternatively or additionally indicate IO efficiency metrics 3839 (e.g. such as a ratio of data emitted vs data processed). For example, higher/more favorable IO efficiency indicated by IO efficiency metrics 3839 can be relevant as it can induce lower levels of processing which can contribute to lower/more efficient memory utilization. The IO efficiency metrics can be implemented as any embodiment of secondary indexing efficiency metrics and/or any means of evaluating IO efficiency described herein.

The operation parameter data 3614 can alternatively or additionally indicate start and/or end time of execution 3625 and/or execution duration of time 3637. For example, higher duration of execution can contribute to higher/less favorable memory utilization, or optionally lower/more efficient memory utilization in the case where peak power is reduced via longer overall execution. The actual start and end times (e.g. relative to times that other operations/functionality of the database system was performed) can be relevant in impacting peak power by the database system (e.g. based on whether many operations are executed simultaneously, which can induce higher peak power by the database system than the case where execution of these operations is spread out over time).

The operation parameter data 3614 can alternatively or additionally indicate one or more relational database tables and/or columns involved 3633, for example, indicating how many tables and/or columns are involved, their corresponding sizes, corresponding types of data (E.g. integer vs. string vs. float etc.) stored in the tables/columns, corresponding table names/identifiers and/or corresponding column names/identifiers (e.g. mapped to additional information regarding these tables/columns that is considered part of the operation parameter data). For example, a greater numbers of tables and/or greater numbers of rows across these tables (e.g. to be written to storage and/or accessed in storage) can be relevant as it can induce higher levels of processing which can contribute to higher/less efficient memory utilization. As another example, a greater numbers of columns and/or columns having larger data types (e.g. floats vs Boolean values) can be relevant as it can induce higher levels of processing which can contribute to higher/less efficient memory utilization.

The operation parameter data 3614 can alternatively or additionally indicate one or more storage clusters and/or computing clusters (e.g. vm clusters involved) 3634, for example, indicating how many clusters are involved, their corresponding sizes, and/or corresponding cluster identifiers (e.g. mapped to additional information regarding these clusters that is considered part of the operation parameter data). For example, each storage/computing cluster can include a set of nodes 37. For example, a greater number of clusters and/or greater number of nodes across these clusters (e.g. to store new data, to access their data, and/or to process data, for example, as part of a query execution plan or loading operation) can be relevant as it can induce higher levels of processing which can contribute to higher/less efficient memory utilization.

The operation parameter data 3614 can indicate data structuring parameters 3639 of data read and/or written in executing the operation 3701.*i*. For example, the data structuring parameters 3639 can impact: energy utilization required to generate storage formatted data structures for storage; energy utilization required to maintain storage of storage formatted data structures; energy utilization required to guarantee persistent storage of storage formatted data structures (e.g. to migrate/rebuild the storage formatted data structures over time for example, in anticipating/responding to outages and/or rebalancing the system); and/or energy utilization required to access the underlying data stored via the storage formatted data structures.

The data structuring parameters 3639 can indicate a compression scheme (e.g. corresponding compression ratio) of data generated/stored/accessed 3635. For example, greater compression ratio/greater levels of compression (e.g. less storage memory resources utilized to store particular underlying data via higher levels of compression) can be relevant as it can induce: higher/less efficient energy utilization required to compress the underlying data to generate storage formatted data structures for storage; lower/more efficient energy utilization required to maintain storage of storage formatted data structures; and/or higher/less efficient energy utilization required to decompress the storage formatted data structures to access the underlying data stored via the storage formatted data structures.

The data structuring parameters 3639 can alternatively or additionally indicate a secondary indexing scheme for data generated/stored/accessed 3636, for example, implementing any type of secondary indexing structure and/or respective secondary indexing scheme described herein. For example, higher levels of indexing (e.g. more index structures, more columns indexed, more complicated/larger index structures) can be relevant as it can induce: higher/less efficient energy utilization required to generate the index structures for storage; higher/less efficient energy utilization required to maintain storage of the index structures; and/or lower/more efficient energy utilization required to access/filter rows of the table that is indexed (e.g. in applying filtering parameters of a corresponding query).

The data structuring parameters 3639 can alternatively or additionally indicate a redundancy storage scheme for data generated/stored/accessed 3640. For example, higher levels of redundancy and/or anticipation of higher failure rates (e.g. more parity data, more duplicated data, more segments in a same segment group) can be relevant as it can induce: higher/less efficient energy utilization required to generate the index structures for storage; and/or higher/less efficient energy utilization required to guarantee persistent storage of the index structures (e.g. these higher levels of energy utilization may be required as a function of higher failure rates by the database system and/or higher probability of data not being lost being required).

The data structuring parameters 3639 can alternatively or additionally indicate targets/restrictions for size/number of rows/pages included in corresponding data structures 3101 (e.g. dictating segment size and/or size of conversion page sets). For example, larger segments and/or larger conversion page sets induce greater energy consumption (e.g. to group rows by cluster key and/or generate respective segments), despite rendering more favorable clustering by cluster key and/or other benefits.

The operation parameter data 3614 can alternatively or additionally indicate resource usage data 3627. For example, the resource usage data 3614 can be relevant at it can impact total energy utilization via execution of the operation 3701.*i* and/or energy utilization by different resources in executing the operation 3701.*i*.

The resource usage data 3614 can include number/types/location/identifiers of nodes and/or devices involved 3628 in executing the operation 3701.*i*. For example, higher amounts of nodes/devices and/or less energy efficient types of nodes/devices can be relevant as it can induce higher/less efficient energy utilization.

The resource usage data 3614 can alternatively or additionally indicate drive usage and/or access amount, type and/or time 3629 in executing the operation 3701.*i*. For example, higher amounts of drive usage, higher amounts of drive access, and/or greater amounts of time accessing/using drives can induce higher energy utilization (e.g. higher drive-based energy utilization via drive-based resources).

The resource usage data 3614 can alternatively or additionally indicate processor usage and/or access amount, type and/or time 3630 in executing the operation 3701.*i*. For example, higher amounts of processor usage and/or greater amounts of time using processors can induce higher energy utilization (e.g. higher processor-based energy utilization via processor-based resources).

The resource usage data 3614 can alternatively or additionally indicate memory usage and/or access amount, type and/or time 3631 in executing the operation 3701.*i*. For example, higher amounts of memory (e.g. non-drive; RAM and/or cache) usage, higher amounts of memory (e.g. non-drive; RAM and/or cache) access, and/or greater amounts of time accessing/using memory (e.g. non-drive; RAM and/or cache) can induce higher energy utilization (e.g. higher memory-based energy utilization via memory-based (e.g. non drive-based) resources).

The resource usage data 3614 can alternatively or additionally indicate chassis and/or network usage and/or access amount, type and/or time 3632 in executing the operation 3701.*i*. For example, higher amounts of network usage and/or greater amounts of time using network resources can induce higher energy utilization (e.g. higher processor-based energy utilization via network-based resources).

The resource usage data 3614 can alternatively or additionally indicate power source usage and/or access amount, type and/or time 3643 in executing the operation 3701.*i*. For example, different types of power sources (e.g. grid-based power vs. onsite generated power vs. battery-based power vs. super conductor-based power vs. renewable energy, etc.) induce different levels of energy utilization (e.g. particular as related to carbon footprint and/or cost of powering devices via respective different types of power).

The operation parameter data 3614 can alternatively or additionally indicate sub-operation data 3638. For example, the sub-operation data 3638 can be relevant as execution of various different sub-operations of the operation 3701.*i* it can influence energy utilization by the database operation 3701.*i*.

The sub-operation data 3638 can indicate a sub-operation set 3639 of sub-operations 3701.*i*.1-3701.*i*.Z of the operation 3701.*i*, for example, corresponding to different portions/steps of the operation (e.g. performed serially or in parallel). The sub-operation data 3638 can alternatively or additionally indicate a serialized/parallelized flow 3626 of the sub-operations 3701.*i*.1-3701.*i*.Z (e.g. an ordering the sub-operations be performed, parallelized performance of sub-operations, how output of one sub-operation is processed as input of another, etc.).

The sub-operation data 3626 can alternatively or additionally indicate sub-operation parameter data 3714.*i*.1-3714.*i*.Z for the sub-operations 3701.*i*.1-3701.*i*.Z, where each given sub-operation can have its own operation parameter data 3714 (e.g. values for some or all of the parameters of operation parameter data 3714 and/or otherwise described herein, specific to the given sub-operation). The energy utilization for the operation 3701.*i* can optionally be determined as an aggregation of/some function of the energy utilization of its individual sub-operations, for example, as discussed in conjunction with FIG. 27G.

As a particular example, the operation 3701.*i* is a query operation corresponding to a query expression that is executed via an operator execution flow 2517 (e.g. indicated by flow 3626), where sub-operations 3701.*i*.1-3701.*i*.Z each correspond to one or more sub-flow of the operator execution flow 2517 (e.g. executed at different levels of the query execution plan) and/or each correspond to operations 2520 of the operator execution flow 2517. As another example, the operation 3701.*i* includes a plurality of parallelized instances of a given process, where multiple ones of the sub-operations 3701.*i*.1-3701.*i*.Z correspond to different ones of the plurality of parallelized instances. As another example, the operation 3701.*i* includes a process performed on different data portions (e.g. different rows, different tables, different segments/storage formatted data structures) of data 2711, where performance of the process upon a given data portion corresponds to one sub-operations. As another example, any operation/function/process/functionality/step performed by database system described herein can be considered an operation 3701, and/or a sub-operation as part of a larger operation 3701.

Figures 27E, 27F:
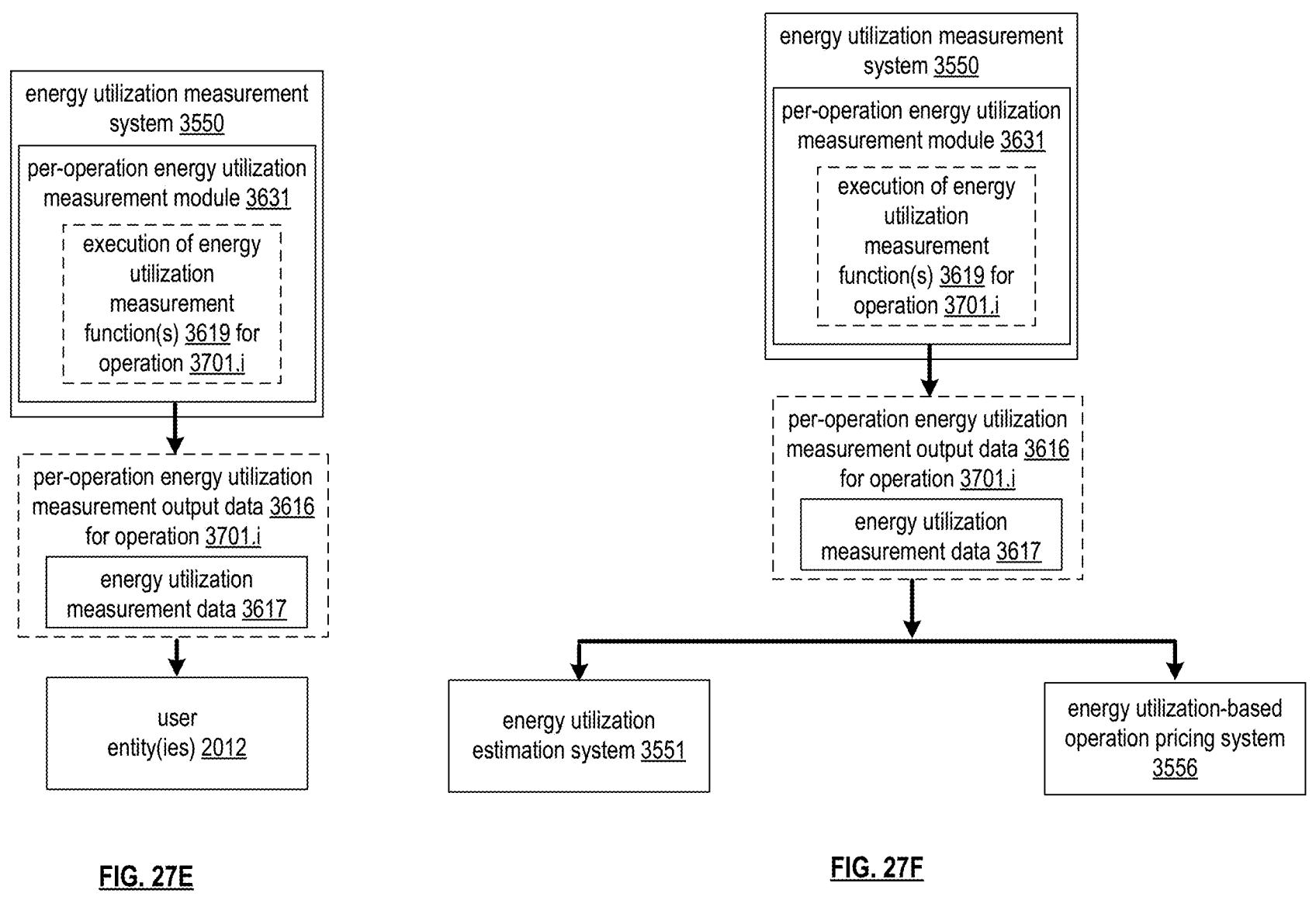

FIG. 27E-27F illustrate embodiments of how energy utilization measurement data 3617 generated by energy utilization measurement system 3550 can be processed/communicated.

As illustrated in FIG. 27E, the energy utilization measurement data 3617 generated for a given operation 3701.*i* can be communicated to a user entity (e.g. as part of log data or other aggregate data for some or all operations performed over a temporal period, such as a given hour, day, week, month or year). For example, the energy utilization measurement data is displayed via a display device (e.g. as part of a plot/table of energy utilization measurement data for multiple operation performed over the temporal period).

As illustrated in FIG. 27F, the energy utilization measurement data 3617 generated for a given operation 3701.*i* can be sent to/stored in memory accessible by other systems of the energy utilization processing system 3500. For example, energy utilization measurement data 3617 generated for a given operation 3701.*i* (and/or for a plurality of operations performed over a temporal period) can be processed by energy utilization estimation system 3551, for example, to train a model/configure a function utilized to generate estimates for subsequent operations (e.g. as historical energy utilization measurement data). As another example, energy utilization measurement data 3617 generated for a given operation 3701.*i* can be processed by energy utilization-based operation pricing system 3556, for example, to dictate how much execution of the corresponding database operation costs (e.g. how much a user entity requesting the operation be performed is charged, for example, in monetary currency, carbon offsets, etc.).

While not illustrated, the energy utilization measurement data 3617 generated for various operations 3701 can be stored in storage resources of database system 10. For example, one or more dedicated relational database tables (e.g. metadata/admin/persistent system tables) store the energy utilization measurement data 3617 for each of a plurality of operations 3701, for example, where each row of the table corresponds to one operation 3701 and stores the energy utilization measurement data 3617 for the operation (e.g. in one or more respective columns, for example, each storing the measured value for a corresponding metric).

Figure 27G:
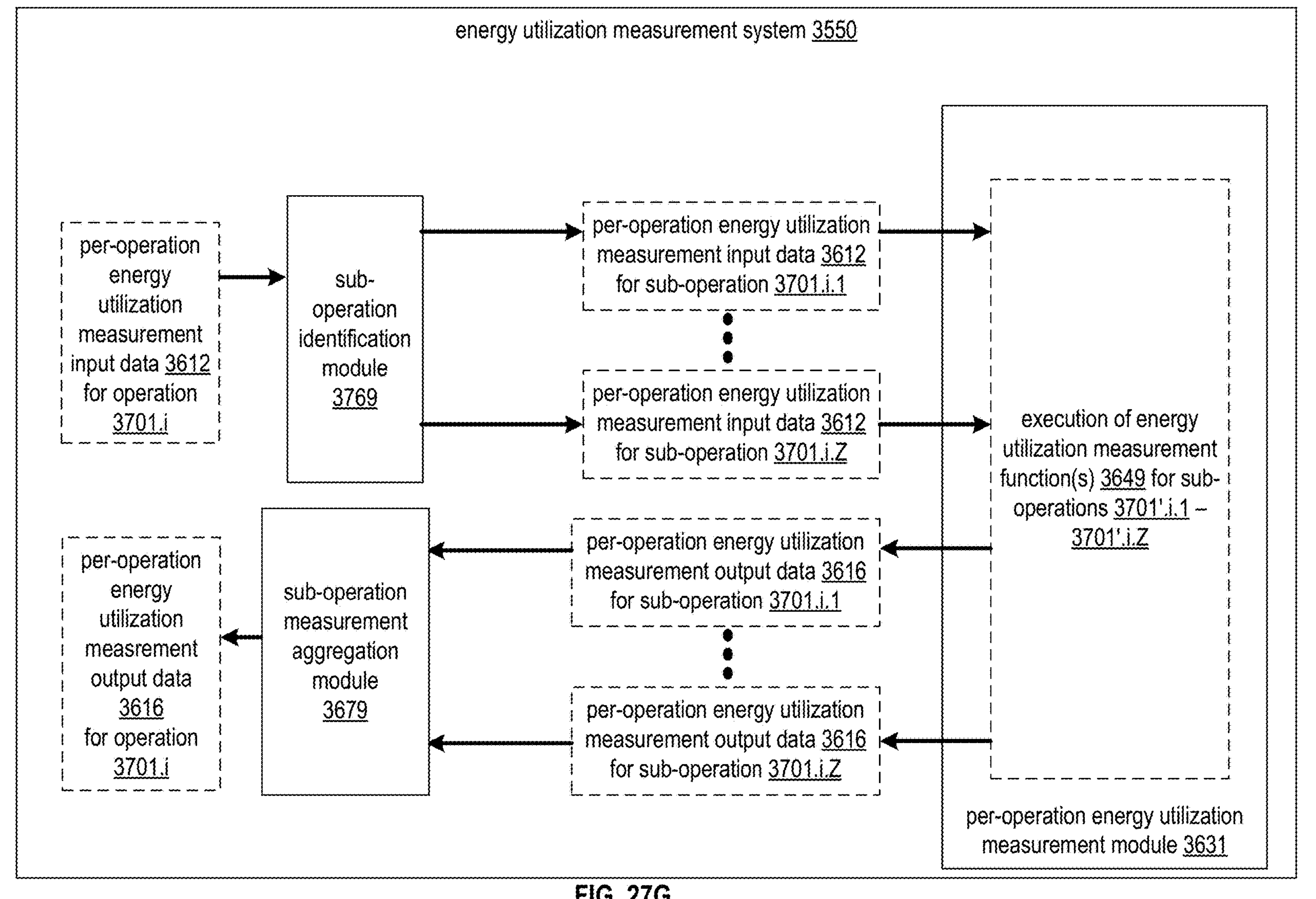

FIG. 27G illustrates an embodiment of energy utilization measurement system 3550 that generates energy utilization measurement output data 3616 for a given operation 3701.*i* as a function of its sub-operations.

In some embodiments, a sub-operation identification module 3769 can determine per-operation energy utilization input data 3612 for each of a plurality of identified sub-operations 3701.*i*.1-3701.*i*.Z (e.g. identified from sub-operation data 3638 of the operation 3701.*i*, where the per-operation energy utilization input data 3612 for each given sub-operation is optionally based on sub-operation parameter data 3714 for each given sub-operation. The energy utilization measurement function(s) 3649 can be performed to process the per-operation energy utilization measurement input data 3612 for each sub-operation (individually/separately, and/or optionally jointly) to generate corresponding per-operation energy utilization measurement output data 3616 for each sub-operation. A sub-operation measurement aggregation module 3679 can generate the per-operation energy utilization measurement data 3616 for the operation 3701.*i* as a whole as a function of the plurality of per-operation energy utilization measurement data 3616 for the plurality of its sub-operations (e.g. one or more values of the energy utilization measurement data 3617 for the operation 3701.*i* are computed as a sum of, or some other function of, corresponding values in energy utilization measurement data 3617 across all of the sub-operations 3701.*i*.1-3701.*i*.Z).

Figure 27H:
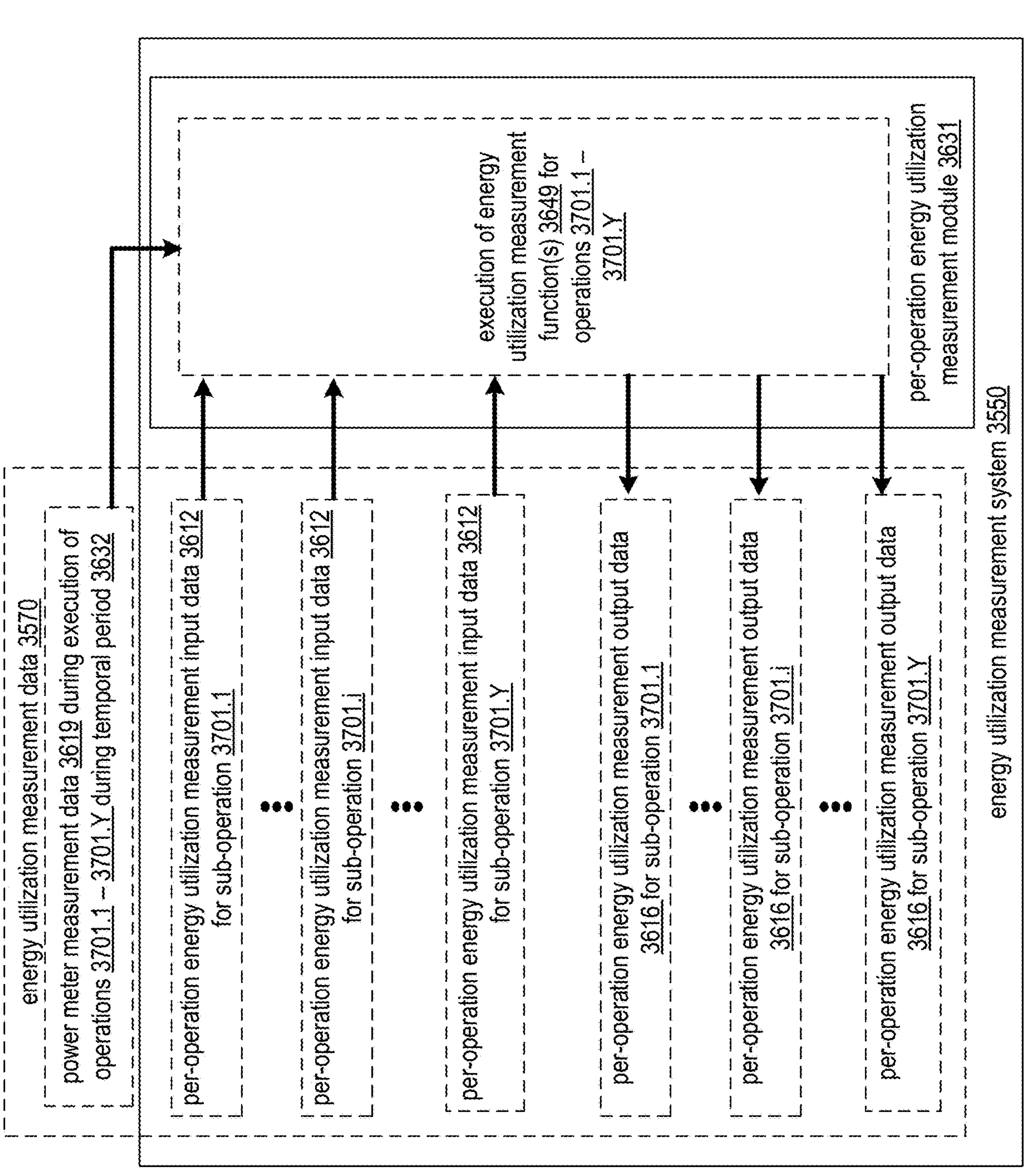

FIG. 27H illustrates an embodiment of energy utilization measurement system that generates per-operation energy utilization measurement output data 3616 for each of a plurality of operations 3701.1-3701.Y based on respective per operation energy utilization measurement input data 3612 for each of the plurality of operations 3701.1-3701.Y based on power meter measurement data 3619 collected during execution of operations 3701.1-3701.Y during temporal period 3632. For example, the power meter measurement data 3619 corresponds to and/or is utilized to determine database system energy utilization 3401, where the operation energy utilization 3402.1-3402.Y is determined in determining per-operation energy utilization output data 3616 for operations 3701.1-3701.Y based on determining which portions of database system energy utilization 3401 (as indicated in power meter measurement data 3619) are attributed to each operation (e.g. based on their respective per-operation input, for example, utilized to determine which operations were performed within which portions of the temporal period and/or did/may have had respective energy utilization/spiked in power at particular times that, when aggregated, render the total database system energy utilization 3401.

Figure 27I:
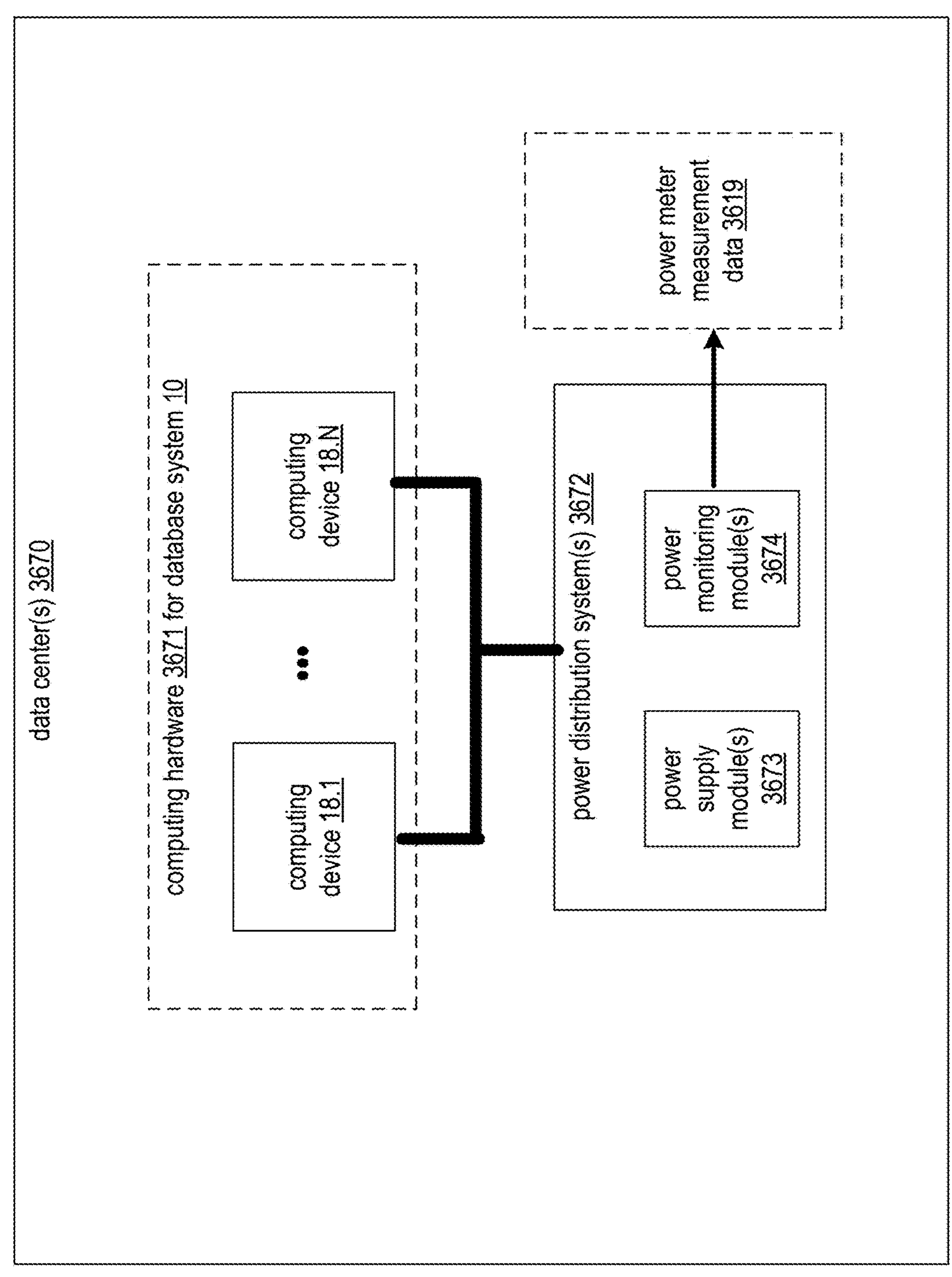
FIG. 27I is a schematic block diagram of a data center in accordance with various embodiments.

FIG. 27I illustrates an example embodiment illustrating power distribution systems 3672 of one or more data centers 3670 implementing database system 10 via computing hardware 3671 that includes a plurality of computing devices 18.1-18.N powered via one or more power supply modules of one or more power distribution systems 3672. In particular, the one or more power distribution systems 3672 can implement power monitoring modules 3674 (e.g. implemented via hardware of corresponding RPPs, PDUs, UPSs, and/or other power distribution systems), which can be operable to generate some or all power meter measurement data 3619 over time based on monitoring of and/or delivery of power to various computing devices/other computing hardware 3671 of database system 10. The power meter measurement data 3619 of FIG. 27 can implement the power meter measurement data 3619 of FIG. 27H and/or any embodiment of power meter measurement data 3619 described herein. Some or all features and/or functionality of database system 10 of FIG. 27I can be utilized to implement database system 10 of FIG. 26B.

The power meter measurement data 3619 is optionally a collection of/aggregation of a plurality of different power meter measurement data collected via a plurality of different power monitoring modules 3674 of a plurality of different power distribution systems 3672, for example, responsible for powering different portions of computing hardware 3671 (e.g. different racks/cabinets; different subsets of the plurality of computing devices 18.1 in different physical locations; different types of resources where different power meter measurement data 3619 optionally includes drive-based power meter measurement data and/or processor-based power meter measurement data and/or memory-based power meter measurement data and/or network-based power meter measurement data; and/or power via different power supply modules 3673 and/or different types of power).

Figure 27J:
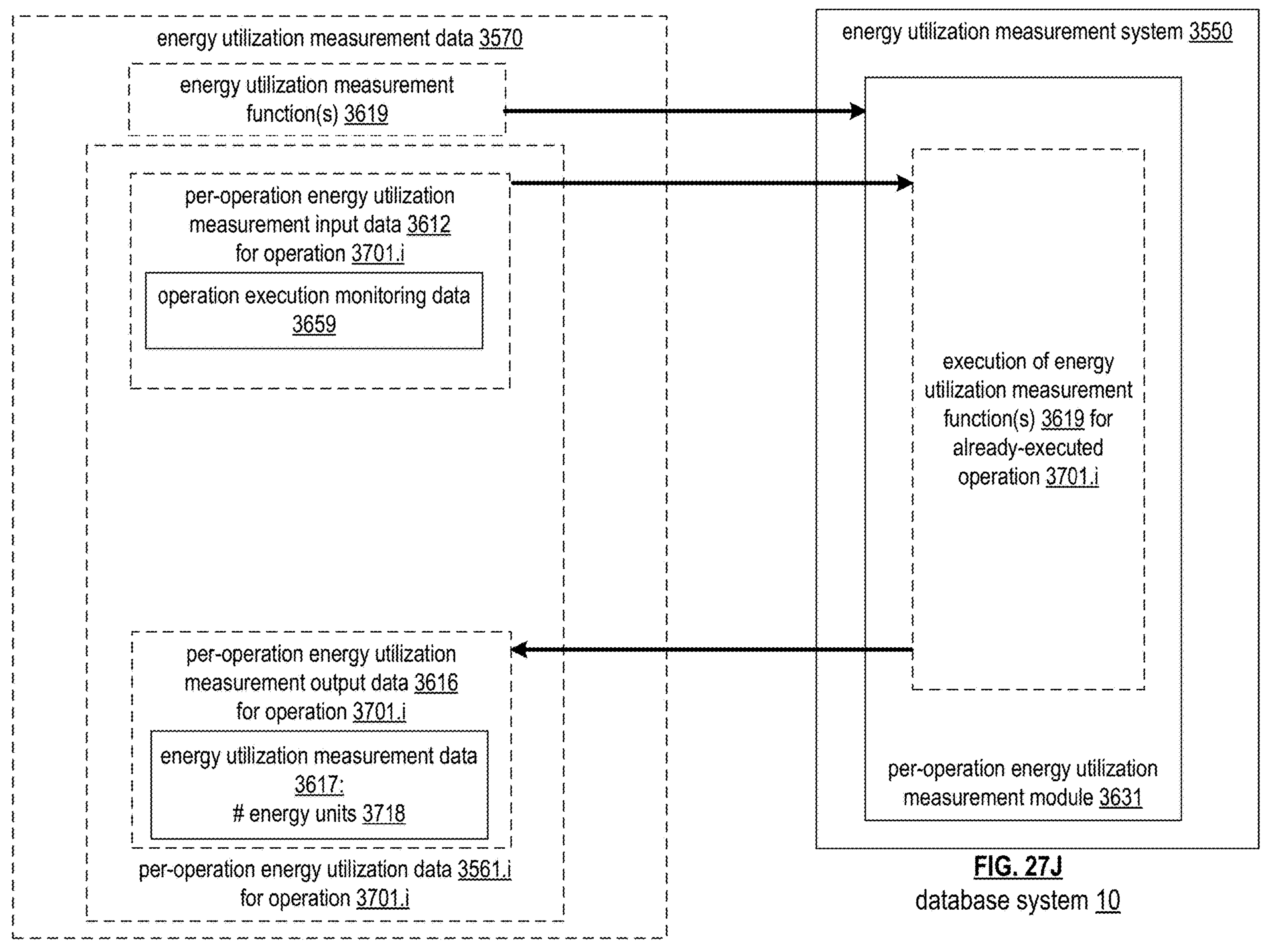
FIG. 27J is a schematic block diagrams illustrating an energy utilization measurement system in accordance with various embodiments.

FIG. 27J illustrates an embodiment where per-operation energy utilization measurement input data 3612 includes operation execution monitoring data 3659 generated, for example, during execution of operation 3701.*i*, where the energy utilization measurement data 3617 for operation 3701.*i* is generated via execution of energy utilization measurement function(s) 3649 as a function of the operation execution monitoring data 3659, alternatively or in addition to being generated as a function of some or all other input data 3612 for operation 3701.*i*.

Figure 27K:
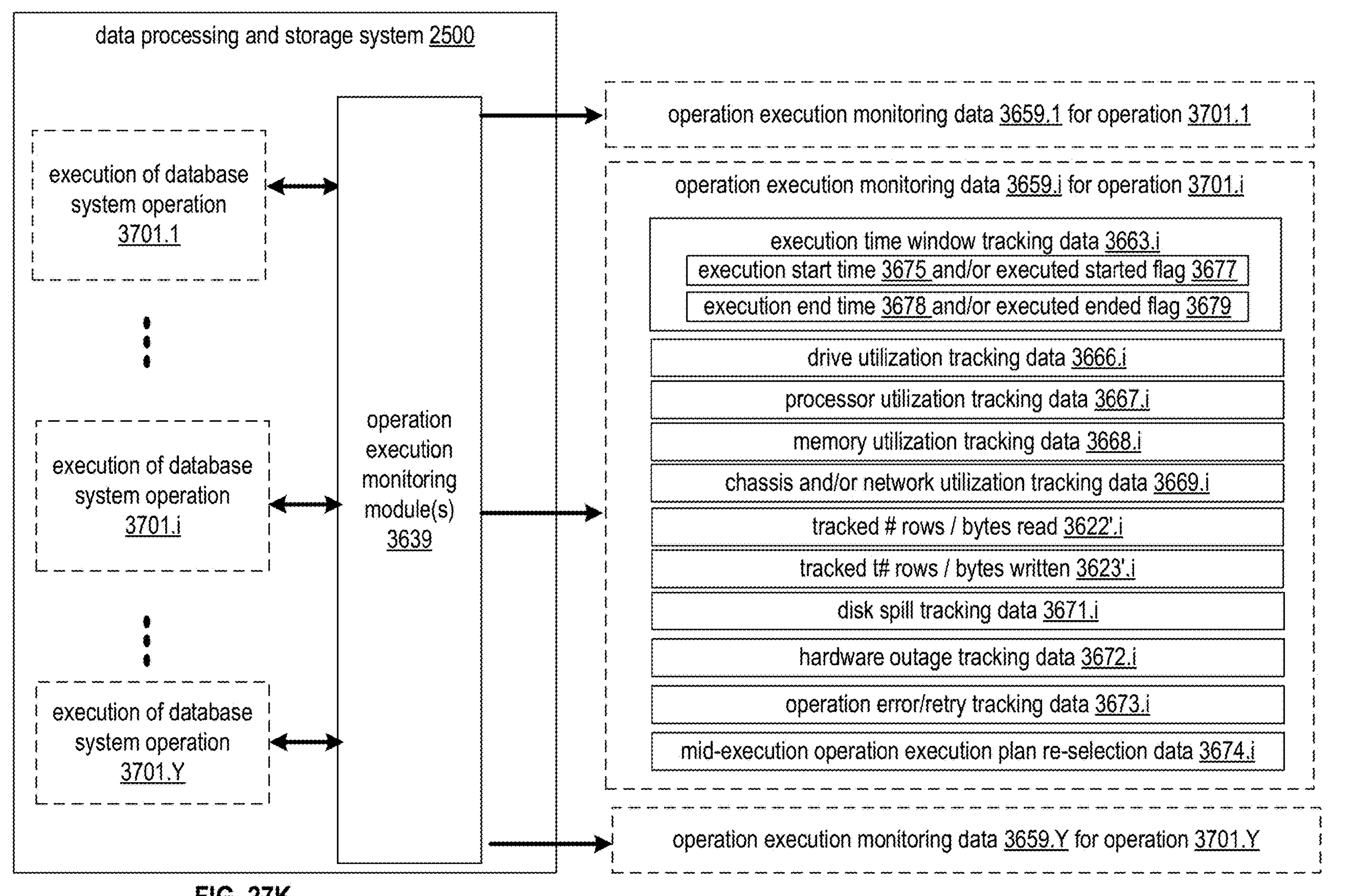
FIGS. 27K-27L are schematic block diagrams illustrating an operator execution monitoring module in accordance with various embodiments.
Figure 27L:
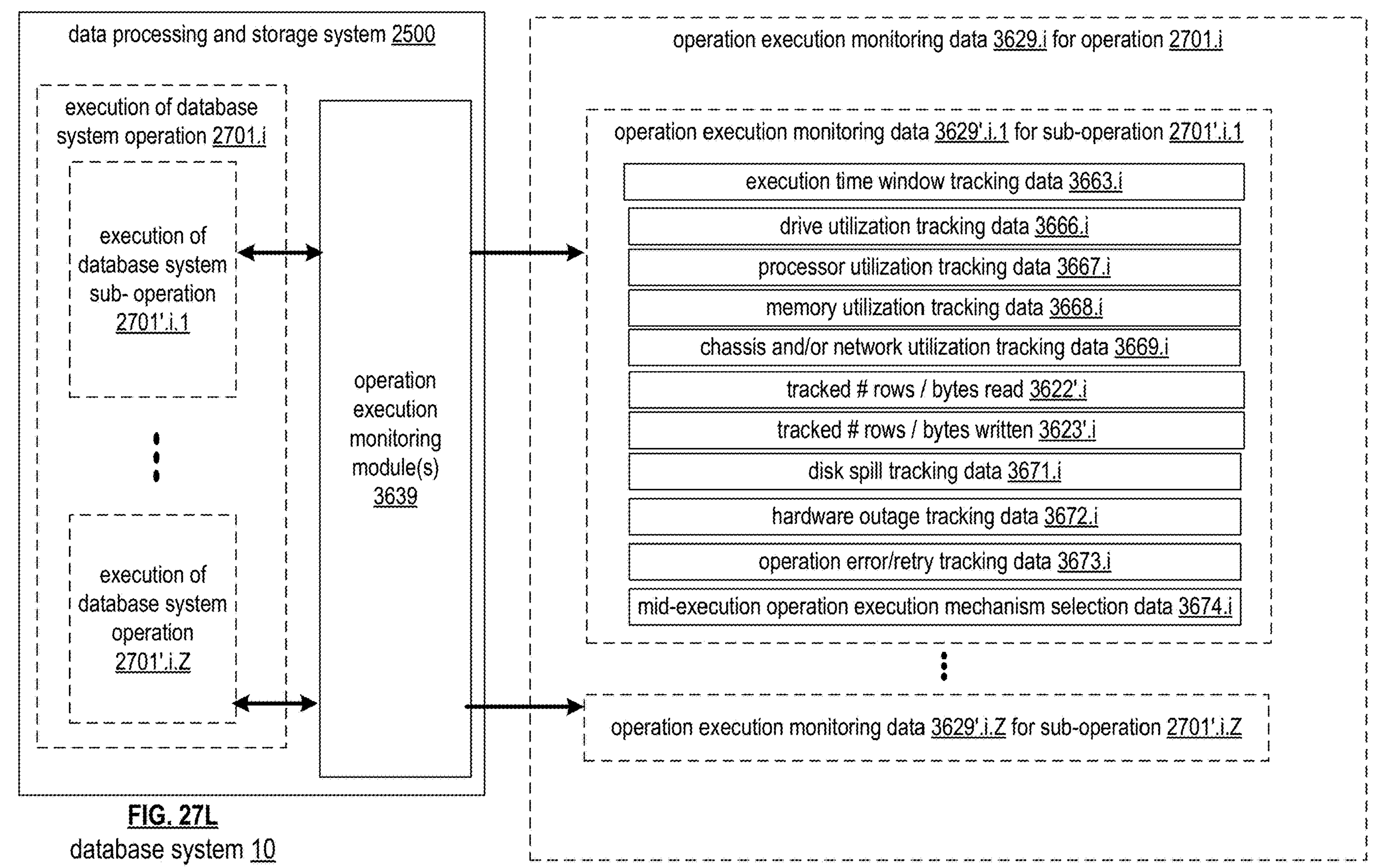

FIGS. 27K and 27L illustrates embodiments of at least one operation execution monitoring module 3639 implemented by data processing and/or storage system to generate operation execution monitoring data 3659 for a plurality of operations 3701.1-3701.Y (and/or to generate corresponding operation execution monitoring data 3629' for a plurality of sub-operations of one or more of these operations 3701) for example, that are executing concurrently and/or are executed within a same temporal period. The operation execution monitoring module 3639 can optionally be implemented by admin data logging system 3508, for example, in conjunction with performing admin/logging operations and/or monitoring operation execution. The operation execution monitoring module 3639 can be implemented by one or more computing devices 18 of database system 10 and/or any processing/memory resources of database system 10.

The operation execution monitoring data 3659.*i* generated for a given operation 3701.*i* (and/or generate for a given sub-operation 3701.*i*.1 of a given operation 3701.*i*) can include execution time window tracking data 3663.*i*. The execution time window tracking data 3663.*i* can indicate an execution start time 3675 indicating when execution initiated and/or can indicate an execution started flag 3677, for example, as a Boolean value indicating whether the operation has initiated execution or not. The execution time window tracking data 3663.*i* can alternatively or additionally indicate an execution end time 3675 indicating when execution ended and/or can indicate an execution ended flag 3679, for example, as a Boolean value indicating whether execution of the operation has ended or not.

The operation execution monitoring data 3659.*i* generated for a given operation 3701.*i* (and/or generate for a given sub-operation 3701.*i*.1 of a given operation 3701.*i*) can alternatively or additionally include: drive utilization tracking data 3666.*i* (e.g. indicating how many/how long/which particular drive-based resources are accessed/read from/written to in executing the database operation 3701.*i* or the sub-operation 3701.*i*.1); processor utilization tracking data 3667.*i* (e.g. indicating how many/how long/which particular processor-based resources are assigned to process/are utilized in executing the database operation 3701.*i* or the sub-operation 3701.*i*.1); memory utilization tracking data 3668.*i* (e.g. indicating how many/how long/which particular memory-based resources are accessed/read from/written to in executing the database operation 3701.*i* or the sub-operation 3701.*i*.1); and/or chassis and/or network utilization tracking data 36679.*i* (e.g. indicating how many/how long/which particular network-based resources are assigned to/are utilized in executing the database operation 3701.*i* or the sub-operation 3701.*i*.1).

The operation execution monitoring data 3659.*i* generated for a given operation 3701.*i* (and/or generate for a given sub-operation 3701.*i*.1 of a given operation 3701.*i*) can alternatively or additionally include tracked number of rows/byte read 3622'.i and/or tracked number of rows/byte written 3623'.i.

The operation execution monitoring data 3659.*i* generated for a given operation 3701.*i* (and/or generate for a given sub-operation 3701.*i*.1 of a given operation 3701.*i*) can alternatively or additionally include disk spill tracking data 3671.*i*, for example, indicating whether/how much data has spilled to disk in executing the corresponding operation/sub-operation. For example, this spilling to disk and/or corresponding tracking can be performed via any embodiment of spilling to disk and/or implementing a corresponding spill to disk flag described herein.

The operation execution monitoring data 3659.*i* generated for a given operation 3701.*i* (and/or generate for a given sub-operation 3701.*i*.1 of a given operation 3701.*i*) can alternatively or additionally include: hardware outage tracking data 3672, for example, indicating whether/which/how many computing devices 18/nodes 37/other computing hardware participating in execution of the operation experienced outages/required reassignment of respective tasks during their execution of the operation; and/or operation error and/or retry tracking data 3673.*i* indicating if/when/how many times an operation failed and/or required restarting/retrying via same or different hardware.

In some embodiments, some or all features and/or functionality of executing operations 3701 can be implemented via parallelized execution of tasks via a plurality of nodes, which can include assigning different tasks to different nodes for in parallel, handling of node outages and facilitating reassignment of tasks, and/or other handling of node outages and/or execution of tasks, for example, implemented via some or all features and/or functionality of assigning, executing, and/or reassigning tasks as disclosed by: U.S. Utility application Ser. No. 18/482,939, entitled "PERFORMING SHUTDOWN OF A NODE IN A DATABASE SYSTEM" filed Oct. 9, 2023. which is hereby incorporated herein by reference in its entirety and made part of the present U.S. Utility patent application for all purposes.

The operation execution monitoring data 3659.*i* generated for a given operation 3701.*i* (and/or generate for a given sub-operation 3701.*i*.1 of a given operation 3701.*i*) can alternatively or additionally include mid-execution operation execution plan re-selection data 3674, for example, indicating whether/how execution of the operation changed/was reconfigured, for example, in embodiments where a plan execution of an operation (e.g. a query) can be dynamically changed mid-execution, for example, via any embodiment of dynamically selecting how a query is executed and/or prioritized described herein.

Some or all of the operation execution monitoring data 3659.*i* generated for a given operation 3701.*i* (and/or generate for a given sub-operation 3701.*i*.1 of a given operation 3701.*i*) can be updated over the course of its execution, where various metrics included in the monitoring data are updated multiple times as the corresponding value changes (e.g. increases) over the course of execution.

The operation execution monitoring data 3659.*i* generated for a given operation 3701.*i* (and/or generate for a given sub-operation 3701.*i*.1 of a given operation 3701.*i*) can be implemented as atomic integers, for example, assessable by a plurality of nodes/parallelized resources performing respective portions of the operation and/or sub-operation. For example, a given node/parallelized resource increments/updates the integer value by an amount corresponding to its respective participation, such as incrementing a number of rows processed (e.g. read and/or written) by a number of rows included in a batch of rows processed by the parallelized node), and/or flips a corresponding bit to one upon detecting a binary condition is true.

Some or all of the operation execution monitoring data 3659.*i* generated for a given operation 3701.*i* (and/or generate for a given sub-operation 3701.*i*.1 of a given operation 3701.*i*) can implemented as, can be included in, and/or be utilized to determine some or all of the operation parameter data 3714.

Figure 28A:
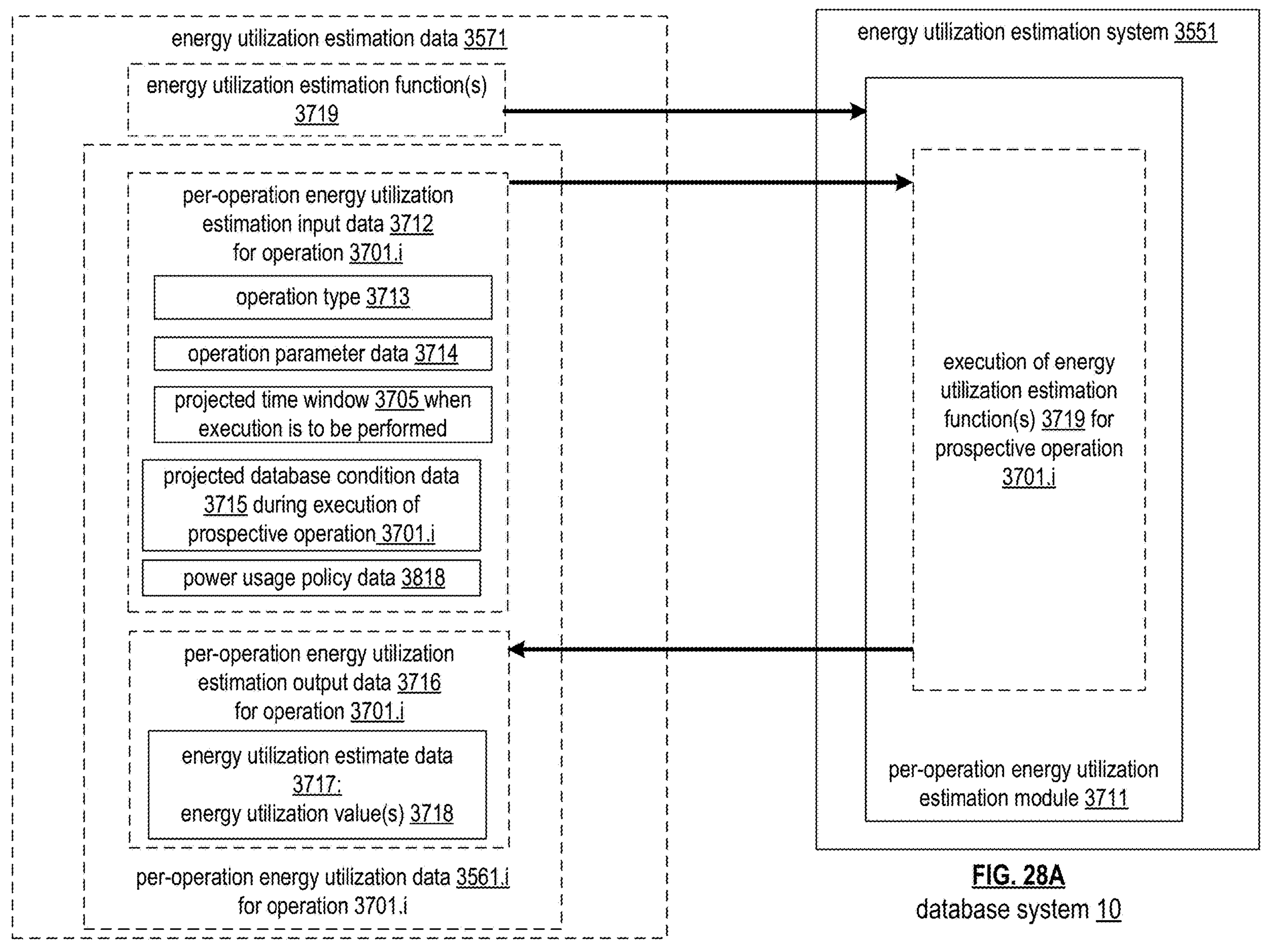
FIGS. 28A-28Q are schematic block diagrams illustrating an energy utilization estimation system in accordance with various embodiments.
Figure 28B:
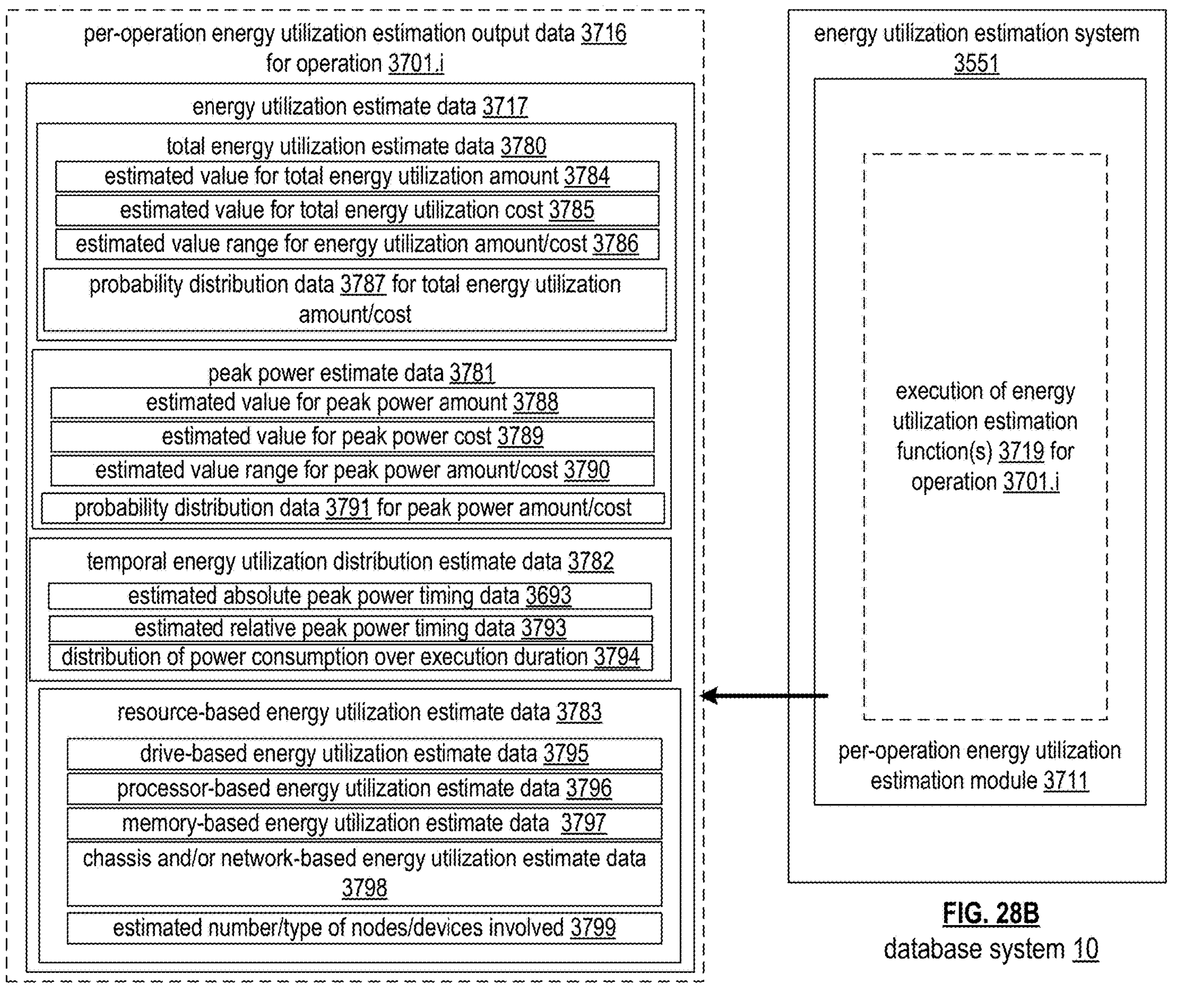
FIGS. 28R-28X are logic diagrams illustrating methods for execution in accordance with various embodiments.
Figure 28C:
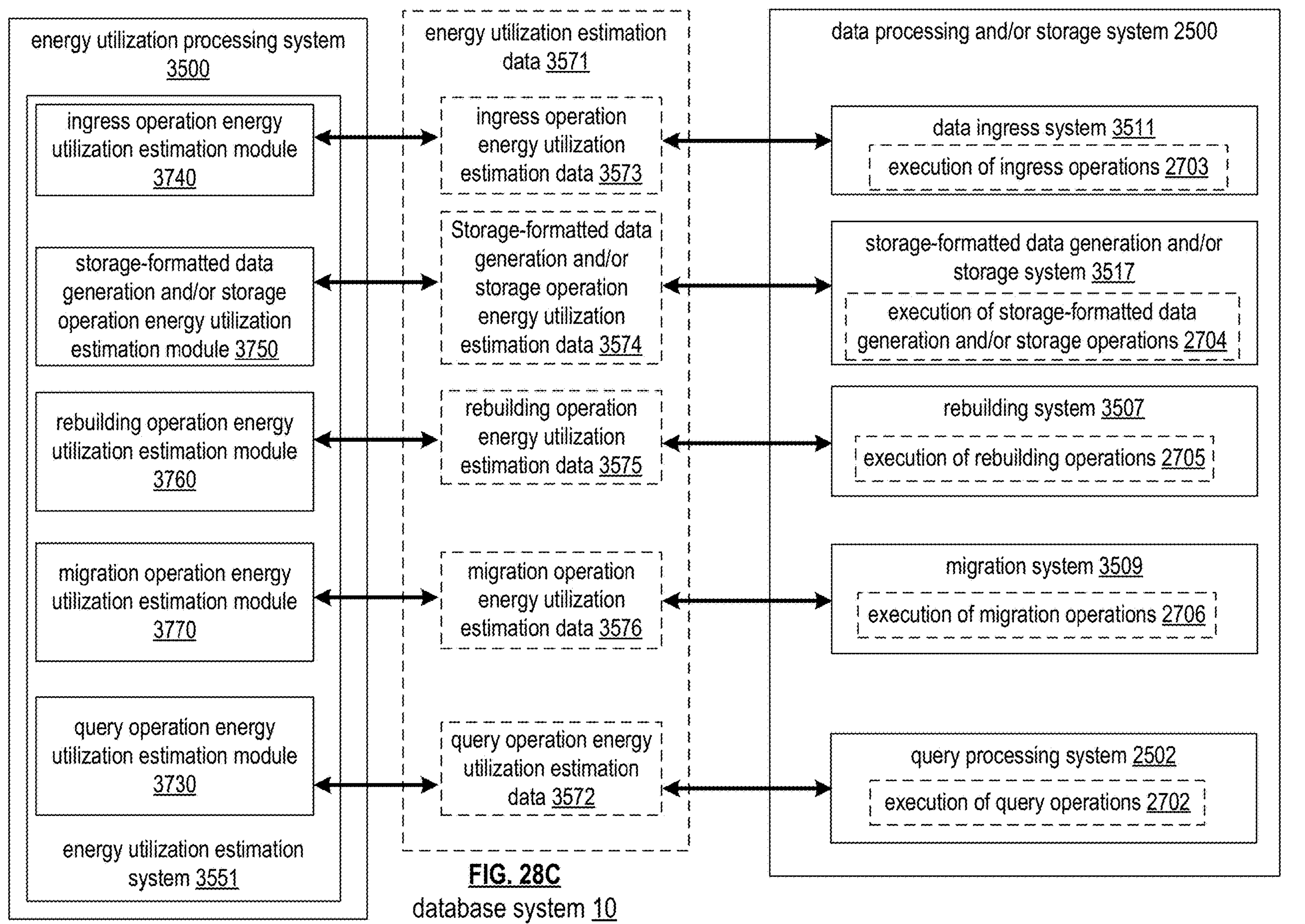
Figure 28D:
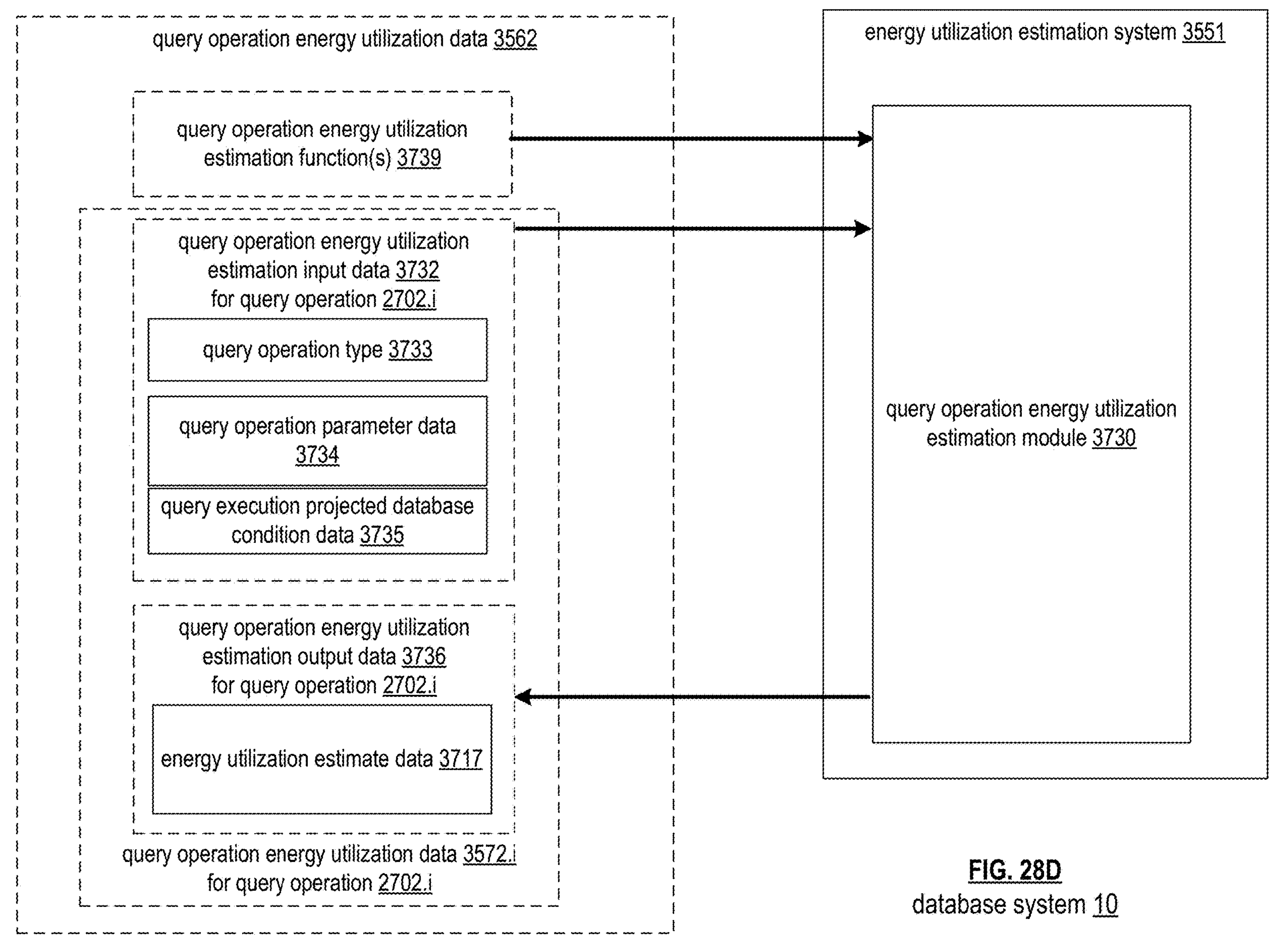
Figure 28E:
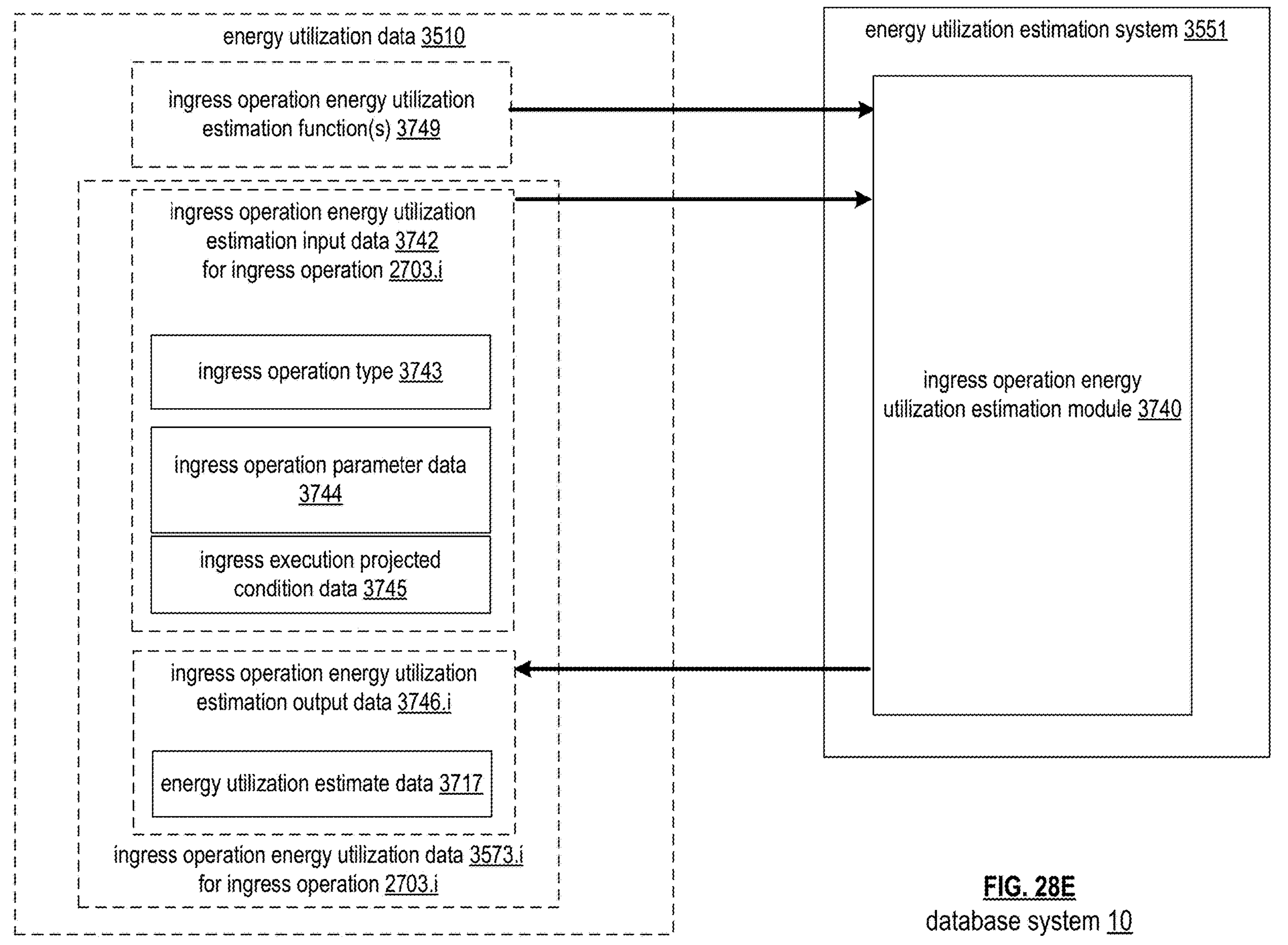
Figure 28F:
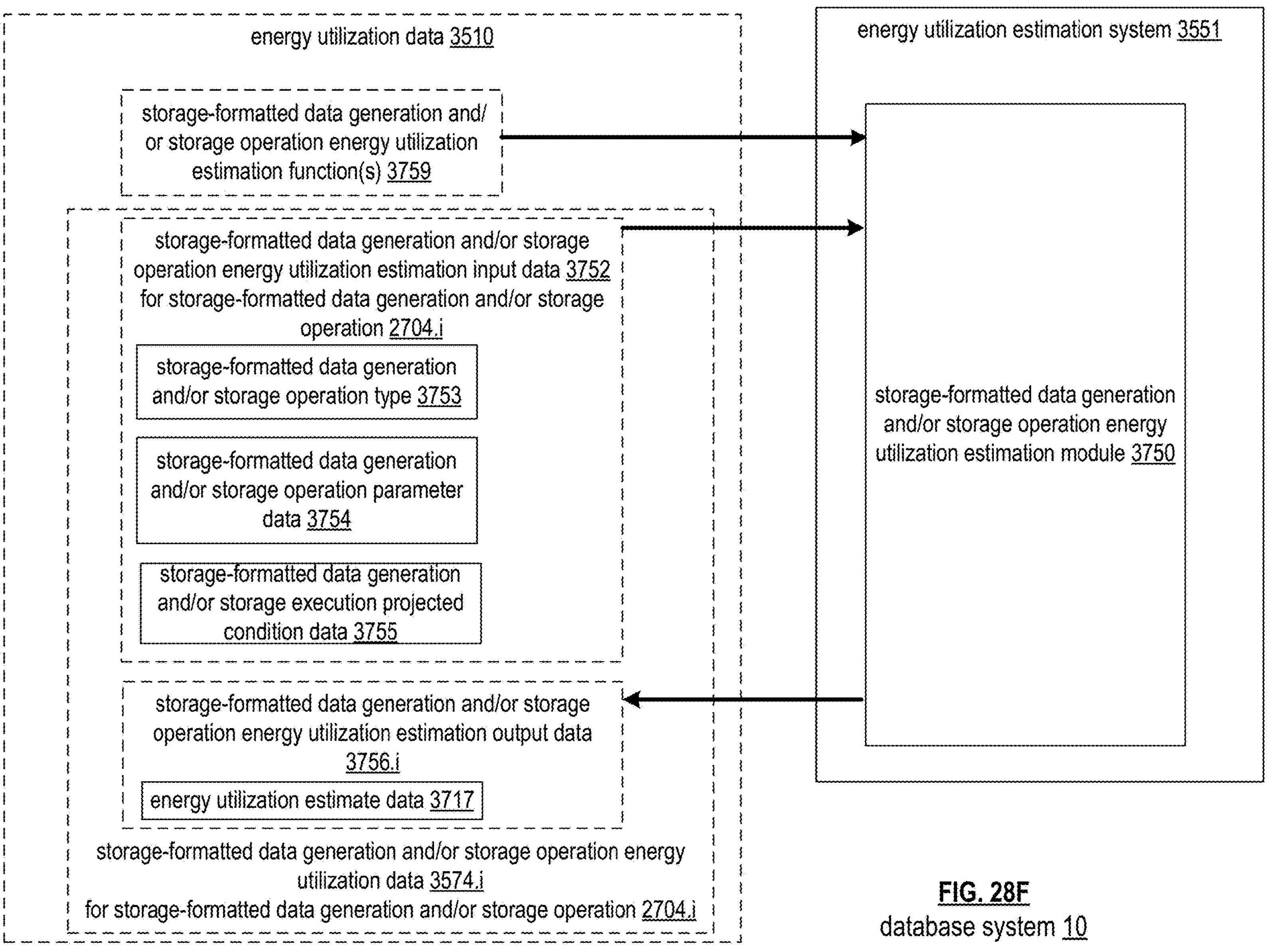
Figure 28G:
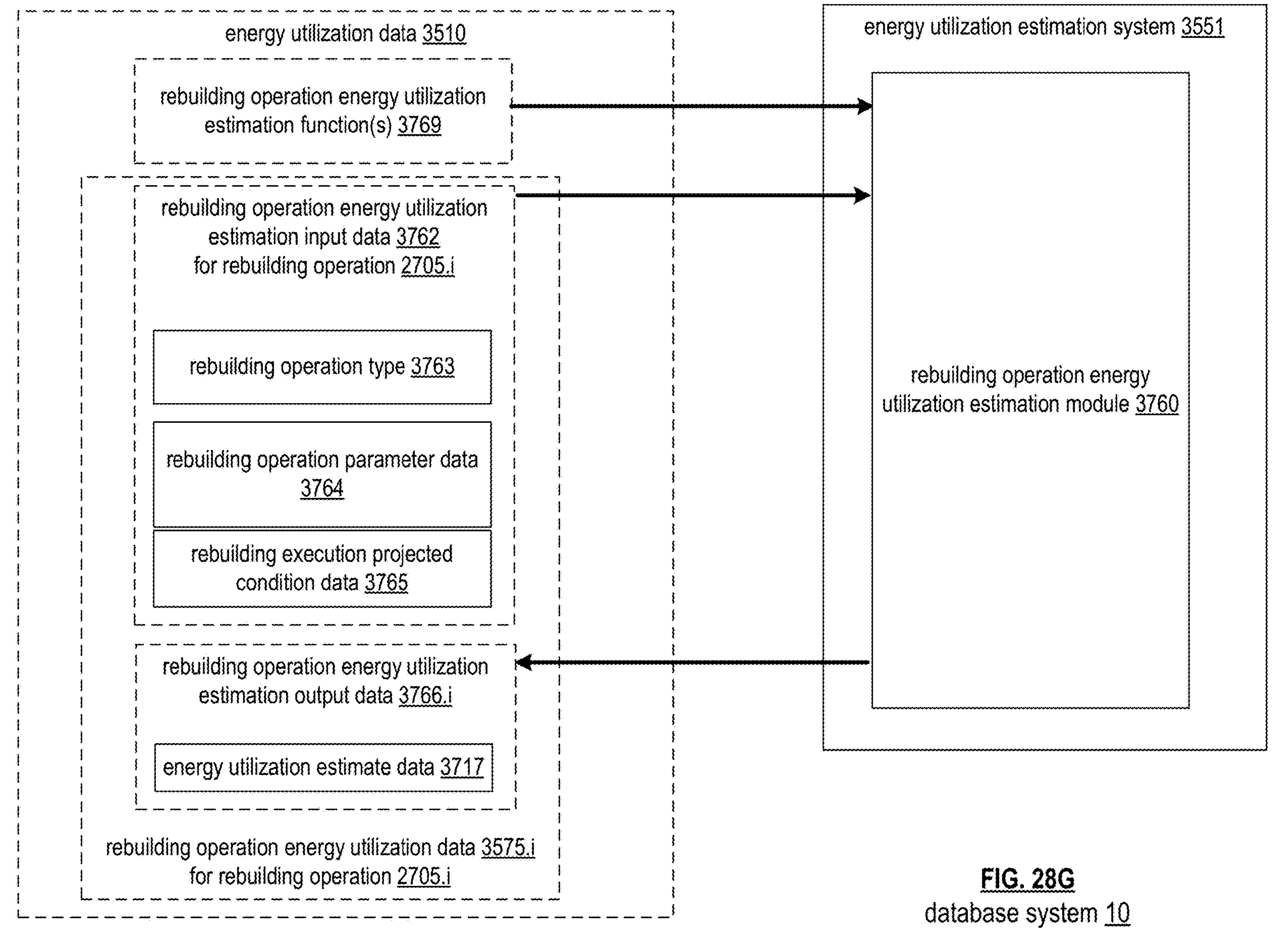
Figure 28H:
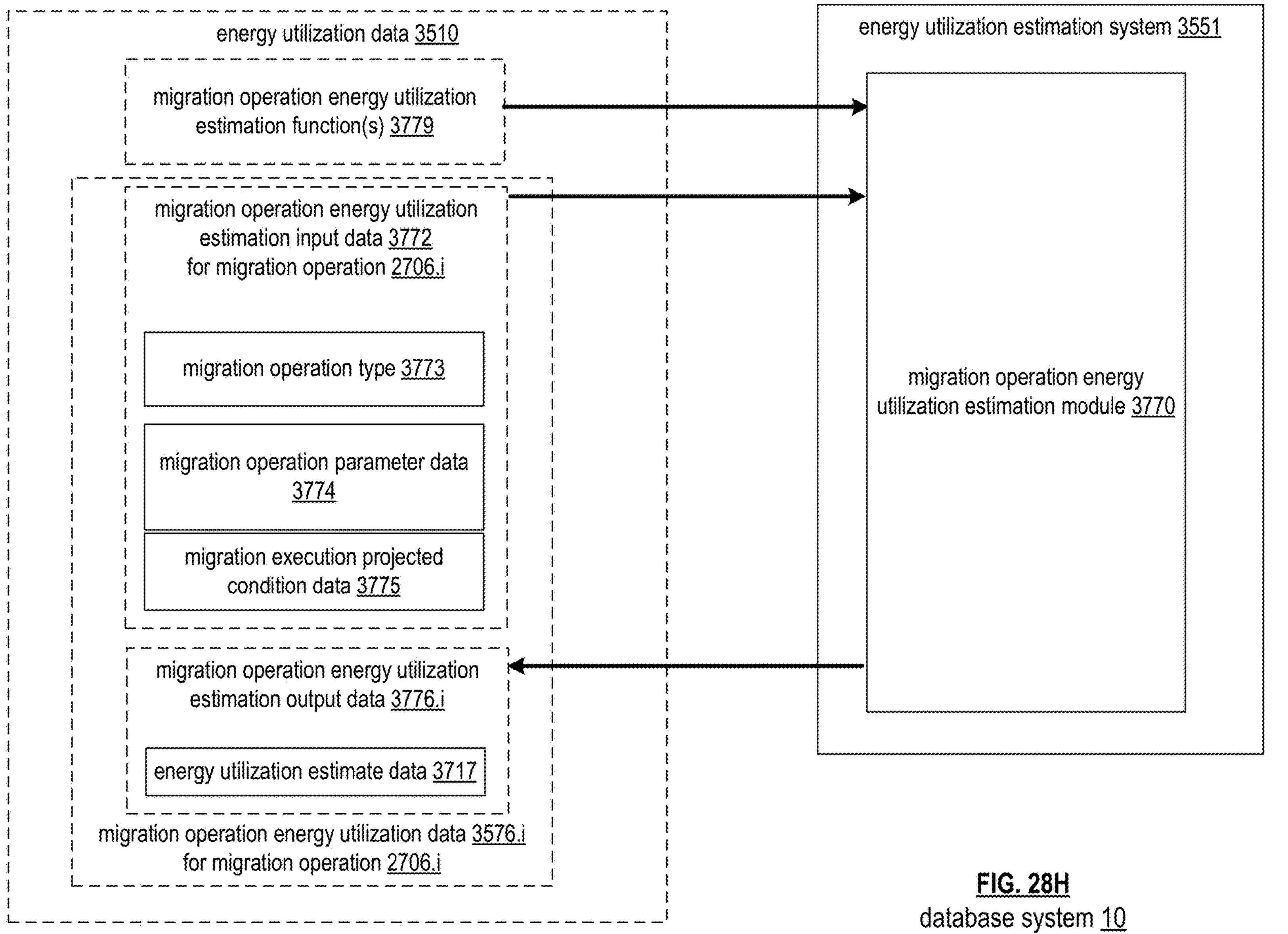
Figure 28I:
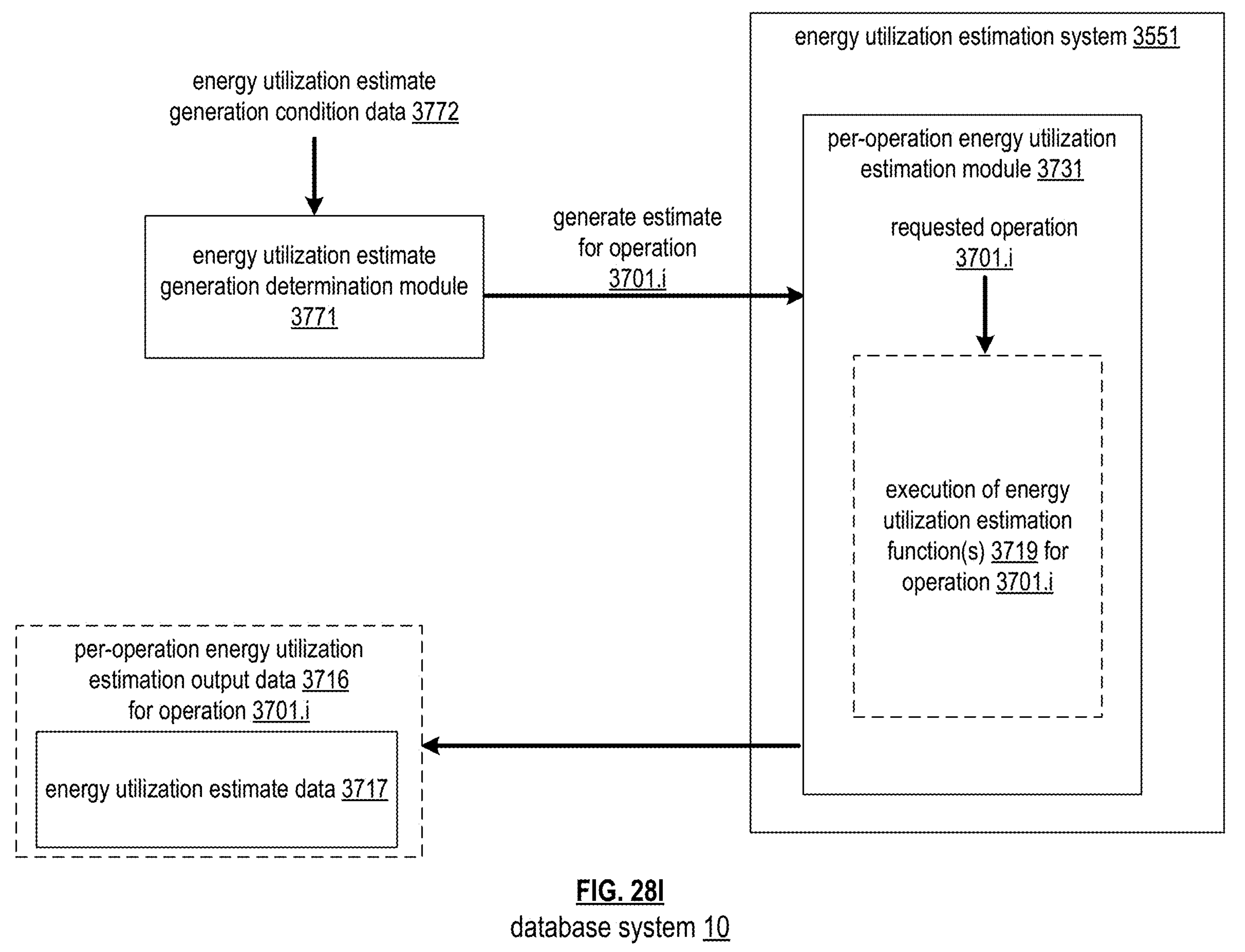
Figures 28J, 28K:
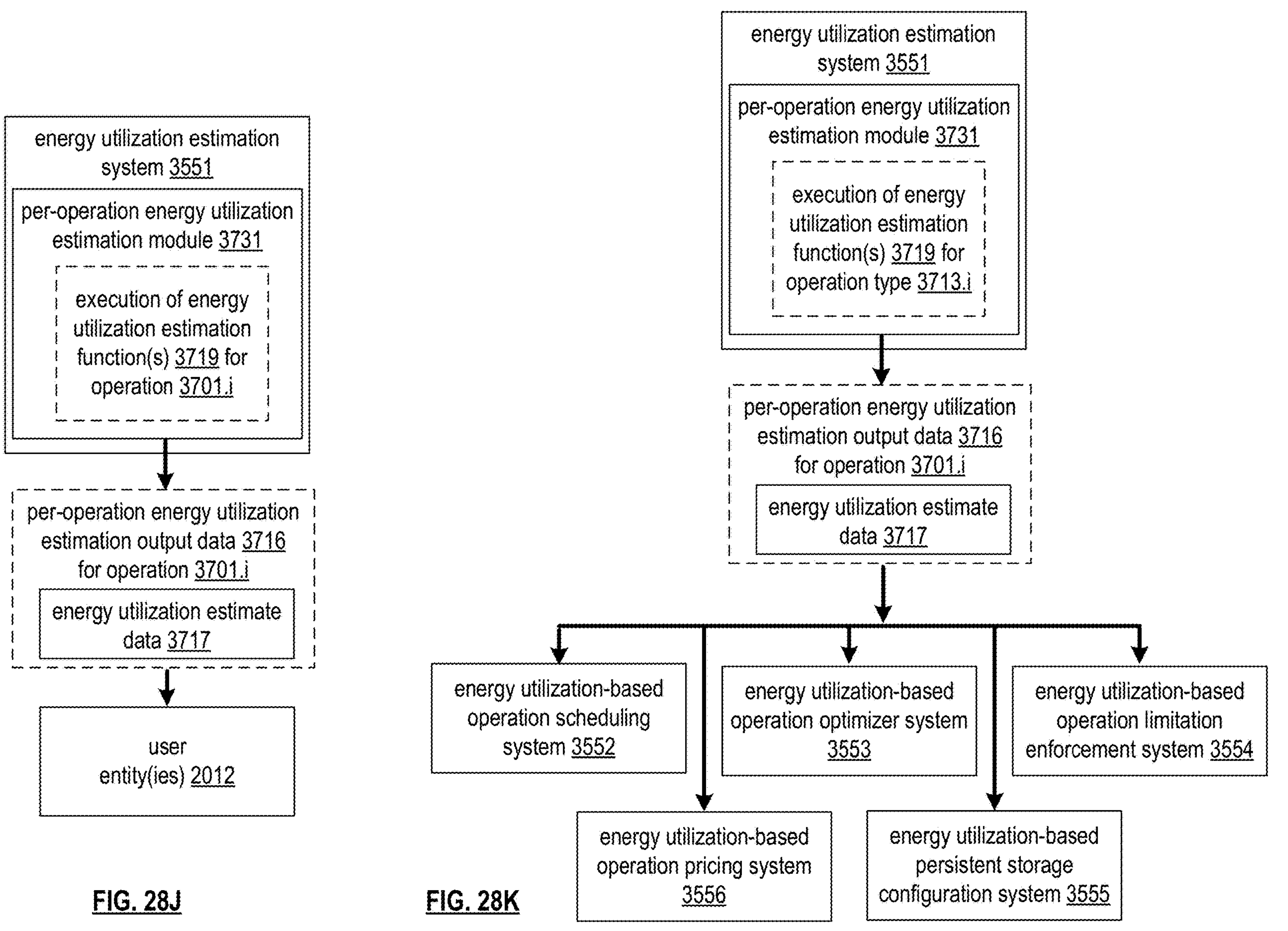
Figure 28M:
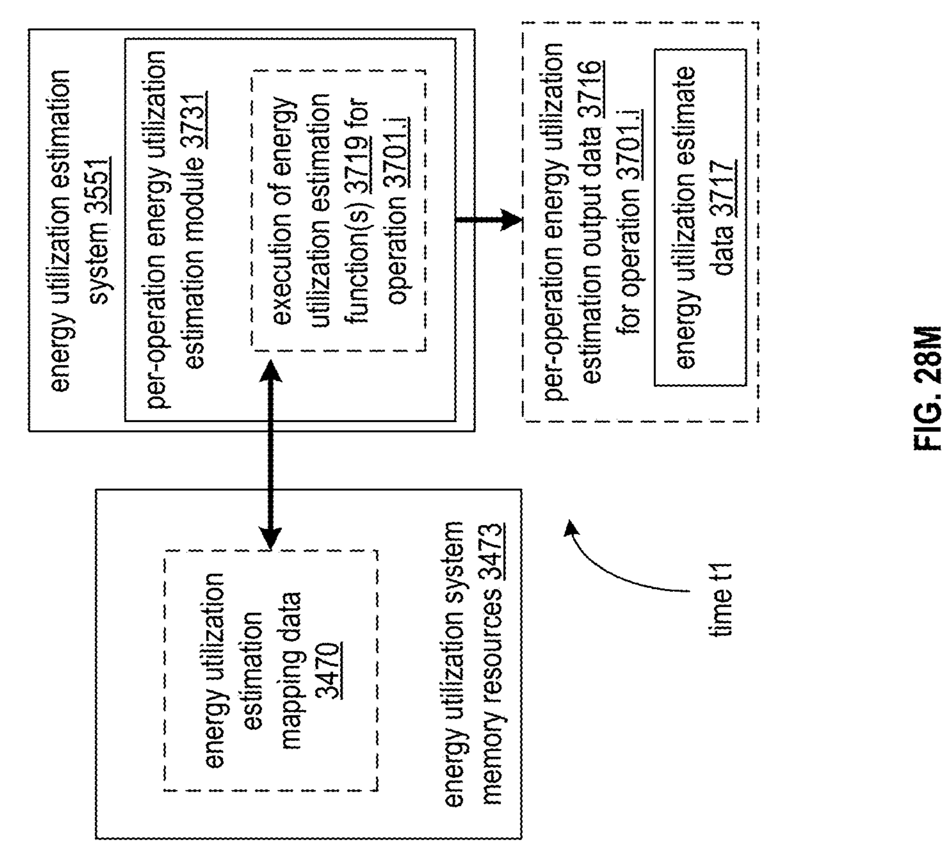
Figure 28L:
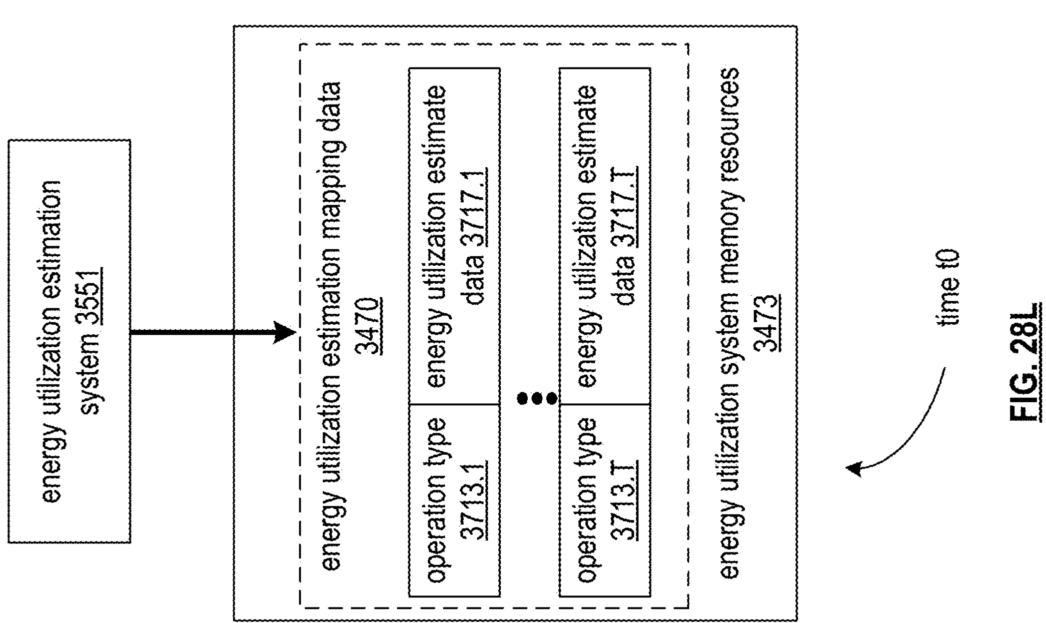
Figure 28O:
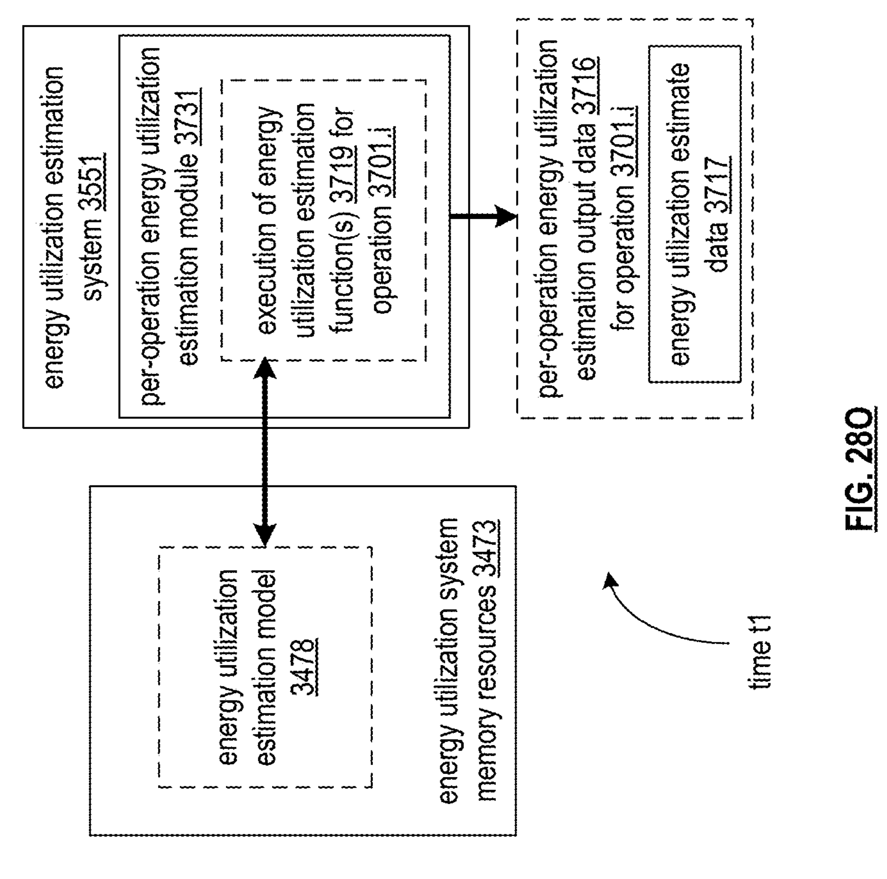
Figure 28N:
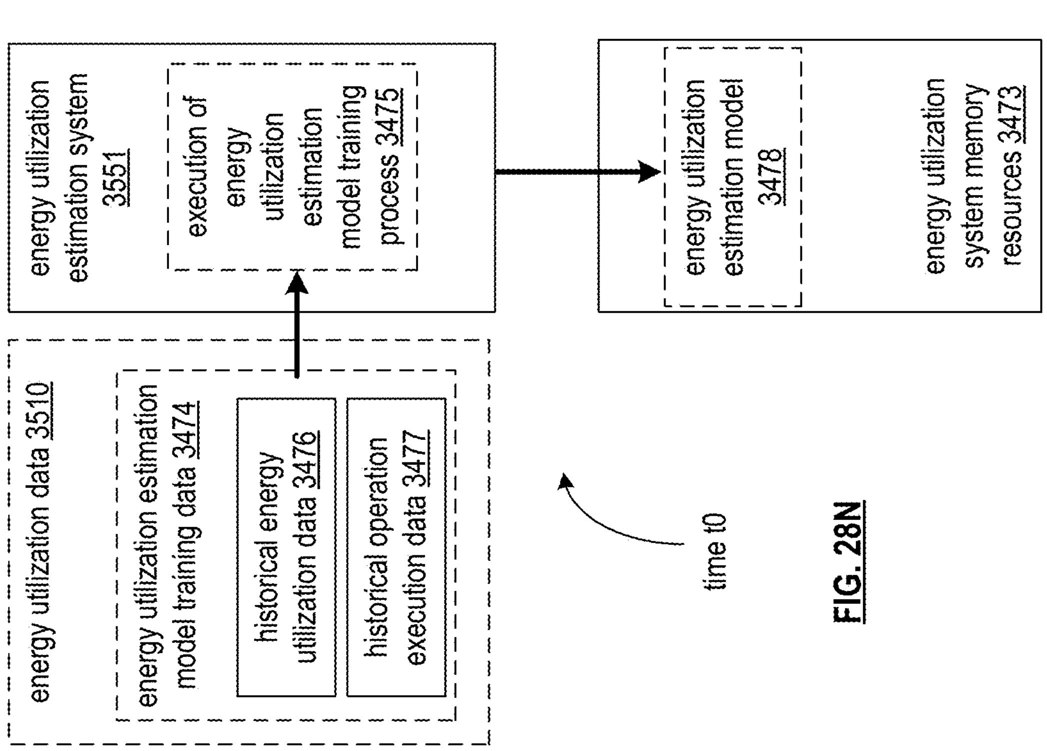
Figure 28P:
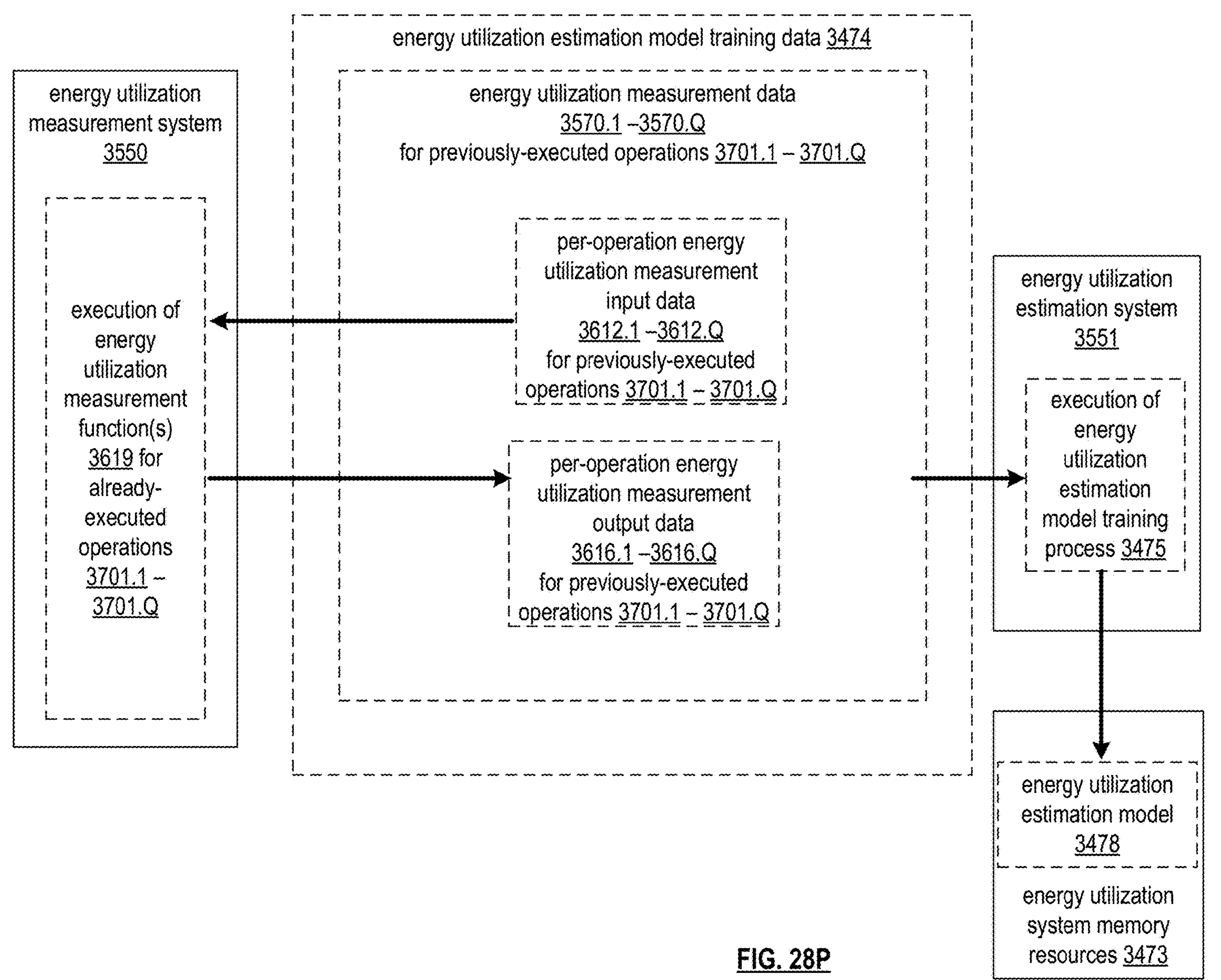
Figure 28Q:
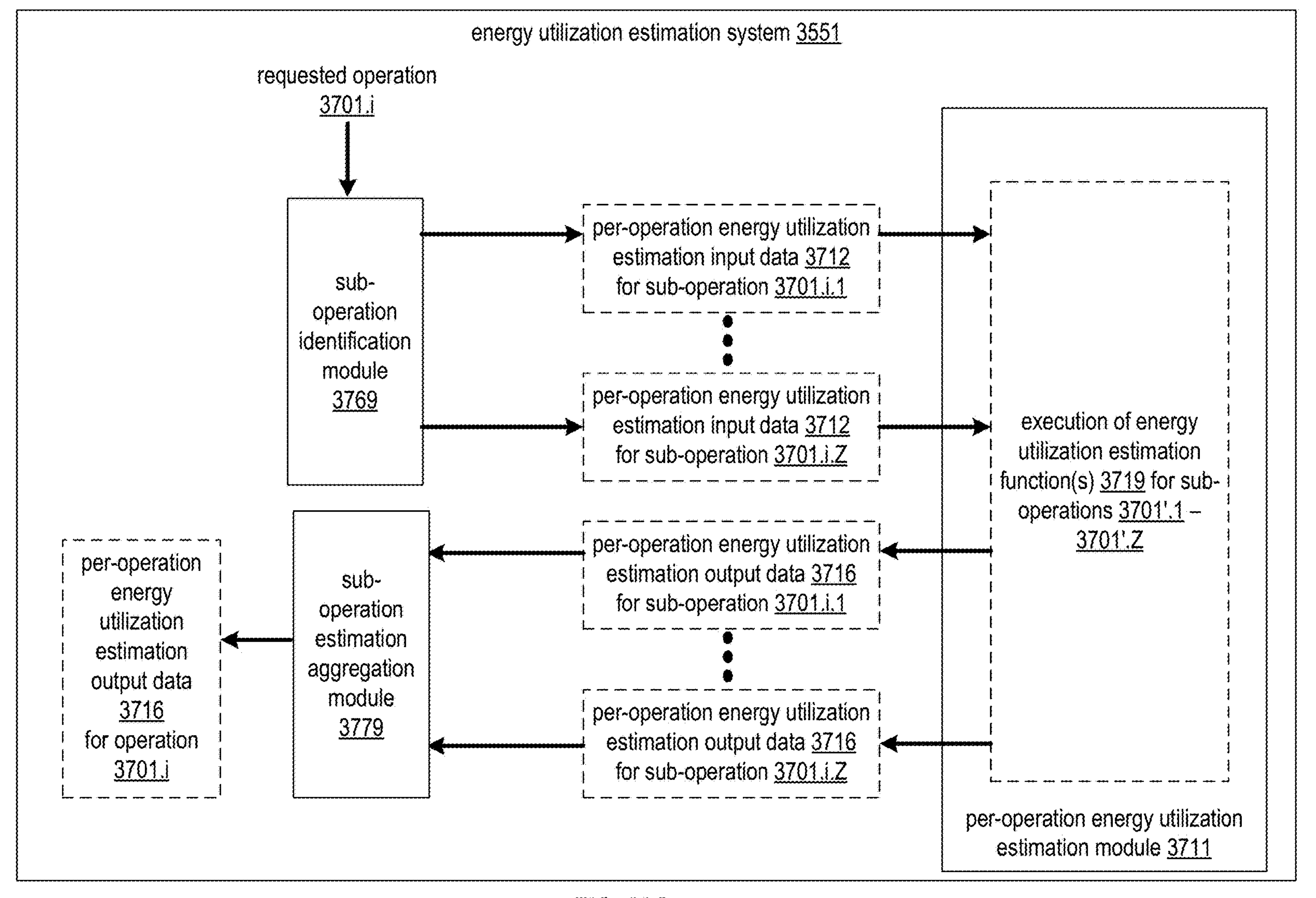

FIGS. 28A-28Q illustrate embodiments of a database system that implements an energy utilization estimation system 3551. Some or all features and/or functionality of the energy utilization estimation system 3551 of FIGS. 28A-28Q can implement the energy utilization estimation system 3551 of FIG. 26C and/or any embodiment of the energy utilization processing system 3500 described herein. Some or all features and/or functionality of the energy utilization estimation data 3571 of FIGS. 28A-28Q can implement any embodiment of energy utilization data 3510 described herein. Some or all features and/or functionality of database system 10 of FIGS. 28A-28Q can implement any embodiment of database system 10 described herein.

FIG. 28A illustrates an embodiment of an energy utilization estimation system 3551 that implements a per-operation energy utilization estimation module 3731 that executes one or more energy utilization estimation functions 3719 to generate per-operation energy utilization estimation output data 3716 that includes energy utilization estimate data 3717 for a given database operation 3701.*i* (e.g. a prospective operation that has not yet been performed) based on per-operation energy utilization estimation input data 3712 for the given database operation 3701.*i*.

In some embodiments, the energy utilization estimation system 3551 implements some or all features and/or functionality of energy utilization measurement system 3550 to perform energy utilization estimation function(s) 3719 in a same or similar fashion as performance of energy utilization measurement function(s) 3649 to generate per-operation energy utilization estimation output data 3716, which can be implemented in a same or similar fashion as per-operation energy utilization measurement output data 3616, based on per-operation energy utilization estimation input data 3712, which can be implemented in a same or similar fashion as per-operation energy utilization measurement input data 3612. For example, the energy utilization measurement data 3617 is implemented as an estimate vs. a definitive measurement as discussed previously, despite the operation having already been performed, and the energy utilization estimate data 3717 can be generated for operations not yet performed based on same or similar input data as energy utilization measurement data 3617 (e.g. input data 3712 can be implemented to include some or all input data 3612 that is determined prior to the execution of the database operation 3701.*i* and/or estimates/projected values for some or all input data 3612 that is determined after to the execution of the database operation 3701.*i*).

In some embodiments, the energy utilization measurement system 3550 can optionally be implemented by energy utilization estimation system 3551, optionally processing additional and/or more precise information in input data 3712 in the case where the operation has already been executed vs. not having this information/having projected values for this information in input data 3712 in the case where the operation has not yet been executed. Alternatively or in addition, any of the measurements/measurement data described herein can be implemented as estimates/estimate data, regardless of whether the operation was already executed or has yet to be executed.

The one or more energy utilization estimation functions 3719 can be executed based on applying corresponding parameters, weights, and/or function definition(s) that are: received by energy utilization processing system 3500; accessed in memory by energy utilization processing system 3500; configured via user input by a user entity communicating with energy utilization processing system 3500; automatically generated and/or automatically updated/re-tuned over time by energy utilization processing system 3500 (e.g. via training on training data to generate a corresponding machine learning model and/or artificial intelligence (AI) model based on utilizing at least one machine learning-based training function and/or technique and/or based on utilizing at least one AI-based training function and/or technique); implemented by energy utilization processing system 3500 via artificial intelligence (e.g. based on utilizing a generative AI platform and/or other AI platform/model(s) accessible by and/or communicating with by energy utilization processing system 3500); and/or otherwise being determined by energy utilization processing system 3500. The corresponding parameters, weights, and/or function definition(s) of energy utilization estimation function(s) 3719 can be configured to generate per-operation energy utilization estimation output data 3716 as a function (e.g. deterministic function) of corresponding per-operation energy utilization estimation input data 3712.

The energy utilization estimation output data 3716 for operation 3701.*i* can include energy utilization estimate data 3717 for the given operation 3701.*i*, which can indicate one or more energy utilization values 3718 (e.g. corresponding to any of the energy utilization-based metrics described herein). Energy utilization estimate data 3717 of FIG. 28A can include any values of the example energy utilization measurement output data 3616 presented in FIG. 27C and/or the energy utilization estimate data 3717 can be implemented in a same or similar fashion (and/or can include values for same or similar metrics) as any embodiment of energy utilization measurement data 3617 described herein.

The energy utilization estimation input data 3712 for operation 3701.*i* can indicate an operation type 3713 for the operation (e.g. whether the operation is a query operation 2702, ingress operation 2703, storage-formatted data generation operation 2704, rebuilding operation 2705, migration operation 2706, admin data logging operation 2707, another operation, a sub-operation of one of these operation categories, etc.). For example, the operation type 3713 indicates a value denoting an identifier for the respective operation type of operation 3701.*i*. The one or more energy utilization values 3718 of energy utilization estimate data 3717 can be computed by energy utilization estimation system 3551 as a function of the operation type 3713.

The energy utilization estimation input data 3712 for operation 3701.*i* can alternatively or additionally indicate operation parameter data 3714 further specifying factors relating to execution of the given operation, for example, that impact energy utilization in executing the operation 3701. Some or all operation parameter data 3714 can be determined prior to execution of the operation 3701, for example, as specified in configurable arguments and/or executable expression of a corresponding request to execute the operation 3701.

Operation parameter data 3714 of FIG. 28A can include any values of the example operation parameter data 3714 presented in FIG. 27D and/or the operation parameter data 3714 of FIG. 28A can be implemented in a same or similar fashion (and/or can include values for same or similar metrics) as any embodiment of operation parameter data 3714 described herein. The one or more energy utilization values 3718 of energy utilization estimate data 3717 can be computed by energy utilization estimation system 3551 as a function of the operation parameter data 3714.

The energy utilization estimation input data 3712 for operation 3701.*i* can alternatively or additionally indicate a projected time window 3705 when execution of the given database operation 3701.*i* is expected to be performed (e.g. amount of time/delay from the current time, a scheduled time for execution, and expected time window in which the operation is expected to be executed). The one or more energy utilization values 3718 of energy utilization estimate data 3717 can be computed by energy utilization estimation system 3551 as a function of the projected time window 3705.

The energy utilization estimation input data 3712 for operation 3701.*i* can alternatively or additionally indicate projected database condition data 3715 during execution of operation 3701.*i* (e.g. current database condition data, or database condition data projected for projected time window 3705) further specifying factors relating to the state of database system 10 at the time the operation is expected to be executed, for example, that impact energy utilization in executing the operation 3701. This can include information such as: database system wide energy utilization (e.g. corresponding values for any metrics described herein), type of power (e.g. battery vs. grid-based vs. renewable) known/expected to be used by the database at the time the operation is projected to be executed; a known/expected mode of operation of storage of the database in persistently storing data 2711 at the time the operation is projected to be executed; an emissions factor for the database's current mode of operation/functionality at the time the operation is projected to be executed; a known/expected pricing scheme at the time the operation is projected to be executed; configuration of the database system 10 at the time the operation is projected to be executed; how much data 2711 is known/expected to be stored across how many tables across how many devices at the time the operation is projected to be executed; which nodes/devices are known/expected to be online vs offline/active vs. idle at the time the operation is projected to be executed; number/type/parameters/energy utilization of other operations projected to be executing concurrently/pending executed/requested for execution when the operation 3701.*i* is executed, etc. The one or more energy utilization values 3718 of energy utilization estimate data 3617 can be computed by energy utilization estimation system 3551 as a function of the projected database condition data 3715.

The energy utilization estimation input data 3712 for operation 3701.*i* can alternatively or additionally include power usage policy data 3818 that is currently in place or projected to be in place during the projected time window. For example, the power usage policy data 3818 can be implemented to impose restrictions on whether/when/how the corresponding operation 3701.*i* can be executed by database system 10, as discussed in further detail herein. Adherence to such restrictions can thus impact the energy utilization induced in executing the database operation. The one or more energy utilization values 3718 of energy utilization estimate data 3617 can be computed by energy utilization estimation system 3551 as a function of the power usage policy data 3818.

The values 3718 of energy utilization estimate data can correspond to singular values for energy utilization (e.g. for of the energy utilization-based metrics), for example, based on the estimation generated via energy utilization estimation function being known/expected to be accurate and/or a singular estimated value being sufficient (e.g. a mean/center of a corresponding distribution, given the input data 3712). These can alternatively or additionally correspond to value ranges (e.g. bounded range by min and max value, confidence intervals, range having a center and span dictated by the input data 3712, for example, based on how confident the estimate is based on the input data 3712, etc.) for energy utilization (e.g. for of the energy utilization-based metrics), for example, based on guaranteeing/expecting the actual value to fall within the presented range. These can alternatively or additionally correspond to probability distribution data (e.g. expected value and/or standard deviation for the value given the input data 3712, a probability mass function (PMF) and/or probability density function (PDF) for the value, given the input data 3712, and/or other distribution data).

In some embodiments, the energy utilization estimate data 3717 can characterize an amount/portion of energy utilization by the database system 10 attributed to execution of the particular database operation 3701.*i*. For example, if value Y is value 3718 estimated to be energy utilization consumed by the database operation, and if energy utilization measured for some or all of the database system as a whole during a temporal period while the operation ultimately executes is measured/determined to be a value X (e.g. for one or more energy utilization metrics, optionally indicated by power meter measurement data 3619 captured over the temporal period) across a temporal period in which database operation 3701.*i* is ultimately executed, a value Z=X−Y is thus expected to be the energy utilization that would have been expected to have been consumed over the temporal period if the database operation had not been executed. As another example, if values Y1, Y2, . . . YY correspond to values 3718 estimated to be energy utilization consumed by Y different operations 3701.1-3701.Y executed over the temporal period, the value of X is expected to be an aggregation of (e.g. summation of or other function of) Y1−YY.

In some cases, estimation error can be measured based on retroactively generating energy utilization measurement data 3617 for the given operation via the energy utilization measurement system 3550, where difference in value(s) 3718 between the energy utilization estimate data and energy utilization measurement data (e.g. when energy utilization measurement data is known/expected to be accurate or close to accurate) can correspond to an amount of error in the estimation. As another example, measuring error can include measuring a difference between: the aggregation of Y1 through YY, and X (e.g. as indicated in power meter measurement data 3619). Measuring such error for many operations 3701 having energy utilization estimate data generated and energy utilization measurement data generated can be utilized to characterize error of/accuracy of the energy utilization estimation function(s) 3719, which can be utilized to configure width/magnitude of ranges/confidence intervals/standard deviation in values 3718 of energy utilization estimate data 3717.

FIG. 28B illustrates an example of energy utilization estimate data 3717 of energy utilization estimate output data 3716 for operation 3701.*i* generated by energy utilization estimation system 3551. The energy utilization estimate data 3717 can include total energy estimate data 3780, peak power estimate data 3781, temporal energy utilization distribution estimate data 3782, and/or resource type-based energy utilization estimate data 3783.

The total energy estimate data 3780 can characterize how much energy, and/or associated monetary cost, is estimated to be required to execute the database operation 3701.*i* over the duration of the database operation (e.g. as a portion of all energy consumed by the database system during the temporal period in which the database operation is executed). The total energy estimate data 3780 can indicate an estimated value for total energy utilization amount 3784 (e.g. a singular value) corresponding to a value indicating estimated total amount of energy utilized (e.g. expressed in kilowatt-hours, measure of energy, integral and/or summation of power utilization by the database operation over a corresponding temporal period in which the database operation was executed, and/or as a value for any of the energy utilization-based metrics described herein). The total energy estimate data 3780 can alternatively or additionally include an estimated value for total energy utilization cost 3785, which can indicate a total energy utilization cost (e.g. a singular value, for example, corresponding to estimated price/monetary/carbon credit/carbon offset) corresponding to a value indicating cost/price of the total amount of energy utilized. The total energy estimate data 3780 can alternatively or additionally include an estimated value range for energy utilization amount and/or cost 3786 corresponding to a range (e.g. bounded by max and min values, a confidence interval, etc.) of value that the actual value for total energy utilization amount and/or total energy utilization cost is known/expected to fall within. The total energy estimate data 3780 can alternatively or additionally include probability distribution data (e.g. expected value and/or standard deviation, parameters defining a PDF or PMF for the corresponding distribution curve, etc.) for estimated total energy utilization amount and/or cost 3787.

The peak power estimate data 3781 can characterize a maximum amount of power, and/or associated monetary cost, that is estimated to be required to execute the database operation 3701.*i* at any given time during the temporal period in which the database operation is executed. In some cases, peak power of the database system as a whole occurs at this time (e.g. the spike in power required at the given time to execute database operation 3701.*i* is substantial enough to render corresponding peak power across the database system during the temporal period in which the database operation is executed, and/or across a longer period of time, for example, due to being more significant than other concurrent activities by the database system over the temporal period and/or more significant than additional activities over the longer period of time). In other cases, peak power of the database system occurs at a different time (e.g. the peak power for the operation was not substantial enough to render peak power by the database system as a whole at that time, for example, due to other concurrently executed database operations with their own spikes in power also having been executing at different times, having been load balanced such that various peak powers of various database operations did not compound, another database operation having a larger peak power during a different time in the temporal period, etc.).

The peak power estimate data 3781 can include an estimated value for peak power amount 3788 (e.g. a singular value, expressed in kilowatts, corresponding to an estimated maximum power induced by the database operation 3701.*i* over a temporal period in which the database operation is executed, optionally expressed in kilowatt-hours or other energy measure for a small time window (e.g. a second or fraction of a second) within the temporal period the database operation is executed having highest energy consumption over all time windows within the temporal period, and/or as a value for any of the energy utilization-based metrics described herein). The peak power estimate data 3781 can include an estimated value for peak power cost 3789, which can be indicate estimated cost attributed to the peak power amount (e.g. a singular value, for example, corresponding to price/monetary/carbon credit/carbon offset). The total energy estimate data 3771 can alternatively or additionally include an estimated value range for peak power amount and/or cost 3790 corresponding to a range (e.g. bounded by max and min values, a confidence interval, etc.) of value that the actual value for peak power amount and/or peak power cost is known/expected to fall within. The total energy estimate data 3781 can alternatively or additionally include probability distribution data (e.g. expected value and/or standard deviation, parameters defining a PDF or PMF for the corresponding distribution curve, etc.) for estimated total peak power amount and/or cost 3791.

The temporal energy utilization distribution estimate data 3782 can characterize estimated power consumption by the database operation over time, for example, based on an estimated execution duration of time indicating how long the execution of database operation 3701.*i* will last (e.g. length of the corresponding temporal period in which the database operation 3701.*i* is executed). This can characterize when power is estimated to spike/dip during execution of the database operation, for example, based on some portions of the database operation's execution being expected to require more power than others.

The temporal energy utilization distribution estimate data 3782 can include estimated absolute peak power timing data 3792 indicating when the peak power of the database operation is estimated to occur, for example, in a standardized time measure across the database system 10 (e.g. a time in coordinated universal time (UTC) time; in the daytime vs. in the nighttime; over the weekend vs. during a weekday, etc. (e.g. expressed as a singular time value, time range, and/or probability distribution value for the absolute time). The temporal energy utilization distribution estimate data 3782 can alternatively or additionally include estimated relative peak power timing data 3793 indicating when the peak power is estimated to occur relative to the temporal period in which the database operation was executed (e.g. after 3 seconds of execution; when the operation is 20% complete; after 15% of the total duration of the database operation execution elapses, etc.; expressed as a singular time value, time range, and/or probability distribution value for the absolute time). The temporal energy utilization distribution estimate data 3782 can alternatively or additionally include distribution of power consumption over the execution duration 3794 (e.g. power utilization attributed to the database operation execution across a plurality of instantaneous points in time during an estimated temporal period of execution, energy utilization across a plurality of clock cycles/short time windows within the temporal period, a function definition defining a corresponding curve for power consumption as a function of time, etc.), and/or can otherwise indicate absolute/relative times that other spikes in power consumption induced by the database operation are estimated to occur (e.g. over a predetermined threshold amount), absolute/relative times that dips in power are estimated to (e.g. under a predetermined threshold amount), etc. (e.g. expressed as a singular time values, time ranges, and/or probability distribution value for the absolute times, mapped to corresponding power levels).

The resource-based energy utilization estimate data 3783 can characterize how energy utilization by the database operation's execution is estimated to be dispersed across different resources of the database system. This can be useful in identifying which resources are expected to experience the greatest power draw. power spikes, and/or highest contribution to energy utilization cost in executing the corresponding database operation.

The resource-based energy utilization estimate data 3783 can include drive-based energy utilization estimate data 3795 indicating drive-based energy utilization estimated to be induced via execution of the database operation, such as energy utilization by storage devices of database system 10 in executing the given database operation, for example, based on the database operation 3701.*i* including steps that involve storing and/or accessing data (e.g. via IO operators and/or execution of an IO pipeline) in these storage devices and/or correspond to operations involving persistent storage of data. The drive-based energy utilization estimate data 3795 can include energy utilization estimate data 3780, peak power estimate data 3781, and/or temporal energy utilization distribution estimate data 3782 attributed specifically to drive-based resources (e.g. total energy utilization amount/cost value/range/probability distribution data attributed specifically to drive-based resources; peak power amount/cost value/range/probability distribution data attributed specifically to drive-based resources; peak power timing/power distribution values, ranges, and/or probability distribution data attributed specifically to drive-based resources; etc.). The drive-based energy utilization estimate data 3795 can optionally further indicate distribution of such drive-based energy consumption across different types of storage devices.

The resource-based energy utilization estimate data 3783 can include processor-based energy utilization estimate data 3796 indicating processor-based energy utilization estimated to be induced via execution of the database operation, such as energy utilization by processor devices of database system 10 in executing the given database operation, for example, based on the database operation 3701.*i* including steps that involve processing data via these processing devices. The processor-based energy utilization estimate data 3795 can include energy utilization estimate data 3780, peak power estimate data 3781, and/or temporal energy utilization distribution estimate data 3782 attributed specifically to processor-based resources (e.g. total energy utilization amount/cost value/range/probability distribution data attributed specifically to processor-based resources; peak power amount/cost value/range/probability distribution data attributed specifically to processor-based resources; peak power timing/power distribution values, ranges, and/or probability distribution data attributed specifically to processor-based resources; etc.). The processor-based energy utilization estimate data 3796 can optionally further indicate distribution of such processor-based energy consumption across different types of processors (e.g. different types of processing devices, different types of processing cores within multi-core processing devices etc.).

The resource-based energy utilization estimate data 3783 can include memory-based energy utilization estimate data 3797 indicating memory-based (e.g. for non-storage-based memory) energy utilization estimated to be induced via execution of the database operation, such as energy utilization by memory devices of database system 10 in executing the given database operation, for example, based on the database operation 3701.*i* including steps that involve storing intermediate data (e.g. hash maps, pages of rows, etc.) generated in executing the database operation via these memory devices. The memory-based energy utilization estimate data 3797 can include energy utilization estimate data 3780, peak power estimate data 3781, and/or temporal energy utilization distribution estimate data 3782 attributed specifically to memory-based resources (e.g. total energy utilization amount/cost value/range/probability distribution data attributed specifically to memory-based resources; peak power amount/cost value/range/probability distribution data attributed specifically to memory-based resources; peak power timing/power distribution values, ranges, and/or probability distribution data attributed specifically to memory-based resources; etc.). The memory-based energy utilization estimate data 3797 can optionally further indicate distribution of such memory-based energy consumption across different types of memory (e.g. RAM vs. cache memory, etc.).

The resource-based energy utilization estimate data 3783 can include chassis and/or network-based energy utilization estimate data 3798 indicating network-based/chassis-based energy utilization estimated to be induced via execution of the database operation, such as energy utilization by network devices of database system 10 in executing the given database operation, for example, based on the database operation 3701.*i* including steps that involve communicating data between devices (e.g. between nodes 37 at same or different levels of a query execution plan, etc.) and/or involve accessing external networks (e.g. the internet). in executing the database operation via these network devices. The network-based energy utilization estimate data 3798 can include energy utilization estimate data 3780, peak power estimate data 3781, and/or temporal energy utilization distribution estimate data 3782 attributed specifically to network-based resources (e.g. total energy utilization amount/cost value/range/probability distribution data attributed specifically to network-based resources; peak power amount/cost value/range/probability distribution data attributed specifically to network-based resources; peak power timing/power distribution values, ranges, and/or probability distribution data attributed specifically to network-based resources; etc.). The network-based energy utilization estimate data 3798 can optionally further indicate distribution of such network-based energy consumption across different types of network devices.

In some embodiments, one or more values of energy utilization estimate data 3717 is generated as a function of and/or based on implementing some or all features and/or functionality of query processing cost estimate data 3141 (e.g. memory usage estimate 3012; internal runtime estimate 3013; external runtime estimate 3014)); query processing cost estimator module 3115; query processing tracking module 3152; query data 2914, execution start time 3015 as disclosed by U.S. Utility application Ser. No. 16/720,481, entitled "SELECTING A NORMALIZED FORM FOR CONVERSION OF A QUERY EXPRESSION", filed Dec. 19, 2019, which is hereby incorporated herein by reference in its entirety and made part of the present U.S. Utility patent application for all purposes.

FIG. 28C illustrates an embodiment of energy utilization estimation system 2551 that implements: an ingress operation energy utilization estimation module 3740 to generate ingress operation energy utilization estimation data 3573 for some or all ingress operations 2703 executed via data ingress system 3511; a storage-formatted data generation and/or storage operation energy utilization estimation module 3750 to generate storage-formatted data generation and/or storage operation energy utilization estimation data 3574 for some or all storage-formatted data generation and/or storage operations 2704 executed via storage-formatted data generation and/or storage system 3517; a rebuilding operation energy utilization estimation module 3760 to generate rebuilding operation energy utilization estimation data 3575 for some or all rebuilding operations 2705 executed via rebuilding system 3507; a migration operation energy utilization estimation module 3770 to generate migration operation energy utilization estimation data 3576 for some or all migration operations 2706 executed via migration system 3509; and/or a query operation energy utilization estimation module 3730 to generate query operation energy utilization estimation data 3572 for some or all query operations 2702 executed via query processing system 2502.

FIG. 28D illustrates an embodiment of a query operation energy utilization estimation module 3730 that performs one or more query operation energy utilization estimation functions 3739 to generate energy utilization estimate data 3717 in query operation energy utilization estimation output data 3736 for a query operation 2702.*i*, for example, as a function of query operation energy utilization input data 3732 for query operation 2702.*i*, which can include input specific to execution of a query operation and/or input influencing energy utilization of a query operation, such as query operation type 3733 (e.g. a sub-type of operation type 3713 specific to query operations), query operation parameter data 3734 (e.g. indicating parameters of operation parameter data 3714 specific to execution of query operations), query execution projected database condition data 3735 (e.g. indicating projected database condition data 3715 relevant to execution of query operations), and/or any other energy utilization estimation input data 3712 relevant to energy utilization in executing a query operation. For example, the query operation energy utilization estimation functions 3739 are a configured type of energy utilization estimation function 3719 that is tuned specifically for query operations (e.g. implements a model trained via training data corresponding specifically to historically executed query operations), where any performance of energy utilization estimation function 3719 described herein can optionally include performance of one or more query operation energy utilization estimation functions 3730 based on the operation 3701.*i* being/including a query operation 2702.

FIG. 28E illustrates an embodiment of an ingress operation energy utilization estimation module 3740 that performs one or more ingress operation energy utilization estimation functions 3749 to generate energy utilization estimate data 3717 in ingress operation energy utilization estimation output data 3746 for a ingress operation 2703.*i*, for example, as a function of ingress operation energy utilization input data 3742 for ingress operation 2703.*i*, which can include input specific to execution of a ingress operation and/or input influencing energy utilization of a ingress operation, such as ingress operation type 3743 (e.g. a sub-type of operation type 3713 specific to ingress operations), ingress operation parameter data 3744 (e.g. indicating parameters of operation parameter data 3714 specific to execution of ingress operations), ingress execution projected database condition data 3745 (e.g. indicating projected database condition data 3715 relevant to execution of ingress operations), and/or any other energy utilization estimation input data 3712 relevant to energy utilization in executing a ingress operation. For example, the ingress operation energy utilization estimation functions 3740 are a configured type of energy utilization estimation function 3719 that is tuned specifically for ingress operations (e.g. implements a model trained via training data corresponding specifically to historically executed ingress operations), where any performance of energy utilization estimation function 3719 described herein can optionally include performance of one or more ingress operation energy utilization estimation functions 3740 based on the operation 3701.*i* being/including an ingress operation 2703.

FIG. 28F illustrates an embodiment of a storage-formatted data generation and/or storage operation energy utilization estimation module 3750 that performs one or more storage-formatted data generation and/or storage operation energy utilization estimation functions 3759 to generate energy utilization estimate data 3717 in storage-formatted data generation and/or storage operation energy utilization estimation output data 3756 for a storage-formatted data generation and/or storage operation 2704.*i*, for example, as a function of storage-formatted data generation and/or storage operation energy utilization input data 3752 for storage-formatted data generation and/or storage operation 2704.*i*, which can include input specific to execution of a storage-formatted data generation and/or storage operation and/or input influencing energy utilization of a ingress operation, such as storage-formatted data generation and/or storage operation type 3753 (e.g. a sub-type of operation type 3713 specific to storage-formatted data generation and/or storage operations), storage-formatted data generation and/or storage operation parameter data 3754 (e.g. indicating parameters of operation parameter data 3714 specific to execution of storage-formatted data generation and/or storage operations), storage-formatted data generation and/or storage operation execution projected database condition data 3755 (e.g. indicating projected database condition data 3715 relevant to execution of storage-formatted data generation and/or storage operations), and/or any other energy utilization estimation input data 3712 relevant to energy utilization in executing a query operation. For example, the storage-formatted data generation and/or storage operation energy utilization estimation functions 3750 are a configured type of energy utilization estimation function 3719 that is tuned specifically for storage-formatted data generation and/or storage operations (e.g. implements a model trained via training data corresponding specifically to historically executed storage-formatted data generation and/or storage operations), where any performance of energy utilization estimation function 3719 described herein can optionally include performance of one or more storage-formatted data generation and/or storage operation energy utilization estimation functions 3750 based on the operation 3701.*i* being/including a storage-formatted data generation and/or storage operation 2704.

FIG. 28G illustrates an embodiment of a rebuilding operation energy utilization estimation module 3760 that performs one or more rebuilding operation energy utilization estimation functions 3769 to generate energy utilization estimate data 3717 in rebuilding operation energy utilization estimation output data 3766 for a rebuilding operation 2705.*i*, for example, as a function of rebuilding operation energy utilization input data 3762 for rebuilding operation 2705.*i*, which can include input specific to execution of a rebuilding operation and/or input influencing energy utilization of a rebuilding operation, such as rebuilding operation type 3763 (e.g. a sub-type of operation type 3713 specific to rebuilding operations), rebuilding operation parameter data 3744 (e.g. indicating parameters of operation parameter data 3714 specific to execution of rebuilding operations), rebuilding execution projected database condition data 3765 (e.g. indicating projected database condition data 3715 relevant to execution of rebuilding operations), and/or any other energy utilization estimation input data 3712 relevant to energy utilization in executing a rebuilding operation. For example, the rebuilding operation energy utilization estimation functions 3760 are a configured type of energy utilization estimation function 3719 that is tuned specifically for rebuilding operations (e.g. implements a model trained via training data corresponding specifically to historically executed rebuilding operations), where any performance of energy utilization estimation function 3719 described herein can optionally include performance of one or more rebuilding operation energy utilization estimation functions 3750 based on the operation 3701.*i* being/including a rebuilding operation 2705.

FIG. 28H illustrates an embodiment of a migration operation energy utilization estimation module 3770 that performs one or more migration operation energy utilization estimation functions 3769 to generate energy utilization estimate data 3717 in migration operation energy utilization estimation output data 3766 for a migration operation 2705.*i*, for example, as a function of migration operation energy utilization input data 3762 for rebuilding operation 2705.*i*, which can include input specific to execution of a migration operation and/or input influencing energy utilization of a migration operation, such as migration operation type 3763 (e.g. a sub-type of operation type 3713 specific to migration operations), migration operation parameter data 3744 (e.g. indicating parameters of operation parameter data 3714 specific to execution of migration operations), migration execution projected database condition data 3765 (e.g. indicating projected database condition data 3715 relevant to execution of migration operations), and/or any other energy utilization estimation input data 3712 relevant to energy utilization in executing a migration operation. For example, the migration operation energy utilization estimation functions 3760 are a configured type of energy utilization estimation function 3719 that is tuned specifically for migration operations (e.g. implements a model trained via training data corresponding specifically to historically executed migration operations), where any performance of energy utilization estimation function 3719 described herein can optionally include performance of one or more migration operation energy utilization estimation functions 3760 based on the operation 3701.*i* being/including a migration operation 2706.

FIG. 28I illustrates an embodiment of an energy utilization estimation system that generates per-operation energy utilization estimation output data 3716 for a given operation 3701.*i* based on the energy utilization estimation system 3551 determining to generate this per-operation energy utilization estimation output data 3716 for the given operation 3701.*i* based on a request received from an energy utilization estimate generation determination module 3771 implemented via computing resources of database system 10 (e.g. implemented via energy utilization processing system 3500). For example, the energy utilization estimate generation determination module 3771 determines whether conditions indicated in energy utilization estimate generation condition data 3772 have been met.

For example, the energy utilization estimation system 3551 can be implemented to generate energy utilization estimate data 3717 for certain operations 3701.*i* in response to/otherwise based on: these operations being requested for execution; these operation having already undergone execution (e.g. a retroactive estimate is taken, for example, to implement corresponding energy utilization measurement data for the already executed operation); the database system has current energy utilization exceeding/comparing unfavorably to a pre-configured threshold amount; the operation requiring energy utilization-based scheduling and/or optimization as a function of its estimated energy utilization; determining whether the operation is allowed to be executed (e.g. based on power consumption policy data) as a function of its estimated energy utilization; a user entity requesting estimates (e.g. to evaluate impact on the system, to determine corresponding pricing, etc.); and/or other conditions. The energy utilization estimate generation condition data can indicate some of these events as conditions that trigger generation of the energy utilization estimate data for a given operation 3701.

FIG. 28J illustrates an embodiment of an energy utilization estimation system 3551 that communicates (e.g. sends, stores in memory for access, displays, etc.) the energy utilization estimate data 3717 generated for one or more operations 3701 to a user entity (e.g. for display, for further processing, for storage, etc.). This can enable user entities (e.g. corresponding people and/or automated systems implemented by computing resources) to view/assess the implications of executing a database operation, for example, enabling the user to elect whether or not to proceed with execution of the given database operation (e.g. the user determines to not execute an operation based on determining it will consume too much energy/will induce too high of a cost to be paid to perform the operation due to how much energy it consumes). For example, some or all operations are not executed until a corresponding user entity (e.g. requesting entity requesting the operation and/or an administrator of the database system) reviews the energy utilization estimate data and decides to proceed with execution given this insight into implications of its execution.

FIG. 28K illustrates an embodiment of an energy utilization estimation system 3551 that communicates (e.g. sends, stores in memory for access, etc.) the energy utilization estimate data 3717 generated for one or more operations 3701 to other systems of the energy utilization processing system 3500. For example, one or more other systems of the energy utilization processing system 3500 implement their corresponding functionality based on processing energy utilization estimate data 3717 (e.g. energy utilization estimate data 3717 for operation 3701.*i* is processed as input to one or more respective functions to generate corresponding output for the operation 3701.*i*).

For example, the energy utilization-based operation scheduling system 3552 can schedule various operations 3701 based on their estimated energy utilization as indicated in energy utilization estimate data 3717. Alternatively or in addition, the energy utilization-based operation optimizer system 3553 can optimize various operations 3701 based on their estimated energy utilization as indicated in energy utilization estimate data 3717. Alternatively or in addition, the energy utilization-based operation limitation enforcement system 3554 can determine whether execution of various operations 3701 is allowed based on their estimated energy utilization as indicated in energy utilization estimate data 3717. Alternatively or in addition, the energy utilization-based operation limitation enforcement system 3554 can select/estimate pricing data for execution of various operations 3701 based on their estimated energy utilization as indicated in energy utilization estimate data 3717.

FIGS. 28L and 28M illustrate embodiments of energy utilization estimation system 3551 that implements energy utilization estimation mapping data 3740 to generate energy utilization estimate data 3717 for various operations 3701.

For example, in some embodiments, the energy utilization estimate data 3717 is a deterministic function of operation type 3713, where different operation types have different corresponding energy utilization estimate data as indicated in energy utilization estimation mapping data 3470 stored in energy utilization system memory resources. While not illustrated, the deterministic mapping can implement greater specificity, where various combinations of operation parameters of operation parameter data 3714 and/or other particular values for per-operation energy utilization estimation input data 3712 are mapped to corresponding energy utilization estimate data 3717. The energy utilization estimation mapping data 3470 can optionally be implemented as a type of energy utilization data 3510.

As illustrated in FIG. 28L, during a first time t0, the energy utilization estimation system 3551 can generate and/or otherwise store energy utilization estimation mapping data 3470 in energy utilization system memory resources 3473 (e.g. any storage/memory/computing devices accessible by energy utilization processing system 3500). For example, this energy utilization estimation mapping data 3470 has respective mappings that are: automatically generated by energy utilization estimation system 3551 (e.g. based on historical execution of various operations of different types/different input parameters of input data 3712 and their respective energy utilization, for example, measured by energy utilization measurement system 3550); configured via user input; accessed in memory; received; and/or otherwise determined.

As illustrated in FIG. 28M, during a second time t1 after time t0 (e.g. after the energy utilization estimation mapping data 3470 is generated and stored), the energy utilization estimation system 3551 can execute energy utilization estimation function(s) 3719 upon various operations, including the given operation 3701.*i*, to generate the corresponding energy utilization estimate data 3717 based on accessing the energy utilization estimation mapping data 3470. For example, the energy utilization estimate data 3717 generated for operation 3701.*i* (e.g. corresponding values 3718) are dictated by the corresponding operation type 3713 of operation 3701.*i* and/or set of particular values for per-operation energy utilization estimation input data 3712 of operation 3701.*i*, for example, based on accessing the energy utilization estimate data 3717 in energy utilization estimation mapping data that is mapped to the corresponding operation type 3713 of operation 3701.*i* and/or set of particular values for per-operation energy utilization estimation input data 3712 of operation 3701.*i* in the energy utilization estimation mapping data 3470.

FIGS. 28N and 28O illustrate embodiments of energy utilization estimation system 3551 that implements at least one energy utilization estimation model 3478 to generate energy utilization estimate data 3717 for various operations 3701. The energy utilization estimation model 3478 can optionally be implemented as a type of energy utilization data 3510.

As illustrated in FIG. 28N, during a first time t0, the energy utilization estimation system 3551 can generate and/or otherwise store an energy utilization estimation model 3478 (e.g. generate and store corresponding weights/parameters/other data defining the model) in energy utilization system memory resources 3473 (e.g. any storage/memory/computing devices accessible by energy utilization processing system 3500). For example, the energy utilization estimation model 3478 is implemented as an AI model and/or machine learning model. As a particular example, the energy utilization estimation model 3478 is implemented as an anomaly detection model, decision tree(s), expert system(s) and other knowledge-based system(s), artificial neural networks, convolutional neural networks, support vector machine(s) (SVMs), Bayesian network(s), genetic algorithm(s), feature learning, deep learning model, generative AI model, and/or other machine learning/AI model, for example, that is trained using training data via unsupervised, semi-supervised, supervised and/or reinforcement learning, and/or other AI/machine learning techniques. The energy utilization estimation model 3478 is optionally implemented as and/or based on the energy utilization estimation mapping data 3470.

Generating the energy utilization estimation model 3478 can include performing an energy utilization estimation model training process 3475 to train the energy utilization estimation model 3478, for example, based on processing energy utilization estimation model training data 3474 (e.g. implemented as at type of energy utilization data 3510) that includes historical energy utilization data 3476 and/or historical operation execution data 3477). The historical operation execution data 3477 can include and/or be based on types 3713/operation parameter data 3714, and/or any per-operation energy utilization estimation input data 3712 for previously executed operations 3701 (e.g. having respective values determined, for example, retroactively for per-operation energy utilization estimation input data 3712 despite optionally never having energy utilization estimate data generated). The historical energy utilization data 3478 can include and/or be based on previously collected/generated: power meter measurement data 3619, energy utilization measurement data 3617, and/or other previously determined energy utilization data. For example, the historical energy utilization data 3478 was previously generated when corresponding previously executed operations of historical operation execution data 3477 were executed, and thus correspond to energy utilization induced by execution of these previously executed operation.

As illustrated in FIG. 28O, during a second time t1 after time t0 (e.g. after the energy utilization estimation module 3478 is generated and stored), the energy utilization estimation system 3551 can execute energy utilization estimation function(s) 3719 upon various operations, including the given operation 3701.*i*, to generate the corresponding energy utilization estimate data 3717 based on applying the energy utilization estimation model 3478 (e.g. energy utilization estimation function is implemented as an inference function implementing the corresponding model 3478 having been trained via a corresponding training function implemented in performing energy utilization estimation model training process 3475). For example, the energy utilization estimate data 3717 generated for operation 3701.*i* (e.g. corresponding values 3718) is generated as inference data (e.g. predicted values of an output feature vector) via applying the energy utilization estimation model 3478, for example, based on energy utilization estimation function(s) 3719 being performed upon an input feature vector that includes values of data included in of per-operation energy utilization estimation input data 3712 for the prospective operation 3701.*i*).

FIG. 28P illustrates a particular example of model training data 3474 that is processed via execution of energy utilization estimation model training process 3475 to generate energy utilization estimation model 3478, for example, as illustrated in FIG. 28N. In particular, some or all of the energy utilization model training data 3474 can include energy utilization measurement data 3570.1-3570.Q (e.g. implemented as historical energy utilization data) for a plurality of previously executed operations 3701.1-3701.Q. For example, the training data 3474 includes per-operation energy utilization measurement output data 3616.1-3616.Q and/or corresponding per-operation energy utilization measurement input data 3612.1-3612.Q of this plurality of previously executed operations 3701.1-3701.Q, for example, each processed to generate the respective one of the plurality of output data 3616.1-3616.Q via energy utilization measurement system 3550.

As a particular example, the training data 3474 can include a plurality of points 1-Q (e.g. defined by corresponding feature vectors of values), each including values defining a corresponding one of the plurality of previously executed operations 3701.1-3701.Q (e.g. each point includes values for various types of data included in of per-operation energy utilization measurement input data 3612 of a corresponding operation 3701, such as type 3713, one or more parameters of operation parameter data 3714, the time window when the execution was actually performed, the database condition data 3715 when the execution was performed, and/or the power meter measurement data 3619 when the execution was performed), and further including values 3718 characterizing energy utilization by the corresponding operation 3701 included in the energy utilization measurement data 3617 of the corresponding per-operation energy utilization measurement output data 3616. For example, this plurality of points is utilized in conjunction with performing a supervised learning process (e.g. to train the model to generate predicted values as values 3718 generated in executing the energy utilization estimation function 3719 applying the model 3478).

FIG. 28Q illustrates an embodiment of energy utilization estimation system 3551 that generates energy utilization estimation output data 3716 for a given operation 3701.*i* as a function of its sub-operations.

In some embodiments, a sub-operation identification module 3769 can determine per-operation energy utilization input data 3712 for each of a plurality of identified sub-operations 3701.*i*.1-3701.*i*.Z (e.g. identified from sub-operation data 3638 of the operation 3701.*i*, where the per-operation energy utilization estimation input data 3712 for each given sub-operation is optionally based on sub-operation parameter data 3714 for each given sub-operation. The energy utilization measurement function(s) 3719 can be performed to process the per-operation energy utilization estimation input data 3712 for each sub-operation (individually/separately, and/or optionally jointly) to generate corresponding per-operation energy utilization measurement output data 3716 for each sub-operation. A sub-operation estimate aggregation module 3779 can generate the per-operation energy utilization estimate data 3716 for the operation 3701.*i* as a whole as a function of the plurality of per-operation energy utilization estimate data 3716 for the plurality of its sub-operations (e.g. one or more values of the energy utilization estimate data 3717 for the operation 3701.*i* are computed as a sum of, or some other function of, corresponding values in energy utilization estimate data 3717 across all of the sub-operations 3701.*i*.1-3701.*i*.Z).

Figure 28R:
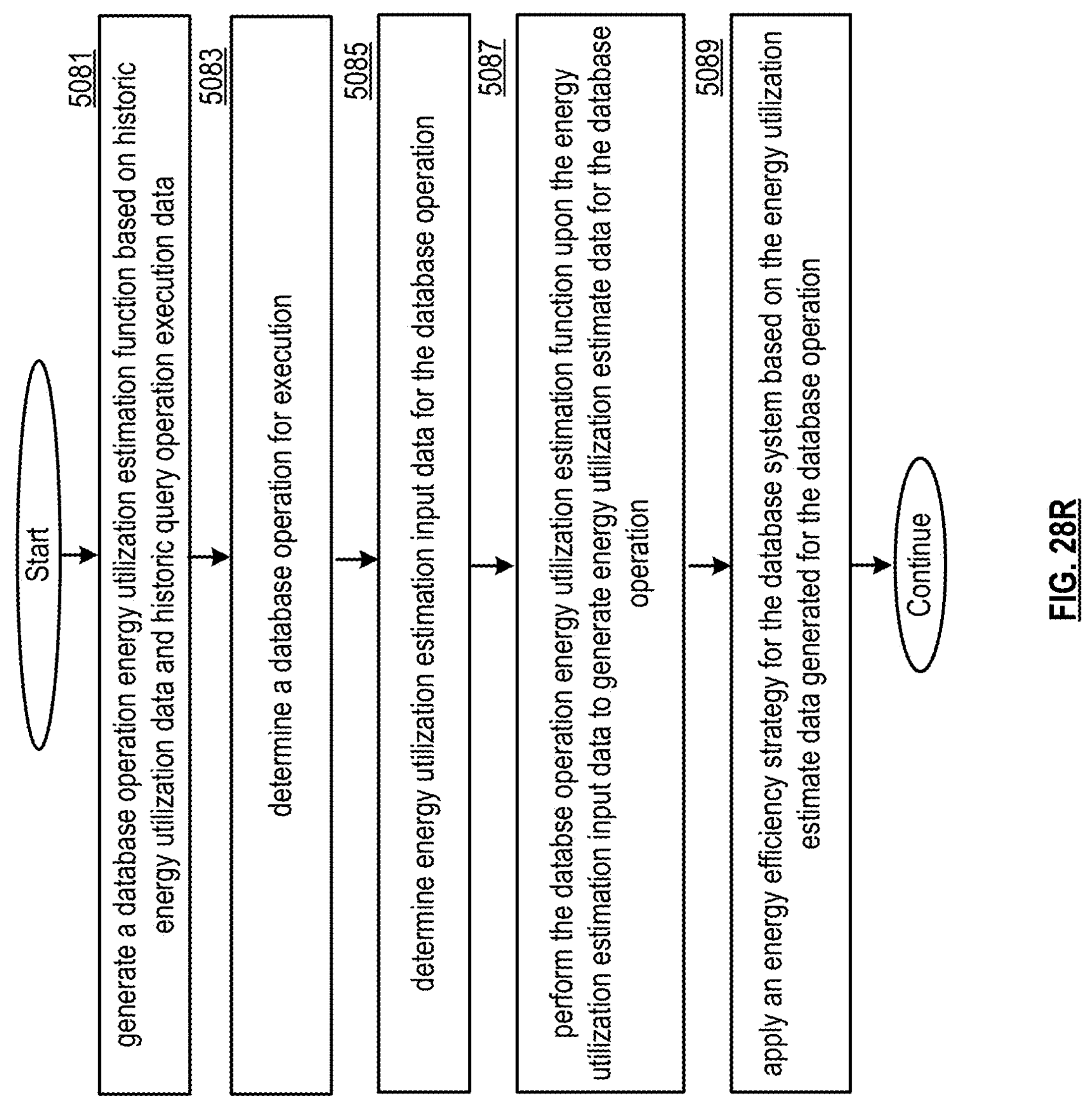

FIG. 28R illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28R. In some embodiments, a node 37 can implement some or all of FIG. 28R based on implementing a corresponding plurality of processing core resources 48.1-48.W. Some or all of the steps of FIG. 28R can optionally be performed by any other one or more processing modules of the database system 10. Some or all of the steps of FIG. 28R can be performed to implement some or all of the functionality of the database system 10 as described in conjunction with FIGS. 28A-28Q, for example, by implementing some or all of the functionality of energy utilization estimation system 3551 and/or based on processing and/or generating energy utilization data 3510. Some or all steps of FIG. 28R can be performed by database system 10 in accordance with other embodiments of the database system 10 and/or nodes 37 discussed herein. Some or all steps of FIG. 28R can be performed by database system 10 via processing and/or generating any energy utilization data 3510 described herein. Some or all of the steps of FIG. 28R can be performed in conjunction with performing some or all steps of any other method described herein.

Step 5081 includes generating a database operation energy utilization estimation function based on historic energy utilization data and historic database operation execution data. Step 5083 includes determining a database operation for execution. Step 5085 includes determining energy utilization estimation input data for the database operation. Step 5087 includes performing the database operation energy utilization estimation function upon the energy utilization estimation input data to generate energy utilization estimate data for the database operation. Step 5089 includes applying an energy efficiency strategy for the database system based on the energy utilization estimate data generated for the database operation.

In various examples, the energy utilization estimation input data includes and/or is based on a database operation type for the database operation indicating one of a plurality of possible database operation types, where the energy utilization estimate data is generated as a function of the database operation type. In various examples, the plurality of possible operation types includes: at least one query operation type; at least one sub-operation type for at least one sub-operation utilized to implement query operations; at least one ingress operation type; at least one sub-operation type for at least one sub-operation utilized to implement ingress operations; at least one rebuilding operation type; at least one sub-operation type for at least one sub-operation utilized to implement rebuilding operations; at least one storage-formatted data generator operation type; at least one sub-operation type for at least one sub-operation utilized to implement storage-formatted data generator operations; at least one migration operation type; at least one sub-operation type for at least one sub-operation utilized to implement migration operations; and/or any other type of operation and/or functionality performed by database system 10 described herein.

In various examples, the energy utilization estimation input data includes and/or is based on operation priority data for the database operation indicating one of a plurality of possible database operation priority values, where the energy utilization estimate data is generated as a function of the operation priority data. In various examples, the energy utilization estimation input data includes and/or is based on an identifier for a requesting user entity for the database operation indicating one of a plurality of possible requesting user entities, where the energy utilization estimate data is generated as a function of the requesting user entity. In various examples, the energy utilization estimation input data includes and/or is based on a level of parallelization for executing the database operation, where the energy utilization estimate data is generated as a function of the level of parallelization.

In various examples, the energy utilization estimation input data includes and/or is based on read size data for an amount of data read when via executing the database operation, where the energy utilization estimate data is generated as a function of the read size data. In various examples, the energy utilization estimation input data includes and/or is based on write size data for an amount of data read when via executing the database operation, where the energy utilization estimate data is generated as a function of the write size data.

In various examples, the energy utilization estimation input data includes and/or is based on execution duration of time for execution of the database operation, where the energy utilization estimate data is generated as a function of the execution duration of time.

In various examples, the energy utilization estimation input data includes and/or is based on failure rate data indicating rate of failure in executing the database operation requiring attempted re-execution of the database operation, where the energy utilization estimate data is generated as a function of the failure rate. In various examples, the energy utilization estimation input data includes and/or is based on computing device data indicating a set of computing devices involved in executing the database operation, where the energy utilization estimate data is generated as a function of the computing device data.

In various examples, the energy utilization estimation input data includes sub-operation data for the database operation that indicates a set of sub-operations included in the database operation; an execution flow of the set of sub-operations corresponding to execution of the database operation; and/or sub-operation parameter data for each of the set of sub-operations. In various examples, the energy utilization estimate data is generated based on: generating a set of sub-operation energy utilization estimate data based on generating corresponding energy utilization estimate data for different ones of the set of set of sub-operations; and/or computing the energy utilization estimate data based on aggregating the set of sub-operation energy utilization estimate data.

In various examples, the sub-operation data for the database operation indicates the execution flow of the set of sub-operations. In various examples, the execution of the set of sub-operations includes parallelized execution of a plurality of parallelized sub-operations of the set of sub-operations. In various examples, the set of sub-operation energy utilization estimate data includes sub-operation energy utilization estimate data for different ones of the plurality of parallelized sub-operations.

In various examples, the energy utilization estimate data is expressed as and/or based on at least one value, range, and/or distribution data for at least one of: a peak power metric; an average power metric; an energy consumption metric; a greenhouse gas emissions metric; a carbon emissions metric; an emissions factor metric; a carbon intensity metric; a grid utilization factor metric; a performance per kilowatt-hour metric; a storage capacity per kilowatt-hour metric; a drive-based energy utilization metric; a processor-based energy utilization metric; a memory-based energy utilization metric; and/or a network-based energy utilization metric.

In various examples, the energy utilization estimate data includes total energy utilization estimate data that indicates at least one of: an estimated value for total energy utilization amount; an estimated value for total energy utilization cost; an estimated value range for the total energy utilization amount; an estimated value range for the total energy utilization amount; probability distribution data for value of total energy utilization amount; and/or probability distribution data for value of total energy utilization cost.

In various examples, the estimated value for the total energy utilization amount is expressed as an estimated number of kilowatt hours. In various examples, the estimated value for the total energy utilization cost is expressed as an estimated price in dollars. In various examples, the estimated value for the total energy utilization amount is expressed to indicate an estimated carbon footprint. In various examples, the estimated value for the total energy utilization amount is expressed to indicate an estimated volume of carbon dioxide and/or greenhouse gasses (e.g. in volumetric tons). In various examples, the estimated value for the total energy utilization amount is expressed to indicate carbon footprint as a product of energy consumption multiplied by an emission factor. In various examples, the estimated value for the total energy utilization cost is expressed as an estimated carbon pricing cost relating to a corresponding amount of carbon credits and/or offset credits.

In various examples, the energy utilization estimate data includes peak power estimate data that indicates at least one of an estimated value for peak power amount; an estimated value for peak power cost; an estimated value range for the peak power amount; an estimated value range for the peak power cost; probability distribution data for value of peak power amount; and/or probability distribution data for value of peak power cost. In various examples, the estimated value for the peak power amount is expressed as an estimated number of kilowatts. In various examples, the estimated value for the peak power cost is expressed as an estimated price in dollars.

In various examples, the energy utilization estimate data includes temporal energy utilization distribution estimate data that indicates: an estimated execution duration of time; estimated peak power timing data indicating when peak power is estimated to occur within the estimated execution duration of time; and/or or distribution of power consumption over the estimated execution duration of time.

In various examples, the energy utilization estimate data includes resource-based energy utilization distribution estimate data that includes: drive-based energy utilization estimate data indicating a proportion of total energy utilization induced by drive resources involved in executing the database operation; processor-based energy utilization estimate data indicating a proportion of total energy utilization induced by processor resources involved in executing the database operation; memory-based energy utilization estimate data indicating a proportion of total energy utilization induced by memory resources involved in executing the database operation; and/or network-based energy utilization estimate data indicating a proportion of total energy utilization induced by network resources involved in executing the database operation.

In various examples, generating the database operation energy utilization estimation function includes generating an energy utilization estimation model by performing a model training function upon training data that includes the historic energy utilization data and the historic database operation execution data.

In various examples, the method further includes: executing a plurality of prior operations; and/or generating a plurality of energy utilization measurements for the plurality of prior operations, wherein the training data includes the plurality of energy utilization measurements for the plurality of prior operations.

In various examples, the database system is implemented via a plurality of computing devices of at least one data center. In various examples, power is delivered to the plurality of computing devices via at least one power distribution system that includes at least one power monitoring module. In various examples, the historic energy utilization data is based on power meter measurement data generated via the at least one power monitoring module during execution of a plurality of previously database operations.

In various examples, the database system is implemented via a plurality of computing devices of at least one data center. In various examples, power is delivered to the plurality of computing devices via at least one power distribution system that includes at least one power monitoring module. In various examples, the method further includes concurrently executing a plurality of database operations over a temporal period. In various examples, the plurality of database operations includes the database operation. In various examples, the power meter measurement data is generated via the at least one power monitoring module during the temporal period to indicate total energy utilization by the plurality of computing devices over the temporal period. In various examples, the energy utilization estimation input data includes the power meter measurement data. In various examples, the database operation energy utilization estimation function is performed upon the power meter measurement data to estimate a plurality of portions of the total energy utilization that are each attributed to execution of a corresponding one of the plurality of database operations. In various examples, the energy utilization estimate data for the database operation is based on an estimated portion of the total energy utilization attributed to execution of the database operation.

In various examples, the method further includes generating a database operation execution strategy for executing the database operation based on the energy utilization estimate data for the database operation. In various examples, applying the energy efficiency strategy includes applying the database operation execution strategy for executing the database operation.

In various examples, generating the database operation execution strategy for executing the database operation includes generating energy utilization-based database operation scheduling data for the database operation based on the energy utilization estimate data for the database operation. In various examples, applying the database operation execution strategy for executing the database operation includes scheduling execution of the database operation in accordance with the database operation execution strategy.

In various examples, generating the database operation execution strategy for executing the database operation includes generating an optimized energy utilization-based operation execution plan for the database operation based on the energy utilization estimate data for the database operation for the database operation. In various examples, applying the database operation execution strategy for executing the database operation including execution the database operation via execution of the optimized energy utilization-based operation execution plan.

In various examples, the method further includes: generating operation requirement data for the database system based on the energy utilization estimate data for the database operation for the database operation, and/or determining a set of subsequent database operations for execution, wherein applying the energy efficiency strategy for the database system includes enforcing the operation requirement data in executing the set of subsequent database operations.

In various embodiments, any one of more of the various examples listed above are implemented in conjunction with performing some or all steps of FIG. 28R. In various embodiments, any set of the various examples listed above can be implemented in tandem, for example, in conjunction with performing some or all steps of FIG. 28R, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28R described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28R, for example, in conjunction with further implementing any one or more of the various examples described above.

In various embodiments, the operational instructions, when executed by the at least one processor, cause the database system to: generate a database operation energy utilization estimation function based on historic energy utilization data and historic database operation execution data; determine a database operation for execution; determine energy utilization estimation input data for the database operation; perform the database operation energy utilization estimation function upon the energy utilization estimation input data to generate energy utilization estimate data for the database operation; and/or apply an energy efficiency strategy for the database system based on the energy utilization estimate data generated for the database operation.

Figure 28S:
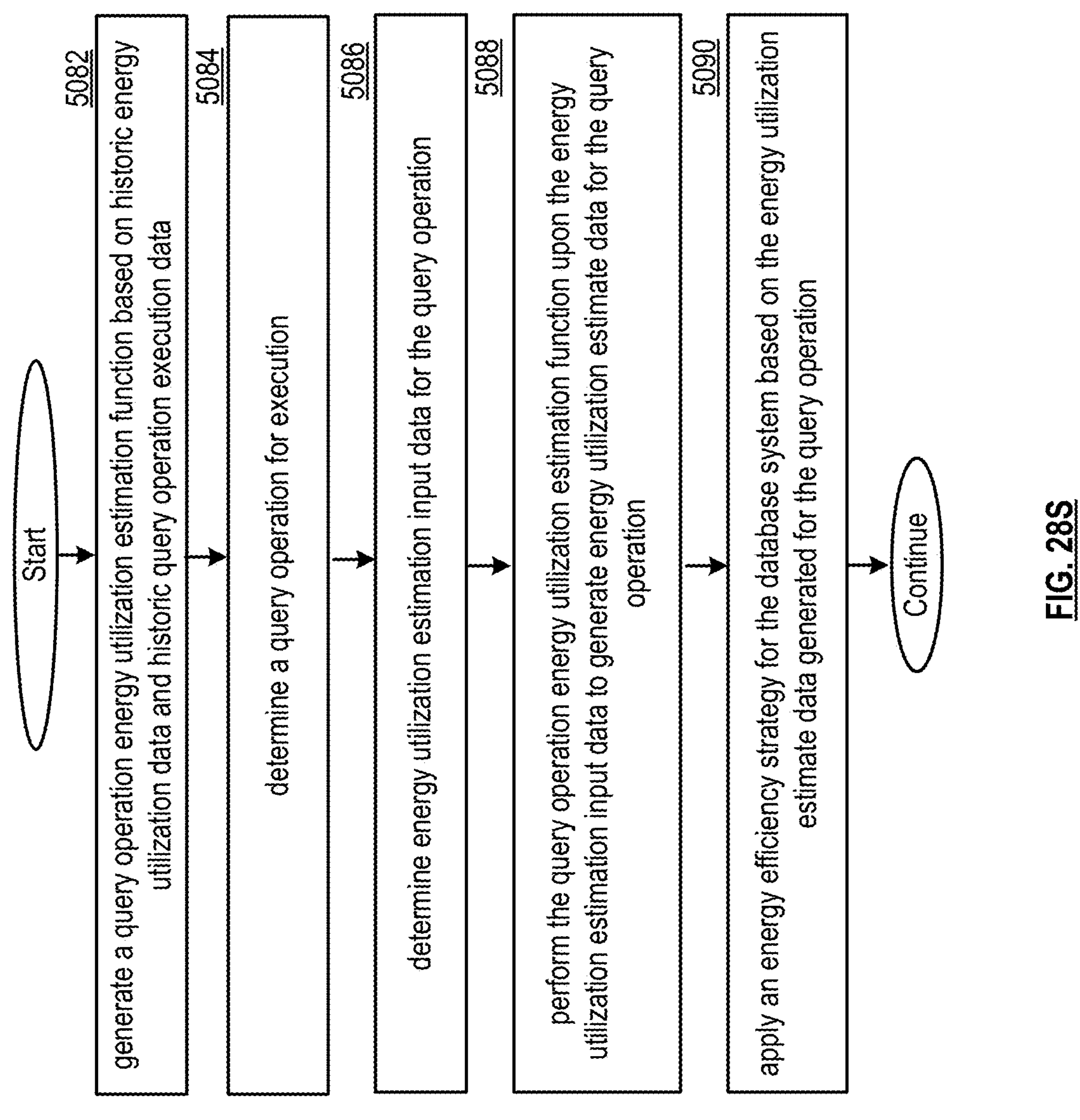

FIG. 28S illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28S. In some embodiments, a node 37 can implement some or all of FIG. 28S based on implementing a corresponding plurality of processing core resources 48.1-48.W. Some or all of the steps of FIG. 28S can optionally be performed by any other one or more processing modules of the database system 10. Some or all of the steps of FIG. 28S can be performed to implement some or all of the functionality of the database system 10 as described in conjunction with FIGS. 28A-28R, for example, by implementing some or all of the functionality of energy utilization estimation system 3551 and/or based on processing and/or generating energy utilization data 3510. Some or all steps of FIG. 28S can be performed by database system 10 in accordance with other embodiments of the database system 10 and/or nodes 37 discussed herein. Some or all steps of FIG. 28S can be performed by database system 10 via processing and/or generating any energy utilization data 3510 described herein. Some or all of the steps of FIG. 28S can be performed in conjunction with performing some or all steps of any other method described herein.

Step 5082 includes generating a query operation energy utilization estimation function based on historic energy utilization data and historic query operation execution data. Step 5084 includes determining a query operation for execution. Step 5086 includes determining energy utilization estimation input data for the query operation. Step 5088 includes performing the query operation energy utilization estimation function upon the energy utilization estimation input data to generate energy utilization estimate data for the query operation. Step 5090 includes applying an energy efficiency strategy for the database system based on the energy utilization estimate data generated for the query operation.

In various examples, the query operation is implemented as the database operation of FIG. 28R. In various examples, the historic query operation execution data is implemented as the historic database operation execution data of FIG. 28R. In various examples, the energy utilization estimation input data for the query operation is implemented as the energy utilization estimation input data for the database operation of FIG. 28R. In various examples, the query operation energy utilization estimation function is implemented as the database operation energy utilization estimation function of FIG. 28R. In various examples, the energy utilization estimate data generated for the query operation is implemented as the energy utilization estimate data generated for the database operation of FIG. 28R.

In various examples, the energy utilization estimation input data includes and/or is based on a query operation type for the query operation indicating one of a plurality of possible query operation types, where the energy utilization estimate data is generated as a function of the query operation type. In various examples, the energy utilization estimation input data includes and/or is based on table size data for at least one relational database table accessed via executing the query operation, where the energy utilization estimate data is generated as a function of the table size data. In various examples, the energy utilization estimation input data includes and/or is based on IO efficiency data determined based on a row cardinality of the at least one relational database table and/or filtering parameters of the query operation, where the energy utilization estimate data is generated as a function of the IO efficiency data. In various examples, the energy utilization estimation input data includes and/or is based on a data formatting scheme of at least one data structure storing the at least one relational database table, where the energy utilization estimate data is generated as a function of the data formatting of the at least one data structure. In various examples, the energy utilization estimation input data includes and/or is based on secondary index structuring of the at least one relational database table, where the energy utilization estimate data is generated as a function of the secondary index structuring.

In various examples, the energy utilization estimation input data includes sub-operation data for the query operation that indicates at least one of: a set of sub-operations included in the query operation; an execution flow of the set of sub-operations corresponding to execution of the query operation; or sub-operation parameter data for each of the set of sub-operations. In various examples, the energy utilization estimate data is generated based on: generating a set of sub-operation energy utilization estimate data based on generating corresponding energy utilization estimate data for different ones of the set of set of sub-operations; and/or computing the energy utilization estimate data based on aggregating the set of sub-operation energy utilization estimate data.

In various examples, the sub-operation data for the query operation indicates the execution flow of the set of sub-operations. In various examples, the execution of the set of sub-operations includes: execution of a first sub-flow that includes a first subset of the set of sub-operations corresponding to generating a filtered subset of rows by reading and filtering rows from at least one of relational database tables identified in the database operation; and/or execution of a second sub-flow, serially after the first sub-flow in the execution flow of the set of sub-operations, that includes a second subset of the set of sub-operations corresponding to further processing the filtered subset of rows to generate a query resultant for the database operation. In various examples, the set of sub-operation energy utilization estimate data includes first sub-operation energy utilization estimate data for the first sub-flow and second sub-operation energy utilization estimate data for the second sub-flow.

In various examples, the method further includes: storing a plurality of rows of a plurality of relational database tables; receiving a query request from a requesting entity indicating a query expression for execution against at least one of the plurality of relational database tables; and/or generating a query operator execution flow for the query expression indicating a flow of a plurality of operators for execution via a plurality of computing device nodes participating in a plurality of levels of a query execution plan. In various examples, the database operation corresponds to the query expression, where the set of sub-operations includes a plurality of query operators of the query operator execution flow. In various examples, the energy utilization estimate data is based on estimated energy consumption across the plurality of computing device nodes in collectively executing the query operator execution flow.

In various examples, the set of sub-operations includes: at least one join operation; at least one aggregation operation;

at least one grouped aggregation operation and/or other type of aggregation operation; at least one set union operation; at least one set intersection operation; at least one set difference operation at least one limit operation; at least one filtering operation; at least one sorting operation; at least one machine learning model training function; at least one machine learning model application function; at least one shuffle operation; at least one multiplexing operation; at least one hash map generation and/or access operation; at least one bloom filter generation and/or access operation; at least one spill to disk operation; at least one CTAS operation; at least one IAS operation; at least one window function; a plurality of parallelized IO operators each implementing a corresponding IO pipeline generated for accessing rows of one corresponding segment of a plurality of segments; and/or a plurality of parallelized operations collectively implementing a sub-operation. In various examples, the set of sub-operations includes one or more instances of any type of operation 2520 and/or 2521 described herein and/or any functionality of execution of a query described herein.

In various examples, the set of sub-operations further includes a query operator execution flow generation and communication operation. In various examples, the query operator execution flow is generated and communicated to the plurality of computing device nodes via execution of the query operator execution flow generation and communication operation. In various examples, the energy utilization estimate data is further based on estimated energy utilization required to execute of the query operator execution flow generation and communication operation. In various examples, the query operator execution flow generation and communication operation includes performing a query probing step.

In various examples, execution of the set of sub-operations includes parallelized execution of a plurality of parallelized sub-operations of the set of sub-operations via a parallelized plurality of nodes (e.g. at a same level of a query execution plan 2405 participating in execution of the query operation) implemented by a plurality of computing device nodes of the database system. In various examples, the set of sub-operation energy utilization estimate data includes sub-operation energy utilization estimate data for different ones of the plurality of parallelized sub-operations.

In various examples, the energy utilization estimate data includes resource-based energy utilization distribution estimate data that includes: drive-based energy utilization estimate data indicating a proportion of total energy utilization induced by drive resources involved in executing the query operation; processor-based energy utilization estimate data indicating a proportion of total energy utilization induced by processor resources involved in executing the query operation; memory-based energy utilization estimate data indicating a proportion of total energy utilization induced by memory resources involved in executing the query operation; and/or network-based energy utilization estimate data indicating a proportion of total energy utilization induced by network resources involved in executing the query operation.

In various examples, the memory-based energy utilization estimate data is based on memory resources required to store at least one of: at least one hash map or at least one bloom filter generated and accessed to perform the database operation.

In various examples, the drive-based energy utilization estimate data is based on disk resources required to spill data to disk during execution of the database operation.

In various examples, the network-based energy utilization estimate data is based on network resources required to communicate data between a plurality of nodes participating in a shuffle operation of the database operation.

In various examples, the network-based energy utilization estimate data is based on network resources required to communicate data between child nodes and parent nodes of a query execution plan implemented to execute the database operation.

In various embodiments, any one of more of the various examples listed above are implemented in conjunction with performing some or all steps of FIG. 28S. In various embodiments, any set of the various examples listed above can be implemented in tandem, for example, in conjunction with performing some or all steps of FIG. 28S, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28S described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28S, for example, in conjunction with further implementing any one or more of the various examples described above.

In various embodiments, the operational instructions, when executed by the at least one processor, cause the database system to: generate a query operation energy utilization estimation function based on historic energy utilization data and historic query operation execution data; determine a query operation for execution; determine energy utilization estimation input data for the query operation; perform the query operation energy utilization estimation function upon the energy utilization estimation input data to generate energy utilization estimate data for the query operation; and/or apply an energy efficiency strategy for the database system based on the energy utilization estimate data generated for the query operation.

Figure 28T:
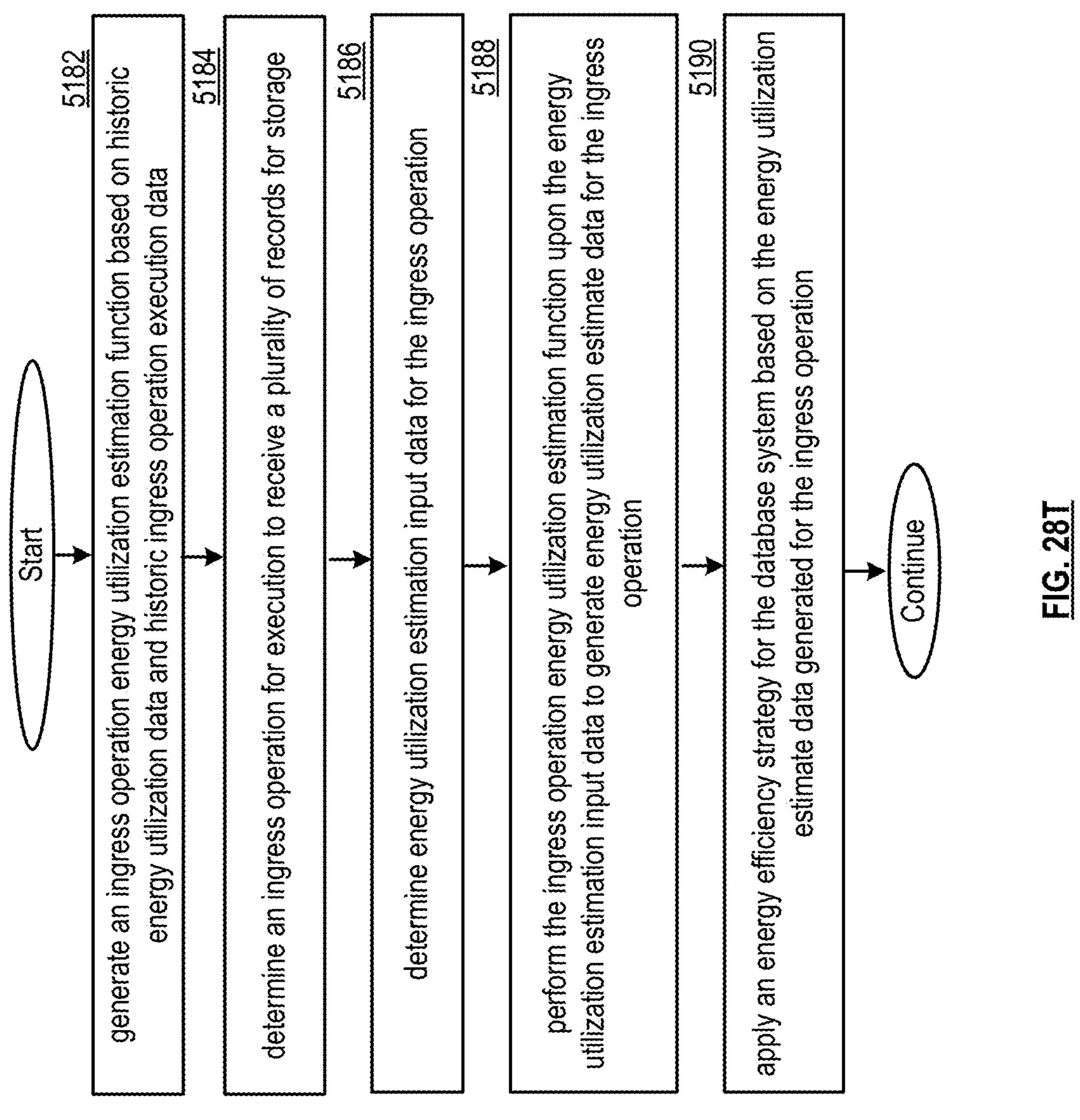

FIG. 28T illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28T. In some embodiments, a node 37 can implement some or all of FIG. 28T based on implementing a corresponding plurality of processing core resources 48.1-48.W. Some or all of the steps of FIG. 28T can optionally be performed by any other one or more processing modules of the database system 10. Some or all of the steps of FIG. 28T can be performed to implement some or all of the functionality of the database system 10 as described in conjunction with FIGS. 28A-28R, for example, by implementing some or all of the functionality of energy utilization estimation system 3551 and/or based on processing and/or generating energy utilization data 3510. Some or all steps of FIG. 28T can be performed by database system 10 in accordance with other embodiments of the database system 10 and/or nodes 37 discussed herein. Some or all steps of FIG. 28T can be performed by database system 10 via processing and/or generating any energy utilization data 3510 described herein. Some or all of the steps of FIG. 28T can be performed in conjunction with performing some or all steps of any other method described herein.

Step 5182 generating an ingress operation energy utilization estimation function based on historic energy utilization data and historic ingress operation execution data. Step 5184 includes determining an ingress operation for execution to receive a plurality of records for storage. Step 5186 includes determining energy utilization estimation input data for the ingress operation. Step 5188 includes performing the ingress operation energy utilization estimation function upon the energy utilization estimation input data to generate energy utilization estimate data for the ingress operation. Step 5190 includes applying an energy efficiency strategy for the database system based on the energy utilization estimate data generated for the ingress operation.

In various examples, the ingress operation is implemented as the database operation of FIG. 28R. In various examples, the historic ingress operation execution data is implemented as the historic database operation execution data of FIG. 28R. In various examples, the energy utilization estimation input data for the ingress operation is implemented as the energy utilization estimation input data for the database operation of FIG. 28R. In various examples, the ingress operation energy utilization estimation function is implemented as the database operation energy utilization estimation function of FIG. 28R. In various examples, the energy utilization estimate data generated for the ingress operation is implemented as the energy utilization estimate data generated for the database operation of FIG. 28R.

In various examples, the energy utilization estimation input data includes and/or is based on an ingress operation type for the ingress operation indicating one of a plurality of possible ingress operation types including a steam-based ingress operation type and a batch-based ingress operation type, where the energy utilization estimate data is generated as a function of the ingress operation type. In various examples, the energy utilization estimation input data includes and/or is based on a number of parallelized data streams for ingress operation, where the energy utilization estimate data is generated as a function of the number of parallelized data streams. In various examples, the energy utilization estimation input data includes and/or is based on a data rate of incoming data for the ingress operation, where the energy utilization estimate data is generated as a function of the number of the data rate. In various examples, the energy utilization estimation input data includes and/or is based on a batch size of a batch of data for the ingress operation, wherein the energy utilization estimate data is generated as a function of the batch size. In various examples, the energy utilization estimation input data includes and/or is based on deduplication efficiency data for deduplication of a plurality of records performed in executing the ingress operation, where the energy utilization estimate data is generated as a function of the deduplication efficiency data. In various examples, the energy utilization estimation input data includes and/or is based on memory type data indicating type of memory utilized to store the plurality of records in executing the ingress operation, where the energy utilization estimate data is generated as a function of the memory type data. In various examples, the energy utilization estimation input data includes and/or is based on storage formatting data indicating type of formatting utilized to store the plurality of records in executing the ingress operation, where the energy utilization estimate data is generated as a function of the storage formatting data. In various examples, the energy utilization estimation input data includes and/or is based on communication protocol data indicating type of communication utilized to send messages to at least one data source supplying the plurality of records, where the energy utilization estimate data is generated as a function of the communication protocol data.

In various examples, the energy utilization estimation input data includes sub-operation data for the ingress operation that indicates at least one of a set of sub-operations included in the ingress operation; an execution flow of the set of sub-operations corresponding to execution of the ingress operation; or sub-operation parameter data for each of the set of sub-operations. In various examples, the energy utilization estimate data is generated based on: generating a set of sub-operation energy utilization estimate data based on generating corresponding energy utilization estimate data for different ones of the set of set of sub-operations; and/or computing the energy utilization estimate data based on aggregating the set of sub-operation energy utilization estimate data.

In various examples, execution of the set of sub-operations includes parallelized execution of a plurality of parallelized sub-operations of the set of sub-operations via a parallelized plurality of loading modules implemented by a plurality of computing device nodes of the database system, wherein the set of sub-operation energy utilization estimate data includes sub-operation energy utilization estimate data for different ones of the plurality of parallelized sub-operations.

In various examples, the set of sub-operations includes the set of sub-operations includes a page generation operation, where execution of the page generation operation includes generating a plurality of memory pages that include a plurality of records received from at least one data source, and/or where the energy utilization estimate data is generated based on estimated energy consumed to store the plurality of memory pages.

In various examples, the set of sub-operations includes the set of sub-operations include a deduplication operation, where execution of the deduplication operation includes deduplicating the plurality of records to guarantee all records received from the at least one data source are stored exactly once, and/or where the energy utilization estimate data is generated based on estimated energy consumed to deduplicate the plurality of records.

In various examples, the set of sub-operations includes a durability horizon update operation, where execution of the durability horizon update operation includes determining and transmit durability horizon data to at least one data source based on row numbers of received ones of the plurality of records and a communication protocol for transmission of the plurality of records via the at least one data source, and/or where the energy utilization estimate data is generated based on estimated energy consumed to determine and transmit the durability horizon data.

In various examples, the energy utilization estimate data includes resource-based energy utilization distribution estimate data that includes: drive-based energy utilization estimate data indicating a proportion of total energy utilization induced by drive resources involved in executing the ingress operation; processor-based energy utilization estimate data indicating a proportion of total energy utilization induced by processor resources involved in executing the ingress operation; memory-based energy utilization estimate data indicating a proportion of total energy utilization induced by memory resources involved in executing the ingress operation; and/or network-based energy utilization estimate data indicating a proportion of total energy utilization induced by network resources involved in executing the ingress operation.

In various examples, the memory-based energy utilization estimate data is based on memory resources required to store a plurality of memory pages that include a plurality of records received from at least one data source.

In various examples, the drive-based energy utilization estimate data is based on disk resources required to spill data to disk during execution of the ingress operation and/or disk resources required to store the plurality of records received from at least one data source.

In various examples, the network-based energy utilization estimate data is based on network resources required to communicate data between a plurality of nodes implementing a plurality of loading modules collectively executing the ingress operation and/or is based on network resources required to receive the plurality of records from at least one data source and/or based on network resources required to transmit confirmation messages and/or row durability data to the at least one data source.

In various embodiments, any one of more of the various examples listed above are implemented in conjunction with performing some or all steps of FIG. 28T. In various embodiments, any set of the various examples listed above can be implemented in tandem, for example, in conjunction with performing some or all steps of FIG. 28T, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28T described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28T, for example, in conjunction with further implementing any one or more of the various examples described above.

In various embodiments, the operational instructions, when executed by the at least one processor, cause the database system to: generate an ingress operation energy utilization estimation function based on historic energy utilization data and historic ingress operation execution data; determine an ingress operation for execution to receive a plurality of records for storage; determine energy utilization estimation input data for the ingress operation; perform the ingress operation energy utilization estimation function upon the energy utilization estimation input data to generate energy utilization estimate data for the ingress operation; and/or apply an energy efficiency strategy for the database system based on the energy utilization estimate data generated for the ingress operation.

Figure 28U:
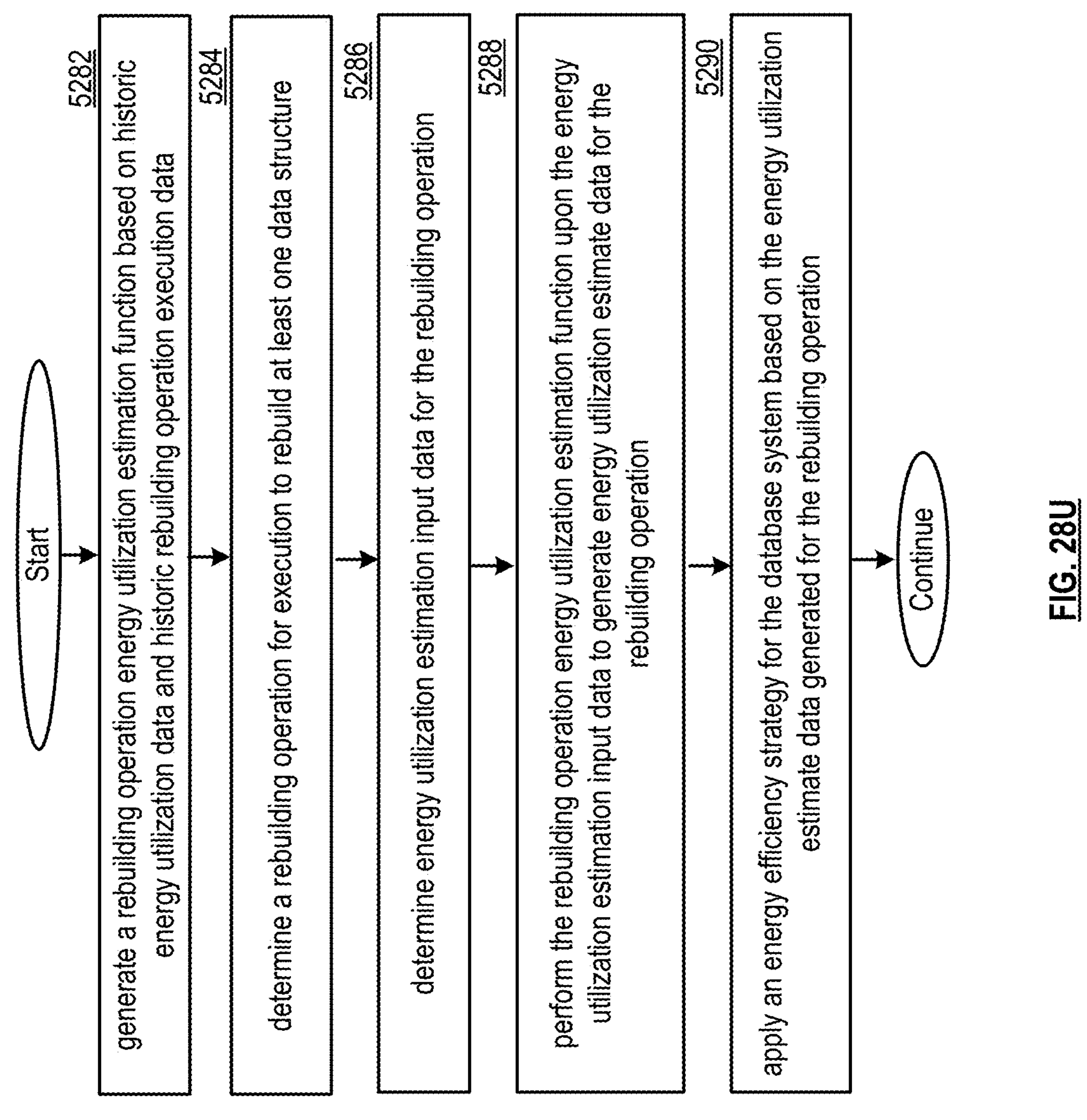

FIG. 28U illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28U. In some embodiments, a node 37 can implement some or all of FIG. 28U based on implementing a corresponding plurality of processing core resources 48.1-48.W. Some or all of the steps of FIG. 28U can optionally be performed by any other one or more processing modules of the database system 10. Some or all of the steps of FIG. 28U can be performed to implement some or all of the functionality of the database system 10 as described in conjunction with FIGS. 28A-28R, for example, by implementing some or all of the functionality of energy utilization estimation system 3551 and/or based on processing and/or generating energy utilization data 3510. Some or all steps of FIG. 28U can be performed by database system 10 in accordance with other embodiments of the database system 10 and/or nodes 37 discussed herein. Some or all steps of FIG. 28U can be performed by database system 10 via processing and/or generating any energy utilization data 3510 described herein. Some or all of the steps of FIG. 28U can be performed in conjunction with performing some or all steps of any other method described herein.

Step 5282 includes generating a rebuilding operation energy utilization estimation function based on historic energy utilization data and historic rebuilding operation execution data. Step 5284 includes determining a rebuilding operation for execution to rebuild at least one data structure. Step 5286 includes determining energy utilization estimation input data for the rebuilding operation. Step 5288 includes performing the rebuilding operation energy utilization estimation function upon the energy utilization estimation input data to generate energy utilization estimate data for the rebuilding operation. Step 5290 includes applying an energy efficiency strategy for the database system based on the energy utilization estimate data generated for the rebuilding operation.

In various examples, the rebuilding operation is implemented as the database operation of FIG. 28R. In various examples, the historic rebuilding operation execution data is implemented as the historic database operation execution data of FIG. 28R. In various examples, the energy utilization estimation input data for the rebuilding operation is implemented as the energy utilization estimation input data for the database operation of FIG. 28R. In various examples, the rebuilding operation energy utilization estimation function is implemented as the database operation energy utilization estimation function of FIG. 28R. In various examples, the energy utilization estimate data generated for the rebuilding operation is implemented as the energy utilization estimate data generated for the database operation of FIG. 28R.

In various examples, the energy utilization estimation input data includes and/or is based on a rebuilding operation type for the rebuilding operation indicating one of a plurality of possible rebuilding operation types, where the energy utilization estimate data is generated as a function of the rebuilding operation type, In various examples, the energy utilization estimation input data includes and/or is based on a redundancy storage scheme applied to rebuild the at least one data structure in executing the rebuilding operation, where the energy utilization estimate data is generated as a function of the rebuilding operation. In various examples, the energy utilization estimation input data includes and/or is based on a number of data structures in a same segment group in accordance with the redundancy storage scheme, where the energy utilization estimate data is generated as a function of the number of data structures. In various examples, the energy utilization estimation input data includes and/or is based on a number of other data structures accessed in performing the rebuilding operation, where the energy utilization estimate data is generated as a function of the number of other data structures. In various examples, the energy utilization estimation input data includes and/or is based on a number of computing device nodes storing the other data structures, wherein the energy utilization estimate data is generated as a function of the number of computing device nodes.

In various examples, the energy utilization estimation input data includes sub-operation data for the rebuilding operation that indicates at least one of a set of sub-operations included in the rebuilding operation; an execution flow of the set of sub-operations corresponding to execution of the rebuilding operation; or sub-operation parameter data for each of the set of sub-operations. In various examples, the energy utilization estimate data is generated based on: generating a set of sub-operation energy utilization estimate data based on generating corresponding energy utilization estimate data for different ones of the set of set of sub-operations; and/or computing the energy utilization estimate data based on aggregating the set of sub-operation energy utilization estimate data.

In various examples, the set of sub-operations includes a storage location identification operation, where execution of the page generation operation includes, for each data structure to be rebuilt, identifying a plurality of storage locations for a plurality of other data structures required to rebuild the each data structure in accordance with a redundancy storage scheme utilized to generate the each data structure and the plurality of other data structures from a record group of records, and/or where the energy utilization estimate data is generated based on estimated energy consumed to identify the plurality of storage locations.

In various examples, the set of sub-operations includes a data structure access operation, where execution of the data structure access operation includes, for the each data structure to be rebuilt, retrieving the plurality of other data structures in plurality of storage locations, where the energy utilization estimate data is generated based on estimated energy consumed to retrieve the plurality the plurality of other data structures.

In various examples, the set of sub-operations includes a rebuild function performance operation, where execution of the rebuild function performance operation includes, for the each data structure to be rebuilt, performing the rebuild function upon the other data structures retrieved from the plurality of storage locations to re-generate the data structure as a rebuilt data structure, and/or where the energy utilization estimate data is generated based on estimated energy consumed to performing the rebuild function.

In various examples, the wherein the rebuilding operation is performed to rebuild a plurality of data structures upon at least one new computing device node added to a storage cluster of the database system that includes a plurality of computing device nodes. In various examples, the energy utilization estimate data is generated based on at least one of: a number of data structures in the plurality of data structures; or a number of new nodes in the at least one new computing device node.

In various examples, the execution of the rebuilding operation includes parallelized execution of a plurality of parallelized sub-operations of the set of sub-operations via a parallelized plurality of rebuild modules implemented by the at least one new computing device node. In various examples, the set of sub-operation energy utilization estimate data includes sub-operation energy utilization estimate data for different ones of the plurality of parallelized sub-operations.

In various examples, the energy utilization estimate data includes resource-based energy utilization distribution estimate data that includes: drive-based energy utilization estimate data indicating a proportion of total energy utilization induced by drive resources involved in executing the rebuilding operation; processor-based energy utilization estimate data indicating a proportion of total energy utilization induced by processor resources involved in executing the rebuilding operation; memory-based energy utilization estimate data indicating a proportion of total energy utilization induced by memory resources involved in executing the rebuilding operation; and/or network-based energy utilization estimate data indicating a proportion of total energy utilization induced by network resources involved in executing the rebuilding operation.

In various examples, the memory-based energy utilization estimate data is based on memory resources required to store intermediate data generated in rebuild the at least one data structure.

In various examples, the drive-based energy utilization estimate data is based on disk resources required to spill data to disk during execution of the rebuilding operation and/or disk resources required to store the plurality of records received from at least one data source.

In various examples, the network-based energy utilization estimate data is based on network resources required to communicate data between a plurality of nodes in a computing cluster storing other data structures utilized to rebuild the at least one data structure in accordance with a redundancy storage scheme.

In various embodiments, any one of more of the various examples listed above are implemented in conjunction with performing some or all steps of FIG. 28U. In various embodiments, any set of the various examples listed above can be implemented in tandem, for example, in conjunction with performing some or all steps of FIG. 28U, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28U described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28U, for example, in conjunction with further implementing any one or more of the various examples described above.

In various embodiments, the operational instructions, when executed by the at least one processor, cause the database system to: generate a rebuilding operation energy utilization estimation function based on historic energy utilization data and historic rebuilding operation execution data; determine a rebuilding operation for execution to rebuild at least one data structure; determine energy utilization estimation input data for the rebuilding operation; perform the rebuilding operation energy utilization estimation function upon the energy utilization estimation input data to generate energy utilization estimate data for the rebuilding operation; and/or apply an energy efficiency strategy for the database system based on the energy utilization estimate data generated for the rebuilding operation.

Figure 28V:
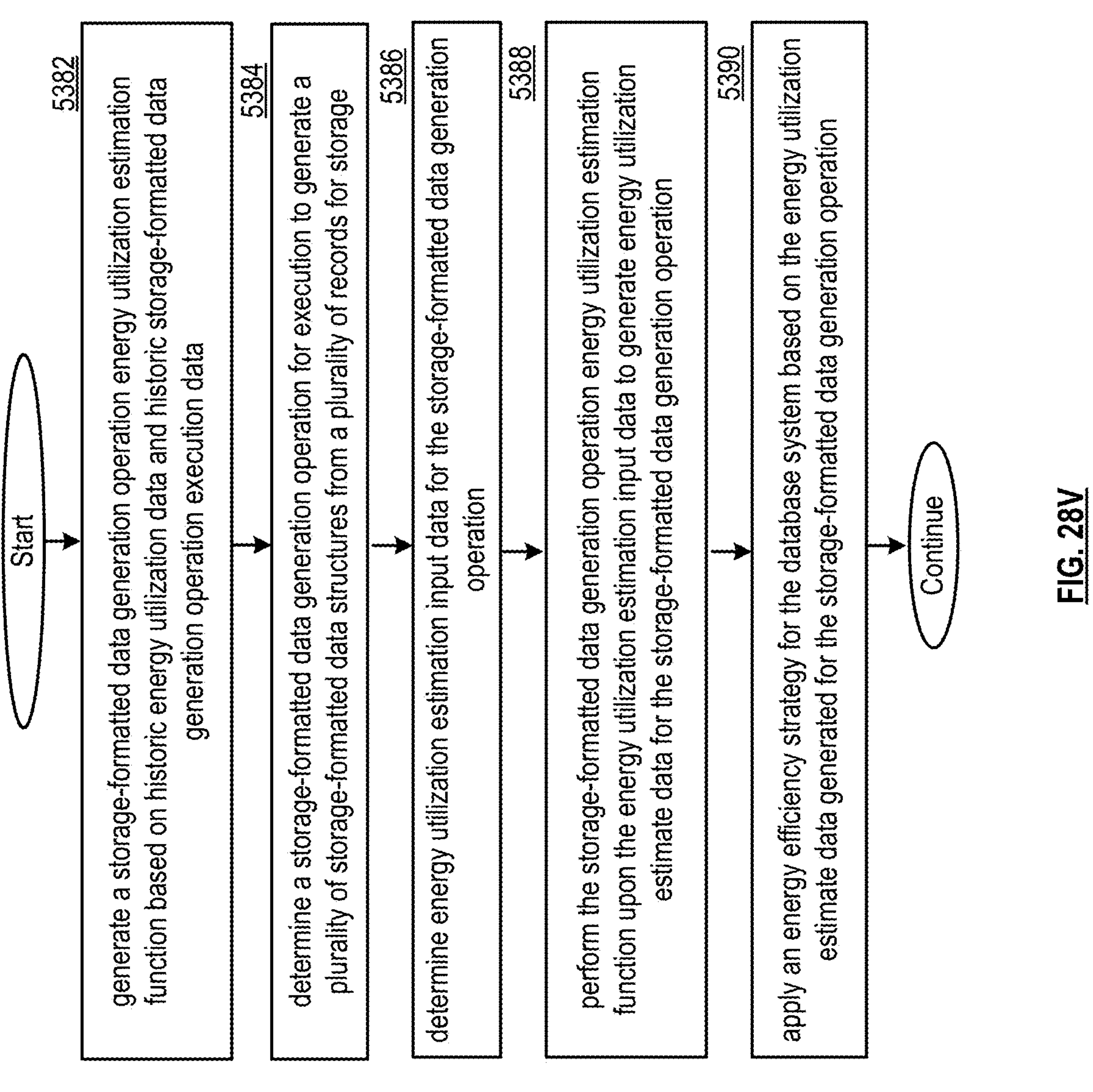

FIG. 28V illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28V. In some embodiments, a node 37 can implement some or all of FIG. 28V based on implementing a corresponding plurality of processing core resources 48.1-48.W. Some or all of the steps of FIG. 28V can optionally be performed by any other one or more processing modules of the database system 10. Some or all of the steps of FIG. 28V can be performed to implement some or all of the functionality of the database system 10 as described in conjunction with FIGS. 28A-28R, for example, by implementing some or all of the functionality of energy utilization estimation system 3551 and/or based on processing and/or generating energy utilization data 3510. Some or all steps of FIG. 28V can be performed by database system 10 in accordance with other embodiments of the database system 10 and/or nodes 37 discussed herein. Some or all steps of FIG. 28V can be performed by database system 10 via processing and/or generating any energy utilization data 3510 described herein. Some or all of the steps of FIG. 28V can be performed in conjunction with performing some or all steps of any other method described herein.

Step 5382 includes generating a storage-formatted data generation operation energy utilization estimation function based on historic energy utilization data and historic storage-formatted data generation operation execution data. Step 5384 includes determining a storage-formatted data generation operation for execution to generate a plurality of storage-formatted data structures from a plurality of records for storage. Step 5386 includes determining energy utilization estimation input data for the storage-formatted data generation operation. Step 5388 includes performing the storage-formatted data generation operation energy utilization estimation function upon the energy utilization estimation input data to generate energy utilization estimate data for the storage-formatted data generation operation. Step 5390 includes applying an energy efficiency strategy for the database system based on the energy utilization estimate data generated for the storage-formatted data generation operation.

In various examples, the storage-formatted data generation operation is implemented as the database operation of FIG. 28R. In various examples, the historic storage-formatted data generation operation execution data is implemented as the historic database operation execution data of FIG. 28R. In various examples, the energy utilization estimation input data for the storage-formatted data generation operation is implemented as the energy utilization estimation input data for the database operation of FIG. 28R. In various examples, the storage-formatted data generation operation energy utilization estimation function is implemented as the database operation energy utilization estimation function of FIG. 28R. In various examples, the energy utilization estimate data generated for the storage-formatted data generation operation is implemented as the energy utilization estimate data generated for the database operation of FIG. 28R.

In various examples, the energy utilization estimation input data includes and/or is based on a storage-formatted data generation operation type for the storage-formatted data generation operation indicating one of a plurality of possible storage-formatted data generation operation types for generation of the plurality of storage-formatted data structures, where the energy utilization estimate data is generated as a function of the storage-formatted data generation operation type. In various examples, the energy utilization estimation input data includes and/or is based on size data for plurality of storage-formatted data structures, wherein the energy utilization estimate data is generated as a function of the size data. In various examples, the energy utilization estimation input data includes and/or is based on a number of pages in a conversion page set for the storage-formatted data generation operation, wherein the energy utilization estimate data is generated as a function of number of pages in the conversion page set. In various examples, the energy utilization estimation input data includes and/or is based on a number of segment groups generated via the storage-formatted data generation operation that include the plurality of storage-formatted data structures, where the energy utilization estimate data is generated as a function of number of segment groups.

In various examples, the energy utilization estimation input data includes and/or is based on indexing strategy data for generating index structures included in the storage-formatted data structures in executing the storage-formatted data generation operation, where the energy utilization estimate data is generated as a function of the indexing strategy data. In various examples, the energy utilization estimation input data includes and/or is based on memory type data indicating type of memory utilized to store the plurality of storage-formatted data structures in executing the storage-formatted data generation operation, where the energy utilization estimate data is generated as a function of the memory type data. In various examples, the energy utilization estimation input data includes and/or is based on compression scheme data indicating at least one of a compression ratio for the storage-formatted data structures or processing efficiency for compressing data in generating storage-formatted data structures, where the energy utilization estimate data is generated as a function of the one of the compression ratio or the compression processing efficiency. In various examples, the energy utilization estimation input data includes and/or is based on redundancy storage scheme efficiency data indicating at least one of parity memory efficiency of parity data included in the storage-formatted data structures in conjunction with a redundancy storage scheme or parity processing efficiency of generating the parity data in accordance with the redundancy storage scheme, where the energy utilization estimate data is generated as a function of the one of the parity memory efficiency or the parity processing efficiency. In various examples, the energy utilization estimation input data includes and/or is based on global dictionary compression (GDC) storage type data indicating at least one of a type of memory utilized to store a global dictionary structure generated and stored in conjunction with compressing data included in the storage-formatted data structures; a size of the global dictionary structure; or a density of the global dictionary structure, where the energy utilization estimate data is generated as a function of the one of the type of memory, the size of the global dictionary structure, or the density of the global dictionary structure.

In various examples, the energy utilization estimation input data includes sub-operation data for the storage-formatted data generation operation that indicates at least one of: a set of sub-operations included in the storage-formatted data generation operation; an execution flow of the set of sub-operations corresponding to execution of the storage-formatted data generation operation; or sub-operation parameter data for each of the set of sub-operations. In various examples, the energy utilization estimate data is generated based on: generating a set of sub-operation energy utilization estimate data based on generating corresponding energy utilization estimate data for different ones of the set of set of sub-operations; and/or computing the energy utilization estimate data based on aggregating the set of sub-operation energy utilization estimate data.

In various examples, execution of the set of sub-operations includes parallelized execution of a plurality of parallelized sub-operations of the set of sub-operations via a parallelized plurality of loading modules implemented by a plurality of computing device nodes of the database system. In various examples, the set of sub-operation energy utilization estimate data includes sub-operation energy utilization estimate data for different ones of the plurality of parallelized sub-operations.

In various examples, the set of sub-operations includes a cluster key grouping operation, where execution of the page generation operation includes segregating the plurality of records into a plurality of record groups by cluster key, and/or where the energy utilization estimate data is generated based on estimated energy consumed to generate the plurality of record groups.

In various examples, the set of sub-operations includes s columnar rotation operation, where execution of the columnar rotation operation includes generating a set of column-formatted record data from each of the plurality of record groups for inclusion in a corresponding set of storage-formatted data structures of the plurality of storage-formatted data structures, and/or where the energy utilization estimate data is generated based on estimated energy consumed to generate the set of column-formatted record data.

In various examples, the set of sub-operations includes an index structure generator operation, where execution of the index structure generator operation includes generating at least one index structure indexing values of at least one column of the plurality of records, and/or where the energy utilization estimate data is generated based on estimated energy consumed to generate the at least one index structure.

In various examples, the energy utilization estimate data includes resource-based energy utilization distribution estimate data that includes: drive-based energy utilization estimate data indicating a proportion of total energy utilization induced by drive resources involved in executing the storage-formatted data generation operation; processor-based energy utilization estimate data indicating a proportion of total energy utilization induced by processor resources involved in executing the storage-formatted data generation operation; memory-based energy utilization estimate data indicating a proportion of total energy utilization induced by memory resources involved in executing the storage-formatted data generation operation; and/or network-based energy utilization estimate data indicating a proportion of total energy utilization induced by network resources involved in executing the storage-formatted data generation operation.

In various examples, the memory-based energy utilization estimate data is based on memory resources required to store intermediate data generated as part of generating the plurality of storage-formatted data structures in executing the storage-formatted data generation operation.

In various examples, the drive-based energy utilization estimate data is based on disk resources required to store the plurality of storage-formatted data structures.

In various examples, the network-based energy utilization estimate data is based on network resources required to communicate data between a plurality of nodes implementing a plurality of loading modules collectively executing the storage-formatted data generation operation.

In various embodiments, any one of more of the various examples listed above are implemented in conjunction with performing some or all steps of FIG. 28V. In various embodiments, any set of the various examples listed above can be implemented in tandem, for example, in conjunction with performing some or all steps of FIG. 28V, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28V described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28V, for example, in conjunction with further implementing any one or more of the various examples described above.

In various embodiments, the operational instructions, when executed by the at least one processor, cause the database system to: generate a storage-formatted data generation operation energy utilization estimation function based on historic energy utilization data and historic storage-formatted data generation operation execution data; determine a storage-formatted data generation operation for execution to generate a plurality of storage-formatted data structures from a plurality of records for storage; determine energy utilization estimation input data for the storage-formatted data generation operation; perform the storage-formatted data generation operation energy utilization estimation function upon the energy utilization estimation input data to generate energy utilization estimate data for the storage-formatted data generation operation; and/or apply an energy efficiency strategy for the database system based on the energy utilization estimate data generated for the storage-formatted data generation operation.

Figure 28W:
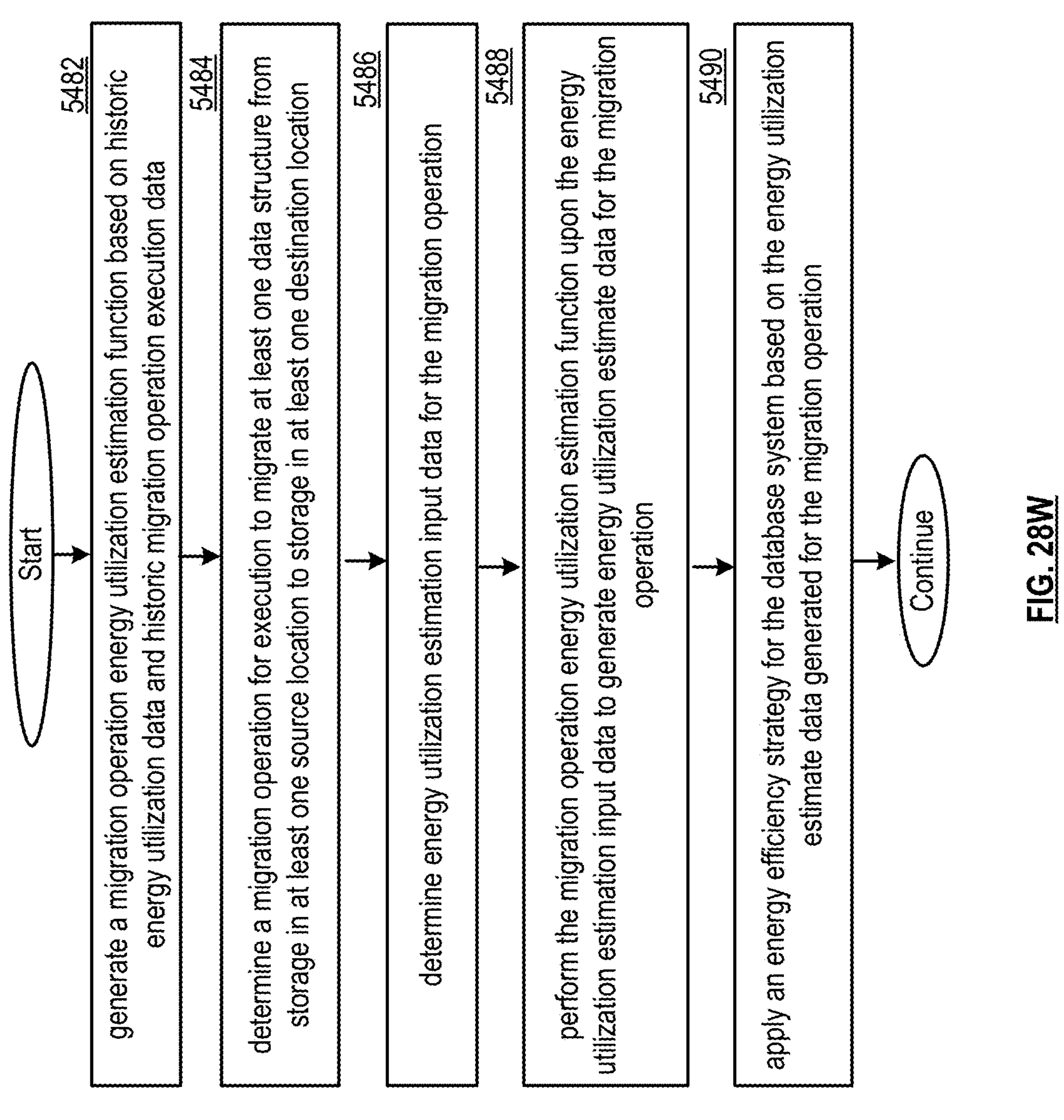

FIG. 28W illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28W. In some embodiments, a node 37 can implement some or all of FIG. 28W based on implementing a corresponding plurality of processing core resources 48.1-48.W. Some or all of the steps of FIG. 28W can optionally be performed by any other one or more processing modules of the database system 10. Some or all of the steps of FIG. 28W can be performed to implement some or all of the functionality of the database system 10 as described in conjunction with FIGS. 28A-28R, for example, by implementing some or all of the functionality of energy utilization estimation system 3551 and/or based on processing and/or generating energy utilization data 3510. Some or all steps of FIG. 28W can be performed by database system 10 in accordance with other embodiments of the database system 10 and/or nodes 37 discussed herein. Some or all steps of FIG. 28W can be performed by database system 10 via processing and/or generating any energy utilization data 3510 described herein. Some or all of the steps of FIG. 28W can be performed in conjunction with performing some or all steps of any other method described herein.

Step 5482 includes generating a migration operation energy utilization estimation function based on historic energy utilization data and historic migration operation execution data. Step 5484 includes determining a migration operation for execution to migrate at least one data structure from storage in at least one source location to storage in at least one destination location. Step 5486 includes determining energy utilization estimation input data for the migration operation. Step 5488 includes performing the migration operation energy utilization estimation function upon the energy utilization estimation input data to generate energy utilization estimate data for the migration operation. Step 5490 includes applying an energy efficiency strategy for the database system based on the energy utilization estimate data generated for the migration operation.

In various examples, the migration operation is implemented as the database operation of FIG. 28R. In various examples, the historic migration operation execution data is implemented as the historic database operation execution data of FIG. 28R. In various examples, the energy utilization estimation input data for the migration operation is implemented as the energy utilization estimation input data for the database operation of FIG. 28R. In various examples, the migration operation energy utilization estimation function is implemented as the database operation energy utilization estimation function of FIG. 28R. In various examples, the energy utilization estimate data generated for the migration operation is implemented as the energy utilization estimate data generated for the database operation of FIG. 28R.

In various examples, the energy utilization estimation input data includes and/or is based on a migration operation type for the migration operation indicating one of a plurality of possible migration operation types, where the energy utilization estimate data is generated as a function of the migration operation type. In various examples, the energy utilization estimation input data includes and/or is based on batch size data for a batch of data structures for migration that includes the at least one data structure, where the energy utilization estimate data is generated as a function of the batch size data. In various examples, the energy utilization estimation input data includes and/or is based on source storage cluster data for a storage cluster of a first plurality of computing device nodes that includes the at least one source location, where the energy utilization estimate data is generated as a function of the source storage cluster data. In various examples, the energy utilization estimation input data includes and/or is based on destination storage cluster data for a storage cluster of a second plurality of computing device nodes that includes the at least one destination location, where the energy utilization estimate data is generated as a function of the destination storage cluster data. In various examples, the energy utilization estimation input data includes and/or is based on transfer coordinator data for at least one computing device implementing at least one transfer coordinator module for performing the migration operation, where the energy utilization estimate data is generated as a function of the transfer coordinator data.

In various examples, the energy utilization estimation input data includes sub-operation data for the migration operation that indicates at least one of: a set of sub-operations included in the migration operation; an execution flow of the set of sub-operations corresponding to execution of the migration operation; or sub-operation parameter data for each of the set of sub-operations. In various examples, the energy utilization estimate data is generated based on: generating a set of sub-operation energy utilization estimate data based on generating corresponding energy utilization estimate data for different ones of the set of set of sub-operations; and/or computing the energy utilization estimate data based on aggregating the set of sub-operation energy utilization estimate data.

In various examples, the execution of the set of sub-operations includes parallelized execution of a plurality of parallelized sub-operations of the set of sub-operations via a parallelized plurality of transfer modules implemented by a plurality of computing device nodes of the database system, where the set of sub-operation energy utilization estimate data includes sub-operation energy utilization estimate data for different ones of the plurality of parallelized sub-operations.

In various examples, the set of sub-operations includes a start transfer operation, where execution of the start transfer step operation includes communication of start transfer instructions to at least one first computing device node that includes the at least one source location and to at least one second computing device node that includes the at least one destination location, and/or where the energy utilization estimate data is generated based on estimated energy consumed to communicate and process the start transfer instructions.

In various examples, the set of sub-operations includes a transfer group operation, wherein execution of the transfer group operation includes at least one of communication of execute transfer instructions to the at least one second computing device node that includes the at least one destination location and to at least one second computing device node that includes the at least one destination location, wherein the energy utilization estimate data is generated based on estimated energy consumed to communicate and process the execute transfer instructions; building of the segment group by the at least one second computing device node based on retrieving the at least one data structure from the at least one first computing device node, wherein the energy utilization estimate data is generated based on estimated energy consumed to build the segment group by the at least one second computing device node; and/or communication of a transfer complete notification by the at least one second computing device node, wherein the energy utilization estimate data is generated based on estimated energy consumed to communicate and process the transfer complete notification.

In various examples, the set of sub-operations includes a commit transfer operation, wherein execution of the commit transfer operation includes communication of a commit transfer instruction to the at least one first computing device node and communication of a transfer committed confirmation notification by the at least one first computing device node, where the energy utilization estimate data is generated based on estimated energy consumed to communicate and process the commit transfer instruction and the commit transfer confirmation notification.

In various examples, the set of sub-operations includes an end transfer operation, wherein execution of the end transfer operation includes communication of transfer finalization instructions to the at least one first computing device node and to the at least one second computing device node, where the energy utilization estimate data is generated based on estimated energy consumed to communicate and process the transfer finalization instructions.

In various examples, the migration operation implements a storage rebalancing process. In various examples, the set of sub-operations includes a source and target criteria generator operation, where execution of the source and target criteria generator operation includes generating source threshold storage utilization data and target threshold storage utilization data, and/or where the energy utilization estimate data is generated based on estimated energy consumed to generate the source threshold storage utilization data and target threshold storage utilization data.

In various examples, the set of sub-operations includes a source and target selection operation, where execution of the source and target selection operation includes selecting a plurality of source locations and a plurality of target locations based on applying the source threshold storage utilization and the target threshold storage utilization data, and/or where the energy utilization estimate data is generated based on estimated energy consumed to select the plurality of source locations and the plurality of target locations.

In various examples, the set of sub-operations includes a plurality of data transfer operations, where execution of each of the data transfer operations includes migrating data from one of the plurality of source locations to a corresponding one of the plurality of target locations, and/or where the energy utilization estimate data is generated based on estimated energy consumed to perform the plurality of data transfer operations.

In various examples, the memory-based energy utilization estimate data is based on memory resources required to store intermediate data generated in migrating the at least one data structure from the at least one source location to the at least one target location.

In various examples, the drive-based energy utilization estimate data is based on disk resources required to store the at least one data structure in the at least one target location after migration from the at least one source location.

In various examples, the network-based energy utilization estimate data is based on network resources required to communicate the at least one data structure from the at least one source location to the at least one target location.

In various examples, the network-based energy utilization estimate data is based on network resources required to communicate instructions and notifications between a task coordinator module, the at least one source location, and/or the at least one target location.

In various embodiments, any one of more of the various examples listed above are implemented in conjunction with performing some or all steps of FIG. 28W. In various embodiments, any set of the various examples listed above can be implemented in tandem, for example, in conjunction with performing some or all steps of FIG. 28W, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28W described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28W, for example, in conjunction with further implementing any one or more of the various examples described above.

In various embodiments, the operational instructions, when executed by the at least one processor, cause the database system to: generate a migration operation energy utilization estimation function based on historic energy utilization data and historic migration operation execution data; determine a migration operation for execution to migrate at least one data structure from storage in at least one source location to storage in at least one destination location; determine energy utilization estimation input data for the migration operation; perform the migration operation energy utilization estimation function upon the energy utilization estimation input data to generate energy utilization estimate data for the migration operation; and/or apply an energy efficiency strategy for the database system based on the energy utilization estimate data generated for the migration operation.

Figure 28X:
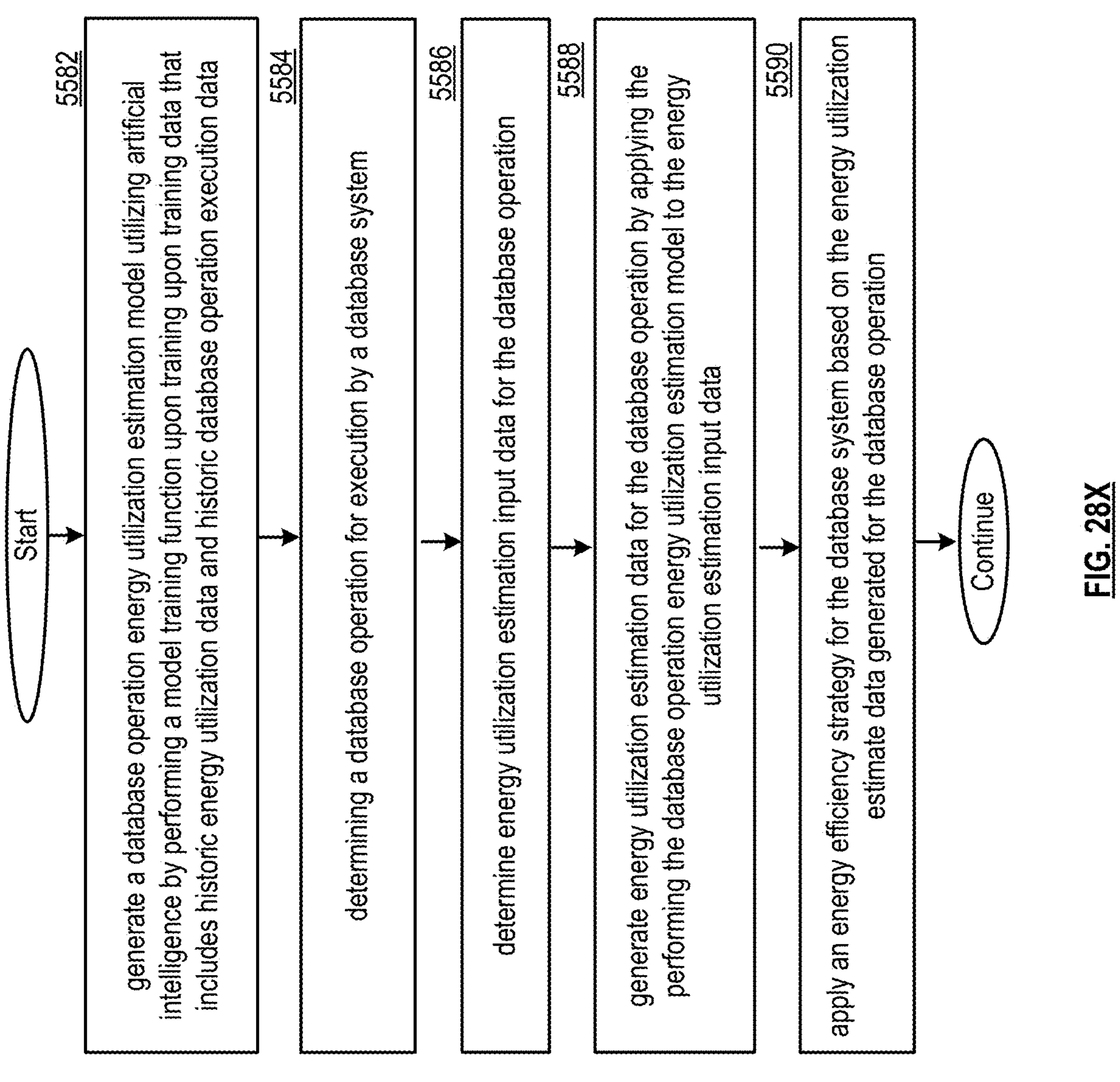

FIG. 28X illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28X. In some embodiments, a node 37 can implement some or all of FIG. 28X based on implementing a corresponding plurality of processing core resources 48.1-48.W. Some or all of the steps of FIG. 28X can optionally be performed by any other one or more processing modules of the database system 10. Some or all of the steps of FIG. 28X can be performed to implement some or all of the functionality of the database system 10 as described in conjunction with FIGS. 28A-28R, for example, by implementing some or all of the functionality of energy utilization estimation system 3551 and/or based on processing and/or generating energy utilization data 3510. Some or all steps of FIG. 28X can be performed by database system 10 in accordance with other embodiments of the database system 10 and/or nodes 37 discussed herein. Some or all steps of FIG. 28X can be performed by database system 10 via processing and/or generating any energy utilization data 3510 described herein. Some or all of the steps of FIG. 28X can be performed in conjunction with performing some or all steps of any other method described herein.

Step 5582 includes generating a database operation energy utilization estimation model utilizing artificial intelligence by performing a model training function upon training upon training data that includes historic energy utilization data and historic database operation execution data. Step 5584 includes determining a database operation for execution by a database system. Step 5586 includes determining energy utilization estimation input data for the database operation. Step 5588 includes generating energy utilization estimation data for the database operation by applying the performing the database operation energy utilization estimation model to the energy utilization estimation input data. Step 5590 includes applying an energy efficiency strategy for the database system based on the energy utilization estimate data generated for the database operation.

In various examples, the method further includes: executing a plurality of prior operations; and/or generating a plurality of energy utilization measurements for the plurality of prior operations. In various examples, the training data includes the plurality of energy utilization measurements for the plurality of prior operations.

In various examples, the database system is implemented via a plurality of computing devices of at least one data center. In various examples, power is delivered to the plurality of computing devices via at least one power distribution system that includes at least one power monitoring module. In various examples, the historic energy utilization data is based on power meter measurement data generated via the at least one power monitoring module during execution of a plurality of previously database operations.

In various examples, the database operation is executed during a temporal period. In various examples, the method further includes generating energy utilization measurement data for the database operation based on measuring power consumption during the temporal period; generating estimation error data for the energy utilization estimate data based on the energy utilization measurement data; and/or generating model accuracy data based on the estimation error data.

In various examples, the method further includes generating energy utilization measurement data for the database operation based on measuring power consumption during the temporal period; and/or retraining the database operation energy utilization estimation model upon a new training set that includes the energy utilization measurement data for the database operation.

In various examples, the method further includes: determining a plurality of database operations for execution by the database system; and/or generating utilization estimation data for each of the plurality of database operations by applying the performing the database operation energy utilization estimation model to energy utilization estimation input data for the each of the plurality of database operations. In various examples, applying the energy efficiency strategy includes generating an energy utilization-based operation scheduling model utilizing artificial intelligence by performing a model training function upon training upon second training data that includes the utilization estimation data generated for the each of the plurality of database operations. In various examples, the method further includes: determining a second plurality of database operations for execution by the database system; and/or scheduling execution of the second plurality of database operations based on applying the energy utilization-based operation scheduling model.

In various examples, the method further includes: determining a plurality of database operations for execution by the database system; and/or generating utilization estimation data for each of the plurality of database operations by applying the performing the database operation energy utilization estimation model to energy utilization estimation input data for the each of the plurality of database operations. In various examples, applying the energy efficiency strategy includes generating an energy utilization-based operation optimization model utilizing artificial intelligence by performing a model training function upon training upon second training data that includes the utilization estimation data generated for the each of the plurality of database operations. In various examples, the method further includes determining a second database operation for execution by the database system; and/or optimizing execution of the second database operation based on applying the energy utilization-based operation scheduling model.

In various embodiments, any one of more of the various examples listed above are implemented in conjunction with performing some or all steps of FIG. 28X. In various embodiments, any set of the various examples listed above can be implemented in tandem, for example, in conjunction with performing some or all steps of FIG. 28X, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28X described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28X, for example, in conjunction with further implementing any one or more of the various examples described above.

In various embodiments, the operational instructions, when executed by the at least one processor, cause the database system to: generate a database operation energy utilization estimation model utilizing artificial intelligence by performing a model training function upon training upon training data that includes historic energy utilization data and historic database operation execution data; determining a database operation for execution by a database system; determine energy utilization estimation input data for the database operation; generate energy utilization estimation data for the database operation by applying the performing the database operation energy utilization estimation model to the energy utilization estimation input data; and apply an energy efficiency strategy for the database system based on the energy utilization estimate data generated for the database operation.

Figure 29A:
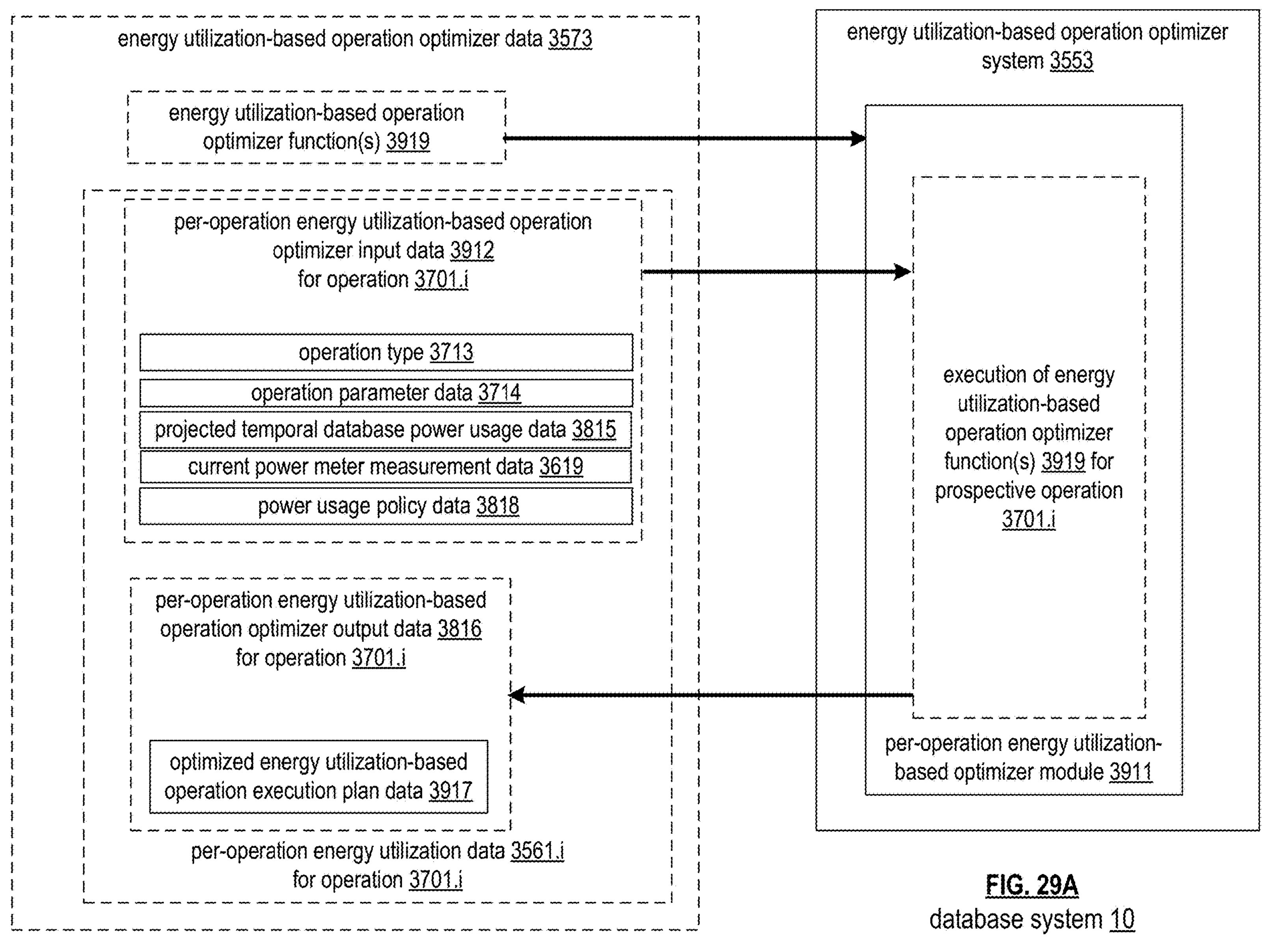
FIGS. 29A-29C are schematic block diagrams of an energy utilization-based operation optimizer system in accordance with various embodiments.

FIGS. 29A-29U illustrate embodiments of a database system that implements an energy utilization-based operation optimizer system 3553. Some or all features and/or functionality of the energy utilization-based operation optimizer system 3553 of FIGS. 29A-29U can implement the energy utilization-based operation optimizer system 3553 of FIG. 26C and/or any embodiment of the energy utilization processing system 3500 described herein. Some or all features and/or functionality of the energy utilization-based operation optimizer data 3573 of FIGS. 29A-29U can implement any embodiment of energy utilization data 3510 described herein. Some or all features and/or functionality of database system 10 of 29A-29U can implement any embodiment of database system 10 described herein.

While FIGS. 29A-29M present embodiments where a plurality of operations are scheduled to improve energy efficiency by the database system over a period of time in which the plurality of operations are executed (e.g. by reducing power spikes), for example, based on scheduling operations relative to one another to smooth power utilization over time, the energy efficiency of individual operations is not necessarily affected (e.g. instead the time at which corresponding energy utilization is induced is configured intelligently relative to other operations. Meanwhile, FIGS. 29A-29U present embodiments where the execution of individual operations is configured, for example, to improve the energy efficiency induced by individual operations in conjunction with optimizing the individual operations for execution (e.g. when the means by which how the execution of these operations is selected, for example, from a plurality of valid options that would render correct execution of the operation yielding a correct/requested result). This can improve energy efficiency of the database system 10 as a whole: individual operations executed across the have their respective execution configured to reduce contributions to energy utilization, which can yield lower/more efficient energy utilization overall.

FIG. 29A illustrates an embodiment of an energy utilization-based operation optimizer system 3553 that implements a per-operation energy utilization-based operation optimizer module 3911 that executes one or more energy utilization-based operation optimizer functions 3919 to generate per-operation energy utilization-based operation optimizer output data 3916 that includes optimized energy utilization-based operation execution plan data 3917 for a given database operation 3701.*i* (e.g. a prospective operation that has not yet been performed) based on per-operation energy utilization-based operation optimizer input data 3912 for the given database operation 3701.*i*.

The one or more energy utilization-based operation optimizer functions 3919 can be executed based on applying corresponding parameters, weights, and/or function definition(s) that are: received by energy utilization processing system 3500; accessed in memory by energy utilization processing system 3500; configured via user input by a user entity communicating with energy utilization processing system 3500; automatically generated and/or automatically updated/re-tuned over time by energy utilization processing system 3500 (e.g. via training on training data to generate a corresponding machine learning model and/or artificial intelligence (AI) model based on utilizing at least one machine learning-based training function and/or technique and/or based on utilizing at least one AI-based training function and/or technique); implemented by energy utilization processing system 3500 via artificial intelligence (e.g. based on utilizing a generative AI platform and/or other AI platform/model(s) accessible by and/or communicating with by energy utilization processing system 3500); and/or otherwise being determined by energy utilization processing system 3500. The corresponding parameters, weights, and/or function definition(s) of energy utilization-based operation optimizer function(s) 3919 can be configured to generate per-operation energy utilization-based operation optimizer output data 3916 as a function (e.g. deterministic function) of corresponding per-operation energy utilization-based operation optimizer input data 3912.

The energy utilization-based operation optimizer output data 3916 for operation 3701.*i* can include optimized energy utilization-based operation execution plan data 3917 for the given operation 3701.*i*, which can indicate values/parameters/a configured flow of sub-operations, etc. specifying how the operation be executed. Example optimized energy utilization-based operation execution plan data 3917 is discussed in conjunction with FIG. 29B.

The energy utilization-based optimizer input data 3912 for operation 3701.*i* can indicate an operation type 3713 for the operation (e.g. whether the operation is a query operation 2702, ingress operation 2703, storage-formatted data generation operation 2704, rebuilding operation 2705, migration operation 2706, admin data logging operation 2707, another operation, a sub-operation of one of these operation categories, etc.). For example, the operation type 3713 indicates a value denoting an identifier for the respective operation type of operation 3701.*i*. The optimized energy utilization-based operation execution plan data 3917 can be computed by energy utilization-based operation optimizer system 3553 as a function of the operation type 3713.

The energy utilization-based optimizer input data 3912 for operation 3701.*i* can alternatively or additionally indicate operation parameter data 3714 further specifying factors relating to execution of the given operation, for example, that impact energy utilization in executing the operation 3701. Some or all operation parameter data 3714 can be determined prior to execution of the operation 3701, for example, as specified in configurable arguments and/or executable expression of a corresponding request to execute the operation 3701.

Operation parameter data 3714 of FIG. 29A can include any values of the example operation parameter data 3714 presented in FIG. 27D and/or the operation parameter data 3714 of FIG. 29A can be implemented in a same or similar fashion (and/or can include values for same or similar metrics) as any embodiment of operation parameter data 3714 described herein. The optimized energy utilization-based operation execution plan data 3917 can be computed by energy utilization-based operation optimizer system 3553 as a function of the operation parameter data 3714.

The energy utilization-based optimizer input data 3912 for operation 3701.*i* can alternatively or additionally indicate projected database power usage data 3815. For example, the projected database power usage data 3815 is generated based on historical energy utilization data 3478 of database system 10 (e.g. historical power meter measurement data 3619) and/or projected trends of the database system 10 The one or more scheduling values 3818 of energy utilization-based operation scheduling data 3817 can be computed by energy utilization-based operation scheduling system 3552 as a function of the projected database power usage data 3815. The projected database power usage data 3815 of FIG. 29A can be implemented via some or all features or functionality of any embodiment of projected database power usage data 3815 described herein. The optimized energy utilization-based operation execution plan data 3917 can be computed by energy utilization-based operation optimizer system 3553 as a function of the projected database power usage data 3815.

While not illustrated, the energy utilization-based optimizer input data 3912 for operation 3701.*i* can alternatively or additionally indicate projected database condition data 3715 during execution of operation 3701.*i* (e.g. current database condition data, or database condition data projected for projected time window 3705) further specifying factors relating to the state of database system 10 at the time the operation is expected to be executed, for example, that impact energy utilization in executing the operation 3701, which can be implemented via any embodiment of projected database condition data described herein. For example, the projected database condition data 3715 includes the projected database power usage data 3815. The optimized energy utilization-based operation execution plan data 3917 can be computed by energy utilization-based operation optimizer system 3553 as a function of the projected database condition data 3715.

The energy utilization-based operation optimizer input data 3912 for operation 3701.*i* can alternatively or additionally indicate current power meter measurement data 3619, for example, utilized in determining by how much execution of operation 3701.*i* should be optimized for energy efficiency (e.g. at the expense of runtime, storage space required, amount of disk access, and/or other performance metrics) based on current energy utilization. The optimized energy utilization-based operation execution plan data 3917 can be computed by energy utilization-based operation optimizer system 3553 as a function of the current power meter measurement data 3619.

The energy utilization-based optimizer input data 3912 for operation 3701.*i* can alternatively or additionally indicate power usage policy data 3818. For example, the power usage policy data 3818 can be implemented to impose restrictions on whether/when/how the corresponding operation 3701.*i* can be executed by database system 10. Adherence to such restrictions can thus impact when/how soon the operation 3701 can be scheduled for execution. The optimized energy utilization-based operation execution plan data 3917 can be computed by energy utilization-based operation optimizer system 3553 as a function of the power usage policy data 3818.

While not illustrated, the energy utilization-based optimizer input data 3912 for operation 3701.*i* can alternatively or additionally indicate current mode of database system-wide operation (e.g. corresponding to a database-wide power utilization mode of a plurality of different current and/or prior database-wide power utilization modes), which can indicate how the database system as a whole is configured to execute operations, for example, based on being configured to attain a configured level of energy utilization and/or otherwise being configured in light of energy utilization induced. In some embodiments, the current mode of database system-wide operation cycles between multiple different mode of database system-wide operation. For example, mode of database system-wide operation is different for different cyclical temporal periods (E.g. different during nighttime vs. daytime), and/or is different for different detected conditions (e.g. when current power utilization is higher than a threshold vs. when current power utilization is lower than a threshold, etc.) Alternatively or in addition, the database system shifts to updated and further updated versions of the current mode of database system-wide operation over time (e.g. to further improve energy utilization, for example, where such updates are configured based on manual and/or automated processing of energy utilization measurement data and/or other historical energy utilization data and/or historical operation execution data to determine collected in the prior/current version to determine how further optimizations can be employed to improve energy efficiency, for example, while still achieving favorable system performance).

Figure 29B:
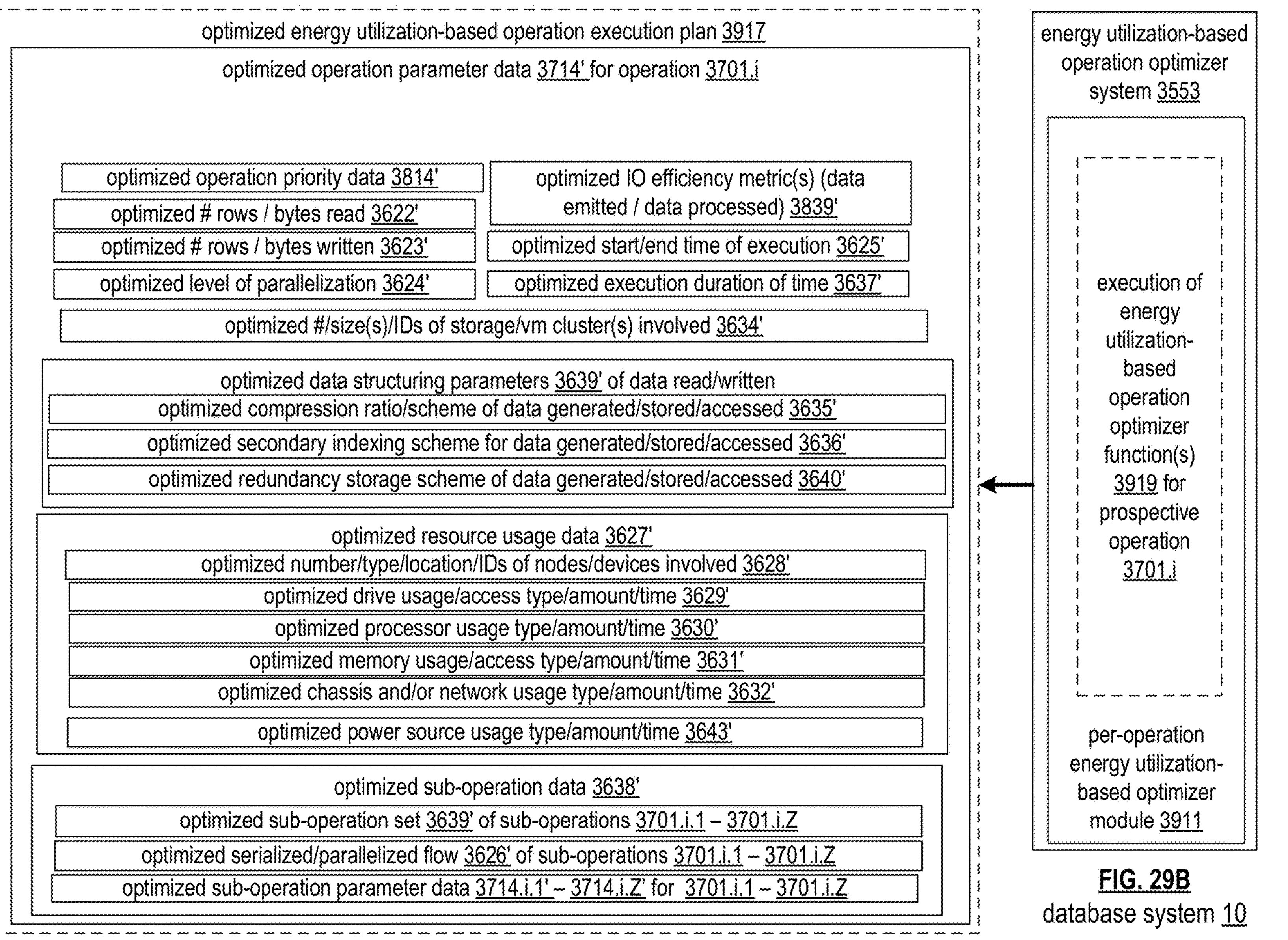

FIG. 29B illustrates an example embodiment parameters configured in generating optimized energy utilization-based operation execution plan 3917. For example, generating optimized energy utilization-based operation execution plan 3917 can include configuring one or more parameters of operation parameter data 3714 to generate optimized operation parameter data 3714'. This can include changing one or more parameters of operation parameter data 3714 indicated in the energy utilization-based operation optimizer input data 3912, for example, to render improved energy efficiency (e.g. ones of the parameters that can be altered without affecting the output of executing the corresponding operation, such as correctness of the query resultant, and/or otherwise rendering sematic equivalence/logical equivalence in executing the operation as imposed by the original parameters). This can alternatively or additionally include configuring one or more parameters of operation parameter data 3714 that are not set/not yet known in operation parameter data 3714 indicated in the energy utilization-based operation optimizer input data 3912 (e.g. setting operation priority that has not yet been selected; setting parallelization to be applied; configuring sub-operation set 3639 and/or corresponding flow 3626 based on optimization not having yet been performed; etc., while parameters such as the expression (e.g. query expression) being executed, which database tables/columns are involved, row cardinality data of tables being accessed/written, etc. are fixed/not able to be changed without changing the result of the operation). This can alternatively or additionally include inducing changes/inducing value of one or more parameters as a result of configuring other parameters (e.g. the amount of data read or written is not expressly configured, but is induced based on configuring other parameters such as type of compression used, whether a flow of sub-operations includes generating a hash map from rows meeting particular filtering parameters in performing a join operation, etc.). Some or all example parameters of FIG. 29B can correspond to the parameters of FIG. 27D (e.g. after having been optimized/otherwise selected and/or configured by energy utilization-based operation optimizer system 3553.

One or more example parameters of FIG. 29B can influence scheduling of the operation (e.g. when it is executed, to which devices it is assigned for execution, etc.). For example, the energy optimization-based operation optimizer system 3553 implements the energy optimization-based operation scheduling system 3552 and/or is implemented in tandem with implementing the energy optimization-based operation scheduling system 3552.

The optimized operation parameter data 3614' can include: optimized operation priority data 3814' which can indicate an automatically configured priority value for the operation 3701.*i* (e.g. relative to other operations). For example, operation priority data 3814' can be optimized based on constricting when/how soon/how quickly the operation is executed to improve/otherwise impact energy utilization (e.g. as operations executed more quickly can induce higher/less favorable energy utilization, operations can be delayed to reduce peak power, etc.).

The optimized operation parameter data 3614' can alternatively or additionally indicate an optimized amount of data (e.g. number of rows and/or bytes) read 3622' in executing the corresponding operation 3701.*i*. This can correspond to configured amount of data to be read from storage/memory resources, and/or an amount of data read as a result of utilizing the optimized energy utilization-based operation execution plan 3917. For example, amount of data read 3622' can be optimized based on reducing amounts of data read 3622 to induce to lower/more efficient memory utilization. As another example, amount of data written is instead increased, for example, as a tradeoff in induce greater energy efficiency elsewhere in executing the operation 3701.*i* via the execution plan 3917.

The optimized operation parameter data 3614' can alternatively or additionally indicate an optimized amount of data (e.g. number of rows and/or bytes) written 3623' in executing the corresponding operation 3701.*i*. This can correspond to configured amount of data to be written to storage/memory resources, and/or an amount of data written as a result of utilizing the optimized energy utilization-based operation execution plan 3917. For example, amount of data written 3623' can be optimized based on reducing amounts of data written 3623 to induce to lower/more efficient memory utilization. As another example, amount of data written is instead increased, for example, as a tradeoff in induce greater energy efficiency elsewhere in executing the operation 3701.*i* via the execution plan 3917.

The optimized operation parameter data 3614' can alternatively or additionally indicate an optimized level of parallelization 3624' (e.g. how many parallelized nodes/processing core resources/threads are executing in parallel, concurrently). For example, level of parallelization 3624' can be optimized based on reducing level of parallelization 3624 to render lower power peaks at a particular time. As another example, level of parallelization 3624 is instead increased, for example, as a tradeoff in induce greater energy efficiency elsewhere in executing the operation 3701.*i* via the execution plan 3917.

The optimized operation parameter data 3614' can alternatively or additionally indicate IO efficiency metrics 3839 (e.g. such as a ratio of data emitted vs data processed). This can correspond to configured IO efficiency metrics, and/or resulting IO efficiency metric induced as a result of utilizing the optimized energy utilization-based operation execution plan 3917. For example, IO efficiency metrics 3839 can be optimized as higher/more favorable IO efficiency indicated by IO efficiency metrics 3839 to induce lower levels of processing which can contribute to lower/more efficient memory utilization. As another example, IO efficiency metrics 3839 are instead configured to have lower/less favorably IO efficiency, for example, as a tradeoff in induce greater energy efficiency elsewhere in executing the operation 3701.*i* via the execution plan 3917.

The optimized operation parameter data 3614' can alternatively or additionally indicate optimized start and/or end time of execution 3625'. For example, the start and/or end time of execution 3625 are configured in accordance with scheduling the execution intelligently, for example, relative to other operations executing and/or current/projected power utilization (e.g. based on implementing some or all functionality of energy utilization-based scheduling system 3552). For example, optimized start and/or end time of execution 3625' are delayed, for example, until a time where energy utilization by the database system is lower.

The optimized operation parameter data 3614' can alternatively or additionally indicate optimized execution duration of time 3637'. This can correspond to configured amount of time taken to execute the operation 3701.*i*, and/or resulting amount of time taken to execute the operation 3701.*i* induced as a result of utilizing the optimized energy utilization-based operation execution plan 3917. For example, execution duration of time 3637' can be optimized based on lengthening execution duration of time 3637 to render less/smaller peaks in power. As another example, execution duration of time 3637 is instead shortened, for example, to reduce overall energy utilization required and/or as a tradeoff in induce greater energy efficiency elsewhere in executing the operation 3701.*i* via the execution plan 3917.

The optimized operation parameter data 3614' can alternatively or additionally indicate an optimized one or more storage clusters and/or computing clusters (e.g. vm clusters involved) 3634, for example, optimizing how many clusters are involved, their corresponding sizes, and/or corresponding cluster identifiers (e.g. mapped to additional information regarding these clusters that is considered part of the operation parameter data) to improve energy efficiency.

The optimized operation parameter data 3614' can optimized indicate data structuring parameters 3639' of data read and/or written in executing the operation 3701.*i*. For example, the data structuring parameters 3639' are configured to improve energy efficiency induced by generating the corresponding formatted data for storage (e.g. via a storage-formatted data generation operation) in executing the operation 3701.*i*. As another example, the data structuring parameters 3639' are configured to improve energy efficiency induced over time (e.g. after execution of the operation) by storing the corresponding formatted data, for example, long term (e.g. requiring energy utilization by drive-based resources storing the data and/or maintaining access to the data) and/or persistently (e.g. via rebuilding operations and/or migration operations) over some period of time. As another example, the data structuring parameters 3639' are configured to improve energy efficiency induced over time (e.g. after execution operation) by accessing the underlying data (e.g. in query operations/rebuilding operations/migration operations). As another example, the data structuring parameters 3639' are configured to render selection of a type of data to access (e.g. from a plurality of options for accessing the underlying data based on the data being stored/accessible multiple ways/from multiple locations) in executing the operation 3701.*i* itself (e.g. a query operation/rebuilding operation/migration operation). In some cases, the data structuring parameters 3639' are configured to improve energy efficiency based on considering a tradeoff of these factors (e.g. energy utilization induced to generate the data vs. energy utilization induced to access the data over time vs. energy utilization induced to store the data long term/persistently), for example, as a function of how long the data is to be stored, how often the data is to be accessed, how often the data need be moved/restored (e.g. based on failure rate and/or rebalancing rate of the database system), how different resources required for generating/storing/accessing the data have different impacts on energy utilization (e.g. processing-based energy utilization and/or memory-based energy utilization to collect the underlying data and generate the respective data structures for storage; drive-based energy utilization to store the data structures/enable IO operations to access the data structures long term; network-based energy utilization and/or additional processing and/or memory-based energy utilization to enable rebuilding/migration of the data as required to store the data persistently; processing and/or memory-based energy utilization to locate/extract the underlying data from the data structures when the data is accessed etc.).

The optimized data structuring parameters 3639' can indicate an optimized compression scheme (e.g. optimized corresponding compression ratio) of data generated/stored/accessed 3635'. For example, optimized compression scheme of data generated/stored/accessed 3635' can be configured with a higher compression ratio to improve energy efficiency induced by storing the data (e.g. due to the higher compression ratio rendering less data to be stored). As another example, optimized compression scheme of data generated/stored/accessed 3635' can be configured with a lower compression ratio/less computationally complex scheme to improve energy efficiency induced to compress and/or decompress the underlying data.

The optimized data structuring parameters 3639' can indicate an optimized secondary indexing scheme of data generated/stored/accessed 3636'. For example, optimized secondary indexing scheme of data generated/stored/accessed 3635' can be configured with higher levels of indexing (e.g. more columns indexed; more complex indexing structures) to improve energy efficiency induced by executing queries against the columns (e.g. inducing better IO efficiency metrics 3639, otherwise rendering less memory/processing required to identify a set of rows meeting particular filtering parameters of a respective query). As another example, optimized secondary indexing scheme of data generated/stored/accessed 3635' can be configured with lower levels of indexing (e.g. less columns indexed; less complex indexing structures) to improve energy efficiency induced by storing the indexing structures (e.g. due to there being less data to be stored).

The optimized data structuring parameters 3639' can indicate an optimized redundancy storage scheme of data generated/stored/accessed 3640'. For example, optimized redundancy storage scheme of data generated/stored/accessed 3640' can be configured with less parity data/accommodating a lower failure rate to improve energy efficiency induced by storing the data (e.g. due to there being less data to be stored). As another example, optimized redundancy storage scheme of data generated/stored/accessed 3640' can be configured with more parity data/accommodating a higher failure rate to improve energy efficiency induced by allowing for a greater rate of device outages (e.g. which can enable devices to be powered off more often to reduce energy utilization of powering all such devices, and/or reduce infrastructure required to ensure drive failures occur less often which can improve energy utilization required to implement such infrastructure).

The optimized operation parameter data 3614' can alternatively or additionally indicate optimized resource usage data 3627'. This can correspond to configured resource usage data 3627 execute the operation 3701.*i*, and/or resource usage data 3627 induced as a result of utilizing the optimized energy utilization-based operation execution plan 3917.

The optimized operation parameter data 3614' can include: optimized number/types/location/identifiers of nodes and/or devices involved 3628'; optimized drive usage and/or access amount/type and/or time 3629'; optimized processor usage and/or access amount/type and/or time 3630'; optimized memory usage and/or access amount/type and/or time 3631'; chassis and/or network usage and/or access amount/type and/or time 3632'; and/or optimized power source amount/type and/or time 3643'. For example, the optimized number/types/location/identifiers of various resources involved can improve energy efficiency based utilizing smaller amounts of, less time utilizing, and/or more energy efficient types of such resources. As another example, smaller amounts of, less time utilizing, and/or more energy efficient types of various resources are instead used, for example, to reduce overall energy utilization required and/or as a tradeoff in induce greater energy efficiency elsewhere (e.g. via other various resources) in executing the operation 3701.*i* via the execution plan 3917.

The optimized operation parameter data 3614' can alternatively or additionally indicate optimized sub-operation data 3638'. For example, the optimized sub-operation data 3638' is configured based on configuring an optimized sub-operation set 3639' of sub-operations 3701.*i*.1-3701.*i*.Z of the operation 3701.*i* and/or a corresponding optimized serialized/parallelized flow 3626' of the sub-operations 3701.*i*.1-3701.*i*.Z. For example, the number of/types of operation in set of sub-operations 3701.*i*.1-3701.*i*.Z, and/or their respective arrangement in serialized/parallelized flow 3626', is configured to reduce energy utilization by the database operation 3701.*i* as a whole (e.g. while maintaining correctness/the requested result in executing the corresponding operation 3701.*i*. Alternatively or in addition, the optimized sub-operation data 3638' can be configured based on configuring optimized sub-operation parameter data 3714.*i*.1-3714.*i*.Z for the sub-operations 3701.*i*.1-3701.*i*.Z, where each given sub-operation can have its own optimized operation parameter data 3714' (e.g. values for some or all of the parameters of operation parameter data 3714 and/or otherwise described herein, specific to the given sub-operation, that are optionally similarly optimized, for example, to reduce energy utilization induced via execution of the given sub-operation, which can reduce energy utilization induced in executing the database operation as a whole).

In some embodiments, the resulting optimized operation parameter data 3714' is implemented as the operation parameter data 3714 for the respective operation 3701.*i*, for example, for use as input to other systems (e.g. the optimized operation parameter data 3714' is utilized to generate energy utilization estimate data, energy utilization measurement data, and/or energy utilization-based scheduling data for the operation 3701.*i*, for example, based on being the parameters that are applied in executing the operation after optimization).

Figure 29C:
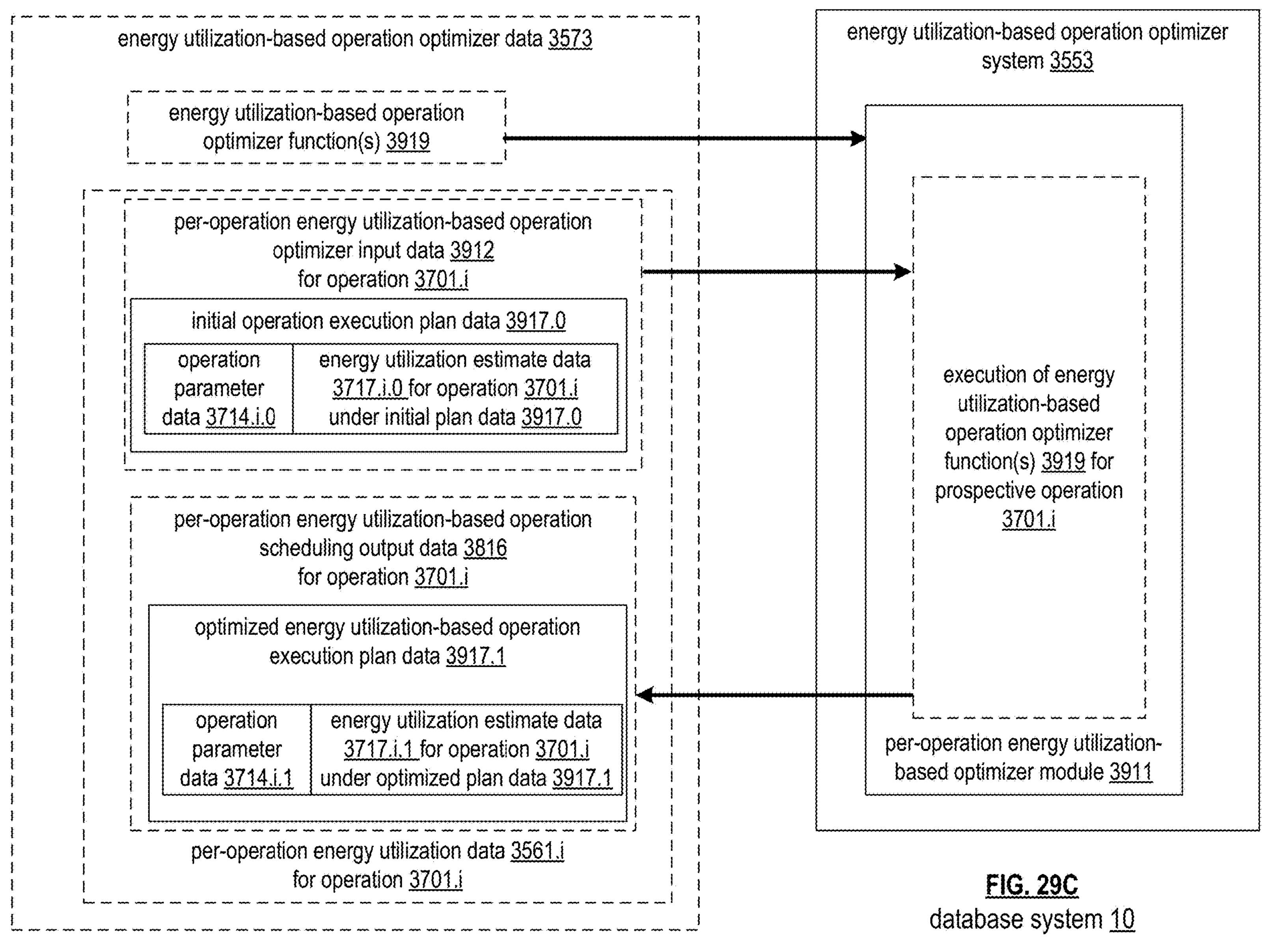

FIG. 29C illustrates an embodiment where optimized operation execution plan data 3719 for operation 3701.*i* is generated as optimized operation execution plan data 3719.1 for by energy utilization-based operation optimizer system based on performing energy utilization-based operation optimizer function(s) 3919 upon initial operation plan data 3719.0. For example, the energy utilization-based operation optimizer function(s) 3919 implements an optimizer and/or otherwise is implemented optimize the plan 3917 under which the operation 3701.*i* is executed. This can include updating operation parameter data 3714.*i*.0 as operation parameter data 3714.*i*.1 (e.g. changing one or more parameter values to improve energy utilization). For example, the optimized energy utilization-based operation execution plan data 3917.1 has corresponding energy utilization estimate data 3717.*i*.1 (e.g. generated by energy utilization estimation system 3551 based on operation parameter data 3714.1) that indicates more favorable energy utilization/higher energy efficiency than corresponding energy utilization estimate data 3717.*i*.0 (e.g. generated by energy utilization estimation system 3551 based on operation parameter data 3714.0) of the initial energy utilization-based operation execution plan data 3917.0.

In some embodiments, performing the energy utilization-based operation optimizer function(s) 3919 includes generating a plurality of plan options, for example, that includes the optimized operation execution plan data 3719.1, the initial operation execution plan data 3719.0, and/or one or more additional options for operation execution plan data 3719. For example, energy utilization estimate data 3717 is generated for each of the plurality of plan options (e.g. via energy utilization estimation system 3551 as a function of their respective operation parameter data 3714), In some embodiments, operation execution plan data 3719.1 is selected from the plurality of options based on its energy utilization estimate data 3717.*i*.1 indicating the lowest/most favorable energy utilization and/or highest/most favorable energy efficiency across all energy utilization estimate data 3717 of all plan options (and/or of only a subset of plan options, such as a sufficiently performance-efficient subset of all plan options, for example, having at least a threshold level of performance efficiency such as having estimated runtime no more than a threshold runtime and requiring storage/memory utilization no greater than a threshold storage/memory utilization).

In some embodiments, the energy utilization-based operation optimizer system and/or generating of an updated flow from an initial flow (e.g. via pushing down/otherwise rearranging respective operators) is implemented via any embodiment of flow optimizer module and/or any embodiment of optimizing queries/respective query operator execution flows described herein.

FIGS. 29D-29G illustrate examples of how energy utilization (e.g. as indicated in energy utilization estimate data 3717.*i*.1 and/or as otherwise induced in performing the respective operation 3701.*i*) can be optimized in generating optimized operation execution plan data 3719.1 (e.g. compared to initial operation execution plan data 3719.0). The respective curves can correspond to operation energy utilization 3402 (and/or estimates for operation energy utilization 3402) induced by the operation 3701.*i* under the respective plan, which would contribute to the database system energy utilization 3401 (e.g. during the temporal period in which the respective operation executed), for example, as discussed in conjunction with FIG. 27B.

Figures 29D, 29E:
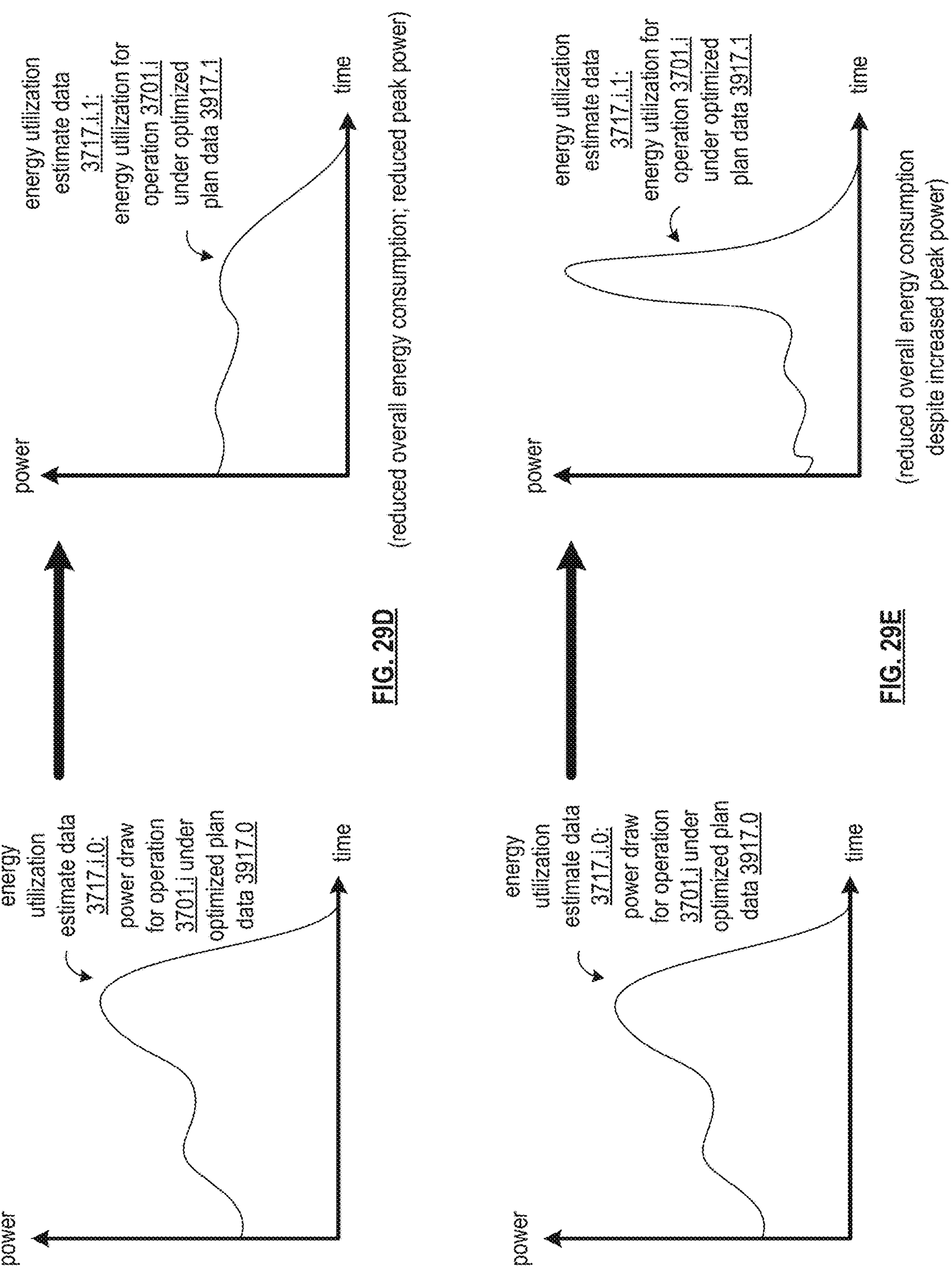
FIGS. 29D-29G illustrate example embodiments of energy utilization estimate data in accordance with various embodiments.

As illustrated in the example of FIG. 29D, energy utilization for operation 3701.*i* under optimized plan data 3719.1 renders reduced overall energy consumption and reduced peak power of the operation (e.g. while keeping execution time and/or other metrics for performance the same/about the same). Such optimization can occur in some or all cases of optimizing various operations 3701.*i*.

This can correspond to a best case scenario, which may not be achievable in all/any cases. For example, trade-offs in peak power vs. overall energy consumption, and/or trade-offs in energy efficiency vs. performance efficiency, may be considered in generating optimized plan data 3917/in selecting optimized plan data 3917 from a plurality of options (e.g. one of the factors: peak power, overall energy consumption, or performance efficiency must be worsened to better the other two factors of peak power, overall energy consumption, or performance efficiency).

The selection of which of these factors are most important/respective weights assigned to the importance of these factors can indicated in corresponding trade-off data, for example, configured via user input, defined in a current database system-wide mode of operation of the database system, automatically configured based on historical data, and/or otherwise determined. The selection of which of these factors are most important/respective weights assigned to the importance of these factors can be the same or different for different operations and/or can be the same or different for operations executed at different times (e.g. daytime vs. nighttime; time of high power demand vs. low power demand; etc.).

As used herein, performance efficiency can correspond to efficiency of one or more performance-based metrics, which may have a direct relationship or inverse relationship with one or more energy utilization-based metrics dictating energy efficiency. In some embodiments, the one or more performance-based metrics include: runtime (e.g. how quickly the query is executed from start to finish and/or how quickly the query finishes executing from the time it is requested, considering delay induced before execution begins); rate of executing operations (e.g. how many operations/how many rows/how much data can be processed (e.g. serially and/or in parallel) within a unit of time); memory efficiency/usage (e.g. how much memory of drive-based resources and/or memory based resources is required in executing the operation/in storing corresponding data structures long term/persistently; IO/disk access efficiency (e.g. how much/often disk drives are accessed to store/retrieve data, for example, vs. other memory types such as RAM or cache, for example, indicated by how much/often data is spilled to disk); accuracy (e.g. confidence/probability that corresponding result is correct/is the result that was requested/required for the operation); reliability/failure rate/retry rate (e.g. confidence/probability the operation execute successfully/probability of failure/expected number of retries required); and/or other performance-based metrics (e.g. corresponding to ways the database operation executes that renders desirable vs. undesirable results for the corresponding metric).

For example, performance efficiency can have a direct relationship with energy efficiency for some metrics and/or under certain conditions (e.g. generation and/or storage of a smaller amount of raw data requires less time and/or storage, which can induce more favorable performance efficiency and energy efficiency; generating output via efficient performance of a function (e.g. via intelligent selection/configuration of a corresponding algorithm) can render faster generation of the result while consuming less energy to generate the result; etc.). Performance efficiency can have an inverse relationship with energy efficiency for some metrics and/or under certain conditions (e.g. faster runtime may require greater levels of parallelization, which may require higher power at a given time; etc.). Relationships between performance efficiency and energy efficiency (e.g. in terms of peak power and/or total energy consumed) for various means of executing operations/sub-operations/parameters of operation parameter data 3914 can be determined (e.g. automatically generated, for example, based on historical performance metrics and historical energy utilization metrics measured/estimated for historical operation execution) in corresponding trade-off data and/or can be utilized to configure the corresponding trade-off data.

As illustrated in the example of FIG. 29E, energy utilization for operation 3701.*i* under optimized plan data 3719.1 renders reduced overall energy consumption, at the expense of higher peak power of the operation (e.g. while keeping execution time and/or other metrics for performance the same/about the same). Such optimization can occur in some or all cases of optimizing various operations 3701.*i*. This can correspond to a scenario selected, for example, based on determining that reducing overall energy consumption is more valuable to energy efficiency than reducing/maintaining same peak power (e.g. based on the new peak power magnitude still falling within a predefined threshold and/or otherwise not inducing any peak power threshold data to be exceeded when executed concurrently with other operations, etc.).

Figures 29F, 29G:
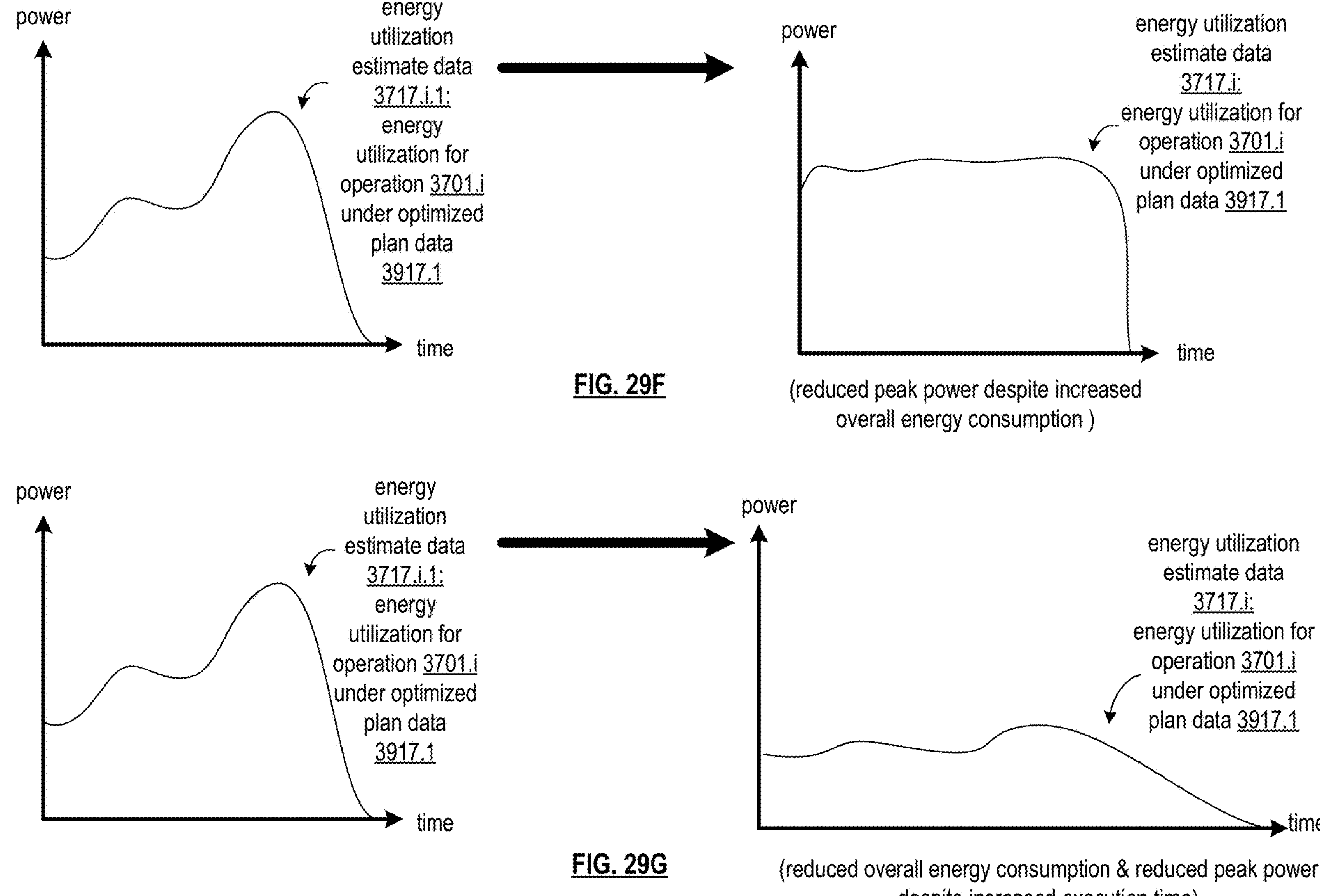

As illustrated in the example of FIG. 29F, energy utilization for operation 3701.*i* under optimized plan data 3719.1 renders reduced peak power, at the expense of higher overall energy consumption of the operation (e.g. while keeping execution time and/or other metrics for performance the same/about the same). Such optimization can occur in some or all cases of optimizing various operations 3701.*i*. This can correspond to a scenario selected, for example, based on determining that reducing peak power is more valuable to energy efficiency than reducing/maintaining same overall energy utilization (e.g. based on the new overall energy utilization still falling within a predefined threshold and/or otherwise not inducing any database-wide overall energy utilization threshold data to be exceeded when executed, etc.).

As illustrated in the example of FIG. 29G, energy utilization for operation 3701.*i* under optimized plan data 3719.1 renders reduced peak power and/or reduced overall energy consumption, at the expense of increased runtime (and/or other less favorable performance). Such optimization can occur in some or all cases of optimizing various operations 3701.*i*. This can correspond to a scenario selected, for example, based on determining that reducing energy utilization (e.g. peak power, overall energy consumption, and/or both) is more valuable than reducing/maintaining same runtime efficiency/other performance efficiency (e.g. based on the new runtime/other performance metrics still falling within a predefined threshold and/or otherwise not inducing any database-wide performance threshold data to be compared with unfavorably when executed, etc.).

Figure 29H:
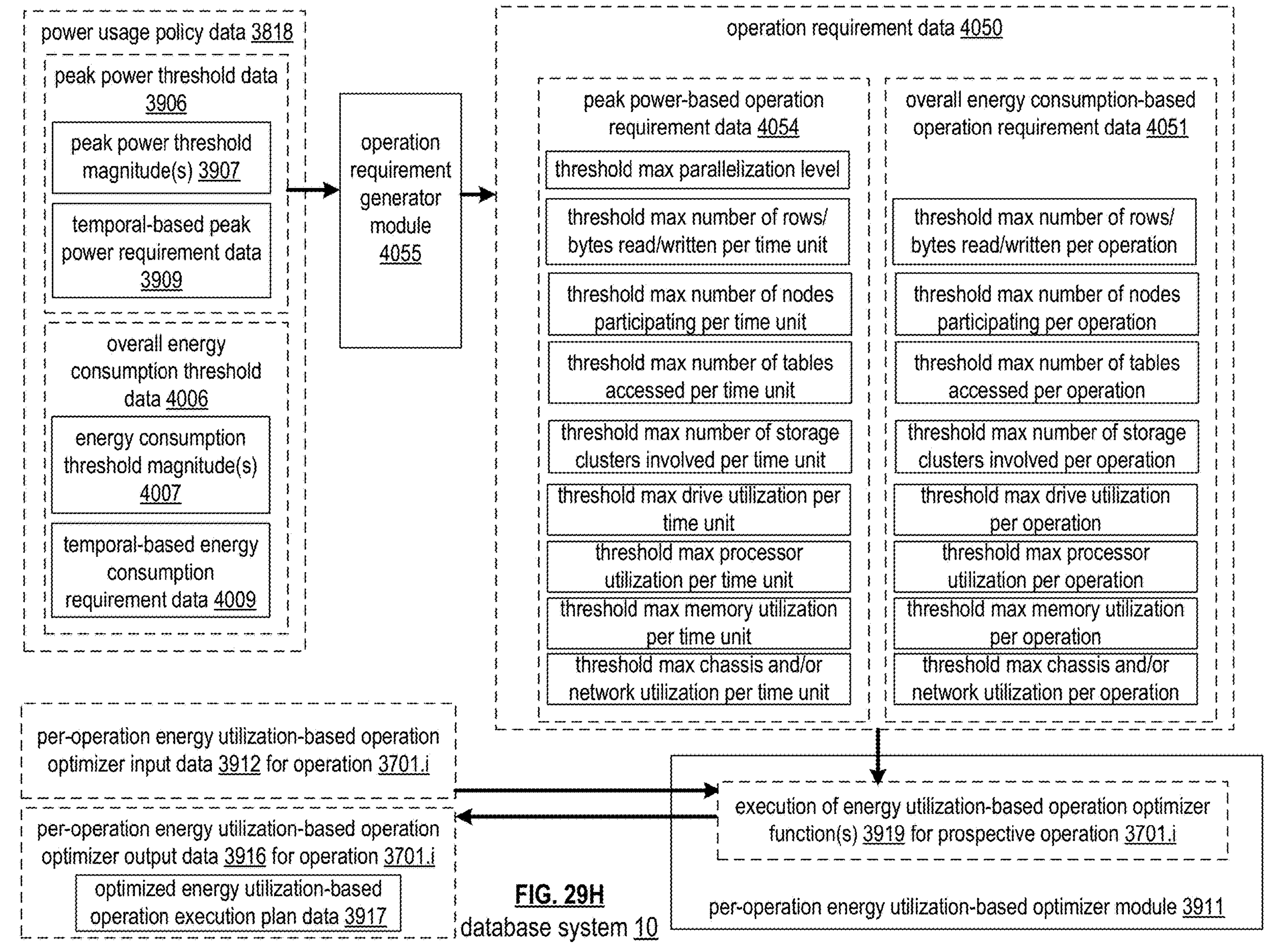
FIG. 29H is a schematic block diagram of an energy utilization-based operation optimizer system in accordance with various embodiments.

FIG. 29H illustrates an embodiment of energy utilization-based operation optimizer system 3553 that generates optimized energy utilization-based operation execution plan data 3917 for operation 3701.*i* based on operation requirement data 4050. For example, the energy utilization-based operation optimizer system 3553 generates optimized energy utilization-based operation execution plan data 3917 for operation 3701.*i* based on peak power-based operation requirement data 4054 and/or overall energy consumption-based operation requirement data 4051 of operation requirement data 4050.

In some embodiments, the operation requirement data 4050 is generated automatically by operation requirement generator module 4055 (e.g. implemented by computing devices/processor and/or memory resources of energy utilization processing system 3500, optionally based on applying artificial intelligence and/or machine learning techniques), for example, based on peak power threshold data 3906 (e.g. implemented via any embodiment of peak power threshold data 3906 described herein), based on overall energy consumption threshold data 4006 (e.g. based on corresponding energy consumption threshold magnitude(s) 4007 within a particular fixed time period such as given hour/day/week/month/year, such as a single threshold magnitude or different levels of threshold magnitudes of energy consumption, for example, inducing jumps in pricing, etc., and/or based on corresponding temporal-based energy consumption requirement data 4009, such as different one or more energy consumption threshold magnitude(s) 4007 for different time frames within the fixed time period such as different hours within the day, different days within the week, different months within the year, etc.), and/or other power usage policy data 3818 (and/or based on historical energy utilization data 3476 and/or historical operation execution data 3477). The operation requirement data 4050 can alternatively or additionally be received, accessed in memory, configured via user input, and/or otherwise determined. The operation requirement data 4050 can optionally be regenerated/updated over time (e.g. in response to changing conditions/trends/requirements/policy).

The operation requirement data 4050 can include overall energy consumption-based operation requirement data 4051, for example, generated based on the overall energy consumption threshold data 4006. The overall energy consumption-based operation requirement data 4051 can include one or more thresholds enforced for various operations 3701 as a whole, for example, where the optimized energy utilization-based operation execution plan data 3917 for a given operation 3701.*i* is generated such that execution of the given operation is known/estimated to induce corresponding overall energy utilization, such as overall energy utilization of operation energy utilization 3402 (e.g. area under the corresponding curve of FIG. 27B), that meets the overall energy consumption-based operation requirement data 4051. For example, the optimized energy utilization-based operation execution plan data 3917 is optionally configured such that its energy utilization estimate data 3717 indicates overall energy consumption for by the operation 3701.*i* meeting the overall energy consumption-based operation requirement data 4051.

For example, the overall energy consumption-based operation requirement data 4051 can indicate and/or be based on: a threshold maximum number of rows and/or bytes read and/or written per operation; a threshold maximum number of nodes participating per operation; a threshold maximum number of tables accessed per operation; a threshold maximum number of storage clusters involved per operation; threshold maximum drive utilization per operation; threshold maximum processor utilization per operation; threshold maximum memory utilization per operation; threshold maximum network utilization per operation; and/or other thresholds. For example, some or all thresholds of overall energy consumption-based operation requirement data 4051 are configured as values selected based on, when exceeded in one or more of a set of operations (e.g. an average number/minimum number/maximum number of operations executed by the database system within the time period for which the overall energy consumption threshold data 4006 applies), being likely to/guaranteed to/having a least a threshold probability of rendering overall energy consumption threshold data 4006 being not adhered to and/or configured based on, when met, being likely to/guaranteed to/having a least a threshold probability of rendering overall energy consumption threshold data 4006 being adhered to.

The operation requirement data 4050 can alternatively or additionally include peak power-based operation requirement data 4054, for example, generated based on the peak power threshold data 3906. The peak power consumption-based operation requirement data 4054 can include one or more thresholds enforced for various operations 3701 at particular discrete times (e.g. within any given time unit during execution of the operation, which can correspond to a clock cycle, short time window, etc., and/or at any instantaneous point in time), for example, where the optimized energy utilization-based operation execution plan data 3917 for a given operation 3701.*i* is generated such that execution of the given operation is known/estimated to induce corresponding peak power, such as peak power of operation energy utilization 3402 (e.g. maximum value of the corresponding curve of FIG. 27B), that meets the peak power-based operation requirement data 4054. For example, the optimized energy utilization-based operation execution plan data 3917 is optionally configured such that its energy utilization estimate data 3717 indicates peak power for by the operation 3701.*i* meeting the peak power-based operation requirement data 4054.

For example, the overall energy consumption-based operation requirement data 4054 can indicate and/or be based on: a threshold maximum parallelization level at any given time; a threshold maximum number of rows and/or bytes read and/or written per time unit; a threshold maximum number of nodes participating per time unit; a threshold maximum number of tables accessed per time unit; a threshold maximum number of storage clusters involved per time unit; threshold maximum drive utilization per time unit; threshold maximum processor utilization per time unit; threshold maximum memory utilization per time unit; threshold maximum network utilization per time unit; and/or other thresholds. For example, some or all thresholds of overall energy consumption-based operation requirement data 4051 are configured as values selected based on, when exceeded in one or more of a set of operations executing concurrently (e.g. an average number/minimum number/ maximum number of operations executed by the database system concurrently at any given time), being likely to/guaranteed to/having a least a threshold probability of rendering peak power threshold data 3906 being not adhered to and/or configured based on, when met, being likely to/guaranteed to/having a least a threshold probability of rendering peak power threshold data 3906 being not adhered to.

Operations can be optimized based on generating optimized energy utilization-based operation execution plan data 3917 that is known/expected to adhering to the overall energy consumption-based operation requirement data 3951 and/or peak power-based operation requirement data 3952, for example, based on configuring values indicated in their operation parameter data and/or other known/estimated attributes of executing the respective operation that correspond to a given threshold in overall energy utilization-based operation requirement data 4051 and/or peak power-based operation requirement data 4054.

In some embodiments, a plurality of different operation requirement data 4050 (e.g. a plurality of different overall energy utilization-based operation requirement data 4051 and/or overall peak power-based operation requirement data 4054) is generated for different possible attributes of operations 3701 (e.g. as indicated in their operation parameter data 3714 and/or other features of per-operation energy utilization-based operation scheduling input data 3812), where a corresponding one or more operation requirement data is identified to apply to a given operation 3701.*i* and is enforced in optimizing the given operation 3701.*i*. FIGS. 29I-29L illustrate examples of such embodiments.

Figures 29I, 29J:
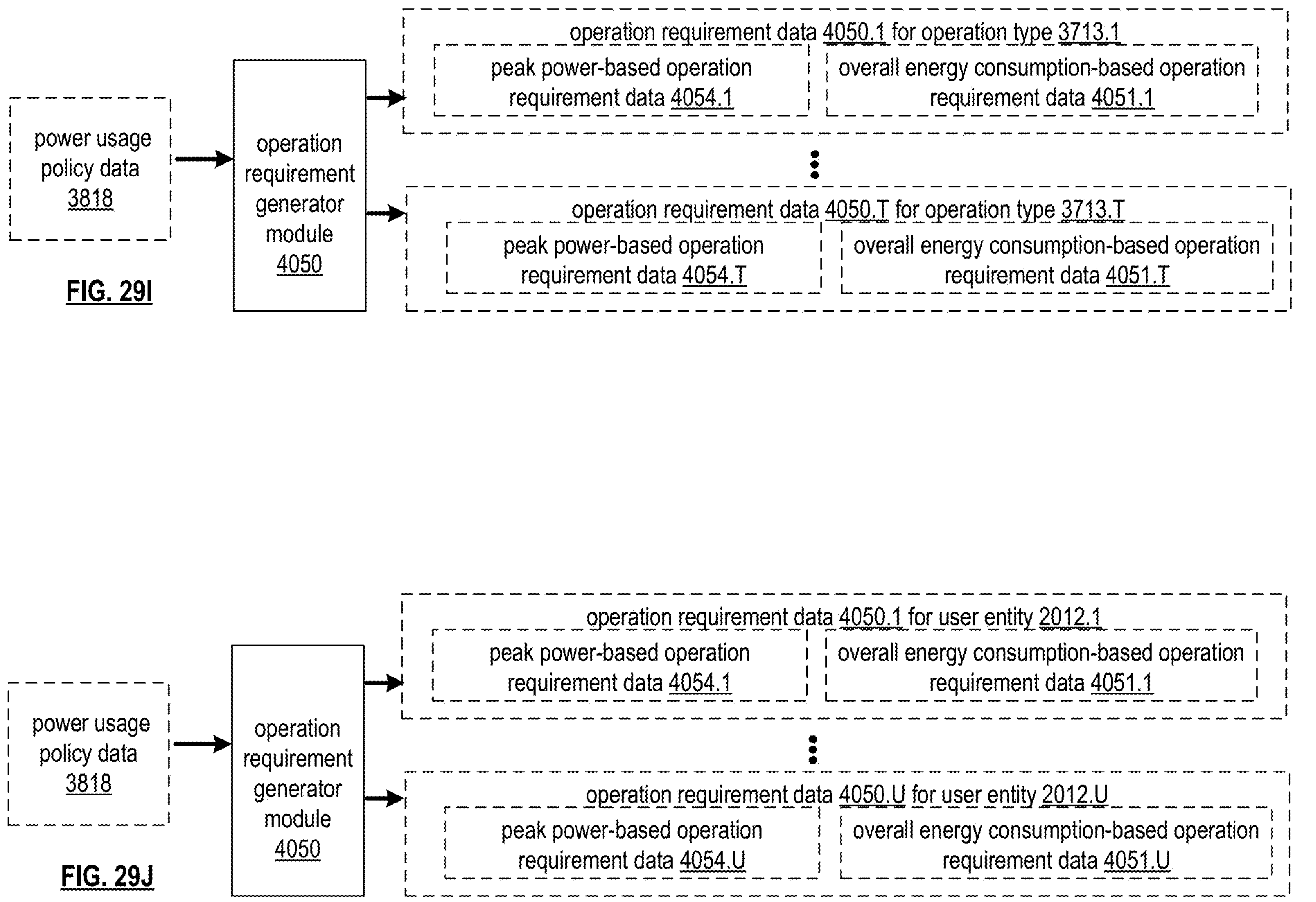

FIG. 29I illustrates an embodiment where different operation requirement data 4050 is generated for different operation types (and/or groups of operation types) 3713.1-3713.T (e.g. queries can be executed via processing of more data than admin logging operations, etc.). This can be based on differences in how various thresholds induce energy utilization by different types of operations/sub-operations, and/ or based on different operation requirement data 4050 having different types of thresholds induced by differences in operation type (e.g. threshold hash map size for executing a join operation is relevant for query operations but not for migration operations, etc.).

FIG. 29J illustrates an embodiment where different operation requirement data 4050 is generated for different user entities (and/or groups of user entities) 2012.1-2012.U (e.g. a first user can execute operations processing more data/ more data per unit time than a second user, based on the first user's respective threshold(s) being looser and the second user's respective threshold(s) being stricter, etc.). This can be based on differences in priority of different users (e.g. different subscription levels to the database system, paying different amounts to a corresponding service, etc.) and/or type of user (e.g. an administrator can execute operations processing more data/more data per unit time based their respective threshold being looser, while an external user of the system may be required to adhere to stricter thresholds and process less data/less data per unit time).

FIG. 29K illustrates an embodiment where different operation requirement data 4050 is generated for different operation priorities (and/or groups of operation priority ranges) 3814.1-3814.V (e.g. a first operation at a first priority can be executed via processing more data/more data per unit time than a first operation at a first priority, based on the first user's respective threshold(s) being looser and the second user's respective threshold(s) being stricter, etc.). This can be based on differences in urgency relating to these priorities (e.g. more urgent operations have higher priorities), differences in importances of the data read/written relating to these priorities (e.g. operations involving storing/ accessing more sensitive data/otherwise more important data have higher priorities) and/or differences in pricing applied to perform operations at different priorities (e.g. higher priority operations are more expensive for the requesting entity).

FIG. 29L illustrates an embodiment where different operation requirement data 4050 is generated for different time frames (and/or groups of time frames) 4052.1-4052.W. For example, different operation requirement data 4050 is generated for different hours/portions of the day, different days/portions of the week, different months/portions of the year, etc. For example, during a first time frame 4052, operations can be executed via processing more data/more data per unit time than a second time frame 4052, based on the respective threshold(s) of the first time frame being looser than the respective threshold(s) of the second time frame. This can be based on differences in expected power load/peaks induced during these time frames (e.g. daytime vs nighttime having more vs. less load/power spikes); differences in pricing applied to energy consumption at different time frames (e.g. daytime vs nighttime having higher vs. lower pricing for power consumption); different known/ expected power demand during these time frames; and/or different peak power threshold magnitudes 3907 at the different time frames.

Different operation requirement data 4050 can be optionally generated for other types of differences than those of FIGS. 29I-29L.

Figure 29M:
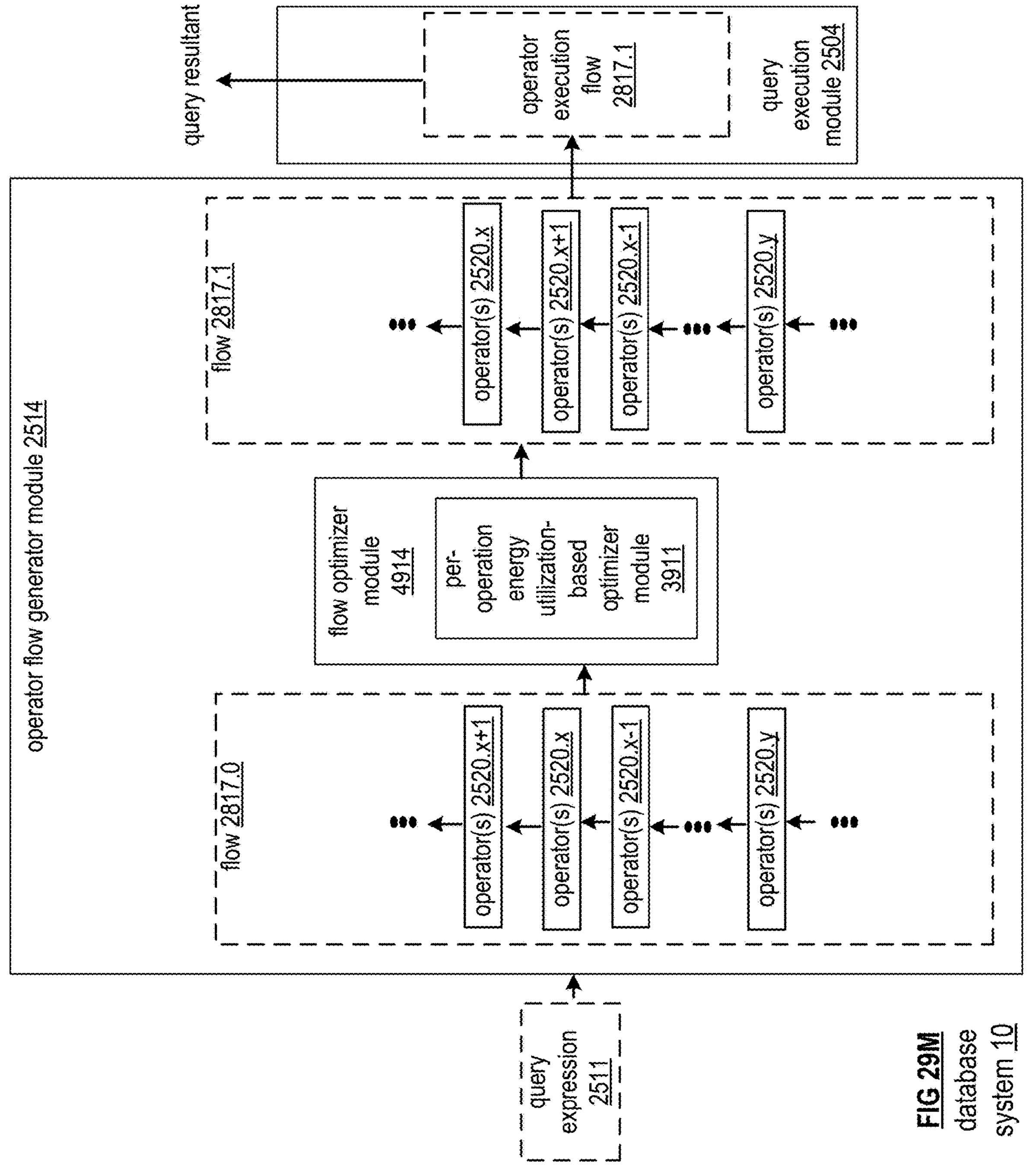
FIGS. 29M-29P are schematic block diagrams of an energy utilization-based operation optimizer system in accordance with various embodiments.

FIG. 29M illustrates an embodiment of database system 10 that implements an operator flow generator module 2514 to generate an updated flow 2817.1 based on optimizing a flow 2817.0 via a flow optimizer module 4914, where the updated flow 2817.1 is executed via query execution module 2504 to generate a corresponding query resultant. For example, flows 2817.0 and 2817.1 are both semantically/ logically equivalent, valid flows for executing query expression 2511, where updated flow 2817.1 is generated and/or selected for execution instead of flow 2817.0 based on being more optimal than flow 2817.0. In particular, flow 2817.1 can be generated and/or selected for execution instead of flow 2817.0 based on being more optimal than flow 2817.0 in terms of energy utilization, based on applying per-operation energy utilization-based optimizer module to optimize for energy utilization/energy efficiency (e.g. instead of or in addition to optimizing for performance). This can include rearranging one or more operators 2520 of flow 2817.0 in generating flow 2817.1 (e.g. pushing operator 2520.*x*+1 below operator 2520.*x* as illustrated in FIG. 29M), adding/ removing one or more operators 2520, changing parameters/ arguments/level of parallelization of one or more operators

2520, and/or other rearrangement/changes rendering semantically/logically equivalent flows that will correctly execute query operation 2511). For example, operators 2520 are implemented as sub-operations 3701 of the corresponding query that is implemented as a query operation 2702, where flow 2817.1 is implemented as optimized serialized/parallelized flow 3626'.

Some or all generation and/or optimization of flows 2817 (e.g. any operator execution flow 2517 and/or 2433 described herein, any IO pipeline 2835 described herein and/or any flow of operations/elements for execution indicating a serialized and/or parallelized flow of operations, for example, as a directed acyclic graph) described herein can implement per-operation energy utilization-based optimizer module 3911. Some or all features and/or functionality of operator flow generator module 2514 and/or flow optimizer module 4914 of FIG. 29M can implement any embodiment of generating of an updated flow from an initial flow (e.g. via pushing down/otherwise rearranging respective operators) described herein, any embodiment of flow optimizer module described herein, and/or any embodiment of optimizing queries/respective query operator execution flows described herein.

Such generation and/or optimization of flows 2817 can similarly implement optimizing of other types of database operations that do not correspond to query operations, for example, via similar rearrangement/addition/removal/changes to sub-operations of these other types of operations in a respective flow 3626, for example, based on such changes rendering improved energy efficiency.

Figure 29N:
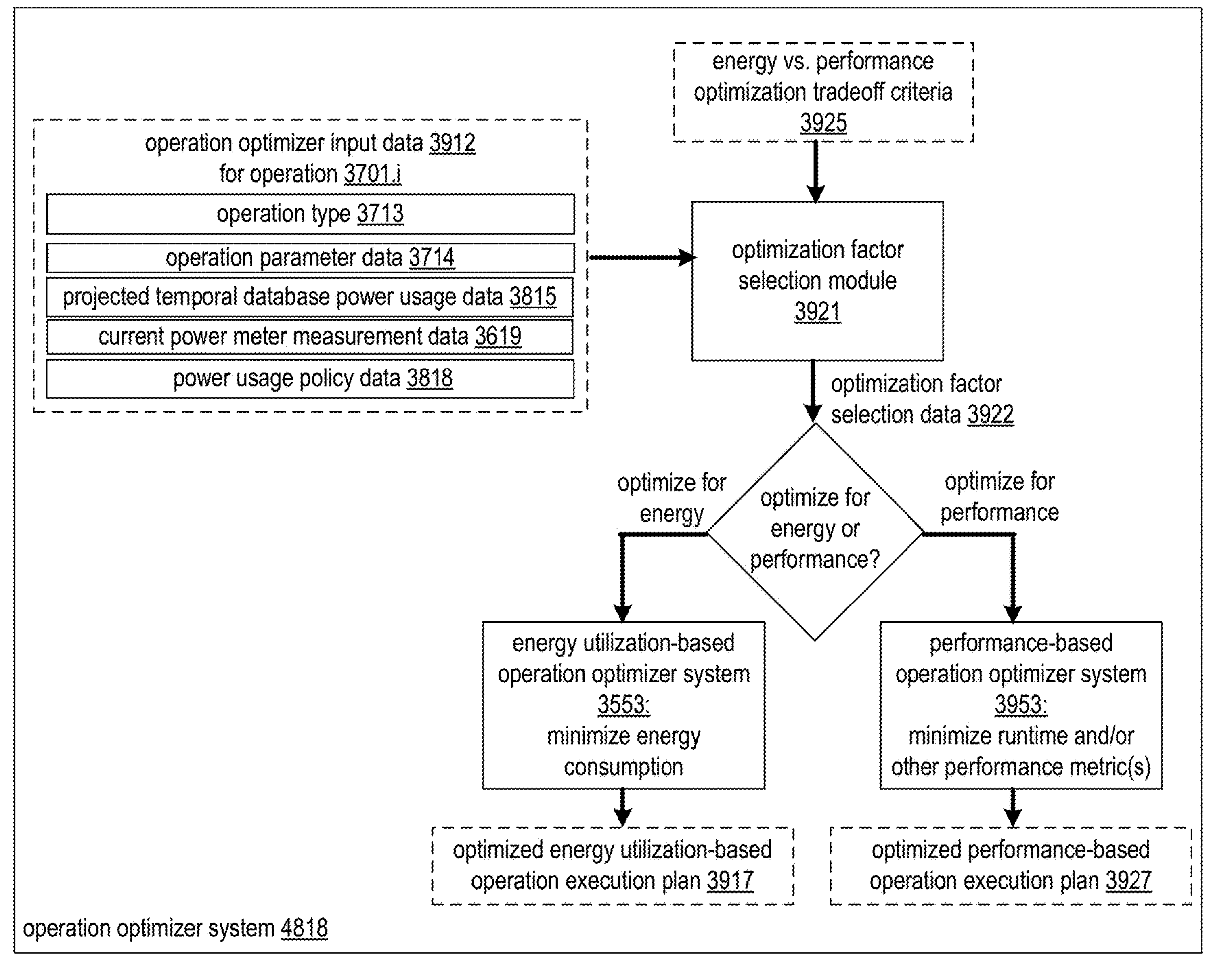

FIG. 29N illustrates an embodiment of an operation optimizer system 4818 implemented by database system (e.g. in conjunction with/as an extension of implementing energy utilization-based operation optimizer system 3553, in conjunction with implementing optimizer module 4914, and/or in conjunction with optimizing any queries/other operations described herein, for example, not necessarily optimizing for energy efficiency in all cases). The operation optimizer system 4818 can be implemented via one or more computing devices 18 and/or any processing and/or memory resources of database system 10 described herein.

Operation optimizer input data 3912 for a given operation 3701.*i* can be proceed via an optimization factor selection module 3921 to determine by which optimization factor(s) of a plurality of factors (e.g. that include an energy efficiency factor, performance efficiency factors, and/or additional factors) by which the operation 3701.*i* be optimized. For example, the optimization factor selection data 3922 indicates a selection to optimize for either energy efficiency or performance efficiency. In some embodiments, optimization factor selection data 3922 indicates a selection to optimize for some weighted combination of factors (e.g. for mostly energy efficiency and slightly for performance efficiency when a higher weight is assigned to energy efficiency vs. performance efficiency; for mostly performance efficiency and slightly for energy efficiency when a higher weight is assigned to performance efficiency vs. energy efficiency; etc.).

The optimization factor selection module 3921 can automatically generate the optimization factor selection data 3921 as a function of some or all attributes indicated in the operation optimizer input data 3912 (e.g. as a function of operation priority/urgency, where higher priority/urgency operations are optimized for performance and where lower priority/urgency operations are optimized for energy efficiency; as a function of requesting entity, where higher priority/paying operations are optimized for performance and where lower priority/urgency operations are optimized for energy efficiency; as a function of time the operation is requested/scheduled to be executed (e.g. time of day; current/projected utilization/power demand/at the requested scheduled time, where operations are optimized for energy efficiency if requested/executed at times with higher current/projected database system-wide power consumption (e.g. exceeding a threshold; within a threshold buffer of thresholds indicated in power usage policy data) and/or where operations are optimized for performance efficiency if requested/executed at times with lower current/projected database system-wide power consumption.

When the optimization factor selection data 3922 indicates optimizing for energy efficiency, energy utilization-based operation optimizer system 3553 can be implemented to generate optimized energy utilization-based operation execution plan 3917 for the given operation 3701.*i*. When the optimization factor selection data 3922 indicates optimizing for performance, a performance-based operation optimizer system 3953 can be implemented to generate an optimized performance-based operation execution plan 3917 for the given operation 3701.*i* (e.g. configured to execute the operation as fast as possible; to execute the operation via as little memory consumption as possible; etc.).

In some embodiments, when optimizing an operation for energy efficiency via energy utilization-based operation optimizer system 3553, optimized energy utilization-based operation execution plan 3917 is generated while adhering to performance-based constraints (e.g. optimize energy efficiency as much as possible while attaining a minimum threshold performance, for example, where a plan is selected from a plurality of options that has greatest energy efficiency of a subset of plan options that are known/predicted to attain the minimum threshold performance).

In some embodiments, when optimizing an operation for performance via performance-based operation optimizer system 3953, optimized performance-based operation execution plan 3927 is generated while adhering to energy-based constraints (e.g. optimize performance efficiency as much as possible while attaining a minimum threshold energy efficiency, for example, where a plan is selected from a plurality of options that has greatest performance efficiency of a subset of plan options that are known/predicted to attain the minimum threshold energy efficiency, for example, as indicated by corresponding energy utilization estimate data 3717).

Figure 29O:
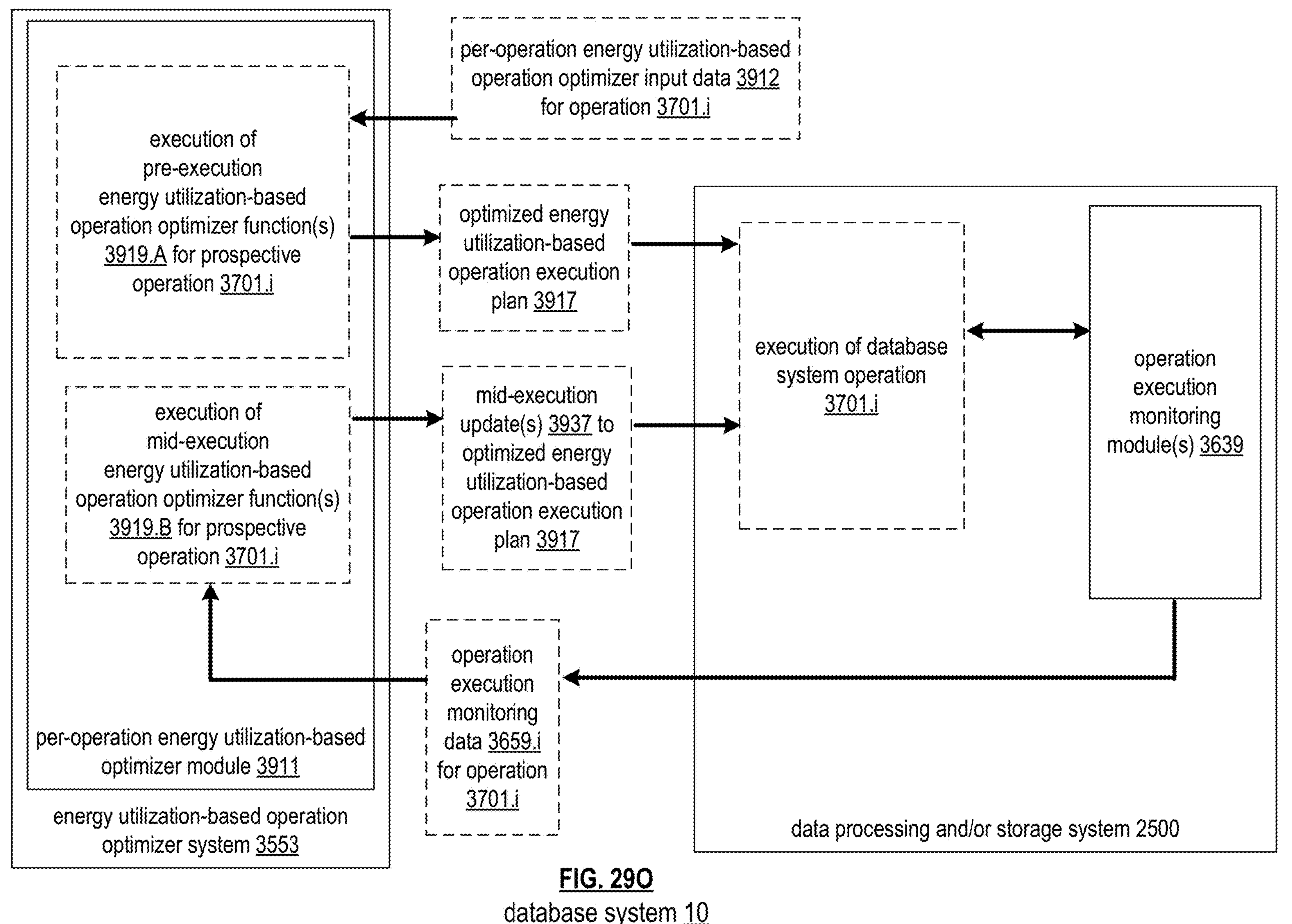

FIG. 29O illustrates an embodiment where a first portion of execution of a given operation 3701.*i* is performed via applying optimized energy utilization-based operation execution plan 3917 generated for the given operation 3701.*i* via execution of pre-execution energy utilization based operation optimizer function(s) 3919.A prior to initiating execution of the operation 3701.*i*, where this optimized energy utilization-based operation execution plan 3917 is optionally updated one or more times via one or more mid-execution updates 3937 generated via execution during execution via executing mid-execution energy utilization-based operation optimizer function(s) 3919.B to further optimize for energy efficiency as a function of/in light of: information regarding the execution so far (e.g. indicated in operation execution monitoring data 3659 for the operation 3701.*i* generated operation execution monitoring module(s) 3639), changes to database condition data 3715 during execution of the operation 3701.*i*, updated instruction regarding the execution (e.g. configured by/sent from a user entity), etc.

For example, one or more portions of optimized energy utilization-based operation execution plan 3917 are changed mid-execution based on the progress/state of execution so far and/or other conditions of database system 10. As another example, one or more portions of optimized energy utilization-based operation execution plan 3917 includes a plurality of options for selection mid-execution, where one or more selections are made from this plurality of options based on the progress/state of execution so far and/or other conditions of database system 10. As another example, operation 3701.*i* is intentionally aborted mid-execution/encounters a failure mid-execution, and updates 3937 correspond to a new optimized energy utilization-based operation execution plan 3917 for attempting re-execution of the operation 3701.*i* in one or more subsequent attempts (e.g. operation is intentionally aborted based on determining to instead execute the operation via a new optimized energy utilization-based operation execution plan 3917).

As a particular example, decisions regarding spilling to disk, hash map generation, bloom filter utilization, devices assigned to execute the operation, priority of the operation, and/or one or more other attributes of the execution are selected/changed in generating mid-execution updates 3937, for example, based on factors such as row cardinality so far, density/size of data structures such as hash maps/bloom filters built so far, health/availability of devices executing the operation, status of other concurrently executing operations, increases/decreases in current energy utilization, etc. Mid-execution updates 3937 can be implemented to employ any dynamic updates to how a query or other operation is executed described herein. Mid-execution updates 3937 can correspond to shifting between some or all attributes of different execution plans generated for a given operation 3701.*i*, which can include shifting between plans with any differing parameters/plans optimized for different criteria/plans generated to optimize for different factors/account for different conditions described herein.

In some embodiments, the mid-execution update(s) 3937 correspond to shifting between optimizing for energy efficiency vs. performance efficiency (e.g. shifting between attributes of plan 3917 and 3927 of FIG. 29N). For example, unexpected spikes in database system-wide energy utilization can render changing of execution of one or more operations via one or more aspects of a performance-based operation execution plan 3927 to one or more aspects of an optimized energy utilization-based operation execution plan 3917, for example, to avoid exceeding any peak power thresholds or otherwise respond to the increase in power consumption. As another example, dips in database system-wide energy utilization and/or instructions to produce faster results can render changing of execution of one or more operations via one or more aspects of an energy efficiency-based operation execution plan 3917 to one or more aspects of an optimized performance-based operation execution plan 3927, for example, to avoid exceeding any peak power thresholds or otherwise respond to the increase in power consumption.

Figure 29P:
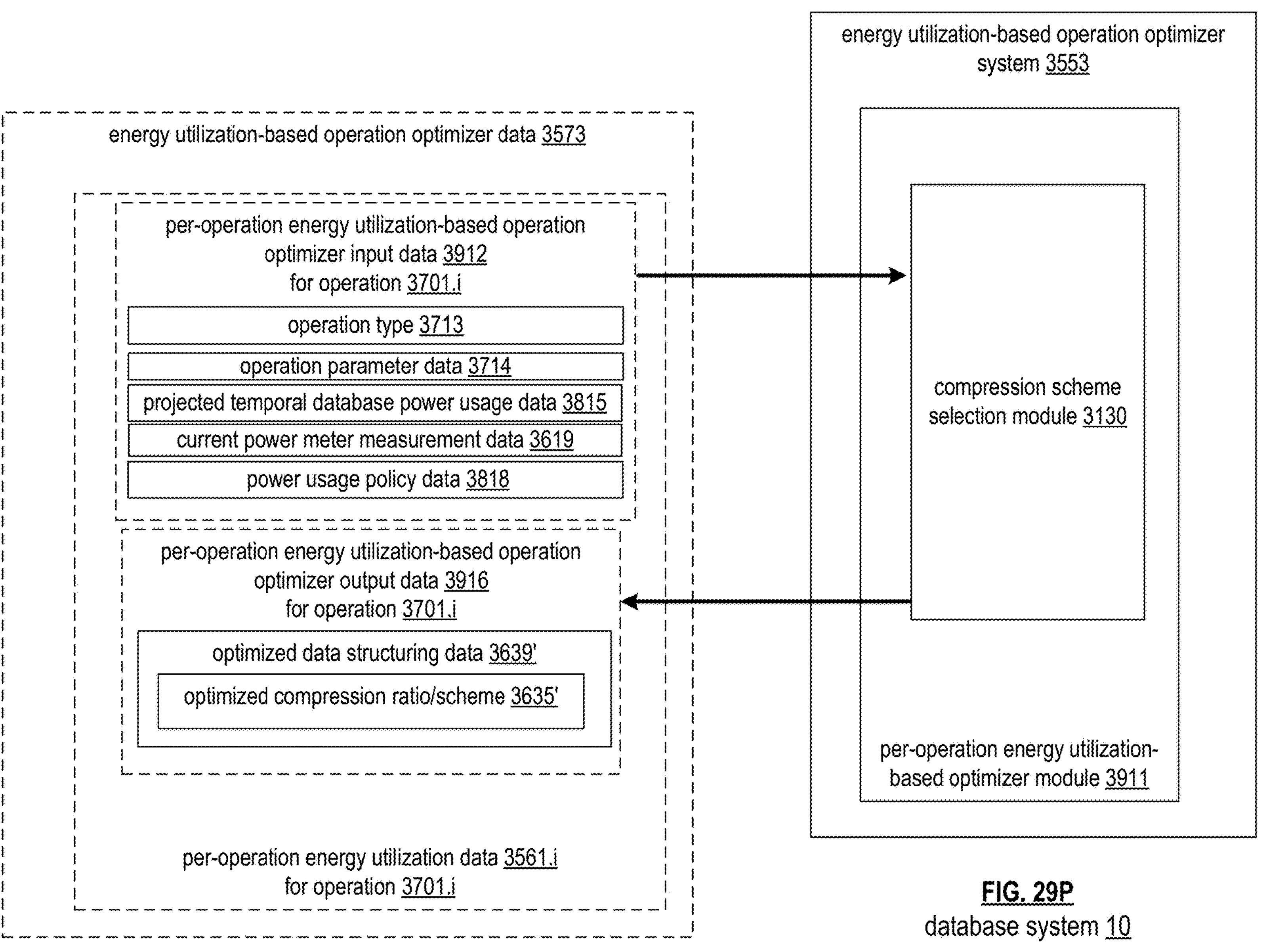
Figure 29Q:
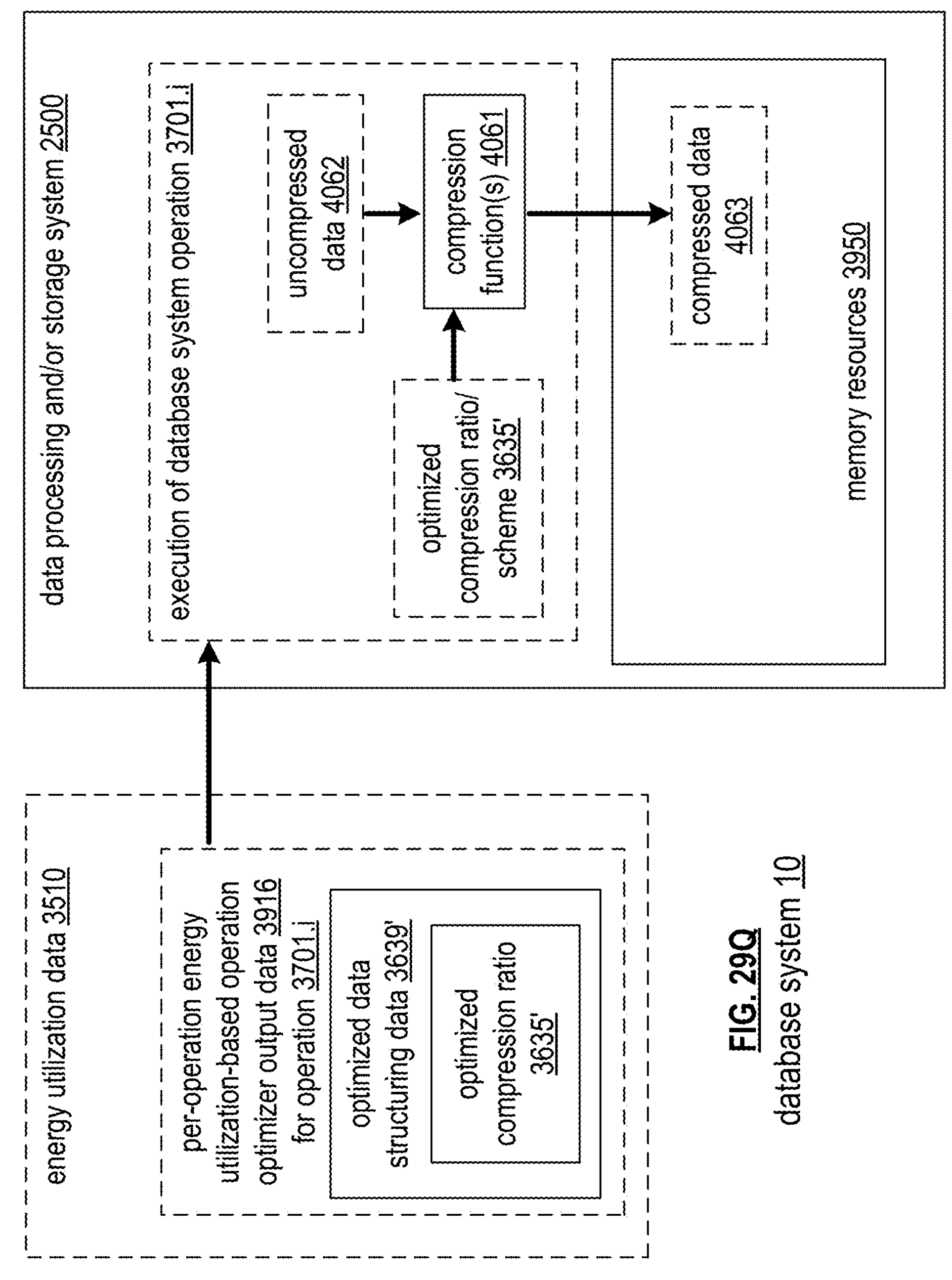
FIG. 29Q is a schematic block diagram of a data processing and/or storage system in accordance with various embodiments.

FIGS. 29P-29Q illustrate example embodiments where an optimized compression ratio 3635' is configured via energy utilization-based operation optimizer system 3553 for use in executing a corresponding operation 3701.*i* As illustrated in FIG. 29P, energy utilization-based operation optimizer system 3553 that implements a compression scheme selection module 3130 (e.g. via execution of one or more energy utilization-based operation optimizer functions 3919) configured to optimize energy utilization based on configuring compression ratio and/or other attributes of a corresponding compression scheme 3635' of optimized data structuring data 3639' (e.g. indicated in corresponding optimized energy utilization-based operation execution plan 3917). As illustrated in FIG. 29Q, the selected optimized compression ratio and/or compression scheme 3635' of optimized data structuring data 3639' is applied via performance of one or more compression functions 4061 in executing database system operation 3701.*i* by data processing and/or storage system 2500 to render generation of compressed data 4063 from uncompressed data 4062 for storage in memory resources 3950 (e.g. disk-based resources and/or other storage resources, and/or optionally non-disk based memory-resources such as RAM and/or cache memory.

For example, the optimized compression ration/scheme 3635 can configure how some or all storage-formatted data structures 3524 (e.g. some or all portions of segments 2424) of database system 10 are compressed/structured, for example, in optimizing a corresponding storage-formatted data structure generation operation. As another example, optimized compression ration/scheme 3635 can configure structuring of/implementation of global dictionary compression and/or any other compression of data described herein.

Figure 29R:
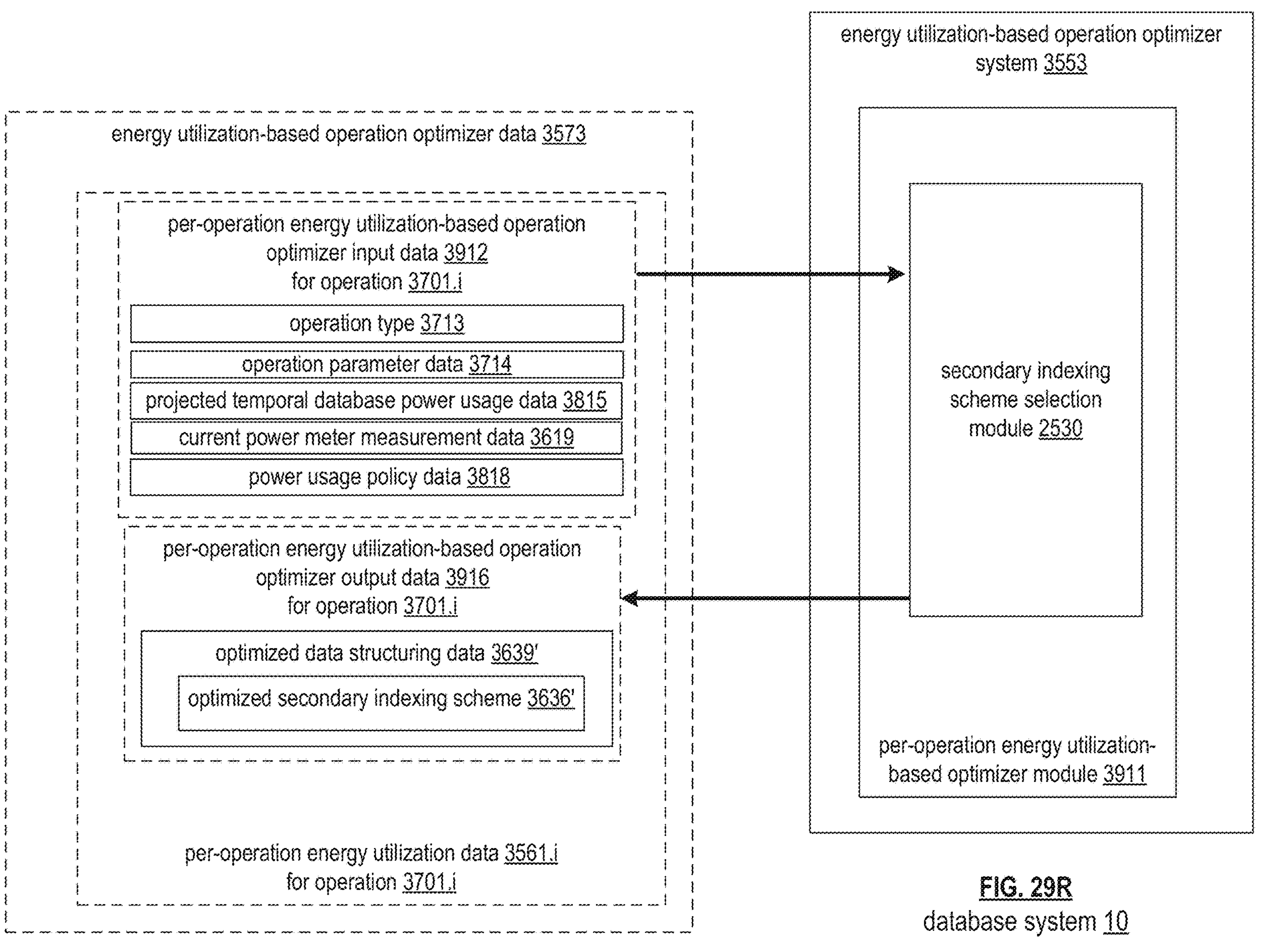
FIG. 29R is a schematic block diagram of an energy utilization-based operation optimizer system in accordance with various embodiments.
Figure 29S:
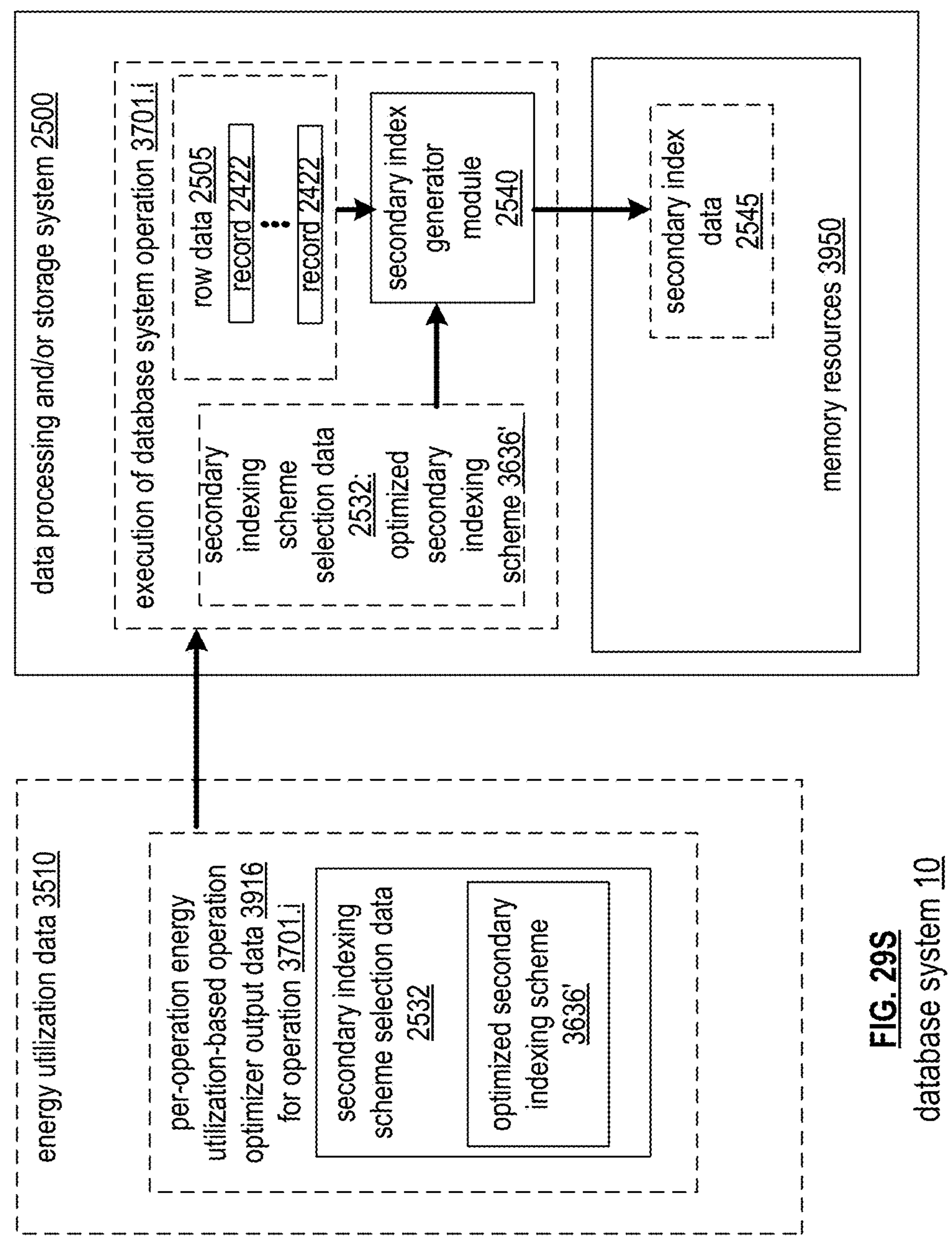
FIG. 29S is a schematic block diagram of a data processing and/or storage system in accordance with various embodiments.

FIGS. 29R-29S illustrate example embodiments where an optimized secondary indexing scheme 3636' is configured via energy utilization-based operation optimizer system 3553 for use in executing a corresponding operation 3701.*i* As illustrated in FIG. 29R, energy utilization-based operation optimizer system 3553 that implements a secondary indexing scheme selection module 2530 (e.g. via execution of one or more energy utilization-based operation optimizer functions 3919 and/or implementing some or all features and/or functionality of secondary indexing scheme selection module 2530 described herein) configured to optimize energy utilization based on configuring secondary indexing scheme 3636' of optimized data structuring data 3639' (e.g. indicated in corresponding optimized energy utilization-based operation execution plan 3917). As illustrated in FIG. 29S, the selected optimized secondary indexing scheme 3636' of optimized data structuring data 3639' is implemented as secondary indexing scheme selection data 2532 and/or is otherwise applied via implementing secondary index generator module 2540 in executing database system operation 3701.*i* by data processing and/or storage system 2500 to render generation of secondary index data 2545 (e.g. one or more corresponding index structures) from corresponding row data 2505 that includes a plurality of records 2422 (e.g. to index one or more columns of the plurality of records via some or all features and/or functionality of generating/storing index data and/or corresponding index structures described herein) for storage in memory resources 3950 (e.g. disk-based resources and/or other storage resources; and/or optionally non-disk based memory-resources such as RAM and/or cache memory.

Figure 29T:
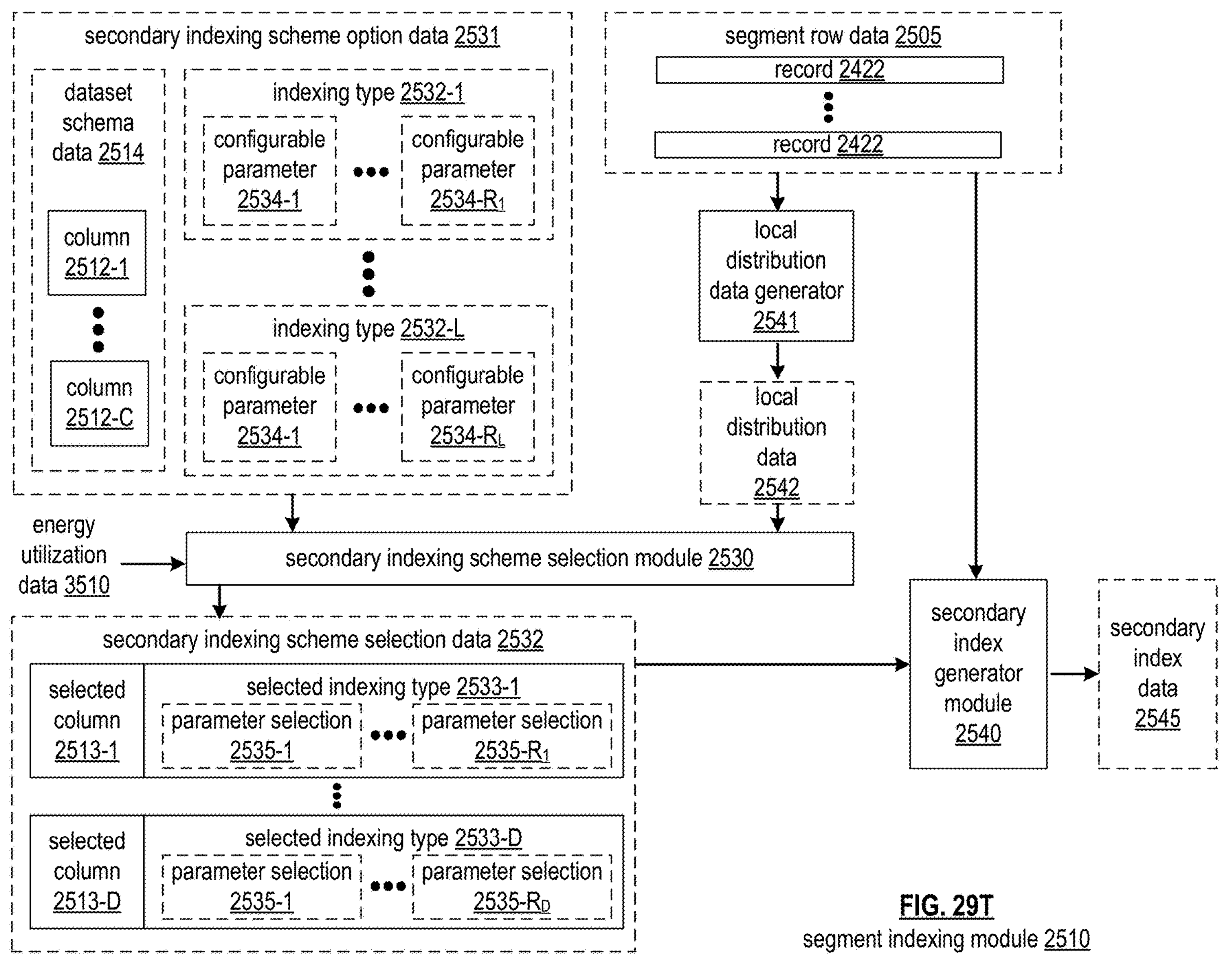

FIGS. 29T-29U illustrates embodiments of secondary indexing scheme selection module 2530 that generates secondary indexing scheme selection data 2532 to select secondary indexing types 2533, and/or corresponding parameters, for one or more columns for processing via secondary index generator module 2540. The secondary indexing scheme selection data 2532 can be selected as optimized secondary indexing scheme 3636' and/or secondary indexing scheme selection module 2530 can otherwise generate secondary indexing scheme selection data 2532 as a function of any energy utilization data 3510 described herein, for example, where secondary indexing scheme selection module 2530 is implemented in conjunction with implementing energy utilization processing system 3500. Some or all features and/or functionality of FIGS. 29T-29U can implement any embodiment of embodiment of secondary indexing scheme selection module 2530, secondary indexing scheme selection data 2532, and/or configuration of secondary indexing (e.g. of segments 2424) described herein.

Figure 29V:
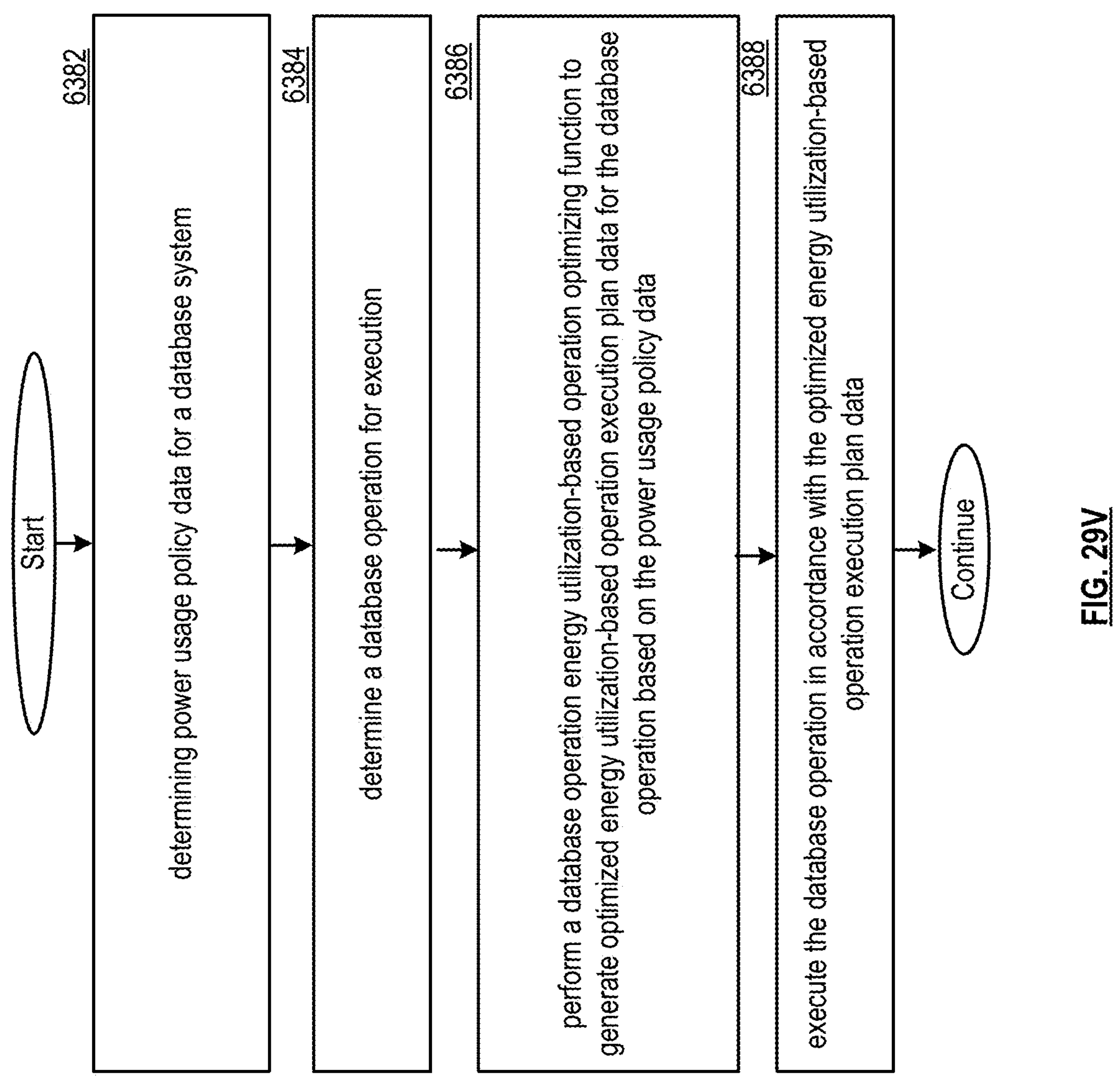
FIGS. 29V-29Y are logic diagrams illustrating methods for execution in accordance with various embodiments.

FIG. 29V illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29V. In some embodiments, a node 37 can implement some or all of FIG. 29V based on implementing a corresponding plurality of processing core resources 48.1-48.W. Some or all of the steps of FIG. 29V can optionally be performed by any other one or more processing modules of the database system 10. Some or all of the steps of FIG. 29V can be performed to implement some or all of the functionality of the database system 10 as described in conjunction with FIGS. 29A-29U, for example, by implementing some or all of the functionality of energy utilization-based operation optimizer system 3553 and/or based on processing and/or generating energy utilization data 3510. Some or all steps of FIG. 29V can be performed by database system 10 in accordance with other embodiments of the database system 10 and/or nodes 37 discussed herein. Some or all steps of FIG. 29V can be performed by database system 10 via processing and/or generating any energy utilization data 3510 described herein. Some or all of the steps of FIG. 29V can be performed in conjunction with performing some or all steps of any other method described herein.

Step 6382 includes determining power usage policy data for the database system. Step 6384 includes determining a database operation for execution. Step 6386 includes performing a database operation energy utilization-based operation optimizing function to generate optimized energy utilization-based operation execution plan data for the database operation based on the power usage policy data. Step 6388 includes executing the database operation in accordance with the optimized energy utilization-based operation execution plan data.

In various examples, the power usage policy data includes peak power threshold data that includes a peak power threshold magnitude for the database system. In various examples, the peak power threshold magnitude is not exceeded during execution of the database operation based on execution the database operation in accordance with the optimized energy utilization-based operation execution plan data.

In various examples, the peak power threshold data indicates a plurality of different peak power thresholds for a plurality of different time frames within a fixed cyclical time window. In various examples, the database operation is executed over a temporal period that spans multiple ones of the plurality of different time frames. In various examples, no peak power threshold magnitude for any of the multiple ones of the plurality of different time frames is exceeded during temporal period based on execution the database operation in accordance with the optimized energy utilization-based operation execution plan data.

In various examples, the method further includes generating the peak power threshold data based on selecting the plurality of different peak power thresholds for a plurality of different time frames based on power pricing data indicating different pricing of power usage by the database system during different ones of the plurality of different time frames.

In various examples, the method further includes generating operation requirement data based on the power usage policy data, wherein the operation requirement data includes at least one of: peak-power-based operation requirement data generated based on peak power threshold data of the power usage policy data, and/or overall energy consumption-based operation requirement data generated based on energy consumption threshold data of the power usage policy data. In various examples, the database operation energy utilization-based operation optimizing function is performed to generate an optimized energy utilization-based operation execution plan data as a function of the operation requirement data.

In various examples, the database operation is executed over a plurality of time slices of a temporal period. In various examples, the peak-power-based operation requirement data is generated to include and/or be based on a threshold maximum parallelization level, where the database operation is executed at a level of parallelization indicated by the optimized energy utilization-based operation execution plan data that does not exceed the threshold maximum parallelization level. In various examples, the peak-power-based operation requirement data is generated to include and/or be based on a threshold maximum amount of data written per time slice, where the threshold maximum amount of data written per time slice is not exceeded for any of the plurality of time slices based on applying the optimized energy utilization-based operation execution plan data in executing the database operation. In various examples, the peak-power-based operation requirement data is generated to include and/or be based on a threshold maximum amount of data read per time slice, where the threshold maximum amount of data read per time slice is not exceeded for any of the plurality of time slices based on applying the optimized energy utilization-based operation execution plan data in executing the database operation. In various examples, the peak-power-based operation requirement data is generated to include and/or be based on a threshold maximum number of computing device nodes participating in execution of the database operation per time slice, where the threshold maximum number of computing device nodes per time slice is not exceeded for any of the plurality of time slices based on applying the optimized energy utilization-based operation execution plan data in executing the database operation. In various examples, the peak-power-based operation requirement data is generated to include and/or be based on a threshold maximum number of relational database tables accessed per time slice, wherein the threshold maximum number of relational database tables per time slice is not exceeded for any of the plurality of time slices based on applying the optimized energy utilization-based operation execution plan data in executing the database operation. In various examples, the peak-power-based operation requirement data is generated to include and/or be based on a threshold maximum number of storage clusters involved per time slice, where the threshold maximum number of storage clusters per time slice is not exceeded for any of the plurality of time slices based on applying the optimized energy utilization-based operation execution plan data in executing the database operation. In various examples, the peak-power-based operation requirement data is generated to include and/or be based on a threshold maximum drive utilization per time slice, where the threshold maximum drive utilization per time slice is not exceeded for any of the plurality of time slices based on applying the optimized energy utilization-based operation execution plan data in executing the database operation. In various examples, the peak-power-based operation requirement data is generated to include and/or be based on a threshold maximum processor utilization per time slice, where the threshold maximum processor utilization per time slice is not exceeded for any of the plurality of time slices based on applying the optimized energy utilization-based operation execution plan data in executing the database operation. In various examples, the peak-power-based operation requirement data is generated to include and/or be based on a threshold maximum memory utilization per time slice, where the threshold maximum memory utilization per time slice is not exceeded for any of the plurality of time slices based on applying the optimized energy utilization-based operation execution plan data in executing the database operation. In various examples, the peak-power-based operation requirement data is generated to include and/or be based on a threshold maximum network utilization per time slice, wherein the threshold maximum network utilization per time slice is not exceeded for any of the plurality of time slices based on applying the optimized energy utilization-based operation execution plan data in executing the database operation.

In various examples, the method further includes generating a plurality of different operation requirement data for a plurality of different time frames based on the power usage policy data. In various examples, the database operation is executed over a temporal period that spans multiple ones of the plurality of different time frames. In various examples, all of the plurality of different operation requirement data is adhered to for all of the multiple ones of the plurality of different time frames based on execution the database operations in accordance with the optimized energy utilization-based operation execution plan data.

In various examples, the database operation energy utilization-based operation optimizing function is configured to optimize the database operation for performance while adhering to the peak-power-based operation requirement data generated based on peak power threshold data of the power usage policy data. In various examples, the database operation energy utilization-based operation optimizing function is configured to optimize the database operation for performance while adhering to the overall energy consumption-based operation requirement data.

In various examples, the method further includes generating a plurality of different operation requirement data for a plurality of different user entities, a plurality of different operation types, and/or a plurality of different operation priorities. In various examples, one of the plurality of different operation requirement data is applied to generate the optimized energy utilization-based operation execution plan data for the database operation based on: a user entity requesting the database operation, an operation type of the database operation, and/or an operation priority of the database operation.

In various examples, generating the optimized energy utilization-based operation execution plan data for the database operation includes selecting optimized operation parameter data for the database operation. In various examples, the database operation is executed in accordance with applying the optimized operation parameter data. In various examples, the optimized operation parameter data includes at least one of an optimized level or parallelization; an optimized time duration of execution; an optimized number of rows to be read; an optimized number of rows to be written; an optimized compression scheme to be applied; an optimized secondary indexing scheme to be applied; an optimized redundancy storage scheme to be applied; an optimized number of computing devices to be utilized; and/or an optimized at least one type of computing device to be utilized.

In various examples, generating the optimized energy utilization-based operation execution plan data for the database operation includes selecting an optimized flow of sub-operations. In various examples, the database operation is executed in accordance with executing a set of sub-operations in an ordering dictated by the optimized flow of sub-operations based on the optimized energy utilization-based operation execution plan data indicating the optimized flow of sub-operations.

In various examples, generating the optimized energy utilization-based operation execution plan data for the database operation includes performing the database operation energy utilization-based operation optimizing function upon an initial operation execution plan data for the database operation to generate the optimized energy utilization-based operation execution plan data based on determining execution of the optimized energy utilization-based operation execution plan data for the database operation yields greater energy efficiency than execution of the initial operation execution plan data for the database operation.

In various examples, the optimized energy utilization-based operation execution plan data indicates an optimized flow of sub-operations generated based on rearranging an ordering of at least two sub-operations in an initial flow of sub-operation indicated in the initial operation execution plan data based on the optimized flow of sub-operations yielding greater energy efficiency than the initial flow of sub-operations.

In various examples, generating the optimized energy utilization-based operation execution plan data for the database operation includes selecting the optimized energy utilization-based operation execution plan data from a plurality of operation execution plan data options, and wherein the optimized energy utilization-based operation execution plan data is selected based on having greater energy efficiency than other ones of the plurality of operation execution plan data options.

In various examples, the optimized energy utilization-based operation execution plan data is selected over another operation execution plan data of the plurality of operation execution plan data options based on the optimized energy utilization-based operation execution plan data having lower overall energy consumption and lower peak power than the another operation execution plan data. In various examples, the optimized energy utilization-based operation execution plan data is selected over another operation execution plan data of the plurality of operation execution plan data options based on the optimized energy utilization-based operation execution plan data having lower overall energy consumption despite having greater peak power than the another operation execution plan data based on the database operation energy utilization-based operation optimizing function weighing energy consumption optimization more heavily than peak power optimization. In various examples, the optimized energy utilization-based operation execution plan data is selected over another operation execution plan data of the plurality of operation execution plan data options based on the optimized energy utilization-based operation execution plan data having lower peak power despite having greater overall energy consumption than the another operation execution plan data based on the database operation energy utilization-based operation optimizing function weighing peak power optimization more heavily than overall energy optimization. In various examples, the optimized energy utilization-based operation execution plan data is selected over another operation execution plan data of the plurality of operation execution plan data options based on the optimized energy utilization-based operation execution plan data having reduced overall energy consumption and reduced peak power despite having increased execution time based on the database operation energy utilization-based operation optimizing function weighing energy efficiency optimization more heavily than performance optimization.

In various examples, the method further includes performing an energy utilization estimation function upon operation parameter data for each the plurality of operation execution plan data options to generate corresponding energy utilization estimate data for the each of the plurality of operation execution plan data options. In various examples, the optimized energy utilization-based operation execution plan data is selected based on having corresponding energy utilization estimate data indicating greater energy efficiency than other ones of the plurality of operation execution plan data options.

In various examples, the database operation energy utilization-based operation optimizing function is performed upon energy utilization-based operation optimizer input data for the database operation that includes at least one of an operation type of the database operation; operation parameter data for the database operation; projected temporal database power usage data for the database system; and/or current power meter measurement data for the database system.

In various examples, the database operation corresponds to a query operation, where executing the database operation includes generating a query resultant for a query expression based on applying the optimized energy utilization-based operation execution plan data to execute the query operation. In various examples, the database operation corresponds to an ingress operation, where executing the database operation includes receiving a plurality of records for storage based on applying the optimized energy utilization-based operation execution plan data to execute the ingress operation. In various examples, the database operation corresponds to a storage-formatted data structure generation operation, where executing the database operation includes generating a plurality of storage-formatted data structures from a corresponding plurality of records for storage based on applying the optimized energy utilization-based operation execution plan data to execute the storage-formatted data structure generation operation. In various examples, the database operation corresponds to a rebuilding operation, where executing the database operation includes rebuilding a first data structure from at least one other first data structure based on applying the optimized energy utilization-based operation execution plan data to execute the rebuilding operation. In various examples, the database operation corresponds to a migration operation, where executing the database operation includes migrating at least one first data structure from storage in at least one first source location to storage in at least one first destination location based on based on applying the optimized energy utilization-based operation execution plan data to execute the migration operation.

In various embodiments, any one of more of the various examples listed above are implemented in conjunction with performing some or all steps of FIG. 29V. In various embodiments, any set of the various examples listed above can be implemented in tandem, for example, in conjunction with performing some or all steps of FIG. 29V, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29V described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29V, for example, in conjunction with further implementing any one or more of the various examples described above.

In various embodiments, the operational instructions, when executed by the at least one processor, cause the database system to: determine power usage policy data for the database system; determine a database operation for execution; perform a database operation energy utilization-based operation optimizing function to generate optimized energy utilization-based operation execution plan data for the database operation based on the power usage policy data; and/or execute the database operation in accordance with the optimized energy utilization-based operation execution plan data.

Figure 29W:
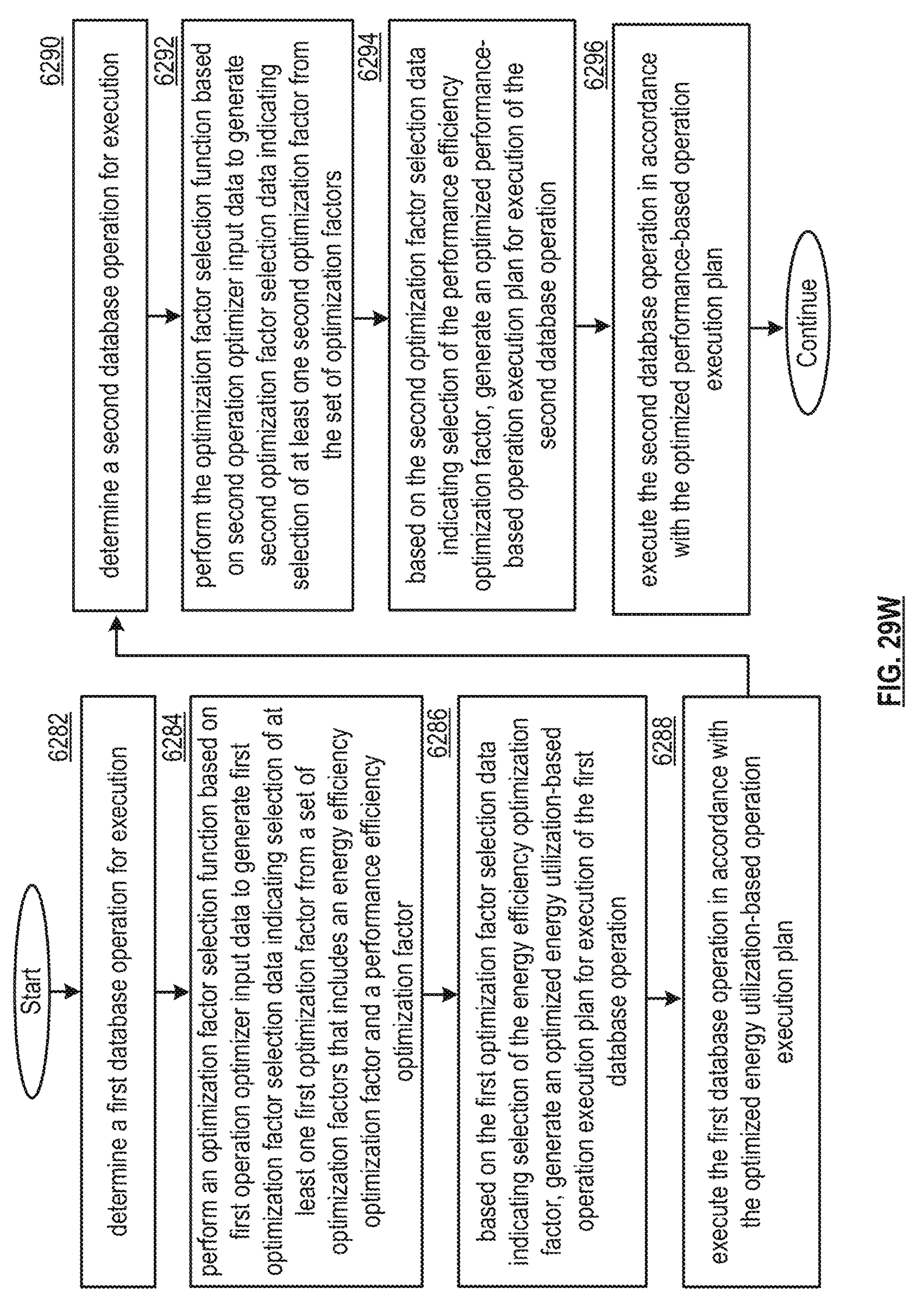

FIG. 29W illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29W. In some embodiments, a node 37 can implement some or all of FIG. 29W based on implementing a corresponding plurality of processing core resources 48.1-48.W. Some or all of the steps of FIG. 29W can optionally be performed by any other one or more processing modules of the database system 10. Some or all of the steps of FIG. 29W can be performed to implement some or all of the functionality of the database system 10 as described in conjunction with FIGS. 29A-29U, for example, by implementing some or all of the functionality of energy utilization-based operation optimizer system 3553 and/or based on processing and/or generating energy utilization data 3510. Some or all steps of FIG. 29W can be performed by database system 10 in accordance with other embodiments of the database system 10 and/or nodes 37 discussed herein. Some or all steps of FIG. 29W can be performed by database system 10 via processing and/or generating any energy utilization data 3510 described herein. Some or all of the steps of FIG. 29W can be performed in conjunction with performing some or all steps of any other method described herein.

Step 6282 includes determining a first database operation for execution. Step 6284 includes performing an optimization factor selection function based on first operation optimizer input data to generate first optimization factor selection data indicating selection of at least one first optimization factor from a set of optimization factors that includes a performance efficiency optimization factor and an energy efficiency optimization factor. Step 6286 includes, based on the first optimization factor selection data indicating selection of the performance efficiency optimization factor, generating an optimized performance-based operation execution plan for execution of the first database operation. Step 6288 includes executing the first database operation in accordance with the optimized performance-based operation execution plan.

Step 6290 includes determining a second database operation for execution. Step 6292 includes performing the optimization factor selection function based on second operation optimizer input data to generate second optimization factor selection data indicating selection of at least one second optimization factor from the set of optimization factors. Step 6294 includes, based on the second optimization factor selection data indicating selection of the energy efficiency optimization factor, generating an optimized energy utilization-based operation execution plan for execution of the second database operation. Step 6206 includes executing the second database operation in accordance with the optimized energy utilization-based operation execution plan.

In various examples, the first database operation and the second database operation are two instances of the same operation. In various examples, the optimized performance-based operation execution plan for the same operation is different from the optimized energy utilization-based operation execution plan for the same operation based on the optimized performance-based operation execution plan being generated to optimize for the performance efficiency optimization factor and the optimized energy utilization-based operation execution plan being generated to optimize for the performance efficiency optimization factor. In various examples, execution of the same operation via the optimized energy utilization-based operation execution plan yields greater energy efficiency from the execution of the same operation via the optimized performance-based operation execution plan. In various examples, execution of the same operation via the optimized performance-based operation execution plan yields greater performance efficiency from the execution of the same operation via the optimized energy utilization-based operation execution plan.

In various examples, the performance efficiency optimization factor corresponds to a runtime efficiency factor. In various examples, execution of the same operation via the optimized performance-based operation execution plan yields a faster runtime than the execution of the same operation via the optimized energy utilization-based operation execution plan.

In various examples, the performance efficiency optimization factor corresponds to a memory utilization size efficiency factor. In various examples, execution of the same operation via the optimized performance-based operation execution plan yields consumption of a smaller amount of memory than the execution of the same operation via the optimized energy utilization-based operation execution plan.

In various examples, the same database operation includes storage of data for future accesses in executing subsequent database operations. In various examples, the performance efficiency optimization factor corresponds to a future access performance efficiency optimization factor for the future access. In various examples, the performance efficiency optimization factor corresponds to a future access energy efficiency optimization factor for the future access. In various examples, execution of the same operation via the optimized performance-based operation execution plan yields greater performance efficiency in the future accesses of the data stored via execution of the optimized performance-based operation execution plan than that of the future accesses of the data stored via execution of the optimized energy utilization-based operation execution plan. In various examples, the execution of the same operation via the optimized energy utilization-based operation execution plan yields greater energy efficiency in the future accesses of the data stored via execution of the optimized energy utilization-based operation execution plan than that of the future access of the data stored via execution of the optimized performance-based operation execution plan.

In various examples, at least one portion of the same database operation is executed via a first sub-plan of the optimized performance-based operation execution plan and is executed via a second sub-plan of the optimized energy utilization-based operation execution plan. In various examples, the first sub-plan and the second sub-plan are different ones of a plurality of sub-plan options for implementing the at least one portion based on the plurality of sub-plan implementation options reflecting an inverse relationship between processing efficiency and energy efficiency.

In various examples, the optimized performance-based operation execution plan includes an optimized performance-based sub-operation execution flow indicating a first directional flow of a first set of sub-operations for execution of the same operation. In various examples, the optimized energy utilization-based operation execution plan includes an optimized energy utilization-based sub-operation execution flow indicating a second directional flow of a second set of sub-operations for execution of the same operation. In various examples, the first directional flow of a first set of sub-operations is different from the second directional flow of the second set of sub-operations for based on the optimized performance-based sub-operation execution flow being generated to optimize for the performance optimization factor and the optimized energy efficiency-based sub-operation execution flow being generated to optimize for the energy efficiency optimization factor, based on execution of the first directional flow of the first set of sub-operations being more performance efficient than execution of the second directional flow of the second set of sub-operations, and/or based on the execution of the second directional flow of the second set of sub-operations being more energy efficient than execution of the first directional flow of the first set of sub-operations.

In various examples, the first set of sub operations and the second set of sub operations have a null set difference. In various examples, the first set of sub operations and the second set of sub operations have a non-null difference. In various examples, the first set of sub operations and the second set of sub operations have a null intersection. In various examples, the first set of sub operations and the second set of sub operations have a non-null intersection. In various examples, the first flow and second flow include serial rearranging of at least two of the set of sub operations, for example, included the non-null intersection.

In various examples, the optimized performance-based operation execution plan includes optimized performance-based memory utilization strategy data. In various examples, the optimized energy utilization-based operation execution plan includes optimized energy utilization-based memory utilization strategy data. In various examples, the optimized performance-based memory utilization strategy data indicates utilization of a first type of memory for execution of at least some of the same database operation different from a second type of memory for execution of the at least some of the same database operation indicated by the optimized energy utilization-based memory utilization strategy based on the energy utilization-based memory utilization strategy data being generated to optimize for the energy efficiency optimization factor and the performance-based memory utilization strategy data being generated to optimize for the performance efficiency optimization factor, based on the first type of memory being more performance efficient than the second type of memory when executing the at least some of the same database operation, and/or based on the second type of memory being more energy efficient than the first type of memory when executing the at least some of the same database operation.

In various examples, the optimized energy utilization-based operation execution plan includes optimized energy utilization-based compression strategy data. In various examples, the optimized performance-based operation execution plan includes optimized performance-based compression strategy data. In various examples, the optimized performance-based compression strategy data indicates utilization of a first compression ratio for execution of at least some of the same database operation different from a second compression ratio for execution of the at least some of the same database operation indicated by the optimized energy utilization-based compression strategy based on the energy utilization-based compression strategy data being generated to optimize for the energy efficiency optimization factor and the performance-based compression strategy data being generated to optimize for the performance efficiency optimization factor, based on use of the first compression ratio being more performance efficient than the second compression ratio, and/or based on use of the second compression ratio being more energy efficient than the first compression ratio.

In various examples, the optimized performance-based compression strategy data indicates utilization of the first compression ratio different from the second compression ratio indicated by the optimized energy utilization-based compression strategy based on generating compressed data via the first compression ratio being more runtime efficient than generating compressed data via the second compression ratio, and/or based on generating the compressed data via the first compression ratio being less energy efficient than generating the compressed data via the second compression ratio.

In various examples, the optimized performance-based compression strategy data indicates utilization of the first compression ratio different from the second compression ratio indicated by the optimized energy utilization-based compression strategy based on storing of compressed data having the first compression ratio being more storage efficient than storing of compressed data having the second compression ratio, and/or based on storing of the compressed data having the first compression ratio being less energy efficient than storing the compressed data having the second compression ratio.

In various examples, the optimized performance-based compression strategy data indicates utilization of the first compression ratio different from the second compression ratio indicated by the optimized energy utilization-based compression strategy based on decompression and/or accessing of compressed data having the first compression ratio being more performance efficient than decompression and/or accessing of the compressed data having the second compression ratio, and/or based on decompression and/or accessing of the compressed data having the first compression ratio being less energy efficient than decompression and/or accessing of the compressed data having the second compression ratio.

In various examples, the optimized energy utilization-based operation execution plan includes optimized energy utilization-based secondary indexing strategy data. In various examples, the optimized performance-based operation execution plan includes optimized performance-based secondary indexing strategy data. In various examples, the optimized performance-based secondary indexing strategy utilization strategy data indicates utilization of a first secondary indexing scheme for execution of at least some of the same database operation different from a second secondary indexing scheme for execution of the at least some of the same database operation indicated by the optimized energy utilization-based secondary indexing strategy based on the energy utilization-based secondary indexing strategy data being generated to optimize for the energy efficiency optimization factor and the performance-based secondary indexing strategy being generated to optimize for the performance efficiency optimization factor, based on use of the first secondary indexing scheme being more performance efficient than the second secondary indexing scheme, and based on use of the second secondary indexing scheme being more energy efficient than the first secondary indexing scheme.

In various examples, the optimized performance-based compression strategy data indicates the first secondary indexing scheme different from the second secondary indexing scheme indicated by the optimized energy utilization-based compression strategy based on generating of index structures via the first secondary indexing scheme being more runtime efficient than generating of index structures via the second secondary indexing scheme and/or based on generating of index structures via the first secondary indexing scheme being less energy efficient than generating of index structures via the second secondary indexing scheme.

In various examples, the optimized performance-based compression strategy data indicates the first secondary indexing scheme different from the second secondary indexing scheme indicated by the optimized energy utilization-based compression strategy based on storing of index structures under the first secondary indexing scheme being more storage efficient than storing of index structures via the second secondary indexing scheme and/or based on storing of index structures under the first secondary indexing scheme being less energy efficient than storing of index structures via the second secondary indexing scheme.

In various examples, the optimized performance-based compression strategy data indicates the first secondary indexing scheme different from the second secondary indexing scheme indicated by the optimized energy utilization-based compression strategy based on accessing of index structures under the first secondary indexing scheme being more runtime efficient than accessing of index structures via the second secondary indexing scheme and/or based on accessing of index structures under the first secondary indexing scheme being less energy efficient than accessing of index structures via the second secondary indexing scheme.

In various examples, the optimized performance-based compression strategy data indicates the first secondary indexing scheme different from the second secondary indexing scheme indicated by the optimized energy utilization-based compression strategy based on IO efficiency in query executions rendered via access to index structures under the first secondary indexing scheme being more efficient than IO efficiency in query executions rendered via access to index structures under the second secondary indexing scheme.

In various examples, the optimized energy utilization-based operation execution plan includes optimized energy utilization-based processing core utilization strategy data. In various examples, the optimized performance-based operation execution plan includes optimized performance-based processing core utilization strategy data. In various examples, the optimized performance-based processing core utilization strategy data indicates utilization of a first type of processing core for parallelized execution of at least some of the same database operation different from a second type of processing core for parallelized execution of the at least some of the same database operation indicated by the optimized energy utilization-based processing core utilization strategy based on the energy utilization-based processing core utilization strategy data being generated to optimize for the energy efficiency optimization factor and the performance-based processing core utilization strategy data being generated to optimize for the performance efficiency optimization factor, based on the first type of processing core being more performance efficient than the second type of processing core when executing the at least some of the same database operation, and/or based on the second type of processing core being more energy efficient than the first type of processing core when executing the at least some of the same database operation.

In various examples, the optimized energy utilization-based operation execution plan includes optimized energy utilization-based power supply strategy data. In various examples, the optimized performance-based operation execution plan includes optimized performance-based power supply strategy data. In various examples, the optimized energy utilization-based power supply strategy data indicates utilization of at least one off grid-powered devices for execution of at least some of the same database operation different from at least one grid powered device for execution of the at least some of the same database operation indicated by the optimized performance-based power supply strategy data.

In various examples, the performance factor operation execution plan data is generated for use in optimizing database operations during a first temporal period. In various examples, the energy efficiency optimization factor is selected for use in optimizing database operations during a second temporal period. In various examples, the performance factor is applied to optimize execution of the first database operation based on determining to execute the second database operation during the first temporal period, and wherein the energy efficiency optimization factor is applied to optimize execution of the first database operation based on determining to execute the first database operation during the second temporal period.

In various examples, the energy efficiency optimization factor is selected for use in optimizing database operations during the second temporal period and the performance factor operation execution plan data is generated for use in optimizing database operations during the first temporal period based on a greater volume of database operations being requested during the second temporal period than the first temporal period. In various examples, the energy efficiency optimization factor is selected for use in optimizing database operations during the second temporal period and the performance factor operation execution plan data is generated for use in optimizing database operations during the first temporal period based on the second temporal period having greater power consumption pricing than the first temporal period. In various examples, the energy efficiency optimization factor is selected for use in optimizing database operations during the second temporal period and the performance factor operation execution plan data is generated for use in optimizing database operations during the first temporal period based on a first peak power threshold during the first temporal period being greater than a second peak power threshold during the second temporal period. In various examples, the energy efficiency optimization factor is selected for use in optimizing database operations during the second temporal period and the performance factor operation execution plan data is generated for use in optimizing database operations during the first temporal period based on first current power meter measurement data generated during the first temporal period indicating lower energy consumption than second current power meter measurement data generated during the second temporal period. In various examples, the energy efficiency optimization factor is selected for use in optimizing database operations during the second temporal period and the performance factor operation execution plan data is generated for use in optimizing database operations during the first temporal period based on first current power meter measurement data generated during the first temporal period indicating lower peak power than the second current power meter measurement data generated during the second temporal period. In various examples, the energy efficiency optimization factor is selected for use in optimizing database operations during the second temporal period and the performance factor operation execution plan data is generated for use in optimizing database operations during the first temporal period based on the first current power meter measurement data generated during the first temporal period indicating a first current power level lower than a peak power threshold level by a first current amount greater than a second amount by which a second power level indicated by the second current power meter measurement data generated during the second temporal period falls below the peak power threshold level. In various examples, the energy efficiency optimization factor is selected for use in optimizing database operations during the second temporal period and the performance factor operation execution plan data is generated for use in optimizing database operations during the first temporal period based on historical operation execution data indicating lower amounts of database operation execution during a first cyclically occurring time frame corresponding to the first temporal period than a second cyclically occurring time frame corresponding to the second temporal period. In various examples, the energy efficiency optimization factor is selected for use in optimizing database operations during the second temporal period and the performance factor operation execution plan data is generated for use in optimizing database operations during the first temporal period based on historical energy utilization data indicating lower energy consumption during the first cyclically occurring time frame corresponding to the first temporal period than the second cyclically occurring time frame corresponding to the second temporal period. In various examples, the energy efficiency optimization factor is selected for use in optimizing database operations during the second temporal period and the performance factor operation execution plan data is generated for use in optimizing database operations during the first temporal period based on the historical energy utilization data indicating lower peak power during the first cyclically occurring time frame corresponding to the first temporal period than the second cyclically occurring time frame corresponding to the second temporal period. the historical energy utilization data for the first cyclically occurring time frame corresponding to the first temporal period indicating a first historic peak power level lower than the peak power threshold by a first historic amount greater than a second historic amount by which a second historic peak power level indicated by the historical energy utilization data for the first cyclically occurring time frame corresponding to the first temporal period falls below the peak power threshold. In various examples, the energy efficiency optimization factor is selected for use in optimizing database operations during the second temporal period and the performance factor operation execution plan data is generated for use in optimizing database operations during the first temporal period based on the first temporal period corresponding to a nighttime temporal period and the second temporal period corresponding to a daytime temporal period.

In various examples, the second temporal period begins at an end of the first temporal period, wherein the optimized performance-based operation execution plan is generated in accordance with a first energy efficiency level for memory usage in executing database operations during the first temporal period that is lower than a second energy efficiency level for memory usage in executing database operations during the second temporal period indicated by the optimized energy efficiency-based operation execution plan based on transitioning from a first database-wide memory utilization mode to a second database-wide operation execution mode to implement transitioning of execution of database operations by the database system from optimizing for performance to optimizing for energy efficiency.

In various examples, the performance optimization factor is selected for optimization of the first database operation based on the first operation optimizer input data indicating first operation parameter data for the first database operation. In various examples, the energy efficiency optimization factor is selected for optimization of the second database operation based on the second operation optimizer input data indicating second operation parameter data for the second database operation that is different from the first operation parameter data.

In various examples, the first operation parameter data indicates and/or is based on a first database operation type for the first database operation indicating one of a plurality of possible database operation types, where the performance efficiency optimization factor is selected over the energy efficiency optimization factor for the first database operation as a function of the first database operation type. In various examples, the first operation parameter data indicates and/or is based on first operation priority data for the first database operation indicating one of a plurality of possible database operation priority values, wherein the performance efficiency optimization factor is selected over the energy efficiency optimization factor for the first database operation as a function of the first operation priority data. In various examples, the first operation parameter data indicates and/or is based on a first requesting user entity for the first database operation indicating one of a plurality of possible requesting user entities, where the performance efficiency optimization factor is selected over the energy efficiency optimization factor for the first database operation as a function of the first requesting user entity. In various examples, the first operation parameter data indicates and/or is based on first read size data for an amount of data read in executing the first database operation, where the performance efficiency optimization factor is selected over the energy efficiency optimization factor for the first database operation as a function of the first read size data. In various examples, the first operation parameter data indicates and/or is based on first write size data for an amount of data written in executing the first database operation, where the performance efficiency optimization factor is selected over the energy efficiency optimization factor for the first database operation as a function of the first write size data. In various examples, the first operation parameter data indicates and/or is based on first failure rate data indicating rate of failure in executing the first database operation requiring attempted re-execution of the first database operation, where the performance efficiency optimization factor is selected over the energy efficiency optimization factor for the first database operation as a function of the first failure rate data. In various examples, the first operation parameter data indicates and/or is based on first computing device data indicating a set of computing devices involved in executing the first database operation, where the performance efficiency optimization factor is selected over the energy efficiency optimization factor for the first database operation as a function of the first computing device data.

In various examples, the performance efficiency optimization factor is selected over the energy efficiency optimization factor for the first database operation and the energy optimization factor is selected over the performance efficiency optimization factor for the second database operation based on the first database operation type of the first database operation having a greater operation type energy efficiency than a second database operation type of the second database operation. In various examples, the performance efficiency optimization factor is selected over the energy efficiency optimization factor for the first database operation and the energy optimization factor is selected over the performance efficiency optimization factor for the second database operation based on the first read size data for the first database operation indicating a smaller amount of data to be read than second read size data for the second database operation. In various examples, the performance efficiency optimization factor is selected over the energy efficiency optimization factor for the first database operation and the energy optimization factor is selected over the performance efficiency optimization factor for the second database operation based on the first failure rate data for the first database operation indicating a lower failure rate than less than second failure rate data for the second database operation. In various examples, the performance efficiency optimization factor is selected over the energy efficiency optimization factor for the first database operation and the energy optimization factor is selected over the performance efficiency optimization factor for the second database operation based on the first computing device data indicating a greater computing device energy efficiency than second computing device data for the second database operation. In various examples, the performance efficiency optimization factor is selected over the energy efficiency optimization factor for the first database operation and the energy optimization factor is selected over the performance efficiency optimization factor for the second database operation based on first operation priority data for the first database operation indicating a greater priority value than second operation priority data for the second database operation based on the first database operation having greater urgency for completion than the second database operation. In various examples, the performance efficiency optimization factor is selected over the energy efficiency optimization factor for the first database operation and the energy optimization factor is selected over the performance efficiency optimization factor for the second database operation based on the first requesting user entity for the first database operation having a greater priority for operation execution than a second requesting user entity for the second database operation.

In various examples, the first database operation corresponds to a first query operation, where executing the first database operation includes generating a first query resultant for a first query expression based on applying the optimized energy utilization-based operation execution plan to execute the first query operation. In various examples, the first database operation corresponds to a first ingress operation, wherein executing the first database operation includes receiving a first plurality of records for storage based on applying the optimized energy utilization-based operation execution plan to execute the first ingress operation. In various examples, the first database operation corresponds to a first storage-formatted data structure generation operation, where executing the first database operation includes generating a first plurality of storage-formatted data structures from a corresponding first plurality of records for storage based on applying the optimized energy utilization-based operation execution plan to execute the first storage-formatted data structure generation operation. In various examples, the first database operation corresponds to a first rebuilding operation, where executing the first database operation includes rebuilding a first data structure from at least one other first data structure based on applying the optimized energy utilization-based operation execution plan to execute the first rebuilding operation. In various examples, the first database operation corresponds to a first migration operation, where executing the first database operation includes migrating at least one first data structure from storage in at least one first source location to storage in at least one first destination location based on based on applying the optimized energy utilization-based operation execution plan to execute the first migration operation.

In various examples, the second database operation corresponds to a second query operation, where executing the second database operation includes generating a second query resultant for a second query expression based on applying the optimized performance-based operation execution plan to execute the first migration operation the second query operation. In various examples, the second database operation corresponds to a second ingress operation, where executing the second database operation includes receiving a second plurality of records for storage based on applying the optimized performance-based operation execution plan to execute the second ingress operation. In various examples, the second database operation corresponds to a second storage-formatted data structure generation operation, where executing the second database operation includes generating a second plurality of storage-formatted data structures from a corresponding second plurality of records for storage based on applying the optimized performance-based operation execution plan to execute the second storage-formatted data structure generation operation. In various examples, the second database operation corresponds to a second rebuilding operation, wherein executing the second database operation includes rebuilding a second data structure from at least one second other data structure based on applying the optimized performance-based operation execution plan to execute the second rebuilding operation. In various examples, the second database operation corresponds to a second migration operation, where executing the second database operation includes migrating at least one second data structure from storage in at least one second source location to storage in at least one second destination location based on applying the optimized performance-based operation execution plan to execute the second migration operation.

In various embodiments, any one of more of the various examples listed above are implemented in conjunction with performing some or all steps of FIG. 29W. In various embodiments, any set of the various examples listed above can be implemented in tandem, for example, in conjunction with performing some or all steps of FIG. 29W, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29W described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29W, for example, in conjunction with further implementing any one or more of the various examples described above.

In various embodiments, the operational instructions, when executed by the at least one processor, cause the database system to: determine a first database operation for execution; perform an optimization factor selection function based on first operation optimizer input data to generate first optimization factor selection data indicating selection of at least one first optimization factor from a set of optimization factors that includes an energy efficiency optimization factor and a performance efficiency optimization factor; based on the first optimization factor selection data indicating selection of the energy efficiency optimization factor, generate an optimized energy utilization-based operation execution plan for execution of the first database operation; execute the first database operation in accordance with the optimized energy utilization-based operation execution plan; determine a second database operation for execution; perform the optimization factor selection function based on second operation optimizer input data to generate second optimization factor selection data indicating selection of at least one second optimization factor from the set of optimization factors; based on the second optimization factor selection data indicating selection of the performance efficiency optimization factor, generate an optimized performance-based operation execution plan for execution of the second database operation; and/or execute the second database operation in accordance with the optimized performance-based operation execution plan.

Figure 29X:
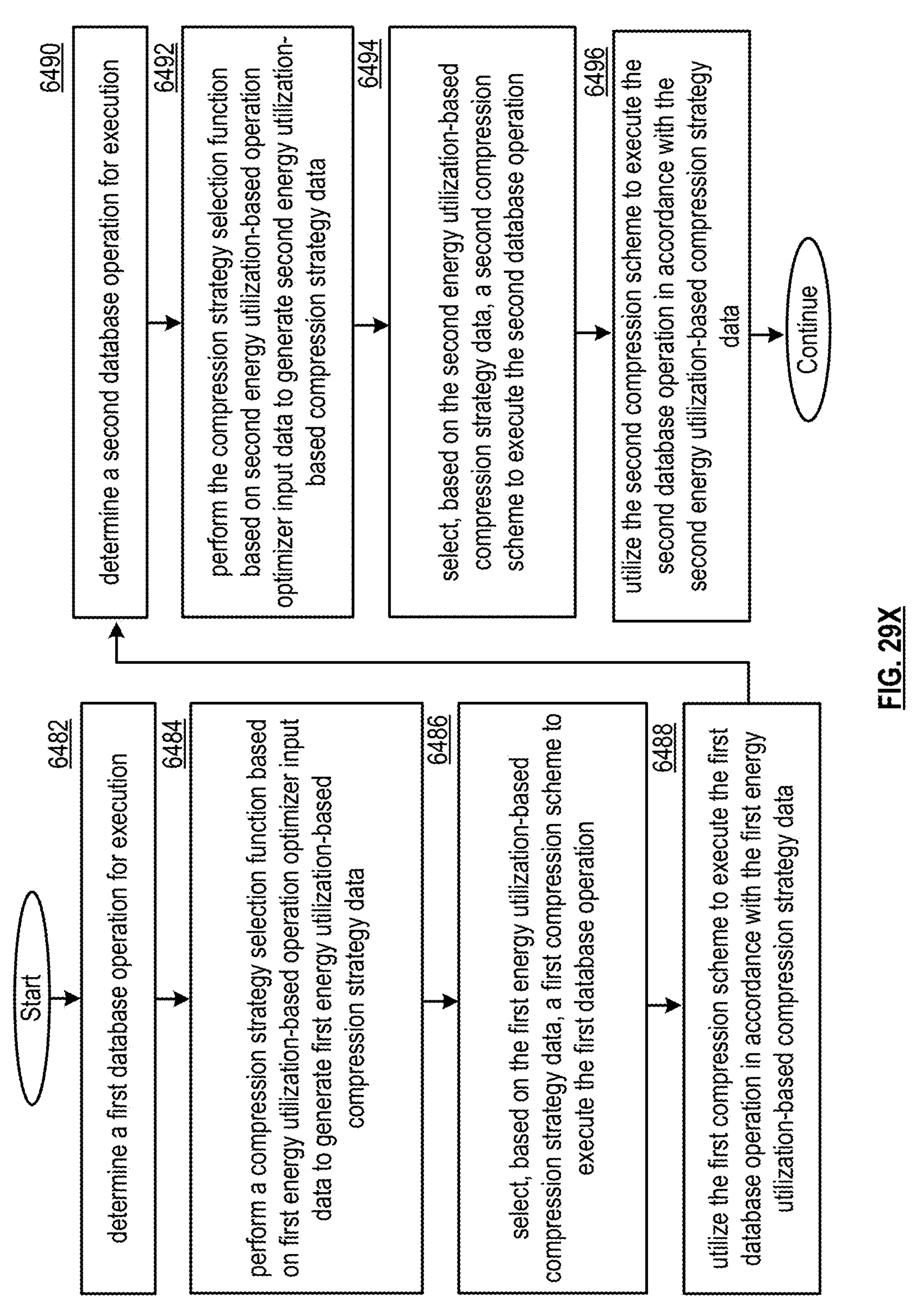

FIG. 29X illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29X. In some embodiments, a node 37 can implement some or all of FIG. 29X based on implementing a corresponding plurality of processing core resources 48.1-48.W. Some or all of the steps of FIG. 29X can optionally be performed by any other one or more processing modules of the database system 10. Some or all of the steps of FIG. 29X can be performed to implement some or all of the functionality of the database system 10 as described in conjunction with FIGS. 29A-29U, for example, by implementing some or all of the functionality of energy utilization-based operation optimizer system 3553 and/or based on processing and/or generating energy utilization data 3510. Some or all steps of FIG. 29X can be performed by database system 10 in accordance with other embodiments of the database system 10 and/or nodes 37 discussed herein. Some or all steps of FIG. 29X can be performed by database system 10 via processing and/or generating any energy utilization data 3510 described herein. Some or all of the steps of FIG. 29X can be performed in conjunction with performing some or all steps of any other method described herein.

In various examples, executing the first database operation includes: determining first data for storage; compressing the first data in accordance with the first compression scheme to generate first compressed data for storage; and/or storing the first compressed data. In various examples, executing the second database operation includes: determining second data for storage; compressing the second data in accordance with the second compression scheme to generate second compressed data for storage; and/or storing the second compressed data.

In various examples, the first compression scheme indicates a first compression ratio, and/or the second compression scheme indicates a second compression ratio indicating a greater level of compression than the first compression ratio.

In various examples, the method further includes: generating first storage-based energy consumption data for storing the first data via the database system and/or generating second storage-based energy consumption data for storing the second data via the database system. In various examples, the second compression ratio is greater than the first compression ratio based on the second storage-based energy consumption data indicating greater energy consumption required to store the second data than that required to store the first data indicated by the first storage-based energy consumption data.

In various examples, the method further includes generating first processing-based energy consumption data for: compressing the first data to generate the compressed data, and/or decompressing the first compressed data in conjunction with executing at least one subsequent database operation to access the first data. In various examples, the method further includes generating second processing-based energy consumption data for at least one of: compressing the second data to generate the compressed data, or decompressing the second compressed data in conjunction with executing at least one subsequent database operation to access the first data. In various examples, the second compression ratio is greater than the first compression ratio based on the second processing-based energy consumption data indicating lower energy consumption required to compress the second data than that required to compress the first data indicated by the first storage-based energy consumption data. In various examples, the second compression ratio is greater than the first compression ratio based on the second processing-based energy consumption data indicating lower energy consumption required to decompress the second data than that required to compress the first data indicated by the first storage-based energy consumption data.

In various examples, the method further includes generating first storage vs. processing-based energy consumption trade-off data based on the first storage-based energy consumption data and the first processing-based energy consumption data, where the first compression scheme is selected as having the first compression ratio based on the storage vs. processing based energy consumption trade-off data. In various examples, the method further includes generating second storage vs. processing-based energy consumption trade-off data based on the second storage-based energy consumption data and the second processing-based energy consumption data, wherein the second compression scheme is selected as having the second compression ratio based on the storage vs. processing based energy consumption trade-off data. In various examples, the second compression ratio is greater than the first compression ratio further based on: the first storage vs. processing based-energy consumption trade-off data favoring processing efficiency over storage efficiency and the second storage vs. processing-based energy consumption trade-off data favoring storage efficiency over processing efficiency; the first storage vs. processing based energy consumption trade-off data favoring processing efficiency over storage efficiency by a first factor greater than a second factor of favoring processing efficiency over storage efficiency indicated by the second storage vs. processing based energy consumption trade-off data; and/or the first storage vs. processing based energy consumption trade-off data favoring storage efficiency over processing efficiency by a first factor less than a second factor of favoring storage efficiency over processing efficiency indicated by the second storage vs. processing based energy consumption trade-off data.

In various examples, generating the first storage-based energy consumption data for storing the first data via the database system is based on first storage utilization parameters that includes and/or is based on: a first size of the first data; at least one first data type of data included in the first data; at least one first memory type of memory resources assigned to store the first data; a first number of computing device nodes assigned to store the first data; a first duration of storage of the first data; a first redundancy storage scheme utilized for storage of the first data; a first failure rate of the computing device nodes; and/or a first rebuilding rate of rebuilding the first data required for the first data to persist in the memory resources. In various examples, generating the second storage-based energy consumption data for storing the second data via the database system is based on a second storage utilization parameters that includes and/or is based on: a second size of the second data; at least one second data type of data included in the second data; at least one second memory type of memory resources assigned to store the second data; a second number of computing devices nodes assigned to store the second data; a second duration of storage of the second data; a second redundancy storage scheme utilized for storage of the second data; a second failure rate of the second computing device nodes; and/or a second rebuilding rate of rebuilding the second data required for the second data to persist in the memory resources. In various examples, the second compression ratio is selected to be greater than the first compression ratio based on: the second size being greater than the first size; the at least one second data type of data being larger than the at least one first data type; the at least one second memory type being less energy efficient than the at least one first memory type; the second number of computing devices nodes being greater than the first number of computing device nodes; the second duration being longer than the first duration; the second redundancy storage scheme requiring more storage for parity data than the first redundancy storage scheme; the second failure rate of the computing device nodes being higher than the first failure rate; and/or the second rebuilding rate being higher than the first rebuilding rate.

In various examples, generating the first processing-based energy consumption data for storing the first data via the database system is based on first processing parameters that includes and/or is based on: a first size of the first data; first processing efficiency of a first compression algorithm utilized to generate the first compressed data; first processing efficiency of a first decompression algorithm utilized to decompress the second compressed data; a first decompression rate expected for accessing the first data in subsequent database operations; and/or a first query operation request rate of query operations for execution executed against at least one first relational database table that includes the first data. In various examples, generating the second processing-based energy consumption data for storing the second data via the database system is based on second processing parameters that includes and/or is based on: a second size of the second data; second processing efficiency of a second compression algorithm utilized to generate the second compressed data; second processing efficiency of a second decompression algorithm utilized to decompress the second compressed data; a second decompression rate expected for accessing the second data in subsequent database operations; and/or a second query operation request rate of query operations for execution executed against at least one second relational database table that includes the second data. In various examples, the second compression ratio is selected to be greater than the first compression ratio based on at least one of: the second size being smaller than the first size; the second processing efficiency of the second compression algorithm being greater than the first processing efficiency of the first compression algorithm; the second processing efficiency of the second decompression algorithm being greater than the first processing efficiency of the first decompression algorithm; the second decompression rate being less than the first decompression rate; and/or the second query operation request rate being less than the first query operation request rate.

In various examples, the method further includes generating energy efficiency data for each of a plurality of compression scheme options. In various examples, the energy efficiency data indicates the second compression scheme has a greater energy efficiency for utilization by the database system for execution of database operations than the first compression scheme. In various examples, the first compression scheme is selected in generating the first energy utilization-based compression strategy data and the second compression scheme is selected in generating the second energy utilization-based compression strategy data based on: the first energy utilization-based compression strategy data indicating a first energy efficiency level lower than a second energy efficiency level indicated by the second energy utilization-based compression strategy data; and/or the second compression scheme having the greater energy efficiency for utilization by the database system for execution of database operations than the first compression scheme.

In various examples, the method further includes generating a compression ratio selection function indicating compression ratio mapped to energy efficiency level as an increasing function of energy efficiency level. In various examples, the plurality of compression scheme options indicates a plurality of different compression scheme ratios. In various examples, the first compression scheme indicates a first compression ratio mapped to the first energy efficiency level via performance of the compression ratio selection function. In various examples, the second compression scheme indicates a second compression ratio mapped to the second energy efficiency level via performance of the compression ratio selection function. In various examples, the second compression ratio is greater than the first compression ratio based on the first energy efficiency level being lower than the second energy efficiency level.

In various examples, the method further includes determining performance efficiency data for each of the plurality of compression scheme options. In various examples, the performance efficiency data indicates the second compression scheme has a lower performance efficiency for utilization by the database system for execution of database operations than the first compression scheme. In various examples, the first energy utilization-based compression strategy data indicates a first performance efficiency level that is greater than a second performance efficiency level of the second energy utilization-based compression strategy data. In various examples, the first compression scheme is selected in generating the first energy utilization-based compression strategy data and the second compression scheme is selected in generating the second energy utilization-based compression strategy data based on: the second first energy utilization-based compression strategy data indicating the second performance efficiency level that is lower than the first performance efficiency level indicated by the first energy utilization-based compression strategy data, and/or the second compression scheme having the lower performance efficiency than the first compression scheme.

In various examples, the first energy utilization-based compression strategy data is generated for use in executing database operations during a first temporal period. In various examples, the second energy utilization-based compression strategy data is generated for use in executing database operations during a second temporal period. In various examples, the first energy utilization-based compression strategy data is applied to select the first compression scheme for execution of the first database operation based on determining to execute the first database operation during the first temporal period. In various examples, the second energy utilization-based compression strategy data is applied to select the second compression scheme for execution of the second database operation based on determining to execute the second database operation during the second temporal period.

In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on a greater volume of database operations being requested during the second temporal period than the first temporal period. In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on the second temporal period having greater power consumption pricing than the first temporal period. In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on a first peak power threshold during the first temporal period being greater than a second peak power threshold during the second temporal period. In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on first current power meter measurement data generated during the first temporal period indicating lower energy consumption than second current power meter measurement data generated during the second temporal period; the first current power meter measurement data generated during the first temporal period indicating lower peak power than the second current power meter measurement data generated during the second temporal period. In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on the first current power meter measurement data generated during the first temporal period indicating a first current power level lower than a peak power threshold level by a first current amount greater than a second amount by which a second power level indicated by the second current power meter measurement data generated during the second temporal period falls below the peak power threshold level. In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on historical operation execution data indicating lower amounts of database operation execution during a first cyclically occurring time frame corresponding to the first temporal period than a second cyclically occurring time frame corresponding to the second temporal period. In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on historical energy utilization data indicating lower energy consumption during the first cyclically occurring time frame corresponding to the first temporal period than the second cyclically occurring time frame corresponding to the second temporal period. In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on the historical energy utilization data indicating lower peak power during the first cyclically occurring time frame corresponding to the first temporal period than the second cyclically occurring time frame corresponding to the second temporal period. In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on the historical energy utilization data for the first cyclically occurring time frame corresponding to the first temporal period indicating a first historic peak power level lower than the peak power threshold level by a first historic amount greater than a second historic amount by which a second historic peak power level indicated by the historical energy utilization data for the first cyclically occurring time frame corresponding to the first temporal period falls below the peak power threshold. In various examples, the first energy utilization-based compression strategy data indicates a first energy efficiency level for executing database operations during the first temporal period that is lower than a second energy efficiency level for executing database operations during the second temporal period indicated by the second energy utilization-based compression strategy data based on the first temporal period corresponding to a nighttime temporal period and the second temporal period corresponding to a daytime temporal period.

In various examples, the second temporal period begins at an end of the first temporal period. In various examples, the first energy utilization-based compression strategy data indicates a first energy efficiency level for memory usage in executing database operations during the first temporal period that is lower than a second energy efficiency level for memory usage in executing database operations during the second temporal period indicated by the second energy utilization-based compression strategy data based on transitioning from a first database-wide compression mode to a second database-wide compression mode to implement transitioning of compression by the database system from the first energy efficiency level to the second energy efficiency level.

In various examples, executing the first database operation includes generating first compressed data by compressing data for storage via applying the first energy utilization-based compression strategy data based on being in the first database-wide compression mode. In various examples, executing the second database operation includes generating second compressed data to replace the first compressed data by recompressing the data for storage via applying the second energy utilization-based compression strategy data based on transitioning to the second database-wide compression mode.

In various examples, the first energy utilization-based compression strategy data is generated for execution of the first database operation based on the first energy utilization-based operation optimizer input data indicating first operation parameter data for the first database operation. In various examples, the second energy utilization-based compression strategy data is generated for execution of the second database operation based on the second energy utilization-based operation optimizer input data indicating second operation parameter data for the second database operation.

In various examples, first operation parameter data indicates and/or is based on a first database operation type for the first database operation indicating one of a plurality of possible database operation types, where the first energy utilization-based compression strategy data is generated as a function of the first database operation type. In various examples, first operation parameter data indicates and/or is based on first operation priority data for the first database operation indicating one of a plurality of possible database operation priority values, where the first energy utilization-based compression strategy data is generated as a function of the first operation priority data. In various examples, first operation parameter data indicates and/or is based on a first requesting user entity for the first database operation indicating one of a plurality of possible requesting user entities, where the first energy utilization-based compression strategy data is generated as a function of the first requesting user entity. In various examples, first operation parameter data indicates and/or is based on first read size data for an amount of data written in executing the first database operation, where the first energy utilization-based compression strategy data is generated as a function of the first read size data. In various examples, first operation parameter data indicates and/or is based on first write size data for an amount of data written in executing the first database operation, where the first energy utilization-based compression strategy data is generated as a function of the first write size data. In various examples, first operation parameter data indicates and/or is based on first failure rate data indicating rate of failure in executing the first database operation requiring attempted re-execution of the first database operation, where the first energy utilization-based compression strategy data is generated as a function of the first failure rate data. In various examples, first operation parameter data indicates and/or is based on first computing device data indicating a set of computing devices involved in executing the first database operation, where the first energy utilization-based compression strategy data is generated as a function of the first computing device data.

In various examples, the first energy utilization-based compression strategy data indicates a first energy efficiency level for memory usage in executing the first database operation that is lower than a second energy efficiency level for memory usage in executing the second database operation indicated by the second energy utilization-based compression strategy data based on the first database operation type of the first database operation having a greater operation type energy efficiency than a second database operation type of the second database operation. In various examples, the first energy utilization-based compression strategy data indicates a first energy efficiency level for memory usage in executing the first database operation that is lower than a second energy efficiency level for memory usage in executing the second database operation indicated by the second energy utilization-based compression strategy data based on the first read size data for the first database operation indicating a lower amount of data to be written than second read size data for the second database operation. In various examples, the first energy utilization-based compression strategy data indicates a first energy efficiency level for memory usage in executing the first database operation that is lower than a second energy efficiency level for memory usage in executing the second database operation indicated by the second energy utilization-based compression strategy data based on the first write size data for the first database operation indicating a lower amount of data to be written than second write size data for the second database operation. In various examples, the first energy utilization-based compression strategy data indicates a first energy efficiency level for memory usage in executing the first database operation that is lower than a second energy efficiency level for memory usage in executing the second database operation indicated by the second energy utilization-based compression strategy data based on the first failure rate data for the first database operation indicating a lower failure rate than less than second failure rate data for the second database operation. In various examples, the first energy utilization-based compression strategy data indicates a first energy efficiency level for memory usage in executing the first database operation that is lower than a second energy efficiency level for memory usage in executing the second database operation indicated by the second energy utilization-based compression strategy data based on the first computing device data indicating a greater computing device energy efficiency than second computing device data for the second database operation.

In various examples, first energy utilization-based compression strategy data indicates a first performance efficiency level greater than a second performance efficiency level indicated by the second energy utilization-based compression strategy data. In various examples, the first energy utilization-based compression strategy data has a first energy efficiency level for executing the first database operation that is lower than a second energy efficiency level for executing the second database operation indicated by the second energy utilization-based compression strategy data based on the first performance efficiency level for the first energy utilization-based compression strategy data being greater than the second performance efficiency level of the second energy utilization-based compression strategy data. In various examples, the first energy utilization-based compression strategy data is generated to indicate the first performance efficiency level greater than the second performance efficiency level indicated by the second energy utilization-based compression strategy data based on: the first operation priority data for the first database operation indicating a greater priority value than second operation priority data for the second database operation based on the first database operation having greater urgency for completion than the second database operation; and/or the first requesting user entity for the first database operation having a greater priority for operation execution than a second requesting user entity for the second database operation.

In various embodiments, any one of more of the various examples listed above are implemented in conjunction with performing some or all steps of FIG. 29X. In various embodiments, any set of the various examples listed above can be implemented in tandem, for example, in conjunction with performing some or all steps of FIG. 29X, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29X described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29X, for example, in conjunction with further implementing any one or more of the various examples described above.

In various embodiments, the operational instructions, when executed by the at least one processor, cause the database system to: determine a first database operation for execution; perform a compression strategy selection function based on first energy utilization-based operation optimizer input data to generate first energy utilization-based compression strategy data; select, based on the first energy utilization-based compression strategy data, a first compression scheme to execute the first database operation; utilize the first compression scheme to execute the first database operation in accordance with the first energy utilization-based compression strategy data; determine a second database operation for execution; perform the compression strategy selection function based on second energy utilization-based operation optimizer input data to generate second energy utilization-based compression strategy data, where the second energy utilization-based compression strategy data is different from the first energy utilization-based compression strategy data based on the second energy utilization-based operation optimizer input data being different from the first energy utilization-based operation optimizer input data; select, based on the second energy utilization-based compression strategy data, a second compression scheme to execute the second database operation, where the second compression scheme is different from the first compression scheme based on the second energy utilization-based compression strategy data being different from the first energy utilization-based compression strategy data; and/or utilize the second compression scheme to execute the second database operation in accordance with the second energy utilization-based compression strategy data.

Figure 29Y:
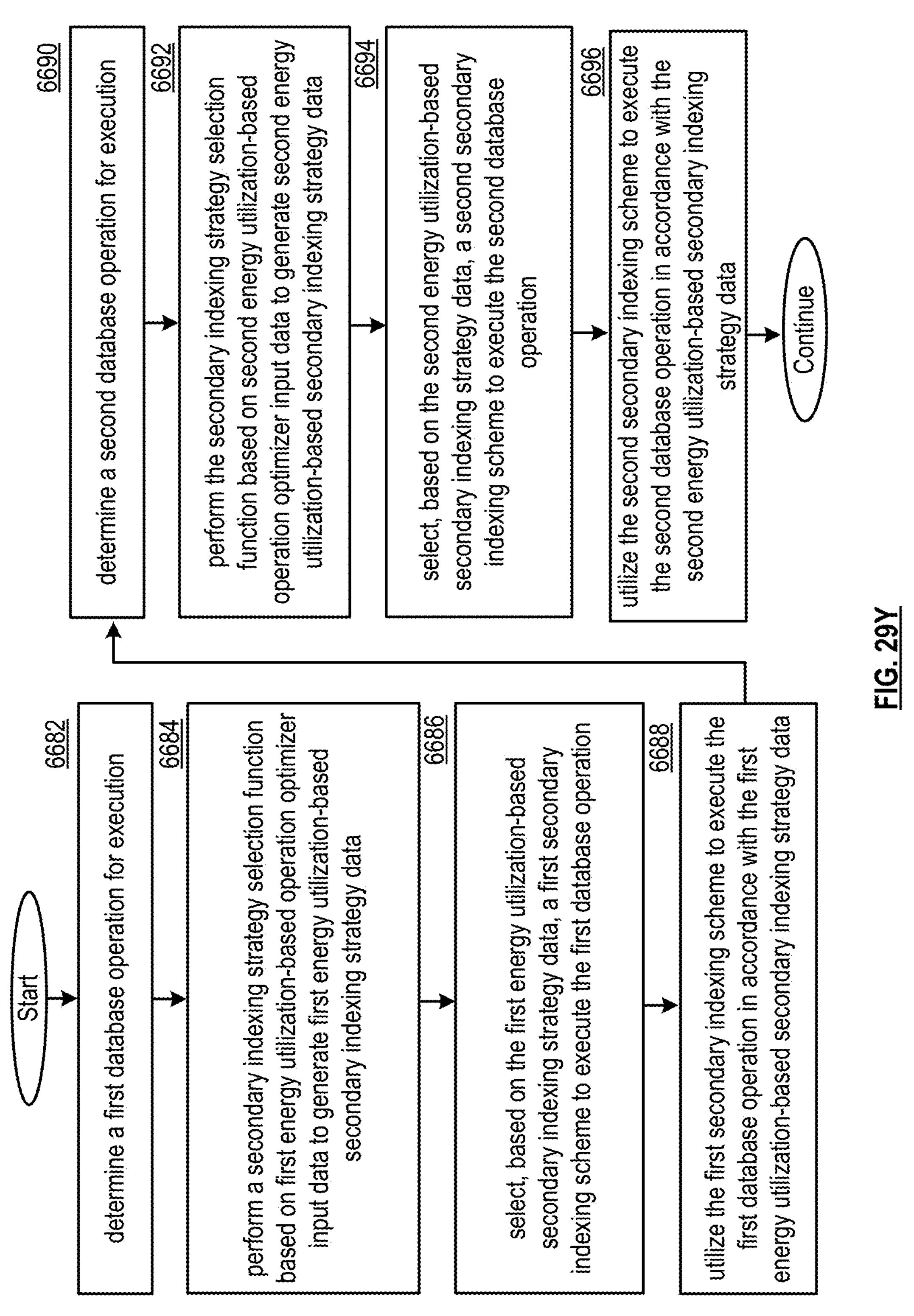

FIG. 29Y illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29Y. In some embodiments, a node 37 can implement some or all of FIG. 29Y based on implementing a corresponding plurality of processing core resources 48.1-48.W. Some or all of the steps of FIG. 29Y can optionally be performed by any other one or more processing modules of the database system 10. Some or all of the steps of FIG. 29X can be performed to implement some or all of the functionality of the database system 10 as described in conjunction with FIGS. 29A-29U, for example, by implementing some or all of the functionality of energy utilization-based operation optimizer system 3553 and/or based on processing and/or generating energy utilization data 3510. Some or all steps of FIG. 29Y can be performed by database system 10 in accordance with other embodiments of the database system 10 and/or nodes 37 discussed herein. Some or all steps of FIG. 29Y can be performed by database system 10 via processing and/or generating any energy utilization data 3510 described herein. Some or all of the steps of FIG. 29Y can be performed in conjunction with performing some or all steps of any other method described herein.

In various examples, executing the first database operation includes: determining a first plurality of records for storage; generating at least one first index structure indexing the first plurality of records in accordance with the first secondary indexing scheme; and/or storing the at least one first index structure in conjunction with storing the first plurality of records. In various examples, executing the second database operation includes: determining a second plurality of records for storage; generating at least one second index structure indexing the second plurality of records in accordance with the second secondary indexing scheme; and/or storing the at least one second index structure in conjunction with storing the second plurality of records.

In various examples, the first secondary indexing scheme indicates a first indexing level for indexing of the first plurality of records. In various examples, the second secondary indexing scheme indicates a second indexing level for indexing of the second plurality of records indicating a lower level of indexing than the first indexing level.

In various examples, the first set of records and the second set of records belong to a same relational database table that includes a set of columns. In various examples, the second secondary indexing level indicates the lower level of indexing than the first indexing level based on: the first secondary indexing scheme corresponding to indexing of at least one column of the set of columns and the second secondary indexing scheme corresponding to indexing of no columns of the set of columns; the first secondary indexing scheme corresponding to indexing of a first subset of columns of the set of columns and the second secondary indexing scheme corresponding to indexing of a second subset of columns of the set of columns that includes a lower number of columns from the first subset of columns; and/or the first secondary indexing scheme corresponding to indexing of a first column of the set of columns via a first type of index structure and the second secondary indexing scheme corresponding to indexing of a the first column of the set of columns via a second type of index structure less complex than the first type of index structure.

In various examples, the method further includes generating first storage-based energy consumption data for storage of any index structures for the first plurality of records via the database system. In various examples, the method further includes generating first processing-based energy consumption data that includes: first processing-based index-based energy consumption data for at least one of generating of the any index structures for the first plurality of records; or accessing the any index structures for the first plurality of records; and/or first processing-based index-free energy consumption data for directly accessing values of records of the first plurality of records. In various examples, the method further includes generating second storage-based energy consumption data for storage of any index structure for the second plurality of records via the database system. In various examples, the method further includes generating second processing-based energy consumption data that includes: second processing-based index-based energy consumption data for at least one of generating of the any index structures for the second plurality of records; or accessing the any index structures for the second plurality of records; and/or second processing-based index-free energy consumption data for directly accessing values of records of the second plurality of records. In various examples, the second secondary indexing level indicates the lower level of indexing than the first indexing level based on: the second storage-based energy consumption data indicating greater energy consumption required to store the second at least one index structure than that required to store the first at least one index structure indicated by the first storage-based energy consumption data; the second processing-based index-based energy consumption data indicating higher energy consumption required to generate the any index structures for the second plurality of records than that required to generate the any index structures for the first plurality of records indicated by the first storage-based energy consumption data; the second processing-based index-based energy consumption data indicating higher energy consumption required to access the any index structures for the second plurality of records than that required to access the any index structures for the first plurality of records indicated by the first storage-based energy consumption data; the second processing-based index-based energy consumption data indicating higher energy consumption required to access the any index structures for the second plurality of records than that required to access the any index structures for the first plurality of records indicated by the first storage-based energy consumption data; the second processing-based index-free energy consumption data indicating lower energy consumption required to directly accessing values of records of the second plurality of records than that required to directly access values of records of the first plurality of records indicated by the first storage-based energy consumption data; and/or a first difference in energy consumption between the first processing-based index-based energy consumption data and the first processing-based index-free energy consumption data indicating a larger reduction in energy consumption by implementing the any index structures than a second difference in energy consumption between the second processing-based index-based energy consumption data and the second processing-based index-free energy consumption data.

In various examples, the method further includes generating first storage vs. processing-based energy consumption trade-off data based on the first storage-based energy consumption data and the first processing-based energy consumption data, where/the first secondary indexing scheme is selected as having the first indexing level based on the storage vs. processing based energy consumption trade-off data; and/or generating second storage vs. processing-based energy consumption trade-off data based on the second storage-based energy consumption data and the second processing-based energy consumption data or the second processing-based index-free energy consumption data, where the second indexing scheme is selected as having the second indexing level based on the storage vs. processing based energy consumption trade-off data. In various examples, the second indexing level is lower than the first indexing level further based on: the first storage vs. processing based-energy consumption trade-off data favoring processing efficiency over storage efficiency and the second storage vs. processing-based energy consumption trade-off data favoring storage efficiency over processing efficiency; the first storage vs. processing based energy consumption trade-off data favoring processing efficiency over storage efficiency by a first factor greater than a second factor of favoring processing efficiency over storage efficiency indicated by the second storage vs. processing based energy consumption trade-off data; and/or the first storage vs. processing based energy consumption trade-off data favoring storage efficiency over processing efficiency by a first factor less than a second factor of favoring storage efficiency over processing efficiency indicated by the second storage vs. processing based energy consumption trade-off data.

In various examples, generating the first storage-based energy consumption data for storing the any index structures for the first plurality of records via the database system is based on first storage utilization parameters that includes and/or is based on at least one of a first size of the first plurality of records; a first set of columns of the first plurality of records; a first cardinality of at least one first column of the first plurality of records; at least one first memory type of memory resources assigned to store the any index structures for the first plurality of records; a first number of computing device nodes assigned to store the any index structures for the first plurality of records; a first duration of storage of store the any index structures for the first plurality of records; a first redundancy storage scheme utilized for storage of the any index structures for the first plurality of records; a first failure rate of the computing device nodes; and/or a first rebuilding rate of rebuilding the any index structures for the first plurality of records required for the any index structures for the first plurality of records to persist in the memory resources. In various examples, generating the second storage-based energy consumption data for storing the any index structures for the second plurality of records via the database system is based on a second storage utilization parameters that includes at least one of a second size of the second plurality of records; a second set of columns of the second plurality of records; a second cardinality of at least one first column of the second plurality of records; at least one second memory type of memory resources assigned to store the any index structures for the second plurality of records; a second number of computing device nodes assigned to store the any index structures for the second plurality of records; a second duration of storage of store the any index structures for the second plurality of records; a second redundancy storage scheme utilized for storage of the any index structures for the second plurality of records; a second failure rate of the computing device nodes; and/or a second rebuilding rate of rebuilding the any index structures for the second plurality of records required for the any index structures for the second plurality of records to persist in the memory resources. In various examples, the second indexing level is lower than the first indexing level further based on at least one of: the second size being greater than the first size; the at least one second memory type being less energy efficient than the at least one first memory type; the second number of computing devices nodes being greater than the first number of computing device nodes; the second duration being longer than the first duration; the second cardinality being higher than the first cardinality; the second redundancy storage scheme requiring more storage for parity data than the first redundancy storage scheme; the second failure rate of the computing device nodes being higher than the first failure rate; and/or the second rebuilding rate being higher than the first rebuilding rate.

In various examples, generating the first processing-based energy consumption data for storing the first data via the database system is based on first processing parameters that includes and/or is based on at least one of a first size of the first plurality of records; first processing efficiency of a first secondary index structure generation process utilized to generate the any secondary indexes for the first plurality of records; first processing efficiency of accessing the first secondary index structure; first processing efficiency of accessing the first plurality of records directly; a first query operation request rate of query operations for execution executed against at least one first relational database table that includes the first plurality of records; a first column request rate of query operations indicating access to at least one column indexed via the any index structures of the first plurality of records; first cardinality of at least one column of the first plurality of records; a first at least one estimated IO efficiency metric for filtering the first plurality of records via applying the any index structure for at least one of on average over all query requests, or when applying estimated most frequent filtering parameters appearing in query requests; and/or first memory efficiency of storing directly accessed values of the first plurality of records prior to applying any filtering predicates of a query operation. In various examples, generating the second storage-based energy consumption data for storing the second data via the database system is based on second compression processing parameters that includes at least one of a second size of the second plurality of records; second processing efficiency of a second secondary index structure generation process utilized to generate the any secondary indexes for the second plurality of records; second processing efficiency of accessing the second secondary index structure; second processing efficiency of accessing the second plurality of records directly; a second query operation request rate of query operations for execution executed against at least one first relational database table that includes the second plurality of records; a second column request rate of query operations indicating access to at least one column indexed via the any index structures of the second plurality of records; second cardinality of at least one column of the second plurality of records; a second at least one estimated IO efficiency metric for filtering the second plurality of records via applying the any index structure for at least one of on average over all query requests, or when applying estimated most frequent filtering parameters appearing in query requests; and/or second memory efficiency of storing directly accessed values of the second plurality of records prior to applying any filtering predicates of a query operation.

In various examples, the second indexing level is lower than the first indexing level further based on at least one of: the second size being smaller than the first size; the second size being larger than the first size; the second processing efficiency of the second secondary index structure generation process being lower than the first processing efficiency of the first secondary index structure generation process; the second processing efficiency of accessing the second secondary index structure being lower than the first processing efficiency of accessing the first secondary index structure; the second processing efficiency of accessing the second plurality of records directly being greater than the first processing efficiency of accessing the first secondary index structure; the second query operation request rate being lower than the first query operation request rate; the second column request rate being lower than the first column request rate; the second cardinality being higher than the first cardinality; the second at least one estimated IO efficiency metric indicating lower IO efficiency than the first estimated IO efficiency metric; and/or the second memory efficiency of storing directly accessed values being greater than the first memory efficiency of storing directly accessed values.

In various examples, the method further includes generating energy efficiency data for each of a plurality of secondary indexing scheme options. In various examples, the energy efficiency data indicates the second secondary indexing scheme has a greater energy efficiency for utilization by the database system for execution of database operations than the first secondary indexing scheme, and wherein the first secondary indexing scheme is selected in generating the first energy utilization-based secondary indexing strategy data and the second secondary indexing scheme is selected in generating the second energy utilization-based secondary indexing strategy data based on: the first energy utilization-based secondary indexing strategy data indicating a first energy efficiency level lower than a second energy efficiency level indicated by the second energy utilization-based secondary indexing strategy data; and/or the second secondary indexing scheme having the greater energy efficiency for utilization by the database system for execution of database operations than the first secondary indexing scheme.

In various examples, the method further includes determining performance efficiency data for each of the plurality of secondary indexing scheme options. In various examples, the performance efficiency data indicates the second secondary indexing scheme has a lower performance efficiency for utilization by the database system for execution of database operations than the first secondary indexing scheme. In various examples, the first energy utilization-based secondary indexing strategy data indicates a first performance efficiency level that is greater than a second performance efficiency level of the second energy utilization-based secondary indexing strategy data. In various examples, the first secondary indexing scheme is selected in generating the first energy utilization-based secondary indexing strategy data and the second secondary indexing scheme is selected in generating the second energy utilization-based secondary indexing strategy data based on: second first energy utilization-based secondary indexing strategy data indicating the second performance efficiency level that is lower than the first performance efficiency level indicated by the first energy utilization-based secondary indexing strategy data and based on the second secondary indexing scheme having the lower performance efficiency than the first secondary indexing scheme.

In various examples, the first energy utilization-based secondary indexing strategy data is generated for use in executing database operations during a first temporal period. In various examples, the second energy utilization-based secondary indexing strategy data is generated for use in executing database operations during a second temporal period. In various examples, the first energy utilization-based secondary indexing strategy data is applied to select the first secondary indexing scheme for execution of the first database operation based on determining to execute the first database operation during the first temporal period. In various examples, the second energy utilization-based secondary indexing strategy data is applied to select the second secondary indexing scheme for execution of the second database operation based on determining to execute the second database operation during the second temporal period.

In various examples, the first energy utilization-based secondary indexing strategy data indicates a first energy efficiency level for executing database operations during the first temporal period that is lower than a second energy efficiency level for executing database operations during the second temporal period indicated by the second energy utilization-based secondary indexing strategy data based on at least one of: a greater volume of database operations being requested during the second temporal period than the first temporal period; the second temporal period having greater power consumption pricing than the first temporal period; a first peak power threshold during the first temporal period being greater than a second peak power threshold during the second temporal period; first current power meter measurement data generated during the first temporal period indicating lower energy consumption than second current power meter measurement data generated during the second temporal period; the first current power meter measurement data generated during the first temporal period indicating lower peak power than the second current power meter measurement data generated during the second temporal period; the first current power meter measurement data generated during the first temporal period indicating a first current power level lower than a peak power threshold level by a first current amount greater than a second amount by which a second power level indicated by the second current power meter measurement data generated during the second temporal period falls below the peak power threshold level; historical operation execution data indicating lower amounts of database operation execution during a first cyclically occurring time frame corresponding to the first temporal period than a second cyclically occurring time frame corresponding to the second temporal period; historical energy utilization data indicating lower energy consumption during the first cyclically occurring time frame corresponding to the first temporal period than the second cyclically occurring time frame corresponding to the second temporal period; the historical energy utilization data indicating lower peak power during the first cyclically occurring time frame corresponding to the first temporal period than the second cyclically occurring time frame corresponding to the second temporal period; the historical energy utilization data for the first cyclically occurring time frame corresponding to the first temporal period indicating a first historic peak power level lower than the peak power threshold level by a first historic amount greater than a second historic amount by which a second historic peak power level indicated by the historical energy utilization data for the first cyclically occurring time frame corresponding to the first temporal period falls below the peak power threshold; and/or the first temporal period corresponding to a nighttime temporal period and the second temporal period corresponding to a daytime temporal period.

In various examples, the second temporal period begins at an end of the first temporal period. In various examples, the first energy utilization-based secondary indexing strategy data indicates a first energy efficiency level for memory usage in executing database operations during the first temporal period that is lower than a second energy efficiency level for memory usage in executing database operations during the second temporal period indicated by the second energy utilization-based secondary indexing strategy data based on transitioning from a first database-wide secondary indexing mode to a second database-wide secondary indexing mode to implement transitioning of compression by the database system from the first energy efficiency level to the second energy efficiency level.

In various examples, executing the first database operation includes generating first indexing structures for a set of records via applying the first energy utilization-based secondary indexing strategy data based on being in the first database-wide secondary indexing mode, and wherein executing the second database operation includes generating second indexing structures for the set of records to replace the first indexing structures based on reindexing the set of records via applying the second energy utilization-based secondary indexing strategy data based on transitioning to a second database-wide compression mode.

In various examples, the first energy utilization-based secondary indexing strategy data is generated for execution of the first database operation based on the first energy utilization-based operation optimizer input data indicating first operation parameter data for the first database operation. In various examples, the second energy utilization-based secondary indexing strategy data is generated for execution of the second database operation based on the second energy utilization-based operation optimizer input data indicating second operation parameter data for the second database operation.

In various examples, first operation parameter data indicates and/or is based on a first database operation type for the first database operation indicating one of a plurality of possible database operation types, where the first energy utilization-based secondary indexing strategy data is generated as a function of the first database operation type. In various examples, first operation parameter data indicates and/or is based on first operation priority data for the first database operation indicating one of a plurality of possible database operation priority values, wherein the first energy utilization-based secondary indexing strategy data is generated as a function of the first operation priority data. In various examples, first operation parameter data indicates and/or is based on a first requesting user entity for the first database operation indicating one of a plurality of possible requesting user entities, where the first energy utilization-based secondary indexing strategy data is generated as a function of the first requesting user entity. In various examples, first operation parameter data indicates and/or is based on first read size data for an amount of data read in executing the first database operation, where the first energy utilization-based secondary indexing strategy data is generated as a function of the first read size data. In various examples, first operation parameter data indicates and/or is based on first write size data for an amount of data written in executing the first database operation, where the first energy utilization-based secondary indexing strategy data is generated as a function of the first write size data. In various examples, first operation parameter data indicates and/or is based on first failure rate data indicating rate of failure in executing the first database operation requiring attempted re-execution of the first database operation, where the first energy utilization-based secondary indexing strategy data is generated as a function of the first failure rate data. In various examples, first operation parameter data indicates and/or is based on first computing device data indicating a set of computing devices involved in executing the first database operation, where the first energy utilization-based secondary indexing strategy data is generated as a function of the first computing device data.

In various examples, the first energy utilization-based secondary indexing strategy data indicates a first performance efficiency level greater than a second performance efficiency level indicated by the second energy utilization-based secondary indexing strategy data. In various examples, the first energy utilization-based secondary indexing strategy data has a first energy efficiency level for executing the first database operation that is lower than a second energy efficiency level for executing the second database operation indicated by the second energy utilization-based secondary indexing strategy data based on the first performance efficiency level for the first energy utilization-based secondary indexing strategy data being greater than the second performance efficiency level of the second energy utilization-based secondary indexing strategy data. In various examples, the first energy utilization-based secondary indexing strategy data is generated to indicate the first performance efficiency level greater than the second performance efficiency level indicated by the second energy utilization-based secondary indexing strategy data based on at least one of the first operation priority data for the first database operation indicating a greater priority value than second operation priority data for the second database;

and/or the first requesting user entity for the first database operation having a greater priority for operation execution than a second requesting user entity for the second database operation.

In various embodiments, any one or more of the various examples listed above are implemented in conjunction with performing some or all steps of FIG. 29Y. In various embodiments, any set of the various examples listed above can be implemented in tandem, for example, in conjunction with performing some or all steps of FIG. 29Y, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29Y described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29Y, for example, in conjunction with further implementing any one or more of the various examples described above.

In various embodiments, the operational instructions, when executed by the at least one processor, cause the database system to: determine a first database operation for execution; perform a secondary indexing strategy selection function based on first energy utilization-based operation optimizer input data to generate first energy utilization-based secondary indexing strategy data; select, based on the first energy utilization-based secondary indexing strategy data, a first secondary indexing scheme to execute the first database operation; utilize the first secondary indexing scheme to execute the first database operation in accordance with the first energy utilization-based secondary indexing strategy data; determine a second database operation for execution; perform the secondary indexing strategy selection function based on second energy utilization-based operation optimizer input data to generate second energy utilization-based secondary indexing strategy data, where the second energy utilization-based secondary indexing strategy data is different from the first energy utilization-based secondary indexing strategy data based on the second energy utilization-based operation optimizer input data being different from the first energy utilization-based operation optimizer input data; select, based on the second energy utilization-based secondary indexing strategy data, a second secondary indexing scheme to execute the second database operation, where the second secondary indexing scheme is different from the first secondary indexing scheme based on the second energy utilization-based secondary indexing strategy data being different from the first energy utilization-based secondary indexing strategy data; and/or utilize the second secondary indexing scheme to execute the second database operation in accordance with the second energy utilization-based secondary indexing strategy data.

FIGS. 30A-30H illustrate embodiments of a database system that implements an energy utilization-based operation limitation enforcement system 3554. Some or all features and/or functionality of the energy utilization-based operation limitation enforcement system 3554 of FIGS. 30A-30H can implement the energy utilization-based operation limitation enforcement system 3554 of FIG. 26C and/or any embodiment of the energy utilization processing system 3500 described herein. Some or all features and/or functionality of the energy utilization-based operation limitation enforcement data 3574 of FIGS. 30A-30H can implement any embodiment of energy utilization data 3510 described herein. Some or all features and/or functionality of database system 10 of FIGS. 30A-30H can implement any embodiment of database system 10 described herein.

Figure 30A:
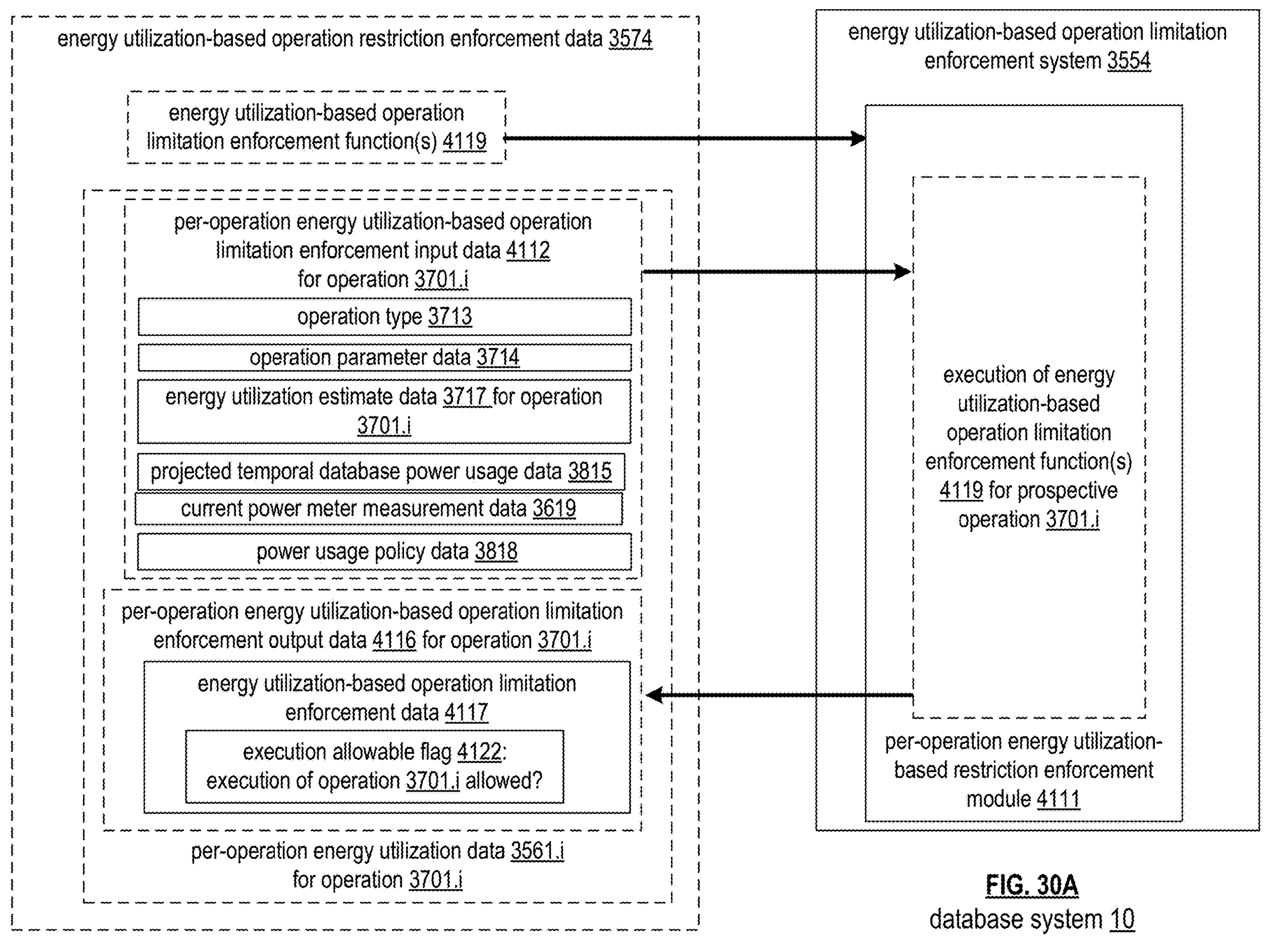
FIGS. 30A-30C are schematic block diagrams of an energy utilization-based operation limitation enforcement system in accordance with various embodiments.

FIG. 30A illustrates an embodiment of an energy utilization-based operation limitation enforcement system 3554 that implements a per-operation energy utilization-based operation limitation enforcement module 4111 that executes one or more energy utilization-based operation limitation enforcement functions 4119 to generate per-operation energy utilization-based operation limitation enforcement output data 4116 that includes energy utilization-based operation limitation enforcement data 4117 for a given database operation 3701.*i* (e.g. a prospective operation that has not yet been performed) based on per-operation energy utilization-based operation limitation enforcement input data 4112 for the given database operation 3701.*i*.

The one or more energy utilization-based operation limitation enforcement functions 4119 can be executed based on applying corresponding parameters, weights, and/or function definition(s) that are: received by energy utilization processing system 3500; accessed in memory by energy utilization processing system 3500; configured via user input by a user entity communicating with energy utilization processing system 3500; automatically generated and/or automatically updated/re-tuned over time by energy utilization processing system 3500 (e.g. via training on training data to generate a corresponding machine learning model and/or artificial intelligence (AI) model based on utilizing at least one machine learning-based training function and/or technique and/or based on utilizing at least one AI-based training function and/or technique); implemented by energy utilization processing system 3500 via artificial intelligence (e.g. based on utilizing a generative AI platform and/or other AI platform/model(s) accessible by and/or communicating with by energy utilization processing system 3500); and/or otherwise being determined by energy utilization processing system 3500. The corresponding parameters, weights, and/or function definition(s) of energy utilization-based operation limitation enforcement function(s) 4119 be configured to generate per-operation energy utilization-based operation limitation enforcement output data 4116 as a function (e.g. deterministic function) of corresponding per-operation energy utilization-based operation limitation enforcement input data 4112.

The energy utilization-based operation limitation enforcement output data 4116 for operation 3701.*i* can include energy utilization-based operation limitation enforcement data 4117 for the given operation 3701.*i*, which can indicate an execution allowable flag 4122 (e.g. corresponding Boolean value) indicating whether the operation 3701.*i* is allowed to be executed. The energy utilization-based operation limitation enforcement data 4117 can further include additional information, for example, regarding why the operation 3701.*i* is allowed/disallowed, such as parameters of input data and/or corresponding restrictions/policy that are/are not met. The energy utilization-based operation limitation enforcement data 4117 can optionally indicate options for executing other operations, scheduling execution of the operation at a later time, etc. in the case where the operation execution is disallowed.

The energy utilization-based limitation enforcement input data 4112 for operation 3701.*i* can indicate an operation type 3713 for the operation (e.g. whether the operation is a query operation 2702, ingress operation 2703, storage-formatted data generation operation 2704, rebuilding operation 2705, migration operation 2706, admin data logging operation 2707, another operation, a sub-operation of one of these operation categories, etc.). For example, the operation type 3713 indicates a value denoting an identifier for the respective operation type of operation 3701.*i*. The energy utilization-based operation limitation enforcement data 4117 can be computed by energy utilization-based operation limitation enforcement system 3554 as a function of the operation type 3713.

The energy utilization-based limitation enforcement input data 4112 for operation 3701.*i* can alternatively or additionally indicate operation parameter data 3714 further specifying factors relating to execution of the given operation, for example, that impact energy utilization in executing the operation 3701. Some or all operation parameter data 3714 can be determined prior to execution of the operation 3701, for example, as specified in configurable arguments and/or executable expression of a corresponding request to execute the operation 3701.

Operation parameter data 3714 of FIG. 30A can include any values of the example operation parameter data 3714 presented in FIG. 27D and/or the operation parameter data 3714 of FIG. 30A can be implemented in a same or similar fashion (and/or can include values for same or similar metrics) as any embodiment of operation parameter data 3714 described herein. The energy utilization-based operation limitation enforcement data 4117 can be computed by energy utilization-based operation limitation enforcement system 3554 as a function of the operation parameter data 3714.

The energy utilization-based limitation enforcement input data 4112 for operation 3701.*i* can alternatively or additionally indicate energy utilization estimate data 3717 for operation 3701.*i*, for example, generated by energy utilization estimation system 3551. The energy utilization-based operation limitation enforcement data 4117 can be computed by energy utilization-based operation limitation enforcement system 3554 as a function of the energy utilization estimate data 3717.

The energy utilization-based limitation enforcement input data 4112 for operation 3701.*i* can alternatively or additionally indicate projected database power usage data 3815. For example, the projected database power usage data 3815 is generated based on historical energy utilization data 3478 of database system 10 (e.g. historical power meter measurement data 3619) and/or projected trends of the database system 10 The one or more scheduling values 3818 of energy utilization-based operation scheduling data 3817 can be computed by energy utilization-based operation scheduling system 3552 as a function of the projected database power usage data 3815. The projected database power usage data 3815 of FIG. 29A can be implemented via some or all features or functionality of any embodiment of projected database power usage data 3815 described herein. The energy utilization-based operation limitation enforcement data 4117 can be computed by energy utilization-based operation limitation enforcement system 3554 as a function of the projected database power usage data 3815.

While not illustrated, the energy utilization-based limitation enforcement input data 4112 for operation 3701.*i* can alternatively or additionally indicate projected database condition data 3715 during execution of operation 3701.*i* (e.g. current database condition data, or database condition data projected for projected time window 3705) further specifying factors relating to the state of database system 10 at the time the operation is expected to be executed, for example, that impact energy utilization in executing the operation 3701, which can be implemented via any embodiment of projected database condition data described herein. For example, the projected database condition data 3715 includes the projected database power usage data 3815. The energy utilization-based operation limitation enforcement data 4117 can be computed by energy utilization-based operation limitation enforcement system 3554 as a function of the projected database condition data 3715.

The energy utilization-based limitation enforcement input data 4112 for operation 3701.*i* can alternatively or additionally indicate current power meter measurement data 3619, for example, utilized in determining by how much execution of operation 3701.*i* should be optimized for energy efficiency (e.g. at the expense of runtime, storage space required, and/or other performance metrics) based on current energy utilization. The energy utilization-based operation limitation enforcement data 4117 can be computed by energy utilization-based operation limitation enforcement system 3554 as a function of the current power meter measurement data 3619.

The energy utilization-based limitation enforcement input data 4112 for operation 3701.*i* can alternatively or additionally indicate power usage policy data 3818. For example, the power usage policy data 3818 can be implemented to impose restrictions on whether/when/how the corresponding operation 3701.*i* can be executed by database system 10. Adherence to such restrictions can thus impact whether the operation 3701 is allowed to be executed. The energy utilization-based operation limitation enforcement data 4117 can be computed by energy utilization-based operation limitation enforcement system 3554 as a function of the power usage policy data 3818.

While not illustrated, the energy utilization-based limitation enforcement input data 4112 for operation 3701.*i* can alternatively or additionally indicate current mode of database system-wide operation (e.g. corresponding to a database-wide power utilization mode of a plurality of different current and/or prior database-wide power utilization modes), which can indicate how/whether the database system as a whole is configured to execute operations, for example, based on being configured to attain a configured level of energy utilization and/or otherwise being configured in light of energy utilization induced. In some embodiments, the current mode of database system-wide operation cycles between multiple different mode of database system-wide operation. For example, mode of database system-wide operation is different for different cyclical temporal periods (E.g. different during nighttime vs. daytime), and/or is different for different detected conditions (e.g. when current power utilization is higher than a threshold vs. when current power utilization is lower than a threshold, etc.) Alternatively or in addition, the database system shifts to updated and further updated versions of the current mode of database system-wide operation over time (e.g. to further improve energy utilization, for example, where such updates are configured based on manual and/or automated processing of energy utilization measurement data and/or other historical energy utilization data and/or historical operation execution data to determine collected in the prior/current version to determine how further optimizations can be employed to improve energy efficiency, for example, while still achieving favorable system performance).

Figure 30B:
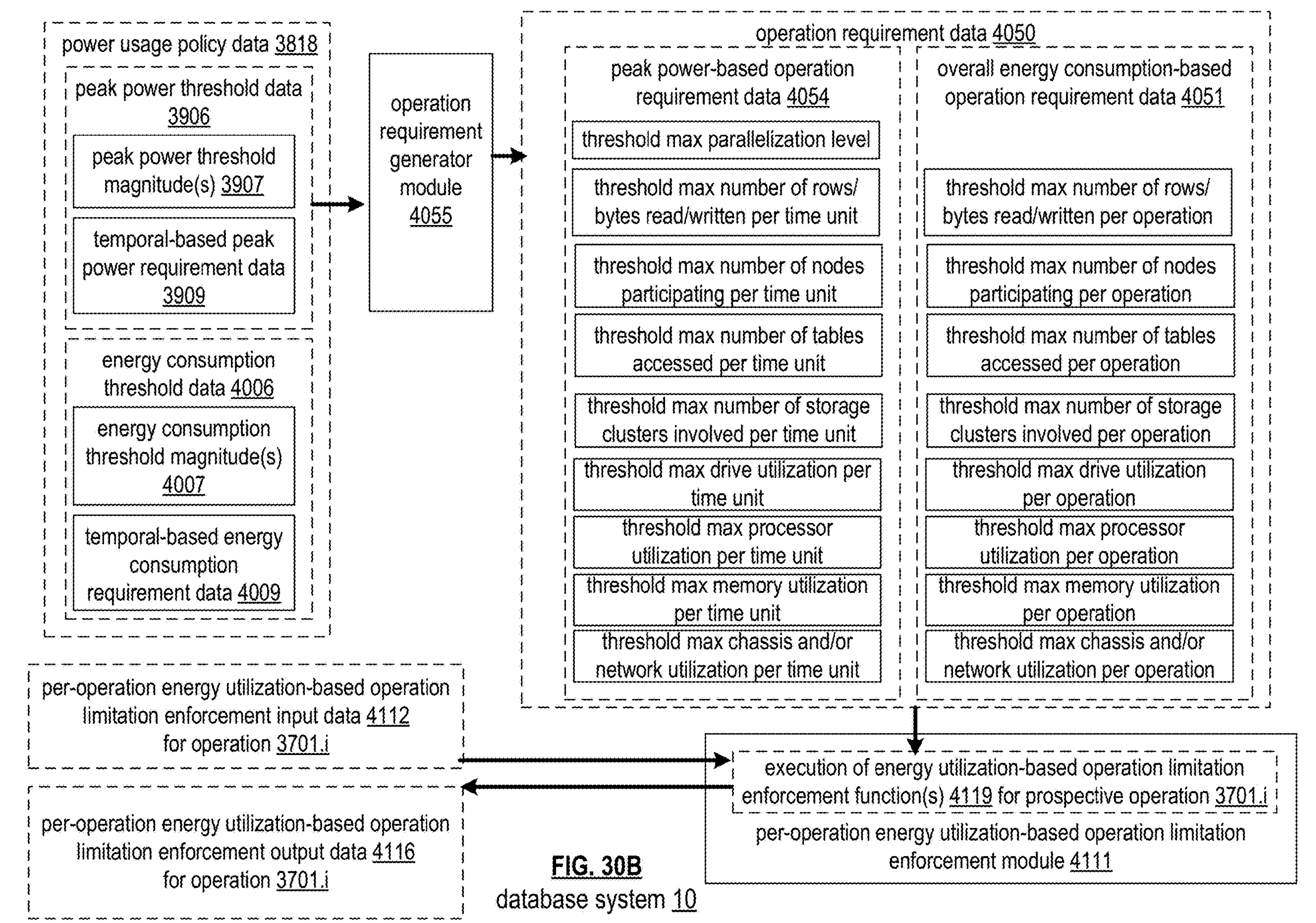

FIG. 30B illustrates an embodiment of energy utilization-based operation limitation enforcement system 3554 that generates energy utilization-based operation limitation enforcement data 4117 for operation 3701.*i* based on operation requirement data 4050. For example, the energy utilization-based operation limitation enforcement system 3554 generates energy utilization-based operation limitation enforcement data 4117 for operation 3701.*i* based on peak power-based operation requirement data 4054 and/or overall energy consumption-based operation requirement data 4051 of operation requirement data 4050. The operation requirement data of FIG. 30B can implement the operation requirement data 4050 of FIG. 29H and/or any embodiment of operation requirement data described herein.

The operation requirement data 4050 can include overall energy consumption-based operation requirement data 4051, for example, generated based on the overall energy consumption threshold data 4006. The overall energy consumption-based operation requirement data 4051 can include one or more thresholds enforced for various operations 3701 as a whole, for example, where the energy utilization-based operation limitation enforcement data 4117 for a given operation 3701.*i* is generated to indicate the operation is allowed only when execution of the given operation is known/estimated to induce corresponding overall energy utilization, such as overall energy utilization of operation energy utilization 3402 (e.g. area under the corresponding curve of FIG. 27B), is determined to meet the overall energy consumption-based operation requirement data 4051. For example, the execution allowable flag 4122 only indicates execution of the operation is allowed when its energy utilization estimate data 3717 indicates overall energy consumption for by the operation 3701.*i* meets the overall energy consumption-based operation requirement data 4051.

The operation requirement data 4050 can alternatively or additionally include peak power-based operation requirement data 4054, for example, generated based on the peak power threshold data 3906. The peak power consumption-based operation requirement data 4054 can include one or more thresholds enforced for various operations 3701 at particular discrete times (e.g. within any given time unit during execution of the operation, which can correspond to a clock cycle, short time window, etc., and/or at any instantaneous point in time), for example, where the energy utilization-based operation limitation enforcement data 4117 for a given operation 3701.*i* is generated to indicate the operation is allowed only when execution of the given operation is known/estimated to induce corresponding peak power, such as peak power of operation energy utilization 3402 (e.g. maximum value of the corresponding curve of FIG. 27B), that meets the peak power-based operation requirement data 4054. For example, the execution allowable flag 4122 only indicates execution of the operation is allowed when its energy utilization estimate data 3717 indicates overall energy consumption for by the operation 3701.*i* meets the peak power-based operation requirement data 4054.

In some embodiments, a plurality of different operation requirement data 4050 (e.g. a plurality of different overall energy utilization-based operation requirement data 4051 and/or overall peak power-based operation requirement data 4054) is generated for different possible attributes of operations 3701 (e.g. as indicated in their operation parameter data 3714 and/or other features of per-operation energy utilization-based operation scheduling input data 3812), where a corresponding one or more operation requirement data is identified to apply to a given operation 3701.*i* and is enforced in determining whether the given operation 3701.*i* is allowed to be executed.

Figure 30C:
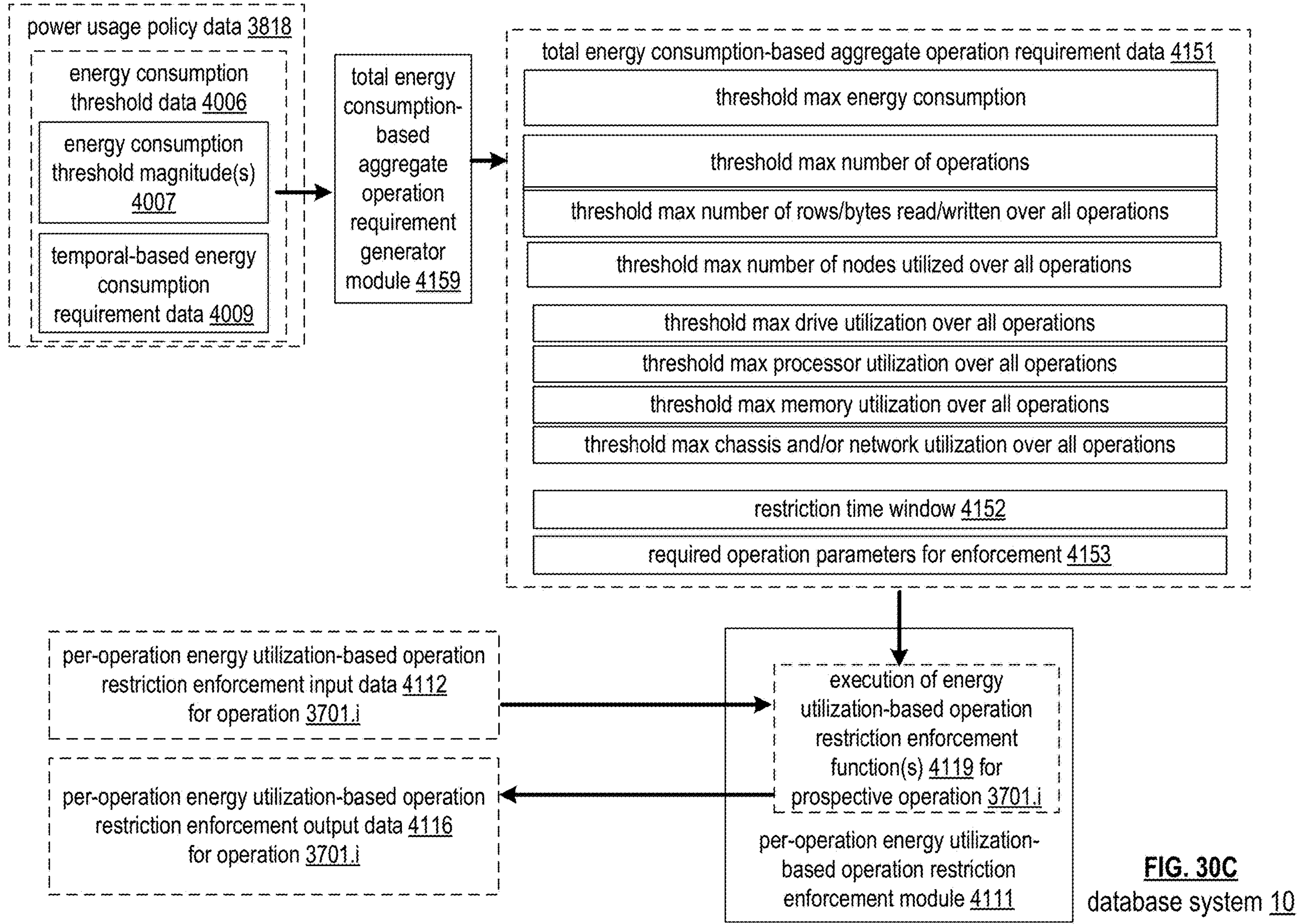

FIG. 30C illustrates an embodiment of energy utilization-based operation limitation enforcement system 3554 that generates energy utilization-based operation limitation enforcement data 4117 for operation 3701.*i* based on total energy consumption-based aggregate operation requirement data 4151.

In some embodiments, the total energy consumption-based aggregate operation requirement data 4151 is generated automatically by a total energy consumption-based aggregate operation requirement generator module 4159 (e.g. implemented by computing devices/processor and/or memory resources of energy utilization processing system 3500, optionally based on applying artificial intelligence and/or machine learning techniques), for example, based overall energy consumption threshold data 4006 (e.g. based on corresponding energy consumption threshold magnitude(s) 4007 within a particular fixed time period such as given hour/day/week/month/year, such as a single threshold magnitude or different levels of threshold magnitudes of energy consumption, for example, inducing jumps in pricing, etc., and/or based on corresponding temporal-based energy consumption requirement data 4009, such as different one or more energy consumption threshold magnitude(s) 4007 for different time frames within the fixed time period such as different hours within the day, different days within the week, different months within the year, etc.), and/or other power usage policy data 3818 (and/or based on historical energy utilization data 3476 and/or historical operation execution data 3477). The total energy consumption-based aggregate operation requirement data 4151 can alternatively or additionally be received, accessed in memory, configured via user input, and/or otherwise determined. The total energy consumption-based aggregate operation requirement data 4151 can optionally be regenerated/updated over time (e.g. in response to changing conditions/trends/requirements/policy).

The total energy consumption-based aggregate operation requirement data 4151 can include one or more thresholds enforced over aggregating corresponding metrics of all of a plurality of operations 3701 (e.g. executed within a corresponding restriction time window 4152) as a whole, for example, where the energy utilization-based operation limitation enforcement data 4117 for a given operation 3701.*i* is generated to indicate the operation is allowed only when execution of the given operation is determined to meet total energy consumption-based aggregate operation requirement data 4151 (e.g. when considered in conjunction with a plurality of previously performed operations during the restriction time window 4152).

The total energy consumption-based aggregate operation requirement data 4151 can indicate and/or be based on a restriction time window 4152 to which one or more corresponding thresholds apply. Restriction time window 4152 can be a sliding window (e.g. thresholds applied to all operations within the last hours; within the last 24 hours; etc.) and/or a cyclically occurring window (e.g. threshold applied during a given day, a given week, a given month, etc.).

In some embodiments, the total energy consumption-based aggregate operation requirement data 4151 can further indicate and/or be based on: a threshold maximum energy consumption over all operations during the restriction time window; a threshold maximum number of operations during the restriction time window; a threshold maximum number of rows and/or bytes read and/or written over all operations during the restriction time window; a threshold maximum number of nodes utilized over all operations during the restriction time window; threshold maximum drive utilization over all operations during the restriction time window; threshold maximum processor utilization over all operations during the restriction time window; threshold maximum memory utilization over all operations during the restriction time window; threshold maximum network utilization over all operations during the restriction time window; and/or other thresholds. For example, some or all thresholds of total energy consumption-based aggregate operation requirement data 4151 are configured as values selected based on, when exceeded during the restriction time window 4152, being likely to/guaranteed to/having a least a threshold probability of rendering overall energy consumption threshold data 4006 being not adhered to during the restriction time window and/or configured based on, when met during the restriction time window, being likely to/guaranteed to/having a least a threshold probability of rendering overall energy consumption threshold data 4006 being adhered to during the restriction time window.

In some embodiments, the total energy consumption-based aggregate operation requirement data 4151 can further indicate required operation parameters for enforcement 4153, where the total energy consumption-based aggregate operation requirement data 4151 is only applied/tracked for operations meeting particular requirements/having particular attributes.

Figures 30D, 30E:
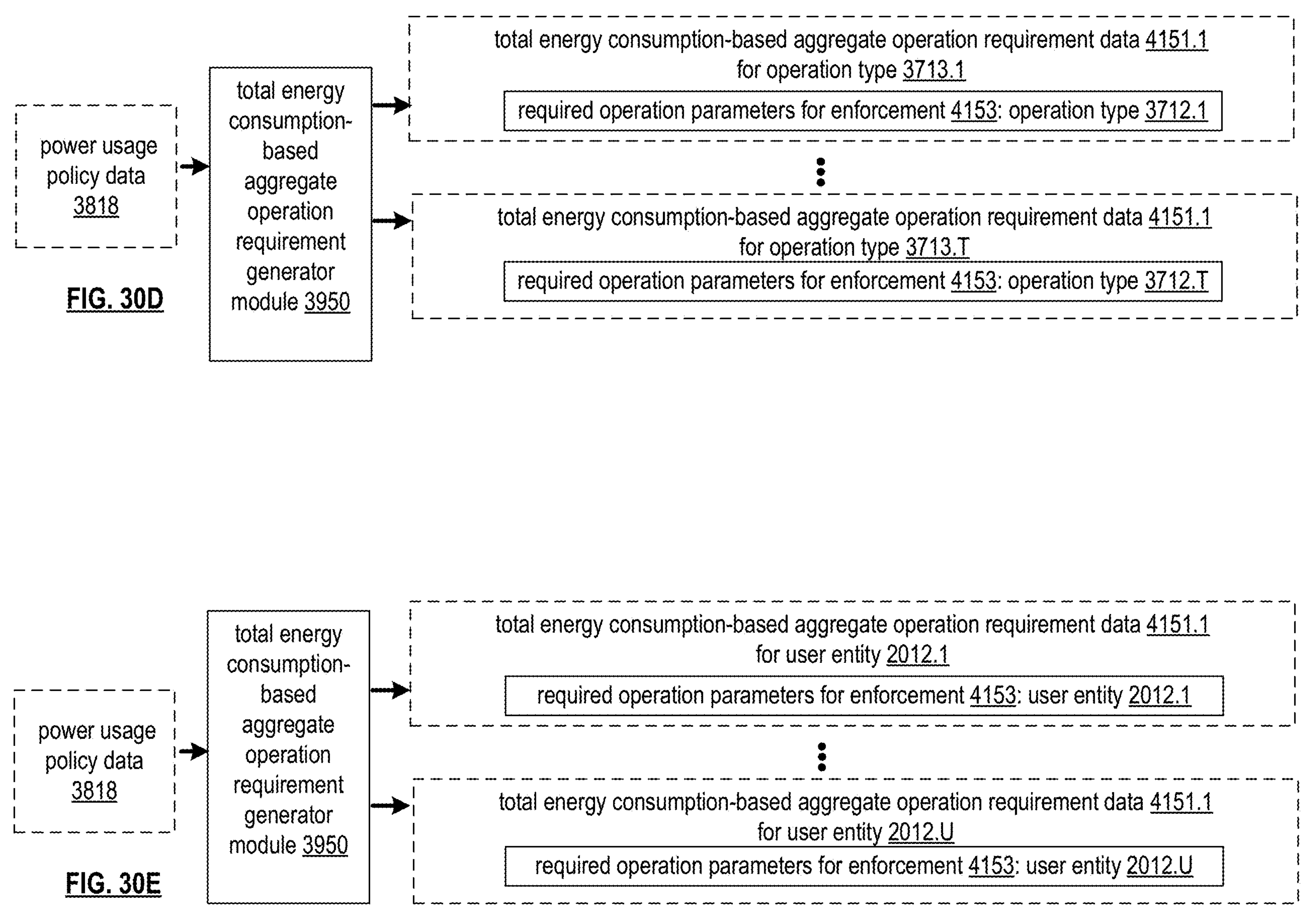
FIGS. 30D-30F are schematic block diagrams of a total energy consumption-based aggregate operation requirement generator module in accordance with various embodiments.
Figure 30F:
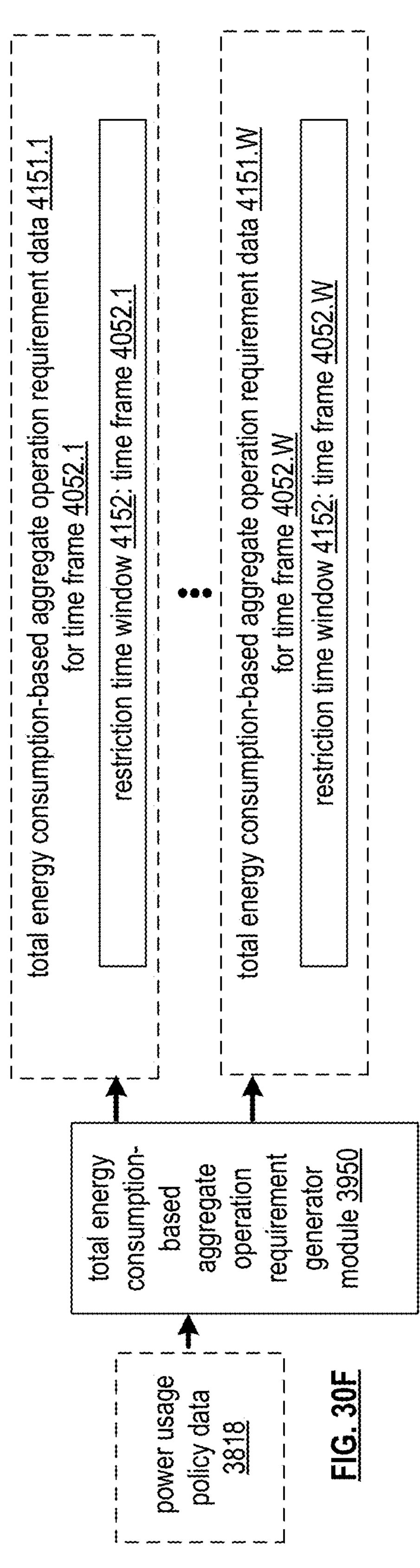

In some embodiments, a plurality of different total energy consumption-based aggregate operation requirement data 4151 is generated for different operation parameters for enforcement 4153 and/or otherwise different possible attributes of operations 3701 (e.g. as indicated in their operation parameter data 3714 and/or other features of per-operation energy utilization-based operation scheduling input data 3812), where a corresponding one or more operation requirement data is identified to apply to a given operation 3701.*i* and is enforced in determining whether the given operation 3701.*i* is allowed to be executed. FIGS. 30D-30F illustrate examples of such embodiments.

FIG. 30D illustrates an embodiment where different total energy consumption-based aggregate operation requirement data 4151 is generated for different operation types (and/or groups of operation types) 3713.1-3713.T (e.g. more queries can be executed over time than admin logging operations, etc.). This can be based on differences in how various thresholds induce energy utilization by different types of operations/sub-operations, and/or based on different operation requirement data 4050 having different types of thresholds induced by differences in operation type.

FIG. 30E illustrates an embodiment where different total energy consumption-based aggregate operation requirement data 4151 is generated for different user entities (and/or groups of user entities) 2012.1-2012.U (e.g. a first user can execute more operations per restriction time window/process more data per restriction time window than a second user, based on the first user's respective threshold(s) being looser and the second user's respective threshold(s) being stricter, etc.). This can be based on differences in priority of different users (e.g. different subscription levels to the database system, paying different amounts to a corresponding service, etc.) and/or type of user (e.g. an administrator can exe execute more operations per restriction time window/process more data per restriction time window based their respective threshold being looser, while an external user of the system may be required to adhere to stricter thresholds and process execute less operations per restriction time window/process less data per restriction time window).

FIG. 30F illustrates an embodiment where different total energy consumption-based aggregate operation requirement data 4151 is generated for different time frames (and/or groups of time frames) 4052.1-4052.W. For example, different total energy consumption-based aggregate operation requirement data 4151 is generated for different hours/portions of the day, different days/portions of the week, different months/portions of the year, etc. For example, during a first time frame 4052, more operations can be executed/more data can be processed over all operations within the time frame than in a second time frame 4052, based on the respective threshold(s) of the first time frame being looser than the respective threshold(s) of the second time frame. This can be based on differences in expected power load/peaks induced during these time frames (e.g. daytime vs nighttime having more vs. less load/power spikes); differences in pricing applied to energy consumption at different time frames (e.g. daytime vs nighttime having higher vs. lower pricing for power consumption); different known/expected power demand during these time frames; and/or different peak power threshold magnitudes 3907 at the different time frames.

Different total energy consumption-based aggregate operation requirement data 4151 can be optionally generated for other types of differences than those of FIGS. 30D-30F.

Figure 30G:
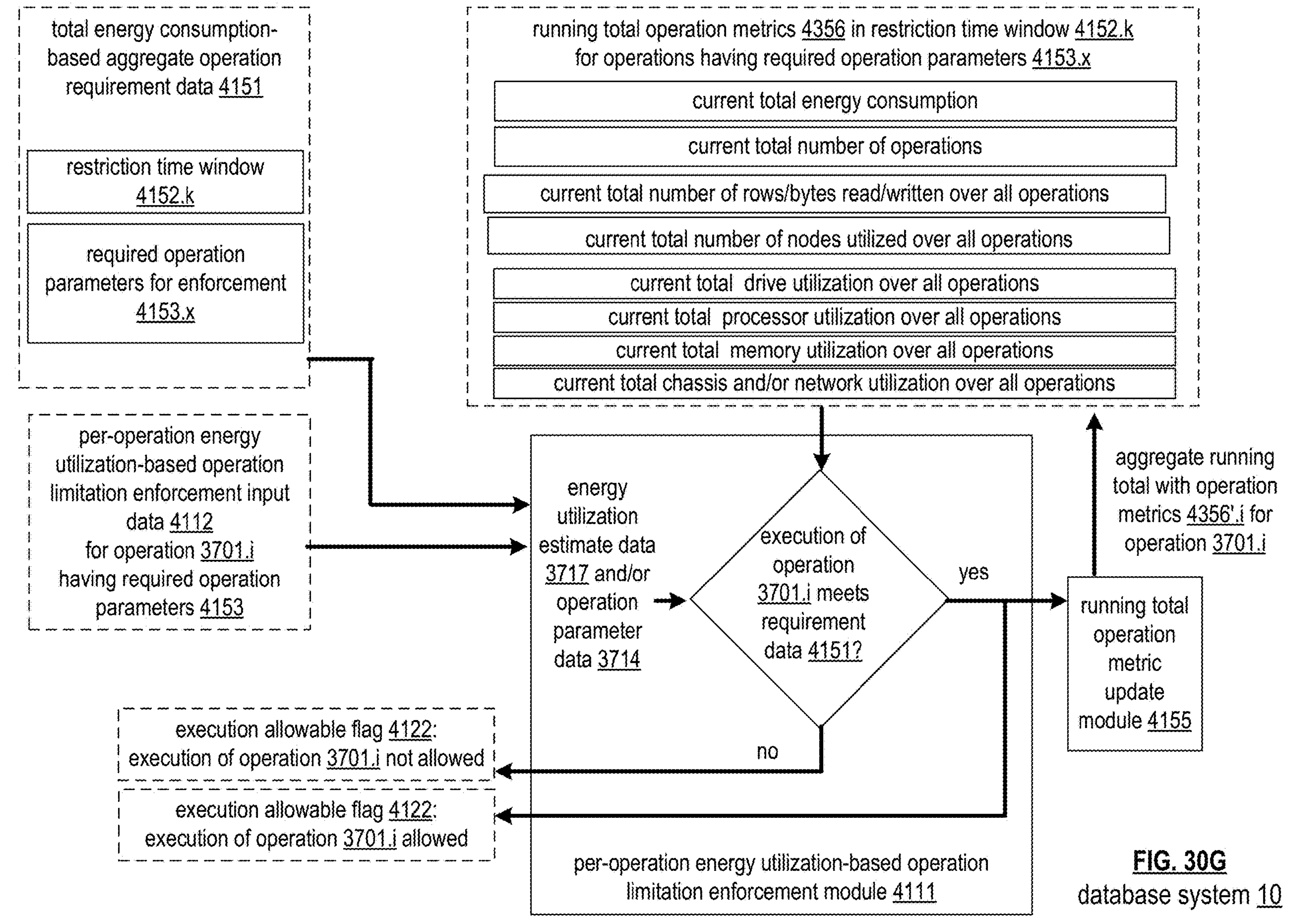
FIGS. 30G-30H are schematic block diagrams of an energy utilization-based operation limitation enforcement system in accordance with various embodiments.

FIG. 30G illustrates an embodiment where per-operation energy utilization-based operation limitation enforcement module 4111 maintains running total operation metrics 4356 within a given period of time corresponding to a given restriction time window 4152.*k* for operations having the corresponding required operation parameters 4153.*x*. This can include data tracking running totals for some or all thresholds of the total energy consumption-based aggregate operation requirement data 4151 so far during the given restriction time window 4152.*k*. The per-operation energy utilization-based operation limitation enforcement module 4111 determines whether the operation can be executed based on determining whether, if the running total operation metrics 4356 were updated in conjunction with executing the operation during the restriction time window 4152*k*, any corresponding thresholds of total energy consumption-based aggregate operation requirement data 4151 would be exceeded. This determination can correspond to known and/or estimated update to running total operation metrics 4356 as a function of energy utilization estimate data 3717 and/or operation parameter data 3714.

When the operation is allowed to be executed and is thus executed, a running total operation metric update module 4155 can update the running total operation metrics 4356 with operation metrics 4356'.i for operation 3701.*i* (e.g. as a function of its energy utilization estimate data 3717, its energy utilization measurement data measured in executing the operation 3701.*i*, and/or its operation parameter data 3714).

Figure 30H:
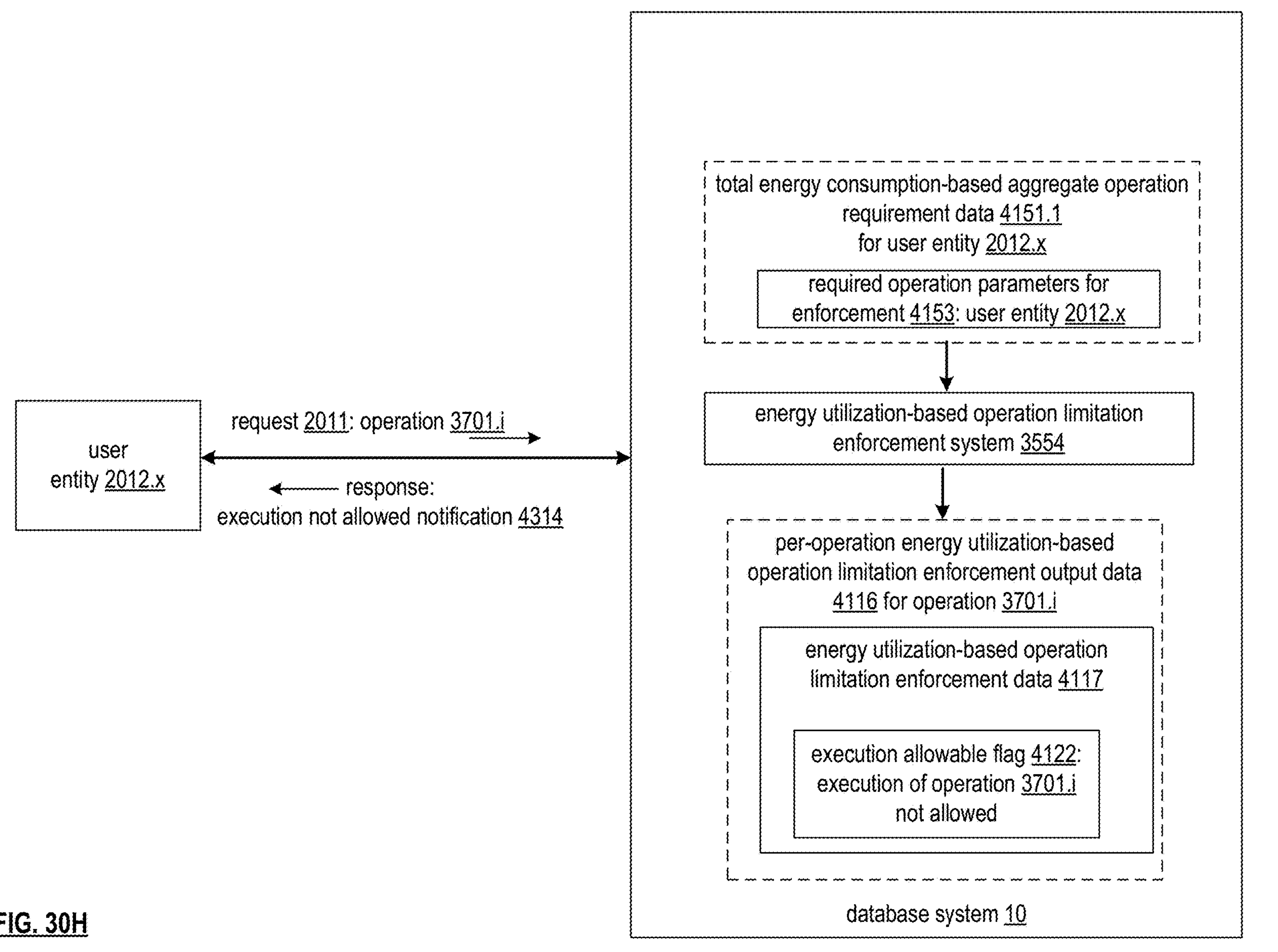

FIG. 30H illustrates an embodiment where total energy consumption-based aggregate operation requirement data 4151.1 is applied and tracked for a given user entity 2012.*x*. For example, as the given user executes operations over their restriction time window, their own running total operation metrics 4356 can be tracked. If the user requests an operation that would render exceeding any thresholds and/or otherwise not meeting total energy consumption-based aggregate operation requirement data 4151.1 within the restriction time window, they can receive a response from database system 10 in response to their request indicating execution of the operation is not allowed. Note that a given user reaching the limits of total energy consumption-based aggregate operation requirement data 4151.1 does not necessarily affect progress of other users having their own usage tracked separately, even if the same total energy consumption-based aggregate operation requirement data 4151.1 are applied (e.g. based on these different users having a same priority/subscription level, etc.).

Figure 30I:
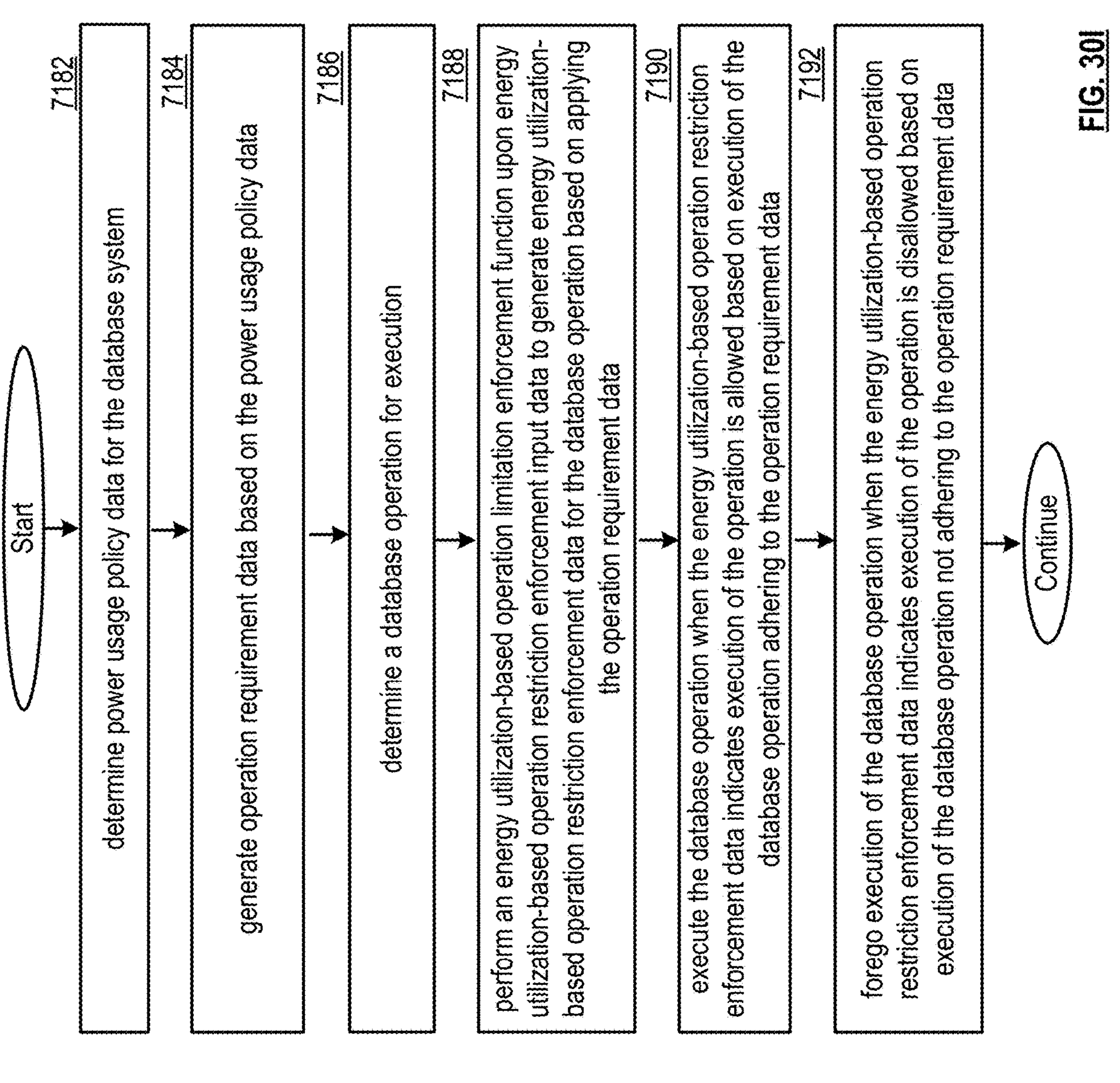
FIG. 30I is a logic diagram illustrating a method for execution in accordance with various embodiments.

FIG. 30I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30I. In some embodiments, a node 37 can implement some or all of FIG. 30I based on implementing a corresponding plurality of processing core resources 48.1-48.W. Some or all of the steps of FIG. 30I can optionally be performed by any other one or more processing modules of the database system 10. Some or all of the steps of FIG. 30I can be performed to implement some or all of the functionality of the database system 10 as described in conjunction with FIGS. 30A-30H, for example, by implementing some or all of the functionality of energy utilization-based operation limitation enforcement system 3554 and/or based on processing and/or generating energy utilization data 3510. Some or all steps of FIG. 30I can be performed by database system 10 in accordance with other embodiments of the database system 10 and/or nodes 37 discussed herein. Some or all steps of FIG. 30I can be performed by database system 10 via processing and/or generating any energy utilization data 3510 described herein. Some or all of the steps of FIG. 30I can be performed in conjunction with performing some or all steps of any other method described herein.

Step 7182 includes determining power usage policy data for the database system. Step 7184 includes generating operation requirement data based on the power usage policy data. Step 7186 includes determining a database operation for execution. Step 7188 includes performing an energy utilization-based operation limitation enforcement function upon energy utilization-based operation restriction enforcement input data to generate energy utilization-based operation restriction enforcement data for the database operation based on applying the operation requirement data. Step 7190 includes executing the database operation when the energy utilization-based operation restriction enforcement data indicates execution of the operation is allowed based on execution of the database operation adhering to the operation requirement data. Step 7192 includes foregoing execution of the database operation when the energy utilization-based operation restriction enforcement data indicates execution of the operation is disallowed based on execution of the database operation not adhering to the operation requirement data. For example, performing the method includes performing either step 7190 or step 7192, but not both, depending on whether the energy utilization-based operation restriction enforcement data indicates execution of the operation is allowed.

In various examples, the method further includes receiving an operation request from a requesting entity indicating the database operation. In various examples, determining the database operation for execution is based on receiving the operation request. In various examples, the method further includes sending operation execution result data to the requesting entity in response to executing the operation when the energy utilization-based operation restriction enforcement data indicates execution of the operation is allowed. In various examples, the method further includes sending an operation execution denied notification to the requesting entity in response to executing the operation when the energy utilization-based operation restriction enforcement data indicates execution of the operation is disallowed.

In various examples, the power usage policy data includes peak power threshold data that includes a peak power threshold magnitude for the database system. In various examples, the energy utilization-based operation restriction enforcement data indicates execution of the operation is disallowed based on determining execution of the database operation would render exceeding of the peak power threshold magnitude. In various examples, the energy utilization-based operation restriction enforcement data indicates execution of the operation is allowed based on determining execution of the database operation would not render exceeding of the peak power threshold magnitude.

In various examples, the peak power threshold data indicates a plurality of different peak power thresholds for a plurality of different time frames within a fixed cyclical time window. In various examples, the database operation is executed over a temporal period that spans multiple ones of the plurality of different time frames. In various examples, the energy utilization-based operation restriction enforcement data indicates execution of the operation is allowed based on determining execution of the database operation would render no peak power threshold magnitude for any of the multiple ones of the plurality of different time frames being exceeded during temporal period. In various examples, the energy utilization-based operation restriction enforcement data indicates execution of the operation is disallowed based on determining execution of the database operation would render no peak power threshold magnitude for at least one of the multiple ones of the plurality of different time frames being exceeded during temporal period.

In various examples, the method further includes comprising generating the peak power threshold data based on selecting the plurality of different peak power thresholds for a plurality of different time frames based on power pricing data indicating different pricing of power usage by the database system during different ones of the plurality of different time frames.

In various examples, the operation requirement data includes at least one of: peak-power-based operation requirement data generated based on peak power threshold data of the power usage policy data; and/or overall energy consumption-based operation requirement data generated based on energy consumption threshold data of the power usage policy data.

In various examples, the overall energy consumption-based operation requirement data is generated to include and/or is based on at least one of: a threshold maximum amount of data written per database operation, where the energy utilization-based operation restriction enforcement data is generated based on determining whether data to be written during execution of the database operation exceeds the threshold maximum amount of data written; a threshold maximum amount of data read per database operation, where the energy utilization-based operation restriction enforcement data is generated based on determining whether data to be read during execution of the database operation exceeds the threshold maximum amount of data read; a threshold maximum number of computing device nodes participating per database operation, where the energy utilization-based operation restriction enforcement data is generated based on determining whether a set of computing nodes to be utilized in executing the database operation exceeds the threshold maximum number of computing device nodes; a threshold maximum number of relational database tables accessed per database operation, where the energy utilization-based operation restriction enforcement data is generated based on determining whether a set of relational database tables to be accessed in executing the database operation exceeds the threshold maximum number of relational database tables; a threshold maximum number of storage clusters involved per database operation, where the energy utilization-based operation restriction enforcement data is generated based on determining whether a set of storage cluster to be involved in executing the database operation exceeds the threshold maximum number of storage clusters; a threshold maximum drive utilization per database operation, where the energy utilization-based operation restriction enforcement data is generated based on determining whether an amount of drive utilization required in executing the database operation exceeds the threshold maximum drive utilization; a threshold maximum processor utilization per database operation, where the energy utilization-based operation restriction enforcement data is generated based on determining whether an amount of processor utilization required in executing the database operation exceeds the threshold maximum processor utilization; a threshold maximum memory utilization per database operation, where the energy utilization-based operation restriction enforcement data is generated based on determining whether an amount of memory utilization required in executing the database operation exceeds the threshold maximum memory utilization; and/or a threshold maximum network utilization per database operation, where the energy utilization-based operation restriction enforcement data is generated based on determining whether an amount of network utilization required in executing the database operation exceeds the threshold maximum network utilization.

In various examples, the database operation is to be executed over a plurality of time slices of a temporal period, and wherein the peak-power-based operation requirement data is generated to include at least one of: a threshold maximum parallelization level, where the energy utilization-based operation restriction enforcement data is generated based on determining whether a level of parallelization of the database operation exceeds the threshold maximum parallelization level during any of the plurality of time slices; a threshold maximum amount of data written per time slice, where the energy utilization-based operation restriction enforcement data is generated based on determining whether data to be written for any of the plurality of time slices via execution of the database operation exceeds the threshold maximum amount of data written per time slice; a threshold maximum amount of data read per time slice, where the energy utilization-based operation restriction enforcement data is generated based on determining whether data to be read for any of the plurality of time slices via execution of the database operation exceeds the threshold maximum amount of data read per time slice; a threshold maximum number of computing device nodes participating in execution of the database operation per time slice, where the energy utilization-based operation restriction enforcement data is generated based on determining whether a set of computing nodes to be utilized in executing the database operation for any of the plurality of time slices exceeds the threshold maximum number of computing device nodes per time slice; a threshold maximum number of relational database tables accessed per time slice, where the energy utilization-based operation restriction enforcement data is generated based on determining whether a set of relational database tables to be accessed in executing the database operation for any of the plurality of time slices exceeds the threshold maximum number of relational database tables per time slice; a threshold maximum number of storage clusters involved per time slice, where the energy utilization-based operation restriction enforcement data is generated based on determining whether a set of storage cluster to be involved in executing the database operation for any of the plurality of time slices exceeds the threshold maximum number of storage clusters per time slice; a threshold maximum drive utilization per time slice, where the energy utilization-based operation restriction enforcement data is generated based on determining whether an amount of drive utilization required in executing the database operation for any of the plurality of time slices exceeds the threshold maximum drive utilization per time slice; a threshold maximum processor utilization per time slice, where the energy utilization-based operation restriction enforcement data is generated based on determining whether an amount of processor utilization required in executing the database operation for any of the plurality of time slices exceeds the threshold maximum processor utilization per time slice; a threshold maximum memory utilization per time slice, where the energy utilization-based operation restriction enforcement data is generated based on determining whether an amount of memory utilization required in executing the database operation for any of the plurality of time slices exceeds the threshold maximum memory utilization per time slice; and/or a threshold maximum network utilization per time slice, where the energy utilization-based operation restriction enforcement data is generated based on determining whether an amount of network utilization required in executing the database operation for any of the plurality of time slices exceeds the threshold maximum network utilization per time slice.

In various examples, the operation requirement data includes total energy consumption-based aggregate operation requirement data applied to a plurality of operations over a restriction time window. In various examples, performing the energy utilization-based operation limitation enforcement function is based on determining whether execution of the database operation is allowed, based on adherence to the total energy consumption-based aggregate operation requirement data, during the restriction time window after having executed a plurality of other database operations during the restriction time window.

In various examples, the method further includes maintaining running total operation metrics for operations executed within the restriction time window based on an aggregation of operation metrics determined for the plurality of other database operations that were previously executed during the restriction time window. In various examples, performing the energy utilization-based operation limitation enforcement function is based on determining whether further aggregating operation metrics for the database operation with the running total operation metrics renders adherence to the total energy consumption-based aggregate operation requirement data during the restriction time window. In various examples, the database operation is executed based on the energy utilization-based operation restriction enforcement data indicating execution of the operation is allowed, updating the running total operation metrics to include the operation metrics for the database operation based on the database operation being executed during the restriction time window.

In various examples, the method further includes, prior to execution of the database operation, performing an energy utilization estimation function for the database operation to generate corresponding energy utilization estimate data that indicates estimated operation metrics for the database operation, wherein performing the energy utilization-based operation limitation enforcement function is based on determining whether further aggregating the estimated operation metrics for the database operation with the running total operation metrics renders adherence to the total energy consumption-based aggregate operation requirement data during the restriction time window. In various examples, the method further includes, based on execution of the database operation; performing an energy utilization measurement function for the database operation to generate corresponding energy utilization estimate data that indicates actual operation metrics for the database operation, wherein the running total operation metrics are updated to include the actual operation metrics for the database operation.

In various examples, the total energy consumption-based aggregate operation requirement data is generated to include at least one of: a threshold maximum energy consumption over the restriction time window, where the energy utilization-based operation restriction enforcement data is generated based on determining whether an aggregation of estimated energy consumption for execution of the database operation with current total energy consumption indicated in the running total operation metrics exceeds the threshold maximum energy consumption; a threshold maximum number of database operations over the restriction time window, where the energy utilization-based operation restriction enforcement data is generated based on determining whether an aggregation of an additional operation with the current total number of operations consumption indicated in the running total operation metrics exceeds the threshold maximum number of database operations; a threshold maximum amount of data written over the restriction time window, where the energy utilization-based operation restriction enforcement data is generated based on determining whether an aggregation of amount of data written for execution of the database operation with current total amount of data written indicated in the running total operation metrics exceeds the threshold maximum amount of data written; a threshold maximum amount of data read over the restriction time window, where the energy utilization-based operation restriction enforcement data is generated based on determining whether an aggregation of amount of data read for execution of the database operation with current total amount of data read indicated in the running total operation metrics exceeds the threshold maximum amount of data read; a threshold maximum drive utilization over the restriction time window, where the energy utilization-based operation restriction enforcement data is generated based on determining whether an aggregation of amount of drive utilization for execution of the database operation with current total amount of drive utilization indicated in the running total operation metrics exceeds the threshold maximum drive utilization; a threshold maximum processor utilization over the restriction time window, where the energy utilization-based operation restriction enforcement data is generated based on determining whether an aggregation of amount of processor utilization for execution of the database operation with current total amount of processor utilization indicated in the running total operation metrics exceeds the threshold maximum processor utilization; a threshold maximum memory utilization over the restriction time window, where the energy utilization-based operation restriction enforcement data is generated based on determining whether an aggregation of amount of memory utilization for execution of the database operation with current total amount of memory utilization indicated in the running total operation metrics exceeds the threshold maximum memory utilization; and/or a threshold maximum network utilization over the restriction time window, where the energy utilization-based operation restriction enforcement data is generated based on determining whether an aggregation of amount of network utilization for execution of the database operation with current total amount of network utilization indicated in the running total operation metrics exceeds the threshold maximum network utilization.

In various examples, the total energy consumption-based aggregate operation requirement data is applied per user entity of a plurality of user entities of the database system. In various examples, different per-user running total operation metrics are maintained for different user entities of the plurality of user entities, wherein the database operation is requested by one user entity of the plurality of user entities, wherein performing the energy utilization-based operation limitation enforcement function is based on determining whether further aggregating operation metrics for the database operation with per-user running total database metrics maintained for the one user entity of the plurality of user entities renders adherence to the total energy consumption-based aggregate operation requirement data during the restriction time window, and wherein, when the database operation is executed based on the energy utilization-based operation restriction enforcement data indicating execution of the operation is allowed for the one user entity, updating the per-user running total operation metrics for the one user entity to include the operation metrics for the database operation based on the database operation being executed during the restriction time window for the one user entity.

In various examples, the method further includes generating a plurality of different operation requirement data for a plurality of different time frames based on the power usage policy data, wherein the database operation is executed over a temporal period that spans multiple ones of the plurality of different time frames. In various examples, performing the energy utilization-based operation limitation enforcement function is based on determining whether execution of the database operation is allowed based on adherence to each total energy consumption-based aggregate operation requirement data for each of the multiple ones of the plurality of different time frames.

In various examples, the method further includes generating a plurality of different operation requirement data for at least one of: a plurality of different user entities, a plurality of different operation types, or a plurality of different operation priorities. In various examples, one of the plurality of different operation requirement data is applied to generate the energy utilization-based operation restriction enforcement data for the database operation based on at least one of: a user entity requesting the database operation, an operation type of the database operation, or an operation priority of the database operation.

In various examples, the energy utilization-based operation restriction enforcement input data for the database operation that includes at least one of: an operation type of the database operation; operation parameter data for the database operation; projected temporal database power usage data for the database system; and/or current power meter measurement data for the database system.

In various examples, the method further includes performing an energy utilization estimation function upon operation parameter data for the database operation to generate corresponding energy utilization estimate data for the database operation. In various examples, the energy utilization-based operation restriction enforcement input data includes the energy utilization estimate data generated for the database operation.

In various examples, the database operation corresponds to one of a query operation, where executing the database operation includes generating a query resultant for a query expression; an ingress operation, where executing the database operation includes receiving a plurality of records for storage; a storage-formatted data structure generation operation, where executing the database operation includes generating a plurality of storage-formatted data structures from a corresponding plurality of records for storage; a rebuilding operation, where executing the database operation includes rebuilding a first data structure from at least one other first data structure; and/or a migration operation, where executing the database operation includes migrating at least one first data structure from storage in at least one first source location to storage in at least one first destination location.

In various embodiments, any one of more of the various examples listed above are implemented in conjunction with performing some or all steps of FIG. 30I. In various embodiments, any set of the various examples listed above can be implemented in tandem, for example, in conjunction with performing some or all steps of FIG. 30I, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30I described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30I, for example, in conjunction with further implementing any one or more of the various examples described above.

In various embodiments, the operational instructions, when executed by the at least one processor, cause the database system to: determine power usage policy data for the database system; generate operation requirement data based on the power usage policy data; determine a database operation for execution; perform an energy utilization-based operation limitation enforcement function upon energy utilization-based operation restriction enforcement input data to generate energy utilization-based operation restriction enforcement data for the database operation based on applying the operation requirement data; execute the database operation when the energy utilization-based operation restriction enforcement data indicates execution of the operation is allowed based on execution of the database operation adhering to the operation requirement data; and/or forego execution of the database operation when the energy utilization-based operation restriction enforcement data indicates execution of the operation is disallowed based on execution of the database operation not adhering to the operation requirement data.

FIGS. 31A-31F illustrate embodiments of a database system that implements an energy utilization-based pricing system 3556. Some or all features and/or functionality of the energy utilization-based operation pricing system 3556 of FIGS. 31A-31F can implement the energy utilization-based operation pricing system 3556 of FIG. 26C and/or any embodiment of the energy utilization processing system 3500 described herein. Some or all features and/or functionality of the energy utilization-based operation pricing data 3576 of FIGS. 31A-31F can implement any embodiment of energy utilization data 3510 described herein. Some or all features and/or functionality of database system 10 of FIGS. 31A-31F can implement any embodiment of database system 10 described herein.

Figure 31A:
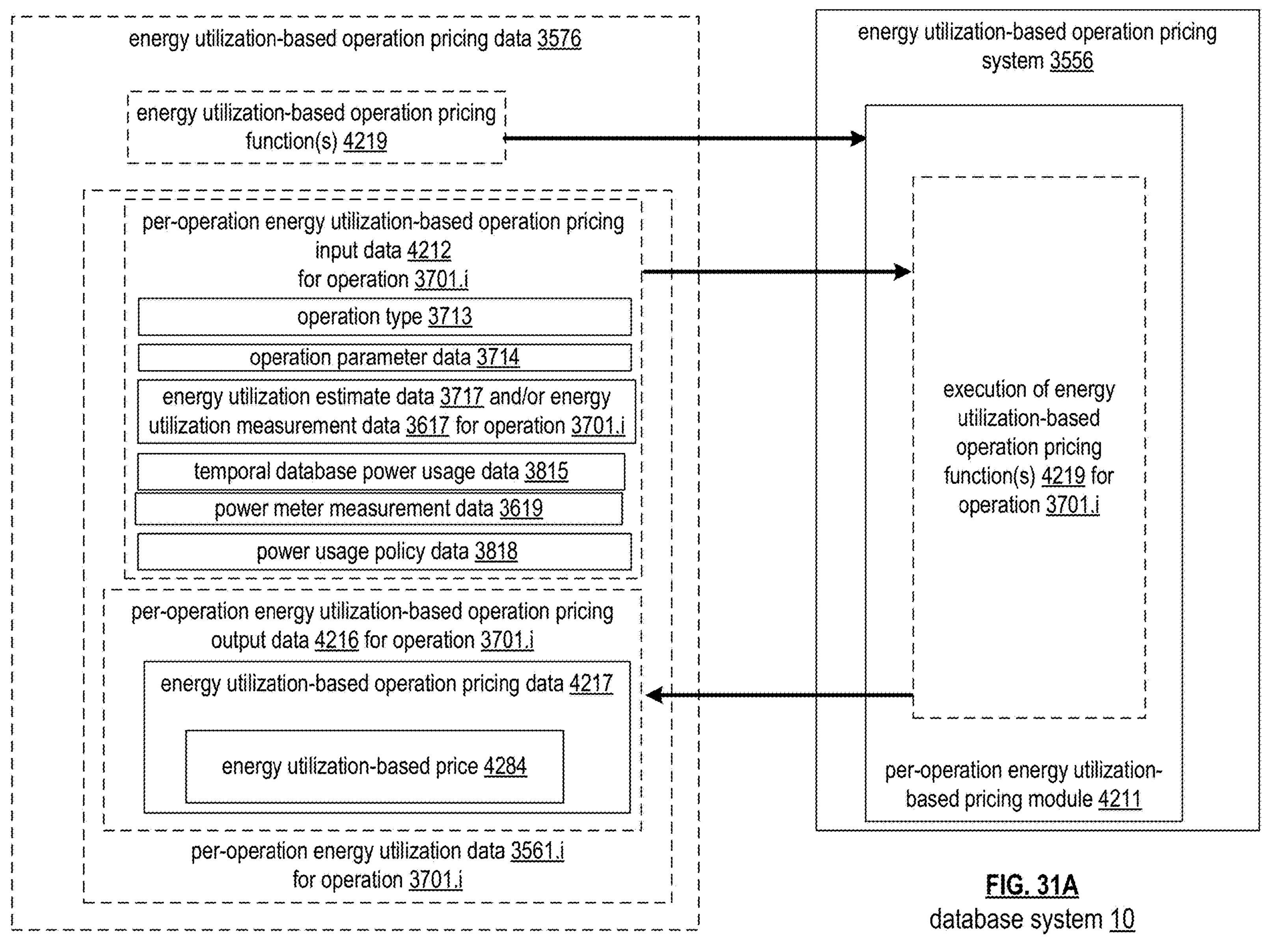
FIGS. 31A-31B are schematic block diagrams of an energy utilization-based operation pricing system in accordance with various embodiments.

FIG. 31A illustrates an embodiment of an energy utilization-based pricing system 3556 that implements a per-operation energy utilization-based operation pricing module 4211 that executes one or more energy utilization-based operation pricing functions 4219 to generate per-operation energy utilization-based operation pricing output data 4216 that includes energy utilization-based operation pricing data 4217 for a given database operation 3701.*i* (e.g. a prospective operation that has not yet been performed to price the operation in advance, and/or an operation that has already been performed to price the operation based on its execution) based on per-operation energy utilization-based operation pricing input data 4212 for the given database operation 3701.*i*.

The one or more energy utilization-based operation pricing functions 4219 can be executed based on applying corresponding parameters, weights, and/or function definition(s) that are: received by energy utilization processing system 3500; accessed in memory by energy utilization processing system 3500; configured via user input by a user entity communicating with energy utilization processing system 3500; automatically generated and/or automatically updated/re-tuned over time by energy utilization processing system 3500 (e.g. via training on training data to generate a corresponding machine learning model and/or artificial intelligence (AI) model based on utilizing at least one machine learning-based training function and/or technique and/or based on utilizing at least one AI-based training function and/or technique); implemented by energy utilization processing system 3500 via artificial intelligence (e.g. based on utilizing a generative AI platform and/or other AI platform/model(s) accessible by and/or communicating with by energy utilization processing system 3500); and/or otherwise being determined by energy utilization processing system 3500. The corresponding parameters, weights, and/or function definition(s) of energy utilization-based operation pricing function(s) 4219 be configured to generate per-operation energy utilization-based operation pricing output data 4216 as a function (e.g. deterministic function) of corresponding per-operation energy utilization-based operation pricing input data 4212.

The energy utilization-based operation pricing output data 4216 for operation 3701.*i* can include energy utilization-based operation pricing data 4217 which can indicate at least one energy utilization-based price 4284 (e.g. in dollars or other currency; in carbon offsets/carbon credits; etc.) for the given operation 3701.*i*. For example, the energy utilization-based price 4284 indicates how much a corresponding user entity will be charged (e.g. by a company/commercial entity associated with the database system 10 and/or corresponding data center) and/or an estimate for how much the corresponding user entity will be charged for the given operation if executed, and/or how much a corresponding user entity is to be charged for the given operation after having been executed. As another example, the energy utilization-based price 4284 indicates how much of a respective energy related costs charged to company/commercial entity associated with the database system 10 and/or corresponding data center (e.g. paid to a utility company supplying power, paid to a data center storing data 2711 of the database system and/or executing operations 3701; and/or paid to a regulatory entity in conjunction with enforcing energy efficiency-related fees) are known/estimated to be attributed to execution of the given operation 3701. This estimate/configured price can be a function of factors of the execution itself such as how much data was processed, how long the execution took, the time the data was executed (e.g. as a function of how much power usage there was/is projected to be at this time and/or a pricing level at this time based on cyclical power demand, such as higher pricing at daytime vs. night-time, etc.).

The energy utilization-based operation pricing data 4217 can further include additional information, for example, indicating a breakdown of how the operation 3701.*i* is priced (e.g. based on pricing of individual sub-operations, based on factors such as time of execution, corresponding power usage at that time, corresponding pricing level, etc. The energy utilization-based operation pricing data 4217 can optionally indicate options for executing the operation at various prices under different corresponding execution plans/scheduling.

In some embodiments, the energy utilization-based operation pricing system 3556 is implemented in conjunction with implementing energy utilization measurement system 3550 to price operations that have already been executed in conjunction with generating energy utilization measurement data 3617 for these operations, where energy utilization-based price 4284 generated as/based on generating measured value for total energy utilization cost 3685 and/or measured value for peak power cost 3689, for example, as a function of other measured values of energy utilization measurement data 3617.

In some embodiments, the energy utilization-based operation pricing system 3556 is implemented in conjunction with implementing energy utilization estimation system 3551 to price operations that have yet to be executed in conjunction with generating energy utilization estimate data 3717 for these operations, where energy utilization-based price 4284 generated as/based on generating estimated value for total energy utilization cost 3785 and/or estimated value for peak power cost 3789, for example, as a function of other estimated values of energy utilization measurement data 3617.

The energy utilization-based operation pricing input data 4212 for operation 3701.*i* can indicate an operation type 3713 for the operation (e.g. whether the operation is a query operation 2702, ingress operation 2703, storage-formatted data generation operation 2704, rebuilding operation 2705, migration operation 2706, admin data logging operation 2707, another operation, a sub-operation of one of these operation categories, etc.). For example, the operation type 3713 indicates a value denoting an identifier for the respective operation type of operation 3701.*i*. The energy utilization-based operation pricing data 4217 can be computed by energy utilization-based operation pricing system 3556 as a function of the operation type 3713.

The energy utilization-based operation pricing input data 4212 for operation 3701.*i* can alternatively or additionally indicate operation parameter data 3714 further specifying factors relating to execution of the given operation, for example, that impact energy utilization in executing the operation 3701. Some or all operation parameter data 3714 can be determined prior to execution of the operation 3701, for example, as specified in configurable arguments and/or executable expression of a corresponding request to execute the operation 3701.

Operation parameter data 3714 of FIG. 31A can include any values of the example operation parameter data 3714 presented in FIG. 27D and/or the operation parameter data 3714 of FIG. 31A can be implemented in a same or similar fashion (and/or can include values for same or similar metrics) as any embodiment of operation parameter data 3714 described herein. The energy utilization-based operation pricing data 4217 can be computed by energy utilization-based operation limitation enforcement system 3554 as a function of the operation parameter data 3714.

The energy utilization-based operation pricing input data 4212 for operation 3701.*i* can alternatively or additionally indicate energy utilization estimate data 3717 for operation 3701.*i*, for example, generated by energy utilization estimation system 3551. The energy utilization-based operation pricing data 4217 can be computed by energy utilization-based operation pricing system 3556 as a function of the energy utilization estimate data 3717 (e.g. energy utilization-based price 4284 is set as and/or computed as a function of estimated value for total energy utilization cost 3785 and/or estimated value for peak power cost 3789).

The energy utilization-based operation pricing input data 4212 for operation 3701.*i* can alternatively or additionally indicate energy utilization measurement data 3617 for operation 3701.*i*, for example, generated by energy utilization measurement system 3550. energy utilization-based operation pricing data 4217 can be computed by energy utilization-based operation pricing system 3556 as a function of the energy utilization measurement data 3617 (e.g. energy utilization-based price 4284 is set as and/or computed as a function of measured value for total energy utilization cost 3685 and/or measured value for peak power cost 3689).

The energy utilization-based operation pricing input data 4212 for operation 3701.*i* can alternatively or additionally indicate database power usage data 3815 that occurred/is projected to occur during execution of the operation. For example, the projected database power usage data 3815 is generated based on historical energy utilization data 3478 of database system 10 (e.g. historical power meter measurement data 3619) and/or projected trends of the database system 10 The one or more scheduling values 3818 of energy utilization-based operation scheduling data 3817 can be computed by energy utilization-based operation scheduling system 3552 as a function of the projected database power usage data 3815. The projected database power usage data 3815 of FIG. 29A can be implemented via some or all features or functionality of any embodiment of projected database power usage data 3815 described herein. The energy utilization-based operation limitation enforcement data 4117 can be computed by energy utilization-based operation limitation enforcement system 3554 as a function of the projected database power usage data 3815.

While not illustrated, the energy utilization-based operation pricing input data 4212 for operation 3701.*i* can alternatively or additionally indicate database condition data 3715 that occurred/is projected to occur during execution of operation 3701.*i* (e.g. current database condition data, or database condition data projected for projected time window 3705) further specifying factors relating to the state of database system 10 at the time the operation is expected to be executed, for example, that impact energy utilization in executing the operation 3701, which can be implemented via any embodiment of projected database condition data described herein. For example, the projected database condition data 3715 includes the projected database power usage data 3815 The energy utilization-based operation pricing data 4217 can be computed by energy utilization-based operation pricing system 3556 as a function of the projected database condition data 3715.

The energy utilization-based operation pricing input data 4212 for operation 3701.*i* can alternatively or additionally indicate power meter measurement data 3619 at the time the operation was/is projected to be executed. The energy utilization-based operation pricing data 4217 can be computed by energy utilization-based operation pricing system 3556 as a function of the current power meter measurement data 3619.

The energy utilization-based operation pricing input data 4212 for operation 3701.*i* can alternatively or additionally indicate power usage policy data 3818. For example, the power usage policy data 3818 can be implemented to impose restrictions on whether/when/how the corresponding operation 3701.*i* can be executed by database system 10. Adherence to such restrictions can thus impact whether the operation 3701 is allowed to be executed. The energy utilization-based operation pricing data 4217 can be computed by energy utilization-based operation pricing system 3556 as a function of the power usage policy data 3818.

While not illustrated, the energy utilization-based operation pricing input data 4212 for operation 3701.*i* can alternatively or additionally indicate current mode of database system-wide operation (e.g. corresponding to a database-wide power utilization mode of a plurality of different current and/or prior database-wide power utilization modes), which can indicate how/whether the database system as a whole is configured to execute operations (and/or how to price these operations accordingly), for example, based on being configured to attain a configured level of energy utilization and/or otherwise being configured in light of energy utilization induced. In some embodiments, the current mode of database system-wide operation cycles between multiple different mode of database system-wide operation. For example, mode of database system-wide operation is different for different cyclical temporal periods (E.g. different during nighttime vs. daytime), and/or is different for different detected conditions (e.g. when current power utilization is higher than a threshold vs. when current power utilization is lower than a threshold, etc.) Alternatively or in addition, the database system shifts to updated and further updated versions of the current mode of database system-wide operation over time (e.g. to further improve energy utilization, for example, where such updates are configured based on manual and/or automated processing of energy utilization measurement data and/or other historical energy utilization data and/or historical operation execution data to determine collected in the prior/current version to determine how further optimizations can be employed to improve energy efficiency, for example, while still achieving favorable system performance).

Figure 31B:
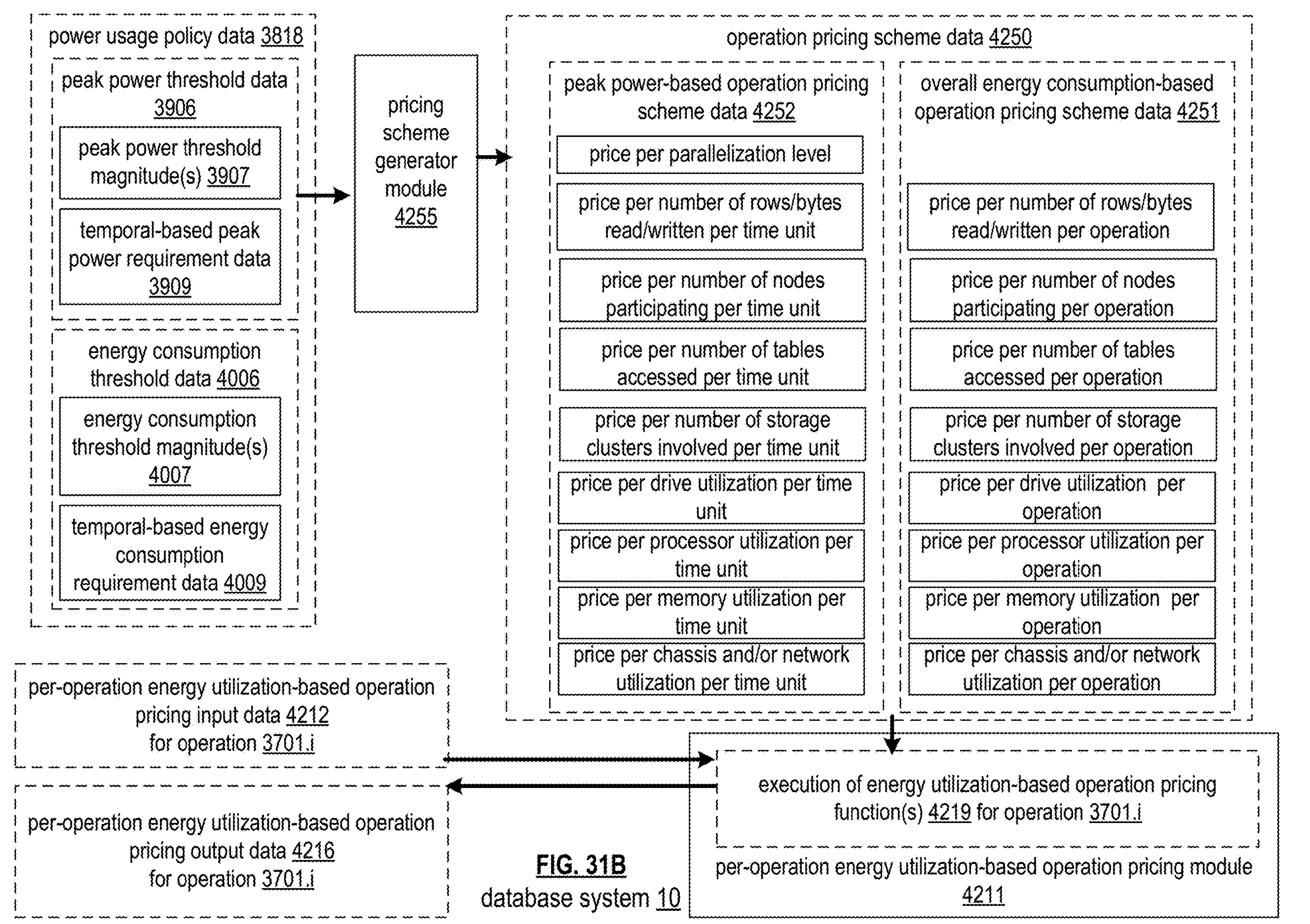

FIG. 31B illustrates an embodiment of energy utilization-based operation pricing system 3556 that generates energy utilization-based operation pricing data 4217 for operation 3701.*i* via a pricing scheme generator module 4255 based on operation pricing scheme data 4250. For example, the energy utilization-based operation pricing system 3556 generates energy utilization-based operation pricing data 4217 for operation 3701.*i* based on peak power-based operation pricing scheme data 4252 and/or overall energy consumption-based pricing scheme data 4251 of operation pricing scheme data 4250.

The operation pricing scheme data 4250 can include overall energy consumption-based pricing scheme data 4251, for example, generated based on the overall energy consumption threshold data 4006. The overall energy consumption-based pricing scheme data 4251 can indicate pricing applied for various operations 3701 as a whole, for example, where the energy utilization-based operation pricing data 4217 for a given operation 3701.*i* is generated to price the operation based on whether/within how much buffer it meets the overall energy consumption-based operation requirement data 4051 and/or corresponding energy consumption threshold data 4006 (e.g. as indicated by its energy utilization measurement data 3617, energy utilization estimate data 3717, and/or operation parameters/other input data).

The energy consumption-based pricing scheme data 4251 can indicate pricing of a given operation be applied as a linear/increasing/deterministic function of number of rows/bytes read/written for the operation (e.g. pricing is dictated per number of rows/bytes read/written per operation, or other function of number of rows/bytes read/written per operation); number of nodes participating in the operation (e.g. pricing is dictated per number of nodes participating per operation, or other function of number of nodes per operation); number of tables accessed in the operation (e.g. pricing is dictated per number of tables accessed per operation, or other function of number of tables per operation); number of storage clusters involved in the operation (e.g. pricing is dictated per number of storage clusters involved per operation, or other function of number of storage clusters per operation); drive utilization by the operation (e.g. pricing is dictated per measured/estimated unit of drive utilization involved per operation, or other function of amount of drive utilization per operation); processor utilization by the operation (e.g. pricing is dictated per measured/estimated unit of processor utilization involved per operation, or other function of amount of processor utilization per operation); memory utilization by the operation (e.g. pricing is dictated per measured/estimated unit of memory utilization involved per operation, or other function of amount of memory utilization per operation); chassis and/or network utilization by the operation (e.g. pricing is dictated per measured/estimated unit of network utilization involved per operation, or other function of amount of network utilization per operation).

The operation pricing scheme data 4250 can alternatively or additionally include peak power-based energy consumption-based pricing scheme data 4252, for example, generated based on the peak power threshold data 3906. The peak power consumption-based operation requirement data 4252 can include one or more thresholds enforced for various operations 3701 at particular discrete times (e.g. within any given time unit during execution of the operation, which can correspond to a clock cycle, short time window, etc., and/or at any instantaneous point in time), for example, where the energy utilization-based operation pricing data 4217 for a given operation 3701.*i* is generated to price the operation based on whether/within how much buffer it meets the peak power-based operation requirement data 4054 and/or corresponding peak power threshold data 3906 (e.g. as indicated by its energy utilization measurement data 3617, energy utilization estimate data 3717, and/or operation parameters/other input data).

The energy consumption-based pricing scheme data 4251 can indicate pricing of a given operation be applied as a linear/increasing/deterministic function of number of rows/bytes read/written for the operation per time unit (e.g. pricing is dictated per max/average number of rows/bytes read/written in any given time unit, or other function of number of rows/bytes read/written in one or more time units); number of nodes participating in the operation per time unit (e.g. pricing is dictated per max/average number of nodes participating in any given time unit, or other function of number of nodes in one or more time units); number of tables accessed in the operation per time unit (e.g. pricing is dictated per number of tables accessed in any given time unit, or other function of number of tables in one or more time units); number of storage clusters involved in the operation per time unit (e.g. pricing is dictated per max/average number of storage clusters involved in any given time unit, or other function of number of storage clusters in one or more time units); drive utilization by the operation per time unit (e.g. pricing is dictated per max/average measured/estimated unit of drive utilization involved in any given time unit, or other function of amount of drive utilization in one or more time units); processor utilization by the operation per time unit (e.g. pricing is dictated per max/average measured/estimated unit of processor utilization involved in any given time unit, or other function of amount of processor utilization in one or more time units); memory utilization by the operation per time unit (e.g. pricing is dictated per max/average measured/estimated unit of memory utilization involved in any given time unit, or other function of amount of memory utilization in one or more time units); chassis and/or network utilization by the operation per time unit (e.g. pricing is dictated per max/average measured/estimated unit of network utilization involved in any given time unit, or other function of amount of network utilization in one or more time units).

In some embodiments, price/pricing rate optionally jumps as a function of whether any thresholds of operation requirement data 4050, of peak power-based concurrent operation requirement data 3951, and/or of total energy consumption-based aggregate operation requirement data 4151 are exceeded/unmet in executing the corresponding operation (e.g. pricing increases as a binary function of whether or not each threshold is met vs. unmet, pricing increases when more operations are executed concurrently, pricing increases within restriction time window as more operations are executed, etc.). For example, alternatively or in addition to restricting execution of operations when such thresholds are exceeded, the energy utilization processing system 3500 can optionally be configured to induce higher pricing when these thresholds are exceeded.

In some embodiments, a plurality of different operating pricing scheme data 4250 (e.g. a plurality of different overall energy utilization-based operation pricing scheme data 4251 and/or overall peak power-based operation pricing scheme data 4254) is generated for different possible attributes of operations 3701 (e.g. as indicated in their operation parameter data 3714 and/or other features of per-operation energy utilization-based operation scheduling input data 3812), where a corresponding one or more operation pricing scheme data 4250 is identified to apply to a given operation 3701.*i* (e.g. different operation pricing scheme data 4250 has different pricing levels per operation/per unit data processed/per other attributes of the operation, as a function of this particular attribute). FIGS. 30C-30F illustrate examples of such embodiments.

FIG. 31C illustrates an embodiment where different total energy consumption-based aggregate operation requirement data 4151 is generated for different operation types (and/or groups of operation types) 3713.1-3713.T (e.g. more queries can be executed over time than admin logging operations, etc.).

FIG. 31D illustrates an embodiment where different total energy consumption-based aggregate operation requirement data 4151 is generated for different user entities (and/or groups of user entities) 2012.1-2012.U (e.g. a first user is charged less per unit data processed than a second user, based on the first user's pricing levels being lower and the second user's respective pricing levels being higher, etc.). This can be based on differences in priority of different users (e.g. different subscription levels to the database system, paying different amounts to a corresponding service, etc.) and/or type of user (e.g. an administrator can execute operations for free/cheaply, while an external user of the system may be required to pay more for their requested operations).

FIG. 31E illustrates an embodiment where different total energy consumption-based aggregate operation requirement data 4151 is generated for different operation priorities (and/or groups of operation priorities) 3814.1-3814.V (e.g. operations at a first priority are charged less per unit data processed than at a second priority based on a corresponding first user requesting operations at the first priority having a lower priority/subscription level than a corresponding second user requesting operations having the second priority; operations at a first priority are charged less per unit data processed than at a second priority based on operations at the first priority being scheduled for execution less urgently than those at the second priority based on the second priority being higher than the first priority, where pricing is optionally lower as a function of delay until execution; operations at a first priority are charged less per unit data processed than at a second priority based on operations at the first priority involving storage/access of less sensitive/less important data than those of the second priority based on the second priority being higher than the first priority; etc.). This can be based on differences in urgency, differences in type/status of requesting users, and/or importance of different operations and/or differences in importance of the underlying data being read/written.

FIG. 31F illustrates an embodiment where different total energy consumption-based aggregate operation requirement data 4151 is generated for different time frames (and/or groups of time frames) 4052.1-4052.W. For example, different total energy consumption-based aggregate operation requirement data 4151 is generated for different hours/portions of the day, different days/portions of the week, different months/portions of the year, etc. For example, during a first time frame 4052, processing data in executing operations is cheaper than processing data in executing operations in a second time frame 4052, based on the pricing levels of the first time frame being lower than the pricing levels of the second time frame. This can be based on differences in expected power load/peaks induced during these time frames (e.g. daytime vs nighttime having more vs. less load/power spikes); differences in pricing applied to energy consumption at different time frames (e.g. daytime vs nighttime having higher vs. lower pricing for power consumption to the database system/corresponding company induce corresponding higher/lower charges per operation requested by requesting users, etc.); different known/expected power demand during these time frames; and/or different peak power threshold magnitudes 3907 at the different time frames.

Different total energy consumption-based aggregate operation requirement data 4151 can be optionally generated for other types of differences than those of FIGS. 31C-31F.

Figure 31G:
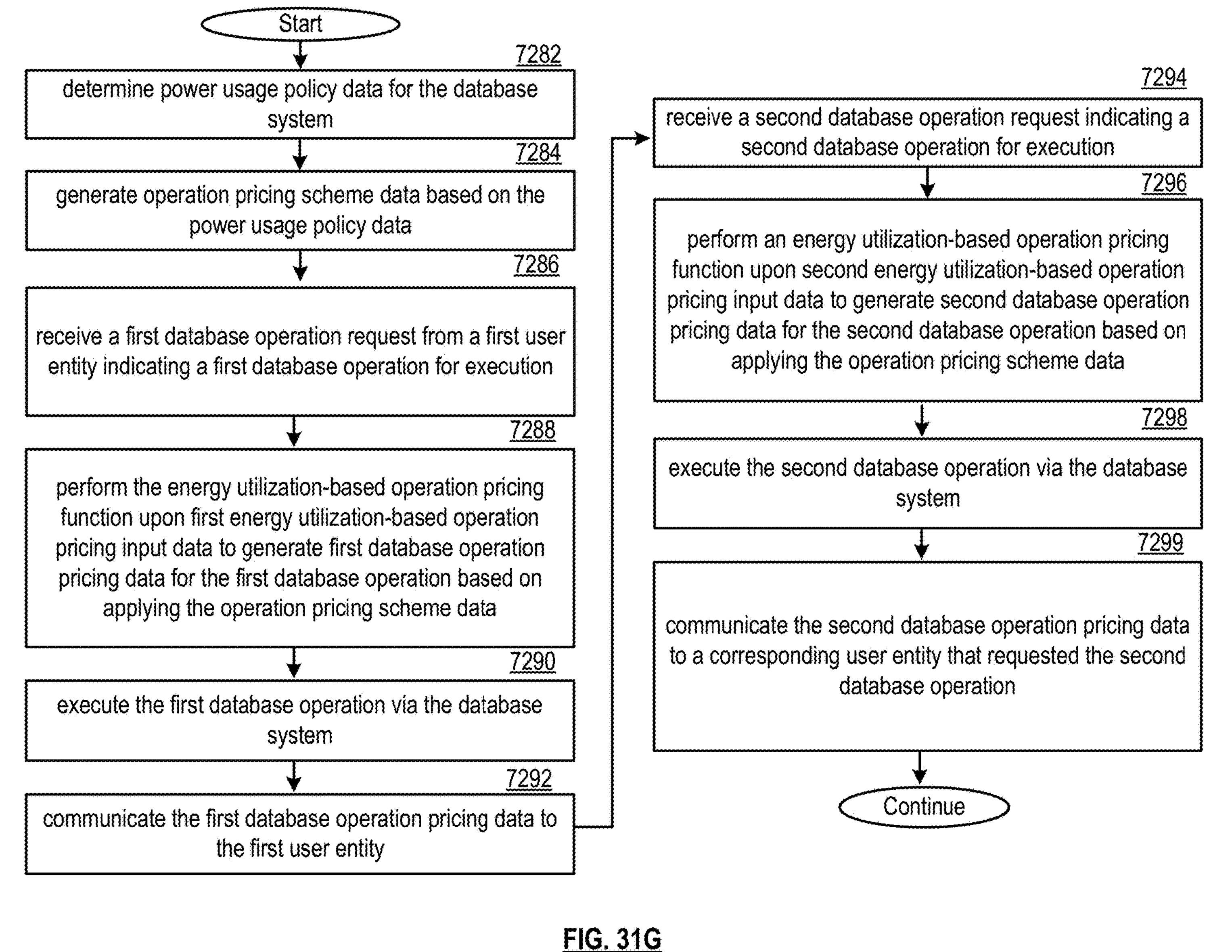
FIG. 31G is a logic diagram illustrating a method for execution in accordance with various embodiments.

FIG. 31G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31G. In some embodiments, a node 37 can implement some or all of FIG. 31G based on implementing a corresponding plurality of processing core resources 48.1-48.W. Some or all of the steps of FIG. 31G can optionally be performed by any other one or more processing modules of the database system 10. Some or all of the steps of FIG. 31G can be performed to implement some or all of the functionality of the database system 10 as described in conjunction with FIGS. 31A-31F, for example, by implementing some or all of the functionality of energy utilization-based operation pricing system 3556 and/or based on processing and/or generating energy utilization data 3510. Some or all steps of FIG. 31G can be performed by database system 10 in accordance with other embodiments of the database system 10 and/or nodes 37 discussed herein. Some or all steps of FIG. 31G can be performed by database system 10 via processing and/or generating any energy utilization data 3510 described herein. Some or all of the steps of FIG. 31G can be performed in conjunction with performing some or all steps of any other method described herein.

Step 7282 includes determining power usage policy data for the database system. Step 7284 includes generating operation pricing scheme data based on the power usage policy data. Step 7286 includes receiving a first database operation request from a first user entity indicating a first database operation for execution. Step 7288 includes performing an energy utilization-based operation pricing function upon first energy utilization-based operation pricing input data to generate first database operation pricing data for the first database operation based on applying the operation pricing scheme data. Step 7290 includes executing the first database operation via the database system. Step 7292 includes communicating the first database operation pricing data to the first user entity. Step 7294 includes receiving a second database operation request indicating a second database operation for execution. Step 7296 includes performing an energy utilization-based operation pricing function upon second energy utilization-based operation pricing input data to generate second database operation pricing data for the second database operation based on applying the operation pricing scheme data. In various examples, the first database operation pricing data indicates higher pricing than the second database operation pricing data based on the second energy utilization-based operation pricing input data being different from the first energy utilization-based operation pricing input data. Step 7298 includes executing the second database operation via the database system. Step 7299 includes communicating the second database operation pricing data to a corresponding user entity that requested the second database operation.

In various examples, the corresponding user entity that requested the second database operation is a second user entity different from the first user entity. In various examples, the second database operation pricing data is different from the first database operation pricing data based on the second user entity being different from the first user entity and based on the operation pricing scheme data indicating a plurality of different pricing schemes for a plurality of different user entities that includes the first user entity and the second user entity.

In various examples, the corresponding user entity that requested the second database operation is the first user entity. In various examples, the second database operation pricing data is different from the first database operation pricing data despite both the first database operation and the second database operation being requested by the first user entity.

In various examples, the power usage policy data includes peak power threshold data that includes a peak power threshold magnitude for the database system. In various examples, the operation pricing scheme data indicating a plurality of pricing levels. In various examples, the first database operation pricing data indicates first pricing of the first database operation at a higher pricing level of the plurality of pricing levels based on determining execution of the first database operation would render exceeding of the peak power threshold magnitude. In various examples, the second database operation pricing data indicates second pricing of the second database operation at a lower pricing level of the plurality of pricing levels based on determining execution of the second database operation would not render exceeding of the peak power threshold magnitude.

In various examples, the peak power threshold data indicates a plurality of different peak power thresholds for a plurality of different time frames within a fixed cyclical time window. In various examples, the first database operation is executed over a temporal period that spans multiple ones of the plurality of different time frames. In various examples, the operation pricing data indicates aggregation of a plurality of sub-pricing data of the first database operation for the plurality of different time frames. In various examples, a first subset of the plurality of sub-pricing data indicates at least one first pricing at at least one higher level for ones of the plurality of different time frames in which corresponding ones of the plurality of different peak power thresholds are exceeded via executing of the first database operation. In various examples, a second subset of the plurality of sub-pricing data indicates at least one second pricing at at least one lower level for ones of the plurality of different time frames in which corresponding ones of the plurality of different peak power thresholds are not exceeded via executing of the first database operation.

In various examples, the method further includes generating the peak power threshold data based on selecting the plurality of different peak power thresholds for a plurality of different time frames based on grid-based power pricing data indicating different pricing of grid-based power usage by the database system during different ones of the plurality of different time frames.

In various examples, the operation pricing scheme data includes at least one of peak power-based operation pricing scheme data generated based on peak power threshold data of the power usage policy data; and/or overall energy consumption-based operation pricing scheme data generated based on energy consumption threshold data of the power usage policy data.

In various examples, the overall energy consumption-based operation pricing scheme data is generated to indicate pricing as a function of at least one of an amount of data written per database operation; an amount of data read per database operation; a number of computing device nodes participating per database operation; a number of relational database tables accessed per database operation; a number of storage clusters involved per database operation; drive utilization per database operation; processor utilization per database operation; memory utilization per database operation; and/or network utilization per database operation. In various examples, the first database operation pricing data indicates the higher pricing than the second database operation pricing data based on at least one of the first database operation involving a greater amount of data written than the second database operation; the first database operation involving a greater amount of data read than the second database operation; the first database operation involving a greater number of computing device nodes than the second database operation; the first database operation involving a greater number of relational database tables than the second database operation; the first database operation involving a greater number of storage clusters than the second database operation; the first database operation involving a greater amount of drive utilization than the second database operation; the first database operation involving a greater amount of processor utilization than the second database operation; the first database operation involving a greater amount of memory utilization than the second database operation; and/or the first database operation involving a greater amount of network utilization than the second database operation.

In various examples, the first database operation is to be executed over a first plurality of time slices of a first temporal period. In various examples, the second database operation is to be executed over a second plurality of time slices over a second temporal period. In various examples, the peak power-based operation pricing scheme data is generated to indicate pricing as a function of at least one of parallelization level; amount of data written per time slice, amount of data read per time slice; number of computing device nodes participating per time slice; a number of relational database tables accessed per time slice, a number of storage clusters involved per time slice, a drive utilization per time slice, a processor utilization per time slice, a memory utilization per time slice; or a network utilization per time slice. In various examples, the first database operation pricing data indicates the higher pricing than the second database operation pricing data based on at least one of: a first maximum amount of data written within any time slice of the first plurality of time slices via the first database operation exceeding a second amount of data written within any time slice of the second plurality of time slices via the second database operation; a first maximum amount of data read within any time slice of the first plurality of time slices via the first database operation exceeding a second amount of data read within any time slice of the second plurality of time slices via the second database operation; a first number of computing device nodes utilized within any time slice of the first plurality of time slices via the first database operation exceeding a second number of computing device nodes utilized within any time slice of the second plurality of time slices via the second database operation; a first number of relational database tables utilized within any time slice of the first plurality of time slices via the first database operation exceeding a second number of relational database tables utilized within any time slice of the second plurality of time slices via the second database operation; a first number of storage clusters involved within any time slice of the first plurality of time slices via the first database operation exceeding a second number of number of storage clusters involved within any time slice of the second plurality of time slices via the second database operation; a first amount of drive utilization within any time slice of the first plurality of time slices via the first database operation exceeding a second amount of drive utilization within any time slice of the second plurality of time slices via the second database operation; a first amount of processor utilization within any time slice of the first plurality of time slices via the first database operation exceeding a second amount of processor utilization within any time slice of the second plurality of time slices via the second database operation; a first amount of memory utilization within any time slice of the first plurality of time slices via the first database operation exceeding a second amount of memory utilization within any time slice of the second plurality of time slices via the second database operation; and/or a first amount of network utilization within any time slice of the first plurality of time slices via the first database operation exceeding a second amount of network utilization within any time slice of the second plurality of time slices via the second database operation.

In various examples, the first database operation pricing data indicates the higher pricing than the second database operation pricing data based on applying the peak power-based operation pricing scheme data. In various examples, a first total amount of data written via the first database operation is less than a second total amount of data written via the second database operation despite the first maximum amount of data written within any time slice of the first plurality of time slices via the first database operation exceeding the second amount of data written within any time slice of the second plurality of time slices via the second database operation. In various examples, a first total amount of data read via the first database operation is less than a second total amount of data read via the second database operation despite the first maximum amount of data read within any time slice of the first plurality of time slices via the first database operation exceeding the second amount of data read within any time slice of the second plurality of time slices via the second database operation. In various examples, a first total number of computing device nodes utilized via the first database operation is less than a second total number of computing device nodes utilized via the second database operation despite the first number of computing device nodes utilized within any time slice of the first plurality of time slices via the first database operation exceeding the second number of computing device nodes utilized within any time slice of the second plurality of time slices via the second database operation. In various examples, a first total number of relational database tables accessed via the first database operation is less than a second total number of relational database tables accessed via the second database operation despite the first number of relational database tables utilized within any time slice of the first plurality of time slices via the first database operation exceeding the second number of relational database tables utilized within any time slice of the second plurality of time slices via the second database operation. In various examples, a first total number of storage clusters involved in the first database operation is less than a second total number of storage clusters involved in the second database operation despite the first number of storage clusters involved within any time slice of the first plurality of time slices via the first database operation exceeding the second number of number of storage clusters involved within any time slice of the second plurality of time slices via the second database operation. In various examples, a first total amount of drive utilization via the first database operation is less than a second total amount of drive utilization via the second database operation despite the first amount of drive utilization within any time slice of the first plurality of time slices via the first database operation exceeding the second amount of drive utilization within any time slice of the second plurality of time slices via the second database operation. In various examples, a first total amount of processor utilization via the first database operation is less than a second total amount of processor utilization via the second database operation despite the first amount of processor utilization within any time slice of the first plurality of time slices via the first database operation exceeding the second amount of processor utilization within any time slice of the second plurality of time slices via the second database operation. In various examples, a first total amount of memory utilization via the first database operation is less than a second total amount of memory utilization via the second database operation despite the first amount of memory utilization within any time slice of the first plurality of time slices via the first database operation exceeding the second amount of memory utilization within any time slice of the second plurality of time slices via the second database operation. In various examples, a first total amount of network utilization via the first database operation is less than a second total amount of network utilization via the second database operation despite the first amount of network utilization within any time slice of the first plurality of time slices via the first database operation exceeding the second amount of network utilization within any time slice of the second plurality of time slices via the second database operation.

In various examples, the method further includes generating a plurality of different operation pricing scheme data for a plurality of different temporal periods based on the power usage policy data, wherein the first database operation is executed during a first temporal period having first corresponding pricing scheme data, wherein the second database operation is executed during a second temporal period having second corresponding pricing scheme data. In various examples, the first database operation pricing data indicates higher pricing than the second database operation pricing data based on the first database operation pricing scheme data indicating higher pricing levels than the second database operation pricing scheme data.

In various examples, the first database operation and the second database operation are different instances of a same database operation. In various examples, the method further includes applying a performance efficiency-based strategy to execute the first database operation, and/or applying an energy efficiency-based strategy to execute the second database operation. In various examples, the first database operation pricing data indicates higher pricing than the second database operation pricing data based on the operation pricing scheme data indicating higher pricing for employing the performance efficiency-based strategy than the energy efficiency-based strategy.

In various examples, applying the performance efficiency-based strategy includes initiating execution of the same database operation at a first scheduled time corresponding to a first delay from a request time corresponding to receipt of the first database operation request that is less than a second delay from a second request time corresponding to receipt of the second database operation request that the same database is executed via applying the energy efficiency-based strategy. In various examples, applying the performance efficiency-based strategy includes executing of the same database operation over a first duration of time that is less than a second duration of time in which the same database is executed via applying the energy efficiency-based strategy.

In various examples, the method further includes: generating a first optimized operation execution plan for the first database operation indicating a first sub-operation execution flow for execution of the same database operation optimized for performance; and/or generating a second optimized operation execution plan for the second database operation indicating a second sub-operation execution flow for execution of the same database operation optimized for energy efficiency. In various examples, the first duration of time is less than the second duration of time based on the first database operation being executed via the first sub-operation execution flow optimized for performance and based on the second database operation being executed via the second sub-operation execution flow optimized for energy efficiency.

In various examples, the first energy utilization-based operation pricing input data for the second database operation includes at least one of a first operation type of the second database operation; first operation parameter data for the second database operation; first projected temporal database power usage data for the database system; and/or first current power meter measurement data for the database system. In various examples, the second energy utilization-based operation pricing input data for the second database operation includes at least one of: a second operation type of the second database operation; second operation parameter data for second the database operation; second projected temporal database power usage data for the database system; and/or second current power meter measurement data for the database system.

In various examples, the database system is implemented via a plurality of computing devices of a data center. In various examples, power is delivered to the plurality of computing devices via at least one power distribution system that includes at least one power monitoring module, the first current power meter measurement data is generated via the at least one power monitoring module at at least one first time for the first database operation, and/or the second current power meter measurement data is generated via the at least one power monitoring module at at least one second time for the second database operation.

In various examples, the database system is implemented via a plurality of computing devices of a data center. In various examples, power is delivered to the plurality of computing devices via at least one power distribution system that includes at least one power monitoring module. In various examples, the method further includes generating peak power trend data based on historical energy utilization data generated based on power meter measurement data generated via the at least one power monitoring module during execution of a plurality of previously executed database operations. In various examples, the peak power trend data indicates at least one of at least one cyclically occurring peak power time frame; and/or at least one peak power magnitude range. In various examples, the method further includes generating the first projected temporal database power usage data and the second projected temporal database power usage data based on the peak power trend data.

In various examples, the method further includes performing an energy utilization estimation function upon operation parameter data for the first database operation to generate corresponding energy utilization estimate data for the first database operation. In various examples, the first energy utilization-based operation pricing input data includes the corresponding energy utilization estimate data generated for the first database operation.

In various examples, the first database operation corresponds to one of a first query operation, where executing the first database operation includes generating a first query resultant for a first query expression; a first ingress operation, where executing the first database operation includes receiving a first plurality of records for storage; a first storage-formatted data structure generation operation, where executing the first database operation includes generating a plurality of storage-formatted data structures from a corresponding plurality of records for storage; a first rebuilding operation, where executing the first database operation includes rebuilding a first data structure from at least one other first data structure; and/or a first migration operation, where executing the first database operation includes migrating at least one first data structure from storage in at least one first source location to storage in at least one first destination location.

In various examples, the second database operation corresponds to one of a second query operation, where executing the first database operation includes generating a second query resultant for a second query expression; a second ingress operation, where executing the second database operation includes receiving a second plurality of records for storage; a second storage-formatted data structure generation operation, where executing the second database operation includes generating a second plurality of storage-formatted data structures from a corresponding second plurality of records for storage; a second rebuilding operation, where executing the second database operation includes rebuilding a second data structure from at least one other second data structure; and/or a second migration operation, where executing the second database operation includes migrating at least one second data structure from storage in at least one second source location to storage in at least one second destination location.

In various embodiments, any one of more of the various examples listed above are implemented in conjunction with performing some or all steps of FIG. 31G. In various embodiments, any set of the various examples listed above can be implemented in tandem, for example, in conjunction with performing some or all steps of FIG. 31G, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 31G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 31G, for example, in conjunction with further implementing any one or more of the various examples described above.

In various embodiments, the operational instructions, when executed by the at least one processor, cause the database system to: determine power usage policy data for the database system; generate operation pricing scheme data based on the power usage policy data; receive a first database operation request from a first user entity indicating a first database operation for execution; perform an energy utilization-based operation pricing function upon first energy utilization-based operation pricing input data to generate first database operation pricing data for the first database operation based on applying the operation pricing scheme data; execute the first database operation via the database system; communicate the first database operation pricing data to the first user entity; receive a second database operation request indicating a second database operation for execution; perform an energy utilization-based operation pricing function upon second energy utilization-based operation pricing input data to generate second database operation pricing data for the second database operation based on applying the operation pricing scheme data, where the first database operation pricing data indicates higher pricing than the second database operation pricing data based on the second energy utilization-based operation pricing input data being different from the first energy utilization-based operation pricing input data; execute the second database operation via the database system; and/or communicate the second database operation pricing data to a corresponding user entity that requested the second database operation.

FIGS. 32A-32F illustrate embodiments of energy utilization-based operation scheduling system 3552 and/or energy utilization-based operation optimizer system 3553 where corresponding scheduling and/or optimizing is based on selection of an execution plan option 4318 from a plurality of execution plan options 4318.1-4318.R for executing (e.g. scheduling/optimizing) a given operation 3701. Some or all features and/or functionality of the energy utilization-based operation scheduling system 3552 and/or energy utilization-based operation optimizer system 3553 of FIGS. 32A-32F can implement the energy utilization-based operation scheduling system 3552 and/or energy utilization-based operation optimizer system 3553 of FIG. 26C and/or any embodiment of the energy utilization processing system 3500 described herein. Some or all features and/or functionality of the energy utilization-based operation scheduling data 3572 and/or of energy utilization-based operation optimizer data 3573 of FIGS. 32A-32F can implement any embodiment of energy utilization data 3510 described herein. Some or all features and/or functionality of database system 10 of FIGS. 32A-32F can implement any embodiment of database system 10 described herein.

FIG. 32A illustrates an embodiment of energy utilization-based operation scheduling system 3552 and/or energy utilization-based operation optimizer system 3553 where a per-operation energy utilization-based operation execution plan option generator module 4311 executes one or more energy utilization-based operation execution option generator functions 4319 to generate per-operation energy utilization-based operation execution plan option output data 4316 that includes execution plan option data 4317 for a given database operation 3701.*i* (e.g. a prospective operation that has not yet been performed) that indicates a plurality of execution plan options 4318.1-4318.R generated based on per-operation energy utilization-based operation execution plan option generation input data 4312 for the given database operation 3701.*i*, and where an operation execution plan selection module 4321 selects one execution plan option 4318.*k* from the plurality of execution plan options 4318.1-4318.R based on applying energy utilization-based operation execution preference data 4322.

In some embodiments, the selected execution plan option 4318.*k* indicates selected energy utilization-based operation scheduling data 3817.*k* selected from a set of scheduling options, for example, where the selected execution plan option 4318.*k* is indicated in per-operation energy utilization-based operation scheduling output data 3816 generated via energy utilization-based operation scheduling system 3552 (e.g. where per-operation energy utilization-based scheduling module 3811 implements per-operation energy utilization-based operation execution plan option generator module 4311 and/or operation execution plan selection module 4321; where execution of energy utilization-based operation scheduling function(s) 3819 includes executing energy utilization-based operation execution option generator function(s) 4319; and/or where per-operation energy utilization-based operation scheduling input data 3812 includes, is based on, and is included in per-operation energy utilization-based operation execution plan option input data 4312 and/or energy utilization operation execution preference data 4322).

In some embodiments, the selected execution plan option 4318.*k* indicates selected optimized energy utilization-based operation plan data 3917.*k* selected from a set of plan options, for example, where the selected execution plan option 4318.*k* is indicated in per-operation energy utilization-based operation optimizer output data 3916 generated via energy utilization-based operation optimizer system 3553 (e.g. where per-operation energy utilization-based optimizer module 3911 implements per-operation energy utilization-based operation execution plan option generator module 4311 and/or operation execution plan selection module 4321; where execution of energy utilization-based operation optimizer function(s) 3919 includes executing energy utilization-based operation execution option generator function(s) 4319; and/or where per-operation energy utilization-based operation optimizer input data 3912 includes, is based on, and is included in per-operation energy utilization-based operation execution plan option input data 4312 and/or energy utilization operation execution preference data 4322).

Figure 32B:
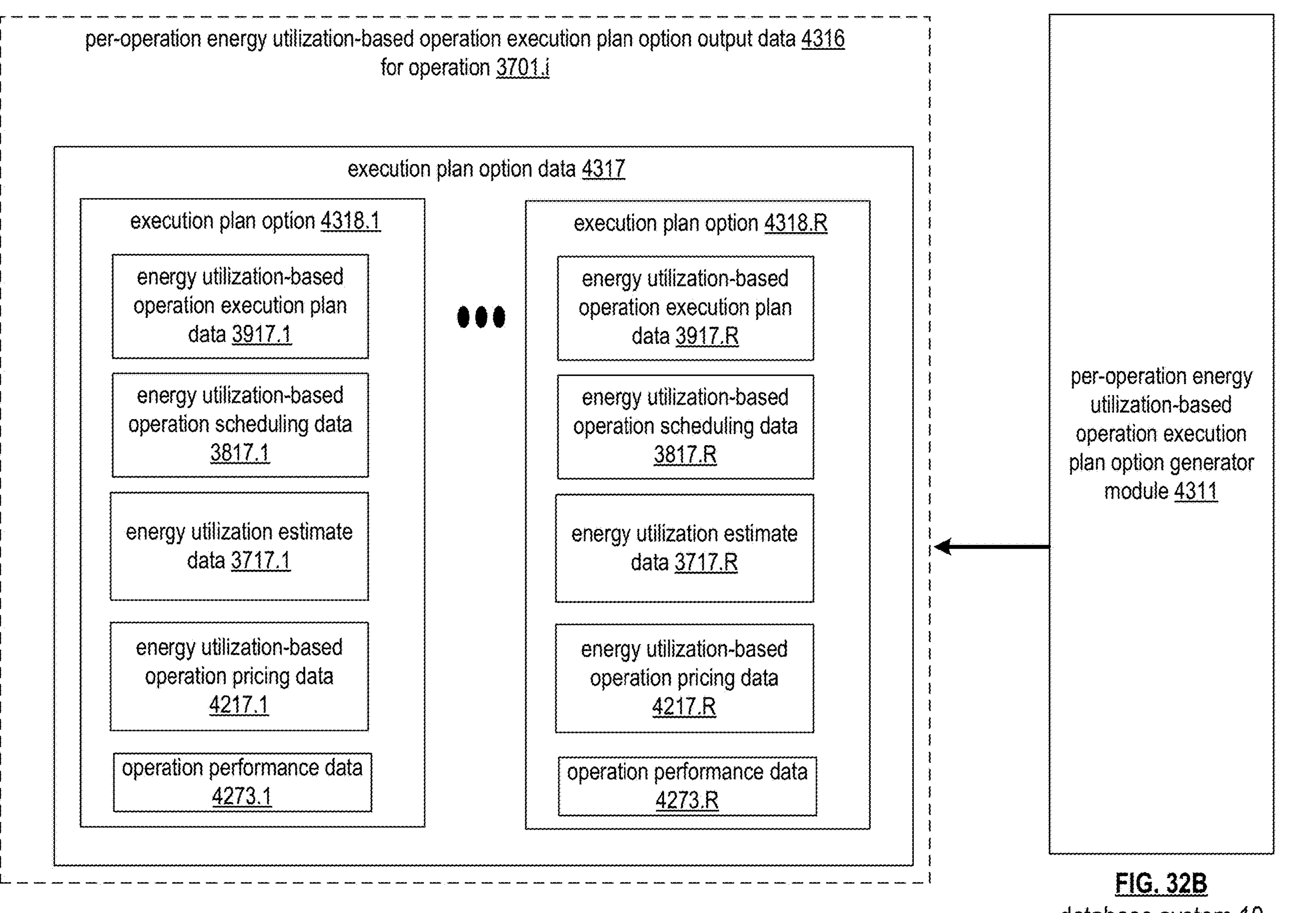
FIGS. 32B-32C are schematic block diagrams of a per-operation energy utilization-based operation execution plan option generator module in accordance with various embodiments.

FIG. 32B illustrates an example embodiment of execution plan option data 4317.

Each execution plan option 4318 can indicate and/or be based on one or more values of energy utilization-based operation execution plan data 3917 for the respective execution option plan data 4318, where a plurality of different energy utilization-based operation execution plan data 3917.1-3917.R corresponding to the R different plans 4318.1-4318.R are generated (e.g. different sub-operations/different arrangements of sub-operations, and/or other differences, for example, based on being optimized via different factors/different weights assigned to different factors, and/or based on generating a plurality of valid, semantically equivalent options for executing the given operation), for example, based on performing energy utilization-based operation optimizer function(s) 3919 and/or based on implementing energy utilization-based operation optimizer system 3553.

Each execution plan option 4318 can alternatively or additionally indicate and/or be based on one or more values of energy utilization-based operation scheduling data 3817 for the respective execution option plan data 4318, where a plurality of different energy utilization-based operation scheduling data 3817.1-3817.R corresponding to the plurality of different plans 4318.1-4318.R are generated (e.g. based on indicating selection of different times for execution and/or assignment to different resources for execution, for example, selected based on different factors/different weights assigned to different factors), for example, based on performing energy utilization-based operation scheduling function(s) 3819 and/or based on implementing energy utilization-based operation scheduling system 3552.

Alternatively or in addition to indicating the parameters defining when/how the respective operation be executed under the respective plan option 4318, each execution plan option 4318 can further indicate ramifications of executing the respective plan, such as the respective energy utilization, price, and/or performance.

For example, each execution plan option 4318 can further indicate and/or be based on one or more values of energy utilization estimate data 3717 for the respective execution option plan data 4318, where a plurality of different energy utilization estimate data 3717.1-3717.R corresponding to the plurality of different plans 4318.1-4318.R are generated (e.g. each generated as a function of the energy utilization-based operation scheduling data 3817 and/or energy utilization-based operation execution plan data 3917 of the respective plan 4318), for example, based on performing energy utilization estimate function(s) 3719 and/or based on implementing energy utilization estimation system 3551.

As another example, each execution plan option 4318 can alternatively or additionally further indicate and/or be based on one or more values of energy utilization-based operation pricing data 4217 for the respective execution option plan data 4318, where a plurality of different energy utilization-based operation pricing data 4217.1-4217.R corresponding to the plurality of different plans 4318.1-4318.R are generated (e.g. each generated as a function of the energy utilization-based operation scheduling data 3817, energy utilization-based operation execution plan data 3917 of the respective plan 4318, and/or energy utilization estimate data 3717 of the respective plan 4318), for example, based on performing energy utilization-based operation pricing function(s) 4219 and/or based on implementing energy utilization-based operation pricing system 3556.

As another example, each execution plan option 4318 can alternatively or additionally further indicate and/or be based on one or more values of operation performance data 4273 (e.g. one or more values for any performance metrics described herein) for the respective execution option plan data 4318, where a plurality of different operation performance data 4273.1-4273.R corresponding to the plurality of different plans 4318.1-4318.R are generated (e.g. each generated as a function of the energy utilization-based operation scheduling data 3817 and/or energy utilization-based operation execution plan data 3917 of the respective plan 4318).

Figure 32C:
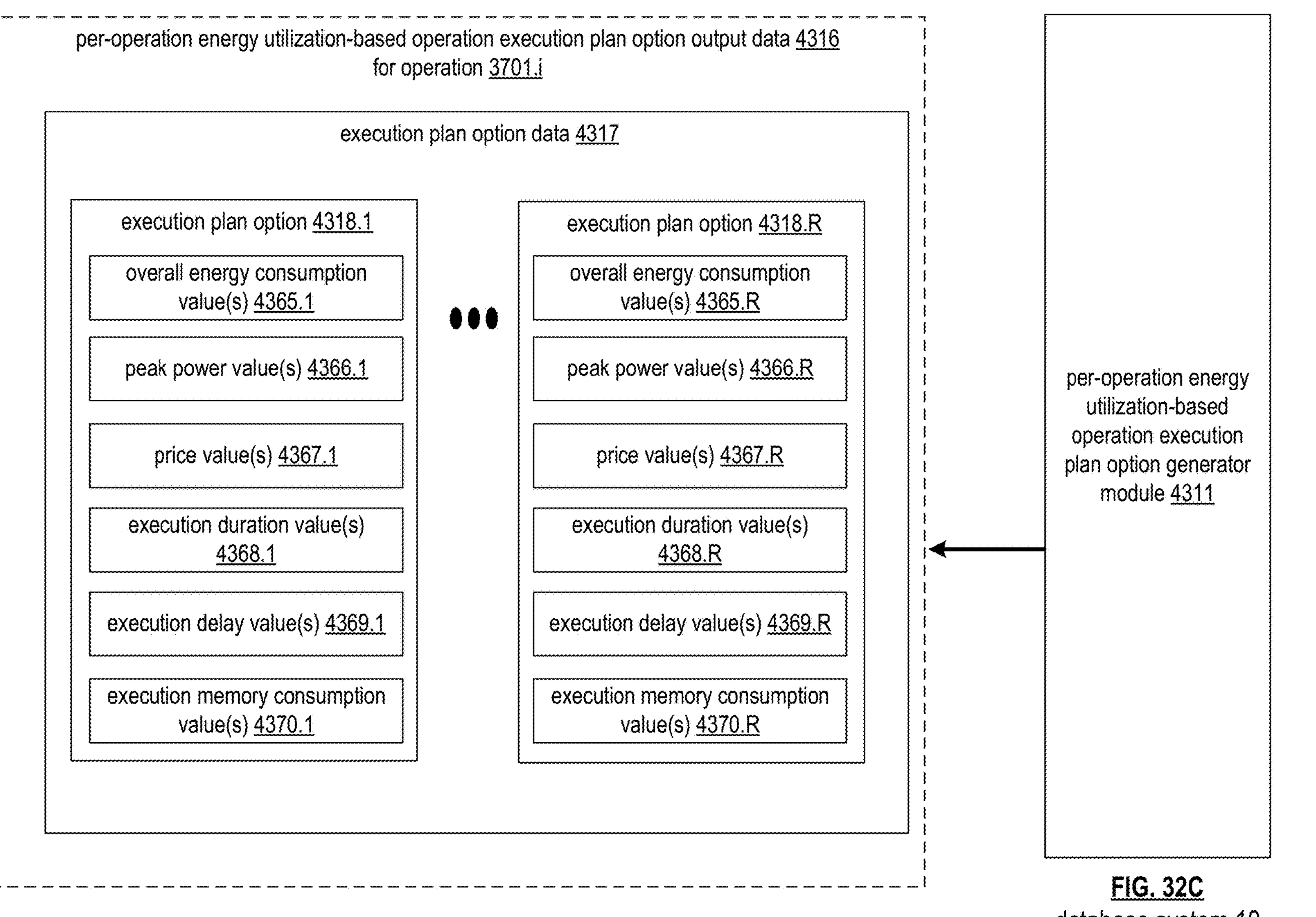

FIG. 32C illustrates another example embodiment of execution plan option data 4317. Some or all features of execution plan option data 4317 of FIG. 32C can be implemented alternatively or in addition to some or all features of execution plan option data 4317 of FIG. 32B.

Each execution plan option 4318 can indicate one or more overall energy consumption values 4365 (e.g. for the operation as a whole, for different types of resources, for different sub-operations, etc.) for the respective execution option plan data 4318, where a plurality of different overall energy consumption values 4365.1-4365.R corresponding to the R different plans 4318.1-4318.R are determined. For example, the one or more overall energy consumption values 4365 for each execution plan option 4318 can be generated/determined in conjunction with generating energy utilization estimate data 3717 for each respective execution plan option 4318 (e.g. overall energy consumption values 4365 indicate/are based on total energy utilization estimate data 3780).

Each execution plan option 4318 can alternatively or additionally indicate one or more peak power values 4366 (e.g. for the operation as a whole, for different types of resources, for different sub-operations, etc.) for the respective execution option plan data 4318, where a plurality of different peak power values 4366.1-4366.R corresponding to the R different plans 4318.1-4318.R are determined. For example, the one or more peak power values 4366 for each execution plan option 4318 can be generated/determined in conjunction with generating energy utilization estimate data 3717 for each respective execution plan option 4318 (e.g. peak power values 4366 indicate/are based on peak power estimate data 3781).

Each execution plan option 4318 can alternatively or additionally indicate one or more price values 4367 (e.g. for the operation as a whole, for different types of resources, for different sub-operations, etc.) for the respective execution option plan data 4318, where a plurality of different price values 4367.1-4367.R corresponding to the R different plans 4318.1-4318.R are determined. For example, the one or more price values 4367 for each execution plan option 4318 can be generated/determined in conjunction with generating energy utilization-based operation pricing data 4217 for each respective execution plan option 4318 (e.g. peak power values 4366 indicate/are based on energy utilization-based price 4284).

Each execution plan option 4318 can alternatively or additionally indicate one or more execution duration values 4368 (e.g. indicating how long execution is known/estimated to take from start to finish, for example, for the operation as a whole, for different types of resources, for different sub-operations, a respective estimated range for duration, etc.) for the respective execution option plan data 4318, where a plurality of different execution duration values 4368.1-4368.R corresponding to the R different plans 4318.1-4318.R are determined. For example, the one or more execution duration values 4368 for each execution plan option 4318 can be generated/determined in conjunction with generating operation performance data 4273 for each respective execution plan option 4318.

Each execution plan option 4318 can alternatively or additionally indicate one or more execution delay values 4369 (e.g. indicating how long from a current time/requested time until execution will initiate, for example, for the operation as a whole, for different types of resources, for different sub-operations, a respective estimated range for delay, etc.) for the respective execution option plan data 4318, where a plurality of different execution delay values 4369.1-4369.R corresponding to the R different plans 4318.1-4318.R are determined. For example, the one or more execution delay values 4369 for each execution plan option 4318 can be generated/determined in conjunction with generating operation performance data 4273 for each respective execution plan option 4318.

Each execution plan option 4318 can alternatively or additionally indicate one or more execution memory consumption values 4370 (e.g. indicating how much memory will be consumed in executing the respective operation, for example, for the operation as a whole, for different types of memory resources, for different sub-operations, a respective estimated range for memory consumption, a length of time the respective memory will be consumed, etc.) for the respective execution option plan data 4318, where a plurality of different execution memory consumption values 4370.1-4370.R corresponding to the R different plans 4318.1-4318.R are determined. For example, the one or more execution memory consumption values 4370 for each execution plan option 4318 can be generated/determined in conjunction with generating operation performance data 4273 for each respective execution plan option 4318.

Figure 32D:
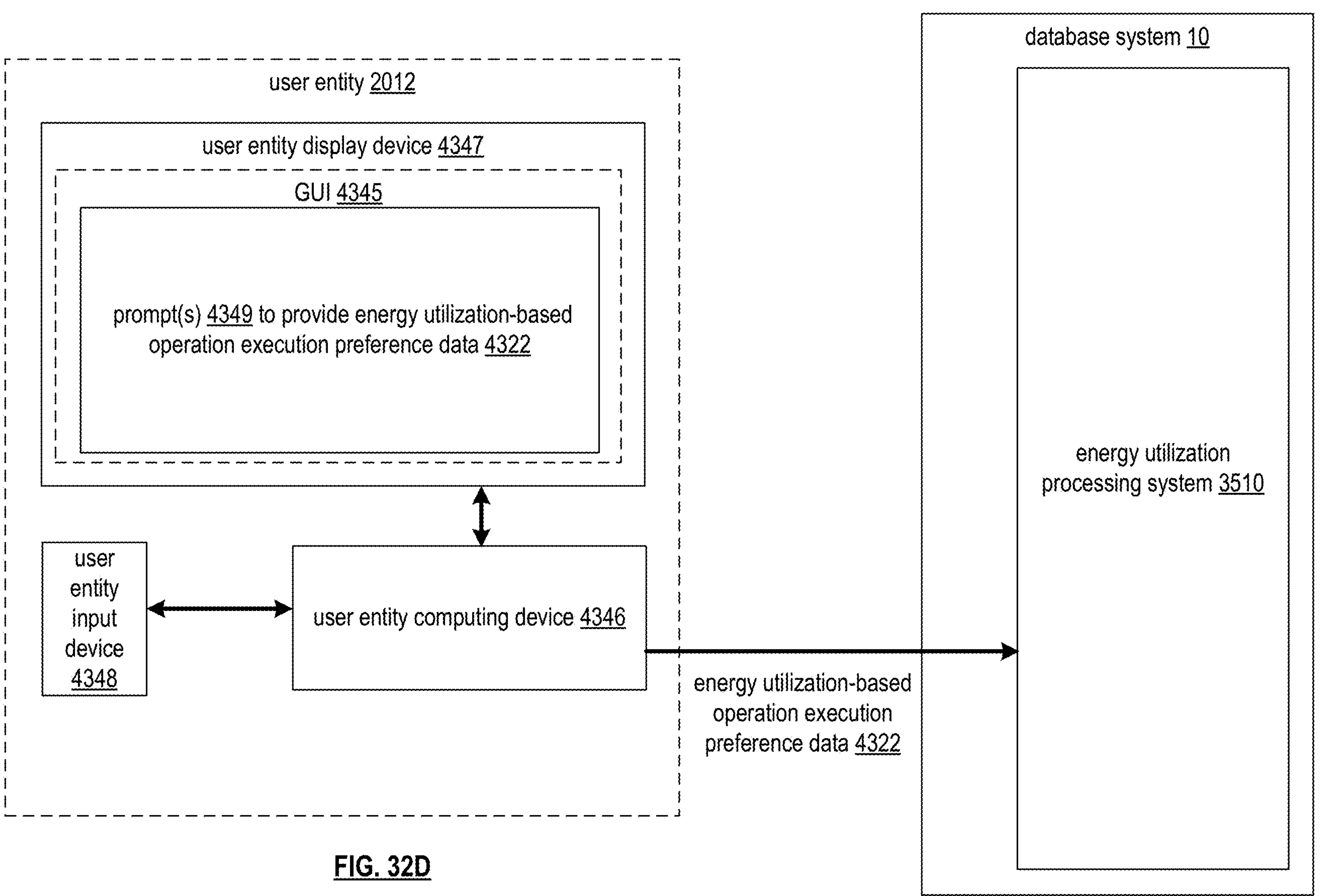
FIGS. 32D-32E are schematic block diagrams of a database system 10 communicating with a user entity computing device in accordance with various embodiments.

FIG. 32D illustrates an embodiment of database system 10 where energy utilization-based operation execution preference data 4322 is configured via user entity 2012 and sent to the database system 10 for processing via energy utilization processing system 3510 by a corresponding user entity computing device 4346. For example, the user entity 2012 configures the energy utilization-based operation execution preference data 4322 based on user input to a user entity input device 4348 coupled to/communicating with user entity computing device 4346, for example, in response to one or more prompts 4349 to provide the energy utilization-based operation execution preference data 4322 presented via a graphical user interface displayed by a user entity display device 4347 coupled to/communicating with user entity computing device 4346.

Figure 32E:
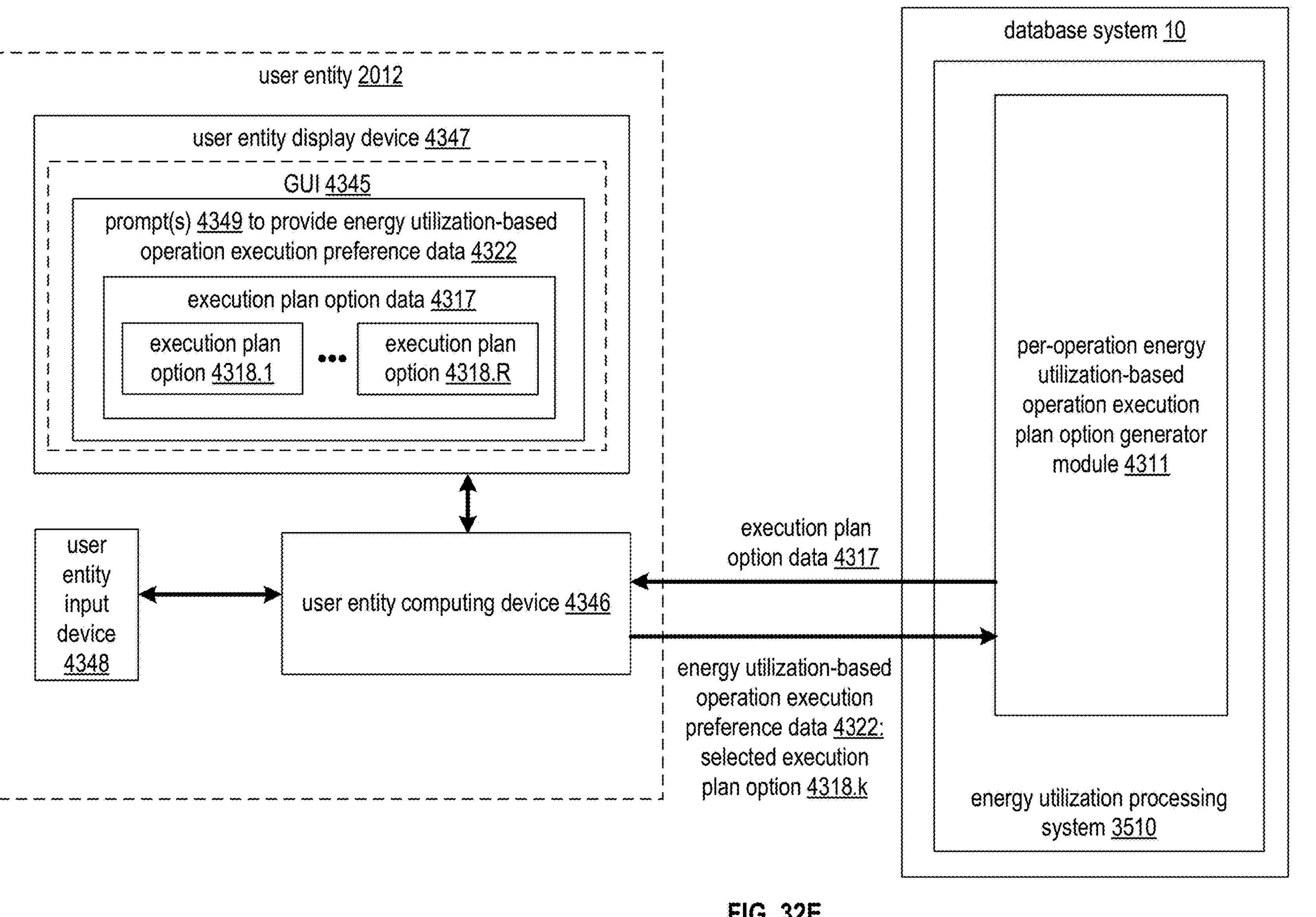

FIG. 32E illustrates an example of configuring energy utilization-based operation execution preference data 4322 to indicate user selection of selected execution plan option 4318.*k* based on the user entity 2012 selecting the execution plan option 4318.*k* from the plurality of execution plan options 4318.1-4318.R based on the respective execution plan option data 4317 being sent and presented to the user entity via the GUI. For example, the user entity can view differences in the respective options (e.g. differences in their pricing, in their energy utilization, and/or their performance) to evaluate which option they find most appealing (e.g. based on determining whether waiting longer for the operation to complete execution is worth lower pricing/lower energy utilization, etc.).

In some embodiments, rather than user entity selecting execution plan option 4318 for their requested operation based on being presented with information regarding the set of execution plan options 4318.1-4318.R after requesting the operation, the user entity can configure operation execution preference data 4322, for example, to be applied to many operations requested by the user after this execution preference data 4322 is already configured, where selected execution plan option 4318.*k* is automatically selected by energy utilization processing system 3510 based on selecting which option meets/best fits the operation execution preference data 4322.

Figure 32F:
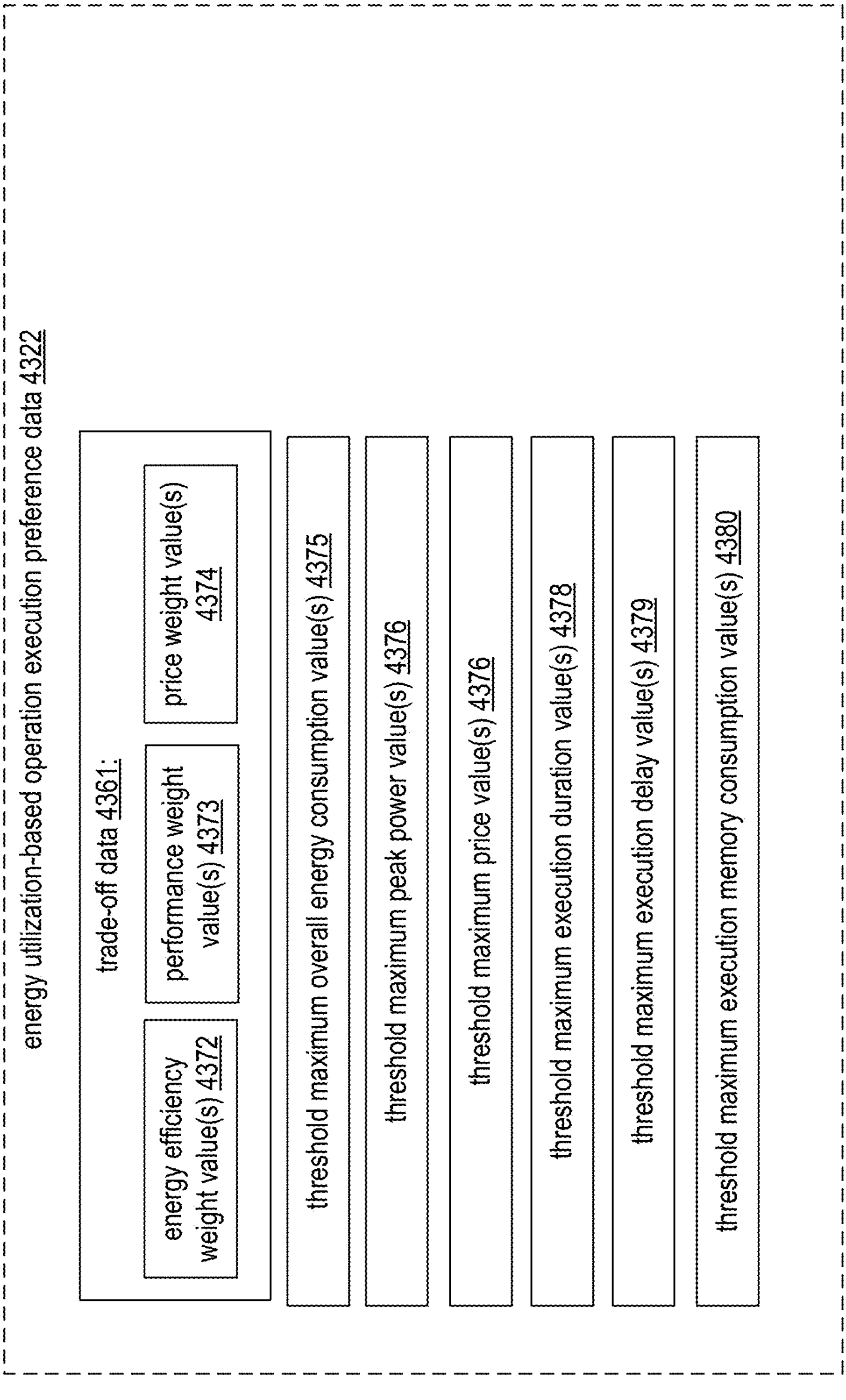
FIG. 32F illustrates example energy utilization-based operation execution preference data in accordance with various embodiments.

FIG. 32F illustrates an embodiment of such energy utilization-based operation execution preference data 4322 (e.g. configured as discussed in conjunction with FIG. 32D) to be applied to subsequently requested operations in determining which of a set of execution plan options for each given subsequently requested operation be applied in executing the given subsequently requested operation.

The energy utilization-based operation execution preference data 4322 can indicate and/or be based on trade-off data 4361, for example, indicating weight values assigned to different factors. For example, the trade-off data 4361 can indicate: at least one energy efficiency weigh value 4372 indicating how much energy efficiency be prioritized relative to other factors in selecting an execution plan option for execution; at least one performance weigh value 4373 indicating how much performance be prioritized relative to other factors in selecting an execution plan option for execution; and/or at least one price weigh value 4374 indicating how much price be prioritized relative to other factors in selecting an execution plan option for execution.

For example, trade-off data 4361 indicates a high weight for performance and low weights for energy efficiency and/or price, indicating that high performance (e.g. operating completing quickly) be favored over more energy efficient options and/or lower priced options. As another example, trade-off data 4361 indicates a high weight for energy efficiency and low weights for performance and/or price, indicating that high energy efficiency (e.g. low peak power/low overall energy utilization) be favored over faster/higher performing options and/or lower priced options. As another example, trade-off data 4361 indicates similar weights for all three categories, indicating preference for options that somewhat reduce energy efficiency and/or somewhat reduce cost at the sacrifice of some performance, even if there are other options with better energy efficiency, lower price, or better performance.

While not illustrated, additional sub-weights can be applied to these categories (e.g. energy efficiency weight values indicates a peak power weight and overall energy utilization weight to dictate whether minimizing peak power is more important than minimizing overall energy utilization; performance weight values indicates runtime weight and memory consumption weight to dictate whether minimizing runtime vs. minimizing memory consumption is more important, etc.).

In some embodiments, the execution preference data 4322 optionally dictates a database system-wide mode of operation, for example, in the case where the user entity 2012 corresponds to an administrator of the database system. In other embodiments, different execution preference data 4322 is configured by different user entities 2012 to reflect their different preferences, each to be applied to performance of respective operations requested by the respective user entity.

The energy utilization-based operation execution preference data 4322 can indicate and/or be based on one or more threshold maximum overall energy consumption values 4375, for example, where the selection execution plan option 4318.*k* is selected (e.g. based on trade-off data 4361) from only a subset the set of execution plan options 4318.1-4318.R determined to meet the threshold maximum overall energy consumption value 4375 (e.g. based on having overall energy consumption values 4365 lower than and/or equal to this threshold maximum overall energy consumption value 4375). The threshold maximum overall energy consumption values 4375 can optionally be configured per amount of data processed and/or other metric to accommodate for differences in size of different operations in which a user may wish to have such thresholds configured differently.

The energy utilization-based operation execution preference data 4322 can alternatively or additionally indicate and/or be based on one or more threshold maximum peak power values 4376, for example, where the selection execution plan option 4318.*k* is selected (e.g. based on trade-off data 4361) from only a subset the set of execution plan options 4318.1-4318.R determined to meet the threshold maximum peak power values 4376 (e.g. based on having peak power values 4366 lower than and/or equal to this threshold maximum peak power value 4376). The threshold maximum peak power values 4376 can optionally be configured per amount of data processed and/or other metric to accommodate for differences in size of different operations in which a user may wish to have such thresholds configured differently.

The energy utilization-based operation execution preference data 4322 can alternatively or additionally indicate and/or be based on one or more threshold maximum price values 4377, for example, where the selection execution plan option 4318.*k* is selected (e.g. based on trade-off data 4361) from only a subset the set of execution plan options 4318.1-4318.R determined to meet the threshold maximum price values 4377 (e.g. based on having price values 4367 lower than and/or equal to this threshold maximum price value 4377). The threshold maximum price values 4377 can optionally be configured per amount of data processed and/or other metric to accommodate for differences in size of different operations in which a user may wish to have such thresholds configured differently.

The energy utilization-based operation execution preference data 4322 can alternatively or additionally indicate and/or be based on one or more threshold maximum execution duration values 4378, for example, where the selection execution plan option 4318.*k* is selected (e.g. based on trade-off data 4361) from only a subset the set of execution plan options 4318.1-4318.R determined to meet the threshold maximum execution duration values 4378, (e.g. based on having execution duration values 4368 lower than and/or equal to this threshold maximum execution duration value 4378). The threshold maximum execution duration values 4378 can optionally be configured per amount of data processed and/or other metric to accommodate for differences in size of different operations in which a user may wish to have such thresholds configured differently.

The energy utilization-based operation execution preference data 4322 can alternatively or additionally indicate and/or be based on one or more threshold maximum execution delay values 4379, for example, where the selection execution plan option 4318.*k* is selected (e.g. based on trade-off data 4361) from only a subset the set of execution plan options 4318.1-4318.R determined to meet the threshold maximum execution delay values 4379, (e.g. based on having execution delay values 4369 lower than and/or equal to this threshold maximum execution delay value 4379). The threshold maximum execution delay values 4379 can optionally be configured per amount of data processed and/or other metric to accommodate for differences in size of different operations in which a user may wish to have such thresholds configured differently.

The energy utilization-based operation execution preference data 4322 can alternatively or additionally indicate and/or be based on one or more threshold maximum execution memory consumption values 4380, for example, where the selection execution plan option 4318.*k* is selected (e.g. based on trade-off data 4361) from only a subset the set of execution plan options 4318.1-4318.R determined to meet the threshold maximum execution memory consumption values 4380, (e.g. based on having execution memory consumption values 4370 lower than and/or equal to this threshold maximum execution delay value 4380). The threshold maximum execution memory consumption values 4380 can optionally be configured per amount of data processed and/or other metric to accommodate for differences in size of different operations in which a user may wish to have such thresholds configured differently.

The energy utilization-based operation execution preference data 4322 can alternatively or additionally indicate other thresholds.

In some embodiments, rather than filtering the full set of options 4318.1-4318.R to identify only ones of the options meeting certain thresholds and/or identifying ones of the full set of options best meeting trade-off data, the per-operation energy utilization-based operation execution plan option generator module 4311 is configured to generate the set of options 4318.1-4318.R by applying the energy utilization-based operation execution preference data 4322 itself to only generate options meeting the specified criteria, where the selected options is ultimately selected automatically from a best fit and/or is selected by a user (e.g. as illustrated in FIG. 32E, where the user is only presented with options meeting their predefined thresholds).

In some embodiments, the energy utilization-based operation execution preference data 4322 implements some or all features and/or functionality of operation requirement data 4050. In some embodiments, energy utilization-based operation execution preference data 4322 configured for a given user entity is applied to configure some or all requirements of operation requirement data 4050 for execution of their requested operations. In some embodiments, the given user can configure multiple different energy utilization-based operation execution preference data 4322 to be applied as different operation requirement data 4050 for different operation types, different operation priorities, different time frames, or other differing criteria indicated in energy utilization-based operation execution preference data 4322.

In some embodiments, energy utilization-based operation execution preference data 4322 configured by an administrator is applied to configure some or all requirements of operation requirement data 4050 applied to all user (e.g. with different energy utilization-based operation execution preference data 4322 configured for different operation priorities, different time frames, different operation types, and/or other differing criteria indicated in energy utilization-based operation execution preference data 4322).

Figure 32G:
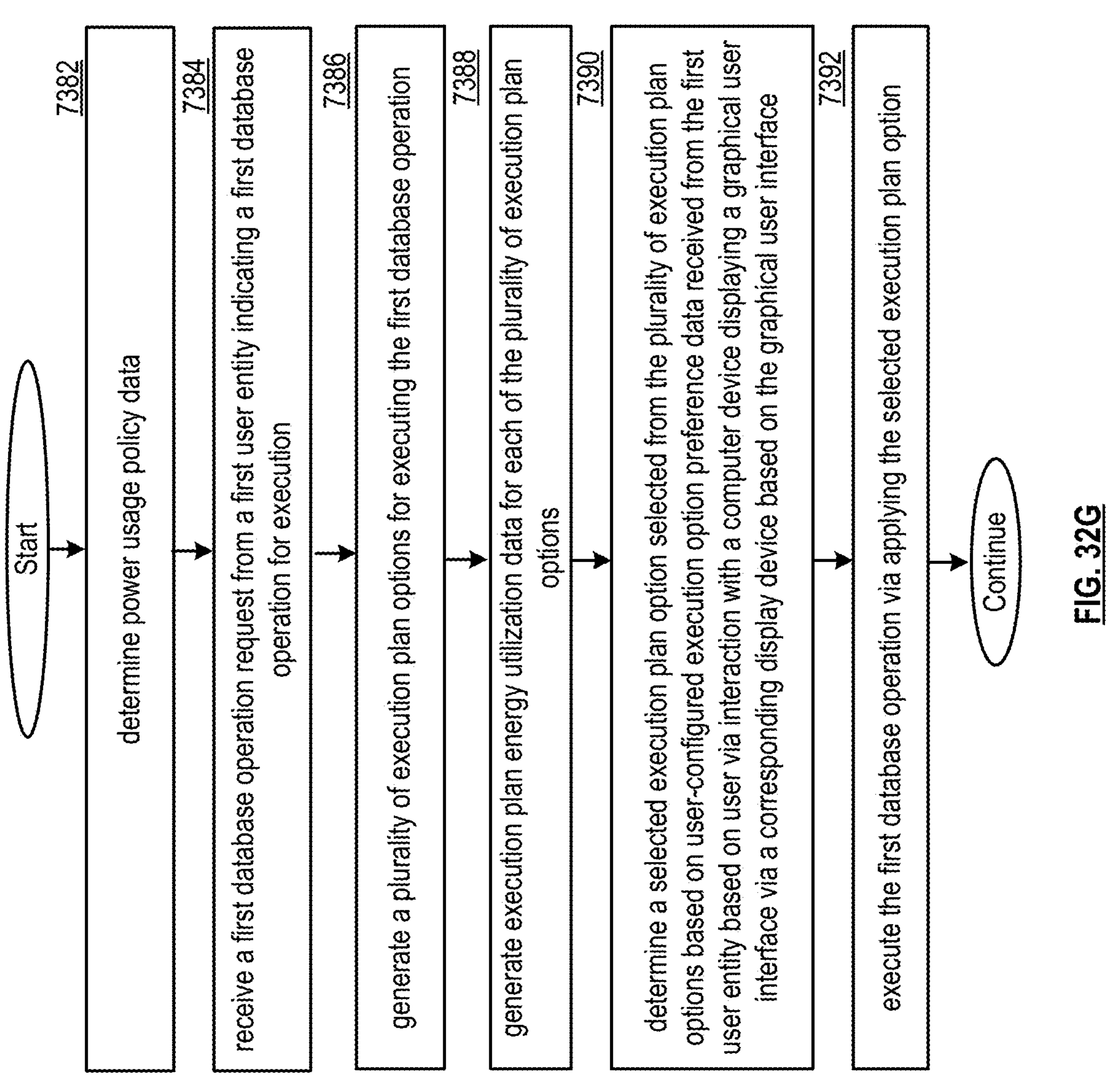
FIG. 32G is a logic diagram illustrating a method for execution in accordance with various embodiments.

FIG. 32G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32G. In some embodiments, a node 37 can implement some or all of FIG. 32G based on implementing a corresponding plurality of processing core resources 48.1-48.W. Some or all of the steps of FIG. 32G can optionally be performed by any other one or more processing modules of the database system 10. Some or all of the steps of FIG. 32G can be performed to implement some or all of the functionality of the database system 10 as described in conjunction with FIGS. 32A-32F, for example, by implementing some or all of the functionality of per-operation energy utilization-based operation execution plan option generator module 4311 and/or operation execution plan selection module 4321, and/or based on processing and/or generating energy utilization data 3510. Some or all steps of FIG. 32G can be performed by database system 10 in accordance with other embodiments of the database system 10 and/or nodes 37 discussed herein. Some or all steps of FIG. 32G can be performed by database system 10 via processing and/or generating any energy utilization data 3510 described herein. Some or all of the steps of FIG. 32G can be performed in conjunction with performing some or all steps of any other method described herein.

Step 7382 includes determining power usage policy data for the database system. Step 7384 includes receiving a first database operation request from a first user entity indicating a first database operation for execution. Step 7386 includes generating a plurality of execution plan options for executing the first database operation. In various examples, the plurality of execution plan options includes a first execution plan option and a second execution plan option. Step 7388 includes generating execution plan energy utilization data for each of the plurality of execution plan options. In various examples, first energy utilization data for the first execution plan option indicates less favorable energy utilization than second energy utilization for the second execution plan option. Step 7390 includes determining a selected execution plan option selected from the plurality of execution plan options based on user-configured execution option preference data received from the first user entity based on user via interaction with a computer device displaying a graphical user interface via a corresponding display device based on the graphical user interface. Step 7392 includes executing the first database operation via applying the selected execution plan option.

In various examples, the first execution plan option corresponds to an optimized performance-based operation execution plan generated to optimize for performance. In various examples, the second execution plan option corresponds to an optimized energy utilization-based operation execution plan generated to optimize for energy efficiency.

In various examples, the plurality of execution plan options includes at least three execution plan options each generated via a corresponding set of weights of a plurality of different sets of weights. In various examples, the corresponding set of weights indicates a performance efficiency weight relative to an energy efficiency weight. In various examples, the optimized performance-based operation execution plan is generated via a first performance efficiency weight and a first energy efficiency weight that is less than the first performance efficiency weight. In various examples, the optimized energy utilization-based operation execution plan is generated via a second performance efficiency weight and a second energy efficiency weight that is greater than the second performance efficiency weight.

In various examples, generating the plurality of execution plan options includes at least one of generating a plurality of different sub-operation execution flows for the plurality of execution plan options, where a first sub-operation execution flow for the first execution plan option is less energy efficient than a second sub-operation execution flow for the second execution plan option; selecting a plurality of different operation parameter data for the plurality operation execution plan options, where first operation parameter data for the first execution plan option is less energy efficient than a second sub-operation execution flow for the second execution plan option; and/or selecting a plurality of different execution scheduling data for the plurality operation execution plan options, where first execution scheduling data for the first execution plan option renders less favorable energy utilization than second execution scheduling data for the second execution plan option.

In various examples, the method further includes: communicating the plurality of execution plan options and the execution plan energy utilization data for the each of the plurality of execution plan options to the first user entity; and/or receiving the user-configured execution option preference data indicating the selected execution plan option selected from the plurality of execution plan options by the first user entity via interaction with the computer device displaying the graphical user interface via the corresponding display device based on the graphical user interface presenting the plurality of execution plan options and the execution plan energy utilization data for the each of the plurality of execution plan options to the first user entity.

In various examples, the method further includes: generating execution plan performance data for each of the plurality of execution plan options, where first performance data for the first execution plan option indicates higher performance than second performance data for the second execution plan option; and/or further communicating the execution plan performance data for the each of the plurality of execution plan options to the first user entity, where the graphical user interface further presents the execution plan performance data for the each of the plurality of execution plan options.

In various examples, the execution plan performance data includes estimated runtime data.

In various examples, the method further includes generating database operation pricing data for each of the plurality of execution plan options. In various examples, first database operation pricing data for the first execution plan option indicates higher pricing than second pricing data for the second execution plan option based on the first execution plan option having less favorable energy utilization than the second execution plan option. In various examples, the method further includes further communicating the database operation pricing data for the each of the plurality of execution plan options to the first user entity. In various examples, the graphical user interface further presents the execution plan pricing data for the each of the plurality of execution plan options.

In various examples, the method further includes generating operation pricing scheme data indicating price for execution of database operations as an increasing function of energy utilization. In various examples, the first database operation pricing data for the first execution plan option indicates the higher pricing than the second pricing data for the second execution plan option based on the operation pricing scheme data indicating price for execution of database operations as an increasing function of energy utilization.

In various examples, the plurality of execution plan options each include execution scheduling data. In various examples, first database operation execution data for the first execution plan option indicates scheduling of execution sooner than second execution scheduling data for the second execution plan option. In various examples, the first execution plan option has the less favorable energy utilization than the second execution plan option based on the first execution plan option indicating the scheduling of execution sooner than second execution scheduling data. In various examples, the graphical user interface presents the plurality of execution plan options based on presenting the execution scheduling data for each of the plurality of execution plan options. In various examples, selection of the selected execution plan option by the first user entity via the interaction with the computer device displaying the graphical user interface is based on user selection of the execution scheduling data of the selected execution plan option.

In various examples, execution scheduling data for different ones of the plurality of execution plan options indicate different corresponding time frames of a plurality of time frames. In various examples, the graphical user interface presents the plurality of execution plan options based on presenting the different corresponding time frames. In various examples, the selection of the selected execution plan option by the first user entity via the interaction with the computer device displaying the graphical user interface is based on user selection of a corresponding time frame of the plurality of time frames of the selected execution plan option. In various examples, the first execution plan option has the less favorable energy utilization than the second execution plan option based on the first execution plan option indicating a first one of the plurality of time frames and the second execution plan option indicating a second one of the plurality of time frames later than the first one of the plurality of time frames. In various examples, the first execution plan option has the less favorable energy utilization than the second execution plan option further based on at least one of: a greater volume of database operations being requested during the second temporal period than the first temporal period; the second temporal period having greater power consumption pricing than the first temporal period; a first peak power threshold during the first temporal period being greater than a second peak power threshold during the second temporal period; first current power meter measurement data generated during the first temporal period indicating lower energy consumption than second current power meter measurement data generated during the second temporal period; the first current power meter measurement data generated during the first temporal period indicating lower peak power than the second current power meter measurement data generated during the second temporal period; the first current power meter measurement data generated during the first temporal period indicating a first current power level lower than a peak power threshold level by a first current amount greater than a second amount by which a second power level indicated by the second current power meter measurement data generated during the second temporal period falls below the peak power threshold level; historical operation execution data indicating lower amounts of database operation execution during a first cyclically occurring time frame corresponding to the first temporal period than a second cyclically occurring time frame corresponding to the second temporal period; historical energy utilization data indicating lower energy consumption during the first cyclically occurring time frame corresponding to the first temporal period than the second cyclically occurring time frame corresponding to the second temporal period; the historical energy utilization data indicating lower peak power during the first cyclically occurring time frame corresponding to the first temporal period than the second cyclically occurring time frame corresponding to the second temporal period; the historical energy utilization data for the first cyclically occurring time frame corresponding to the first temporal period indicating a first historic peak power level lower than the peak power threshold by a first historic amount greater than a second historic amount by which a second historic peak power level indicated by the historical energy utilization data for the first cyclically occurring time frame corresponding to the first temporal period falls below the peak power threshold; and/or the first temporal period corresponding to a nighttime temporal period and the second temporal period corresponding to a daytime temporal period.

In various examples, the method further includes: communicating a set of configurable operation parameters to the first user entity; receiving the user-configured execution option preference data indicating selected configuration of the set of configurable operation parameters by the first user entity via interaction with the computer device displaying the graphical user interface via the corresponding display device based on the graphical user interface presenting the set of configurable energy utilization-based operation parameters to the first user entity for configuration via user input; storing the user-configured execution option preference data mapped to the first user entity in user profile data stored via the database system; and/or in response to receiving the first database operation request, automatically selecting the selected execution plan option from the plurality of execution plan options based on applying the user-configured execution option preference data to select the selected execution plan option based on having corresponding execution plan energy utilization data meeting the selected configuration of the set of configurable operation parameters configured by the first user entity.

In various examples, the set of configurable operation parameters includes at least one energy utilization-based operation parameter that includes and/or is based on a minimum energy efficiency parameter, where the selected execution plan option is selected based on the corresponding execution plan energy utilization data for the selected execution plan option indicating an energy efficiency value greater than a minimum energy efficiency value selected by the first user entity for the minimum energy efficiency parameter.

In various examples, the set of configurable operation parameters includes at least one energy utilization-based operation parameter that includes and/or is based on a maximum peak power parameter, where the selected execution plan option is selected based on the corresponding execution plan energy utilization data for the selected execution plan option indicating a peak power value less than a maximum peak power value selected by the first user entity for the maximum peak power parameter.

In various examples, the set of configurable operation parameters includes at least one energy utilization-based operation parameter that includes and/or is based on a maximum total energy utilization parameter, wherein the selected execution plan option is selected based on the corresponding execution plan energy utilization data for the selected execution plan option indicating a total energy utilization value less than a maximum total energy utilization value selected by the first user entity for the maximum total energy utilization parameter.

In various examples, multiple ones of the plurality of execution plan options generated for the first database operation meet the selected configuration of the set of configurable energy utilization-based operation parameters configured by the first user entity. In various examples, the selected execution plan option is automatically selected from the multiple ones of the plurality of execution plan meeting the selected configuration of the set of configurable energy utilization-based operation parameters based on the selected execution plan option having a fastest estimated runtime of the multiple ones of the plurality of execution plan options. In various examples, only the multiple ones of the plurality of execution plan meeting the selected configuration of the set of configurable energy utilization-based operation parameters are presented via the graphical user interface, and the user entity selects the selected execution plan option via interaction with the graphical user interface to select the selected execution plan option from the multiple ones of the plurality of execution plan options.

In various examples, the set of configurable operation parameters includes at least one performance-based operation parameter that includes at least one of: a minimum performance efficiency parameter; a maximum runtime parameter; a maximum execution delay parameter; a maximum storage utilization parameter; and/or a minimum future access efficiency parameter. In various examples, the method further includes generating execution plan performance data for each of the plurality of execution plan options. In various examples, first performance data for the first execution plan option indicates higher performance than second performance data for the second execution plan option. In various examples, the selected execution plan option is selected based on at least one of the corresponding execution plan energy utilization data for the selected execution plan option indicating a performance efficiency value greater than a minimum performance efficiency value selected by the first user entity for the minimum performance efficiency parameter; the corresponding execution plan energy utilization data for the selected execution plan option indicating an estimated runtime value less than a maximum runtime value selected by the first user entity for the maximum runtime parameter; the corresponding execution plan energy utilization data for the selected execution plan option indicating an scheduled execution time value having delay from the current time less than a maximum execution delay value selected by the first user entity for the maximum execution delay parameter; the corresponding execution plan energy utilization data for the selected execution plan option indicating an estimated storage utilization value less than a maximum storage utilization value selected by the first user entity for the maximum storage utilization parameter; and/or the corresponding execution plan energy utilization data for the selected execution plan option indicating an estimated future access efficiency value greater than a minimum future access efficiency value selected by the first user entity for the minimum future access efficiency parameter.

In various examples, multiple ones of the plurality of execution plan options generated for the first database operation meet the selected configuration of the set of configurable performance-based operation parameters configured by the first user entity. In various examples, the selected execution plan option is automatically selected from the multiple ones of the plurality of execution plan meeting the selected configuration of the set of configurable energy utilization-based operation parameters based on the selected execution plan option having at least one of a greatest energy efficiency of the multiple ones of the plurality of execution plan options; a lowest peak power of the multiple ones of the plurality of execution plan options; a lowest total energy utilization of the multiple ones of the plurality of execution plan options; and/or lowest pricing of the multiple ones of the plurality of execution plan options.

In various examples, wherein the set of configurable operation parameters includes at least one pricing-based operation parameter that includes a maximum pricing parameter. In various examples, the method further includes generating execution plan pricing data for each of the plurality of execution plan options. In various examples, first pricing data for the first execution plan option indicates higher pricing than second pricing data for the second execution plan option. In various examples, the selected execution plan option is selected based on the corresponding execution plan energy utilization data for the selected execution plan option indicating a pricing value less than a maximum pricing value selected by the first user entity for the maximum pricing parameter.

In various examples, multiple ones of the plurality of execution plan options generated for the first database operation meet the selected configuration of the set of configurable performance-based operation parameters configured by the first user entity. In various examples, the selected execution plan option is automatically selected from the multiple ones of the plurality of execution plan meeting the selected configuration of the set of configurable energy utilization-based operation parameters based on the selected execution plan option having at least one of a greatest energy efficiency of the multiple ones of the plurality of execution plan options; a lowest peak power of the multiple ones of the plurality of execution plan options; and/or a lowest total energy utilization of the multiple ones of the plurality of execution plan options.

In various examples, the first energy utilization data for the first execution plan option indicates less favorable energy utilization than second energy utilization for the second execution plan option based on at least one of the first execution plan option involving a greater amount of parallelization for executing the first database operation than the second execution plan option; the first execution plan option involving writing of a greater amount of data than the second execution plan option; the first execution plan option involving reading of a greater amount of data than the second execution plan option; the first execution plan option involving use of a first memory type less energy efficient than a second memory type involved in the second execution plan option; the first execution plan option involving use of a first compression scheme less energy efficient than a second compression scheme involved in the second execution plan option; the first execution plan option involving use of a first secondary indexing scheme less energy efficient than a second secondary indexing scheme involved in the second execution plan option; the first execution plan option involving use of greater amounts of grid-based power than the second execution plan option; the first execution plan option involving lower use of an energy efficiency-based processing core type and higher use of a performance-based processing core type than the second execution plan option; the first execution plan option having a lower estimated runtime than the second execution plan option; the first execution plan option requiring use of a greater number of computing nodes than the second execution plan option; the first execution plan option having a greater estimated peak power than the second execution plan option; the first execution plan option having a greater total estimated energy utilization than the second execution plan option; the first execution plan option indicating scheduling of execution of the first database operation during a first time frame having a higher peak power than a second time frame for scheduling of the first database operation indicated in the second execution plan option; the first execution plan option indicating scheduling of execution of the first database operation at a first time frame having a higher projected energy utilization than a second time frame for scheduling of the first database operation indicated in the second execution plan option; the first execution plan option indicating scheduling of execution of the first database operation at a first time frame having a greater number of other operations scheduled for concurrent execution than a second time frame for scheduling of the first database operation indicated in the second execution plan option; and/or the first execution plan option indicating scheduling of execution of the first database operation during a daytime time frame and the second execution plan option indicating scheduling of the first database operation during a nighttime time frame.

In various examples, generating the execution plan energy utilization data for each of the plurality of execution plan options includes performing an energy utilization estimation function upon operation parameter data for the each of the plurality of execution plan options generate corresponding energy utilization estimate data for the each of the plurality of execution plan options. In various examples, the first energy utilization data for the first execution plan option indicates less favorable energy utilization than second energy utilization for the second execution plan option based on first energy utilization estimate data indicating less favorable estimated energy utilization than the estimated energy utilization data for the second execution plan option.

In various examples, the first database operation corresponds to one of a first query operation, where executing the first database operation includes generating a first query resultant for a first query expression; a first ingress operation, where executing the first database operation includes receiving a first plurality of records for storage a first storage-formatted data structure generation operation, wherein executing the first database operation includes generating a plurality of storage-formatted data structures from a corresponding plurality of records for storage; a first rebuilding operation, where executing the first database operation includes rebuilding a first data structure from at least one other first data structure; and/or a first migration operation, where executing the first database operation includes migrating at least one first data structure from storage in at least one first source location to storage in at least one first destination location.

In various embodiments, any one of more of the various examples listed above are implemented in conjunction with performing some or all steps of FIG. 32G. In various embodiments, any set of the various examples listed above can be implemented in tandem, for example, in conjunction with performing some or all steps of FIG. 32G, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 32G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 32G, for example, in conjunction with further implementing any one or more of the various examples described above.

In various embodiments, the operational instructions, when executed by the at least one processor, cause the database system to: determine power usage policy data; receive a first database operation request from a first user entity indicating a first database operation for execution; generate a plurality of execution plan options for executing the first database operation, where the plurality of execution plan options includes a first execution plan option and a second execution plan option; generate execution plan energy utilization data for each of the plurality of execution plan options, wherein first energy utilization data for the first execution plan option indicates less favorable energy utilization than second energy utilization for the second execution plan option; determine a selected execution plan option selected from the plurality of execution plan options based on user-configured execution option preference data received from the first user entity based on user via interaction with a computer device displaying a graphical user interface via a corresponding display device based on the graphical user interface, and/or execute the first database operation via applying the selected execution plan option.

Figure 33A:
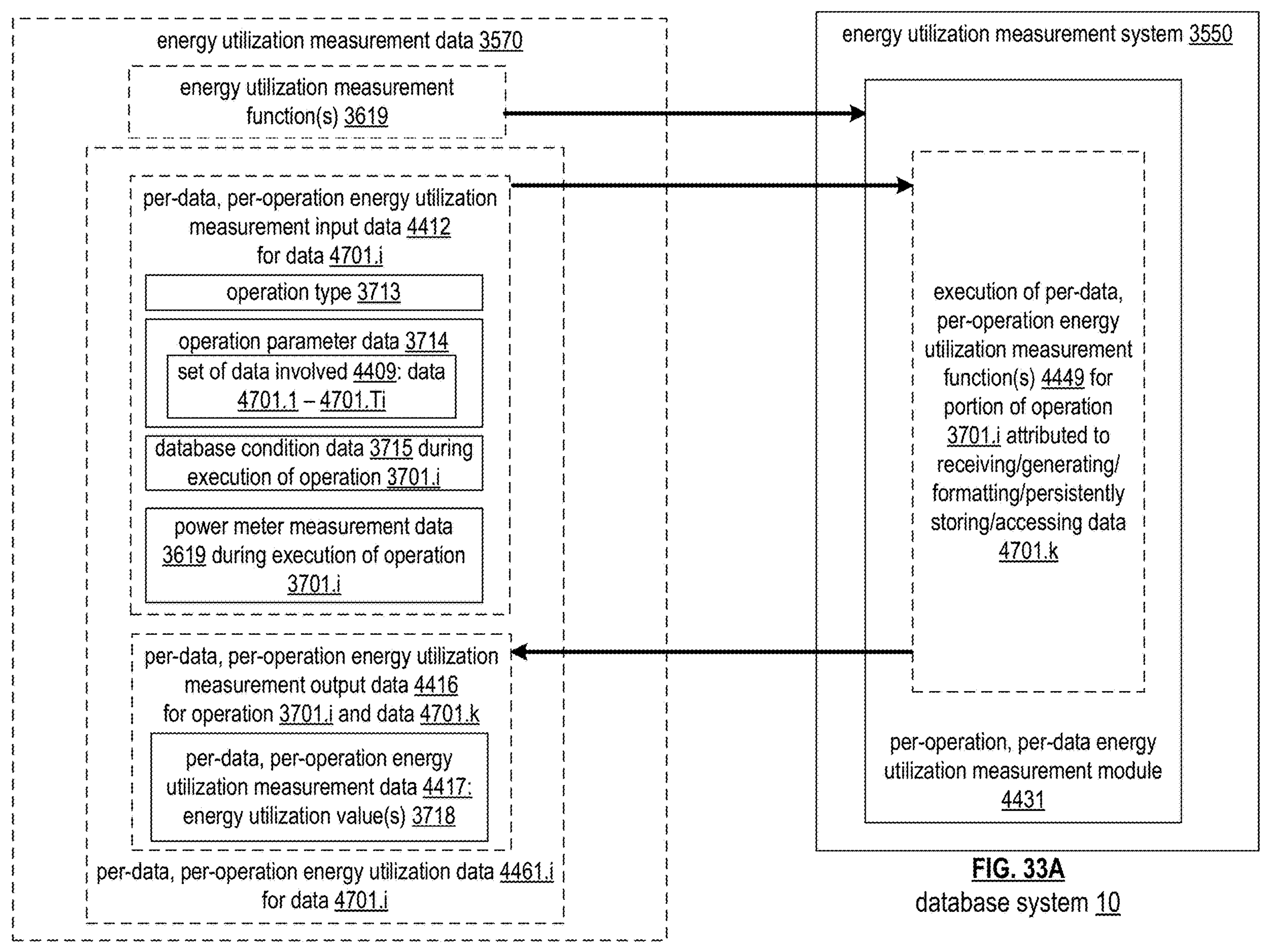
FIGS. 33A-33C are schematic block diagrams of an energy utilization measurement system in accordance with various embodiments.
Figure 33B:
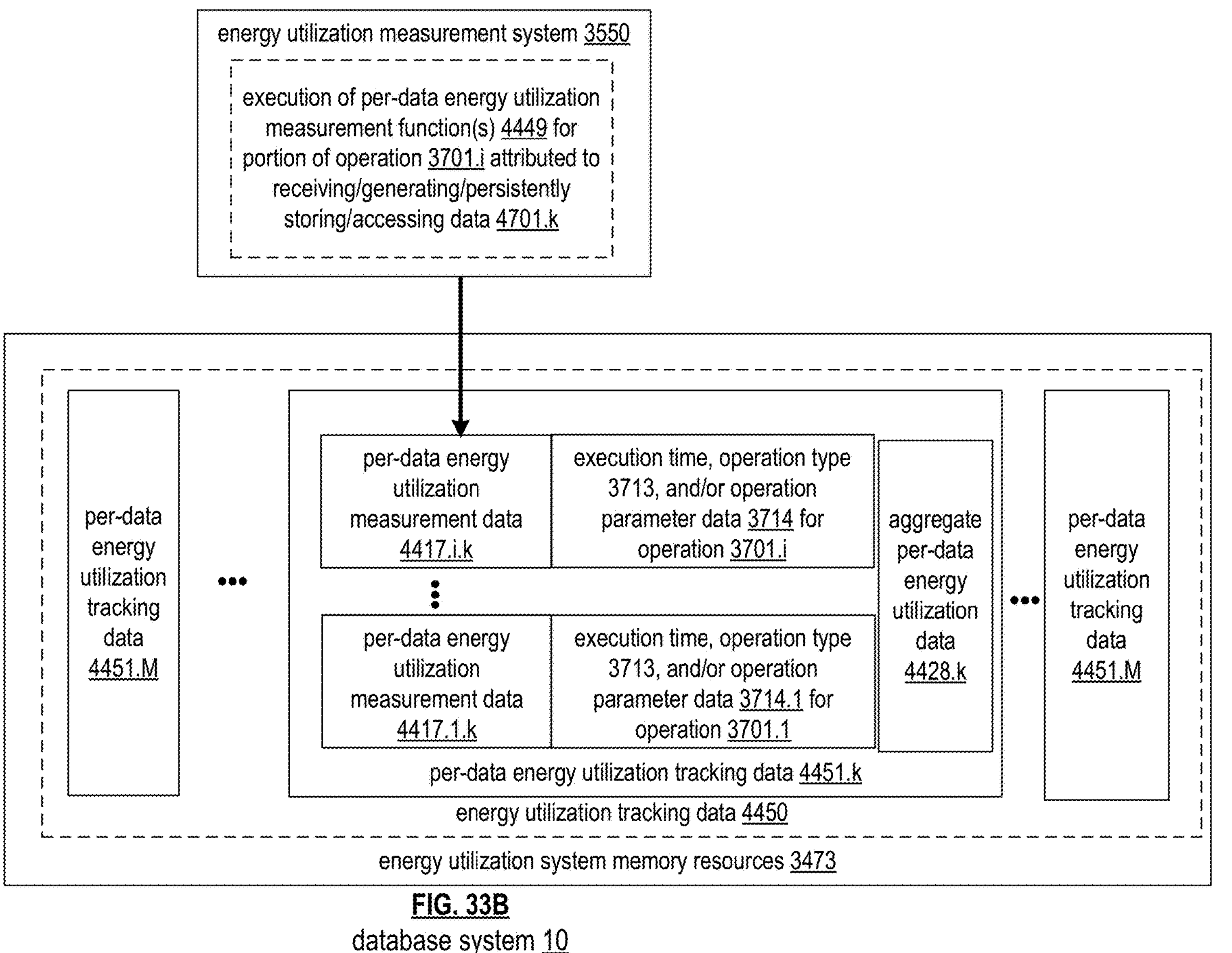
Figure 33C:
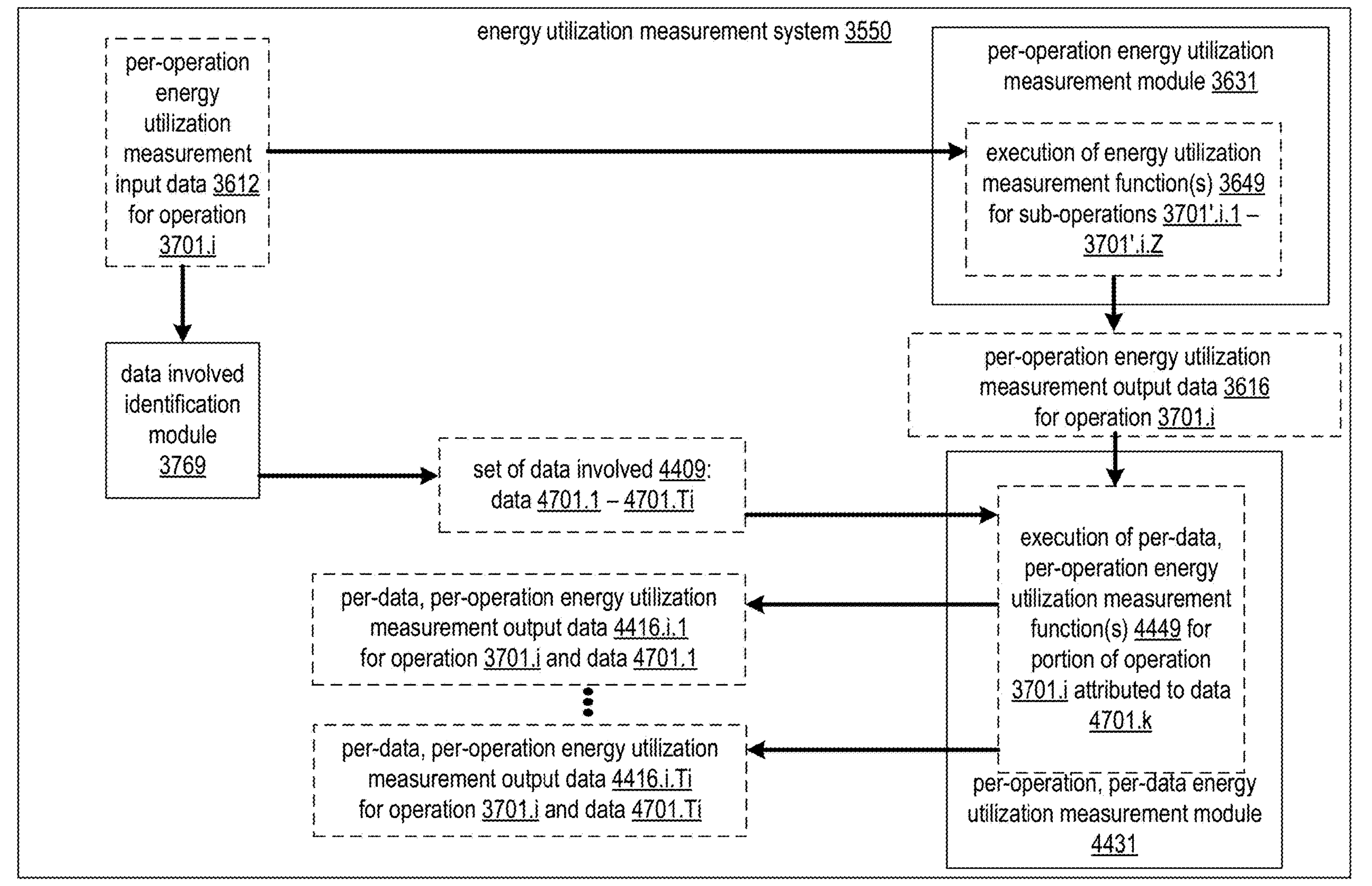

FIGS. 33A-33C illustrate embodiments of an energy utilization measurement system 3550 that implements a per-operation, per-data energy utilization measurement module 4431, for example, to attribute portions of energy utilization induced by execution of an operation to particular data involved, which can be utilized to track energy utilization induced by various data over the life of maintaining storage of the each particular data 4701, based on energy utilization induced in receiving, generating, formatting, migrating, rebuilding, persistently storing, accessing, and/or processing the data over time in conjunction with executing various corresponding operations 3701 to receive, generate, format, migrate, rebuild, persistently store, access, and/or process a collection of data 2711 that includes the particular data 4701. Some or all features and/or functionality of the energy utilization measurement system 3550 of FIGS. 33A-33C can implement the energy utilization measurement system 3550 of FIG. 26C and/or any embodiment of the energy utilization processing system 3500 described herein. Some or all features and/or functionality of the energy utilization measurement data 3570 of FIGS. 33A-33C can implement any embodiment of energy utilization data 3510 described herein. Some or all features and/or functionality of database system 10 of FIGS. 33A-33C can implement any embodiment of database system 10 described herein.

FIG. 33A illustrates an embodiment of an energy utilization measurement system 3550 that implements a per-operation, per-data energy utilization measurement module 4431 that executes one or more execution of per-data, per-operation energy utilization measurement functions 4449 to generate per-data, per-operation energy utilization measurement output data 4416 that includes per-data, per-operation energy utilization measurement data 4417 for given data 4701.*k* involved in a given operation 3701.*i* (e.g. that has already been performed upon the given data) based on per-data, per-operation energy utilization measurement input data 4412 for the given database operation 3701.*i* and given data 4701.*k*.

The one or more per-data, per-operation energy utilization measurement functions 4449 can be executed based on applying corresponding parameters, weights, and/or function definition(s) that are: received by energy utilization processing system 3500; accessed in memory by energy utilization processing system 3500; configured via user input by a user entity communicating with energy utilization processing system 3500; automatically generated and/or automatically updated/re-tuned over time by energy utilization processing system 3500 (e.g. via training on training data to generate a corresponding machine learning model and/or artificial intelligence (AI) model based on utilizing at least one machine learning-based training function and/or technique and/or based on utilizing at least one AI-based training function and/or technique); implemented by energy utilization processing system 3500 via artificial intelligence (e.g. based on utilizing a generative AI platform and/or other AI platform/model(s) accessible by and/or communicating with by energy utilization processing system 3500); and/or otherwise being determined by energy utilization processing system 3500. The corresponding parameters, weights, and/or function definition(s) of per-data, per-operation energy utilization measurement function(s) 4449 be configured to generate per-operation energy utilization-based operation pricing output data 4216 as a function (e.g. deterministic function) of corresponding per-operation energy utilization-based operation pricing input data 4212.

In some embodiments, the per-data, per-operation energy utilization measurement functions 4449 is executed in a same or similar fashion as executing per-operation energy utilization measurement functions 3649 and/or executing the per-data, per-operation energy utilization measurement functions 4449 includes executing some or all of per-operation energy utilization measurement functions 3649 for the respective operation 3701.*i*.

The per-data, per-operation energy utilization measurement output data 4416 for operation 3701.*i* and data 4701.*k* can include per-data, per-operation energy utilization measurement data 4417, which can indicate one or more energy utilization value 3718 (e.g. for one or more energy utilization metrics), such as some or all energy utilization values 3718 of energy utilization measurement data 3617 (e.g. corresponding to the portion of energy corresponding metrics attributed to the particular data 4701*k*). The per-data, per-operation energy utilization measurement data 4417 can include values attributed to data 4701.*k* for some or all types of values discussed in conjunction with FIG. 27C. These energy utilization values 3718 optionally correspond to estimates for how much energy utilization be attributed to processing the data 4701.*k* in performing operation 3701.*i*.

The per-data, per-operation energy utilization measurement input data 4412 for operation 3701.*i* and data 4701.*k* can indicate some or all per-operation energy utilization measurement input data 3612 for measuring energy utilization of the respective operation as a whole. The per-data, per-operation energy utilization measurement input data 4412 for operation 3701.*i* and data 4701.*k* can indicate a set of data involved 4409 in executing the operation 3701.*i* (e.g. indicated by/determined based on operation parameter data 3714 for the operation 3701.*i*), which can indicate a set of data 4701.1-4701.Ti that includes data 4701.*k*. The set of data involved 4409 can optionally indicate data parameter data 4714 for some or all data 4701 of set of data involved 4409. This information can be utilized by the per-data, per-operation energy utilization measurement functions 4449 in distinguishing which energy utilization required in executing the operation 3701.*i* be attributed to processing of particular data 4701.*k* vs. other data 4701 in the set of data involved 4409 (e.g. based on number of different data 4701 in the set of data involved 4409, differences in size/#bytes/#rows/type/structuring/values of different data 4701 in the set of data involved 4409, etc.)

FIG. 33B illustrates an embodiment of energy utilization measurement system 3550 that generates various per-data energy utilization measurement data 4417 for various data of a given operation and further for various operations performed on this same or different various data over time. This can be utilized to generate and maintain energy utilization tracking data 4450 (e.g. stored and accessed in energy utilization system memory resources 3473, for example, as its own relational database table, as state data, as admin logging data, etc.). The energy utilization tracking data 4450 can be included in energy utilization data 3510 generated by energy utilization processing system 3500.

The energy utilization measurement data 4450 can include a plurality of per-data energy utilization tracking data 4451.1-4451.M for a plurality of data 4701.1-4701.M. Each per-data energy utilization tracking data 4451.1-4451.M can include a set of per energy utilization measurement data 4417 for the given data 4701, tracking utilization attributed to various processing (e.g. receiving, generating, storing, formatting, rebuilding, migrating, compressing, decompressing, indexing, persistently storing, accessing, reading, writing, etc.) of the data in conjunction with executing various corresponding operations to perform such operations over time (e.g. in conjunction with storing the given data long term and/or persistently).

Information regarding the corresponding processing/corresponding operation can be indicated for/mapped to the respective per-data energy utilization measurement data 4417, for example, to enhance corresponding logging by enabling distinguishing of when various energy utilization attributed to the given data took place. Different per-data energy utilization tracking data 4451 can have different numbers of different per-energy utilization measurement data 4417, for example, based on having undergone processing by different numbers/types of operations over time, and/or based on having been stored for different amounts of time.

Each per-data energy utilization tracking data 4451.*k* can alternatively or additionally include aggregate per-data energy data 4428 for the respective data 4701 (e.g. running totals of one or more metrics that are updated as further operations involving this data are performed over time, averages/other statistical information characterizing impact of storing this data on energy utilization by the database system 10, etc.) The aggregate per-data energy data 4428 can be generated as a function of the set of per-data energy utilization measurement data 4417 generated for the given operation 4701, and/or the aggregate per-data energy data 4428 can be updated in conjunction with generating new per-data energy utilization measurement data 4417 in response to executing a corresponding operation 3701.

The set of data 4701.1-4701.M can collectively constitute some or all data 2711 stored via database system 10. The set of data 4701.1-4701.M can include data 4701.1-4701.Ti of a given operation 3701.*i*, as well as addition data 4701.Ti+1-4701.M (e.g. based on the given operation 3701.*i* not involving/processing this data, where this data is involved in execution of various other operations performed over time).

The set of data 4701.1-4701.M can correspond to a plurality of records/rows, where data 4701.*k* corresponds to a particular record/row (e.g. included in a given relational database table). The set of data 4701.1-4701.M can alternatively or additionally correspond to a plurality of data structures 3101, where data 4701.*k* corresponds to a particular data structure 3101 (e.g. particular segment 2424, particular page 2515 and/or collection of pages of a conversion page set, etc.). The set of data 4701.1-4701.M can alternatively or additionally correspond to a plurality of tables 2712, where data 4701.*k* corresponds to a particular table 2717. Each of the set of data 4701.1-4701.M can alternatively or additionally correspond to a corresponding bulk set of data, where data 4701.*k* corresponds to data included in a particular file/batch of rows (e.g. received all at once for ingress). The set of data 4701.1-4701.M can alternatively or additionally correspond to a plurality of datasets (e.g. that each include a collection of records/rows), for example, each received from a different one of a set of data sources.

FIG. 33C illustrates an embodiment of energy measurement system 3550 that generates per-data, per-operation energy utilization measurement output data 4416.*i*.1-4416.*i*.Ti for a plurality of data 4701.1-4701.Ti involved in executing the corresponding operation 3701.*i*. For example, a data involved identification module 3769 is implemented to identify the set of data involved 4409 based on per-operation energy measurement input data 3612 for operation 3701.*i* (e.g. table name of a table involved and/or corresponding set of rows included in the table is identified based on the table being identified in a request to execute the operation and the set of rows included being specified in system state data for the table at the time, etc.).

The per-operation, per-data energy utilization measurement module 4431 can execute the per-data, per-operation energy utilization measurement function(s) 4449 based on further processing per-operation energy utilization measurement data 3616 (e.g. generated for the operation 3701.*i* as a whole via per-operation energy utilization measurement module processing on per-operation energy measurement input data 3612 for operation 3701.*i*) as input (e.g. per-operation energy utilization measurement data 3616 and/or per-operation energy measurement input data 3612 for operation 3701.*i* is included and/or is processed to determine the per-data, per-operation energy utilization measurement input data 4412.*i*.1-442.*i*.Ti for each data 4701 the set of data involved 4409.

In some embodiments, the per-operation, per-data energy utilization measurement module 4431 generates per-data, per-operation energy utilization measurement output data 4416.*i*.1-4416.*i*.Ti based on computing corresponding values 3718.*i*.1-3718.*i*.Ti as respective fractions of value(s) 3718.*i* for the operation as a whole indicated in per-operation energy utilization measurement output data 3616. For example, similarly to attributing portions of energy utilization to each of a plurality of concurrently executing operations, energy utilization by a given operation can similarly be attributed to each of the plurality of data 4701.1-4701.Ti. For example, if energy utilization measured/estimated for the operation 3701.*i* a whole is Y (e.g. value 3718.*i*), a plurality of values $Y_1$-$Y_{Ti}$ can correspond to portions of Y attributed to plurality of data 4701.1-4701.Ti. For example, the values 3718.*i*.1-3718.*i*.Ti sum to value 3718.*i*. In the case where each data 4701.1-4701.Ti is of a same/similar size/type, the plurality of values $Y_1$-$Y_{Ti}$ can be measured/estimated as equal portions of Y, and are determined to be equal to/approximately Y/Ti. For example, value 3718.*i*.k can be measured/estimated as the value 3718.*i*/Ti.

While not illustrated, in some embodiments, alternatively or in addition to tracking energy utilization by data (e.g. over the life of the data being stored), energy utilization can be tracked by user entity (e.g. to understand which users induce greatest energy utilization by the database system; to cap usage for users after a certain amount of energy has been utilized; etc.)

Figure 33D:
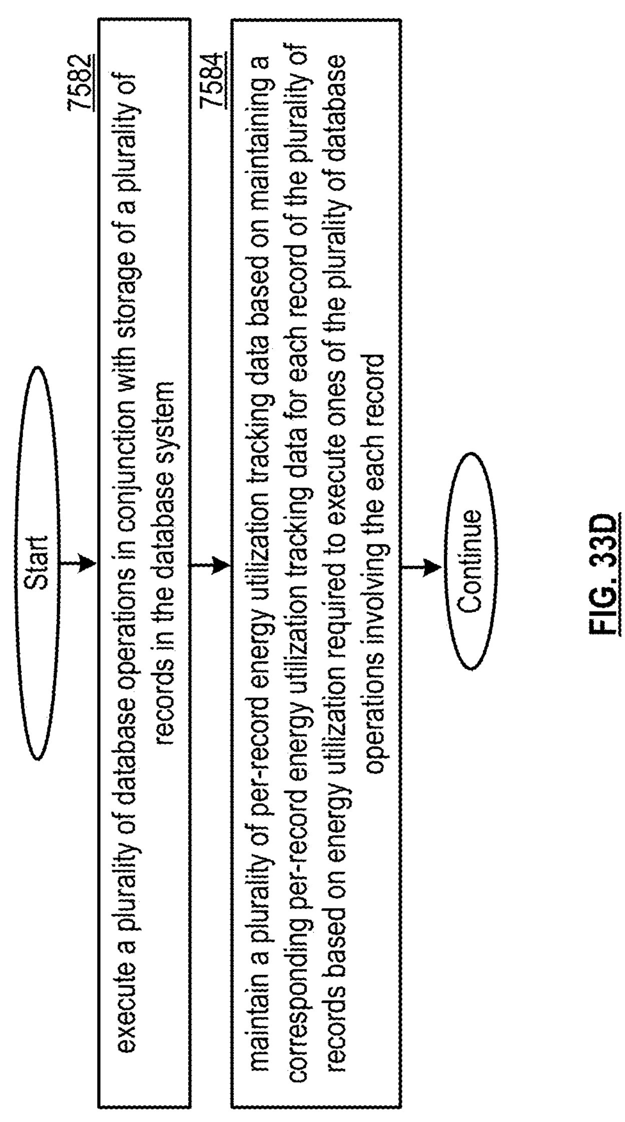
FIG. 33D is a logic diagram illustrating a method for execution in accordance with various embodiments.

FIG. 33D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33D. In some embodiments, a node 37 can implement some or all of FIG. 33D based on implementing a corresponding plurality of processing core resources 48.1-48.W. Some or all of the steps of FIG. 33D can optionally be performed by any other one or more processing modules of the database system 10. Some or all of the steps of FIG. 33D can be performed to implement some or all of the functionality of the database system 10 as described in conjunction with FIGS. 33A-33C, for example, by implementing some or all of the functionality of energy utilization measurement system 3550 and/or based on processing and/or generating energy utilization data 3510. Some or all steps of FIG. 33D can be performed by database system 10 in accordance with other embodiments of the database system 10 and/or nodes 37 discussed herein. Some or all steps of FIG. 33D can be performed by database system 10 via processing and/or generating any energy utilization data 3510 described herein. Some or all of the steps of FIG. 33D can be performed in conjunction with performing some or all steps of any other method described herein.

Step 7582 includes executing a plurality of database operations in conjunction with storage of a plurality of records in the database system. Step 7584 includes maintaining a plurality of per-record energy utilization tracking data based on maintaining a corresponding per-record energy utilization tracking data for each record of the plurality of records based on energy utilization required to execute ones of the plurality of database operations involving the each record.

In various examples, the method further includes communicating a plurality of per-record energy utilization tracking data for the plurality of records to a user entity for display via a display device.

In various examples, the per-record energy utilization tracking data indicates an aggregation of energy utilization data for each of a subset of database operations of the plurality of database operations involving the each record.

In various examples, maintaining the plurality of per-record energy utilization tracking data is based on: initializing the corresponding per-record energy utilization tracking data for the each record based on receiving the each record for storage; and/or performing a plurality of updates to the corresponding per-record energy utilization tracking data over a time window based on performance of a subset of database operations of the plurality of database operations involving the each record over the time window. In various examples, each update of the plurality of updates is response to performance a corresponding database operation involving the each record.

In various examples, a subset of the plurality of database operations each involve each of a set of multiple records of the plurality of records. In various examples, multiple per-record energy utilization tracking data for the set of multiple records of the plurality of records are each updated to indicate energy utilization data for each of the subset of the plurality of database operations.

In various examples, updating the multiple per-record energy utilization tracking data for the set of multiple records of the plurality of records to indicate the energy utilization data for each of the subset of the plurality of database operations includes:

determining total energy utilization data for executing the each of the subset of the plurality of database operations; and/or determining a plurality of per-record energy utilization data for the each of the subset of the plurality of database operations corresponding to different portions of the total energy utilization data corresponding to different ones of the subset of the plurality of database operations. In various examples, each of the multiple per-record energy utilization tracking data is updated to indicate a corresponding per-record energy utilization data of the plurality of per-record energy utilization data for a corresponding record of the set of multiple records.

In various examples, the total energy utilization data includes a total value for an energy utilization metric. In various examples, each of the plurality of per-record energy utilization data include a same per-record value for the energy utilization metric as a fraction of the total value based on a number of records in the set of multiple records.

In various examples, a first subset of database operations of the plurality of database operations involve a first record of the plurality of records. In various examples, the plurality of database operations include at least one of: a plurality of ingress operations executed to receive the plurality of records for storage, wherein the first subset of database operations includes a subset of the plurality of ingress operations based on being executed to receive the first record for storage; a plurality of storage-formatted data structure generation operations executed to generate each of a plurality of storage-formatted data structures from a corresponding subset of the plurality of records, where the first subset of database operations includes a subset of the plurality of storage-formatted data structure generation operations based on being executed to generate one the plurality of storage-formatted data structures that includes the first record; a plurality of rebuilding operations executed to rebuild at least one data structures from at least one other first data structure, where the first subset of database operations includes a subset of the plurality of rebuilding operations based on being executed to rebuild a data structure that includes the first record; a plurality of migration operations executed to migrate at least one first data structure from storage in at least one first source location to storage in at least one first destination location, where the first subset of database operations includes a subset of the plurality of migration operations based on being executed to migrate the data structure that includes the first record; and/or a plurality of query operations executed to generate query resultants for query expressions based on accessing the plurality of records, where the first subset of database operations includes a subset of the plurality of query operations based on being executed to access the first record.

In various examples, the plurality of database operations are requested via a plurality of user entities. In various examples, the method further includes maintaining a plurality of per-user energy utilization tracking data based on maintaining a corresponding per-user energy utilization tracking data for each user entity of the plurality of user entities based on energy utilization required to execute ones of the plurality of database operations requested by the each user entity.

In various examples, the plurality of records belong to a plurality of datasets, further comprising: maintaining a plurality of per-dataset energy utilization tracking data based on maintaining a corresponding per-dataset energy utilization tracking data for each dataset of the plurality of datasets based on energy utilization required to execute ones of the plurality of database operations involving records included in the each dataset.

In various examples, the plurality of records are stored via a plurality of data structures that each include multiple ones of the plurality of records. In various examples, the method further includes maintaining a plurality of per-data structure energy utilization tracking data based on maintaining a corresponding per-data structure energy utilization tracking data for each dataset of the plurality of data structures based on energy utilization required to execute ones of the plurality of database operations involving records included in the each data structure.

In various examples, the corresponding per-record energy utilization tracking data includes values tracked for at least one energy utilization metric that includes at least one of a peak power metric; an average power metric; an energy consumption metric; a greenhouse gas emissions metric; a carbon emissions metric; an emissions factor metric; a carbon intensity metric; a grid utilization factor metric; a performance per kilowatt-hour metric; a storage capacity per kilowatt-hour metric; a drive-based energy utilization metric; a processor-based energy utilization metric; a memory-based energy utilization metric; and/or a network-based energy utilization metric.

In various examples, the values are tracked for the at least one energy utilization metric for each of a plurality of temporal periods in which different ones of the plurality of database operations that involve the each record are executed.

In various examples, the values tracked for the at least one energy utilization metric correspond to an aggregation of a plurality of per-operation values that each correspond to one operation of the ones of the plurality of database operations involving the each record and that each are computed as a function of at least one of: a database operation type for the one operation; read size data for an amount of data read in executing the one operation; write size data for an amount of data read in executing the one operation; failure rate data indicating rate of failure in executing the one operation; computing device data indicating a set of computing devices involved in executing the one operation; a secondary indexing scheme involved in executing the one operation; a compression scheme involved in executing the one operation; and/or a redundancy storage scheme involved in executing the one operation.

In various examples, generating the corresponding per-record energy utilization tracking data is based on computing the at least one energy utilization metric for each database operation of the plurality of database operations based on performing an operation energy utilization estimation function upon operation energy utilization estimation input data for the each of the plurality of database operations.

In various examples, the database system is implemented via a plurality of computing devices of at least one data center. In various examples, power is delivered to the plurality of computing devices via at least one power distribution system that includes at least one power monitoring module, and wherein generating the corresponding per-record energy utilization tracking data is based on power meter measurement data generated via the at least one power monitoring module during execution of the each database operation.

In various examples, multiple ones of the plurality of database operations are executed concurrently over a temporal period. In various examples, corresponding power meter measurement data is generated via the at least one power monitoring module during the temporal period to indicate total energy utilization by the plurality of computing devices over the temporal period. In various examples, an operation energy utilization estimation function is performed upon the corresponding power meter measurement data to generate energy utilization estimate data based on estimating a plurality of portions of the total energy utilization that are each attributed to execution of a corresponding one of the plurality of database operations. In various examples, the energy utilization estimate data for the corresponding one of the plurality of database operations is based on an estimated portion of the total energy utilization attributed to the corresponding one of the plurality of database operations.

In various examples, the corresponding per-record energy utilization tracking data indicates energy utilization for the each record as a function of a number of operations involving the each record that are executed within a temporal period.

In various embodiments, any one of more of the various examples listed above are implemented in conjunction with performing some or all steps of FIG. 33D. In various embodiments, any set of the various examples listed above can be implemented in tandem, for example, in conjunction with performing some or all steps of FIG. 33D, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 33D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 33D, for example, in conjunction with further implementing any one or more of the various examples described above.

In various embodiments, the operational instructions, when executed by the at least one processor, cause the database system to: execute a plurality of database operations in conjunction with storage of a plurality of records; and/or maintain a plurality of per-record energy utilization tracking data based on maintaining a corresponding per-record energy utilization tracking data for each record of the plurality of records based on energy utilization required to execute ones of the plurality of database operations involving the each record.

FIG. 34A illustrates an embodiment where energy utilization processing system 3500 implements a carbon footprint-based power usage policy data configuration module 4780 operable to generate power usage policy data 3816 based on carbon footprint target data 4750, for example, indicating targets for carbon emissions during a particular time frame, targets for carbon emission factor, and/or targets for any other carbon emission and/or GHG-based emissions metrics (e.g. corresponding to any of the energy utilization metrics described herein relating to emissions).

In some embodiments, the carbon footprint target data 4750 indicates threshold requirements and/or target values for such metrics can be generated automatically (e.g. implemented by computing devices/processor and/or memory resources of energy utilization processing system 3500, optionally based on applying artificial intelligence and/or machine learning techniques). In some embodiments, the carbon footprint target data 4750 is generated based on and/or is dictated by: laws/policy, for example, established by a governmental agency/entity relating to carbon footprint of companies that a company implementing and/or associated with database system 10 is required to adhere to; thresholds imposed by various types of computing hardware 3671 and/or limitations of the data center, for example, that trigger jumps in other energy utilization such as jumps in cooling required when certain levels of utilization by particular hardware is reached; target energy utilization/energy efficiency set by a company implementing and/or associated with database system 10, for example, based on the company's desire to save money induced by energy utilization and/or the company's desire to be environmentally conscious by reducing their carbon footprint; other established guidelines/regulations; etc.

Any embodiment of power usage policy data 3816 described herein, and/or any corresponding requirement data/corresponding thresholds generated as a function of power usage data 3816, can be configured automatically based on carbon footprint target data 4750. For example, the power usage policy data 3816 can be generated such that, if adhered to in execution various operations 3701 and/or storing various data 4701 of data 2711 over time, thresholds/desired conditions indicated in carbon footprint target data 4750 are likely to/guaranteed to/have a least a threshold probability of rendering power usage policy data 3816 being met. This can thus dictate how various systems implemented by energy utilization processing system 3500 perform their functionality, and/or dictate how operations are scheduled/optimized in light of known/estimated impact on carbon footprint.

Power usage policy data 3816 can be updated over time, for example, in response to carbon footprint target data 4750 not being met in applying the power usage policy data 3816, and/or as a function of the carbon footprint target data 4750 changing.

In some embodiments, the carbon footprint-based power usage policy data configuration module 4780 generates power usage policy data 3816 based on historical energy utilization data 3476 and/or historical operation execution data 3477 (e.g. indicating data utilization occurring when various operations were executed, for example, indicating how particular parameters/system conditions impact energy utilization (e.g. for metrics specific to emissions) in executing operation, which can be automatically processed to dictate how power usage policy data 3816 be configured, for example, to ensure carbon footprint target data 4750 is met by database system 10 in performing its various functionality.

FIG. 34B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34B. In some embodiments, a node 37 can implement some or all of FIG. 34B based on implementing a corresponding plurality of processing core resources 48.1-48.W. Some or all of the steps of FIG. 34B can optionally be performed by any other one or more processing modules of the database system 10. Some or all of the steps of FIG. 34B can be performed to implement some or all of the functionality of the database system 10 as described in conjunction with Figure, for example, by implementing some or all of the functionality of carbon footprint-based power usage policy data configuration module 4780 and/or based on processing and/or generating energy utilization data 3510. Some or all steps of FIG. 34B can be performed by database system 10 in accordance with other embodiments of the database system 10 and/or nodes 37 discussed herein. Some or all steps of FIG. 34B can be performed by database system 10 via processing and/or generating any energy utilization data 3510 described herein. Some or all of the steps of FIG. 34B can be performed in conjunction with performing some or all steps of any other method described herein.

Step 7482 includes generating power usage policy data based on carbon footprint target data for the database system. Step 7484 includes determining a plurality of database operations for execution. Step 7486 includes determining a plurality of carbon footprint data for execution of the plurality of database operations. In various examples, each of the plurality of database operations has corresponding carbon footprint data of the plurality of carbon footprint data. Step 7488 includes generating a plurality of execution plan data for executing the plurality of database operations in accordance with the power usage policy data based on the plurality of carbon footprint data and the carbon footprint target data. In various examples, each of the database operations has corresponding execution plan data of the plurality of execution plan data. Step 7490 includes executing the plurality of database operations based on applying the plurality of execution plan data. In various examples, the carbon footprint target data is met in executing the plurality of database operations based on generating the plurality of execution plan data in accordance with the power usage policy data.

In various examples, the carbon footprint target data indicates at least one threshold value for at least one carbon footprint-based metric measured for the database system.

In various examples, the at least one carbon footprint-based metric includes and/or is based on at least one of: a peak power metric; an average power metric; an energy consumption metric; a greenhouse gas emissions metric; a carbon emissions metric; an emissions factor metric; a carbon intensity metric; a grid utilization factor metric; a performance per kilowatt-hour metric; a storage capacity per kilowatt-hour metric; a drive-based energy utilization metric; a processor-based energy utilization metric; a memory-based energy utilization metric; a network-based energy utilization metric. In various examples, the at least one threshold value includes at least one of a maximum peak power threshold for at least one time frame; a maximum average power threshold for at least one time frame; a maximum total energy consumption threshold for at least one time frame; a maximum greenhouse gas emissions threshold for at least one time frame; a maximum carbon emissions threshold for at least one time frame; a maximum emissions factor threshold for at least one time frame; a maximum carbon intensity threshold for at least one time frame; a maximum grid utilization factor for at least one time frame; a minimum performance per kilowatt-hour for at least one time frame; a maximum drive-based energy utilization for at least one time frame; a maximum processor-based energy utilization for at least one time frame; a maximum memory-based energy utilization for at least one time frame; and/or a maximum network-based energy utilization for at least one time frame.

In various examples, the corresponding plurality of carbon footprint data includes the at least one carbon footprint-based metric determined for the each of the plurality of database operations.

In various examples, determining the plurality of carbon footprint data for execution of the plurality of database operations is based on performing an performing an operation energy utilization estimation function upon operation energy utilization estimation input data for the each of the plurality of database operations to generate corresponding energy utilization estimate data that indicates the at least one carbon footprint-based metric for the each of the plurality of database operations.

In various examples, the method further includes generating the operation energy utilization estimation function based on generating an energy utilization estimation model by performing a model training function upon training data that includes historic energy utilization data and historic query operation execution data.

In various examples, the at least one carbon footprint-based metric for the each of the plurality of database operations is determined as a function of at least one of: a database operation type for the each of the plurality of database operations indicating one of a plurality of possible database operation types; operation priority data for the each of the plurality of database operations indicating one of a plurality of possible database operation priority values; read size data for an amount of data read in executing the each of the plurality of database operations; write size data for an amount of data read in executing the each of the plurality of database operations; runtime for executing the each of the plurality of database operations; failure rate data indicating rate of failure in executing the each of the plurality of database operations based on requiring attempted re-execution; computing device data indicating a set of computing devices involved in executing the each of the plurality of database operations; a secondary indexing scheme involved in executing the each of the plurality of database operations; a compression scheme involved in executing the each of the plurality of database operations; and/or a redundancy storage scheme involved in executing the each of the plurality of database operations.

In various examples, the plurality of carbon footprint data includes first carbon footprint data for a first database operation of the plurality of operations and second carbon footprint data for a second operation of the plurality of operations. In various examples, the first carbon footprint data indicates a greater carbon footprint than the second carbon footprint data based on at least one of: a first database operation type for the first database operations indicating a more energy-intensive database operation type than a second database operation type for the second database operation; first operation priority data for the first database operations indicating a higher priority than second operation priority data for the second database operation; first read size data for the first database operation indicating more data than second read size data for the second database operation; first write size data for the first database operation indicating more data than second write size data for the second database operation; first failure rate data for the first database operation indicating a higher failure rate than second failure rate data for the second database operation; first computing device data indicating devices consuming more energy than second computing device data for the second database operation; a first secondary indexing scheme for the first database operation being less energy efficient than a second secondary indexing scheme for the second database operation; a first compression scheme for the first database operation being less energy efficient than a second compression scheme for the second database operation; and/or a first redundancy storage scheme for the first database operation being less energy efficient than a second redundancy storage scheme for the second database operation.

In various examples, the plurality of execution plan data is generated to include at least one of energy utilization-based memory utilization strategy data generated for executing the each of the plurality of database operations as a function of the corresponding carbon footprint data generated for the each of the plurality of operations; energy utilization-based processor core utilization strategy data generated for executing the each of the plurality of database operations as a function of the corresponding carbon footprint data generated for the each of the plurality of operations; and/or energy utilization-based power supply strategy data generated for executing the each of the plurality of database operations as a function of the corresponding carbon footprint data generated for the each of the plurality of operations.

In various examples, the method further includes performing a query operation energy utilization-based operation scheduling function to generate energy utilization-based operation scheduling data for the each of the plurality of database operations as a function of the corresponding carbon footprint data generated for the each of the plurality of database operations.

In various examples, the plurality of carbon footprint data includes first carbon footprint data for a first database operation of the plurality of operations and/or second carbon footprint data for a second database operation of the plurality of operations. In various examples, the first carbon footprint data indicates a greater carbon footprint than the second carbon footprint data. In various examples, first energy utilization-based operation scheduling data for the first database operation indicates a first temporal period different from a second temporal period indicated by second energy utilization-based operation scheduling data for the second database operation based on at least one of a greater volume of database operations being requested during the second temporal period than the first temporal period; the second temporal period having greater power consumption pricing than the first temporal period; a first peak power threshold during the first temporal period being greater than a second peak power threshold during the second temporal period; first current power meter measurement data generated during the first temporal period indicating lower energy consumption than second current power meter measurement data generated during the second temporal period; the first current power meter measurement data generated during the first temporal period indicating lower peak power than the second current power meter measurement data generated during the second temporal period; the first current power meter measurement data generated during the first temporal period indicating a first current power level lower than a peak power threshold level by a first current amount greater than a second amount by which a second power level indicated by the second current power meter measurement data generated during the second temporal period falls below the peak power threshold level; historical operation execution data indicating lower amounts of database operation execution during a first cyclically occurring time frame corresponding to the first temporal period than a second cyclically occurring time frame corresponding to the second temporal period; historical energy utilization data indicating lower energy consumption during the first cyclically occurring time frame corresponding to the first temporal period than the second cyclically occurring time frame corresponding to the second temporal period; the historical energy utilization data indicating lower peak power during the first cyclically occurring time frame corresponding to the first temporal period than the second cyclically occurring time frame corresponding to the second temporal period; the historical energy utilization data for the first cyclically occurring time frame corresponding to the first temporal period indicating a first historic peak power level lower than the peak power threshold by a first historic amount greater than a second historic amount by which a second historic peak power level indicated by the historical energy utilization data for the first cyclically occurring time frame corresponding to the first temporal period falls below the peak power threshold; or the first temporal period corresponding to a nighttime temporal period and the second temporal period corresponding to a daytime temporal period.

In various examples, the method further includes generating, based on the corresponding carbon footprint data generated for the each of the plurality of database operations, corresponding plurality of execution plan data for each of the plurality of database operations as optimized execution plan data generated from corresponding initial execution plan data determined for the each of the plurality of database operations.

In various examples, the method further includes determining a larger plurality of database operations for execution that includes the plurality of database operations for execution and further includes a plurality of additional database operations requested for execution; determining a larger plurality of carbon footprint data that includes a plurality of additional carbon footprint data for execution of the plurality of additional database operations, wherein each of the plurality of additional database operations has corresponding carbon footprint data of the plurality of additional carbon footprint data; and/or generating a larger plurality of execution plan data that includes a plurality of additional execution plan data for the plurality of additional database operations, wherein each of the larger plurality of execution plan is generated to indicate a selection of whether to execute a corresponding database operation based on determining whether execution of the corresponding database operation would render adherence to the power usage policy data. In various examples, only the plurality of database operations are executed based on the plurality of execution plan data for the plurality of database operations each indicating a selection to execute the corresponding database operation. In various examples, all of the additional plurality of database operations are not executed based on the plurality of additional execution plan data for the plurality of additional database operations each indicating a selection to forego execution of the corresponding database operation.

In various examples, the power usage policy data is generated based on historic energy utilization data and historic query operation execution data.

In various examples, the database system is implemented via a plurality of computing devices of a data center. In various examples, power is delivered to the plurality of computing devices via at least one power distribution system that includes at least one power monitoring module. In various examples, the historic energy utilization data is based on power meter measurement data generated via the at least one power monitoring module during execution of a plurality of previously query operations.

In various examples, the method further includes generating operation requirement data based on the power usage policy data. In various examples, the operation requirement data includes at least one of: peak-power-based operation requirement data generated based on peak power threshold data of the power usage policy data; and/or overall energy consumption-based operation requirement data generated based on energy consumption threshold data of the power usage policy data. In various examples, the plurality of execution plan data is generated based on the operation requirement data.

In various examples, the overall energy consumption-based operation requirement data is generated to include at least one of a threshold maximum amount of data written per database operation, wherein overall energy consumption-based operation requirement data is generated based on determining whether data to be written during execution of the database operation exceeds the threshold maximum amount of data written; a threshold maximum amount of data read per database operation, where the overall energy consumption-based operation requirement data is generated based on determining whether data to be read during execution of the database operation exceeds the threshold maximum amount of data read; a threshold maximum number of computing device nodes participating per database operation, where the overall energy consumption-based operation requirement data is generated based on determining whether a set of computing nodes to be utilized in executing the database operation exceeds the threshold maximum number of computing device nodes; a threshold maximum number of relational database tables accessed per database operation, where the overall energy consumption-based operation requirement data is generated based on determining whether a set of relational database tables to be accessed in executing the database operation exceeds the threshold maximum number of relational database tables; a threshold maximum number of storage clusters involved per database operation, where the overall energy consumption-based operation requirement data is generated based on determining whether a set of storage cluster to be involved in executing the database operation exceeds the threshold maximum number of storage clusters; a threshold maximum drive utilization per database operation, where the overall energy consumption-based operation requirement data is generated based on determining whether an amount of drive utilization required in executing the database operation exceeds the threshold maximum drive utilization; a threshold maximum processor utilization per database operation, where the overall energy consumption-based operation requirement data is generated based on determining whether an amount of processor utilization required in executing the database operation exceeds the threshold maximum processor utilization; a threshold maximum memory utilization per database operation, where the overall energy consumption-based operation requirement data is generated based on determining whether an amount of memory utilization required in executing the database operation exceeds the threshold maximum memory utilization; and/or a threshold maximum network utilization per database operation, where the overall energy consumption-based operation requirement data is generated based on determining whether an amount of network utilization required in executing the database operation exceeds the threshold maximum network utilization.

In various examples, the database operation is to be executed over a plurality of time slices of a temporal period. In various examples, the peak-power-based operation requirement data is generated to include at least one of: a threshold maximum parallelization level, where the peak-power-based operation requirement data is generated based on determining whether a level of parallelization of the database operation exceeds the threshold maximum parallelization level during any of the plurality of time slices; a threshold maximum amount of data written per time slice, where the peak-power-based operation requirement data is generated based on determining whether data to be written for any of the plurality of time slices via execution of the database operation exceeds the threshold maximum amount of data written per time slice; a threshold maximum amount of data read per time slice, where the peak-power-based operation requirement data is generated based on determining whether data to be read for any of the plurality of time slices via execution of the database operation exceeds the threshold maximum amount of data read per time slice; a threshold maximum number of computing device nodes participating in execution of the database operation per time slice, where the peak-power-based operation requirement data is generated based on determining whether a set of computing nodes to be utilized in executing the database operation for any of the plurality of time slices exceeds the threshold maximum number of computing device nodes per time slice; a threshold maximum number of relational database tables accessed per time slice, where the peak-power-based operation requirement data is generated based on determining whether a set of relational database tables to be accessed in executing the database operation for any of the plurality of time slices exceeds the threshold maximum number of relational database tables per time slice; a threshold maximum number of storage clusters involved per time slice, where the peak-power-based operation requirement data is generated based on determining whether a set of storage cluster to be involved in executing the database operation for any of the plurality of time slices exceeds the threshold maximum number of storage clusters per time slice; a threshold maximum drive utilization per time slice, where the peak-power-based operation requirement data is generated based on determining whether an amount of drive utilization required in executing the database operation for any of the plurality of time slices exceeds the threshold maximum drive utilization per time slice; a threshold maximum processor utilization per time slice, where the peak-power-based operation requirement data is generated based on determining whether an amount of processor utilization required in executing the database operation for any of the plurality of time slices exceeds the threshold maximum processor utilization per time slice; a threshold maximum memory utilization per time slice, where the peak-power-based operation requirement data is generated based on determining whether an amount of memory utilization required in executing the database operation for any of the plurality of time slices exceeds the threshold maximum memory utilization per time slice; and/or a threshold maximum network utilization per time slice, where the peak-power-based operation requirement data is generated based on determining whether an amount of network utilization required in executing the database operation for any of the plurality of time slices exceeds the threshold maximum network utilization per time slice.

In various embodiments, any one or more of the various examples listed above are implemented in conjunction with performing some or all steps of FIG. 34B. In various embodiments, any set of the various examples listed above can be implemented in tandem, for example, in conjunction with performing some or all steps of FIG. 34B, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 34B described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 34B, for example, in conjunction with further implementing any one or more of the various examples described above.

In various embodiments, the operational instructions, when executed by the at least one processor, cause the database system to: generate power usage policy data based on carbon footprint target data; determine a plurality of database operations for execution; determine a plurality of carbon footprint data for execution of the plurality of database operations, where each of the plurality of database operations has corresponding carbon footprint data of the plurality of carbon footprint data; generate a plurality of execution plan data for executing the plurality of database operations in accordance with the power usage policy data based on the plurality of carbon footprint data and the carbon footprint target data, where each of the database operations has corresponding execution plan data of the plurality of execution plan data; and/or execute the plurality of database operations based on applying the plurality of execution plan data, where the carbon footprint target data is met in executing the plurality of database operations based on generating the plurality of execution plan data in accordance with the power usage policy data.

In some embodiments, any embodiment of operation requirement data described herein can be implemented in conjunction with implementing workload management (WLM), for example, to constrain some or all users from executing operations not adhering to respective requirements for executing a given operation/multiple operations concurrently/multiple operations over a time frame.

In some embodiments, any embodiment of scheduling operations described herein is performed in conjunction with implementing WLM.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining $-A$ matches $-B$ or not (A) matches not (B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by an energy utilization processing sub-system a parallelized database system, the method comprises:

monitoring a first plurality of computing device clusters of a data input sub-system of the parallelized database system for data input operations, wherein the first plurality of computing device clusters includes first pluralities of computing devices, wherein the first pluralities of computing devices includes pluralities of loader computing nodes, wherein a first computing device of the first pluralities of computing devices incudes a first plurality of loader computing nodes of the pluralities of loader computing nodes;

monitoring a second plurality of computing device clusters of a query and response sub-system of the parallelized database system for incoming queries, wherein the second plurality of computing device clusters includes second pluralities of computing devices, wherein the second pluralities of computing devices includes pluralities of query and response computing nodes, wherein a first computing device of the second pluralities of computing devices incudes a first plurality of query and response computing nodes of the pluralities of query and response computing nodes;

monitoring a third plurality of computing device clusters of a store and compute sub-system of the parallelized database system for store and compute operations, wherein the third pluralities of computing devices includes pluralities of store and compute computing nodes, wherein a first computing device of the third pluralities of computing devices incudes a first plurality of store and compute computing nodes of the pluralities of store and compute computing nodes; and based on the monitoring:

determining a database operation for execution;

determining power usage policy data for the database system regarding the database operation;

generating operation requirement data based on the power usage policy data;

performing an energy utilization-based operation limitation enforcement function upon energy utilization-based operation restriction enforcement input data to generate energy utilization-based operation restriction enforcement data for the database operation based on applying the operation requirement data;

executing the database operation when the energy utilization-based operation restriction enforcement data indicates execution of the operation is allowed based on execution of the database operation adhering to the operation requirement data; and foregoing execution of the database operation when the energy utilization-based operation restriction enforcement data indicates execution of the operation is disallowed based on execution of the database operation not adhering to the operation requirement data.

2. The method of claim 1, further comprising:

receiving an operation request from a requesting entity indicating the database operation, wherein determining the database operation for execution is based on receiving the operation request;

sending operation execution result data to the requesting entity in response to executing the operation when the energy utilization-based operation restriction enforcement data indicates execution of the operation is allowed; and sending an operation execution denied notification to the requesting entity in response to executing the operation when the energy utilization-based operation restriction enforcement data indicates execution of the operation is disallowed.

3. The method of claim 1, wherein the power usage policy data includes peak power threshold data that includes a peak power threshold magnitude for the database system, and wherein one of:

the energy utilization-based operation restriction enforcement data indicates execution of the operation is disallowed based on determining execution of the database operation would render exceeding of the peak power threshold magnitude; or the energy utilization-based operation restriction enforcement data indicates execution of the operation is allowed based on determining execution of the database operation would not render exceeding of the peak power threshold magnitude.

4. The method of claim 3, wherein the peak power threshold data indicates a plurality of different peak power thresholds for a plurality of different time frames within a fixed cyclical time window, wherein the database operation is executed over a temporal period that spans multiple ones of the plurality of different time frames, and wherein one of:

the energy utilization-based operation restriction enforcement data indicates execution of the operation is allowed based on determining execution of the database operation would render no peak power threshold magnitude for any of the multiple ones of the plurality of different time frames being exceeded during temporal period; or the energy utilization-based operation restriction enforcement data indicates execution of the operation is disallowed based on determining execution of the database operation would render no peak power threshold magnitude for at least one of the multiple ones of the plurality of different time frames being exceeded during temporal period.

5. The method of claim 4, further comprising generating the peak power threshold data based on selecting the plurality of different peak power thresholds for a plurality of different time frames based on power pricing data indicating different pricing of power usage by the database system during different ones of the plurality of different time frames.

6. The method of claim 1, wherein the operation requirement data includes at least one of:

peak-power-based operation requirement data generated based on peak power threshold data of the power usage policy data; or overall energy consumption-based operation requirement data generated based on energy consumption threshold data of the power usage policy data.

7. The method of claim 6, wherein the overall energy consumption-based operation requirement data is generated to include at least one of:

a threshold maximum amount of data written per database operation, wherein the energy utilization-based operation restriction enforcement data is generated based on determining whether data to be written during execution of the database operation exceeds the threshold maximum amount of data written;

a threshold maximum amount of data read per database operation, wherein the energy utilization-based operation restriction enforcement data is generated based on determining whether data to be read during execution of the database operation exceeds the threshold maximum amount of data read;

a threshold maximum number of computing device nodes participating per database operation, wherein the energy utilization-based operation restriction enforcement data is generated based on determining whether a set of computing nodes to be utilized in executing the database operation exceeds the threshold maximum number of computing device nodes;

a threshold maximum number of relational database tables accessed per database operation, wherein the energy utilization-based operation restriction enforcement data is generated based on determining whether a set of relational database tables to be accessed in executing the database operation exceeds the threshold maximum number of relational database tables;

a threshold maximum number of storage clusters involved per database operation, wherein the energy utilization-based operation restriction enforcement data is generated based on determining whether a set of storage cluster to be involved in executing the database operation exceeds the threshold maximum number of storage clusters;

a threshold maximum drive utilization per database operation, wherein the energy utilization-based operation restriction enforcement data is generated based on determining whether an amount of drive utilization required in executing the database operation exceeds the threshold maximum drive utilization;

a threshold maximum processor utilization per database operation, wherein the energy utilization-based operation restriction enforcement data is generated based on determining whether an amount of processor utilization required in executing the database operation exceeds the threshold maximum processor utilization;

a threshold maximum memory utilization per database operation, wherein the energy utilization-based operation restriction enforcement data is generated based on determining whether an amount of memory utilization required in executing the database operation exceeds the threshold maximum memory utilization; or a threshold maximum network utilization per database operation, wherein the energy utilization-based operation restriction enforcement data is generated based on determining whether an amount of network utilization required in executing the database operation exceeds the threshold maximum network utilization.

8. The method of claim 6, wherein the database operation is to be executed over a plurality of time slices of a temporal period, and wherein the peak-power-based operation requirement data is generated to include at least one of:

a threshold maximum parallelization level, wherein the energy utilization-based operation restriction enforcement data is generated based on determining whether a level of parallelization of the database operation exceeds the threshold maximum parallelization level during any of the plurality of time slices;

a threshold maximum amount of data written per time slice, wherein the energy utilization-based operation restriction enforcement data is generated based on determining whether data to be written for any of the plurality of time slices via execution of the database operation exceeds the threshold maximum amount of data written per time slice;

a threshold maximum amount of data read per time slice, wherein the energy utilization-based operation restriction enforcement data is generated based on determining whether data to be read for any of the plurality of time slices via execution of the database operation exceeds the threshold maximum amount of data read per time slice;

a threshold maximum number of computing device nodes participating in execution of the database operation per time slice, wherein the energy utilization-based operation restriction enforcement data is generated based on determining whether a set of computing nodes to be utilized in executing the database operation for any of the plurality of time slices exceeds the threshold maximum number of computing device nodes per time slice;

a threshold maximum number of relational database tables accessed per time slice, wherein the energy utilization-based operation restriction enforcement data is generated based on determining whether a set of relational database tables to be accessed in executing the database operation for any of the plurality of time slices exceeds the threshold maximum number of relational database tables per time slice;

a threshold maximum number of storage clusters involved per time slice, wherein the energy utilization-based operation restriction enforcement data is generated based on determining whether a set of storage cluster to be involved in executing the database operation for any of the plurality of time slices exceeds the threshold maximum number of storage clusters per time slice;

a threshold maximum drive utilization per time slice, wherein the energy utilization-based operation restriction enforcement data is generated based on determining whether an amount of drive utilization required in executing the database operation for any of the plurality of time slices exceeds the threshold maximum drive utilization per time slice;

a threshold maximum processor utilization per time slice, wherein the energy utilization-based operation restriction enforcement data is generated based on determining whether an amount of processor utilization required in executing the database operation for any of the plurality of time slices exceeds the threshold maximum processor utilization per time slice;

a threshold maximum memory utilization per time slice, wherein the energy utilization-based operation restriction enforcement data is generated based on determining whether an amount of memory utilization required in executing the database operation for any of the plurality of time slices exceeds the threshold maximum memory utilization per time slice; or a threshold maximum network utilization per time slice, wherein the energy utilization-based operation restriction enforcement data is generated based on determining whether an amount of network utilization required in executing the database operation for any of the plurality of time slices exceeds the threshold maximum network utilization per time slice.

9. The method of claim 1, wherein the operation requirement data includes total energy consumption-based aggregate operation requirement data applied to a plurality of operations over a restriction time window, and wherein performing the energy utilization-based operation limitation enforcement function is based on determining whether execution of the database operation is allowed, based on adherence to the total energy consumption-based aggregate operation requirement data, during the restriction time window after having executed a plurality of other database operations during the restriction time window.

10. The method of claim 9, further comprising:

maintaining running total operation metrics for operations executed within the restriction time window based on an aggregation of operation metrics determined for the plurality of other database operations that were previously executed during the restriction time window;

wherein performing the energy utilization-based operation limitation enforcement function is based on determining whether further aggregating operation metrics for the database operation with the running total operation metrics renders adherence to the total energy consumption-based aggregate operation requirement data during the restriction time window; and when the database operation is executed based on the energy utilization-based operation restriction enforcement data indicating execution of the operation is allowed, updating the running total operation metrics to include the operation metrics for the database operation based on the database operation being executed during the restriction time window.

11. The method of claim 10, further comprising at least one of:

prior to execution of the database operation, performing an energy utilization estimation function for the database operation to generate corresponding energy utilization estimate data that indicates estimated operation metrics for the database operation, wherein performing the energy utilization-based operation limitation enforcement function is based on determining whether further aggregating the estimated operation metrics for the database operation with the running total operation metrics renders adherence to the total energy consumption-based aggregate operation requirement data during the restriction time window; or based on execution of the database operation; performing an energy utilization measurement function for the database operation to generate corresponding energy utilization estimate data that indicates actual operation metrics for the database operation, wherein the running total operation metrics are updated to include the actual operation metrics for the database operation.

12. The method of claim 10, wherein the total energy consumption-based aggregate operation requirement data is generated to include at least one of:

a threshold maximum energy consumption over the restriction time window, wherein the energy utilization-based operation restriction enforcement data is generated based on determining whether an aggregation of estimated energy consumption for execution of the database operation with current total energy consumption indicated in the running total operation metrics exceeds the threshold maximum energy consumption;

a threshold maximum number of database operations over the restriction time window, wherein the energy utilization-based operation restriction enforcement data is generated based on determining whether an aggregation of an additional operation with the current total number of operations consumption indicated in the running total operation metrics exceeds the threshold maximum number of database operations;

a threshold maximum amount of data written over the restriction time window, wherein the energy utilization-based operation restriction enforcement data is generated based on determining whether an aggregation of amount of data written for execution of the database operation with current total amount of data written indicated in the running total operation metrics exceeds the threshold maximum amount of data written;

a threshold maximum amount of data read over the restriction time window, wherein the energy utilization-based operation restriction enforcement data is generated based on determining whether an aggregation of amount of data read for execution of the database operation with current total amount of data read indicated in the running total operation metrics exceeds the threshold maximum amount of data read;

a threshold maximum drive utilization over the restriction time window, wherein the energy utilization-based operation restriction enforcement data is generated based on determining whether an aggregation of amount of drive utilization for execution of the database operation with current total amount of drive utilization indicated in the running total operation metrics exceeds the threshold maximum drive utilization;

a threshold maximum processor utilization over the restriction time window, wherein the energy utilization-based operation restriction enforcement data is generated based on determining whether an aggregation of amount of processor utilization for execution of the database operation with current total amount of processor utilization indicated in the running total operation metrics exceeds the threshold maximum processor utilization;

a threshold maximum memory utilization over the restriction time window, wherein the energy utilization-based operation restriction enforcement data is generated based on determining whether an aggregation of amount of memory utilization for execution of the database operation with current total amount of memory utilization indicated in the running total operation metrics exceeds the threshold maximum memory utilization; or a threshold maximum network utilization over the restriction time window, wherein the energy utilization-based operation restriction enforcement data is generated based on determining whether an aggregation of amount of network utilization for execution of the database operation with current total amount of network utilization indicated in the running total operation metrics exceeds the threshold maximum network utilization.

13. The method of claim 10, wherein the total energy consumption-based aggregate operation requirement data is applied per user entity of a plurality of user entities of the database system, wherein different per-user running total operation metrics are maintained for different user entities of the plurality of user entities, wherein the database operation is requested by one user entity of the plurality of user entities, wherein performing the energy utilization-based operation limitation enforcement function is based on determining whether further aggregating operation metrics for the database operation with per-user running total database metrics maintained for the one user entity of the plurality of user entities renders adherence to the total energy consumption-based aggregate operation requirement data during the restriction time window, and wherein, when the database operation is executed based on the energy utilization-based operation restriction enforcement data indicating execution of the operation is allowed for the one user entity, updating the per-user running total operation metrics for the one user entity to include the operation metrics for the database operation based on the database operation being executed during the restriction time window for the one user entity.

14. The method of claim 1, further comprising generating a plurality of different operation requirement data for a plurality of different time frames based on the power usage policy data, wherein the database operation is executed over a temporal period that spans multiple ones of the plurality of different time frames, wherein performing the energy utilization-based operation limitation enforcement function is based on determining whether execution of the database operation is allowed based on adherence to each total energy consumption-based aggregate operation requirement data for each of the multiple ones of the plurality of different time frames.

15. The method of claim 1, further comprising:

generating a plurality of different operation requirement data for at least one of: a plurality of different user entities, a plurality of different operation types, or a plurality of different operation priorities;

wherein one of the plurality of different operation requirement data is applied to generate the energy utilization-based operation restriction enforcement data for the database operation based on at least one of: a user entity requesting the database operation, an operation type of the database operation, or an operation priority of the database operation.

16. The method of claim 1, wherein the energy utilization-based operation restriction enforcement input data for the database operation that includes at least one of:

an operation type of the database operation;

operation parameter data for the database operation;

projected temporal database power usage data for the database system; or current power meter measurement data for the database system.

17. The method of claim 1, further comprising:

performing an energy utilization estimation function upon operation parameter data for the database operation to generate corresponding energy utilization estimate data for the database operation, wherein the energy utilization-based operation restriction enforcement input data includes the energy utilization estimate data generated for the database operation.

18. The method of claim 1, wherein the database operation corresponds to one of:

a query operation, wherein executing the database operation includes generating a query resultant for a query expression;

an ingress operation, wherein executing the database operation includes receiving a plurality of records for storage;

a storage-formatted data structure generation operation, wherein executing the database operation includes generating a plurality of storage-formatted data structures from a corresponding plurality of records for storage;

a rebuilding operation, wherein executing the database operation includes rebuilding a first data structure from at least one other first data structure; or a migration operation, wherein executing the database operation includes migrating at least one first data structure from storage in at least one first source location to storage in at least one first destination location.

19. A parallelized database system comprises:

a data input sub-system including a first plurality of computing device clusters, wherein the first plurality of computing device clusters includes first pluralities of computing devices, wherein the first pluralities of computing devices includes pluralities of loader computing nodes, wherein a first computing device of the first pluralities of computing devices incudes a first plurality of loader computing nodes of the pluralities of loader computing nodes;

a query and response sub-system including a second plurality of computing device clusters, wherein the second plurality of computing device clusters includes second pluralities of computing devices, wherein the second pluralities of computing devices includes pluralities of query and response computing nodes, wherein a first computing device of the second pluralities of computing devices incudes a first plurality of query and response computing nodes of the pluralities of query and response computing nodes;

a store and compute sub-system including a third plurality of computing device clusters, wherein the third plurality of computing device clusters includes third pluralities of computing devices, wherein the third pluralities of computing devices includes pluralities of store and compute computing nodes, wherein a first computing device of the third pluralities of computing devices includes a first plurality of store and compute computing nodes of the pluralities of store and compute computing nodes; and an energy utilization processing sub-system operable to:

monitor the data input sub-system for data input operations;

monitor the query and response sub-system for incoming queries;

monitor the store and compute sub-system for store and compute operations; and based on the monitoring:

determine a database operation for execution;

determine power usage policy data for the database system regarding the database operation;

generate operation requirement data based on the power usage policy data;

perform an energy utilization-based operation limitation enforcement function upon energy utilization-based operation restriction enforcement input data to generate energy utilization-based operation restriction enforcement data for the database operation based on applying the operation requirement data;

execute the database operation when the energy utilization-based operation restriction enforcement data indicates execution of the operation is allowed based on execution of the database operation adhering to the operation requirement data; and forego execution of the database operation when the energy utilization-based operation restriction enforcement data indicates execution of the operation is disallowed based on execution of the database operation not adhering to the operation requirement data.

20. A non-transitory computer readable storage medium comprises:

a first memory section that stores operational instructions that, when executed by an energy utilization processing sub-system of a parallelized database system, cause the energy utilization processing sub-system to:

monitor a first plurality of computing device clusters of a data input sub-system of the parallelized database system for data input operations, wherein the first plurality of computing device clusters includes first pluralities of computing devices, wherein the first pluralities of computing devices includes pluralities of loader computing nodes, wherein a first computing device of the first pluralities of computing devices incudes a first plurality of loader computing nodes of the pluralities of loader computing nodes;

monitor a second plurality of computing device clusters of a query and response sub-system of the parallelized database system for incoming queries, wherein the second plurality of computing device clusters includes second pluralities of computing devices, wherein the second pluralities of computing devices includes pluralities of query and response computing nodes, wherein a first computing device of the second pluralities of computing devices incudes a first plurality of query and response computing nodes of the pluralities of query and response computing nodes;

monitor a third plurality of computing device clusters of a store and compute sub-system of the parallelized database system for store and compute operations, wherein the third pluralities of computing devices includes pluralities of store and compute computing nodes, wherein a first computing device of the third pluralities of computing devices incudes a first plurality of store and compute computing nodes of the pluralities of store and compute computing nodes; and based on the monitoring:

determine a database operation for execution;

determine power usage policy data for the database system regarding the database operation;

generate operation requirement data based on the power usage policy data;

perform an energy utilization-based operation limitation enforcement function upon energy utilization-based operation restriction enforcement input data to generate energy utilization-based operation restriction enforcement data for the database operation based on applying the operation requirement data;

execute the database operation when the energy utilization-based operation restriction enforcement data indicates execution of the operation is allowed based on execution of the database operation adhering to the operation requirement data; and forego execution of the database operation when the energy utilization-based operation restriction enforcement data indicates execution of the operation is disallowed based on execution of the database operation not adhering to the operation requirement data.

* * * * *